US008416468B2

(12) United States Patent
Underwood et al.

(10) Patent No.: US 8,416,468 B2

(45) Date of Patent: Apr. 9, 2013

(54) SENSING DEVICE FOR SUBSAMPLING IMAGED CODED DATA

(75) Inventors: Matthew John Underwood, Balmain (AU); Nicholas Damon Ridley, Balmain (AU); Paul Lapstun, Balmain (AU); Peter Charles Boyd Henderson, Balmain (AU); Zhenya Alexander Yourlo, Balmain (AU); Alireza Moini, Balmain (AU); Jan Rusman, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

(21) Appl. No.: 12/568,635

(22) Filed: Sep. 28, 2009

(65) Prior Publication Data

US 2010/0014784 A1 Jan. 21, 2010

Related U.S. Application Data

(63) Continuation of application No. 10/815,636, filed on Apr. 2, 2004, now Pat. No. 7,605,940, which is a continuation-in-part of application No. 10/778,056, filed on Feb. 17, 2004.

(51) Int. Cl.
*H04N 1/04* (2006.01)
*H04N 3/14* (2006.01)

(52) U.S. Cl. ......................... 358/474; 358/483; 348/317

(58) Field of Classification Search .................. 358/505, 358/513, 474, 479, 483, 497, 1.17; 348/294, 348/295, 317

See application file for complete search history.

(56) References Cited

U.S. PATENT DOCUMENTS 4,825,058 A 4/1989 Poland
4,864,618 A 9/1989 Wright et al.
5,051,736 A 9/1991 Bennett et al.
5,077,612 A 12/1991 Megrgardt et al.
5,260,556 A 11/1993 Lake et al.
5,477,012 A 12/1995 Sekendur
5,600,582 A 2/1997 Miyaguchi
5,652,412 A 7/1997 Lazzouni et al.
5,661,506 A 8/1997 Lazzouni et al.

(Continued)

FOREIGN PATENT DOCUMENTS

DE 3942615 A1 6/1990
EP 0510408 A 10/1992

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner* — Jerome Grant, II

(57) ABSTRACT

A sensing device is provided with an image sensor for capturing images of coded data disposed on a surface, a framestore for storing frames of the captured image as image data, subsampling means for subsampling the stored image date to generate subsampled image data, and an image processor for processing the subsampled image data to generate interaction data based on the sensed coded data and indicative of interaction of the sensing device with the surface. The image processor is integrated on a monolithic integrated circuit, the monolithic integrated circuit including a first subsampled framestore for storing the subsampled image data based on image data from the framestore.

3 Claims, 157 Drawing Sheets

| | | | | | |
|---|---|---|---|---|---|
| 0x7E | control byte "00110001" | TopLeftX | TopLeftY | SizeX-1 | SizeY-1 |

Sub-sampled image read command with arguments

U.S. PATENT DOCUMENTS

| | | | | |
|---|---|---|---|---|
| 5,692,073 | A | 11/1997 | Cass | |
| 5,832,133 | A | 11/1998 | Smith | |
| 5,852,434 | A | 12/1998 | Sekendur | |
| 5,905,251 | A | 5/1999 | Knowles | |
| 5,940,595 | A | 8/1999 | Reber et al. | |
| 5,978,773 | A | 11/1999 | Hudetz et al. | |
| 6,006,990 | A | 12/1999 | Ye et al. | |
| 6,046,444 | A | 4/2000 | Afghahi | |
| 6,076,734 | A | 6/2000 | Dougherty et al. | |
| 6,248,991 | B1 | 6/2001 | Chen et al. | |
| 6,344,877 | B1 | 2/2002 | Gowda et al. | |
| 6,366,317 | B1 | 4/2002 | Mattison et al. | |
| 6,456,326 | B2 | 9/2002 | Fossum et al. | |
| 6,567,571 | B1 | 5/2003 | Kochi et al. | |
| 6,606,122 | B1 | 8/2003 | Shaw et al. | |
| 6,879,340 | B1 * | 4/2005 | Chevallier | 348/207.99 |
| 6,903,670 | B1 | 6/2005 | Lee et al. | |
| 6,930,709 | B1 | 8/2005 | Creamer et al. | |
| 6,964,374 | B1 | 11/2005 | Djuknic et al. | |
| 7,009,648 | B2 | 3/2006 | Lauxtermann et al. | |
| 7,092,582 | B2 | 8/2006 | Hier et al. | |
| 7,164,443 | B1 | 1/2007 | Hagihara | |
| 7,224,389 | B2 | 5/2007 | Dierickx | |
| 7,239,349 | B2 | 7/2007 | Saito et al. | |
| 7,265,397 | B1 | 9/2007 | Tower et al. | |
| 7,277,129 | B1 | 10/2007 | Lee | |
| 7,315,406 | B2 * | 1/2008 | Lee et al. | 358/482 |
| 7,443,427 | B2 | 10/2008 | Takayanagi | |
| 7,515,186 | B2 | 4/2009 | Moini | |
| 7,567,279 | B2 | 7/2009 | Yourlo | |
| 7,760,259 | B2 | 7/2010 | Moini | |
| 2001/0002945 | A1 | 6/2001 | Watanabe et al. | |
| 2001/0040631 | A1 | 11/2001 | Ewedemi | |
| 2002/0125317 | A1 | 9/2002 | Hussey | |
| 2002/0160711 | A1 | 10/2002 | Carlson et al. | |
| 2003/0011694 | A1 | 1/2003 | Dierickx | |
| 2003/0052976 | A1 | 3/2003 | Harada et al. | |
| 2003/0206319 | A1 | 11/2003 | Kondo | |
| 2004/0051800 | A1 | 3/2004 | Hsieh | |
| 2004/0098911 | A1 | 5/2004 | Okamoto et al. | |
| 2004/0103133 | A1 | 5/2004 | Gurney | |
| 2004/0153270 | A1 * | 8/2004 | Yamashita et al. | 702/81 |
| 2004/0155977 | A1 * | 8/2004 | Clark et al. | 348/362 |
| 2004/0164165 | A1 * | 8/2004 | Havens et al. | 235/462.43 |
| 2005/0024510 | A1 * | 2/2005 | Lapstun et al. | 348/294 |
| 2005/0024511 | A1 * | 2/2005 | Lapstun et al. | 348/294 |
| 2005/0024512 | A1 * | 2/2005 | Moini et al. | 348/294 |
| 2005/0024524 | A1 * | 2/2005 | Yourlo et al. | 348/372 |
| 2005/0036039 | A1 * | 2/2005 | Silverbrook et al. | 348/222.1 |
| 2005/0046717 | A1 * | 3/2005 | Lapstun et al. | 348/308 |
| 2005/0046718 | A1 * | 3/2005 | Yourlo et al. | 348/308 |
| 2005/0052556 | A1 * | 3/2005 | Henderson et al. | 348/308 |
| 2005/0134702 | A1 * | 6/2005 | Subbotin | 348/223.1 |
| 2010/0002111 | A1 | 1/2010 | Yourlo et al. | |

FOREIGN PATENT DOCUMENTS

| | | | |
|---|---|---|---|
| EP | 0539897 | A | 5/1993 |
| EP | 1016953 | A2 | 7/2000 |
| EP | 1143707 | A2 | 10/2001 |
| EP | 1237363 | A | 9/2002 |
| EP | 1278100 | A | 1/2003 |
| EP | 0840172 | B1 | 4/2003 |
| GB | 2269506 | A | 2/1994 |
| GB | 2306669 | A | 5/1997 |
| GB | 2336497 | A | 10/1999 |
| WO | WO 98/17051 | A | 4/1998 |
| WO | WO 99/18487 | A2 | 4/1999 |
| WO | WO 99/21136 | A1 | 4/1999 |
| WO | WO 99/50787 | A1 | 10/1999 |
| WO | WO 01/03015 | A1 | 1/2001 |
| WO | WO 02/23726 | A1 | 3/2002 |
| WO | WO 02/98112 | A2 | 5/2002 |
| WO | WO 02/45404 | A | 6/2002 |
| WO | WO 02/063691 | A | 8/2002 |
| WO | WO02/098112 | A2 | 12/2002 |

* cited by examiner

Note: the number of clock pulses between events is indicative only. The actual values will depend on the particular implementation.

| | | | |
|---|---|---|---|
| 0x7E | control byte "00100001" | TopLeftX | TopLeftY |

Unprocessed image read command

FIG. 158

| | | | | | |
|---|---|---|---|---|---|
| 0x7E | control byte "00111001" | TopLeftX | TopLeftY | SizeX-1 | SizeY-1 |

processed image read command with arguments

FIG. 159A

| | |
|---|---|
| 0x7E | control byte "00011001" |

processed image read command without arguments

FIG. 159B

Sub-sampled image read command with arguments

Sub-sampled image read command without arguments

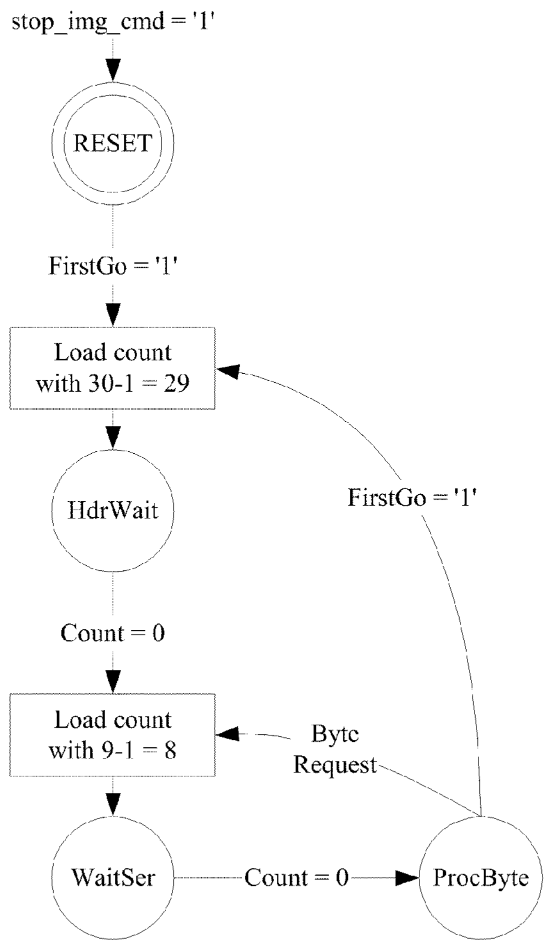

Notes:

1. FirstGo
   This is the 'fgo' field of the image command from the serial_if. This basically says - "Wait for the serial_if to send out a command header before you start."

2. When stop_img_cmd = '1', this acts as a global reset and overides all other transitions.

3. The ser_avail output is '1' only during the ProcByte state. The ByteRequest may come immediately (in the same cycle), so this state may only last for one cycle.

4. The HdrWait state will last for 30 cycles. The WaitSer state will last for 9 cycles, and when added to the minimum one ProcByte state, we get the required 10 cycles for every byte.

FIG. 196

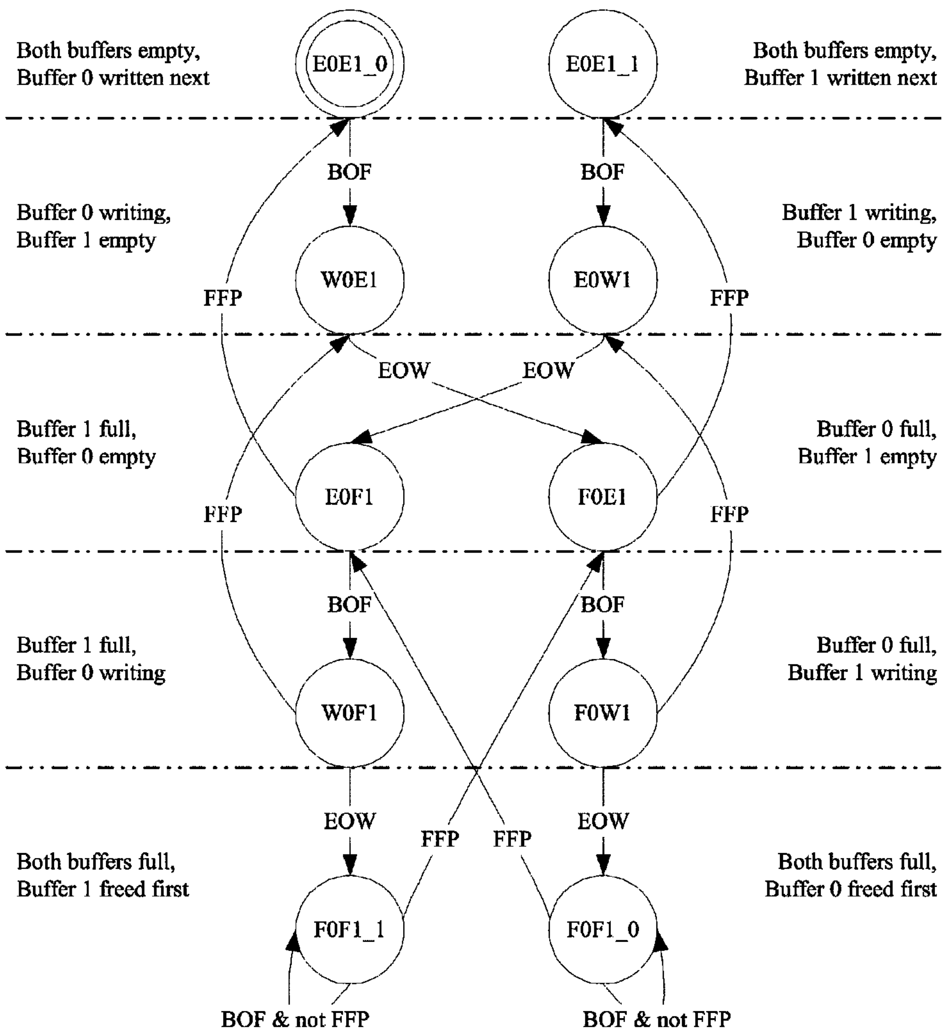

Notes:

1. BOF - Beginning Of Frame. isync1 pulse from sens_mux
2. EOW - End Of Window from sens_ss
3. FFP- Finished Frame Processing event from the serialif 4. State names are coded to show the state of both buffers:
   E - empty
   F - full
   W - writing When both are empty or full, the extra number on the end shows which will be wriiten to next.

5. Transitions from one side to the other generate NewFrame events to the serialif. The NewFrame event includes the number of the buffer just filled.

6. Where the head of a FFP transition meets the tail of a BOF or EOW transition, the tail transition will be followed (if true) before entering the state.

For example:
From state E0F1, if FFP is true but BOF is false, E0E1 is the next state. If FFP is true and BOF is true, W0E1 is the destination.

FIG. 198

SENSING DEVICE FOR SUBSAMPLING IMAGED CODED DATA

This application is a Continuation of U.S. application Ser. No. 10/815,636 filed Apr. 2, 2004, which is a Continuation-in-Part of co-pending application No. U.S. Ser. No. 10/778,056, filed on Feb. 17, 2004, herein incorporated as a reference.

FIELD OF THE INVENTION

The present invention relates to the field of sensing devices for sensing coded data on or in a surface.

The invention has been designed to enable a user to interact with printed coded data on product packaging or labels, and will largely be described with reference to this application. However, it will be appreciated that the invention is not limited to use in this particular application.

CO-PENDING APPLICATIONS

Various methods, systems and apparatus relating to the present invention are disclosed in the following co-pending applications filed by the applicant or assignee of the present invention simultaneously with application Ser. No. 10/815,636:

| | | | | |
|---|---|---|---|---|
| 10/815,621 | 7,243,835 | 10/815,630 | 10/815,637 | 10/815,638 |
| 7,251,050 | 10/815,642 | 7,097,094 | 7,137,549 | 10/815,618 |
| 7,156,292 | 10/815,635 | 7,357,323 | 10/815,634 | 7,137,566 |
| 7,131,596 | 7,128,265 | 7,207,485 | 7,197,374 | 7,175,089 |
| 10/815,617 | 7,537,160 | 7,178,719 | 7,506,808 | 7,207,483 |
| 7,296,737 | 7,270,266 | 10/815,614 | 7,128,270 | 7,457,007 |
| 7,150,398 | 7,159,777 | 7,450,273 | 7,188,769 | 7,097,106 |
| 7,070,110 | 7,243,849 | 7,204,941 | 7,282,164 | 7,465,342 |

The disclosures of these co-pending applications are incorporated herein by cross-reference.

CROSS-REFERENCES

Various methods, systems and apparatus relating to the present invention are disclosed in the following co-pending applications filed by the applicant or assignee of the present invention. The disclosures of all of these co-pending applications and granted patents are incorporated herein by cross-reference.

| | | | | |
|---|---|---|---|---|
| 7,156,289 | 7,178,718 | 7,225,979 | 09/575,197 | 7,079,712 |
| 6,825,945 | 7,330,974 | 6,813,039 | 7,190,474 | 6,987,506 |
| 6,824,044 | 6,980,318 | 6,816,274 | 7,102,772 | 7,350,236 |
| 6,681,045 | 6,678,499 | 6,679,420 | 6,963,845 | 6,976,220 |
| 6,728,000 | 7,110,126 | 7,173,722 | 6,976,035 | 6,813,558 |
| 6,766,942 | 6,965,454 | 6,995,859 | 7,088,459 | 6,720,985 |
| 7,286,113 | 6,922,779 | 6,978,019 | 6,847,883 | 7,131,058 |
| 7,295,839 | 7,406,445 | 7,533,031 | 6,959,298 | 6,973,450 |
| 7,150,404 | 6,965,882 | 7,233,924 | 09/575,181 | 7,593,899 |
| 7,175,079 | 7,162,259 | 6,718,061 | 7,464,880 | 7,012,710 |
| 6,825,956 | 7,451,115 | 7,222,098 | 7,590,561 | 7,263,508 |
| 7,031,010 | 6,972,864 | 6,862,105 | 7,009,738 | 6,989,911 |
| 6,982,807 | 7,518,756 | 6,829,387 | 6,714,678 | 6,644,545 |
| 6,609,653 | 6,651,879 | 10/291,555 | 7,293,240 | 7,467,185 |
| 7,415,668 | 7,044,363 | 7,004,390 | 6,867,880 | 7,034,953 |
| 6,987,581 | 7,216,224 | 7,506,153 | 7,162,269 | 7,162,222 |
| 7,290,210 | 7,293,233 | 7,293,234 | 6,850,931 | 6,865,570 |
| 6,847,961 | 10/685,583 | 7,162,442 | 10/685,584 | 7,159,784 |
| 7,557,944 | 7,404,144 | 7,068,382 | 7,007,851 | 6,957,921 |

-continued

| | | | | |
|---|---|---|---|---|
| 6,457,883 | 7,094,910 | 7,091,344 | 7,122,685 | 7,038,066 |
| 7,099,019 | 7,062,651 | 6,789,194 | 6,789,191 | 6,644,642 |
| 6,502,614 | 6,622,999 | 6,669,385 | 6,827,116 | 6,549,935 |
| 6,987,573 | 6,727,996 | 6,591,884 | 6,439,706 | 6,760,119 |
| 7,295,332 | 7,064,851 | 6,826,547 | 6,290,349 | 6,428,155 |
| 6,785,016 | 6,831,682 | 6,741,871 | 6,927,871 | 6,980,306 |
| 6,965,439 | 6,840,606 | 7,036,918 | 6,977,746 | 6,970,264 |
| 7,068,389 | 7,093,991 | 7,190,491 | 6,982,798 | 6,870,966 |
| 6,822,639 | 6,474,888 | 6,627,870 | 6,724,374 | 6,788,982 |
| 7,263,270 | 6,788,293 | 6,946,672 | 6,737,591 | 7,091,960 |
| 7,369,265 | 6,792,165 | 7,105,753 | 6,795,593 | 6,980,704 |
| 6,768,821 | 7,132,612 | 7,041,916 | 6,797,895 | 7,015,901 |
| 7,289,882 | 7,148,644 | 10/778,056 | 10/778,058 | 10/778,060 |
| 7,515,186 | 7,567,279 | 10/778,062 | 10/778,061 | 10/778,057 |
| 7,055,739 | 7,233,320 | 6,830,196 | 6,832,717 | 7,182,247 |
| 7,082,562 | 6,843,420 | 10/291,718 | 6,789,731 | 7,057,608 |
| 6,766,944 | 6,766,945 | 7,289,103 | 7,412,651 | 7,299,969 |
| 7,108,192 | 7,111,791 | 7,564,605 | 10/683,040 | 7,526,128 |
| 6,957,768 | 7,456,820 | 7,170,499 | 7,106,888 | 7,123,239 |
| 6,982,701 | 6,982,703 | 7,227,527 | 6,786,397 | 6,947,027 |
| 6,975,299 | 7,139,431 | 7,048,178 | 7,118,025 | 6,839,053 |
| 7,015,900 | 7,010,147 | 7,133,557 | 6,914,593 | 7,437,671 |
| 6,454,482 | 6,808,330 | 6,527,365 | 6,474,773 | 6,550,997 |
| 7,093,923 | 6,957,923 | 7,131,724 | | |

BACKGROUND

Monolithic integrated circuit image sensors are known in the art. Examples include Charge-Coupled Devices (CCDs) and CMOS image sensors. Refer, for example, to Janesick, J. R., *Scientific Charge-Coupled Devices* (SPIE Press 2001); Holst, G. C., *CCD Arrays, Cameras and Displays* (SPIE Press 1996); and Moini, A., *Vision Chips* (Kluwer Academic Publishers 1999). Digital image processing algorithms are known in the art. Refer, for example, to Gonzales, R. C. and R. E. Woods, *Digital Image Processing* (Addision Wesley 1992).

Image sensors such as CMOS and CCD image capture devices are known. Such devices are typically designed to work in conjunction with an external framestore and a host processor.

One of the issues that arises when such image sensors are used in systems with a host processor is that the link between the image sensor and the host processor must support the relatively high read-out data rate of the image sensor.

It would desirable, at least for some aspects of the invention, to provide alternative architectures that overcome some of the problems associated with direct coupling between the image sensor and the host processor.

Active pixel cells have a storage node which stores a charge. During an integration period, the stored charge is modified from an initial level. Once the integration is completed, the amount of charge determines an output voltage, which can be used to drive an output circuit. The output of the output circuit is controlled by the voltage, and hence the charge, of the storage node.

In conventional pixel cells, switching into and out of the integration period causes one or more voltage drops at the storage node due to various capacitances in the circuit. This reduces the potential dynamic range of the pixel cell.

It would be desirable, at least for some aspects of the invention, to provide a pixel cell that overcomes or at least reduces the impact of these voltage drops without requiring complicated additional circuitry. It would be even more desirable if a fill factor of such a pixel cell was not substantially different to that of prior art pixel cells.

SUMMARY OF THE INVENTION

In a first aspect the present invention provides a sensing device for: sensing coded data disposed on a surface; and generating interaction data based on the sensed coded data, the interaction data being indicative of interaction of the sensing device with the surface; the sensing device comprising:

(a) an image sensor for capturing image information;

(b) at least one analog to digital converter for converting the captured image information into image data;

(c) an image processor for processing the image data to generate processed image data;

(d) a host processor for generating the interaction data based at least partially on the processed image data.

In a further aspect the present invention provides a sensing device for: sensing coded data disposed on a surface; and generating interaction data based on the sensed coded data, the interaction data being indicative of interaction of the sensing device with the surface; the sensing device comprising:

(a) a monolithic integrated circuit, comprising:

(i) an image sensor for capturing image information;

(ii) at least one analog to digital converter for converting the captured image information into image data;

(iii) a framestore for storing the image data; and (b) a host processor for generating the interaction data based at least partially on the image data.

In a second aspect the present invention provides a scanning device for: scanning coded data disposed on a surface; and generating interaction data based on the sensed coded data, the interaction data being indicative of interaction of the scanning device with the surface; the coded data including, at a plurality of locations on the interface surface, a corresponding plurality of coded data portions, the scanning device comprising:

(a) a laser source and scan optics configured to emit a scanning beam through an aperture in a housing of the scanning device, the scanning beam being directed in first and second orthogonal directions to thereby generate a raster scan pattern over a scanning patch, the scanning patch being positioned to cause the exposure of the at least one coded data portion when the surface and the sensing device are positioned operatively with respect to each other;

(b) a photodetector for detecting reflection of the scanning beam from the surface, thereby to capture sample information;

(c) at least one analog to digital converter for converting the captured sample information into sample data;

(d) a first framestore for storing successive sample data as image data;

(e) an image processor for processing the image data to generate processed image data;

(e) a host processor for generating the interaction data based at least partially on the processed image data.

BRIEF DESCRIPTION OF THE DRAWINGS

Preferred and other embodiments of the invention will now be described, by way of non-limiting example only, with reference to the accompanying drawings, in which.

Figure 213:
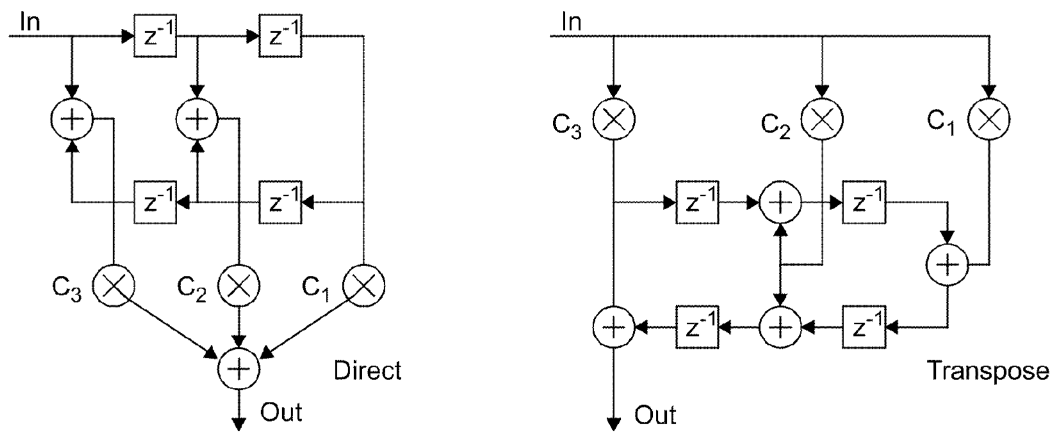

FIG. 213. Symmetric FIR parallel implementation

Figure 214:
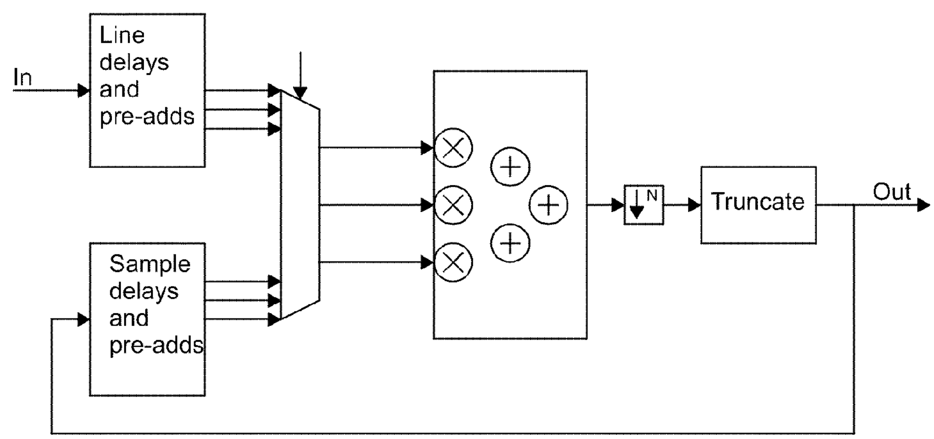

FIG. 214. Reuse of multiplier and adder tree

Figure 215:
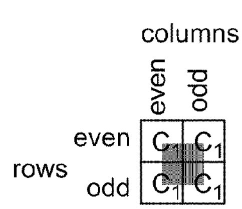

FIG. 215. 2-tap 2D FIR

Figure 216:
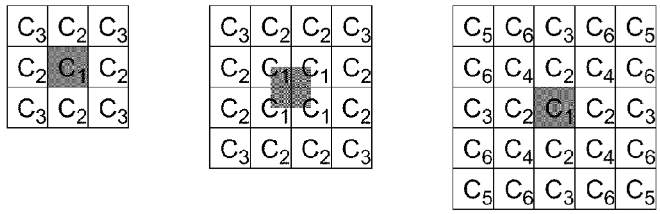

FIG. 216. Symmetric 2D FIR's

Figure 217:
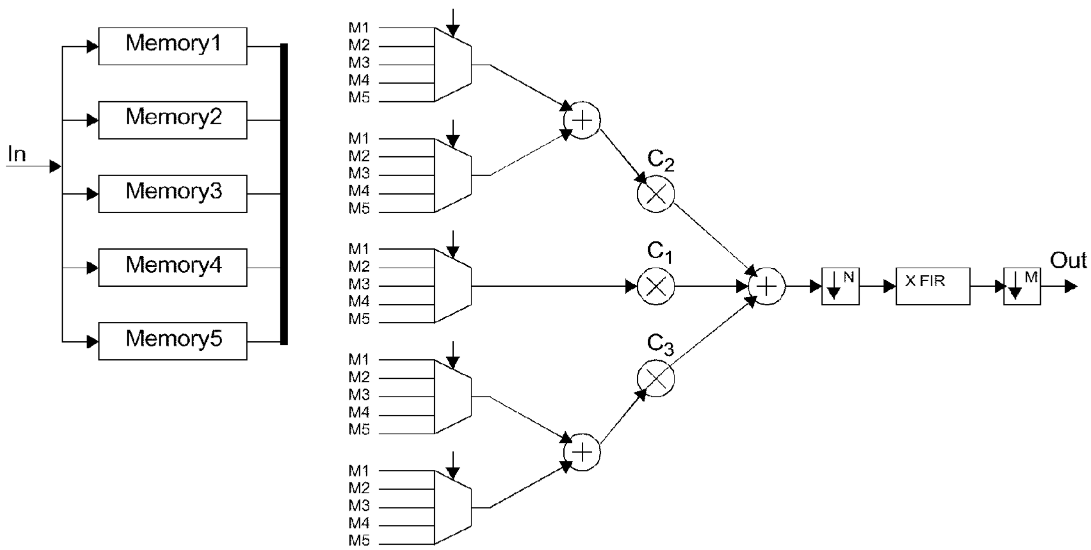

FIG. 217. Block memory scheme decoupling decimation factors and filter order

Figure 218:
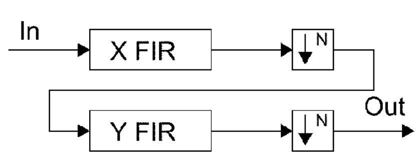

FIG. 218. Reduced linestore 2D FIR

Figure 219:
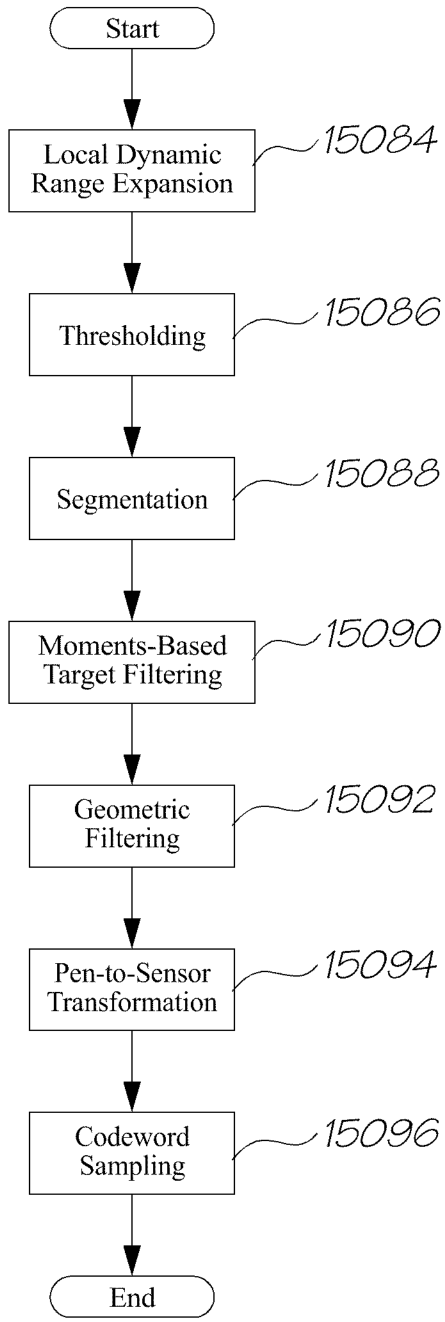

FIG. 219. Tag image processing chain

Figure 220:
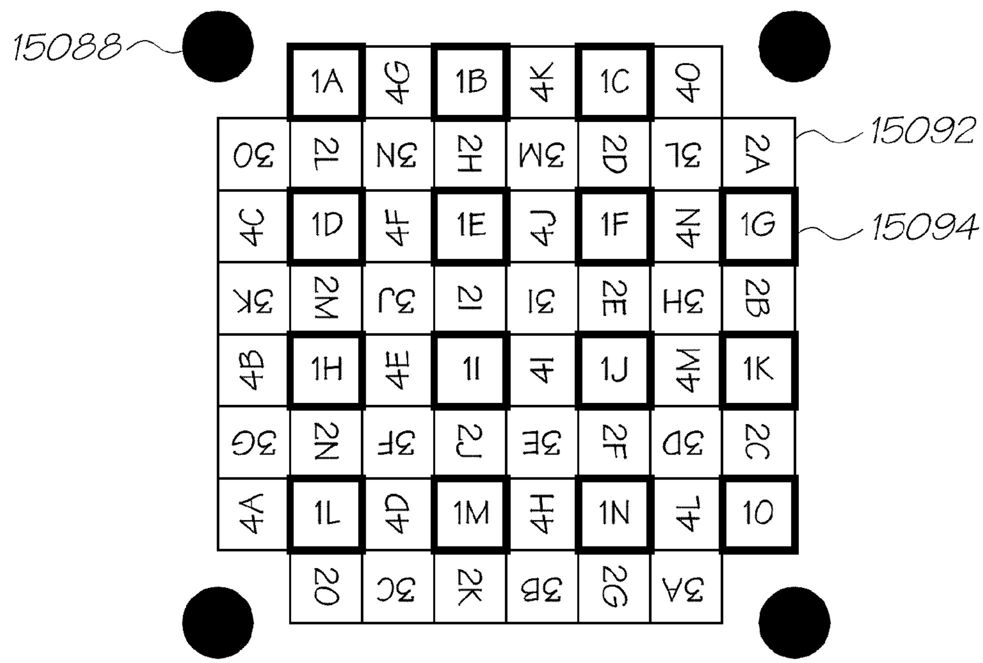

FIG. 220. First sample tag structure, showing symbol arrangement

Figure 221:
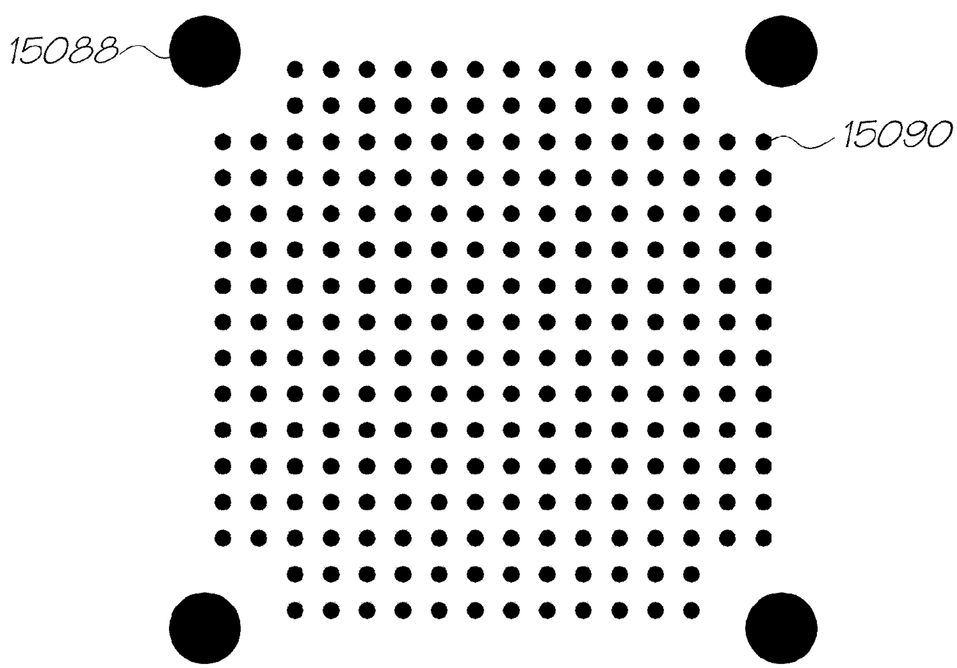

FIG. 221. First sample tag structure, showing macrodot arrangement, (fully populated with macrodots)

Figure 222:
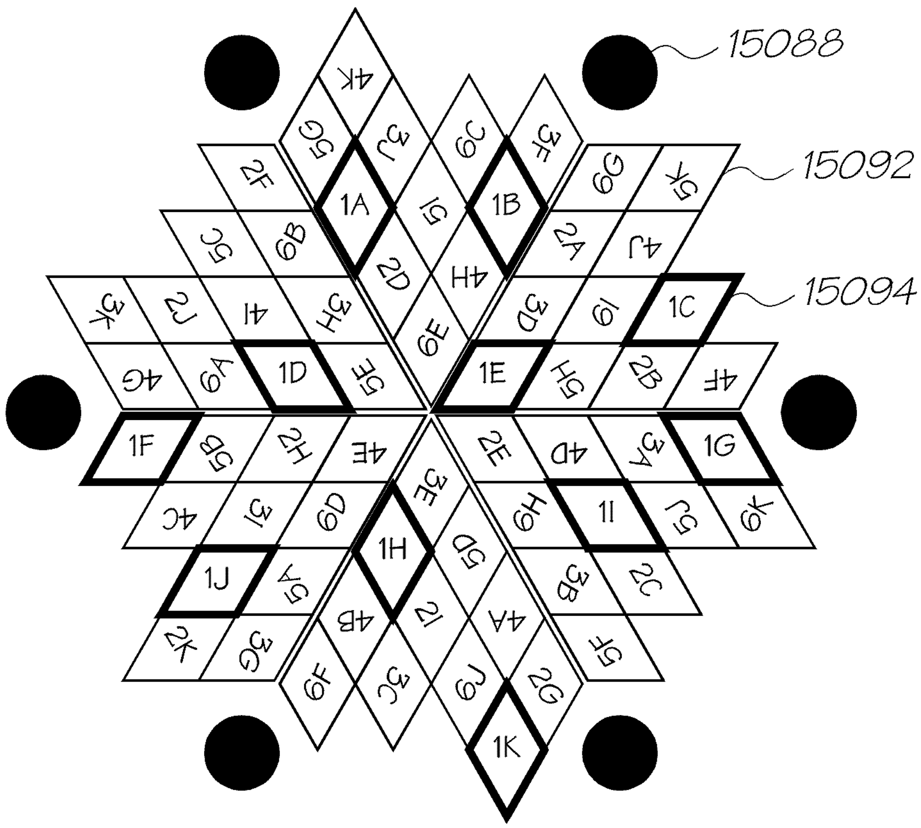

FIG. 222. Second sample tag structure, showing symbol arrangement

Figure 223:
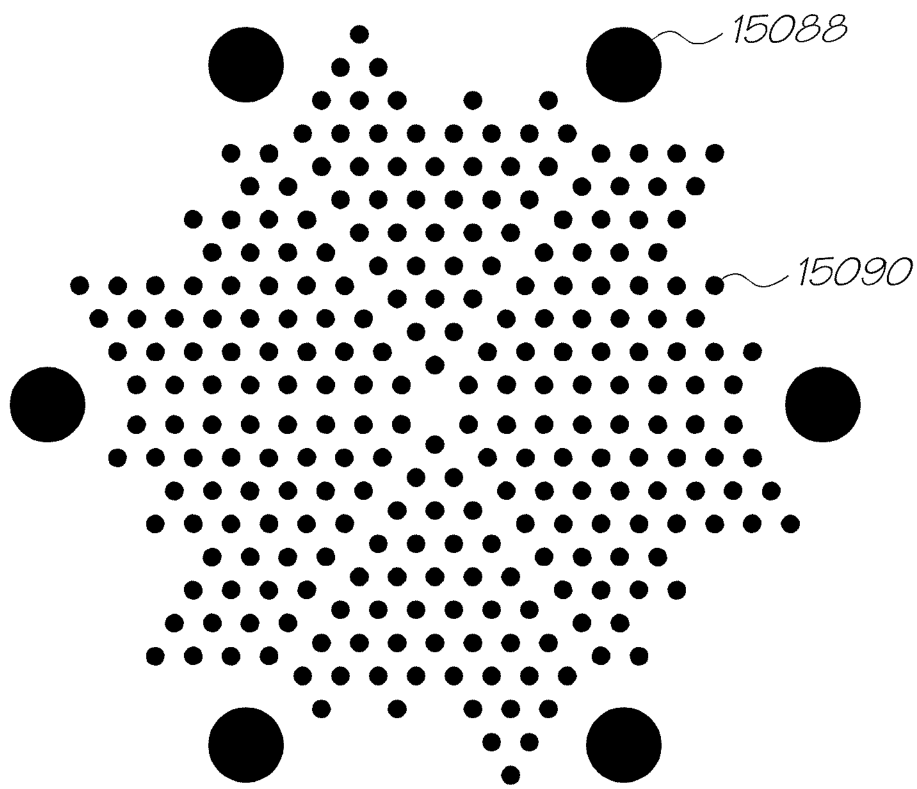

FIG. 223. Second sample tag structure, showing macrodot arrangement (fully populated with macrodots)

DESCRIPTION OF PREFERRED AND OTHER EMBODIMENTS

Note: Memjet™ is a trade mark of Silverbrook Research Pty Ltd, Australia.

In the preferred embodiment, the invention is configured to work with the netpage networked computer system, a detailed overview of which follows. It will be appreciated that not every implementation will necessarily embody all or even most of the specific details and extensions discussed below in relation to the basic system. However, the system is described in its most complete form to reduce the need for external reference when attempting to understand the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
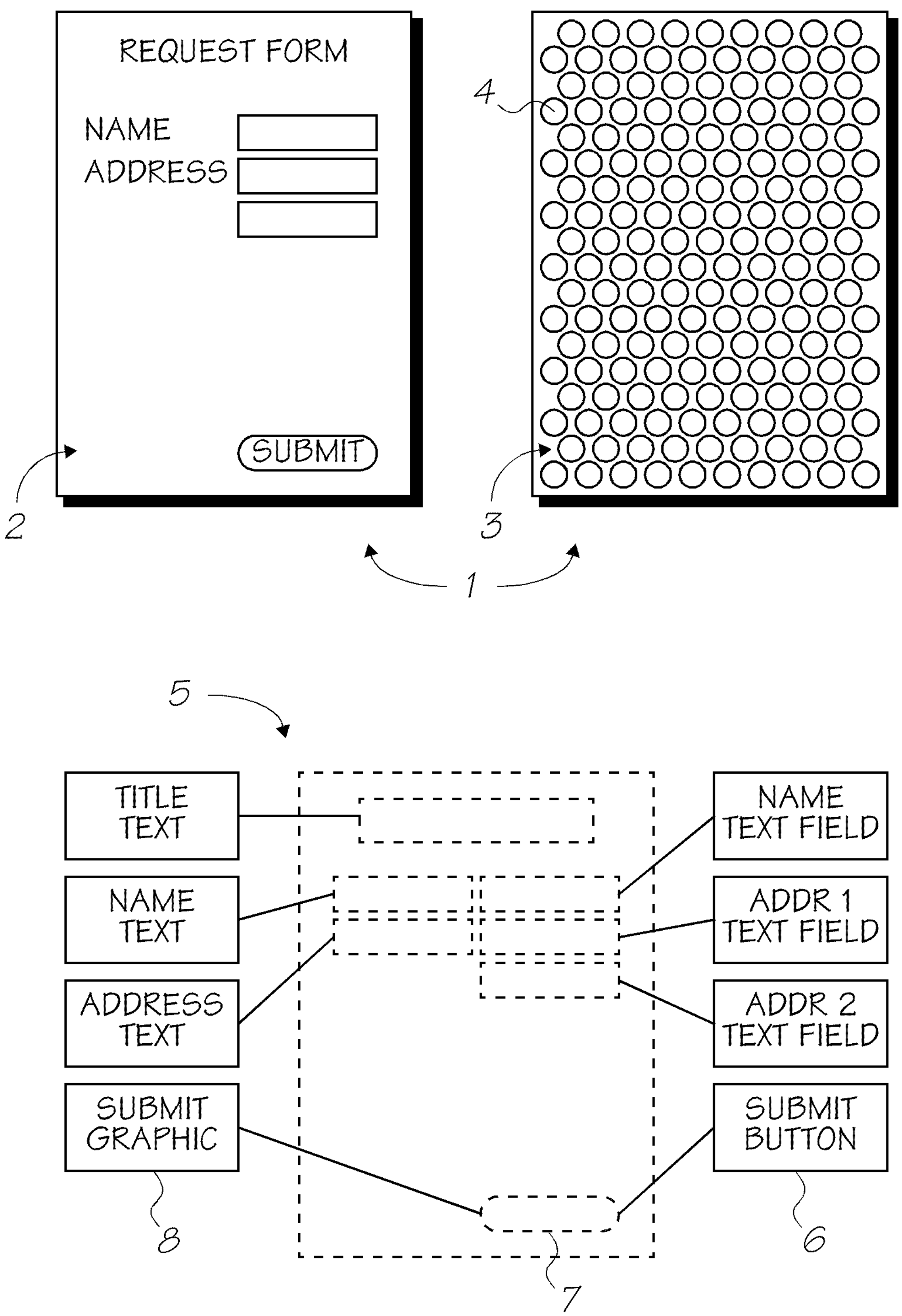
FIG. 1 is a schematic of a the relationship between a sample printed netpage and its online page description.

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
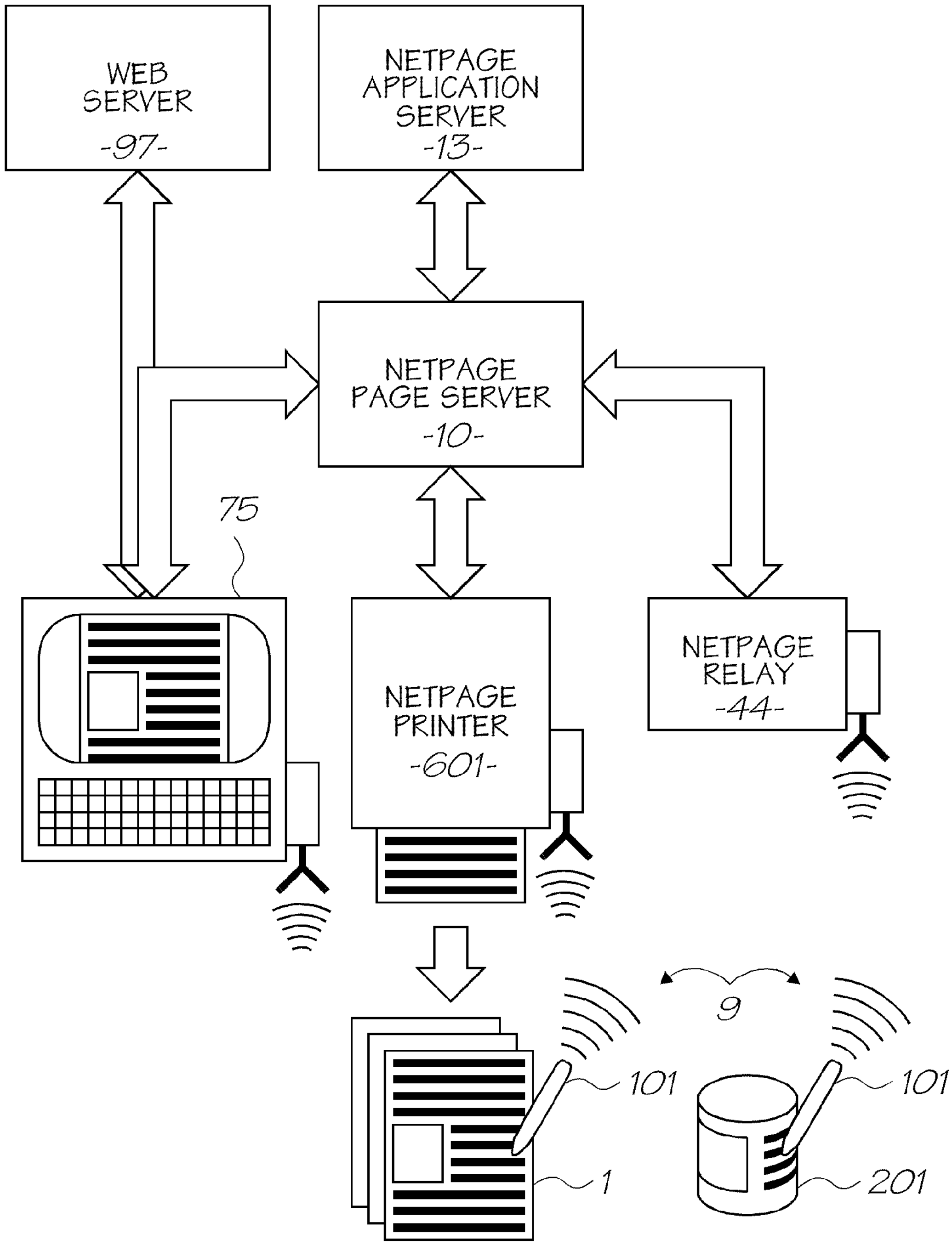
FIG. 2 is a schematic view of a interaction between a netpage pen, a Web terminal, a netpage printer, a netpage relay, a netpage page server, and a netpage application server, and a Web server.
Figure 8:
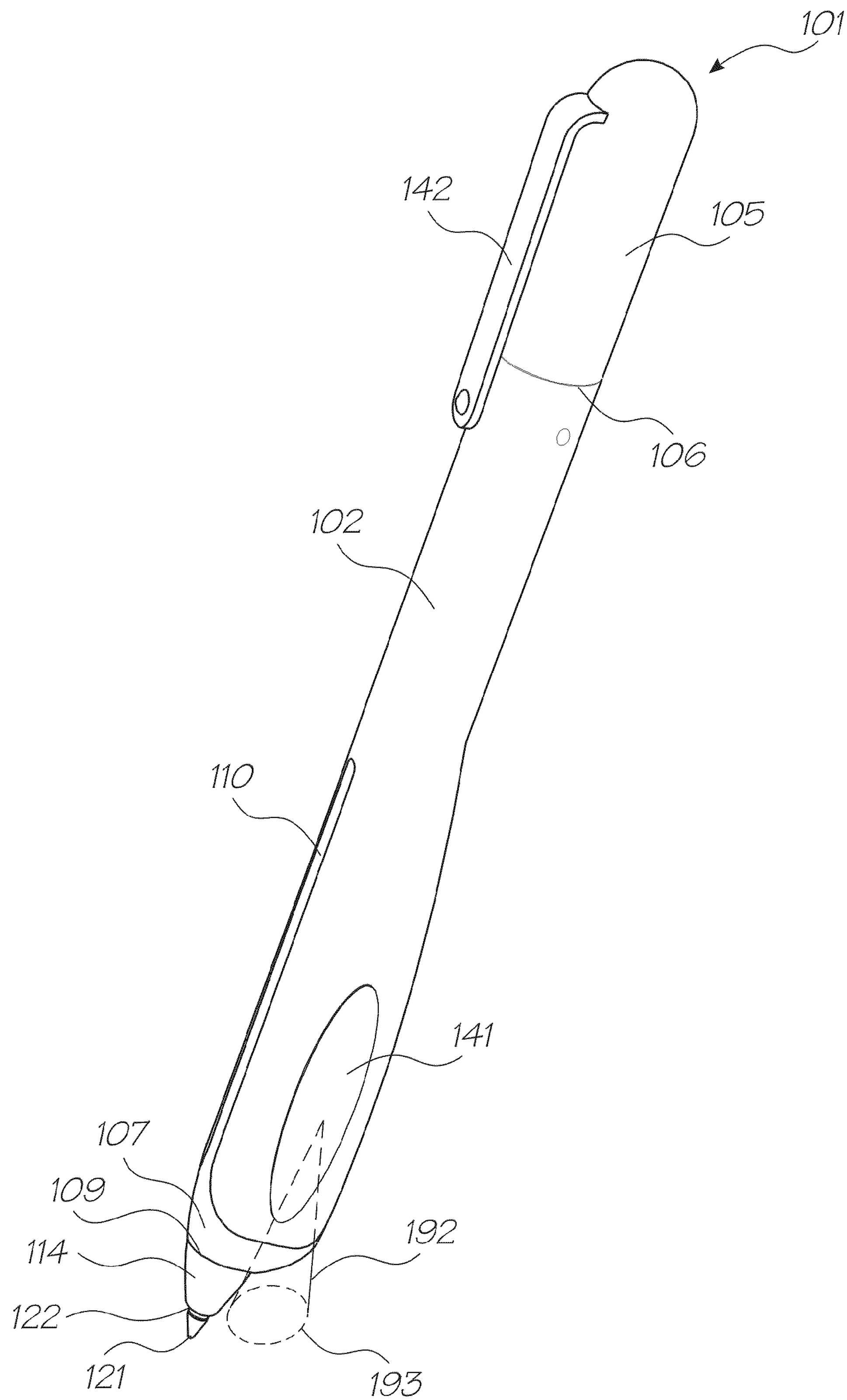
FIG. 8 is a perspective view of a netpage pen and its associated tag-sensing field-of-view cone.
Figure 9:
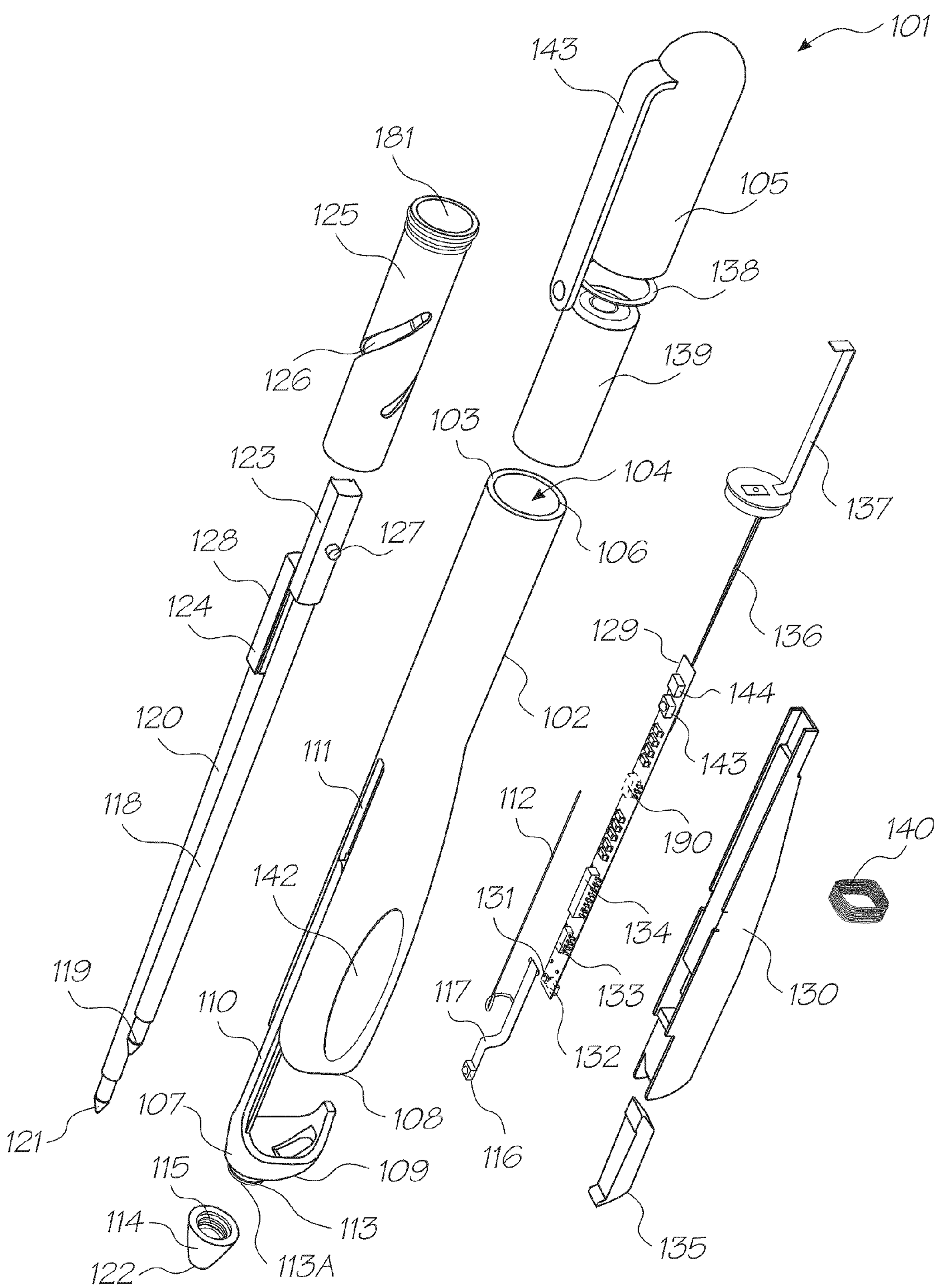
FIG. 9 is a perspective exploded view of the netpage pen shown in FIG. 8.

As illustrated in FIG. 2, the netpage pen 101, a preferred form of which is shown in FIGS. 8 and 9 and described in more detail below, works in conjunction with a personal computer (PC), Web terminal 75, or a netpage printer 601. The netpage printer is an Internet-connected printing appliance for home, office or mobile use. The pen is wireless and communicates securely with the netpage network via a short-range radio link 9. Short-range communication is relayed to the netpage network by a local relay function which is either embedded in the PC, Web terminal or netpage printer, or is provided by a separate relay device 44. The relay function can also be provided by a mobile phone or other device which incorporates both short-range and longer-range communications functions.

In an alternative embodiment, the netpage pen utilises a wired connection, such as a USB or other serial connection, to the PC, Web terminal, netpage printer or relay device.

Figure 11:
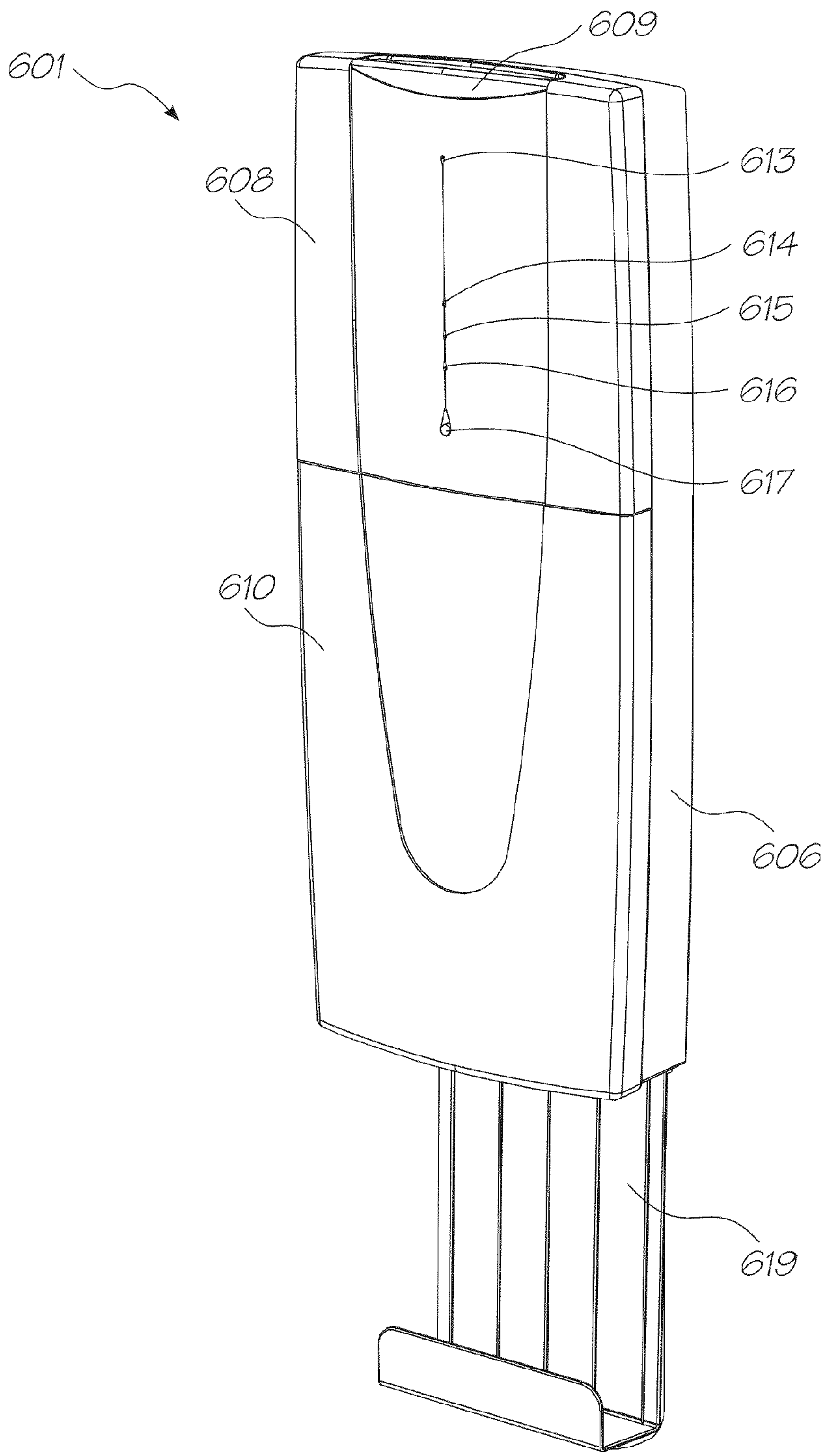
FIG. 11 is a perspective view of a wall-mounted netpage printer.
Figure 12:
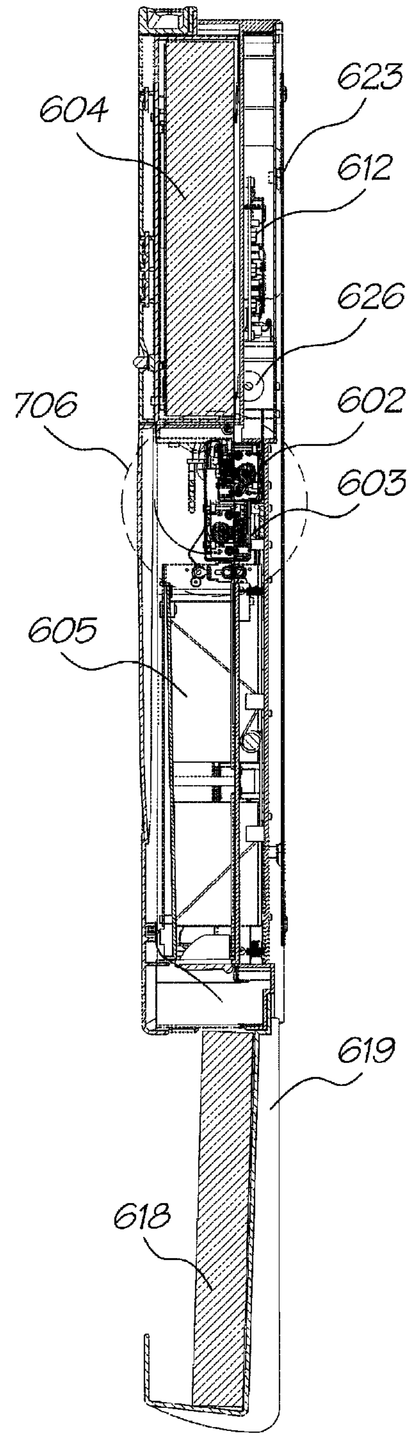
FIG. 12 is a section through the length of the netpage printer of FIG. 11.
Figure 13:
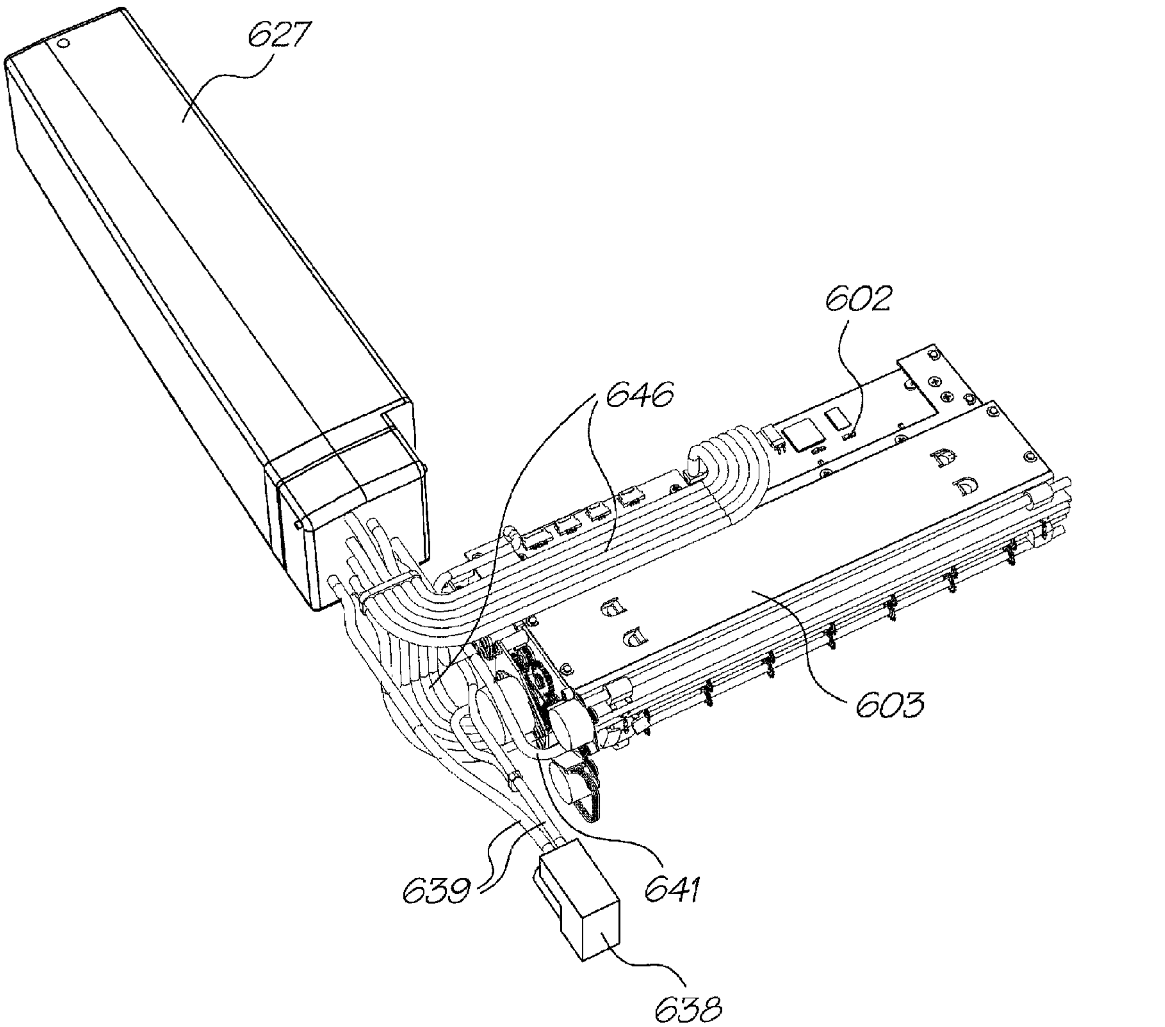
FIG. 13 is a detailed view of the ink cartridge, ink, air and glue paths, and print engines of the netpage printer of FIGS. 11 and 12.

The netpage printer 601, a preferred form of which is shown in FIGS. 11 to 13 and described in more detail below, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 (or product item 201) and communicates the interaction via a short-range radio link 9 to a relay. The relay sends the interaction to the relevant netpage page server 10 for interpretation. In appropriate circumstances, the page server sends a corresponding message to application computer software running on a netpage application server 13. The application server may in turn send a response which is printed on the originating printer.

In an alternative embodiment, the PC, Web terminal, netpage printer or relay device may communicate directly with local or remote application software, including a local or remote Web server. Relatedly, output is not limited to being printed by the netpage printer. It can also be displayed on the PC or Web terminal, and further interaction can be screen-based rather than paper-based, or a mixture of the two.

The netpage system is made considerably more convenient in the preferred embodiment by being used in conjunction with high-speed microelectromechanical system (MEMS) based inkjet (Memjet™) printers. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. Cable service is available to 95% of households in the United States, and cable modem service offering broadband Internet access is already available to 20% of these. The netpage printer can also operate with slower connections, but with longer delivery times and lower image quality. Indeed, the netpage system can be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or email address.

1 Netpage System Architecture

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. The UML does not directly support second-order modelling—i.e. classes of classes.

Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled.

An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line.

A generalization relationship ("is-a") is drawn as a solid line joining two classes, with an arrow (in the form of an open triangle) at the generalization end.

When a class diagram is broken up into multiple diagrams, any class which is duplicated is shown with a dashed outline in all but the main diagram which defines it. It is shown with attributes only where it is defined.

1.1 Netpages

Netpages are the foundation on which a netpage network is built. They provide a paper-based user interface to published information and interactive services.

A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 4:
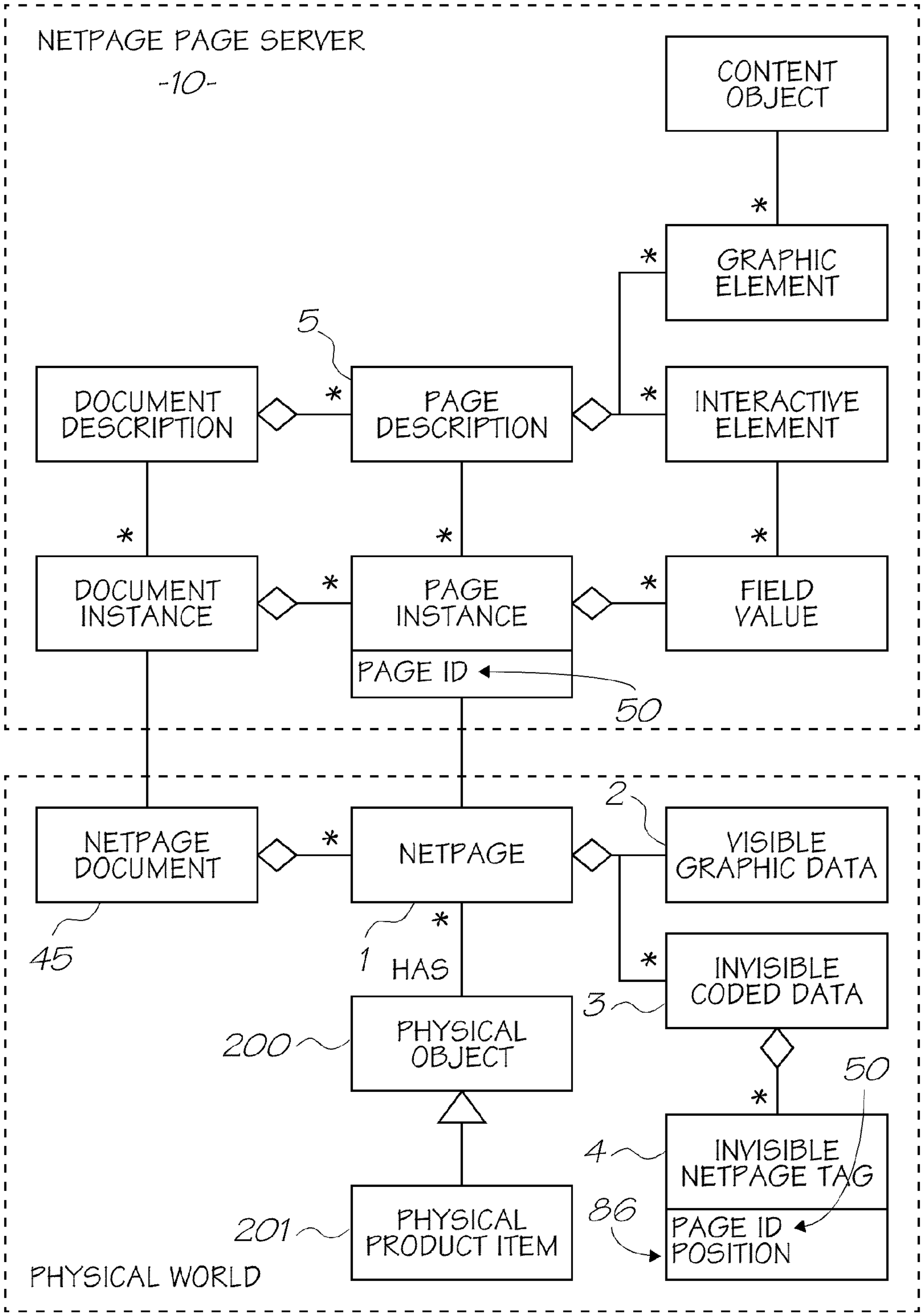
FIG. 4 is a schematic view of a high-level structure of a printed netpage and its online page description.

The relationship between the page description, the page instance, and the printed netpage is shown in FIG. 4. The printed netpage may be part of a printed netpage document 45. The page instance is associated with both the netpage printer which printed it and, if known, the netpage user who requested it.

As shown in FIG. 4, one or more netpages may also be associated with a physical object such as a product item, for example when printed onto the product item's label, packaging, or actual surface.

1.2 Coded Data on Surfaces Using Netpage Tags

Various netpage coding schemes and patterns are described in the present applicants' co-pending U.S. application U.S. Ser. No. 09/575,154 entitled "Identity-Coded Surface with Reference Points", filed 23 May 2000; co-pending U.S. application U.S. Ser. No. 10/120,441 entitled "Cyclic Position Codes", filed 12 Apr. 2002; co-pending U.S. application U.S. Ser. No. 10/309,358 entitled "Rotationally Symmetric Tags", filed 4 Dec. 2002; and co-pending U.S. Application U.S. Ser. No. 10/409,864 entitled "Orientation-Indicating Cyclic Position Codes", filed 9 Apr. 2003.

1.2.1 Tag Data Content

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ ($10^{27}$~ or a thousand trillion trillion) different regions to be uniquely identified. A 100-bit region ID allows $2^{100}$ (~$10^{30}$ or a million trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates. It will be appreciated the region ID and tag ID precision may be more or less than just described depending on the environment in which the system will be used.

1.2.2 Tag Data Encoding

In one embodiment, the 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword.

Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code can be used in place of a (15, 5) Reed-Solomon code, for example: a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by reference thereto).

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags.

1.2.3 Tag Structure

Figure 5A:
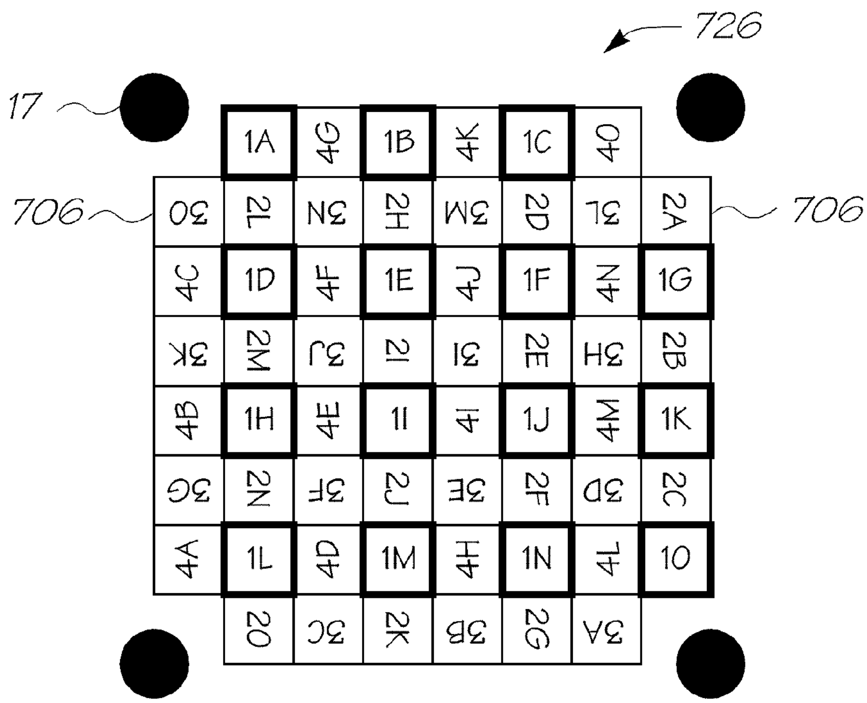
FIG. 5A is a plan view showing the interleaving and rotation of the symbols of four codewords of the tag.
Figure 5C:
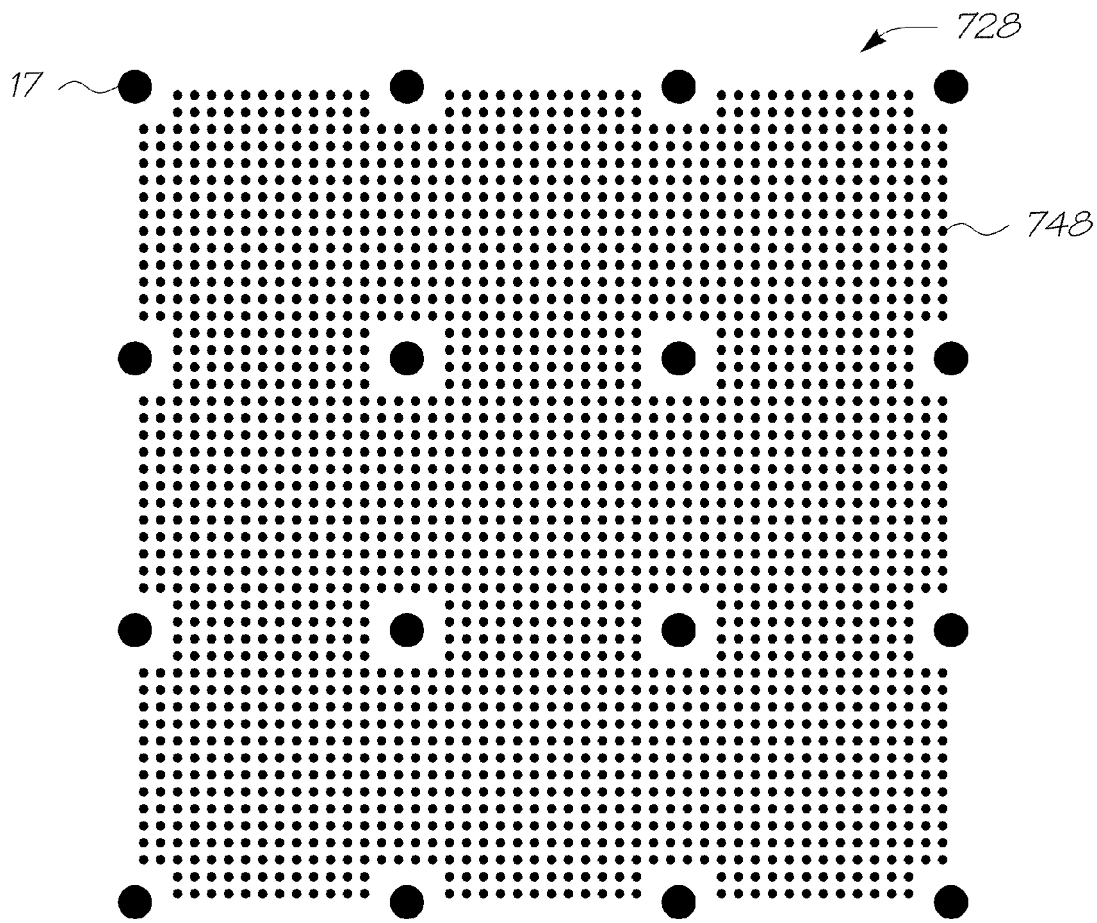
FIG. 5C is a plan view showing an arrangement of nine of the tags shown in FIGS. 5A and 5B, in which targets are shared between adjacent tags.
Figure 6:
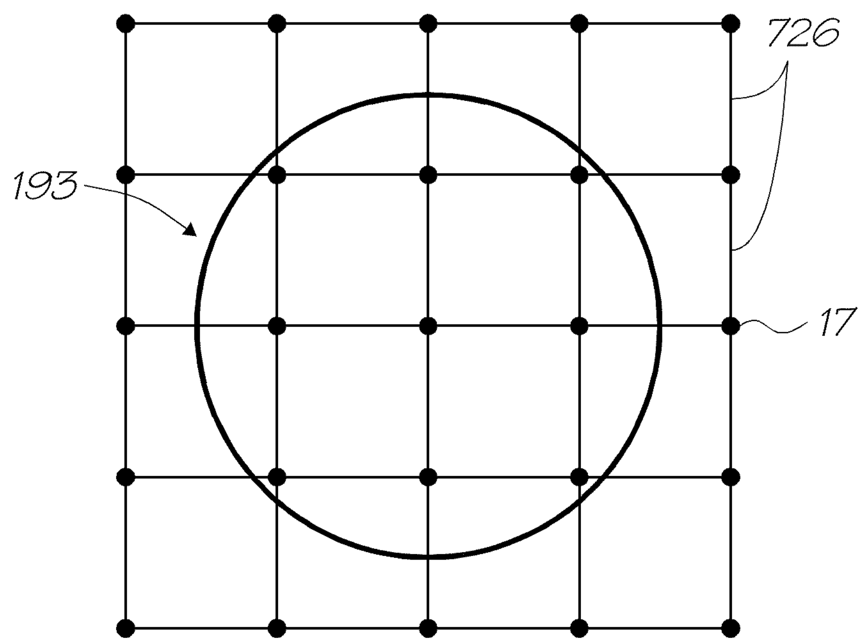
FIG. 6 is a plan view showing a relationship between a set of the tags shown in FIG. 6*a* and a field of view of a netpage sensing device in the form of a netpage pen.

FIG. 5*a* shows a tag 4, in the form of tag 726 with four perspective targets 17. The tag 726 represents sixty 4-bit Reed-Solomon symbols 747 (see description of FIGS. 44 to 46 below for discussion of symbols), for a total of 240 bits. The tag represents each "one" bit by the presence of a mark 748, referred to as a macrodot, and each "zero" bit by the absence of the corresponding macrodot. FIG. 5*c* shows a square tiling 728 of nine tags, containing all "one" bits for illustrative purposes. It will be noted that the perspective targets are designed to be shared between adjacent tags. FIG. 6 shows a square tiling of 16 tags and a corresponding minimum field of view 193, which spans the diagonals of two tags.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits.

The data-bearing macrodots 748 of the tag are designed to not overlap their neighbors, so that groups of tags cannot produce structures that resemble targets. This also saves ink. The perspective targets allow detection of the tag, so further targets are not required.

Although the tag may contain an orientation feature to allow disambiguation of the four possible orientations of the tag relative to the sensor, the present invention is concerned with embedding orientation data in the tag data. For example, the four codewords can be arranged so that each tag orientation (in a rotational sense) contains one codeword placed at that orientation, as shown in FIG. 5*a*, where each symbol is labelled with the number of its codeword (1-4) and the position of the symbol within the codeword (A-O). Tag decoding then consists of decoding one codeword at each rotational orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. Various such schemes are described in the present applicants' co-pending PCT application PCT/AU01/01274 filed 11 Oct. 2001.

The arrangement 728 of FIG. 5*c* shows that the square tag 726 can be used to fully tile or tesselate, i.e. without gaps or overlap, a plane of arbitrary size.

Although in preferred embodiments the tagging schemes described herein encode a single data bit using the presence or absence of a single undifferentiated macrodot, they can also use sets of differentiated glyphs to represent single-bit or multi-bit values, such as the sets of glyphs illustrated in the present applicants' co-pending PCT application PCT/AU01/01274 filed 11 Oct. 2001.

1.2.4.1 Macrodot Packing Schemes

Figure 44:
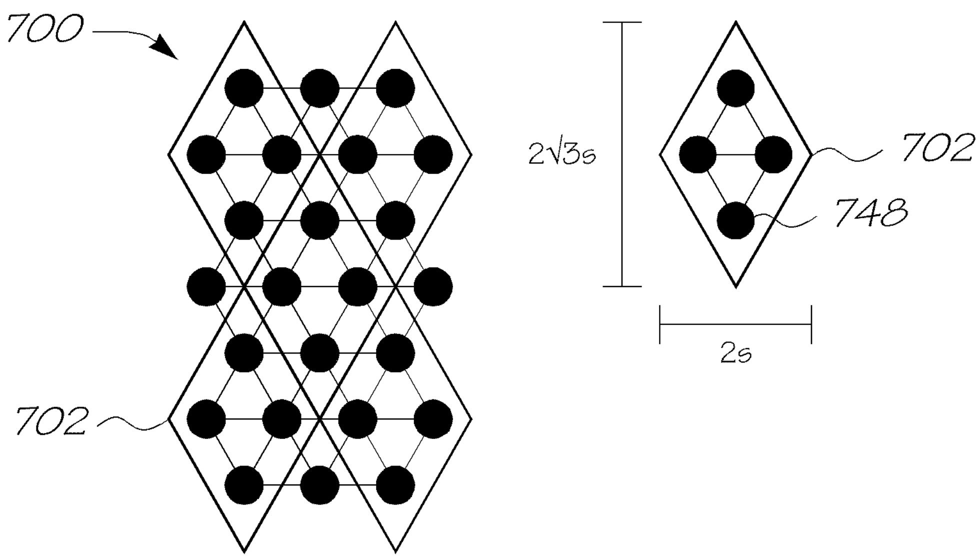
FIG. 44 shows a triangular macrodot packing with a four-bit symbol unit outlined, for use with an embodiment of the invention.
Figure 45:
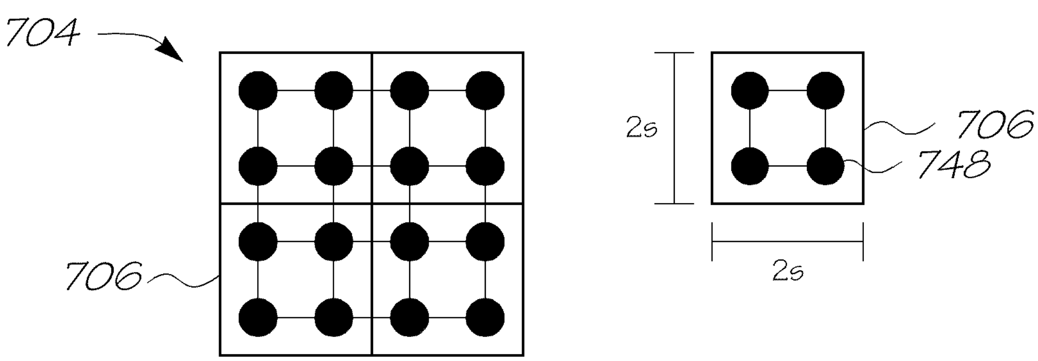
FIG. 45 shows a square macrodot packing with a four-bit symbol unit outlined, for use with an embodiment of the invention such as that described in relation to FIGS. 5*a* to 5*c;*

FIG. 44 shows a triangular macrodot packing 700 with a four-bit symbol unit 702 outlined. The area of the symbol unit is given by $$A_{UNIT}=2\sqrt{3}s^2\approx 3.5s^2$$

where s the spacing of adjacent macrodots. FIG. 45 shows a square macrodot packing 704 with a four-bit symbol unit 706 outlined. The area of the symbol unit is given by $$A_{UNIT}=4s^2$$

Figure 46:
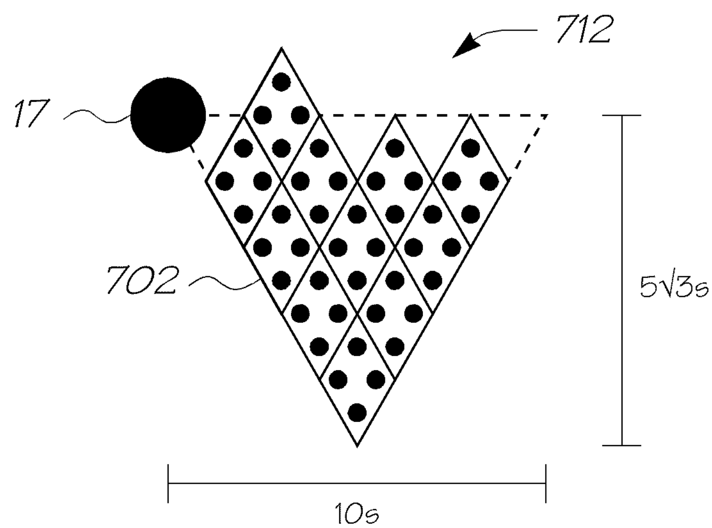
FIG. 46 shows a one-sixth segment of an hexagonal tag, with the segment containing a maximum of 11 four-bit symbols with the triangular macrodot packing shown in FIG. 44.

FIG. 46 shows a hexagonal macrodot packing 708 with a four-bit symbol unit 710 outlined. The area of the symbol unit is given by $$A_{UNIT}=3\sqrt{3}s^2\approx 5.2s^2$$

Of these packing schemes, the triangular packing scheme gives the greatest macrodot density for a particular macrodot spacing s.

In preferred embodiments, s has a value between 100 μm and 200 μm.

1.2.4.2 Tag Designs

FIG. 46 shows a one-sixth segment 712 of a hexagonal tag, with the segment containing a maximum of 11 four-bit symbols with the triangular macrodot packing shown in FIG. 44. The target 17 is shared with adjacent segments. Each tag segment can, by way of example, support a codeword of an (11,k) Reed-Solomon code, i.e. a punctured (15,k) code, with the ability to detect u=11−k symbol errors, or correct t=[(11−k)/2] symbol errors. For example, if k=7 then u=4 and t=2.

Figure 47:
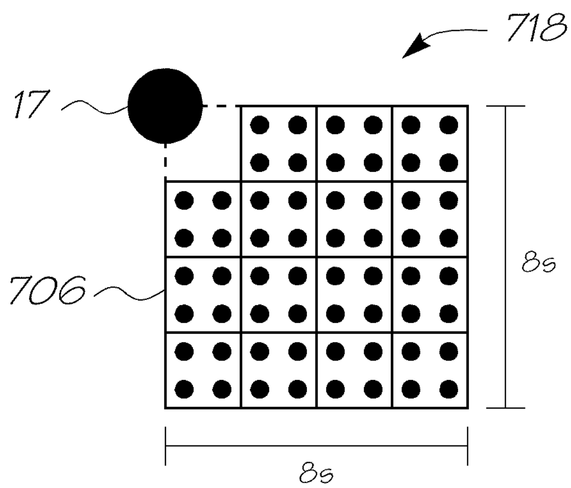
FIG. 47 shows a one-quarter segment of a square tag, with the segment containing a maximum of 15 four-bit symbols with the square macrodot packing shown in FIG. 45.

FIG. 47 shows a one-quarter segment 718 of a square tag, with the segment containing a maximum of 15 four-bit symbols with the square macrodot packing shown in FIG. 45. Each tag segment can, by way of example, support a codeword of a (15,k) Reed-Solomon code, with the ability to detect u=15−k symbol errors, or correct t=[(15−k)/2] symbol errors. For example, if k=7 then u=8 and t=4.

1.2.4.3 Hexagonal Tag Design

Figure 48:
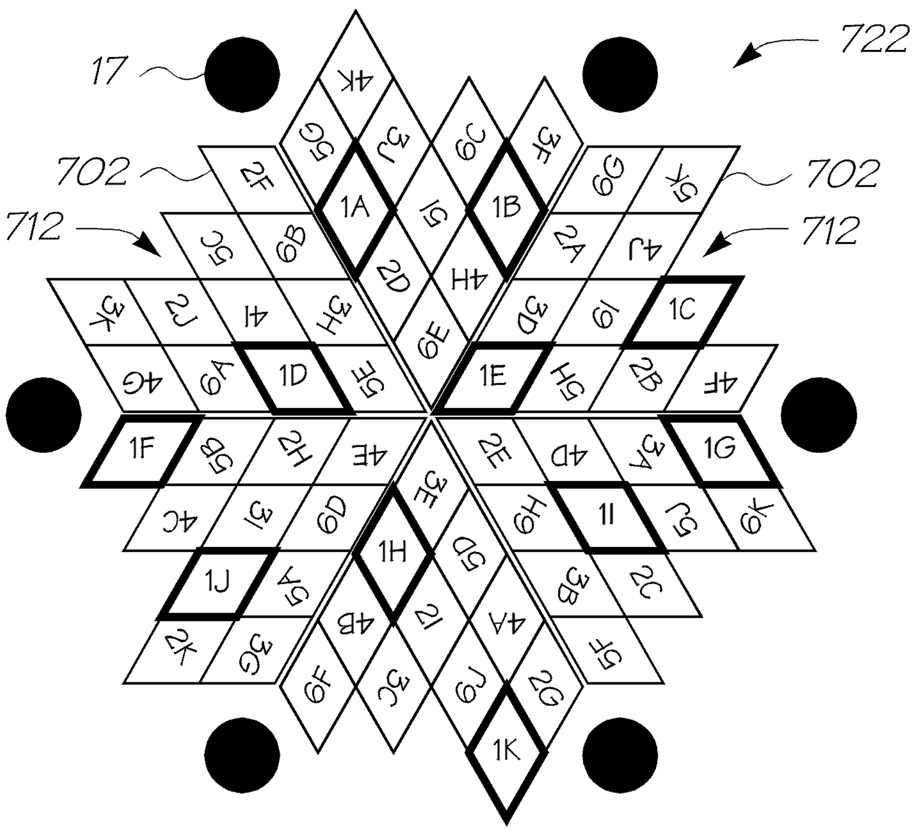
FIG. 48 shows a logical layout of a hexagonal tag using the tag segment of FIG. 47, with six interleaved $2^4$-ary (11, k) codewords.
Figure 49:
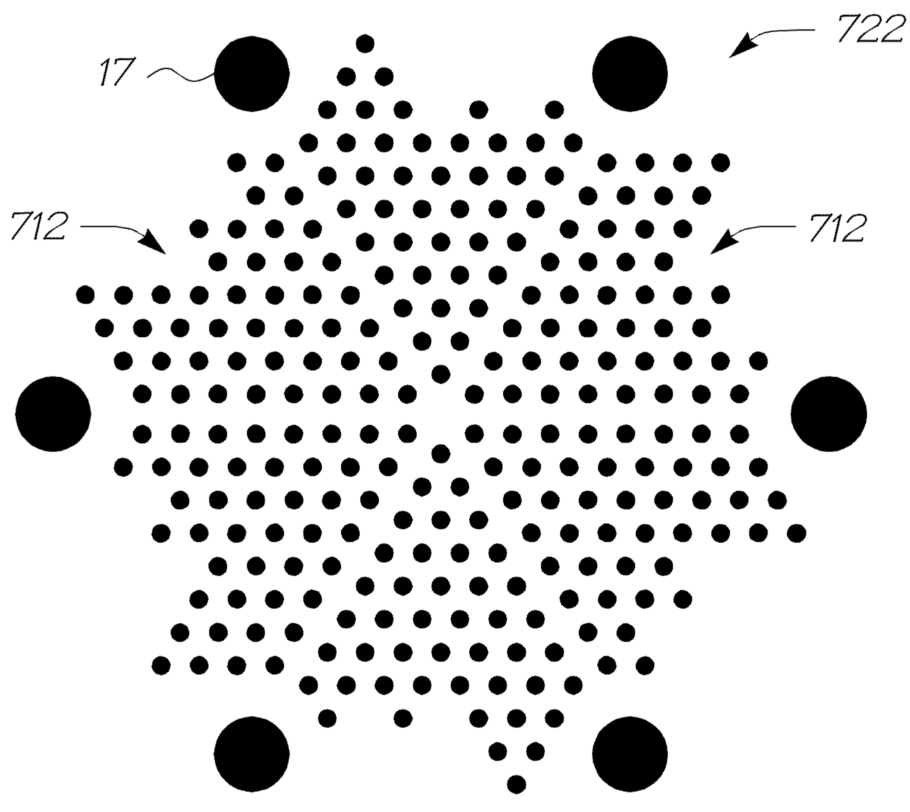
FIG. 49 shows the macrodot layout of the hexagonal tag of FIG. 48.
Figure 50:
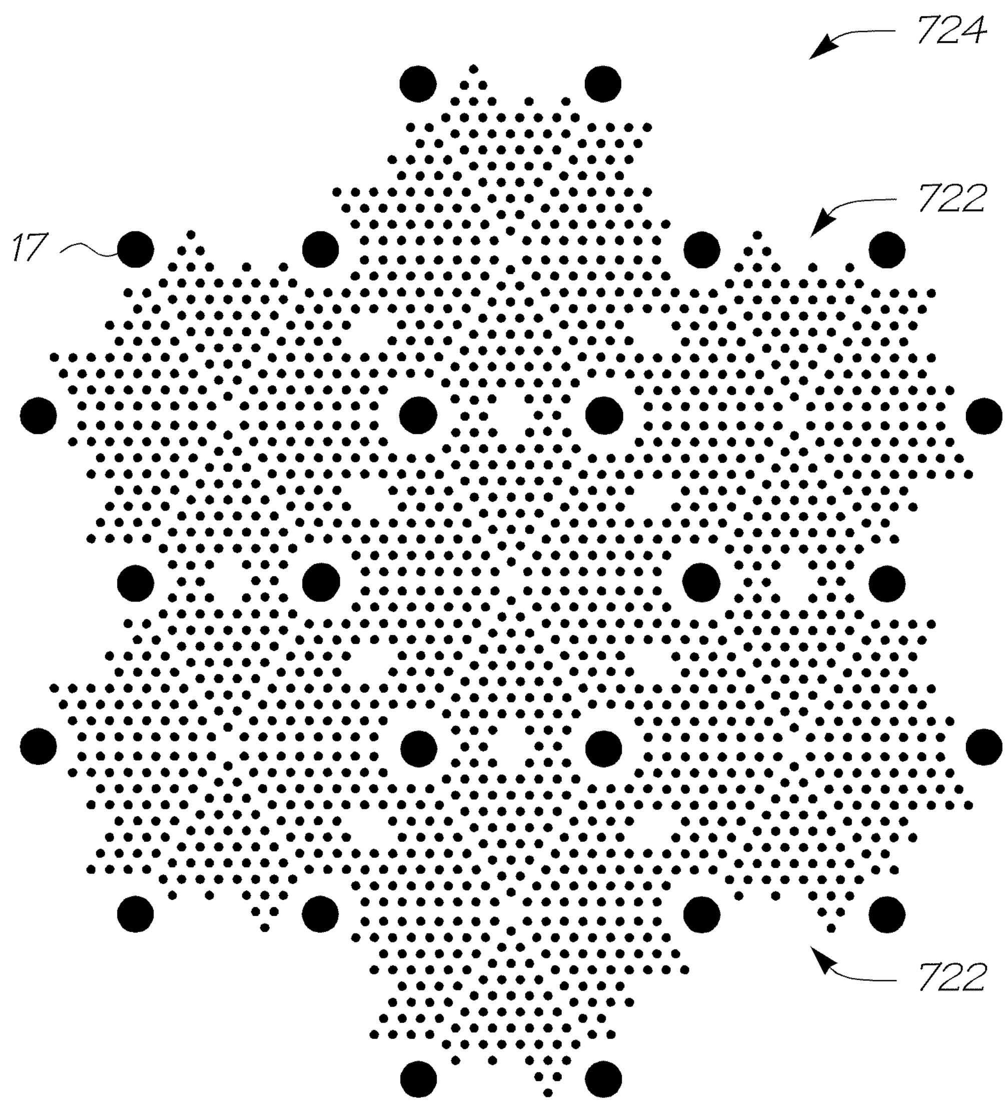
FIG. 50 shows an arrangement of seven abutting tags of the design of FIGS. 48 and 49, with shared targets.
Figure 53:
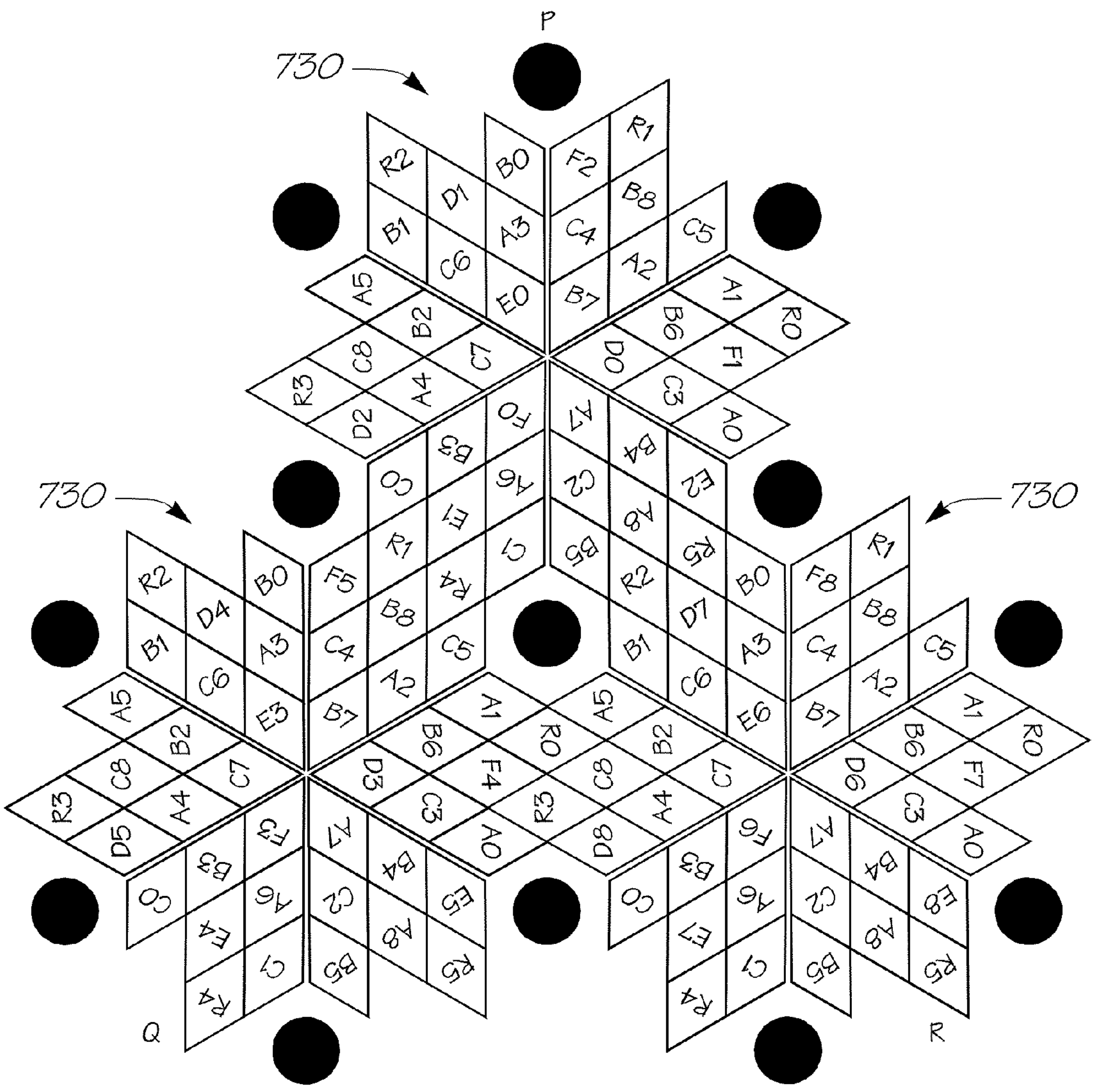
FIG. 53 shows three adjacent tags of type P, Q and R, each with the layout of the tag of FIG. 51, containing a complete set of distributed codewords.

FIG. 48 shows a logical layout of a hexagonal tag 722 using the tag segment 712 of FIG. 46, with six interleaved $2^4$-ary (11,k) codewords. FIG. 49 shows the macrodot layout of the hexagonal tag 722 of FIG. 51. FIG. 53 shows an arrangement 724 of seven abutting tags 722 of the design of FIG. 48, with shared targets 17. The arrangement 724 shows that the hexagonal tag 722 can be used to tesselate a plane of arbitrary size.

1.2.4.4 Alternative Hexagonal Tag Design 1

Figure 51:
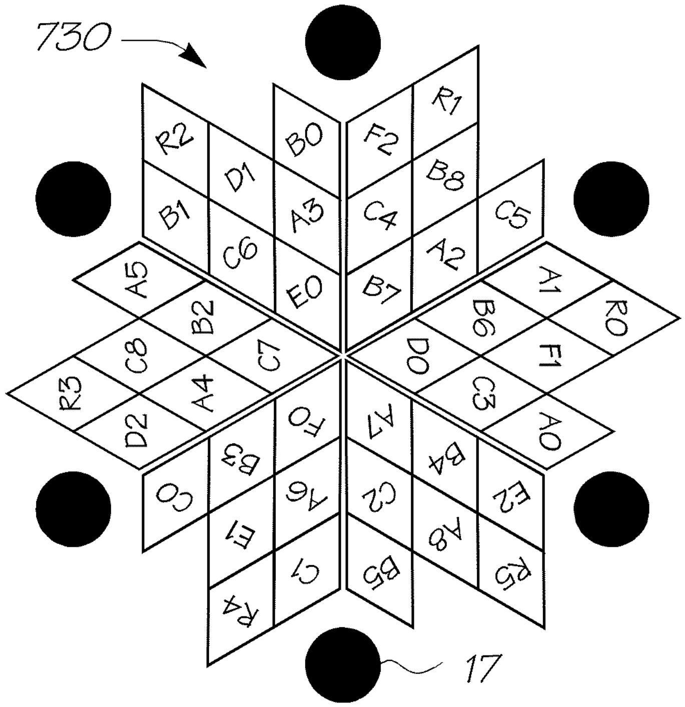
FIG. 51 shows a logical layout of an alternative hexagonal tag using the tag segment of FIG. 47, with three interleaved $2^4$-ary (9, k) codewords and three interleaved three-symbol fragments of three distributed $2^4$-ary (9, k) codewords.

FIG. 51 shows the logical layout of an alternative hexagonal tag. This tag design is described in detail in the present applicants' co-pending U.S. application U.S. Ser. No. 10/409,864 entitled "Orientation-Indicating Cyclic Position Codes".

Figure 52:
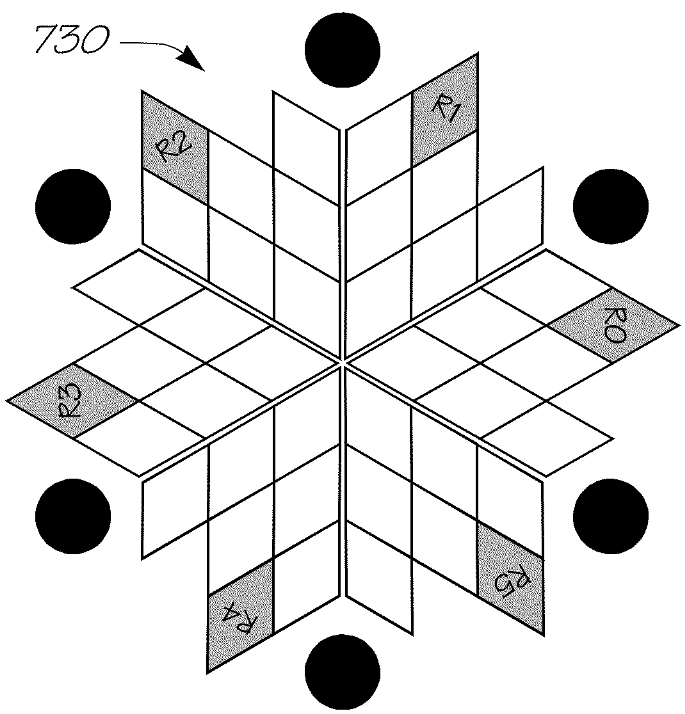
FIG. 52 shows the logical layout of an orientation-indicating cyclic position codeword of the hexagonal tag of FIG. 51.

The tag contains a $2^4$-ary (6,1) cyclic position codeword (0, 5, 6, 9, $A_{16}$, $F_{16}$) which can be decoded at any of the six possible orientations of the tag to determine the actual orientation of the tag. Symbols which are part of the cyclic position codeword have a prefix of "R" and are numbered 0 to 5 in order of increasing significance, and are shown shaded in FIG. 52.

The tag locally contains three complete codewords which are used to encode information unique to the tag. Each codeword is of a punctured $2^4$-ary (9,5) Reed-Solomon code. The tag therefore encodes up to 60 bits of information unique to the tag. The tag also contains fragments of three codewords which are distributed across three adjacent tags and which are used to encode information common to a set of contiguous tags. Each codeword is of a punctured $2^4$-ary (9,5) Reed-Solomon code. Any three adjacent tags therefore together encode up to 60 bits of information common to a set of contiguous tags.

The layout of the three complete codewords, distributed across three adjacent tags, is shown in FIG. 53. In relation to these distributed codewords there are three types of tag. These are referred to as P, Q and R in order of increasing significance.

The P, Q and R tags are repeated in a continuous tiling of tags which guarantees the any set of three adjacent tags contains one tag of each type, and therefore contains a complete set of distributed codewords. The tag type, used to determine the registration of the distributed codewords with respect to a particular set of adjacent tags, is encoded in one of the local codewords of each tag.

1.2.4.4 Alternative Hexagonal Tag Design 2

Figure 54:
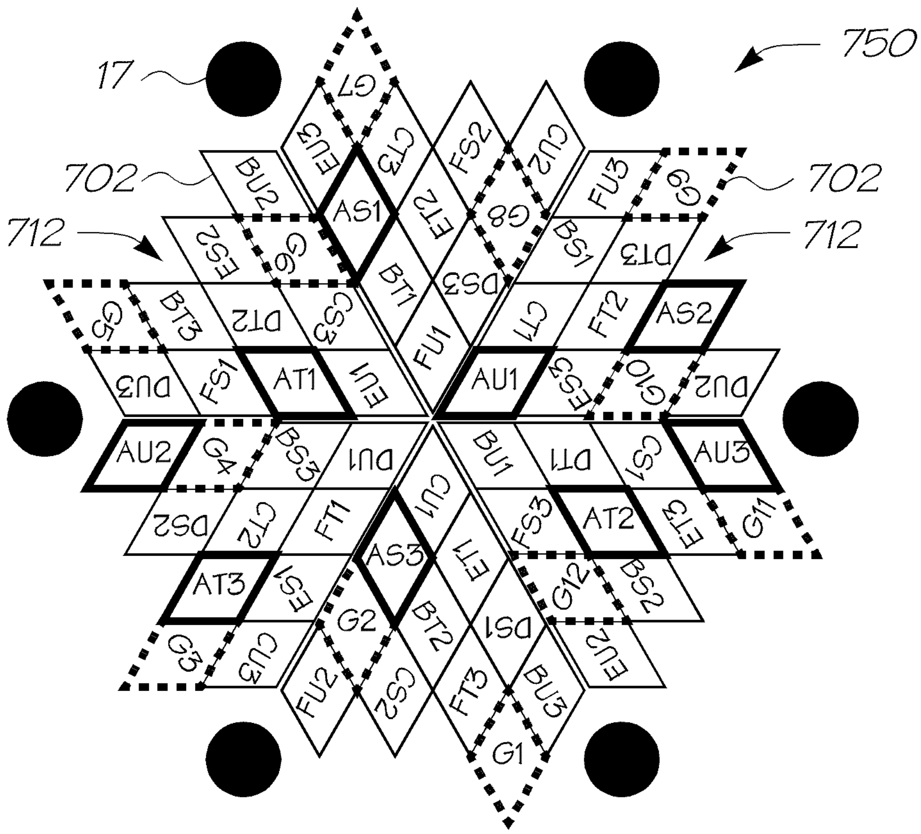
FIG. 54 shows the logical layout of yet another alternative hexagonal tag using the tag segment of FIG. 47, with one local $2^4$-ary (12, k) codeword, interleaved with eighteen 3-symbol fragments of eighteen distributed $2^4$-ary (9, k) codewords.

FIG. 54 shows the logical layout of another alternative hexagonal tag. This tag design is described in detail in the present applicants' U.S. Pat. No. 7,564,605, entitled "Symmetric Tags".

FIG. 54 shows a logical layout of a hexagonal tag 750 using the tag segment of FIG. 46, with one local $2^4$-ary (12,k) codeword interleaved with eighteen 3-symbol fragments of eighteen distributed $2^4$-ary (9,k) codewords.

In the layout of FIG. 54, the twelve 4-bit symbols of the local codeword are labelled G1 through G12, and are shown with a dashed outline. Each symbol of the eighteen fragments of the eighteen distributed codewords is labelled with an initial prefix of A through F, indicating which of six nominal codewords the symbol belongs to, a subsequent prefix of S through U, indicating which 3-symbol part of the codeword the symbol belongs to, and a suffix of 1 through 3, indicating which of the three possible symbols the symbol is.

Tag 750 is structured so that the minimal field of view allows the recovery of the local codeword G of at least one tag, and the entire set of distributed codewords AP through FR via fragments of tags of type P, Q and R included in the field of view. Furthermore, the continuous tiling of tag 750 ensures that there is a codeword available with a known layout for each possible rotational and translational combination (of which there are eighteen). Each distributed codeword includes data which identifies the rotation of the codeword in relation to the tiling, thus allowing the rotation of the tiling with respect to the field of view to be determined from decoded data rather than from other structures, and the local codeword to be decoded at the correct orientation.

Figure 55:
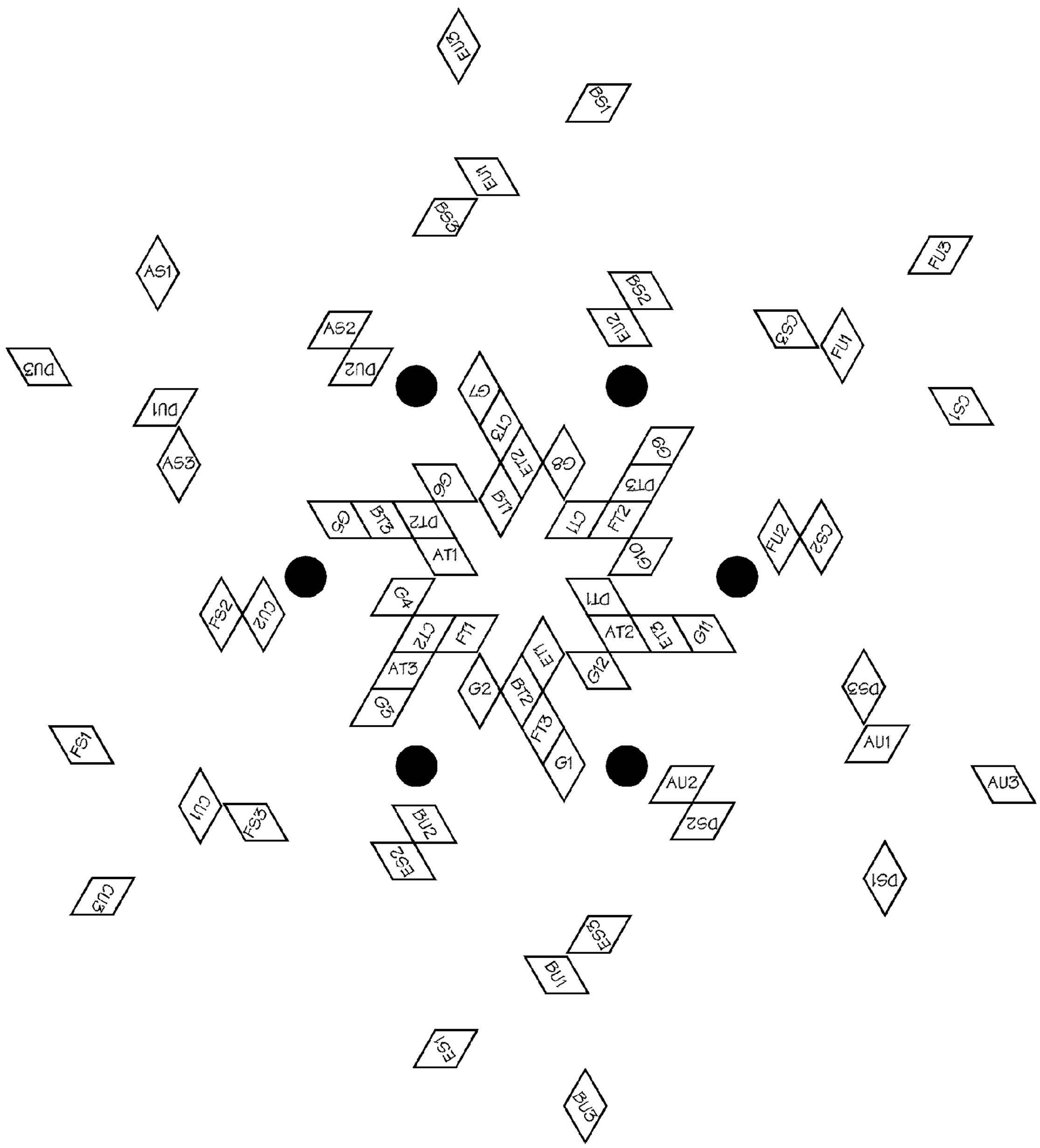
FIG. 55 shows the logical layout of the hexagonal tag of FIG. 54, re-arranged to show the distributed 3-symbol fragments which contribute to the same codewords.

FIG. 55 shows the logical layout of the hexagonal tag 750 of FIG. 54, re-arranged to show the distributed 3-symbol fragments which contribute to the same codewords. For example, if the central tag shown in FIG. 54 were a P-type tag, then the six distributed codewords shown in the figure would be the AP, BP, CP, DP, EP and FP codewords. FIG. 55 also shows the local G codeword of the tag. Clearly, given the distributed and repeating nature of the distributed codewords, different fragments from the ones shown in the figure can be used to build the corresponding codewords.

1.2.4 Tag Image Processing and Decoding

Figure 7:
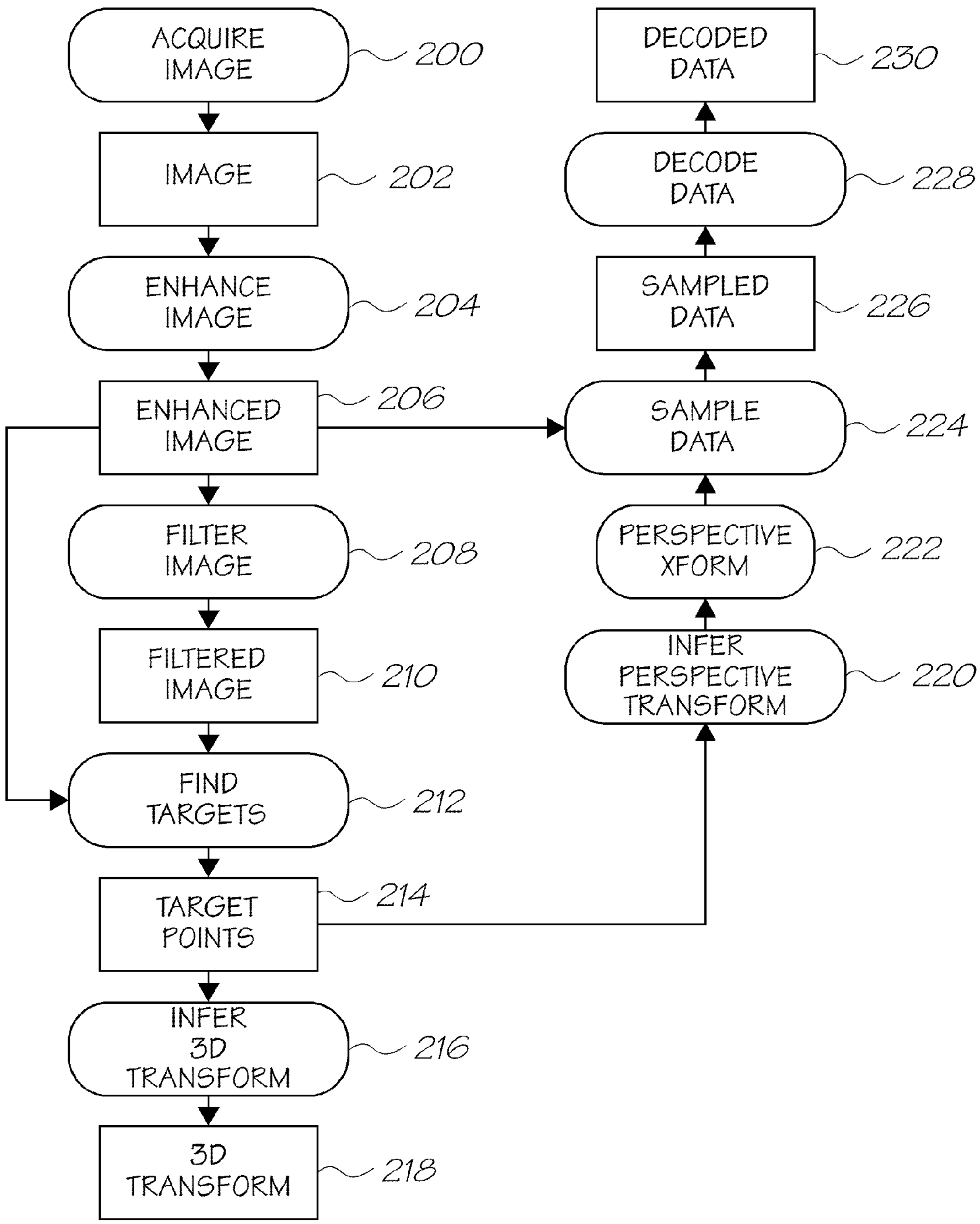
FIG. 7 is a flowchart of a tag image processing and decoding algorithm.

FIG. 7 shows a tag image processing and decoding process flow. A raw image 202 of the tag pattern is acquired (at 200), for example via an image sensor such as a CCD image sensor, CMOS image sensor, or a scanning laser and photodiode image sensor. The raw image is then typically enhanced (at 204) to produce an enhanced image 206 with improved contrast and more uniform pixel intensities. Image enhancement may include global or local range expansion, equalisation, and the like. The enhanced image 206 is then typically filtered (at 208) to produce a filtered image 210. Image filtering may consist of low-pass filtering, with the low-pass filter kernel size tuned to obscure macrodots but to preserve targets. The filtering step 208 may include additional filtering (such as edge detection) to enhance target features. The filtered image 210 is then processed to locate target features (at 212), yielding a set of target points. This may consist of a search for target features whose spatial inter-relationship is consistent with the known geometry of a tag. Candidate targets may be identified directly from maxima in the filtered image 210, or may the subject of further characterisation and matching, such as via their (binary or grayscale) shape moments (typically computed from pixels in the enhanced image 206 based on local maxima in the filtered image 210), as described in U.S. patent application Ser. No. 09/575,154. The search typically starts from the center of the field of view. The target points 214 found by the search step 212 indirectly identify the location of the tag in the three-dimensional space occupied by the image sensor and its associated optics. Since the target points 214 are derived from the (binary or grayscale) centroids of the targets, they are typically defined to sub-pixel precision.

It may be useful to determine the actual 3D transform of the tag (at 216), and, by extension, the 3D transform (or pose) 218 of the sensing device relative to the tag. This may be done analytically, as described in U.S. patent application Ser. No. 09/575,154, or using a maximum likelihood estimator (such as least squares adjustment) to fit parameter values to the 3D transform given the observed perspective-distorted target points (as described in P. R. Wolf and B. A. Dewitt, Elements of Photogrammetry with Applications in GIS, 3rd Edition, McGraw Hill, February 2000, the contents of which are herein incorporated by reference thereto). The 3D transform includes the 3D translation of the tag, the 3D orientation (rotation) of the tag, and the focal length and viewport scale of the sensing device, thus giving eight parameters to be fitted, or six parameters if the focal length and viewport scale are known (e.g. by design or from a calibration step). Each target point yields a pair of observation equations, relating an observed coordinate to a known coordinate. If eight parameters are being fitted, then five or more target points are needed to provide sufficient redundancy to allow maximum likelihood estimation. If six parameters are being fitted, then four or more target points are needed. If the tag design contains more targets than are minimally required to allow maximum likelihood estimation, then the tag can be recognised and decoded even if up to that many of its targets are damaged beyond recognition.

To allow macrodot values to be sampled accurately, the perspective transform of the tag must be inferred. Four of the target points are taken to be the perspective-distorted corners of a rectangle of known size in tag space, and the eight-degree-of-freedom perspective transform 222 is inferred (at 220), based on solving the well-understood equations relating the four tag-space and image-space point pairs (see Heckbert, P., Fundamentals of Texture Mapping and Image Warping, Masters Thesis, Dept. of EECS, U. of California at Berkeley, Technical Report No. UCB/CSD 89/516, June 1989, the contents of which are herein incorporated by reference thereto). The perspective transform may alternatively be derived from the 3D transform 218, if available.

The inferred tag-space to image-space perspective transform 222 is used to project (at 224) each known data bit position in tag space into image space where the real-valued position is used to bi-linearly (or higher-order) interpolate (at 224) the four (or more) relevant adjacent pixels in the enhanced input image 206. The resultant macrodot value is compared with a suitable threshold to determine whether it represents a zero bit or a one bit.

One the bits of one or more complete codeword have been sampled, the codewords are decoded (at 228) to obtain the desired data 230 encoded in the tag. Redundancy in the codeword may be used to detect errors in the sampled data, or to correct errors in the sampled data.

As discussed in U.S. patent application Ser. No. 09/575,154, the obtained tag data 230 may directly or indirectly identify the surface region containing the tag and the position of the tag within the region. An accurate position of the sensing device relative to the surface region can therefore be derived from the tag data 230 and the 3D transform 218 of the sensing device relative to the tag.

1.2.6 Tag Map

Figure 22:
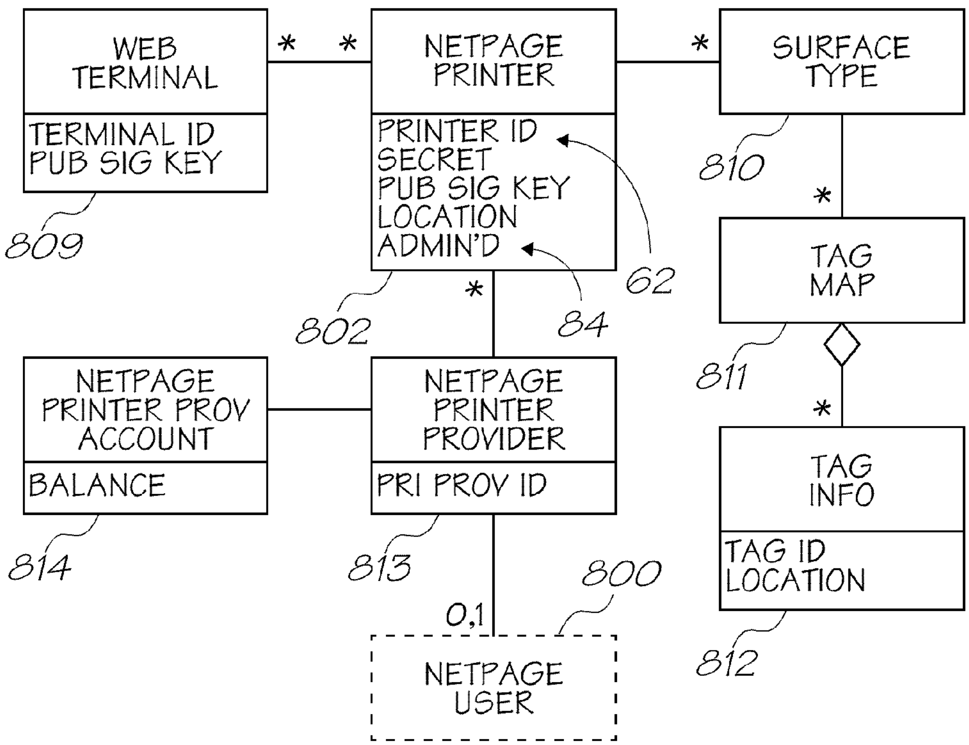
FIG. 22 is a schematic view of a printer class diagram.

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. The tag map class diagram is shown in FIG. 22, as part of the netpage printer class diagram.

A tag map reflects the scheme used to tile the surface region with tags, and this can vary according to surface type. When multiple tagged regions share the same tiling scheme and the same tag numbering scheme, they can also share the same tag map.

The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encode Cartesian coordinates or polar coordinates, depending on the surface type on which it appears. The tag ID structure is dictated by and known to the tag map, and tag IDs associated with different tag maps may therefore have different structures. For example, the tag ID may simply encode a pair of x and y coordinates of the tag, in which case the tag map may simply consist of record of the coordinate precision. If the coordinate precision is fixed, then the tag map can be implicit.

1.2.7 Tagging Schemes

Two distinct surface coding schemes are of interest, both of which use the tag structure described earlier in this section. The preferred coding scheme uses "location-indicating" tags as already discussed. An alternative coding scheme uses object-indicating tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating tag contains a tag ID which directly identifies a user interface element in the page description associated with the region. All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

1.3 Document and Page Descriptions

Figure 25:
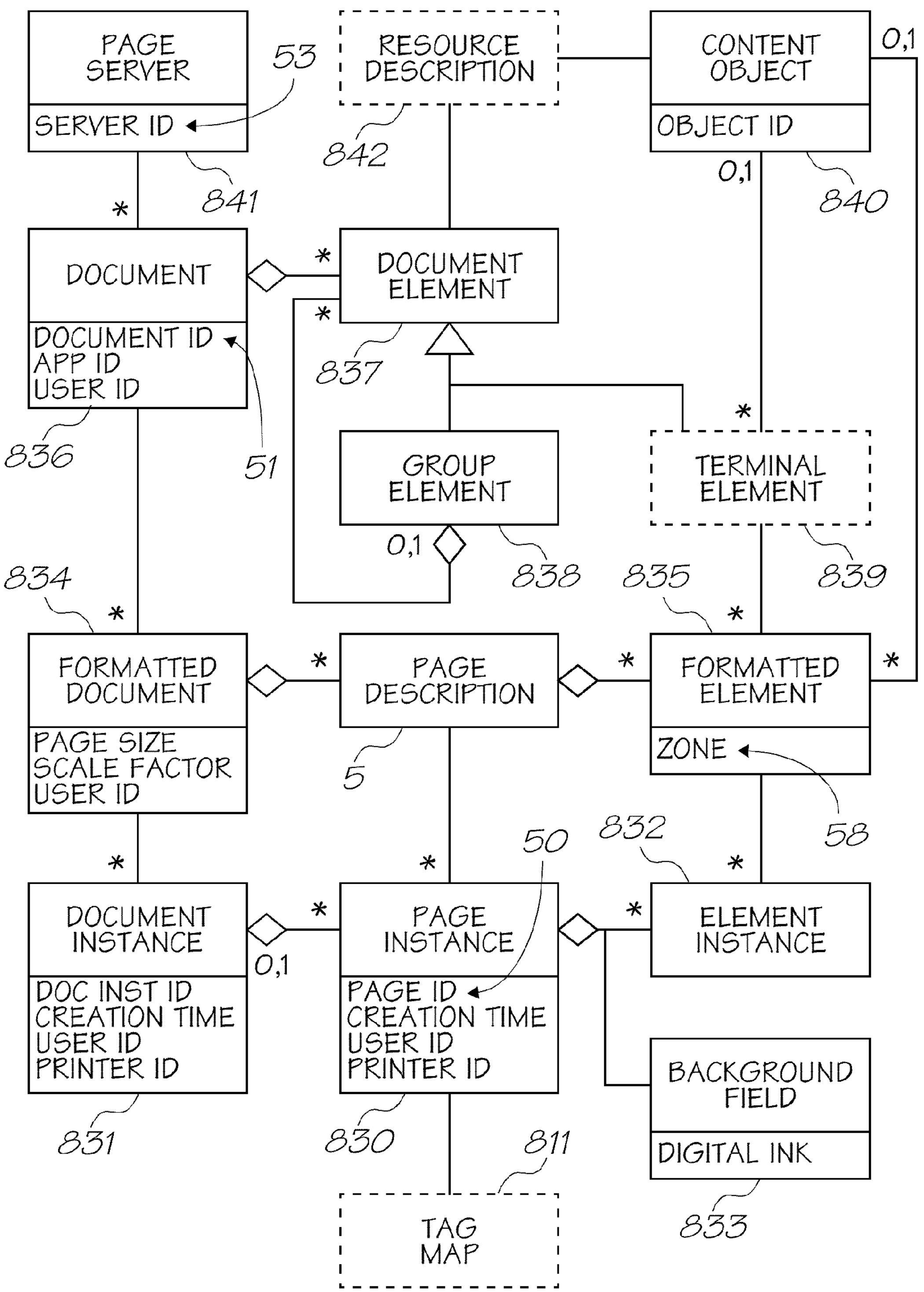
FIG. 25 is a schematic view of a document and page description class diagram.
Figure 26:
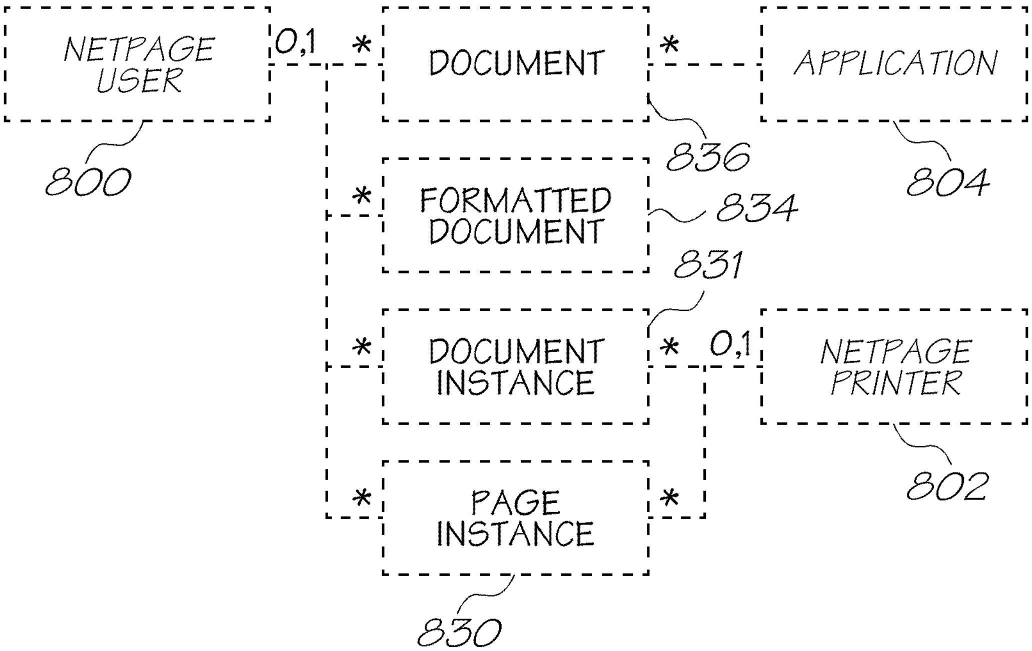
FIG. 26 is a schematic view of a document and page ownership class diagram.

A preferred embodiment of a document and page description class diagram is shown in FIGS. 25 and 26.

In the netpage system a document is described at three levels. At the most abstract level the document 836 has a hierarchical structure whose terminal elements 839 are associated with content objects 840 such as text objects, text style objects, image objects, etc. Once the document is printed on a printer with a particular page size and according to a particular user's scale factor preference, the document is paginated and otherwise formatted. Formatted terminal elements 835 will in some cases be associated with content objects which are different from those associated with their corresponding terminal elements, particularly where the content objects are style-related. Each printed instance of a document and page is also described separately, to allow input captured through a particular page instance 830 to be recorded separately from input captured through other instances of the same page description.

The presence of the most abstract document description on the page server allows a user to request a copy of a document without being forced to accept the source document's specific format. The user may be requesting a copy through a printer with a different page size, for example. Conversely, the presence of the formatted document description on the page server allows the page server to efficiently interpret user actions on a particular printed page.

A formatted document 834 consists of a set of formatted page descriptions 5, each of which consists of a set of formatted terminal elements 835. Each formatted element has a spatial extent or zone 58 on the page. This defines the active area of input elements such as hyperlinks and input fields.

A document instance 831 corresponds to a formatted document 834. It consists of a set of page instances 830, each of which corresponds to a page description 5 of the formatted document. Each page instance 830 describes a single unique printed netpage 1, and records the page ID 50 of the netpage. A page instance is not part of a document instance if it represents a copy of a page requested in isolation.

A page instance consists of a set of terminal element instances 832. An element instance only exists if it records instance-specific information. Thus, a hyperlink instance exists for a hyperlink element because it records a transaction ID 55 which is specific to the page instance, and a field instance exists for a field element because it records input specific to the page instance. An element instance does not exist, however, for static elements such as textflows.

Figure 27:
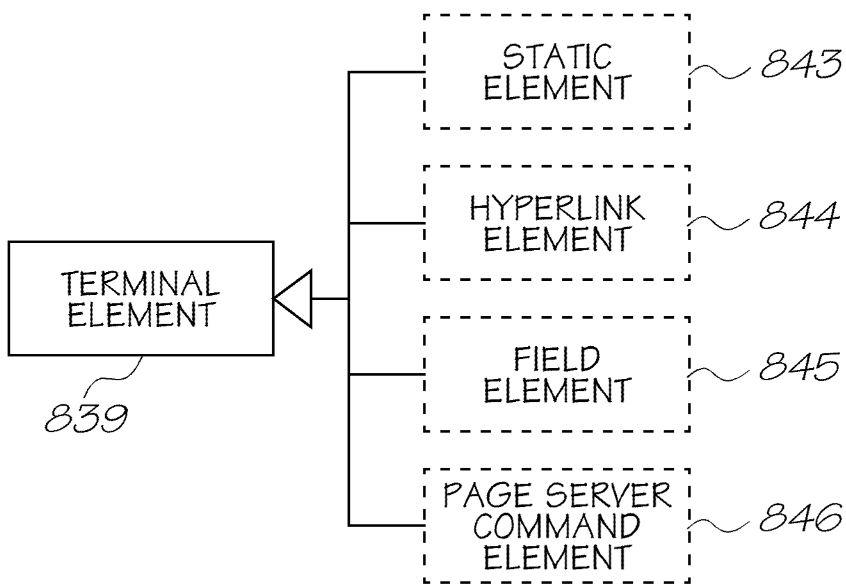
FIG. 27 is a schematic view of a terminal element specialization class diagram.
Figure 28:
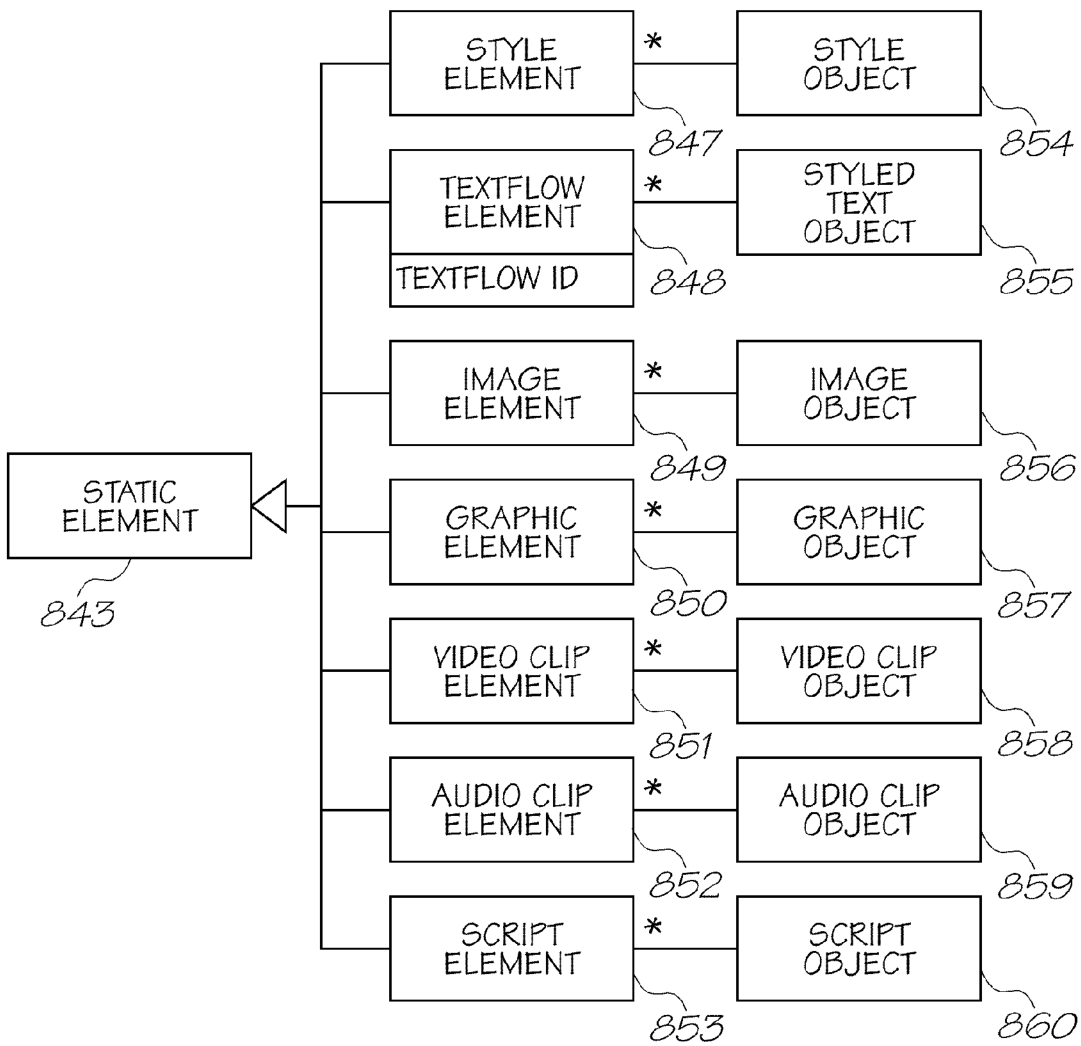
FIG. 28 is a schematic view of a static element specialization class diagram.

A terminal element can be a static element 843, a hyperlink element 844, a field element 845 or a page server command element 846, as shown in FIG. 27. A static element 843 can be a style element 847 with an associated style object 854, a textflow element 848 with an associated styled text object 855, an image element 849 with an associated image element 856, a graphic element 850 with an associated graphic object 857, a video clip element 851 with an associated video clip object 858, an audio clip element 852 with an associated audio clip object 859, or a script element 853 with an associated script object 860, as shown in FIG. 28.

A page instance has a background field 833 which is used to record any digital ink captured on the page which does not apply to a specific input element.

In the preferred form of the invention, a tag map 811 is associated with each page instance to allow tags on the page to be translated into locations on the page.

1.4 The Netpage Network

Figure 3:
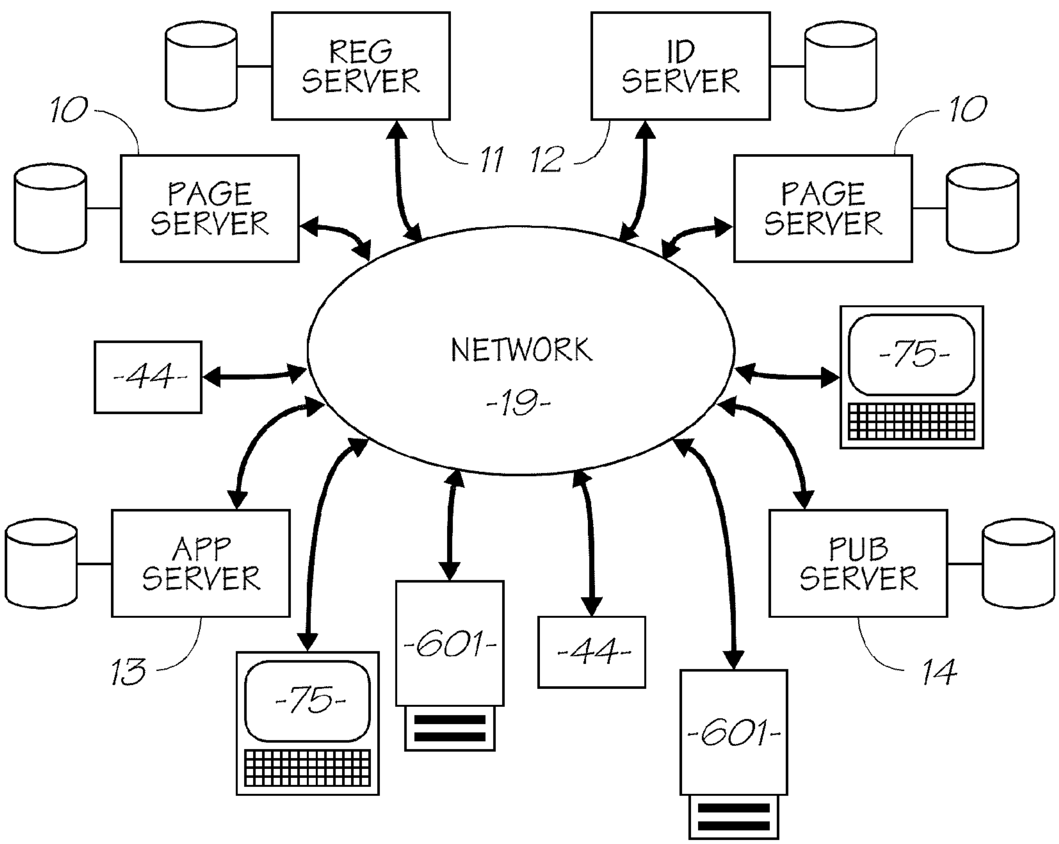
FIG. 3 illustrates a collection of netpage servers, Web terminals, printers and relays interconnected via a network.

In a preferred embodiment, a netpage network consists of a distributed set of netpage page servers 10, netpage registration servers 11, netpage ID servers 12, netpage application servers 13, netpage publication servers 14, Web terminals 75, netpage printers 601, and relay devices 44 connected via a network 19 such as the Internet, as shown in FIG. 3.

The netpage registration server 11 is a server which records relationships between users, pens, printers, applications and publications, and thereby authorizes various network activities. It authenticates users and acts as a signing proxy on behalf of authenticated users in application transactions. It also provides handwriting recognition services. As described above, a netpage page server 10 maintains persistent information about page descriptions and page instances. The netpage network includes any number of page servers, each handling a subset of page instances. Since a page server also maintains user input values for each page instance, clients such as netpage printers send netpage input directly to the appropriate page server. The page server interprets any such input relative to the description of the corresponding page.

A netpage ID server 12 allocates document IDs 51 on demand, and provides load-balancing of page servers via its ID allocation scheme.

A netpage printer uses the Internet Distributed Name System (DNS), or similar, to resolve a netpage page ID 50 into the network address of the netpage page server handling the corresponding page instance.

A netpage application server 13 is a server which hosts interactive netpage applications. A netpage publication server 14 is an application server which publishes netpage documents to netpage printers. They are described in detail in Section 2.

Netpage servers can be hosted on a variety of network server platforms from manufacturers such as IBM, Hewlett-Packard, and Sun. Multiple netpage servers can run concurrently on a single host, and a single server can be distributed over a number of hosts. Some or all of the functionality provided by netpage servers, and in particular the functionality provided by the ID server and the page server, can also be provided directly in a netpage appliance such as a netpage printer, in a computer workstation, or on a local network.

1.5 The Netpage Printer

The netpage printer 601 is an appliance which is registered with the netpage system and prints netpage documents on demand and via subscription. Each printer has a unique printer ID 62, and is connected to the netpage network via a network such as the Internet, ideally via a broadband connection.

Apart from identity and security settings in non-volatile memory, the netpage printer contains no persistent storage. As far as a user is concerned, "the network is the computer". Netpages function interactively across space and time with the help of the distributed netpage page servers 10, independently of particular netpage printers.

The netpage printer receives subscribed netpage documents from netpage publication servers 14. Each document is distributed in two parts: the page layouts, and the actual text and image objects which populate the pages. Because of personalization, page layouts are typically specific to a particular subscriber and so are pointcast to the subscriber's printer via the appropriate page server. Text and image objects, on the other hand, are typically shared with other subscribers, and so are multicast to all subscribers' printers and the appropriate page servers.

The netpage publication server optimizes the segmentation of document content into pointcasts and multicasts. After receiving the pointcast of a document's page layouts, the printer knows which multicasts, if any, to listen to.

Once the printer has received the complete page layouts and objects that define the document to be printed, it can print the document.

The printer rasterizes and prints odd and even pages simultaneously on both sides of the sheet. It contains duplexed print engine controllers 760 and print engines utilizing Memjet™ printheads 350 for this purpose.

The printing process consists of two decoupled stages: rasterization of page descriptions, and expansion and printing of page images. The raster image processor (RIP) consists of one or more standard DSPs 757 running in parallel. The duplexed print engine controllers consist of custom processors which expand, dither and print page images in real time, synchronized with the operation of the printheads in the print engines.

Printers not enabled for IR printing have the option to print tags using IR-absorptive black ink, although this restricts tags to otherwise empty areas of the page. Although such pages have more limited functionality than IR-printed pages, they are still classed as netpages.

A normal netpage printer prints netpages on sheets of paper. More specialised netpage printers may print onto more specialised surfaces, such as globes. Each printer supports at least one surface type, and supports at least one tag tiling scheme, and hence tag map, for each surface type. The tag map 811 which describes the tag tiling scheme actually used to print a document becomes associated with that document so that the document's tags can be correctly interpreted.

FIG. 2 shows the netpage printer class diagram, reflecting printer-related information maintained by a registration server 11 on the netpage network.

A preferred embodiment of the netpage printer is described in greater detail in Section 6 below, with reference to FIGS. 11 to 16.

1.5.1 Memjet™ Printheads

The netpage system can operate using printers made with a wide range of digital printing technologies, including thermal inkjet, piezoelectric inkjet, laser electrophotographic, and others. However, for wide consumer acceptance, it is desirable that a netpage printer have the following characteristics:

- photographic quality color printing
- high quality text printing
- high reliability
- low printer cost
- low ink cost
- low paper cost
- simple operation
- nearly silent printing
- high printing speed
- simultaneous double sided printing
- compact form factor
- low power consumption No commercially available printing technology has all of these characteristics.

Figure 17:
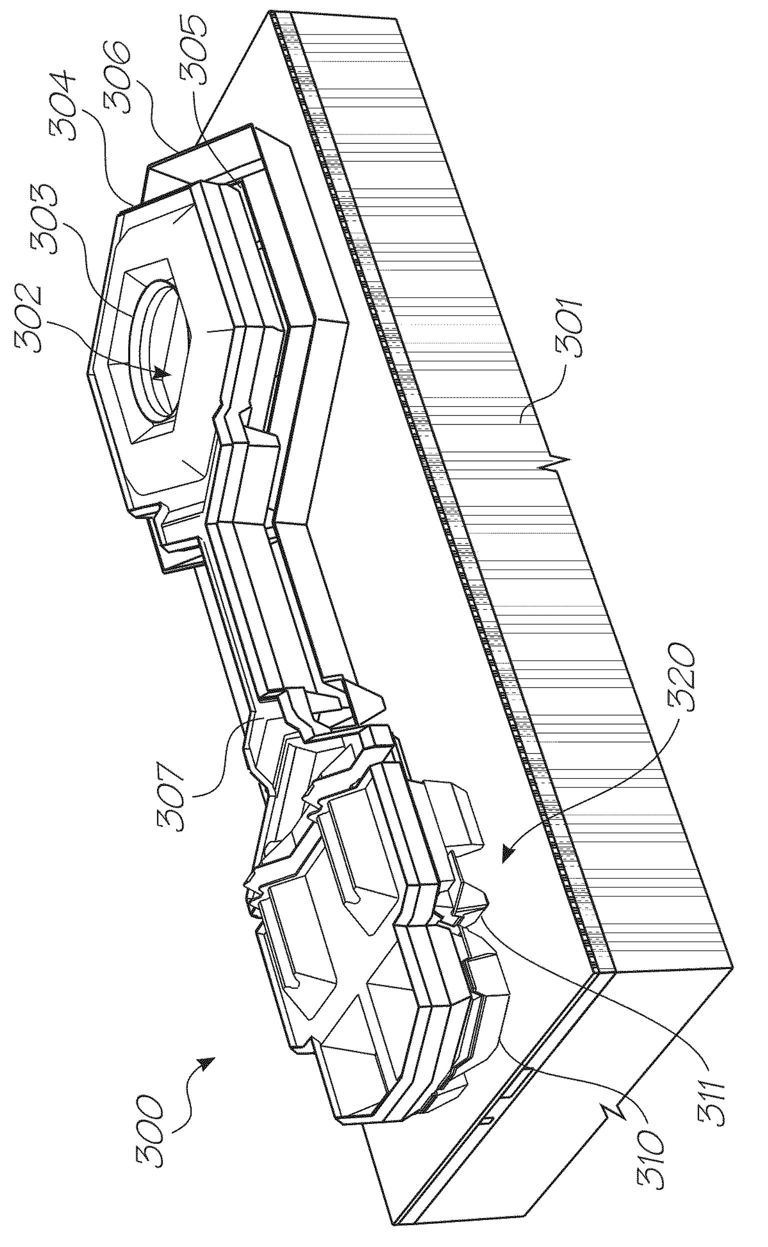
FIG. 17 is a perspective view of a single Memjet™ printing element, as used in, for example, the netpage printer of FIGS. 10 to 12.

To enable to production of printers with these characteristics, the present applicant has invented a new print technology, referred to as Memjet™ technology. Memjet™ is a drop-on-demand inkjet technology that incorporates pagewidth printheads fabricated using microelectromechanical systems (MEMS) technology. FIG. 17 shows a single printing element 300 of a Memjet™ printhead. The netpage wallprinter incorporates 168960 printing elements 300 to form a 1600 dpi pagewidth duplex printer. This printer simultaneously prints cyan, magenta, yellow, black, and infrared inks as well as paper conditioner and ink fixative.

The printing element 300 is approximately 110 microns long by 32 microns wide. Arrays of these printing elements are formed on a silicon substrate 301 that incorporates CMOS logic, data transfer, timing, and drive circuits (not shown).

Major elements of the printing element 300 are the nozzle 302, the nozzle rim 303, the nozzle chamber 304, the fluidic seal 305, the ink channel rim 306, the lever arm 307, the active actuator beam pair 308, the passive actuator beam pair 309, the active actuator anchor 310, the passive actuator anchor 311, and the ink inlet 312.

The active actuator beam pair 308 is mechanically joined to the passive actuator beam pair 309 at the join 319. Both beams pairs are anchored at their respective anchor points 310 and 311. The combination of elements 308, 309, 310, 311, and 319 form a cantilevered electrothermal bend actuator 320.

While printing, the printhead CMOS circuitry distributes data from the print engine controller to the correct printing element, latches the data, and buffers the data to drive the electrodes 318 of the active actuator beam pair 308. This causes an electrical current to pass through the beam pair 308 for about one microsecond, resulting in Joule heating. The temperature increase resulting from Joule heating causes the beam pair 308 to expand. As the passive actuator beam pair 309 is not heated, it does not expand, resulting in a stress difference between the two beam pairs. This stress difference is partially resolved by the cantilevered end of the electrothermal bend actuator 320 bending towards the substrate 301. The lever arm 307 transmits this movement to the nozzle chamber 304. The nozzle chamber 304 moves about two microns to the position shown in FIG. 19(*b*). This increases the ink pressure, forcing ink 321 out of the nozzle 302, and causing the ink meniscus 316 to bulge. The nozzle rim 303 prevents the ink meniscus 316 from spreading across the surface of the nozzle chamber 304.

As the temperature of the beam pairs 308 and 309 equalizes, the actuator 320 returns to its original position. This aids in the break-off of the ink droplet 317 from the ink 321 in the nozzle chamber. The nozzle chamber is refilled by the action of the surface tension at the meniscus 316.

In a netpage printer, the length of the printhead is the full width of the paper (typically 210 mm). When printing, the paper is moved past the fixed printhead. The printhead has 6 rows of interdigitated printing elements 300, printing the six colors or types of ink supplied by the ink inlets.

To protect the fragile surface of the printhead during operation, a nozzle guard wafer is attached to the printhead substrate. For each nozzle there is a corresponding nozzle guard hole through which the ink droplets are fired. To prevent the nozzle guard holes from becoming blocked by paper fibers or other debris, filtered air is pumped through the air inlets and out of the nozzle guard holes during printing. To prevent ink from drying, the nozzle guard is sealed while the printer is idle.

1.6 The Netpage Pen

The active sensing device of the netpage system is typically a pen 101, which, using its embedded controller 134, is able to capture and decode IR position tags from a page via an image sensor. The image sensor is a solid-state device provided with an appropriate filter to permit sensing at only near-infrared wavelengths. As described in more detail below, the system is able to sense when the nib is in contact with the surface, and the pen is able to sense tags at a sufficient rate to capture human handwriting (i.e. at 200 dpi or greater and 100 Hz or faster). Information captured by the pen is encrypted and wirelessly transmitted to the printer (or base station), the printer or base station interpreting the data with respect to the (known) page structure.

Figure 23:
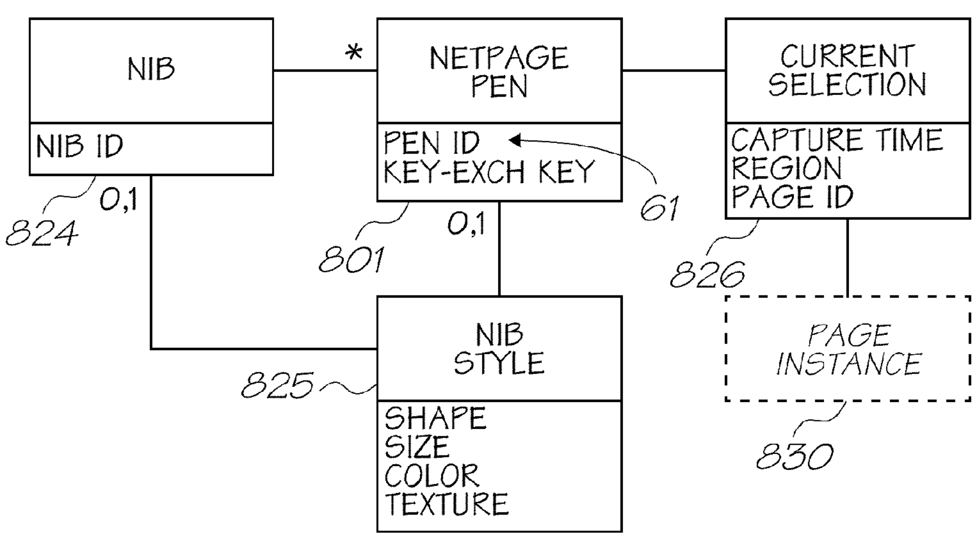
FIG. 23 is a schematic view of a pen class diagram.

The preferred embodiment of the netpage pen operates both as a normal marking ink pen and as a non-marking stylus. The marking aspect, however, is not necessary for using the netpage system as a browsing system, such as when it is used as an Internet interface. Each netpage pen is registered with the netpage system and has a unique pen ID 61. FIG. 23 shows the netpage pen class diagram, reflecting pen-related information maintained by a registration server 11 on the netpage network.

When either nib is in contact with a netpage, the pen determines its position and orientation relative to the page. The nib is attached to a force sensor, and the force on the nib is interpreted relative to a threshold to indicate whether the pen is "up" or "down". This allows a interactive element on the page to be 'clicked' by pressing with the pen nib, in order to request, say, information from a network. Furthermore, the force is captured as a continuous value to allow, say, the full dynamics of a signature to be verified.

The pen determines the position and orientation of its nib on the netpage by imaging, in the infrared spectrum, an area 193 of the page in the vicinity of the nib. It decodes the nearest tag and computes the position of the nib relative to the tag from the observed perspective distortion on the imaged tag and the known geometry of the pen optics. Although the position resolution of the tag may be low, because the tag density on the page is inversely proportional to the tag size, the adjusted position resolution is quite high, exceeding the minimum resolution required for accurate handwriting recognition.

Pen actions relative to a netpage are captured as a series of strokes. A stroke consists of a sequence of time-stamped pen positions on the page, initiated by a pen-down event and completed by the subsequent pen-up event. A stroke is also tagged with the page ID 50 of the netpage whenever the page ID changes, which, under normal circumstances, is at the commencement of the stroke.

Each netpage pen has a current selection 826 associated with it, allowing the user to perform copy and paste operations etc. The selection is timestamped to allow the system to discard it after a defined time period. The current selection describes a region of a page instance. It consists of the most recent digital ink stroke captured through the pen relative to the background area of the page. It is interpreted in an application-specific manner once it is submitted to an application via a selection hyperlink activation.

Each pen has a current nib 824. This is the nib last notified by the pen to the system. In the case of the default netpage pen described above, either the marking black ink nib or the non-marking stylus nib is current. Each pen also has a current nib style 825. This is the nib style last associated with the pen by an application, e.g. in response to the user selecting a color from a palette. The default nib style is the nib style associated with the current nib. Strokes captured through a pen are tagged with the current nib style. When the strokes are subsequently reproduced, they are reproduced in the nib style with which they are tagged.

Whenever the pen is within range of a printer with which it can communicate, the pen slowly flashes its "online" LED. When the pen fails to decode a stroke relative to the page, it momentarily activates its "error" LED. When the pen succeeds in decoding a stroke relative to the page, it momentarily activates its "ok" LED.

A sequence of captured strokes is referred to as digital ink. Digital ink forms the basis for the digital exchange of drawings and handwriting, for online recognition of handwriting, and for online verification of signatures.

The pen is wireless and transmits digital ink to the netpage printer via a short-range radio link. The transmitted digital ink is encrypted for privacy and security and packetized for efficient transmission, but is always flushed on a pen-up event to ensure timely handling in the printer.

When the pen is out-of-range of a printer it buffers digital ink in internal memory, which has a capacity of over ten minutes of continuous handwriting. When the pen is once again within range of a printer, it transfers any buffered digital ink.

A pen can be registered with any number of printers, but because all state data resides in netpages both on paper and on the network, it is largely immaterial which printer a pen is communicating with at any particular time.

Figure 10:
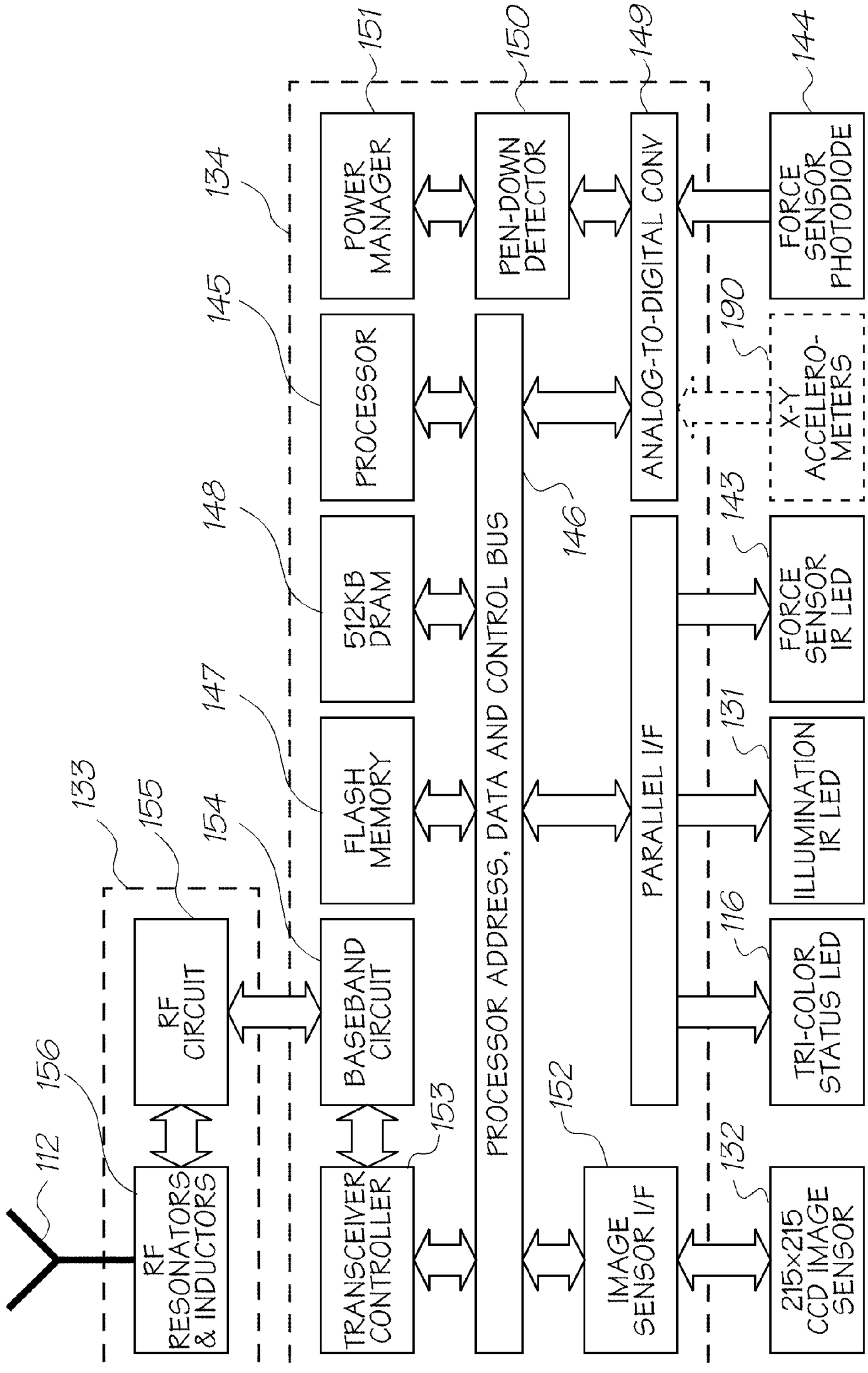
FIG. 10 is a schematic block diagram of a pen controller for the netpage pen shown in FIGS. 8 and 9.

A preferred embodiment of the pen is described in greater detail in Section 6 below, with reference to FIGS. 8 to 10.

1.7 Netpage Interaction

The netpage printer 601 receives data relating to a stroke from the pen 101 when the pen is used to interact with a netpage 1. The coded data 3 of the tags 4 is read by the pen when it is used to execute a movement, such as a stroke. The data allows the identity of the particular page and associated interactive element to be determined and an indication of the relative positioning of the pen relative to the page to be obtained. The indicating data is transmitted to the printer, where it resolves, via the DNS, the page ID 50 of the stroke into the network address of the netpage page server 10 which maintains the corresponding page instance 830. It then transmits the stroke to the page server. If the page was recently identified in an earlier stroke, then the printer may already have the address of the relevant page server in its cache. Each netpage consists of a compact page layout maintained persistently by a netpage page server (see below). The page layout refers to objects such as images, fonts and pieces of text, typically stored elsewhere on the netpage network.

When the page server receives the stroke from the pen, it retrieves the page description to which the stroke applies, and determines which element of the page description the stroke intersects. It is then able to interpret the stroke in the context of the type of the relevant element.

A "click" is a stroke where the distance and time between the pen down position and the subsequent pen up position are both less than some small maximum. An object which is activated by a click typically requires a click to be activated, and accordingly, a longer stroke is ignored. The failure of a pen action, such as a "sloppy" click, to register is indicated by the lack of response from the pen's "ok" LED.

There are two kinds of input elements in a netpage page description: hyperlinks and form fields. Input through a form field can also trigger the activation of an associated hyperlink.

1.7.1 Hyperlinks

A hyperlink is a means of sending a message to a remote application, and typically elicits a printed response in the netpage system.

Figure 29:
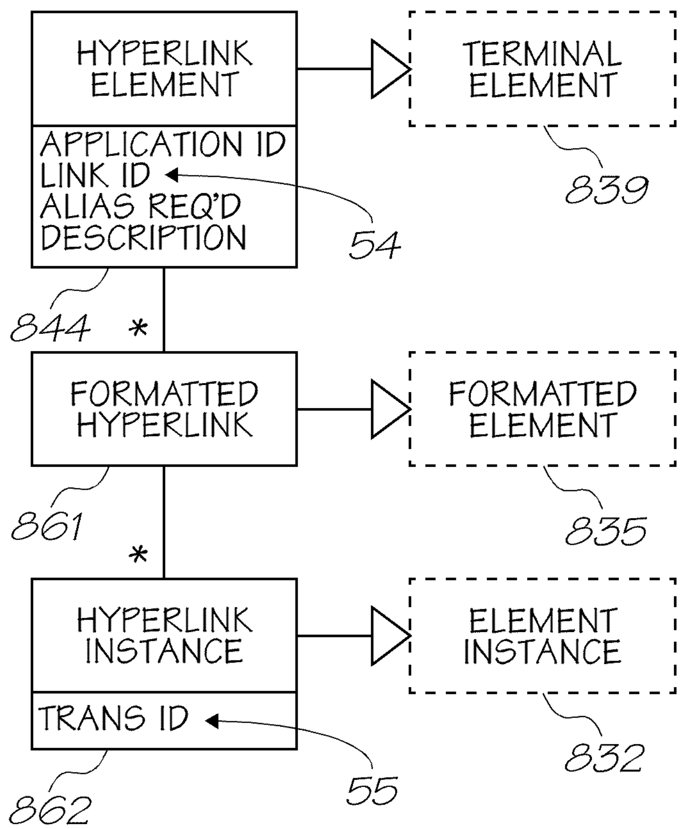
FIG. 29 is a schematic view of a hyperlink element class diagram.

A hyperlink element 844 identifies the application 71 which handles activation of the hyperlink, a link ID 54 which identifies the hyperlink to the application, an "alias required" flag which asks the system to include the user's application alias ID 65 in the hyperlink activation, and a description which is used when the hyperlink is recorded as a favorite or appears in the user's history. The hyperlink element class diagram is shown in FIG. 29.

Figure 30:
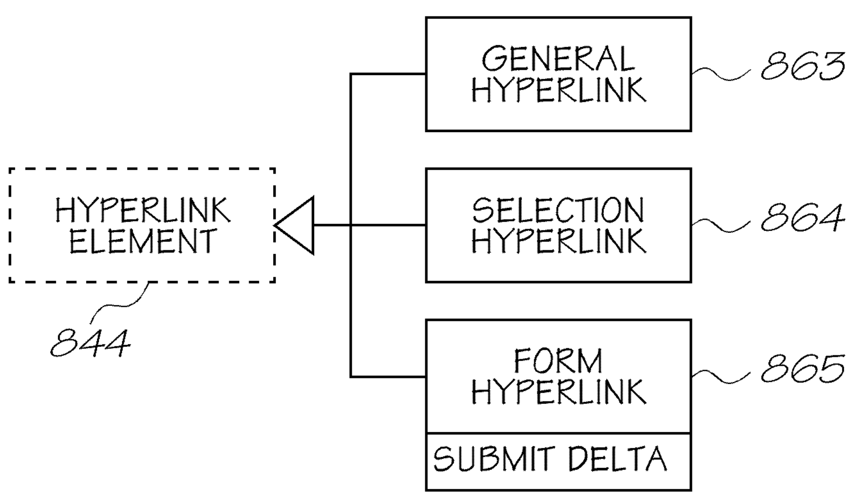
FIG. 30 is a schematic view of a hyperlink element specialization class diagram.

When a hyperlink is activated, the page server sends a request to an application somewhere on the network. The application is identified by an application ID 64, and the application ID is resolved in the normal way via the DNS. There are three types of hyperlinks: general hyperlinks 863, form hyperlinks 865, and selection hyperlinks 864, as shown in FIG. 30. A general hyperlink can implement a request for a linked document, or may simply signal a preference to a server. A form hyperlink submits the corresponding form to the application. A selection hyperlink submits the current selection to the application. If the current selection contains a single-word piece of text, for example, the application may return a single-page document giving the word's meaning within the context in which it appears, or a translation into a different language. Each hyperlink type is characterized by what information is submitted to the application.

The corresponding hyperlink instance 862 records a transaction ID 55 which can be specific to the page instance on which the hyperlink instance appears. The transaction ID can identify user-specific data to the application, for example a "shopping cart" of pending purchases maintained by a purchasing application on behalf of the user.

The system includes the pen's current selection 826 in a selection hyperlink activation. The system includes the content of the associated form instance 868 in a form hyperlink activation, although if the hyperlink has its "submit delta" attribute set, only input since the last form submission is included. The system includes an effective return path in all hyperlink activations.

Figure 31:
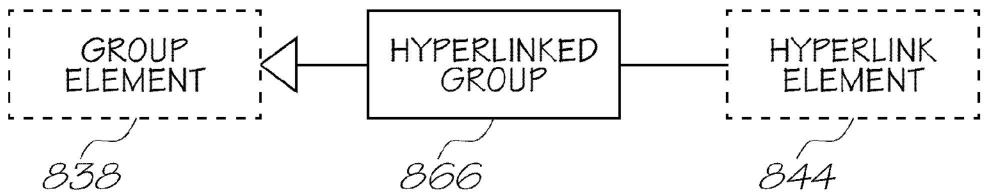
FIG. 31 is a schematic view of a hyperlinked group class diagram.

A hyperlinked group 866 is a group element 838 which has an associated hyperlink, as shown in FIG. 31. When input occurs through any field element in the group, the hyperlink 844 associated with the group is activated. A hyperlinked group can be used to associate hyperlink behavior with a field such as a checkbox. It can also be used, in conjunction with the "submit delta" attribute of a form hyperlink, to provide continuous input to an application. It can therefore be used to support a "blackboard" interaction model, i.e. where input is captured and therefore shared as soon as it occurs.

1.7.2 Forms

A form defines a collection of related input fields used to capture a related set of inputs through a printed netpage. A form allows a user to submit one or more parameters to an application software program running on a server.

Figure 32:
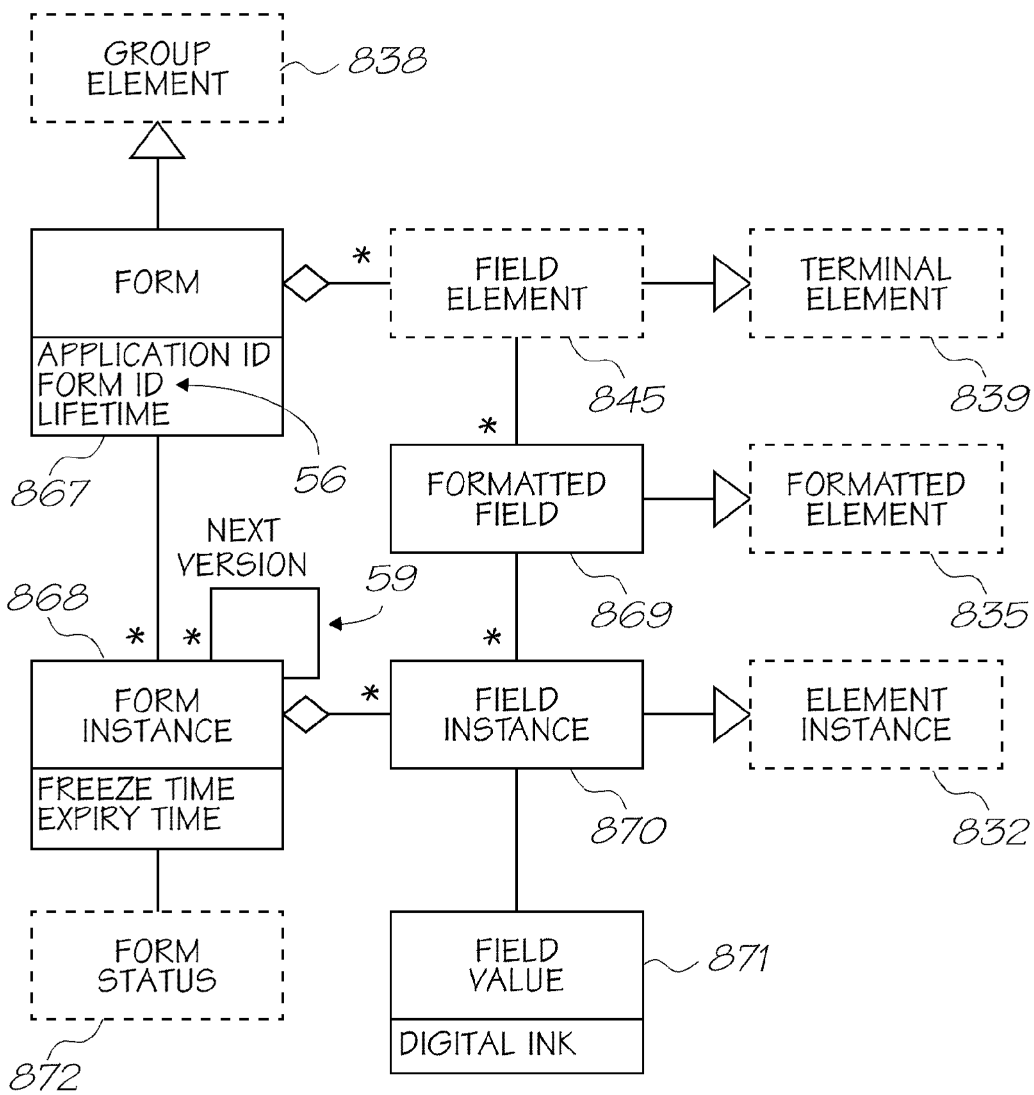
FIG. 32 is a schematic view of a form class diagram.

A form 867 is a group element 838 in the document hierarchy. It ultimately contains a set of terminal field elements 839. A form instance 868 represents a printed instance of a form. It consists of a set of field instances 870 which correspond to the field elements 845 of the form. Each field instance has an associated value 871, whose type depends on the type of the corresponding field element. Each field value records input through a particular printed form instance, i.e. through one or more printed netpages. The form class diagram is shown in FIG. 32.

Each form instance has a status 872 which indicates whether the form is active, frozen, submitted, void or expired. A form is active when first printed. A form becomes frozen once it is signed or once its freeze time is reached. A form becomes submitted once one of its submission hyperlinks has been activated, unless the hyperlink has its "submit delta" attribute set. A form becomes void when the user invokes a void form, reset form or duplicate form page command. A form expires when its specified expiry time is reached, i.e. when the time the form has been active exceeds the form's specified lifetime. While the form is active, form input is allowed. Input through a form which is not active is instead captured in the background field 833 of the relevant page instance. When the form is active or frozen, form submission is allowed. Any attempt to submit a form when the form is not active or frozen is rejected, and instead elicits an form status report.

Each form instance is associated (at 59) with any form instances derived from it, thus providing a version history. This allows all but the latest version of a form in a particular time period to be excluded from a search.

Figure 33:
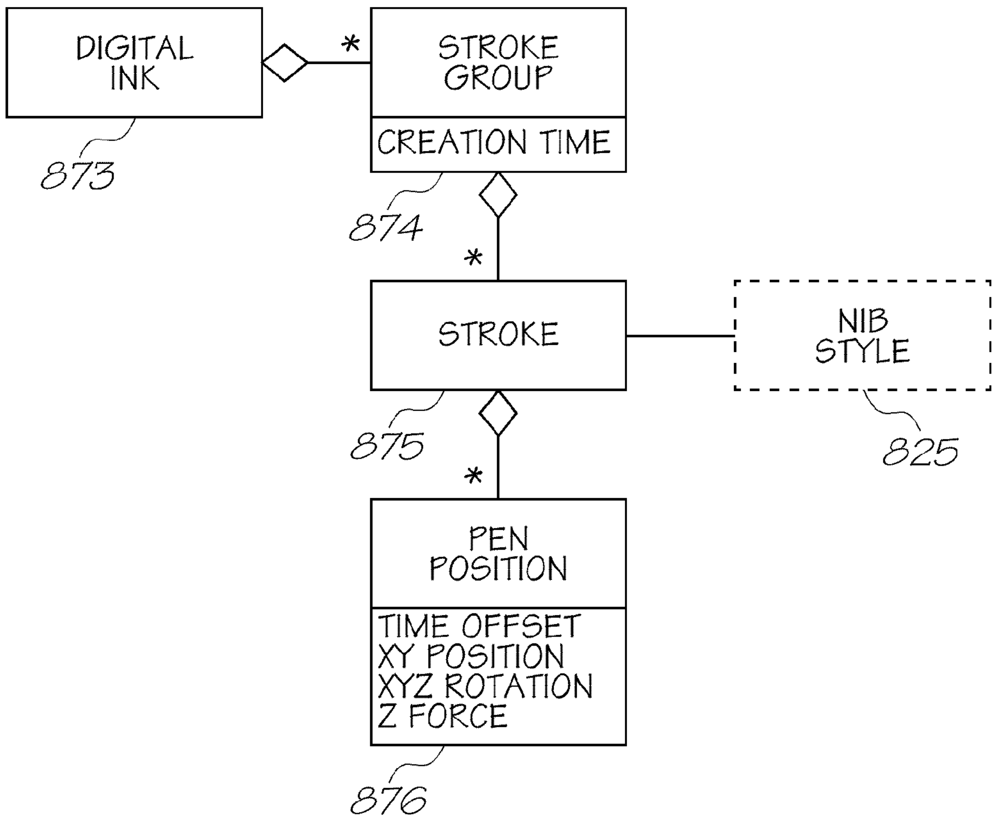
FIG. 33 is a schematic view of a digital ink class diagram.

All input is captured as digital ink. Digital ink 873 consists of a set of timestamped stroke groups 874, each of which consists of a set of styled strokes 875. Each stroke consists of a set of timestamped pen positions 876, each of which also includes pen orientation and nib force. The digital ink class diagram is shown in FIG. 33.

Figure 34:
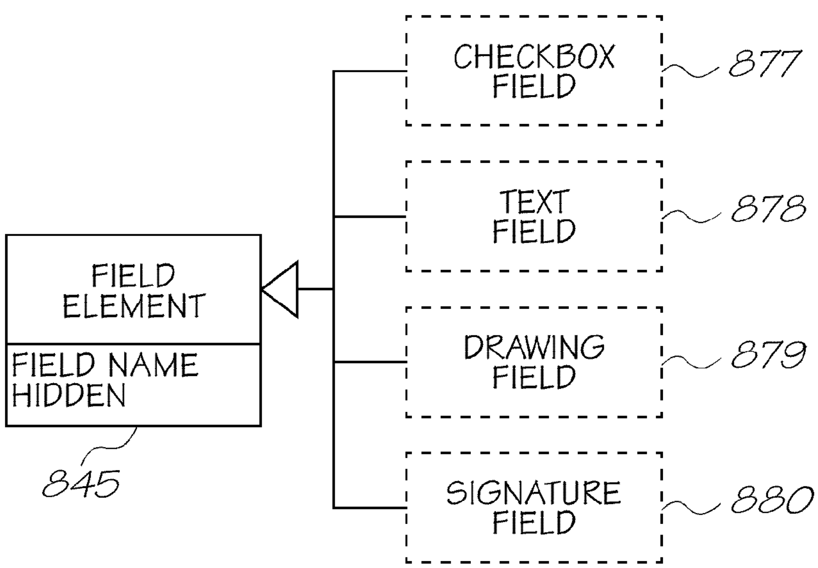
FIG. 34 is a schematic view of a field element specialization class diagram.

A field element 845 can be a checkbox field 877, a text field 878, a drawing field 879, or a signature field 880. The field element class diagram is shown in FIG. 34. Any digital ink captured in a field's zone 58 is assigned to the field.

Figure 35:
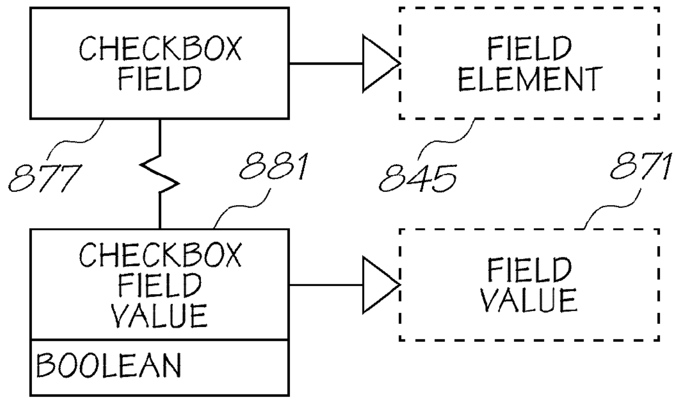
FIG. 35 is a schematic view of a checkbox field class diagram.

A checkbox field has an associated boolean value 881, as shown in FIG. 35. Any mark (a tick, a cross, a stroke, a fill zigzag, etc.) captured in a checkbox field's zone causes a true value to be assigned to the field's value.

Figure 36:
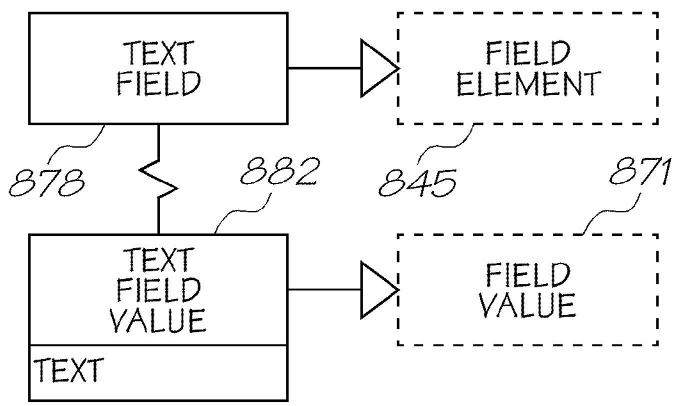
FIG. 36 is a schematic view of a text field class diagram.

A text field has an associated text value 882, as shown in FIG. 36. Any digital ink captured in a text field's zone is automatically converted to text via online handwriting recognition, and the text is assigned to the field's value. Online handwriting recognition is well-understood (see, for example, Tappert, C., C. Y. Suen and T. Wakahara, "The State of the Art in On-Line Handwriting Recognition", IEEE Transactions on Pattern Analysis and Machine Intelligence, Vol. 12, No. 8, August 1990, the contents of which are herein incorporated by cross-reference).

Figure 37:
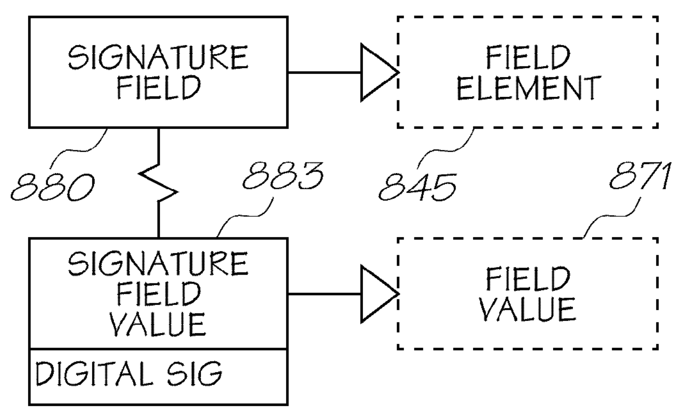
FIG. 37 is a schematic view of a signature field class diagram.

A signature field has an associated digital signature value 883, as shown in FIG. 37. Any digital ink captured in a signature field's zone is automatically verified with respect to the identity of the owner of the pen, and a digital signature of the content of the form of which the field is part is generated and assigned to the field's value. The digital signature is generated using the pen user's private signature key specific to the application which owns the form. Online signature verification is well-understood (see, for example, Plamondon, R. and G. Lorette, "Automatic Signature Verification and Writer Identification—The State of the Art", Pattern Recognition, Vol. 22, No. 2, 1989, the contents of which are herein incorporated by cross-reference).

A field element is hidden if its "hidden" attribute is set. A hidden field element does not have an input zone on a page and does not accept input. It can have an associated field value which is included in the form data when the form containing the field is submitted.

"Editing" commands, such as strike-throughs indicating deletion, can also be recognized in form fields.

Because the handwriting recognition algorithm works "online" (i.e. with access to the dynamics of the pen movement), rather than "offline" (i.e. with access only to a bitmap of pen markings), it can recognize run-on discretely-written characters with relatively high accuracy, without a writer-dependent training phase. A writer-dependent model of handwriting is automatically generated over time, however, and can be generated up-front if necessary, Digital ink, as already stated, consists of a sequence of strokes. Any stroke which starts in a particular element's zone is appended to that element's digital ink stream, ready for interpretation. Any stroke not appended to an object's digital ink stream is appended to the background field's digital ink stream.

Digital ink captured in the background field is interpreted as a selection gesture. Circumscription of one or more objects is generally interpreted as a selection of the circumscribed objects, although the actual interpretation is application-specific.

Table 3 summarises these various pen interactions with a netpage.

The system maintains a current selection for each pen. The selection consists simply of the most recent stroke captured in the background field. The selection is cleared after an inactivity timeout to ensure predictable behavior.

The raw digital ink captured in every field is retained on the netpage page server and is optionally transmitted with the form data when the form is submitted to the application. This allows the application to interrogate the raw digital ink should it suspect the original conversion, such as the conversion of handwritten text. This can, for example, involve human intervention at the application level for forms which fail certain application-specific consistency checks. As an extension to this, the entire background area of a form can be designated as a drawing field. The application can then decide, on the basis of the presence of digital ink outside the explicit fields of the form, to route the form to a human operator, on the assumption that the user may have indicated amendments to the filled-in fields outside of those fields.

TABLE 3

Summary of pen interactions with a netpage

| Object | Type | Pen input | Action |
|---|---|---|---|
| Hyperlink | General | Click | Submit action to application |
| | Form | Click | Submit form to application |
| | Selection | Click | Submit selection to application |
| Form field | Checkbox | Any mark | Assign true to field |
| | Text | Handwriting | Convert digital ink to text; assign text to field |
| | Drawing | Digital ink | Assign digital ink to field |
| | Signature | Signature | Verify digital ink signature; generate digital signature of form; assign digital signature to field |
| None | — | Circumscription | Assign digital ink to current selection |

Figure 38:
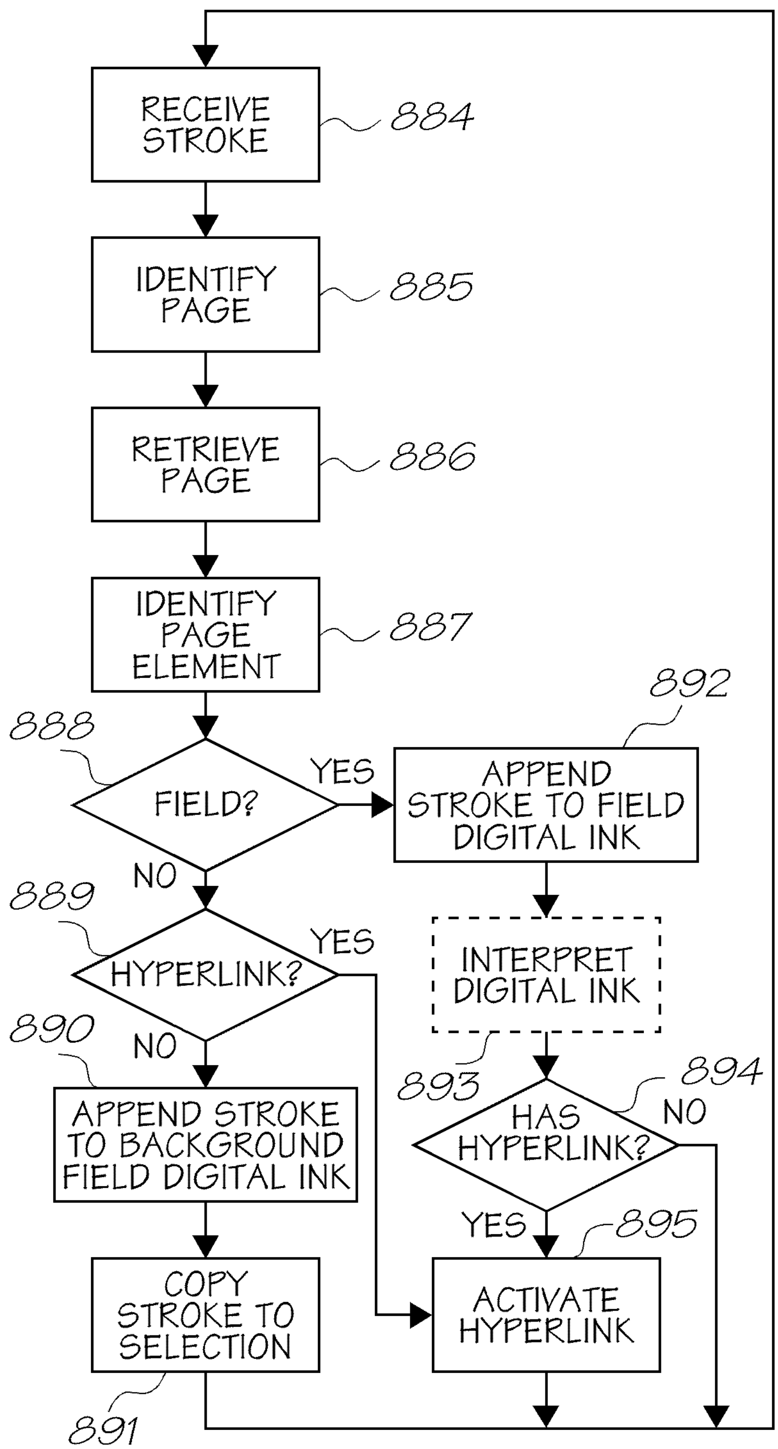
FIG. 38 is a flowchart of an input processing algorithm.

FIG. 38 shows a flowchart of the process of handling pen input relative to a netpage. The process consists of receiving (at 884) a stroke from the pen; identifying (at 885) the page instance 830 to which the page ID 50 in the stroke refers; retrieving (at 886) the page description 5; identifying (at 887) a formatted element 839 whose zone 58 the stroke intersects; determining (at 888) whether the formatted element corresponds to a field element, and if so appending (at 892) the received stroke to the digital ink of the field value 871, interpreting (at 893) the accumulated digital ink of the field, and determining (at 894) whether the field is part of a hyperlinked group 866 and if so activating (at 895) the associated hyperlink; alternatively determining (at 889) whether the formatted element corresponds to a hyperlink element and if so activating (at 895) the corresponding hyperlink; alternatively, in the absence of an input field or hyperlink, appending (at 890) the received stroke to the digital ink of the background field 833; and copying (at 891) the received stroke to the current selection 826 of the current pen, as maintained by the registration server.

Figure 38A:
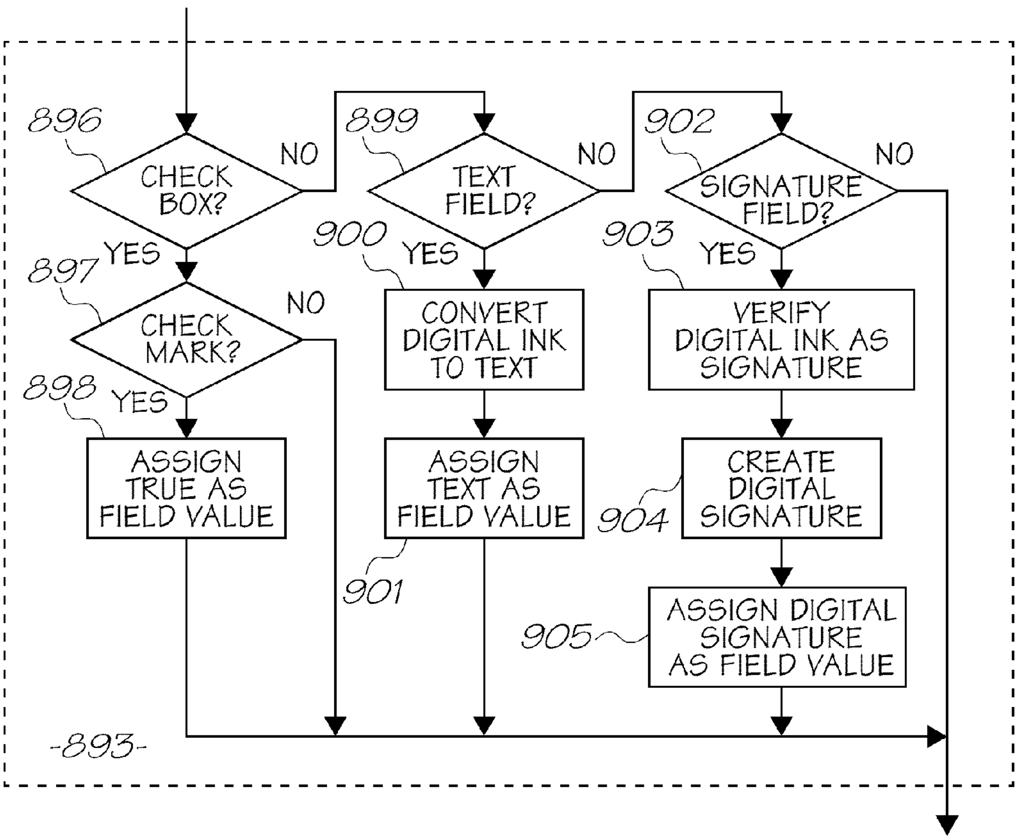
FIG. 38A is a detailed flowchart of one step of the flowchart of FIG. 38.

FIG. 38*a* shows a detailed flowchart of step 893 in the process shown in FIG. 38, where the accumulated digital ink of a field is interpreted according to the type of the field. The process consists of determining (at 896) whether the field is a checkbox and (at 897) whether the digital ink represents a checkmark, and if so assigning (at 898) a true value to the field value; alternatively determining (at 899) whether the field is a text field and if so converting (at 900) the digital ink to computer text, with the help of the appropriate registration server, and assigning (at 901) the converted computer text to the field value; alternatively determining (at 902) whether the field is a signature field and if so verifying (at 903) the digital ink as the signature of the pen's owner, with the help of the appropriate registration server, creating (at 904) a digital signature of the contents of the corresponding form, also with the help of the registration server and using the pen owner's private signature key relating to the corresponding application, and assigning (at 905) the digital signature to the field value.

1.7.3 Page Server Commands

A page server command is a command which is handled locally by the page server. It operates directly on form, page and document instances.

Figure 39:
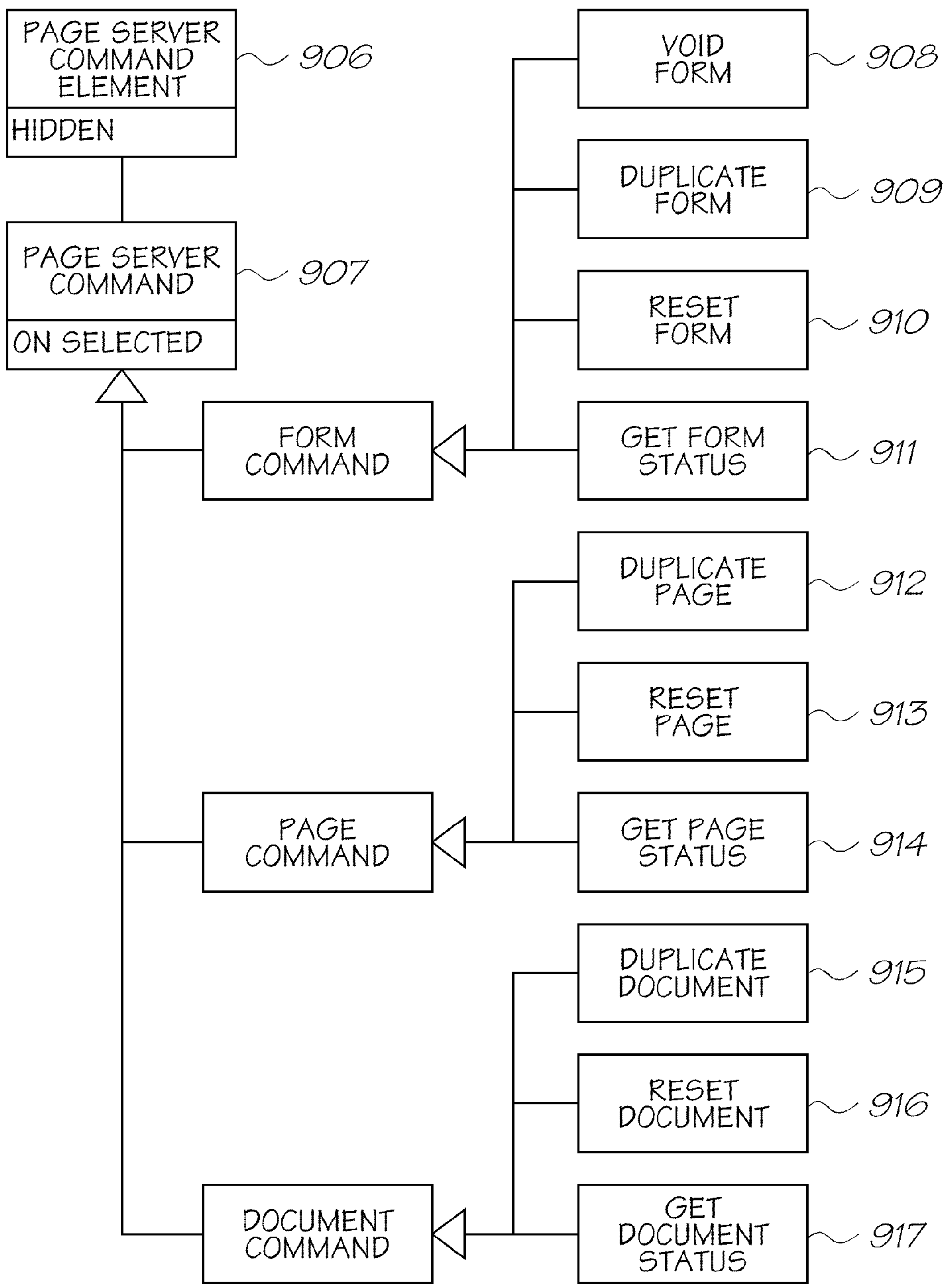
FIG. 39 is a schematic view of a page server command element class diagram.

A page server command 907 can be a void form command 908, a duplicate form command 909, a reset form command 910, a get form status command 911, a duplicate page command 912, a reset page command 913, a get page status command 914, a duplicate document command 915, a reset document command 916, or a get document status command 917, as shown in FIG. 39.

A void form command voids the corresponding form instance. A duplicate form command voids the corresponding form instance and then produces an active printed copy of the current form instance with field values preserved. The copy contains the same hyperlink transaction IDs as the original, and so is indistinguishable from the original to an application. A reset form command voids the corresponding form instance and then produces an active printed copy of the form instance with field values discarded. A get form status command produces a printed report on the status of the corresponding form instance, including who published it, when it was printed, for whom it was printed, and the form status of the form instance.

Since a form hyperlink instance contains a transaction ID, the application has to be involved in producing a new form instance. A button requesting a new form instance is therefore typically implemented as a hyperlink.

A duplicate page command produces a printed copy of the corresponding page instance with the background field value preserved. If the page contains a form or is part of a form, then the duplicate page command is interpreted as a duplicate form command. A reset page command produces a printed copy of the corresponding page instance with the background field value discarded. If the page contains a form or is part of a form, then the reset page command is interpreted as a reset form command. A get page status command produces a printed report on the status of the corresponding page instance, including who published it, when it was printed, for whom it was printed, and the status of any forms it contains or is part of.

The netpage logo which appears on every netpage is usually associated with a duplicate page element.

When a page instance is duplicated with field values preserved, field values are printed in their native form, i.e. a checkmark appears as a standard checkmark graphic, and text appears as typeset text. Only drawings and signatures appear in their original form, with a signature accompanied by a standard graphic indicating successful signature verification.

A duplicate document command produces a printed copy of the corresponding document instance with background field values preserved. If the document contains any forms, then the duplicate document command duplicates the forms in the same way a duplicate form command does. A reset document command produces a printed copy of the corresponding document instance with background field values discarded. If the document contains any forms, then the reset document command resets the forms in the same way a reset form command does. A get document status command produces a printed report on the status of the corresponding document instance, including who published it, when it was printed, for whom it was printed, and the status of any forms it contains.

If the page server command's "on selected" attribute is set, then the command operates on the page identified by the pen's current selection rather than on the page containing the command. This allows a menu of page server commands to be printed. If the target page doesn't contain a page server command element for the designated page server command, then the command is ignored.

An application can provide application-specific handling by embedding the relevant page server command element in a hyperlinked group. The page server activates the hyperlink associated with the hyperlinked group rather than executing the page server command.

A page server command element is hidden if its "hidden" attribute is set. A hidden command element does not have an input zone on a page and so cannot be activated directly by a user. It can, however, be activated via a page server command embedded in a different page, if that page server command has its "on selected" attribute set.

1.8 Standard Features of Netpages

In the preferred form, each netpage is printed with the netpage logo at the bottom to indicate that it is a netpage and therefore has interactive properties. The logo also acts as a copy button. In most cases pressing the logo produces a copy of the page. In the case of a form, the button produces a copy of the entire form. And in the case of a secure document, such as a ticket or coupon, the button elicits an explanatory note or advertising page.

The default single-page copy function is handled directly by the relevant netpage page server. Special copy functions are handled by linking the logo button to an application.

1.9 User Help System

In a preferred embodiment, the netpage printer has a single button labelled "Help". When pressed it elicits a single help page 46 of information, including:

status of printer connection
status of printer consumables
top-level help menu
document function menu
top-level netpage network directory The help menu provides a hierarchical manual on how to use the netpage system.

The document function menu includes the following functions:

print a copy of a document
print a clean copy of a form
print the status of a document A document function is initiated by selecting the document and then pressing the button. The status of a document indicates who published it and when, to whom it was delivered, and to whom and when it was subsequently submitted as a form.

The help page is obviously unavailable if the printer is unable to print. In this case the "error" light is lit and the user can request remote diagnosis over the network.

2 Personalized Publication Model

In the following description, news is used as a canonical publication example to illustrate personalization mechanisms in the netpage system. Although news is often used in the limited sense of newspaper and newsmagazine news, the intended scope in the present context is wider.

In the netpage system, the editorial content and the advertising content of a news publication are personalized using different mechanisms. The editorial content is personalized according to the reader's explicitly stated and implicitly captured interest profile. The advertising content is personalized according to the reader's locality and demographic.

2.1 Editorial Personalization

A subscriber can draw on two kinds of news sources: those that deliver news publications, and those that deliver news streams. While news publications are aggregated and edited by the publisher, news streams are aggregated either by a news publisher or by a specialized news aggregator. News publications typically correspond to traditional newspapers and newsmagazines, while news streams can be many and varied: a "raw" news feed from a news service, a cartoon strip, a freelance writer's column, a friend's bulletin board, or the reader's own e-mail.

The netpage publication server supports the publication of edited news publications as well as the aggregation of multiple news streams. By handling the aggregation and hence the formatting of news streams selected directly by the reader, the server is able to place advertising on pages over which it otherwise has no editorial control.

The subscriber builds a daily newspaper by selecting one or more contributing news publications, and creating a personalized version of each. The resulting daily editions are printed and bound together into a single newspaper. The various members of a household typically express their different interests and tastes by selecting different daily publications and then customizing them.

For each publication, the reader optionally selects specific sections. Some sections appear daily, while others appear weekly. The daily sections available from The New York Times online, for example, include "Page One Plus", "National", "International", "Opinion", "Business", "Arts/Living", "Technology", and "Sports". The set of available sections is specific to a publication, as is the default subset.

The reader can extend the daily newspaper by creating custom sections, each one drawing on any number of news streams. Custom sections might be created for e-mail and friends' announcements ("Personal"), or for monitoring news feeds for specific topics ("Alerts" or "Clippings").

For each section, the reader optionally specifies its size, either qualitatively (e.g. short, medium, or long), or numerically (i.e. as a limit on its number of pages), and the desired proportion of advertising, either qualitatively (e.g. high, normal, low, none), or numerically (i.e. as a percentage).

The reader also optionally expresses a preference for a large number of shorter articles or a small number of longer articles. Each article is ideally written (or edited) in both short and long forms to support this preference.

An article may also be written (or edited) in different versions to match the expected sophistication of the reader, for example to provide children's and adults' versions. The appropriate version is selected according to the reader's age. The reader can specify a "reading age" which takes precedence over their biological age.

The articles which make up each section are selected and prioritized by the editors, and each is assigned a useful lifetime. By default they are delivered to all relevant subscribers, in priority order, subject to space constraints in the subscribers' editions.

In sections where it is appropriate, the reader may optionally enable collaborative filtering. This is then applied to articles which have a sufficiently long lifetime. Each article which qualifies for collaborative filtering is printed with rating buttons at the end of the article. The buttons can provide an easy choice (e.g. "liked" and "disliked"), making it more likely that readers will bother to rate the article.

Articles with high priorities and short lifetimes are therefore effectively considered essential reading by the editors and are delivered to most relevant subscribers.

The reader optionally specifies a serendipity factor, either qualitatively (e.g. do or don't surprise me), or numerically. A high serendipity factor lowers the threshold used for matching during collaborative filtering. A high factor makes it more likely that the corresponding section will be filled to the reader's specified capacity. A different serendipity factor can be specified for different days of the week.

The reader also optionally specifies topics of particular interest within a section, and this modifies the priorities assigned by the editors.

The speed of the reader's Internet connection affects the quality at which images can be delivered. The reader optionally specifies a preference for fewer images or smaller images or both. If the number or size of images is not reduced, then images may be delivered at lower quality (i.e. at lower resolution or with greater compression).

At a global level, the reader specifies how quantities, dates, times and monetary values are localized. This involves specifying whether units are imperial or metric, a local timezone and time format, and a local currency, and whether the localization consist of in situ translation or annotation. These preferences are derived from the reader's locality by default.

To reduce reading difficulties caused by poor eyesight, the reader optionally specifies a global preference for a larger presentation. Both text and images are scaled accordingly, and less information is accommodated on each page.

The language in which a news publication is published, and its corresponding text encoding, is a property of the publication and not a preference expressed by the user. However, the netpage system can be configured to provide automatic translation services in various guises.

2.2 Advertising Localization and Targeting

The personalization of the editorial content directly affects the advertising content, because advertising is typically placed to exploit the editorial context. Travel ads, for example, are more likely to appear in a travel section than elsewhere. The value of the editorial content to an advertiser (and therefore to the publisher) lies in its ability to attract large numbers of readers with the right demographics.

Effective advertising is placed on the basis of locality and demographics. Locality determines proximity to particular services, retailers etc., and particular interests and concerns associated with the local community and environment. Demographics determine general interests and preoccupations as well as likely spending patterns.

A news publisher's most profitable product is advertising "space", a multi-dimensional entity determined by the publication's geographic coverage, the size of its readership, its readership demographics, and the page area available for advertising.

In the netpage system, the netpage publication server computes the approximate multi-dimensional size of a publication's saleable advertising space on a per-section basis, taking into account the publication's geographic coverage, the section's readership, the size of each reader's section edition, each reader's advertising proportion, and each reader's demographic.

In comparison with other media, the netpage system allows the advertising space to be defined in greater detail, and allows smaller pieces of it to be sold separately. It therefore allows it to be sold at closer to its true value.

For example, the same advertising "slot" can be sold in varying proportions to several advertisers, with individual readers' pages randomly receiving the advertisement of one advertiser or another, overall preserving the proportion of space sold to each advertiser.

The netpage system allows advertising to be linked directly to detailed product information and online purchasing. It therefore raises the intrinsic value of the advertising space.

Because personalization and localization are handled automatically by netpage publication servers, an advertising aggregator can provide arbitrarily broad coverage of both geography and demographics. The subsequent disaggregation is efficient because it is automatic. This makes it more cost-effective for publishers to deal with advertising aggregators than to directly capture advertising. Even though the advertising aggregator is taking a proportion of advertising revenue, publishers may find the change profit-neutral because of the greater efficiency of aggregation. The advertising aggregator acts as an intermediary between advertisers and publishers, and may place the same advertisement in multiple publications.

It is worth noting that ad placement in a netpage publication can be more complex than ad placement in the publication's traditional counterpart, because the publication's advertising space is more complex. While ignoring the full complexities of negotiations between advertisers, advertising aggregators and publishers, the preferred form of the netpage system provides some automated support for these negotiations, including support for automated auctions of advertising space. Automation is particularly desirable for the placement of advertisements which generate small amounts of income, such as small or highly localized advertisements.

Once placement has been negotiated, the aggregator captures and edits the advertisement and records it on a netpage ad server. Correspondingly, the publisher records the ad placement on the relevant netpage publication server. When the netpage publication server lays out each user's personalized publication, it picks the relevant advertisements from the netpage ad server.

2.3 User Profiles 2.3.1 Information Filtering

The personalization of news and other publications relies on an assortment of user-specific profile information, including:

- publication customizations
- collaborative filtering vectors
- contact details
- presentation preferences The customization of a publication is typically publication-specific, and so the customization information is maintained by the relevant netpage publication server.

A collaborative filtering vector consists of the user's ratings of a number of news items. It is used to correlate different users' interests for the purposes of making recommendations. Although there are benefits to maintaining a single collaborative filtering vector independently of any particular publication, there are two reasons why it is more practical to maintain a separate vector for each publication: there is likely to be more overlap between the vectors of subscribers to the same publication than between those of subscribers to different publications; and a publication is likely to want to present its users' collaborative filtering vectors as part of the value of its brand, not to be found elsewhere. Collaborative filtering vectors are therefore also maintained by the relevant netpage publication server.

Contact details, including name, street address, ZIP Code, state, country, telephone numbers, are global by nature, and are maintained by a netpage registration server.

Presentation preferences, including those for quantities, dates and times, are likewise global and maintained in the same way.

The localization of advertising relies on the locality indicated in the user's contact details, while the targeting of advertising relies on personal information such as date of birth, gender, marital status, income, profession, education, or qualitative derivatives such as age range and income range.

For those users who choose to reveal personal information for advertising purposes, the information is maintained by the relevant netpage registration server. In the absence of such information, advertising can be targeted on the basis of the demographic associated with the user's ZIP or ZIP+4 Code.

Each user, pen, printer, application provider and application is assigned its own unique identifier, and the netpage registration server maintains the relationships between them, as shown in FIGS. 21, 22, 23 and 24. For registration purposes, a publisher is a special kind of application provider, and a publication is a special kind of application.

Each user 800 may be authorized to use any number of printers 802, and each printer may allow any number of users to use it. Each user has a single default printer (at 66), to which periodical publications are delivered by default, whilst pages printed on demand are delivered to the printer through which the user is interacting. The server keeps track of which publishers a user has authorized to print to the user's default printer. A publisher does not record the ID of any particular printer, but instead resolves the ID when it is required. The user may also be designated as having administrative privileges 69 on the printer, allowing the user to authorize other users to use the printer. This only has meaning if the printer requires administrative privileges 84 for such operations.

When a user subscribes 808 to a publication 807, the publisher 806 (i.e. application provider 803) is authorized to print to a specified printer or the user's default printer. This authorization can be revoked at any time by the user. Each user may have several pens 801, but a pen is specific to a single user. If a user is authorized to use a particular printer, then that printer recognizes any of the user's pens.

The pen ID is used to locate the corresponding user profile maintained by a particular netpage registration server, via the DNS in the usual way.

A Web terminal 809 can be authorized to print on a particular netpage printer, allowing Web pages and netpage documents encountered during Web browsing to be conveniently printed on the nearest netpage printer.

The netpage system can collect, on behalf of a printer provider, fees and commissions on income earned through publications printed on the provider's printers. Such income can include advertising fees, click-through fees, e-commerce commissions, and transaction fees. If the printer is owned by the user, then the user is the printer provider.

Each user also has a netpage account 820 which is used to accumulate micro-debits and credits (such as those described in the preceding paragraph); contact details 815, including name, address and telephone numbers; global preferences 816, including privacy, delivery and localization settings; any number of biometric records 817, containing the user's encoded signature 818, fingerprint 819 etc; a handwriting model 819 automatically maintained by the system; and SET payment card accounts 821, with which e-commerce payments can be made.

In addition to the user-specific netpage account, each user also has a netpage account 936 specific to each printer the user is authorized to use. Each printer-specific account is used to accumulate micro-debits and credits related to the user's activities on that printer. The user is billed on a regular basis for any outstanding debit balances.

A user optionally appears in the netpage user directory 823, allowing other users to locate and direct e-mail (etc.) to the user.

2.4 Intelligent Page Layout

The netpage publication server automatically lays out the pages of each user's personalized publication on a section-by-section basis. Since most advertisements are in the form of pre-formatted rectangles, they are placed on the page before the editorial content.

The advertising ratio for a section can be achieved with wildly varying advertising ratios on individual pages within the section, and the ad layout algorithm exploits this. The algorithm is configured to attempt to co-locate closely tied editorial and advertising content, such as placing ads for roofing material specifically within the publication because of a special feature on do-it-yourself roofing repairs.

The editorial content selected for the user, including text and associated images and graphics, is then laid out according to various aesthetic rules.

The entire process, including the selection of ads and the selection of editorial content, must be iterated once the layout has converged, to attempt to more closely achieve the user's stated section size preference. The section size preference can, however, be matched on average over time, allowing significant day-to-day variations.

2.5 Document Format

Once the document is laid out, it is encoded for efficient distribution and persistent storage on the netpage network.

The primary efficiency mechanism is the separation of information specific to a single user's edition and information shared between multiple users' editions. The specific information consists of the page layout. The shared information consists of the objects to which the page layout refers, including images, graphics, and pieces of text.

A text object contains fully-formatted text represented in the Extensible Markup Language (XML) using the Extensible Stylesheet Language (XSL). XSL provides precise control over text formatting independently of the region into which the text is being set, which in this case is being provided by the layout. The text object contains embedded language codes to enable automatic translation, and embedded hyphenation hints to aid with paragraph formatting.

An image object encodes an image in the JPEG 2000 wavelet-based compressed image format. A graphic object encodes a 2D graphic in Scalable Vector Graphics (SVG) format.

The layout itself consists of a series of placed image and graphic objects, linked textflow objects through which text objects flow, hyperlinks and input fields as described above, and watermark regions. These layout objects are summarized in Table 4. The layout uses a compact format suitable for efficient distribution and storage.

TABLE 4 netpage layout objects

| Layout object | Attribute | Format of linked object |
|---|---|---|
| Image | Position | — |
| | Image object ID | JPEG 2000 |
| Graphic | Position | — |
| | Graphic object ID | SVG |
| Textflow | Textflow ID | — |
| | Zone | — |
| | Optional text object ID | XML/XSL |
| Hyperlink | Type | — |
| | Zone | — |
| | Application ID, etc. | — |
| Field | Type | — |
| | Meaning | — |
| | Zone | — |
| Watermark | Zone | — |

2.6 Document Distribution

As described above, for purposes of efficient distribution and persistent storage on the netpage network, a user-specific page layout is separated from the shared objects to which it refers.

When a subscribed publication is ready to be distributed, the netpage publication server allocates, with the help of the netpage ID server 12, a unique ID for each page, page instance, document, and document instance.

The server computes a set of optimized subsets of the shared content and creates a multicast channel for each subset, and then tags each user-specific layout with the names of the multicast channels which will carry the shared content used by that layout. The server then pointcasts each user's layouts to that user's printer via the appropriate page server, and when the pointcasting is complete, multicasts the shared content on the specified channels. After receiving its pointcast, each page server and printer subscribes to the multicast channels specified in the page layouts. During the multicasts, each page server and printer extracts from the multicast streams those objects referred to by its page layouts. The page servers persistently archive the received page layouts and shared content.

Once a printer has received all the objects to which its page layouts refer, the printer re-creates the fully-populated layout and then rasterizes and prints it.

Under normal circumstances, the printer prints pages faster than they can be delivered. Assuming a quarter of each page is covered with images, the average page has a size of less than 400 KB. The printer can therefore hold in excess of 100 such pages in its internal 64 MB memory, allowing for temporary buffers etc. The printer prints at a rate of one page per second. This is equivalent to 400 KB or about 3 Mbit of page data per second, which is similar to the highest expected rate of page data delivery over a broadband network.

Even under abnormal circumstances, such as when the printer runs out of paper, it is likely that the user will be able to replenish the paper supply before the printer's 100-page internal storage capacity is exhausted.

However, if the printer's internal memory does fill up, then the printer will be unable to make use of a multicast when it first occurs. The netpage publication server therefore allows printers to submit requests for re-multicasts. When a critical number of requests is received or a timeout occurs, the server re-multicasts the corresponding shared objects.

Once a document is printed, a printer can produce an exact duplicate at any time by retrieving its page layouts and contents from the relevant page server.

2.7 ON-Demand Documents

When a netpage document is requested on demand, it can be personalized and delivered in much the same way as a periodical. However, since there is no shared content, delivery is made directly to the requesting printer without the use of multicast.

When a non-netpage document is requested on demand, it is not personalized, and it is delivered via a designated netpage formatting server which reformats it as a netpage document. A netpage formatting server is a special instance of a netpage publication server. The netpage formatting server has knowledge of various Internet document formats, including Adobe's Portable Document Format (PDF), and Hypertext Markup Language (HTML). In the case of HTML, it can make use of the higher resolution of the printed page to present Web pages in a multi-column format, with a table of contents. It can automatically include all Web pages directly linked to the requested page. The user can tune this behavior via a preference.

The netpage formatting server makes standard netpage behavior, including interactivity and persistence, available on any Internet document, no matter what its origin and format. It hides knowledge of different document formats from both the netpage printer and the netpage page server, and hides knowledge of the netpage system from Web servers.

2.8 ID Allocation

Unstructured netpage IDs such as the document ID 51, page ID (region ID) 50, etc., may be assigned on demand through a multi-level assignment hierarchy with a single root node. Lower-level assignors obtain blocks of IDs from higher-level assignors on demand. Unlike with structured ID assignment, these blocks correspond to arbitrary ranges (or even sets) of IDs, rather than to IDs with fixed prefixes. Each assignor in the assignment hierarchy ensures that blocks of IDs and individual IDs are assigned uniquely.

Both registration servers 11 and ID servers 12 act as ID assignors.

3 Security 3.1 Cryptography

Cryptography is used to protect sensitive information, both in storage and in transit, and to authenticate parties to a transaction. There are two classes of cryptography in widespread use: secret-key cryptography and public-key cryptography. The netpage network uses both classes of cryptography.

Secret-key cryptography, also referred to as symmetric cryptography, uses the same key to encrypt and decrypt a message. Two parties wishing to exchange messages must first arrange to securely exchange the secret key.

Public-key cryptography, also referred to as asymmetric cryptography, uses two encryption keys. The two keys are mathematically related in such a way that any message encrypted using one key can only be decrypted using the other key. One of these keys is then published, while the other is kept private. The public key is used to encrypt any message intended for the holder of the private key. Once encrypted using the public key, a message can only be decrypted using the private key. Thus two parties can securely exchange messages without first having to exchange a secret key. To ensure that the private key is secure, it is normal for the holder of the private key to generate the key pair.

Public-key cryptography can be used to create a digital signature. The holder of the private key can create a known hash of a message and then encrypt the hash using the private key. Anyone can then verify that the encrypted hash constitutes the "signature" of the holder of the private key with respect to that particular message by decrypting the encrypted hash using the public key and verifying the hash against the message. If the signature is appended to the message, then the recipient of the message can verify both that the message is genuine and that it has not been altered in transit.

To make public-key cryptography work, there has to be a way to distribute public keys which prevents impersonation. This is normally done using certificates and certificate authorities. A certificate authority is a trusted third party which authenticates the connection between a public key and someone's identity. The certificate authority verifies the person's identity by examining identity documents, and then creates and signs a digital certificate containing the person's identity details and public key. Anyone who trusts the certificate authority can use the public key in the certificate with a high degree of certainty that it is genuine. They just have to verify that the certificate has indeed been signed by the certificate authority, whose public key is well-known.

In most transaction environments, public-key cryptography is only used to create digital signatures and to securely exchange secret session keys. Secret-key cryptography is used for all other purposes.

In the following discussion, when reference is made to the secure transmission of information between a netpage printer and a server, what actually happens is that the printer obtains the server's certificate, authenticates it with reference to the certificate authority, uses the public key-exchange key in the certificate to exchange a secret session key with the server, and then uses the secret session key to encrypt the message data. A session key, by definition, can have an arbitrarily short lifetime.

3.2 Netpage Printer Security

Each netpage printer is assigned a pair of unique identifiers at time of manufacture which are stored in read-only memory in the printer and in the netpage registration server database. The first ID 62 is public and uniquely identifies the printer on the netpage network. The second ID is secret and is used when the printer is first registered on the network.

When the printer connects to the netpage network for the first time after installation, it creates a signature public/private key pair. It transmits the secret ID and the public key securely to the netpage registration server. The server compares the secret ID against the printer's secret ID recorded in its database, and accepts the registration if the IDs match. It then creates and signs a certificate containing the printer's public ID and public signature key, and stores the certificate in the registration database.

The netpage registration server acts as a certificate authority for netpage printers, since it has access to secret information allowing it to verify printer identity.

When a user subscribes to a publication, a record is created in the netpage registration server database authorizing the publisher to print the publication to the user's default printer or a specified printer. Every document sent to a printer via a page server is addressed to a particular user and is signed by the publisher using the publisher's private signature key. The page server verifies, via the registration database, that the publisher is authorized to deliver the publication to the specified user. The page server verifies the signature using the publisher's public key, obtained from the publisher's certificate stored in the registration database.

The netpage registration server accepts requests to add printing authorizations to the database, so long as those requests are initiated via a pen registered to the printer.

3.3 Netpage Pen Security

Each netpage pen is assigned a unique identifier at time of manufacture which is stored in read-only memory in the pen and in the netpage registration server database. The pen ID 61 uniquely identifies the pen on the netpage network.

A netpage pen can "know" a number of netpage printers, and a printer can "know" a number of pens. A pen communicates with a printer via a radio frequency signal whenever it is within range of the printer. Once a pen and printer are registered, they regularly exchange session keys. Whenever the pen transmits digital ink to the printer, the digital ink is always encrypted using the appropriate session key. Digital ink is never transmitted in the clear.

A pen stores a session key for every printer it knows, indexed by printer ID, and a printer stores a session key for every pen it knows, indexed by pen ID. Both have a large but finite storage capacity for session keys, and will forget a session key on a least-recently-used basis if necessary.

When a pen comes within range of a printer, the pen and printer discover whether they know each other. If they don't know each other, then the printer determines whether it is supposed to know the pen. This might be, for example, because the pen belongs to a user who is registered to use the printer. If the printer is meant to know the pen but doesn't, then it initiates the automatic pen registration procedure. If the printer isn't meant to know the pen, then it agrees with the pen to ignore it until the pen is placed in a charging cup, at which time it initiates the registration procedure.

In addition to its public ID, the pen contains a secret key-exchange key. The key-exchange key is also recorded in the netpage registration server database at time of manufacture. During registration, the pen transmits its pen ID to the printer, and the printer transmits the pen ID to the netpage registration server. The server generates a session key for the printer and pen to use, and securely transmits the session key to the printer. It also transmits a copy of the session key encrypted with the pen's key-exchange key. The printer stores the session key internally, indexed by the pen ID, and transmits the encrypted session key to the pen. The pen stores the session key internally, indexed by the printer ID.

Although a fake pen can impersonate a pen in the pen registration protocol, only a real pen can decrypt the session key transmitted by the printer.

When a previously unregistered pen is first registered, it is of limited use until it is linked to a user. A registered but "un-owned" pen is only allowed to be used to request and fill in netpage user and pen registration forms, to register a new user to which the new pen is automatically linked, or to add a new pen to an existing user.

The pen uses secret-key rather than public-key encryption because of hardware performance constraints in the pen.

3.4 Secure Documents

The netpage system supports the delivery of secure documents such as tickets and coupons. The netpage printer includes a facility to print watermarks, but will only do so on request from publishers who are suitably authorized. The publisher indicates its authority to print watermarks in its certificate, which the printer is able to authenticate.

The "watermark" printing process uses an alternative dither matrix in specified "watermark" regions of the page. Back-to-back pages contain mirror-image watermark regions which coincide when printed. The dither matrices used in odd and even pages' watermark regions are designed to produce an interference effect when the regions are viewed together, achieved by looking through the printed sheet.

The effect is similar to a watermark in that it is not visible when looking at only one side of the page, and is lost when the page is copied by normal means.

Pages of secure documents cannot be copied using the built-in netpage copy mechanism described in Section 1.9 above. This extends to copying netpages on netpage-aware photocopiers.

Secure documents are typically generated as part of e-commerce transactions. They can therefore include the user's photograph which was captured when the user registered biometric information with the netpage registration server, as described in Section 2.

When presented with a secure netpage document, the recipient can verify its authenticity by requesting its status in the usual way. The unique ID of a secure document is only valid for the lifetime of the document, and secure document IDs are allocated non-contiguously to prevent their prediction by opportunistic forgers. A secure document verification pen can be developed with built-in feedback on verification failure, to support easy point-of-presentation document verification.

Clearly neither the watermark nor the user's photograph are secure in a cryptographic sense. They simply provide a significant obstacle to casual forgery. Online document verification, particularly using a verification pen, provides an added level of security where it is needed, but is still not entirely immune to forgeries.

3.5 Non-Repudiation

In the netpage system, forms submitted by users are delivered reliably to forms handlers and are persistently archived on netpage page servers. It is therefore impossible for recipients to repudiate delivery.

E-commerce payments made through the system, as described in Section 4, are also impossible for the payee to repudiate.

4 Electronic Commerce Model 4.1 Secure Electronic Transaction (SET)

The netpage system uses the Secure Electronic Transaction (SET) system as one of its payment systems. SET, having been developed by MasterCard and Visa, is organized around payment cards, and this is reflected in the terminology. However, much of the system is independent of the type of accounts being used.

In SET, cardholders and merchants register with a certificate authority and are issued with certificates containing their public signature keys. The certificate authority verifies a cardholder's registration details with the card issuer as appropriate, and verifies a merchant's registration details with the acquirer as appropriate. Cardholders and merchants store their respective private signature keys securely on their computers. During the payment process, these certificates are used to mutually authenticate a merchant and cardholder, and to authenticate them both to the payment gateway.

SET has not yet been adopted widely, partly because cardholder maintenance of keys and certificates is considered burdensome. Interim solutions which maintain cardholder keys and certificates on a server and give the cardholder access via a password have met with some success.

4.2 SET Payments

In the netpage system the netpage registration server acts as a proxy for the netpage user (i.e. the cardholder) in SET payment transactions.

The netpage system uses biometrics to authenticate the user and authorize SET payments. Because the system is pen-based, the biometric used is the user's on-line signature, consisting of time-varying pen position and pressure. A fingerprint biometric can also be used by designing a fingerprint sensor into the pen, although at a higher cost. The type of biometric used only affects the capture of the biometric, not the authorization aspects of the system.

The first step to being able to make SET payments is to register the user's biometric with the netpage registration server. This is done in a controlled environment, for example a bank, where the biometric can be captured at the same time as the user's identity is verified. The biometric is captured and stored in the registration database, linked to the user's record. The user's photograph is also optionally captured and linked to the record. The SET cardholder registration process is completed, and the resulting private signature key and certificate are stored in the database. The user's payment card information is also stored, giving the netpage registration server enough information to act as the user's proxy in any SET payment transaction.

When the user eventually supplies the biometric to complete a payment, for example by signing a netpage order form, the printer securely transmits the order information, the pen ID and the biometric data to the netpage registration server. The server verifies the biometric with respect to the user identified by the pen ID, and from then on acts as the user's proxy in completing the SET payment transaction.

4.3 Micro-Payments

The netpage system includes a mechanism for micro-payments, to allow the user to be conveniently charged for printing low-cost documents on demand and for copying copyright documents, and possibly also to allow the user to be reimbursed for expenses incurred in printing advertising material. The latter depends on the level of subsidy already provided to the user.

When the user registers for e-commerce, a network account is established which aggregates micro-payments. The user receives a statement on a regular basis, and can settle any outstanding debit balance using the standard payment mechanism.

The network account can be extended to aggregate subscription fees for periodicals, which would also otherwise be presented to the user in the form of individual statements.

4.4 Transactions

When a user requests a netpage in a particular application context, the application is able to embed a user-specific transaction ID 55 in the page. Subsequent input through the page is tagged with the transaction ID, and the application is thereby able to establish an appropriate context for the user's input.

When input occurs through a page which is not user-specific, however, the application must use the user's unique identity to establish a context. A typical example involves adding items from a pre-printed catalog page to the user's virtual "shopping cart". To protect the user's privacy, however, the unique user ID 60 known to the netpage system is not divulged to applications. This is to prevent different application providers from easily correlating independently accumulated behavioral data.

Figure 24:
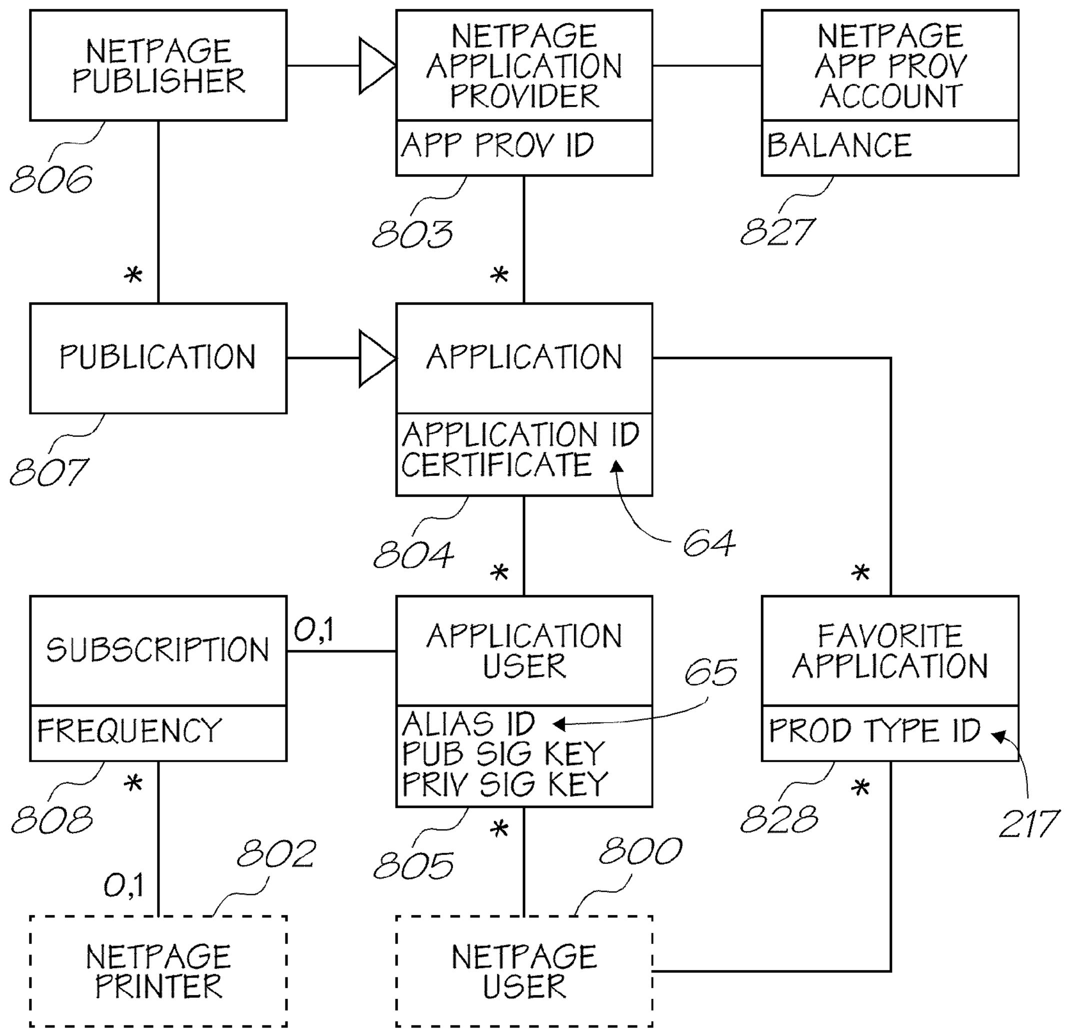
FIG. 24 is a schematic view of an application class diagram.

The netpage registration server instead maintains an anonymous relationship between a user and an application via a unique alias ID 65, as shown in FIG. 24. Whenever the user activates a hyperlink tagged with the "registered" attribute, the netpage page server asks the netpage registration server to translate the associated application ID 64, together with the pen ID 61, into an alias ID 65. The alias ID is then submitted to the hyperlink's application.

The application maintains state information indexed by alias ID, and is able to retrieve user-specific state information without knowledge of the global identity of the user.

The system also maintains an independent certificate and private signature key for each of a user's applications, to allow it to sign application transactions on behalf of the user using only application-specific information.

To assist the system in routing product bar code (e.g. UPC) and similar product-item-related "hyperlink" activations, the system records a favorite application on behalf of the user for any number of product types. For example, a user may nominate Amazon as their favorite bookseller, while a different user may nominate Barnes and Noble. When the first user requests book-related information, e.g. via a printed book review or via an actual book, they are provided with the information by Amazon.

Each application is associated with an application provider, and the system maintains an account on behalf of each application provider, to allow it to credit and debit the provider for click-through fees etc.

An application provider can be a publisher of periodical subscribed content. The system records the user's willingness to receive the subscribed publication, as well as the expected frequency of publication.

5 Communications Protocols

A communications protocol defines an ordered exchange of messages between entities. In the netpage system, entities such as pens, printers and servers utilise a set of defined protocols to cooperatively handle user interaction with the netpage system.

Each protocol is illustrated by way of a sequence diagram in which the horizontal dimension is used to represent message flow and the vertical dimension is used to represent time. Each entity is represented by a rectangle containing the name of the entity and a vertical column representing the lifeline of the entity. During the time an entity exists, the lifeline is shown as a dashed line. During the time an entity is active, the lifeline is shown as a double line. Because the protocols considered here do not create or destroy entities, lifelines are generally cut short as soon as an entity ceases to participate in a protocol.

5.1 Subscription Delivery Protocol

Figure 40:
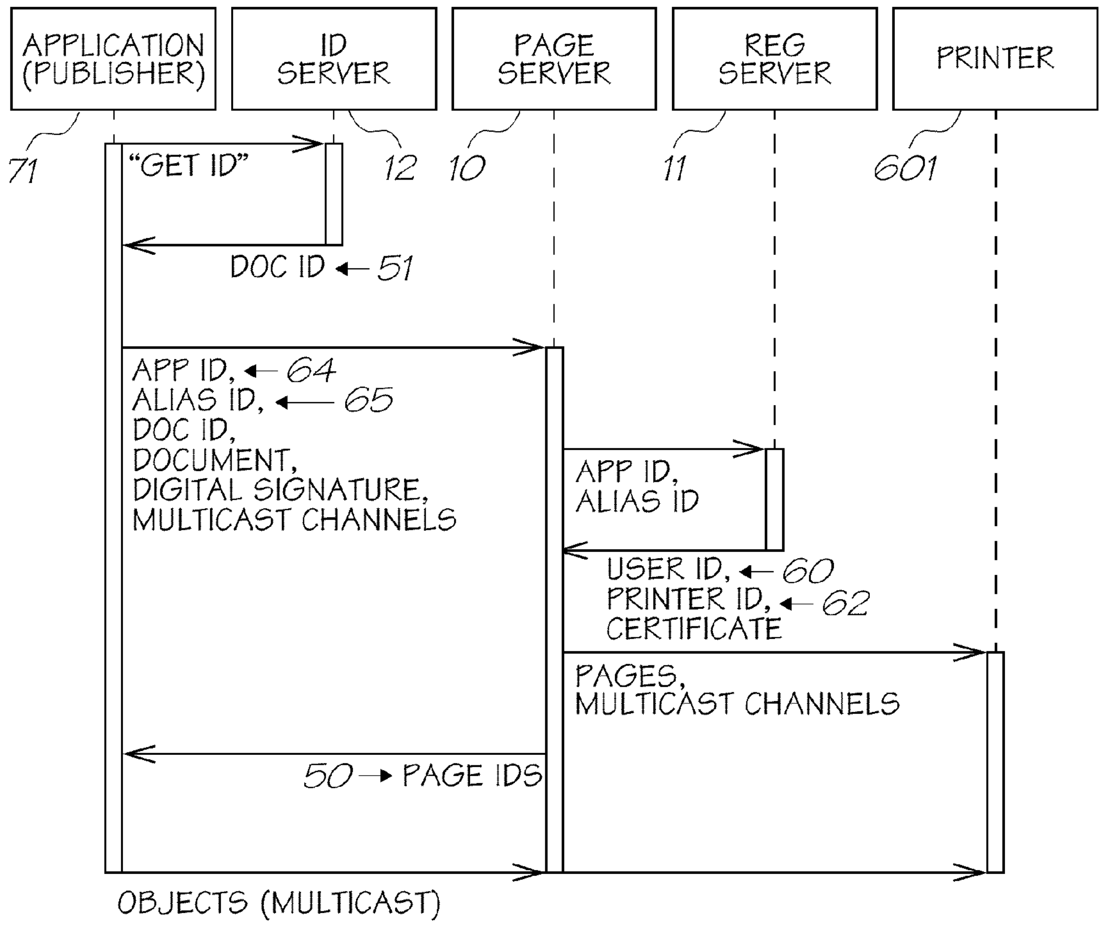
FIG. 40 is a schematic vie/w of a subscription delivery protocol.

A preferred embodiment of a subscription delivery protocol is shown in FIG. 40.

A large number of users may subscribe to a periodical publication. Each user's edition may be laid out differently, but many users' editions will share common content such as text objects and image objects. The subscription delivery protocol therefore delivers document structures to individual printers via pointcast, but delivers shared content objects via multicast.

The application (i.e. publisher) first obtains a document ID 51 for each document from an ID server 12. It then sends each document structure, including its document ID and page descriptions, to the page server 10 responsible for the document's newly allocated ID. It includes its own application ID 64, the subscriber's alias ID 65, and the relevant set of multicast channel names. It signs the message using its private signature key.

The page server uses the application ID and alias ID to obtain from the registration server the corresponding user ID 60, the user's selected printer ID 62 (which may be explicitly selected for the application, or may be the user's default printer), and the application's certificate.

The application's certificate allows the page server to verify the message signature. The page server's request to the registration server fails if the application ID and alias ID don't together identify a subscription 808.

The page server then allocates document and page instance IDs and forwards the page descriptions, including page IDs 50, to the printer. It includes the relevant set of multicast channel names for the printer to listen to.

It then returns the newly allocated page IDs to the application for future reference.

Once the application has distributed all of the document structures to the subscribers' selected printers via the relevant page servers, it multicasts the various subsets of the shared objects on the previously selected multicast channels. Both page servers and printers monitor the appropriate multicast channels and receive their required content objects. They are then able to populate the previously pointcast document structures. This allows the page servers to add complete documents to their databases, and it allows the printers to print the documents.

5.2 Hyperlink Activation Protocol

Figure 42:
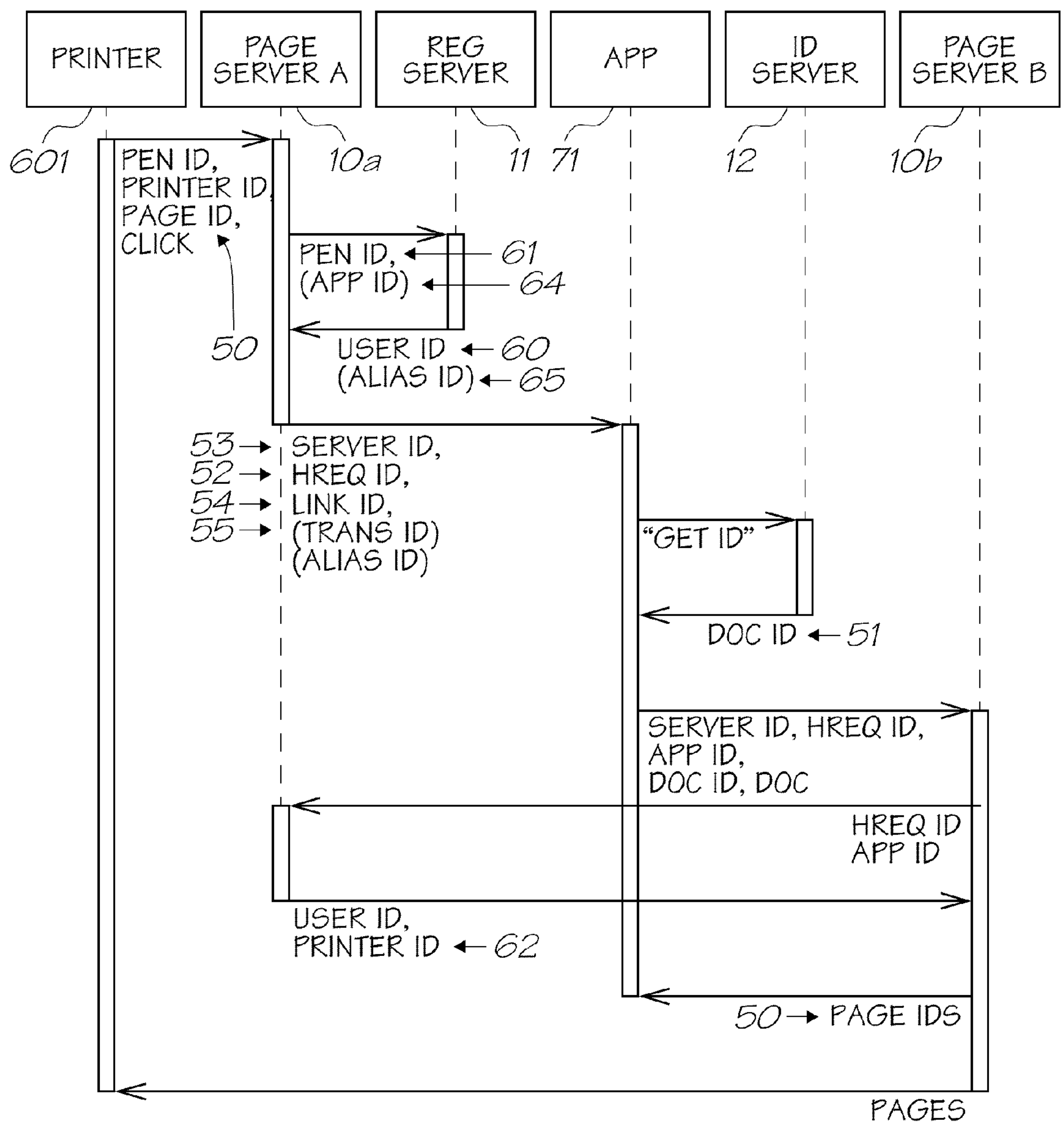
FIG. 42 is a schematic view of a hyperlink activation protocol.

A preferred embodiment of a hyperlink activation protocol is shown in FIG. 42.

When a user clicks on a netpage with a netpage pen, the pen communicates the click to the nearest netpage printer 601. The click identifies the page and a location on the page. The printer already knows the ID 61 of the pen from the pen connection protocol.

The printer determines, via the DNS, the network address of the page server 10*a* handling the particular page ID 50. The address may already be in its cache if the user has recently interacted with the same page. The printer then forwards the pen ID, its own printer ID 62, the page ID and click location to the page server.

The page server loads the page description 5 identified by the page ID and determines which input element's zone 58, if any, the click lies in. Assuming the relevant input element is a hyperlink element 844, the page server then obtains the associated application ID 64 and link ID 54, and determines, via the DNS, the network address of the application server hosting the application 71.

Figure 41:
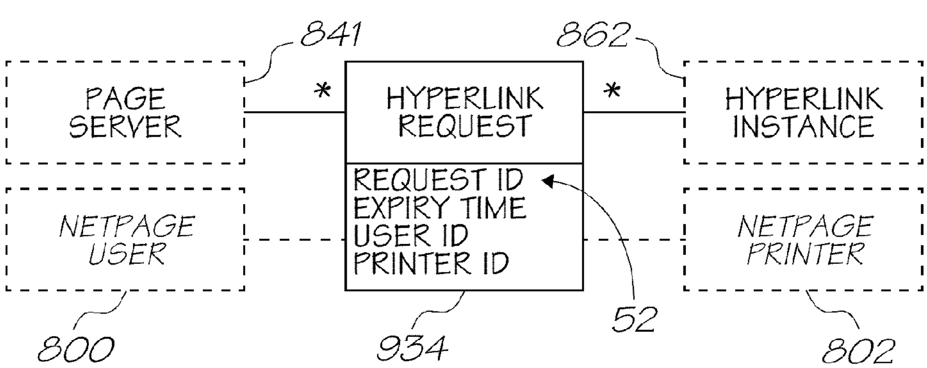
FIG. 41 is a schematic view of a hyperlink request class diagram.

The page server uses the pen ID 61 to obtain the corresponding user ID 60 from the registration server 11, and then allocates a globally unique hyperlink request ID 52 and builds a hyperlink request 934. The hyperlink request class diagram is shown in FIG. 41. The hyperlink request records the IDs of the requesting user and printer, and identifies the clicked hyperlink instance 862. The page server then sends its own server ID 53, the hyperlink request ID, and the link ID to the application.

The application produces a response document according to application-specific logic, and obtains a document ID 51 from an ID server 12. It then sends the document to the page server 10*b* responsible for the document's newly allocated ID, together with the requesting page server's ID and the hyperlink request ID.

The second page server sends the hyperlink request ID and application ID to the first page server to obtain the corresponding user ID and printer ID 62. The first page server rejects the request if the hyperlink request has expired or is for a different application.

The second page server allocates document instance and page IDs 50, returns the newly allocated page IDs to the application, adds the complete document to its own database, and finally sends the page descriptions to the requesting printer.

The hyperlink instance may include a meaningful transaction ID 55, in which case the first page server includes the transaction ID in the message sent to the application. This allows the application to establish a transaction-specific context for the hyperlink activation.

If the hyperlink requires a user alias, i.e. its "alias required" attribute is set, then the first page server sends both the pen ID 61 and the hyperlink's application ID 64 to the registration server 11 to obtain not just the user ID corresponding to the pen ID but also the alias ID 65 corresponding to the application ID and the user ID. It includes the alias ID in the message sent to the application, allowing the application to establish a user-specific context for the hyperlink activation.

5.3 Handwriting Recognition Protocol

When a user draws a stroke on a netpage with a netpage pen, the pen communicates the stroke to the nearest netpage printer. The stroke identifies the page and a path on the page.

The printer forwards the pen ID 61, its own printer ID 62, the page ID 50 and stroke path to the page server 10 in the usual way.

The page server loads the page description 5 identified by the page ID and determines which input element's zone 58, if any, the stroke intersects. Assuming the relevant input element is a text field 878, the page server appends the stroke to the text field's digital ink.

After a period of inactivity in the zone of the text field, the page server sends the pen ID and the pending strokes to the registration server 11 for interpretation. The registration server identifies the user corresponding to the pen, and uses the user's accumulated handwriting model 822 to interpret the strokes as handwritten text. Once it has converted the strokes to text, the registration server returns the text to the requesting page server. The page server appends the text to the text value of the text field.

5.4 Signature Verification Protocol

Assuming the input element whose zone the stroke intersects is a signature field 880, the page server 10 appends the stroke to the signature field's digital ink.

After a period of inactivity in the zone of the signature field, the page server sends the pen ID 61 and the pending strokes to the registration server 11 for verification. It also sends the application ID 64 associated with the form of which the signature field is part, as well as the form ID 56 and the current data content of the form. The registration server identifies the user corresponding to the pen, and uses the user's dynamic signature biometric 818 to verify the strokes as the user's signature. Once it has verified the signature, the registration server uses the application ID 64 and user ID 60 to identify the user's application-specific private signature key. It then uses the key to generate a digital signature of the form data, and returns the digital signature to the requesting page server. The page server assigns the digital signature to the signature field and sets the associated form's status to frozen.

The digital signature includes the alias ID 65 of the corresponding user. This allows a single form to capture multiple users' signatures.

5.5 Form Submission Protocol

Figure 43:
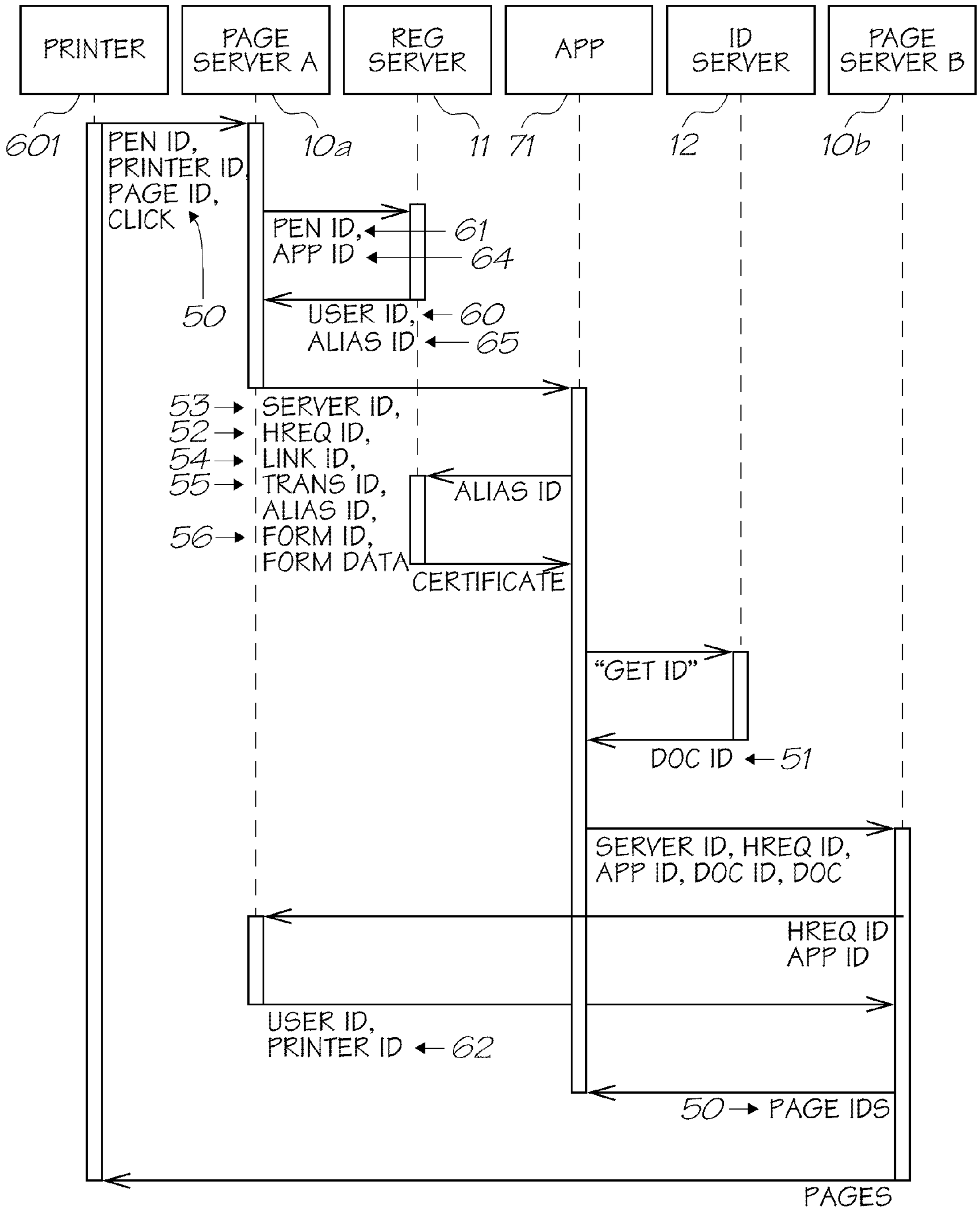
FIG. 43 is a schematic view of a form submission protocol.

A preferred embodiment of a form submission protocol is shown in FIG. 43.

Form submission occurs via a form hyperlink activation. It thus follows the protocol defined in Section 5.2, with some form-specific additions.

In the case of a form hyperlink, the hyperlink activation message sent by the page server 10 to the application 71 also contains the form ID 56 and the current data content of the form. If the form contains any signature fields, then the application verifies each one by extracting the alias ID 65 associated with the corresponding digital signature and obtaining the corresponding certificate from the registration server 11.

6 Netpage Pen Description 6.1 Pen Mechanics

Referring to FIGS. 8 and 9, the pen, generally designated by reference numeral 101, includes a housing 102 in the form of a plastics moulding having walls 103 defining an interior space 104 for mounting the pen components. The pen top 105 is in operation rotatably mounted at one end 106 of the housing 102. A semi-transparent cover 107 is secured to the opposite end 108 of the housing 102. The cover 107 is also of moulded plastics, and is formed from semi-transparent material in order to enable the user to view the status of the LED mounted within the housing 102. The cover 107 includes a main part 109 which substantially surrounds the end 108 of the housing 102 and a projecting portion 110 which projects back from the main part 109 and fits within a corresponding slot 111 formed in the walls 103 of the housing 102. A radio antenna 112 is mounted behind the projecting portion 110, within the housing 102. Screw threads 113 surrounding an aperture 113A on the cover 107 are arranged to receive a metal end piece 114, including corresponding screw threads 115. The metal end piece 114 is removable to enable ink cartridge replacement.

Also mounted within the cover 107 is a tri-color status LED 116 on a flex PCB 117. The antenna 112 is also mounted on the flex PCB 117. The status LED 116 is mounted at the top of the pen 101 for good all-around visibility.

The pen can operate both as a normal marking ink pen and as a non-marking stylus. An ink pen cartridge 118 with nib 119 and a stylus 120 with stylus nib 121 are mounted side by side within the housing 102. Either the ink cartridge nib 119 or the stylus nib 121 can be brought forward through open end 122 of the metal end piece 114, by rotation of the pen top 105. Respective slider blocks 123 and 124 are mounted to the ink cartridge 118 and stylus 120, respectively. A rotatable cam barrel 125 is secured to the pen top 105 in operation and arranged to rotate therewith. The cam barrel 125 includes a cam 126 in the form of a slot within the walls 181 of the cam barrel. Cam followers 127 and 128 projecting from slider blocks 123 and 124 fit within the cam slot 126. On rotation of the cam barrel 125, the slider blocks 123 or 124 move relative to each other to project either the pen nib 119 or stylus nib 121 out through the hole 122 in the metal end piece 114. The pen 101 has three states of operation. By turning the top 105 through 90° steps, the three states are:

stylus 120 nib 121 out ink cartridge 118 nib 119 out, and neither ink cartridge 118 nib 119 out nor stylus 120 nib 121 out A second flex PCB 129, is mounted on an electronics chassis 130 which sits within the housing 102. The second flex PCB 129 mounts an infrared LED 131 for providing infrared radiation for projection onto the surface. An image sensor 132 is provided mounted on the second flex PCB 129 for receiving reflected radiation from the surface. The second flex PCB 129 also mounts a radio frequency chip 133, which includes an RF transmitter and RF receiver, and a controller chip 134 for controlling operation of the pen 101. An optics block 135 (formed from moulded clear plastics) sits within the cover 107 and projects an infrared beam onto the surface and receives images onto the image sensor 132. Power supply wires 136 connect the components on the second flex PCB 129 to battery contacts 137 which are mounted within the cam barrel 125. A terminal 138 connects to the battery contacts 137 and the cam barrel 125. A three volt rechargeable battery 139 sits within the cam barrel 125 in contact with the battery contacts. An induction charging coil 140 is mounted about the second flex PCB 129 to enable recharging of the battery 139 via induction. The second flex PCB 129 also mounts an infrared LED 143 and infrared photodiode 144 for detecting displacement in the cam barrel 125 when either the stylus 120 or the ink cartridge 118 is used for writing, in order to enable a determination of the force being applied to the surface by the pen nib 119 or stylus nib 121. The IR photodiode 144 detects light from the IR LED 143 via reflectors (not shown) mounted on the slider blocks 123 and 124.

Rubber grip pads 141 and 142 are provided towards the end 108 of the housing 102 to assist gripping the pen 101, and top 105 also includes a clip 142 for clipping the pen 101 to a pocket.

6.2 Pen Controller

The pen 101 is arranged to determine the position of its nib (stylus nib 121 or ink cartridge nib 119) by imaging, in the infrared spectrum, an area of the surface in the vicinity of the nib. It records the location data from the nearest location tag, and is arranged to calculate the distance of the nib 121 or 119 from the location tab utilising optics 135 and controller chip 134. The controller chip 134 calculates the orientation of the pen and the nib-to-tag distance from the perspective distortion observed on the imaged tag.

Utilising the RF chip 133 and antenna 112 the pen 101 can transmit the digital ink data (which is encrypted for security and packaged for efficient transmission) to the computing system.

When the pen is in range of a receiver, the digital ink data is transmitted as it is formed. When the pen 101 moves out of range, digital ink data is buffered within the pen 101 (the pen 101 circuitry includes a buffer arranged to store digital ink data for approximately 12 minutes of the pen motion on the surface) and can be transmitted later.

The controller chip 134 is mounted on the second flex PCB 129 in the pen 101. FIG. 10 is a block diagram illustrating in more detail the architecture of the controller chip 134. FIG. 10 also shows representations of the RF chip 133, the image sensor 132, the tri-color status LED 116, the IR illumination LED 131, the IR force sensor LED 143, and the force sensor photodiode 144.

The pen controller chip 134 includes a controlling processor 145. Bus 146 enables the exchange of data between components of the controller chip 134. Flash memory 147 and a 512 KB DRAM 148 are also included. An analog-to-digital converter 149 is arranged to convert the analog signal from the force sensor photodiode 144 to a digital signal.

An image sensor interface 152 interfaces with the image sensor 132. A transceiver controller 153 and base band circuit 154 are also included to interface with the RF chip 133 which includes an RF circuit 155 and RF resonators and inductors 156 connected to the antenna 112.

The controlling processor 145 captures and decodes location data from tags from the surface via the image sensor 132, monitors the force sensor photodiode 144, controls the LEDs 116, 131 and 143, and handles short-range radio communication via the radio transceiver 153. It is a medium-performance (~40 MHz) general-purpose RISC processor.

The processor 145, digital transceiver components (transceiver controller 153 and baseband circuit 154), image sensor interface 152, flash memory 147 and 512 KB DRAM 148 are integrated in a single controller ASIC. Analog RF components (RF circuit 155 and RF resonators and inductors 156) are provided in the separate RF chip.

The image sensor is a CCD or CMOS image sensor. Depending on tagging scheme, it has a size ranging from about 100×100 pixels to 200×200 pixels. Many miniature CMOS image sensors are commercially available, including the National Semiconductor LM9630.

The controller ASIC 134 enters a quiescent state after a period of inactivity when the pen 101 is not in contact with a surface. It incorporates a dedicated circuit 150 which monitors the force sensor photodiode 144 and wakes up the controller 134 via the power manager 151 on a pen-down event.

The radio transceiver communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

In an alternative embodiment, the pen incorporates an Infrared Data Association (IrDA) interface for short-range communication with a base station or netpage printer.

In a further embodiment, the pen 101 includes a pair of orthogonal accelerometers mounted in the normal plane of the pen 101 axis. The accelerometers 190 are shown in FIGS. 9 and 10 in ghost outline.

The provision of the accelerometers enables this embodiment of the pen 101 to sense motion without reference to surface location tags, allowing the location tags to be sampled at a lower rate. Each location tag ID can then identify an object of interest rather than a position on the surface. For example, if the object is a user interface input element (e.g. a command button), then the tag ID of each location tag within the area of the input element can directly identify the input element.

The acceleration measured by the accelerometers in each of the x and y directions is integrated with respect to time to produce an instantaneous velocity and position.

Since the starting position of the stroke is not known, only relative positions within a stroke are calculated. Although position integration accumulates errors in the sensed acceleration, accelerometers typically have high resolution, and the time duration of a stroke, over which errors accumulate, is short.

7 Netpage Printer Description 7.1 Printer Mechanics

Figure 12A:
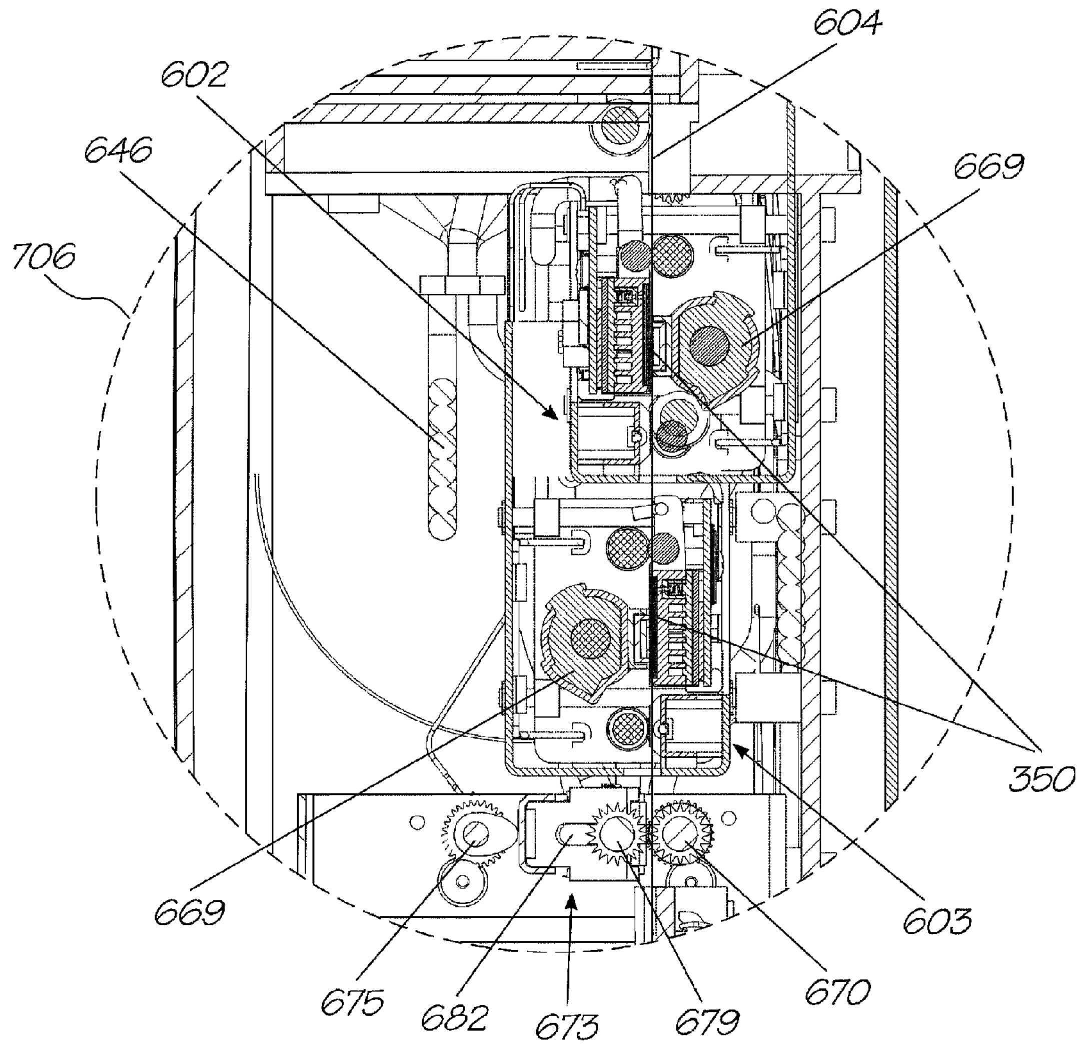
FIG. 12A is an enlarged portion of FIG. 12 showing a section of the duplexed print engines and glue wheel assembly.

The vertically-mounted netpage wallprinter 601 is shown fully assembled in FIG. 11. It prints netpages on Letter/A4 sized media using duplexed 8½" Memjet™ print engines 602 and 603, as shown in FIGS. 12 and 12*a*. It uses a straight paper path with the paper 604 passing through the duplexed print engines 602 and 603 which print both sides of a sheet simultaneously, in full color and with full bleed.

An integral binding assembly 605 applies a strip of glue along one edge of each printed sheet, allowing it to adhere to the previous sheet when pressed against it. This creates a final bound document 618 which can range in thickness from one sheet to several hundred sheets.

The replaceable ink cartridge 627, shown in FIG. 13 coupled with the duplexed print engines, has bladders or chambers for storing fixative, adhesive, and cyan, magenta, yellow, black and infrared inks. The cartridge also contains a micro air filter in a base molding. The micro air filter interfaces with an air pump 638 inside the printer via a hose 639. This provides filtered air to the printheads to prevent ingress of micro particles into the Memjet™ printheads 350 which might otherwise clog the printhead nozzles. By incorporating the air filter within the cartridge, the operational life of the filter is effectively linked to the life of the cartridge. The ink cartridge is a fully recyclable product with a capacity for printing and gluing 3000 pages (1500 sheets).

Referring to FIG. 12, the motorized media pick-up roller assembly 626 pushes the top sheet directly from the media tray past a paper sensor on the first print engine 602 into the duplexed Memjet™ printhead assembly. The two Memjet™ print engines 602 and 603 are mounted in an opposing in-line sequential configuration along the straight paper path. The paper 604 is drawn into the first print engine 602 by integral, powered pick-up rollers 626. The position and size of the paper 604 is sensed and full bleed printing commences. Fixative is printed simultaneously to aid drying in the shortest possible time.

The paper exits the first Memjet™ print engine 602 through a set of powered exit spike wheels (aligned along the straight paper path), which act against a rubberized roller. These spike wheels contact the 'wet' printed surface and continue to feed the sheet 604 into the second Memjet™ print engine 603.

Referring to FIGS. 12 and 12*a*, the paper 604 passes from the duplexed print engines 602 and 603 into the binder assembly 605. The printed page passes between a powered spike wheel axle 670 with a fibrous support roller and another movable axle with spike wheels and a momentary action glue wheel. The movable axle/glue assembly 673 is mounted to a metal support bracket and it is transported forward to interface with the powered axle 670 via gears by action of a camshaft. A separate motor powers this camshaft.

The glue wheel assembly 673 consists of a partially hollow axle 679 with a rotating coupling for the glue supply hose 641 from the ink cartridge 627. This axle 679 connects to a glue wheel, which absorbs adhesive by capillary action through radial holes. A molded housing 682 surrounds the glue wheel, with an opening at the front. Pivoting side moldings and sprung outer doors are attached to the metal bracket and hinge out sideways when the rest of the assembly 673 is thrust forward. This action exposes the glue wheel through the front of the molded housing 682. Tension springs close the assembly and effectively cap the glue wheel during periods of inactivity.

As the sheet 604 passes into the glue wheel assembly 673, adhesive is applied to one vertical edge on the front side (apart from the first sheet of a document) as it is transported down into the binding assembly 605.

7.2 Printer Controller Architecture

Figure 14:
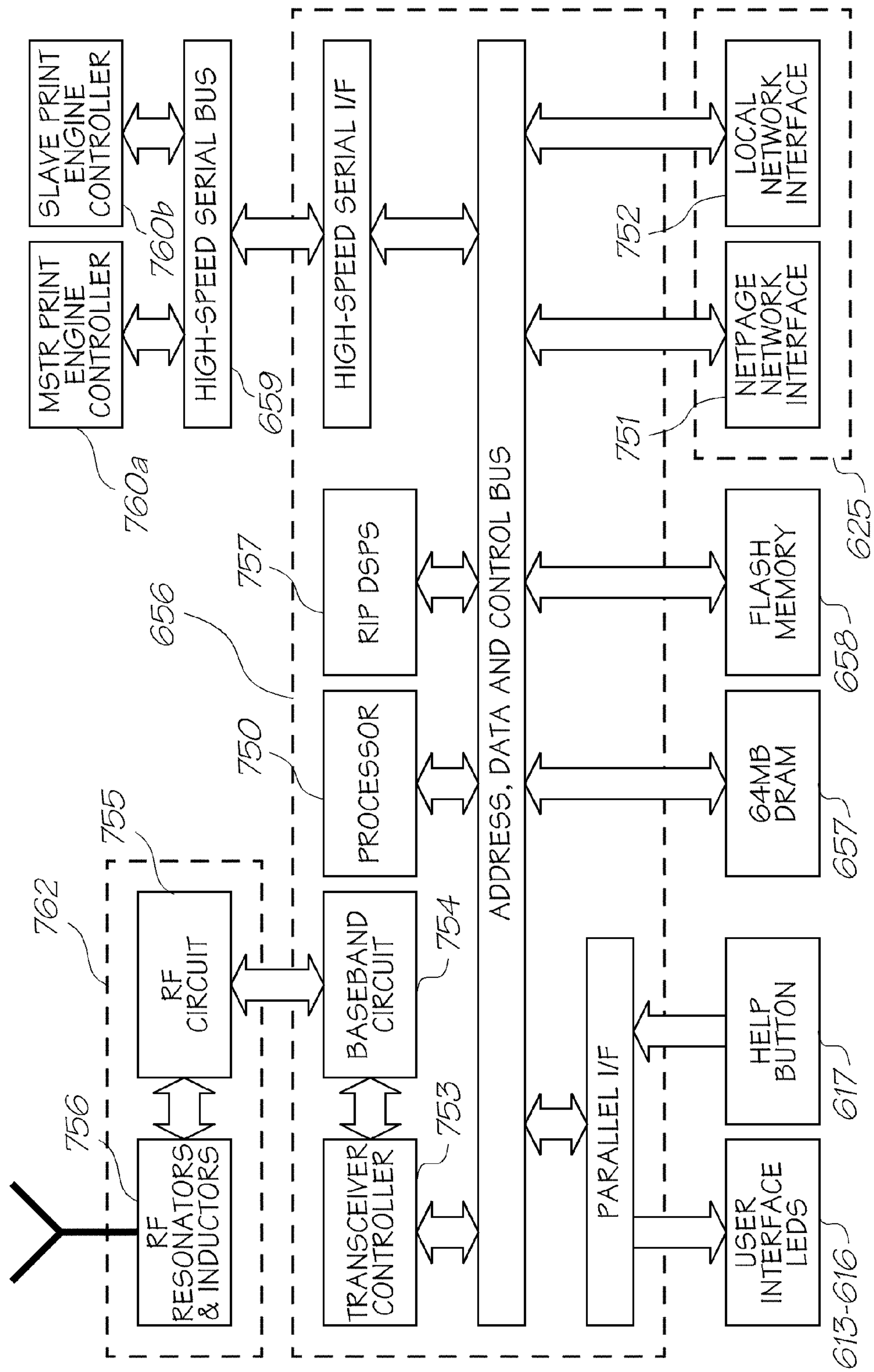
FIG. 14 is a schematic block diagram of a printer controller for the netpage printer shown in FIGS. 11 and 12.
Figure 15:
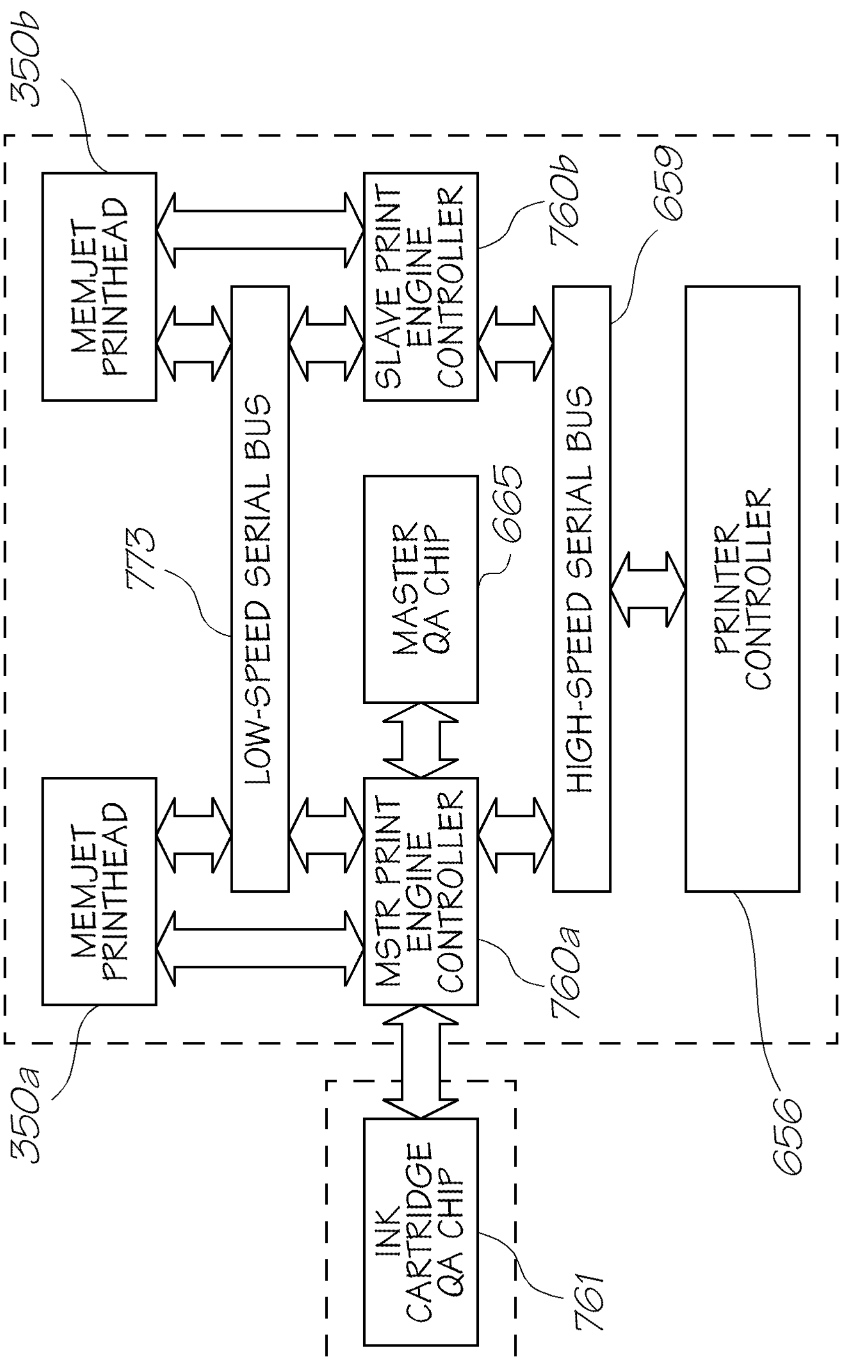
FIG. 15 is a schematic block diagram of duplexed print engine controllers and Memjet™ printheads associated with the printer controller shown in FIG. 14.
Figure 16:
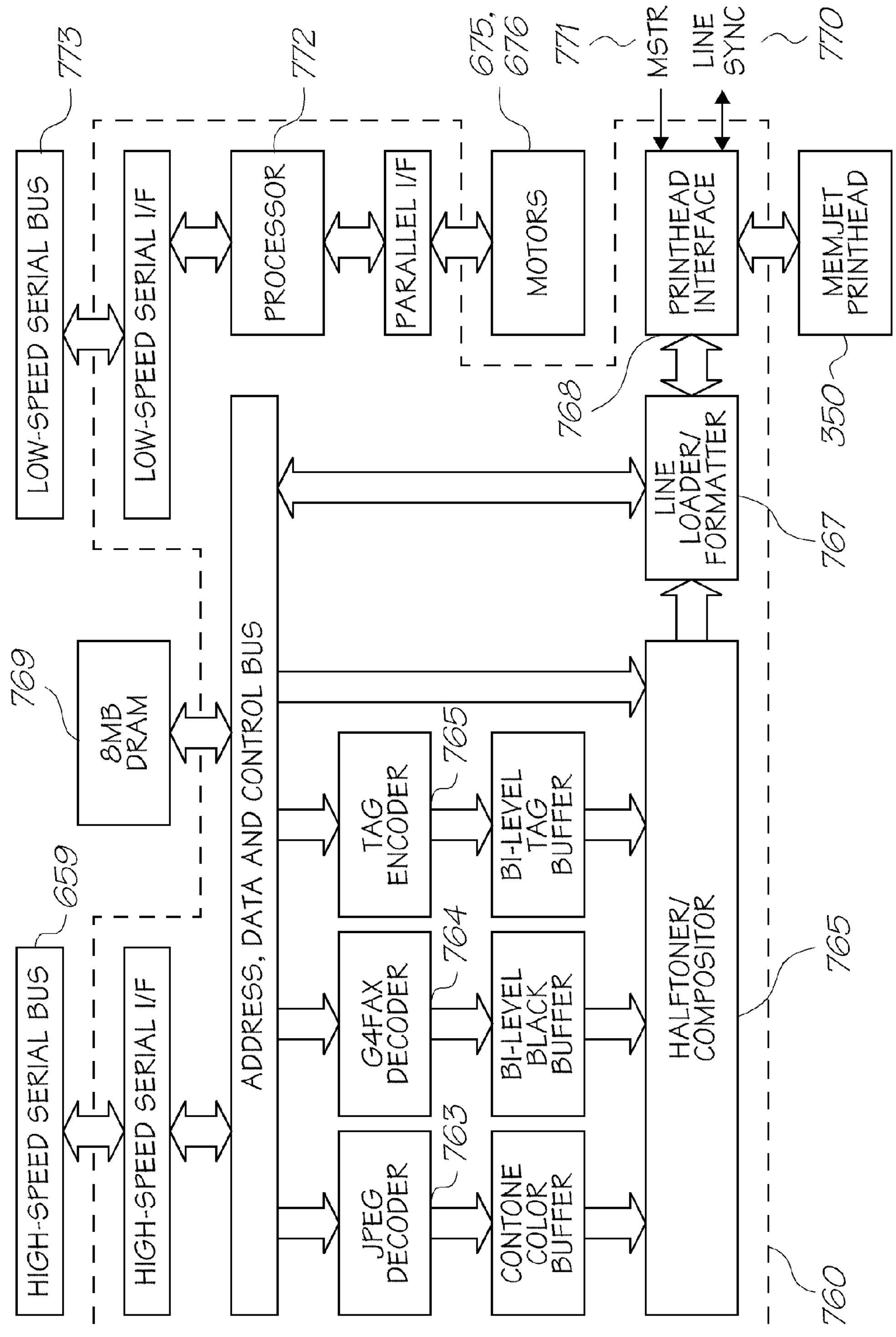
FIG. 16 is a schematic block diagram of the print engine controller shown in FIGS. 14 and 15.

The netpage printer controller consists of a controlling processor 750, a factory-installed or field-installed network interface module 625, a radio transceiver (transceiver controller 753, baseband circuit 754, RF circuit 755, and RF resonators and inductors 756), dual raster image processor (RIP) DSPs 757, duplexed print engine controllers 760*a* and 760*b*, flash memory 658, and 64 MB of DRAM 657, as illustrated in FIG. 14.

The controlling processor handles communication with the network 19 and with local wireless netpage pens 101, senses the help button 617, controls the user interface LEDs 613-616, and feeds and synchronizes the RIP DSPs 757 and print engine controllers 760. It consists of a medium-performance general-purpose microprocessor. The controlling processor 750 communicates with the print engine controllers 760 via a high-speed serial bus 659.

The RIP DSPs rasterize and compress page descriptions to the netpage printer's compressed page format. Each print engine controller expands, dithers and prints page images to its associated Memjet™ printhead 350 in real time (i.e. at over 30 pages per minute). The duplexed print engine controllers print both sides of a sheet simultaneously.

The master print engine controller 760*a* controls the paper transport and monitors ink usage in conjunction with the master QA chip 665 and the ink cartridge QA chip 761.

The printer controller's flash memory 658 holds the software for both the processor 750 and the DSPs 757, as well as configuration data. This is copied to main memory 657 at boot time.

The processor 750, DSPs 757, and digital transceiver components (transceiver controller 753 and baseband circuit 754) are integrated in a single controller ASIC 656. Analog RF components (RF circuit 755 and RF resonators and inductors 756) are provided in a separate RF chip 762. The network interface module 625 is separate, since netpage printers allow the network connection to be factory-selected or field-selected. Flash memory 658 and the 2×256 Mbit (64 MB) DRAM 657 is also off-chip. The print engine controllers 760 are provided in separate ASICs.

A variety of network interface modules 625 are provided, each providing a netpage network interface 751 and optionally a local computer or network interface 752. Netpage network Internet interfaces include POTS modems, Hybrid Fiber-Coax (HFC) cable modems, ISDN modems, DSL modems, satellite transceivers, current and next-generation cellular telephone transceivers, and wireless local loop (WLL) transceivers. Local interfaces include IEEE 1284 (parallel port), 10Base-T and 100Base-T Ethernet, USB and USB 2.0, IEEE 1394 (Firewire), and various emerging home networking interfaces. If an Internet connection is available on the local network, then the local network interface can be used as the netpage network interface.

The radio transceiver 753 communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

The printer controller optionally incorporates an Infrared Data Association (IrDA) interface for receiving data "squirted" from devices such as netpage cameras. In an alternative embodiment, the printer uses the IrDA interface for short-range communication with suitably configured netpage pens.

7.2.1 Rasterization and Printing

Once the main processor 750 has received and verified the document's page layouts and page objects, it runs the appropriate RIP software on the DSPs 757.

The DSPs 757 rasterize each page description and compress the rasterized page image. The main processor stores each compressed page image in memory. The simplest way to load-balance multiple DSPs is to let each DSP rasterize a separate page. The DSPs can always be kept busy since an arbitrary number of rasterized pages can, in general, be stored in memory. This strategy only leads to potentially poor DSP utilization when rasterizing short documents.

Watermark regions in the page description are rasterized to a contone-resolution bi-level bitmap which is losslessly compressed to negligible size and which forms part of the compressed page image.

The infrared (IR) layer of the printed page contains coded netpage tags at a density of about six per inch. Each tag encodes the page ID, tag ID, and control bits, and the data content of each tag is generated during rasterization and stored in the compressed page image.

The main processor 750 passes back-to-back page images to the duplexed print engine controllers 760. Each print engine controller 760 stores the compressed page image in its local memory, and starts the page expansion and printing pipeline. Page expansion and printing is pipelined because it is impractical to store an entire 114 MB bi-level CMYK+IR page image in memory.

7.2.2 Print Engine Controller

The page expansion and printing pipeline of the print engine controller 760 consists of a high speed IEEE 1394 serial interface 659, a standard JPEG decoder 763, a standard Group 4 Fax decoder 764, a custom halftoner/compositor unit 765, a custom tag encoder 766, a line loader/formatter unit 767, and a custom interface 768 to the Memjet™ printhead 350.

The print engine controller 360 operates in a double buffered manner. While one page is loaded into DRAM 769 via the high speed serial interface 659, the previously loaded page is read from DRAM 769 and passed through the print engine controller pipeline. Once the page has finished printing, the page just loaded is printed while another page is loaded.

The first stage of the pipeline expands (at 763) the JPEG-compressed contone CMYK layer, expands (at 764) the Group 4 Fax-compressed bi-level black layer, and renders (at 766) the bi-level netpage tag layer according to the tag format defined in section 1.2, all in parallel. The second stage dithers (at 765) the contone CMYK layer and composites (at 765) the bi-level black layer over the resulting bi-level CMYK layer. The resultant bi-level CMYK+IR dot data is buffered and formatted (at 767) for printing on the Memjet™ printhead 350 via a set of line buffers. Most of these line buffers are stored in the off-chip DRAM. The final stage prints the six channels of bi-level dot data (including fixative) to the Memjet™ printhead 350 via the printhead interface 768.

When several print engine controllers 760 are used in unison, such as in a duplexed configuration, they are synchronized via a shared line sync signal 770. Only one print engine 760, selected via the external master/slave pin 771, generates the line sync signal 770 onto the shared line.

The print engine controller 760 contains a low-speed processor 772 for synchronizing the page expansion and rendering pipeline, configuring the printhead 350 via a low-speed serial bus 773, and controlling the stepper motors 675, 676.

In the 8½" versions of the netpage printer, the two print engines each prints 30 Letter pages per minute along the long dimension of the page (11"), giving a line rate of 8.8 kHz at 1600 dpi. In the 12" versions of the netpage printer, the two print engines each prints 45 Letter pages per minute along the short dimension of the page (8½"), giving a line rate of 10.2 kHz. These line rates are well within the operating frequency of the Memjet™ printhead, which in the current design exceeds 30 kHz.

8 Product Tagging

Automatic identification refers to the use of technologies such as bar codes, magnetic stripe cards, smartcards, and RF transponders, to (semi-)automatically identify objects to data processing systems without manual keying. Existing systems typically utilise RFID tags or two-dimensional bar codes as discussed above.

However, significant problems exist with such systems and it is therefore proposed to provide tags utilising the netpage tagging system, herein after referred to as Hyperlabel™ tagging.

8.1 Hyperlabel Tagging in the Supply Chain

Using an invisible (e.g. infrared) tagging scheme such as the netpage tagging scheme described above to uniquely identify a product item has the significant advantage that it allows the entire surface of a product to be tagged, or a significant portion thereof, without impinging on the graphic design of the product's packaging or labelling. If the entire product surface is tagged, then the orientation of the product doesn't affect its ability to be scanned, i.e. a significant part of the line-of-sight disadvantage of a visible bar code is eliminated. Furthermore, since the tags are small and massively replicated, label damage no longer prevents scanning.

Hyperlabel tagging, then, consists of covering a large proportion of the surface of a product item with optically-readable invisible tags. When the tags utilise reflection or absorption in the infrared spectrum they are also referred to as infrared identification (IRID) tags. Each Hyperlabel tag uniquely identifies the product item on which it appears. The Hyperlabel tag may directly encode the product code (e.g. EPC) of the item, or may encode a surrogate ID which in turn identifies the product code via a database lookup. Each Hyperlabel tag also optionally identifies its own position on the surface of the product item, to provide the downstream consumer benefits of netpage interactivity described earlier.

Hyperlabel tags are applied during product manufacture and/or packaging using digital printers. These may be add-on infrared printers which print the Hyperlabel tags after the text and graphics have been printed by other means, or integrated color and infrared printers which print the Hyperlabel tags, text and graphics simultaneously. Digitally-printed text and graphics may include everything on the label or packaging, or may consist only of the variable portions, with other portions still printed by other means.

The economic case for IRID Hyperlabel tagging is discussed in more detail below.

8.2 Hyperlabel Tagging

Figure 18:
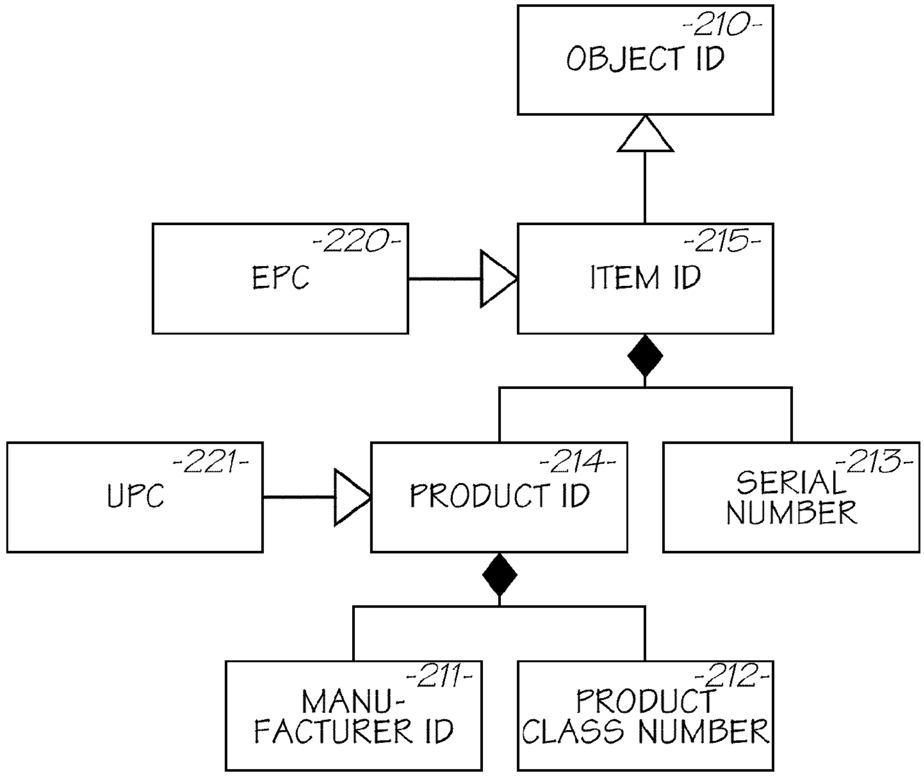
FIG. 18 is a schematic view of the structure of an item ID.

As shown in FIG. 18, a product's unique item ID 215 may be seen as a special kind of unique object ID 210. The Electronic Product Code (EPC) 220 is one emerging standard for an item ID. An item ID typically consists of a product ID 214 and a serial number 213. The product ID identifies a class of product, while the serial number identifies a particular instance of that class, i.e. an individual product item. The product ID in turn typically consists of a manufacturer number 211 and a product class number 212. The best-known product ID is the EAN.UCC Universal Product Code (UPC) 221 and its variants.

Figure 19:
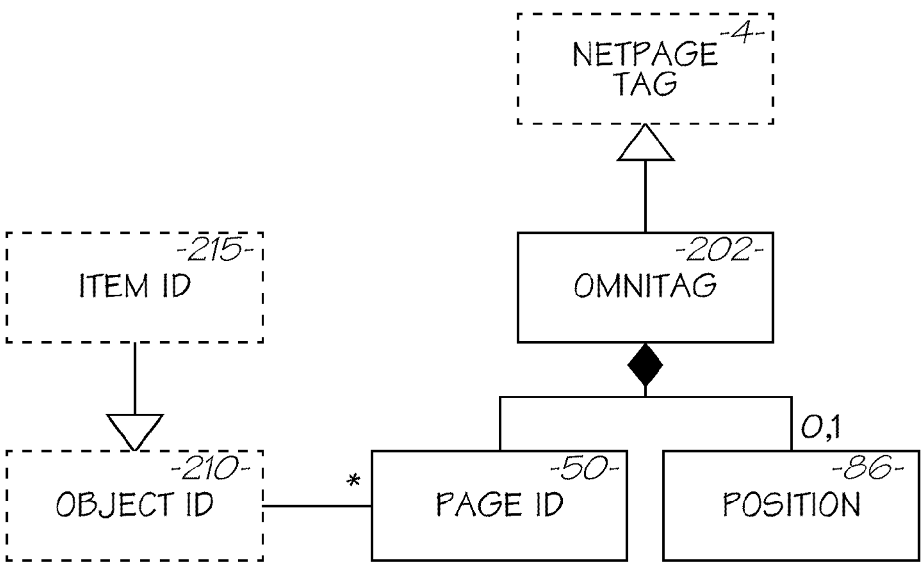
FIG. 19 is a schematic view of the structure of a Hyperlabel tag.

As shown in FIG. 19, a Hyperlabel tag 202 encodes a page ID (or region ID) 50 and a two-dimensional (2D) position 86. The region ID identifies the surface region containing the tag, and the position identifies the tag's position within the two-dimensional region. Since the surface in question is the surface of a physical product item 201, it is useful to define a one-to-one mapping between the region ID and the unique object ID 210, and more specifically the item ID 215, of the product item. Note, however, that the mapping can be many-to-one without compromising the utility of the Hyperlabel tag. For example, each panel of a product item's packaging could have a different region ID 50. Conversely, the Hyperlabel tag may directly encode the item ID, in which case the region ID contains the item ID, suitably prefixed to decouple item ID allocation from general netpage region ID allocation. Note that the region ID uniquely distinguishes the corresponding surface region from all other surface regions identified within the global netpage system. Directly encoding the item ID 215 in the region ID 50 is preferred, since it allows the item ID to be obtained directly from the Hyperlabel tag without additional lookup, thus facilitating more seamless integration with inventory systems and the like.

The item ID 215 is preferably the EPC 220 proposed by the Auto-ID Center, since this provides direct compatibility between Hyperlabel tags and EPC-carrying RFID tags.

In FIG. 19 the position 86 is shown as optional. This is to indicate that much of the utility of the Hyperlabel tag in the supply chain derives from the region ID 50, and the position may be omitted if not desired for a particular product.

For interoperability with the netpage system, a Hyperlabel tag 202 is a netpage tag 4, i.e. it has the logical structure, physical layout and semantics of a netpage tag.

In one example, when a netpage sensing device such as the netpage pen 101 images and decodes a Hyperlabel tag, it uses the position and orientation of the tag in its field of view to compute its own position relative to the tag, and it combines this with the position encoded in the tag, to compute its own position relative to the region containing the tag. As the sensing device is moved relative to a Hyperlabel tagged surface region, it is thereby able to track its own motion relative to the region and generate a set of timestamped position samples representative of its time-varying path. When the sensing device is a pen, then the path consists of a sequence of strokes, with each stroke starting when the pen makes contact with the surface, and ending when the pen breaks contact with the surface.

When a stroke is forwarded to the page server 10 responsible for the region ID, the server retrieves a description of the region keyed by region ID, and interprets the stroke in relation to the description. For example, if the description includes a hyperlink and the stroke intersects the zone of the hyperlink, then the server may interpret the stroke as a designation of the hyperlink and activate the hyperlink.

8.2.1 Item ID Management

As previously described, a structured item ID 215 typically has a three-level encoding, consisting of a manufacturer number 211, a product class number 212, and a serial number 213. In the EPC the manufacturer number corresponds to the manager ID. Manufacturer numbers are assigned to particular manufacturers 235 by a governing body such as EAN, EPC-global (UCC). Within the scope of each manufacturer number the manufacturer 235 assigns product class numbers to particular product classes 236, and within the scope of each product class number the manufacturer assigns serial numbers to individual product items 237. Each assignor in the assignment hierarchy ensures that each component of the item ID is assigned uniquely, with the end result that an item ID uniquely identifies a single product item. Each assigned item ID component is robustly recorded to ensure unique assignment, and subsequently becomes a database key to details about the corresponding manufacturer, product or item. At the product level this information may include the product's description, dimensions, weight and price, while at the item level it may include the item's expiry date and place of manufacture.

Figure 20:
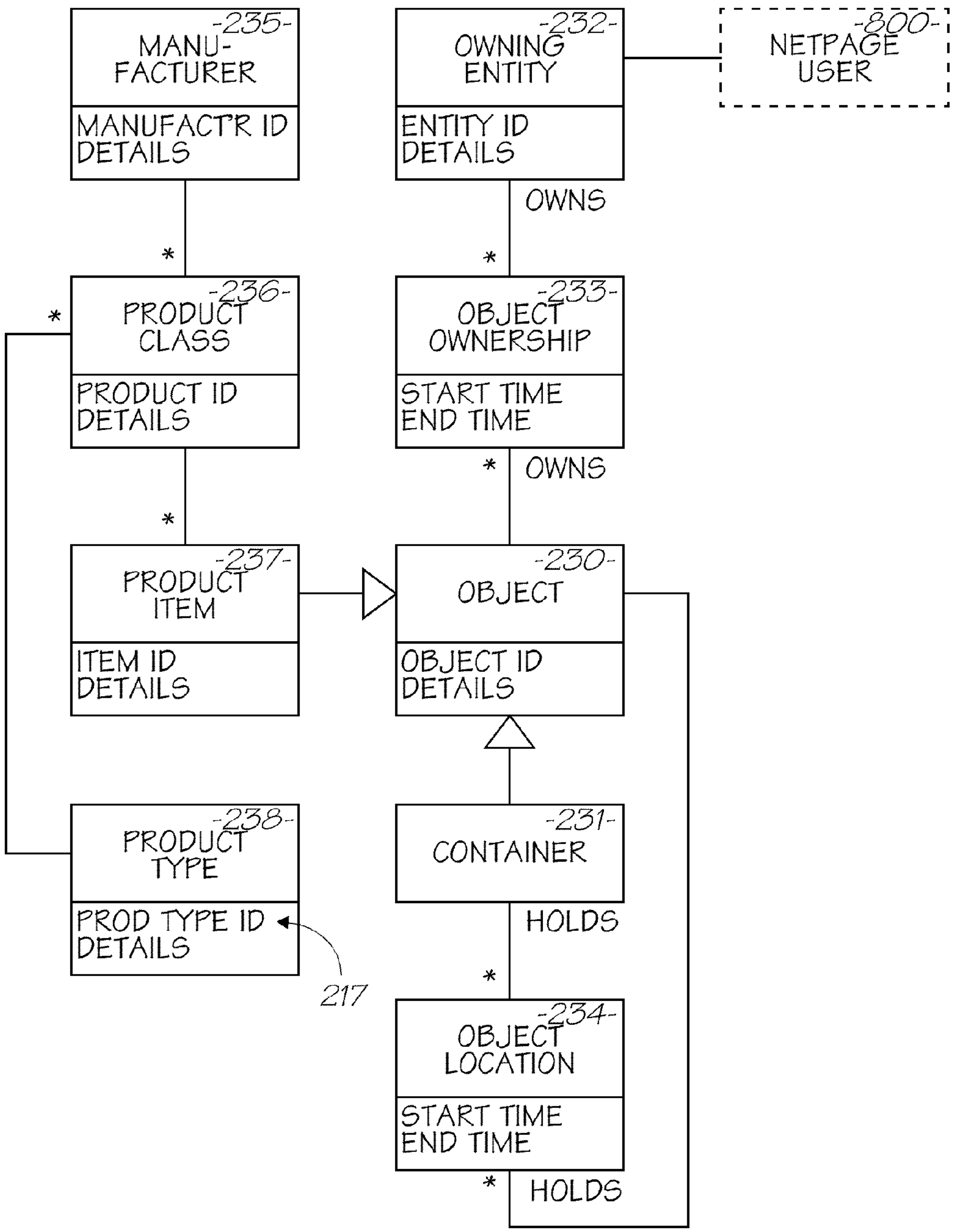
FIG. 20 is a schematic view of a product item and object ownership and packaging hierarchy class diagram.
Figure 21:
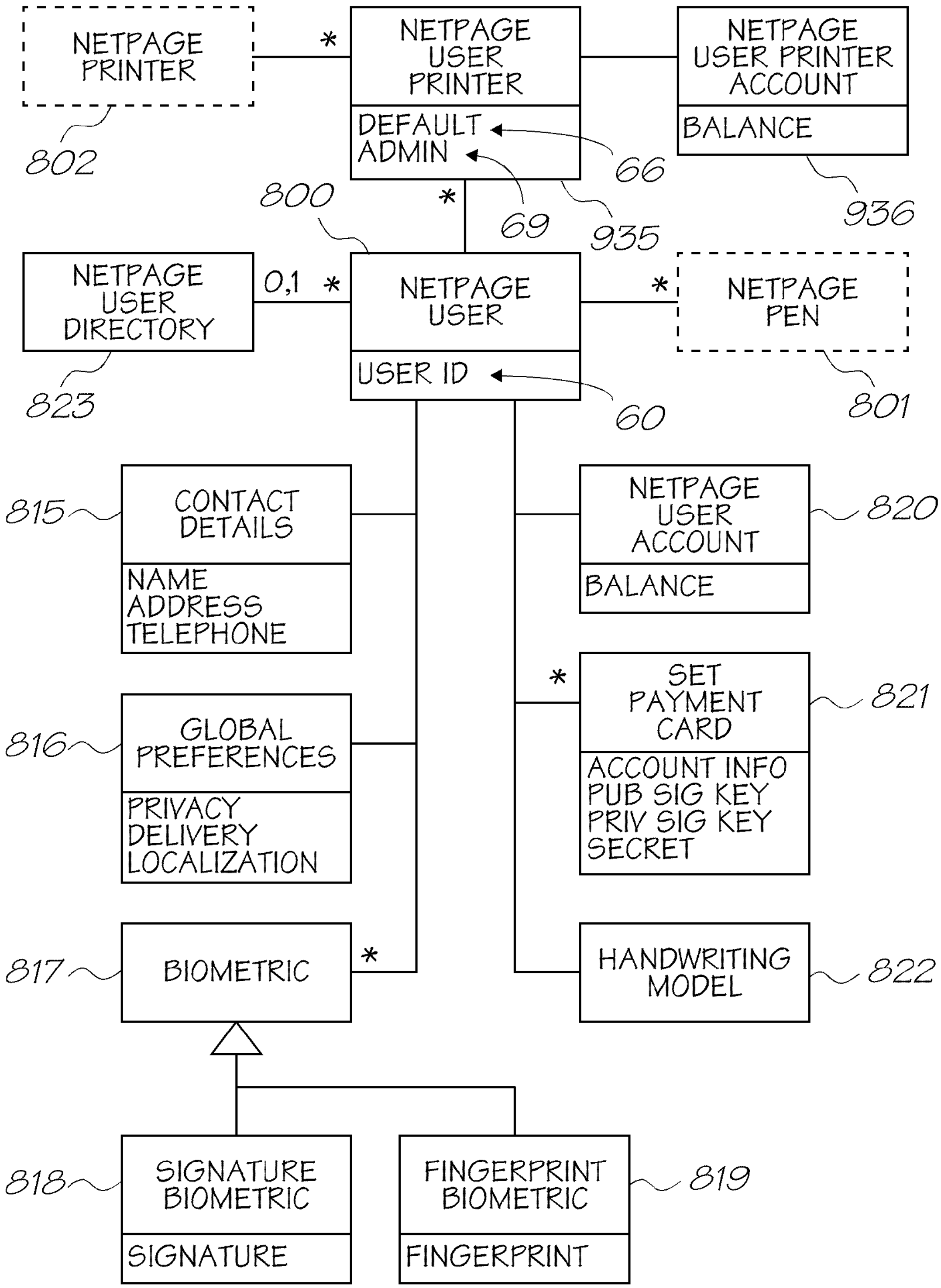
FIG. 21 is a schematic view of a user class diagram.

As shown in FIG. 20, a collection of related product classes may be recorded as a single product type 238, identified by a unique product type ID 217. This provides the basis for mapping a scanned or otherwise obtained product ID 214 (or the product ID portion of a scanned or otherwise obtained item ID 215) to a product type 238. This in turn allows a favorite application 828 for that product type to be identified for a particular netpage user 800, as shown in FIG. 24.

As a product item moves through the supply chain, status information is ideally maintained in a globally accessible database, keyed by the item ID. This information may include the item's dynamic position in the packaging, shipping and transportation hierarchy, its location on a store shelf, and ultimately the date and time of its sale and the recipient of that sale. In a packaging, shipping and transportation hierarchy, higher level units such as cases, pallets, shipping containers and trucks all have their own item IDs, and this provides the basis for recording the dynamic hierarchy in which the end product item participates. Note that the concept of an item also extends to a sub-component of an assembly or a component or element of a saleable product.

FIG. 20 shows the product description hierarchy corresponding to the structure of the item ID; the product item's dynamic participation in a dynamic packaging, shipping and transportation hierarchy; and the product item's dynamic ownership. As the figure shows, a container 231 (e.g. case, pallet, shipping container, or truck) is a special case of an uniquely identified object 230. The fact that the container is holding, or has held, a particular object for the duration of some time interval is represented by the time-stamped object location 234, wherein the end time remains unspecified until the container ceases to hold the item. The object-container relationship is recursive, allowing it to represent an arbitrary dynamic hierarchy. Clearly this representation can be expanded to record the time-varying relative or absolute geographic location of an object.

The fact that an entity 232 owns, or has owned, a particular object for the duration of some time interval is represented by the time-stamped object ownership 233, wherein the end time remains unspecified until the entity ceases to own the item. The owning entity 232 may represent a netpage user 800, e.g. when a netpage user purchases a product item and the sale is recorded, or some other supply chain participant such as a manufacturer, distributor or retailer.

Figure 56:
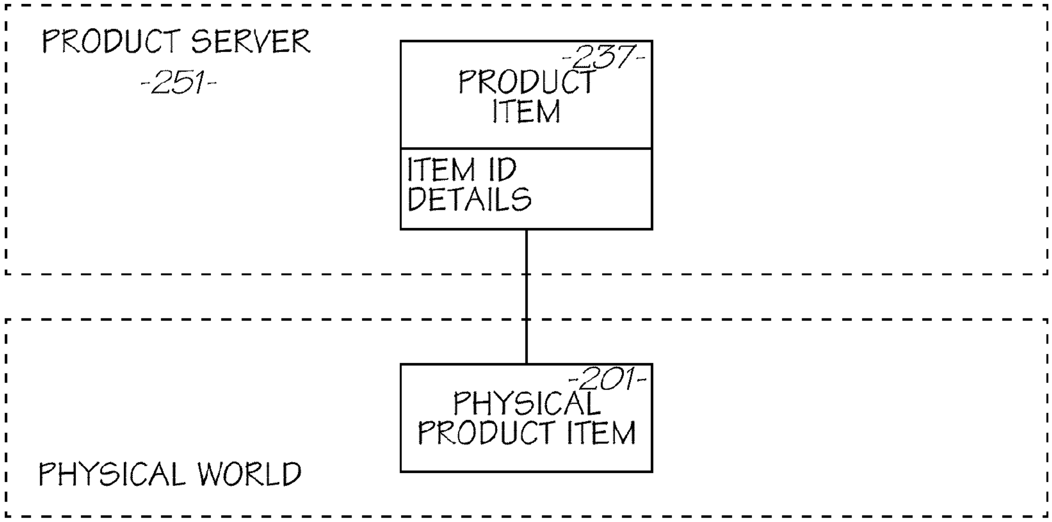
FIG. 56 is a schematic view of a physical product item and its online description.

As shown in FIG. 56, a physical product item 201 is recorded as a product item 237 by a product server 251. A product item may be recorded in multiple product servers, managed by different participants in the supply chain such as manufacturers, distributors and retailers. However, benefits accrue from providing a unified view of a product item, even if the unified view is provided virtually.

To foster interoperability between different supply chain participants and between disparate systems which may want to query and update both static and dynamic item information, such information interchanges are ideally performed using a standard representation. The MIT Auto-ID Center's Physical Markup Language (PML) is an example of a standard representation designed for this purpose. For a detailed description of PML, refer to Brock, D. L. et al., *The Physical Markup Language*, MIT Auto-ID Center (June 2001), the contents of which are herein incorporated by cross-reference.

The Auto-ID Centre has proposed a distributed architecture wherein a relevant supply chain participants are notified of product movements in an event-driven manner.

In general there is a single public source of information about an item identified by an item ID, and there is a mechanism which resolves an item ID into the network address of a corresponding server. In the case of an EPC, the ONS resolver rewrites the EPC into the domain name of the product server, and then uses the Domain Name System (DNS) to resolve the domain name into the address of the product server. The DNS allows a domain name to resolve to a list of addresses, providing a basis for both load balancing and fault tolerance. DNS lookups are made efficient by caching of results.

8.2.2 EPC-Driven Supply Chain Example

In a supply chain driven by EPC scan data, legacy database systems will typically be enhanced to support the description and tracking of EPC-tagged containers and product items. Some scan events result in message flow between systems, while other scan events result in purely local database updates.

The EPC administrator (EPCglobal) allocates an EPC manager number to the manufacturer for the exclusive use of a manufacturer. The manufacturer in turn allocates an object class number to each of its products. When the manufacturer produces a batch of a particular product, it allocates each product item a unique serial number within the corresponding object class, and encodes the entire EPC in the Hyperlabel tags printed on the product item's label or packaging. As the manufacturer aggregates individual product items into cases and higher-level containers, its manufacturing and shipping systems record the container hierarchy. This allows the contents of a container to be tracked by simply tracking the container.

When a retailer receives a case, it is scanned into inventory at the receiving dock. The scan event triggers the retailer's inventory system to retrieve a description of the case content from the manufacturer. The inventory system uses the case EPC to first identify, via the ONS, the server responsible for serving information about that EPC. It then contacts that server to identify the contents of the case, and iterates the entire process for the case content, down to the item level. In order to satisfy the inventory system's queries, the manufacturer's server extracts information from the manufacturer's private databases and translates this information into standard PML.

When an item is sold, the point-of-sale EPC scan event triggers the inventory system to record the item as sold, and may also trigger the system to notify the item's manufacturer of the circumstances of the sale. This can provide the manufacturer with timely information about the effect of a promotional campaign, particularly when the campaign is lot-specific and involves campaign-specific product graphics. Again the EPC lookup uses the ONS, but this time the inventory system transmits the sale event information to the manufacturer's server as PML.

The EPC-driven architecture of the integrated supply chain is independent of whether EPC scan data originates from Hyperlabel scanners, RFID readers, or a mixture of both.

8.2.3 Region ID Management

An unstructured identifier such as the region ID (page ID) may be assigned on demand through a multi-level assignment hierarchy with a single root node. Lower-level assignors obtain blocks of IDs from higher-level assignors on demand. Unlike with structured ID assignment, these blocks correspond to arbitrary ranges (or even sets) of IDs, rather than to IDs with fixed prefixes. Again, each assignor in the assignment hierarchy ensures that blocks of IDs and individual IDs are assigned uniquely. The region ID subsequently becomes a database key to information about the region. In the Netpage system, this information includes a full description of the graphical and interactive elements which appear in the region. Graphical elements include such things as text flows, text and images. Interactive elements include such things as buttons, hyperlinks, checkboxes, drawing fields, text fields and signature fields.

8.2.4 Product Interface Document Management

In the netpage system, the graphic and interactive elements of a netpage are described by a document 836, as illustrated in FIG. 25. A product manufacturer therefore defines the graphic and interactive elements of a Hyperlabel tagged product item by publishing a corresponding interface document to the netpage system in much the usual way (i.e. as described earlier). The manufacturing application (i.e. publisher) first obtains a document ID 51 for the interface document from an ID server 12. It then sends the document structure, including its document ID and page descriptions, to the page server 10 responsible for the document's newly allocated ID.

Even if the graphic elements of a product label are printed by traditional non-digital means (e.g. offset or flexographic), it is still beneficial to include the graphic elements in the netpage document 836, since this facilitates logical operations on otherwise passive label content, such as copy and paste, and searching on a combination of label content and annotations.

As described earlier, the preferred form of the region ID 50 of a Hyperlabel tag 202 contains the corresponding item ID 215. When the manufacturer allocates an item ID to a product item at time of manufacture, the item ID is registered as a page ID with the page server responsible for the corresponding document 836. The page server records the page ID as part of a page instance 830. The item ID is also registered as a page ID with a netpage ID server to facilitate subsequent lookup of the corresponding page server.

The document 836 typically describes the label or packaging of a class 236 of product items. Publication of the document, down to the level of the formatted document 834, may therefore be decoupled from the printing of individual product item labels. However, since the item ID 215 is structured, the ID server and page server may also record a partial page ID based on an item ID 215 with a unspecified serial number 213 (i.e. a product ID 214). When a netpage user interacts with an individual product item, the relay function identifies the corresponding page server via the ID server based purely on the product item's product ID. If no page instance 830 exists which corresponds to the full item ID (i.e. page ID) then the page server creates a page instance against which to record the interaction.

To address the situation where the label or packaging of a product class 236 changes over time, the ID server may record a range of item IDs against a document ID (e.g. in the form of a product ID and a range of serial numbers). The manufacturer may leave the end of the range unspecified until a label or packaging change actually occurs.

An individual item ID is already recorded by the product server 237 which manages the product item. Therefore, as an alternative to using the netpage ID server to record and support the lookup of the netpage page server associated with an item ID, the page server can instead be registered with the product server in much the same way.

Figure 100:
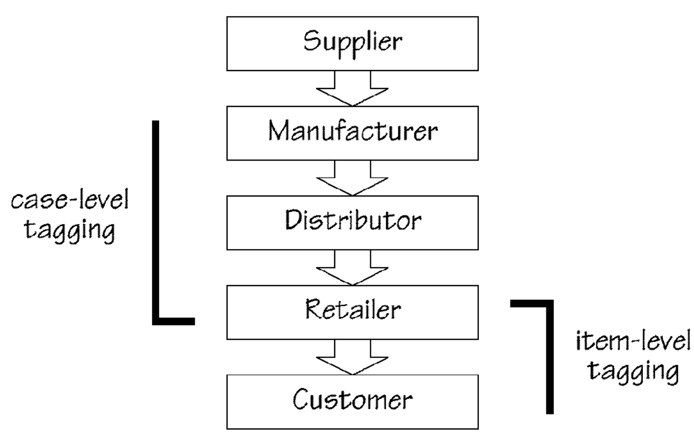

Rather than publish an interface document to a Netpage page server, the product server may instead allow the page server to retrieve the interface document from the product server on demand. The product server is then responsible for recording relationships between ranges of item IDs and particular interface descriptions, as shown in FIG. 100. As described earlier, the page server may use a standard name service lookup mechanism to resolve an item ID into a network address of a corresponding product server.

Figure 101:
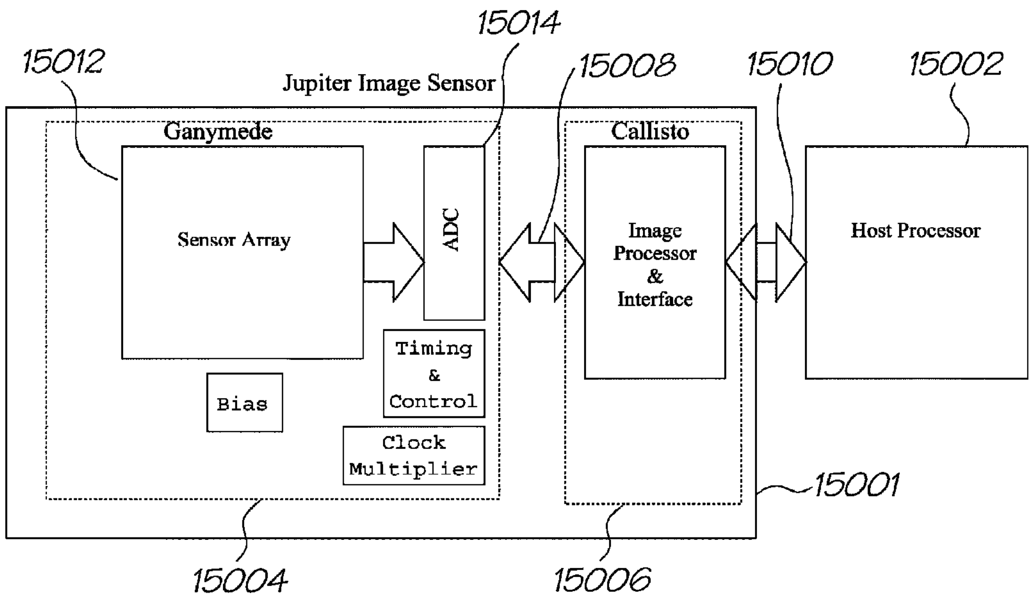
FIG. 101. Jupiter system diagram
Figure 102:
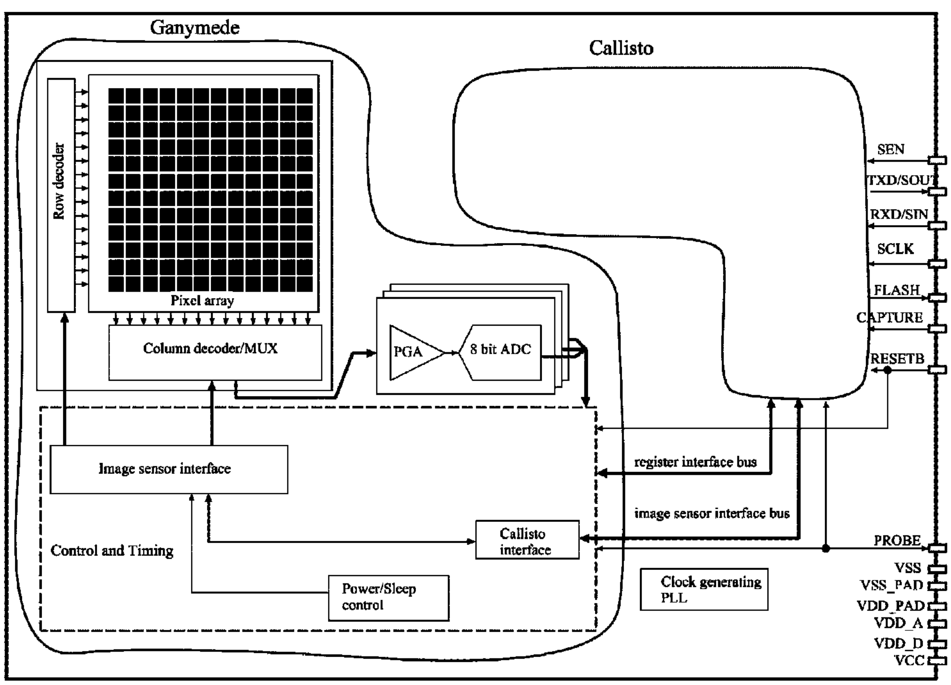
FIG. 102. Detailed architecture of Jupiter

FIG. 101 shows a typical interaction between a Netpage pen and a Web server in this scenario. The pen captures an item ID and digital ink via a product surface. It forwards this to the Netpage pen server associated with the pen. The pen server uses the item ID to look up the address of the item ID's product server via a name server (or hierarchy of name servers). The pen server then retrieves the product's interface description from the identified product server, and uses the interface description to interpret the user's digital ink input in the usual way. This may ultimately result in the submission of a form to, and/or the retrieval of a Web page from a Web server identified by a URI associated with a form or hyperlink in the interface description. Again this involves the resolution of a server address for the Web server using a name server, which is not shown in the figure. The pen server may then display the Web page on a Web terminal associated with the Netpage pen. For example, the relay device (e.g. PC, mobile phone or PDA) through which the pen is communicating with the pen server may act as a Web terminal by running a Web browser. The user may continue to interact with the Web page directly through the Web browser.

Note that in this scenario the page server has been replaced by a pen server. Where the page server provides persistent storage of digital ink associated with particular pages, the pen server provides persistent storage of digital ink associated with particular users' pens. In both cases the persistence is provided at least until the form to which the digital ink applies is submitted. Note that the pen server may be a shared network server which serves many users, or may be a private server which executes on the pen user's relay device (e.g. PC, mobile telephone or PDA). In the limit case it may execute in the pen itself.

8.3 Hyperlabel Tag Printing

A Hyperlabel printer is a digital printer which prints Hyperlabel tags onto the label, packaging or actual surface of a product before, during or after product manufacture and/or assembly. It is a special case of a netpage printer 601. It is capable of printing a continuous pattern of Hyperlabel tags onto a surface, typically using a near-infrared-absorptive ink. In high-speed environments, the printer includes hardware which accelerates tag rendering. This typically includes real-time Reed-Solomon encoding of variable tag data such as tag position, and real-time template-based rendering of the actual tag pattern at the dot resolution of the printhead.

The printer may be an add-on infrared printer which prints the Hyperlabel tags after text and graphics have been printed by other means, or an integrated color and infrared printer which prints the Hyperlabel tags, text and graphics simultaneously. Digitally-printed text and graphics may include everything on the label or packaging, or may consist only of the variable portions, with other portions still printed by other means. Thus a Hyperlabel tag printer with an infrared and black printing capability can displace an existing digital printer used for variable data printing, such as a conventional thermal transfer or inkjet printer.

For the purposes of the following discussion, any reference to printing onto an item label is intended to include printing onto the item packaging in general, or directly onto the item surface. Furthermore, any reference to an item ID 215 is intended to include a region ID 50 (or collection of per-panel region IDs), or a component thereof.

The printer is typically controlled by a host computer, which supplies the printer with fixed and/or variable text and graphics as well as item IDs for inclusion in the Hyperlabel tags. The host may provide real-time control over the printer, whereby it provides the printer with data in real time as printing proceeds. As an optimisation, the host may provide the printer with fixed data before printing begins, and only provide variable data in real time. The printer may also be capable of generating per-item variable data based on parameters provided by the host. For example, the host may provide the printer with a base item ID prior to printing, and the printer may simply increment the base item ID to generate successive item IDs. Alternatively, memory in the ink cartridge or other storage medium inserted into the printer may provide a source of unique item IDs, in which case the printer reports the assignment of items IDs to the host computer for recording by the host.

Alternatively still, the printer may be capable of reading a pre-existing item ID from the label onto which the Hyperlabel tags are being printed, assuming the unique ID has been applied in some form to the label during a previous manufacturing step. For example, the item ID may already be present in the form of a visible 2D bar code, or encoded in an RFID tag. In the former case the printer can include an optical bar code scanner. In the latter case it can include an RFID reader.

The printer may also be capable of rendering the item ID in other forms. For example, it may be capable of printing the item ID in the form of a 2D bar code, or of printing the product ID component of the item ID in the form of a ID bar code, or of writing the item ID to a writable or write-once RFID tag.

8.4 Hyperlabel Scanning

Item information typically flows to the product server in response to situated scan events, e.g. when an item is scanned into inventory on delivery; when the item is placed on a retail shelf; and when the item is scanned at point of sale. Both fixed and hand-held scanners may be used to scan Hyperlabel tagged product items, using both laser-based 2D scanning and 2D image-sensor-based scanning, using similar or the same techniques as employed in the netpage pen.

Figure 57:
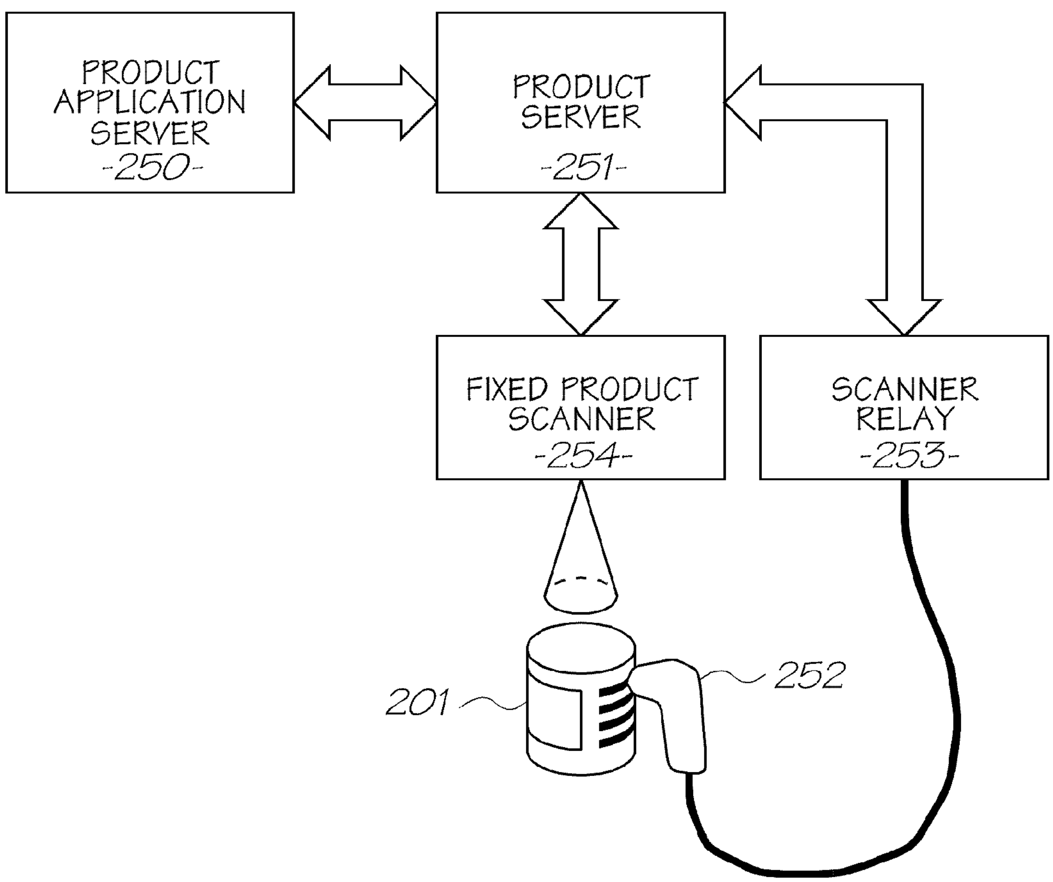
FIG. 57 is a schematic view of the interaction between a product item, a fixed product scanner, a hand-held product scanner, a scanner relay, a product server, and a product application server.
Figure 58:
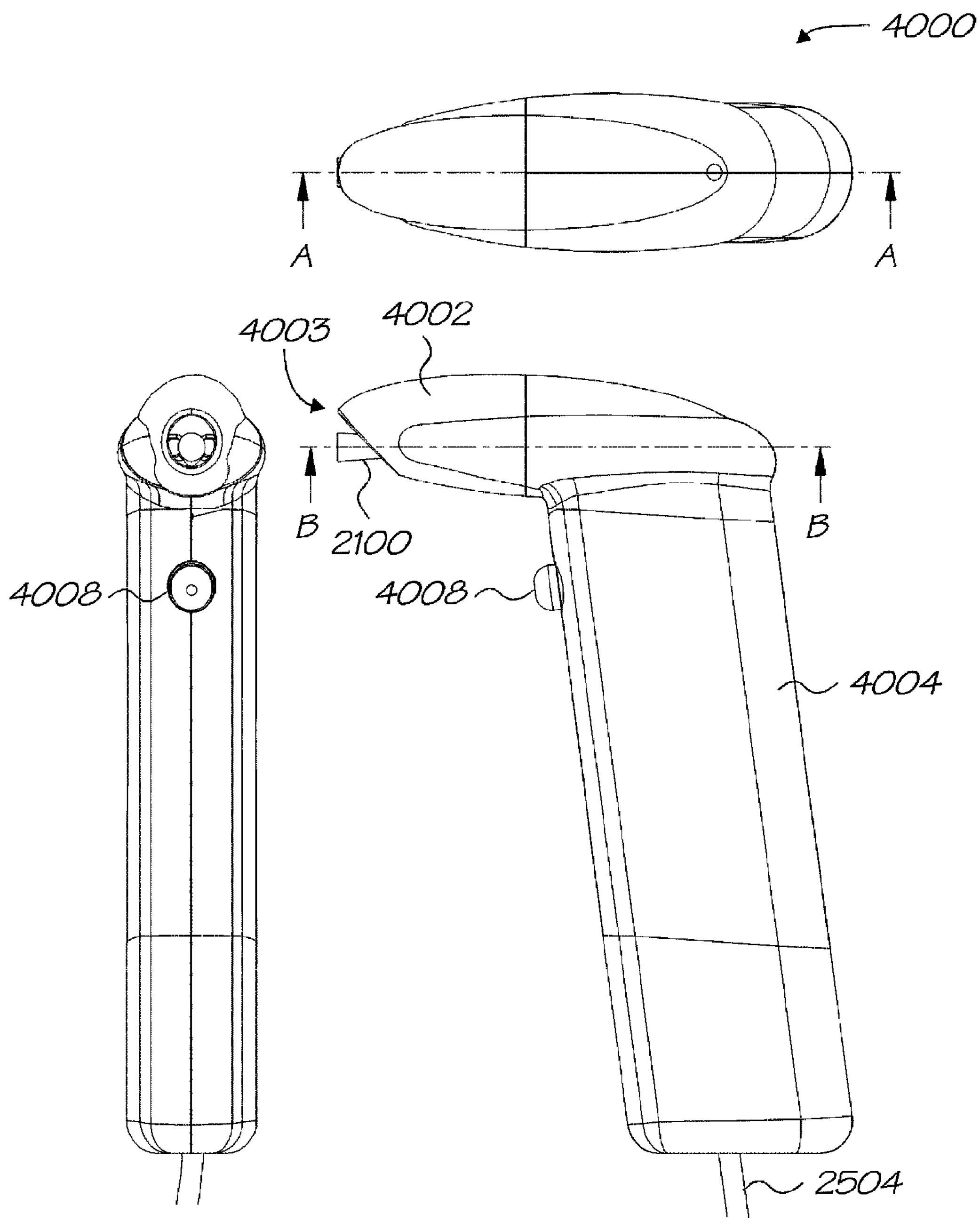
FIG. 58 shows a plan and elevation view of a hand-held Hyperlabel scanner 4000 according to a preferred embodiment of the present invention.

As shown in FIG. 57, both a fixed scanner 254 and a hand-held scanner 252 can communicate scan data to the product server 251. The product server may in turn communicate product item event data to a peer product server (not shown), or to a product application server 250, which may implement sharing of data with related product servers. For example, stock movements within a retail store may be recorded locally on the retail store's product server, but the manufacturer's product server may be notified once a product item is sold.

8.4.1 Hand Based Scanners

A number of designs of a hand based scanners Hyperlabel scanner 252 will now be described Hyperlabel scanner.

8.4.1.1 Hand-Held Hyperlabel Optical Reader

FIG. 58, FIG. 59, FIG. 60 and FIG. 61 show a first embodiment of a Hyperlabel scanner 4000. The scanner is designed to image and decode Hyperlabel tags when its tip 4003 is brought into close proximity or contact with a Hyperlabel tagged surface. The scanner can be operated in free mode, in which it continuously and automatically scans tags within its field of view; or in triggered mode, in which it only scans tags when its trigger 4008 is held depressed. Although the scanner is designed with a limited depth of field, thus reducing the likelihood of unintentional scans in free mode, triggered mode can be used to avoid unintentional scans. The trigger may also be configured to be manually operated (as shown), or configured to be automatically activated when the scanner makes contact with the surface. Because an individual product item is tagged with a unique item ID, there is no possibility of duplicate scans.

During normal operation the scanner returns the item ID encoded in a Hyperlabel tag, but ignores the position 86. The scanner distinguishes between Hyperlabel tags, which encode item IDs, and general netpage tags, which do not.

The scanner is a general-purpose Hyperlabel scanner suitable for shelf-stock scanning, point-of-sale scanning, and returns processing. Although not shown in the figures, the Hyperlabel scanner may usefully incorporate a conventional laser-based bar code scanner for backwards compatibility with linear bar codes. Alternatively or additionally, the scanner may be programmed to support scanning of extant linear and/or two-dimensional symbologies via its two-dimensional image sensor.

The scanner as shown is designed for tethered operation, wherein it obtains DC power from an external supply via a cable 2504, and transmits decoded scan data to an external processor via the same cable 2504. The scanner may be connected to a relay 253 which simply relays the scan data to a point-of-sale system or other processing system via wired or wireless communications, or the scanner may be directly connected to the processing system.

Alternative versions of the scanner incorporate a replaceable or rechargeable battery to allow untethered operation; a wireless communication capability such as IrDA, Bluetooth, IEEE 802.15 (e.g. ZigBee) or IEEE 802.11 to allow untethered data transmission; and/or external contacts designed to mate with a tethered pod to allow in-pod battery charging and/or data transmission.

During a single period of proximity or contact with a tagged surface, the scanner may successfully perform tens or even hundreds of scans. Although even a single scan may be performed reliably based on built-in error correction in the Hyperlabel tag, multiple scans can be used to further ensure reliability.

The scanner can indicate a correct (and possibly unique) scan by flashing its status LED 2426 and/or by producing an audible "beep". The beep may be generated by the control unit to which the scanner is attached or by the scanner itself. It is useful if the status LED is flashed on a successful scan but the beep is only produced on a unique scan (as identified by the control unit).

As shown in FIG. 58 through FIG. 62, the scanner consists of a nose molding 4002 and two grip moldings 4004 and 4006. The grip moldings mate together to hold the nose molding in place and to form the grip. Although shown with screw fasteners, the grip moldings may alternatively incorporate snap fasteners. The nose molding incorporates an aperture, directly below the tip 4003, to accommodate the imaging field-of-view cone 2100 and illumination field cones 2102. Further apertures in the grip accommodate the status LED window 4010, the trigger 4008, and the cable 2504.

Figure 59:
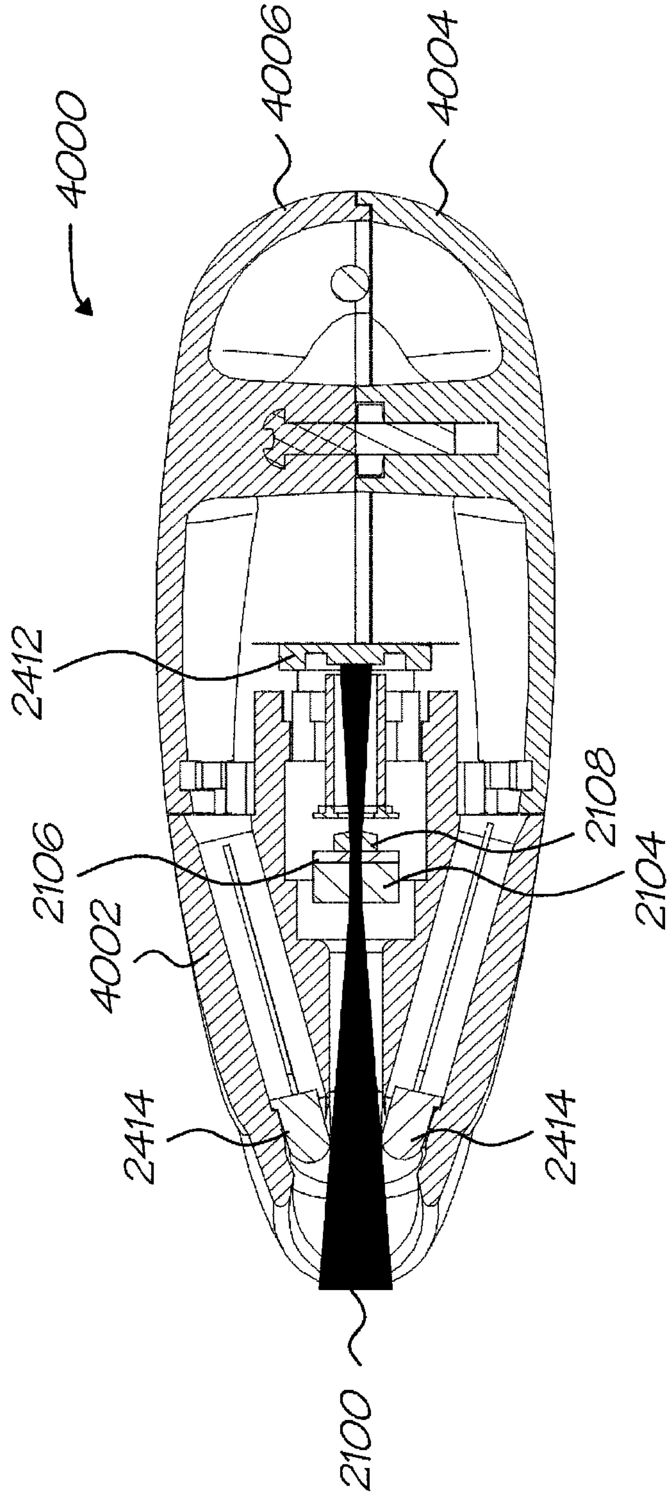
FIG. 59 shows a cross-sectional view A of the scanner of FIG. 59.
Figure 60:
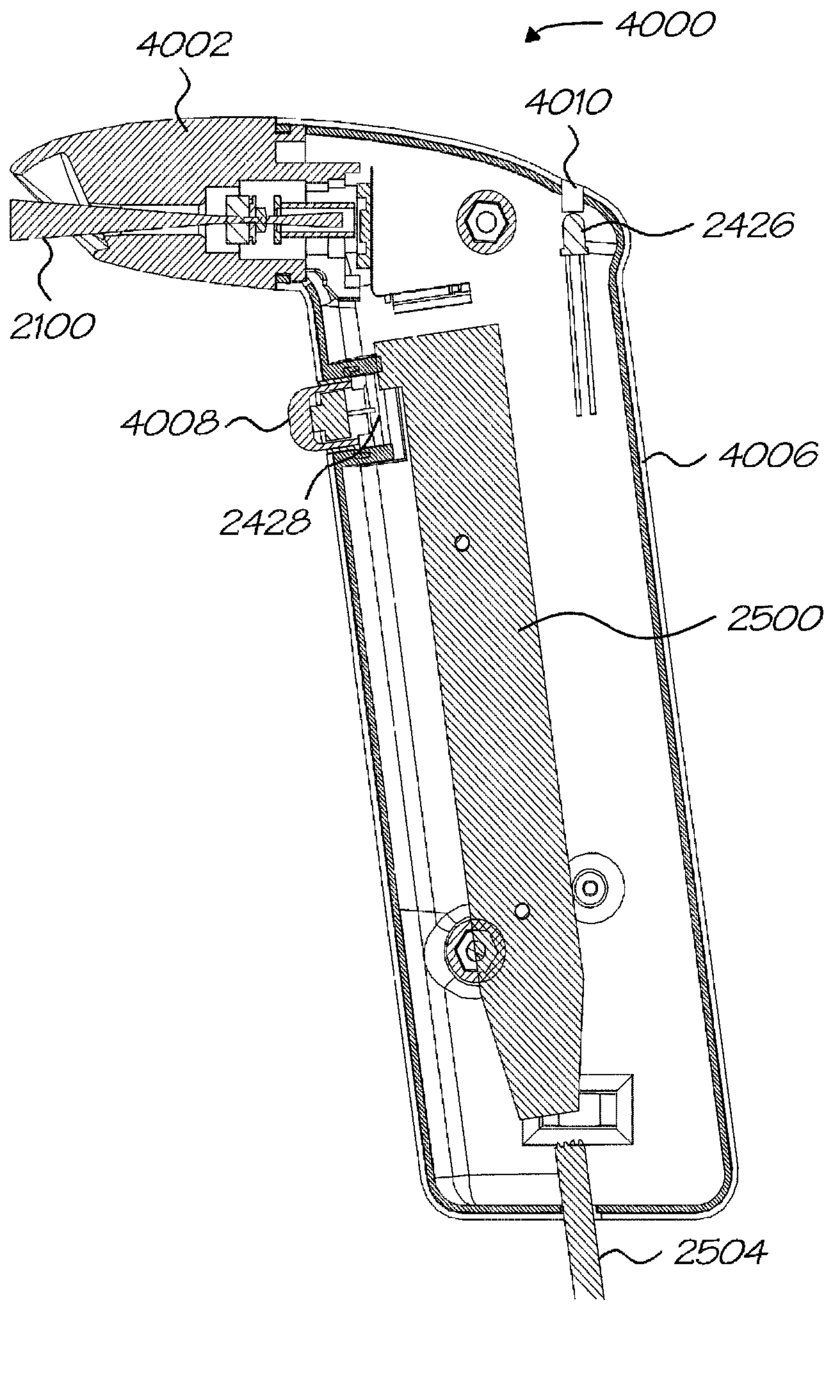
FIG. 60 shows a cross-sectional view B of the scanner of FIG. 58.
Figure 61:
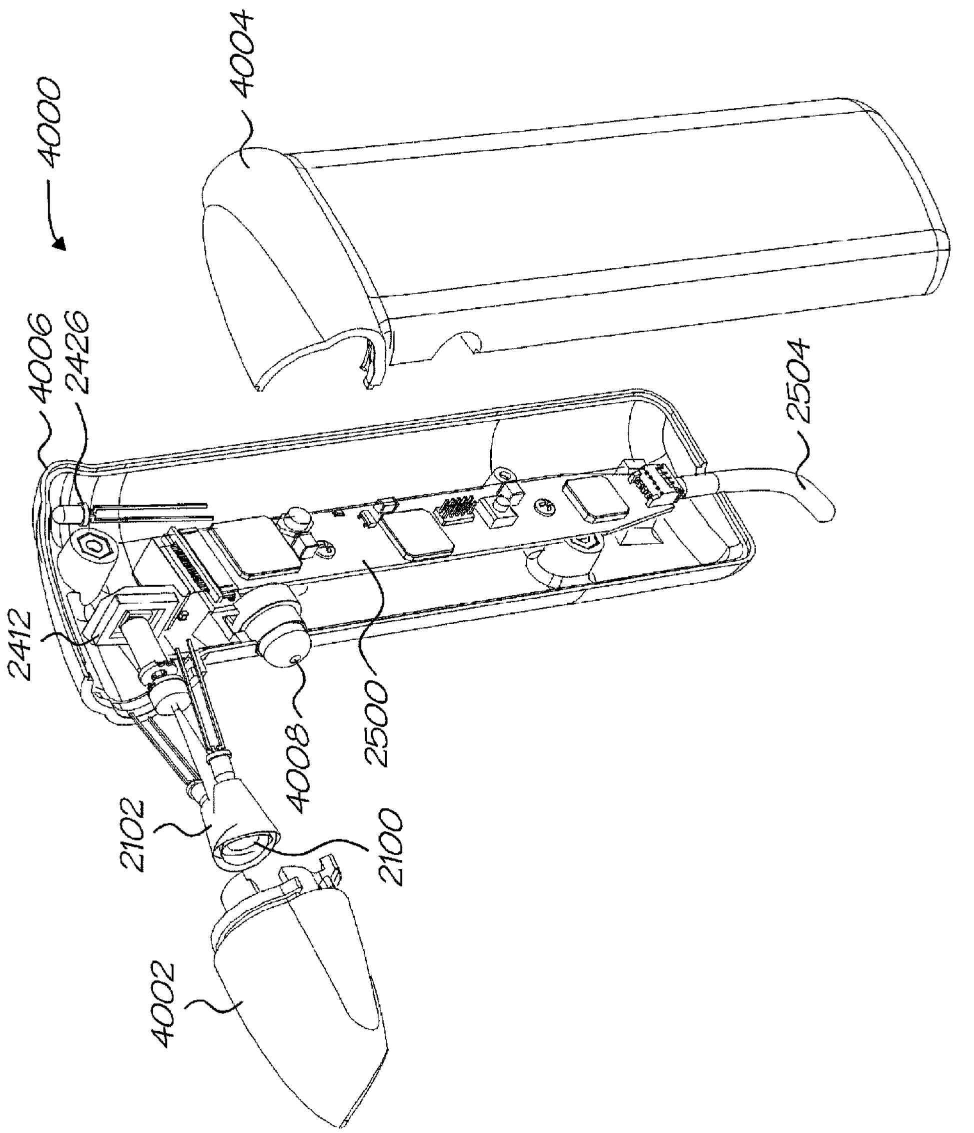
FIG. 61 shows an exploded view of the hand-held scanner.
Figure 62:
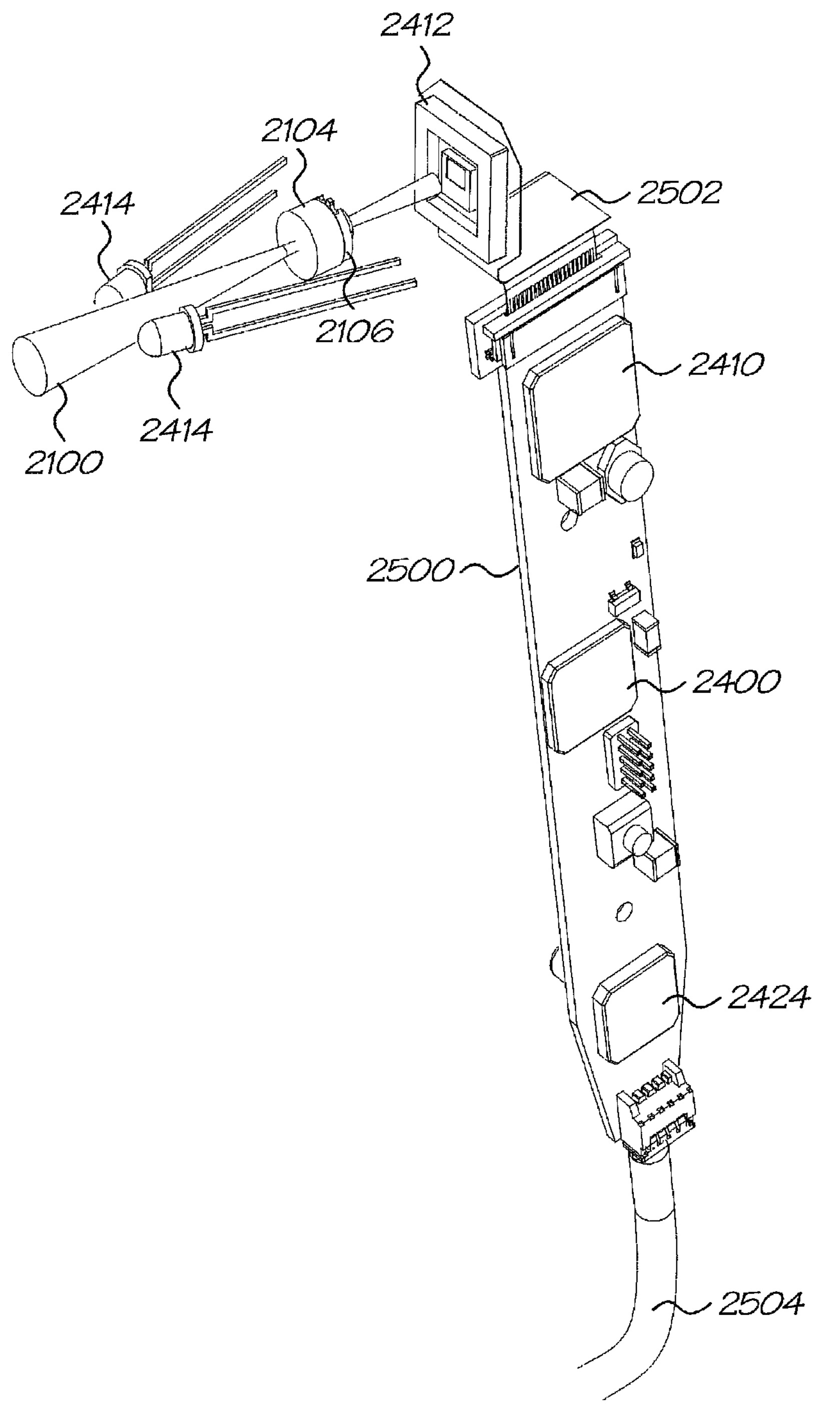
FIG. 62 shows a view of the optical and electronic sub-assemblies of the hand-held scanner.

As shown in FIGS. 59 and 62, the two near-infrared illumination LEDs 2414 are disposed symmetrically about the imaging field-of-view cone 2100 to provide a uniform illumination field across a range of tilt angles.

The optical assembly consists of a near-infrared filter 2104, an aperture disc 2106 incorporating a pin-hole aperture of between 0.5 mm and 1 mm in diameter, a focussing lens 2108, and a CMOS image sensor 2412. To ensure accurate Hyperlabel tag acquisition across a range of tilt angles and relative scanner-to-Hyperlabel tag registrations, the image sensor has a pixel array size of at least 128 by 128. The small aperture and the large ratio of viewing distance to nominal field-of-view diameter (i.e. in excess of 5:1) yields adequate depth-of-field for reliable operation across a tilt range (i.e. combination of pitch and roll) of plus 45 degrees to minus 45 degrees, as well as contact-less tag acquisition. The optical magnification is dictated by the image sensor's pixel size and the required sampling rate of between 2:1 and 3:1 with respect to the worst-case (i.e. tilt-induced) pitch of the macrodots in the tag. The focussing lens is chosen to provide the required magnification while minimising overall space requirements. The near-infrared filter 2104 may be of longpass type or narrow bandpass type, depending on the required performance of the scanner with respect to ambient light levels, and the characteristics of the ink used to print the tags. If the scanner is required to perform in direct sunlight, then a narrow bandpass filter is preferred. If the ink is narrowband, then a matching narrowband filter is also preferred.

Figure 63:
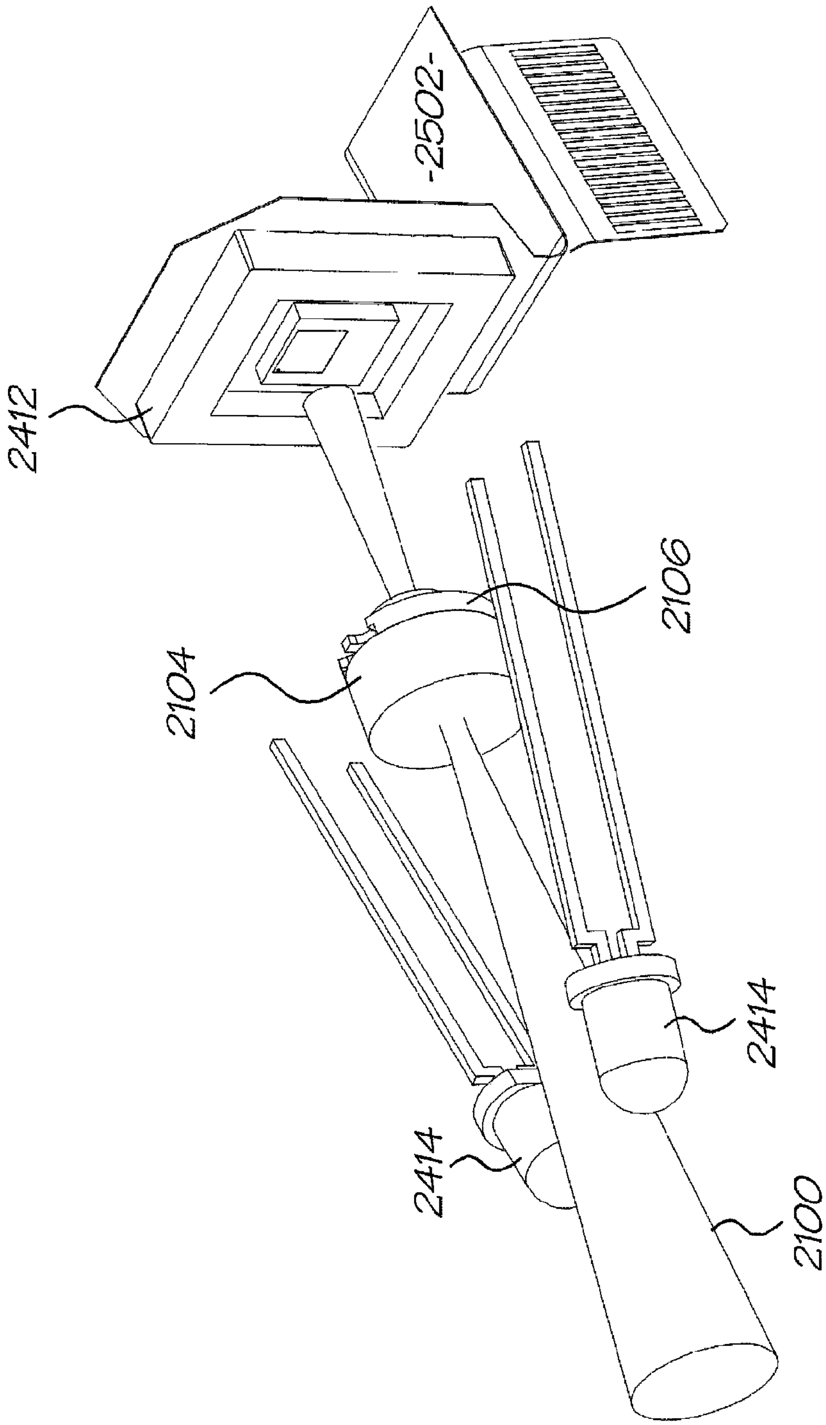
FIG. 63 shows a close-up view of the optical sub-assembly.
Figure 64:
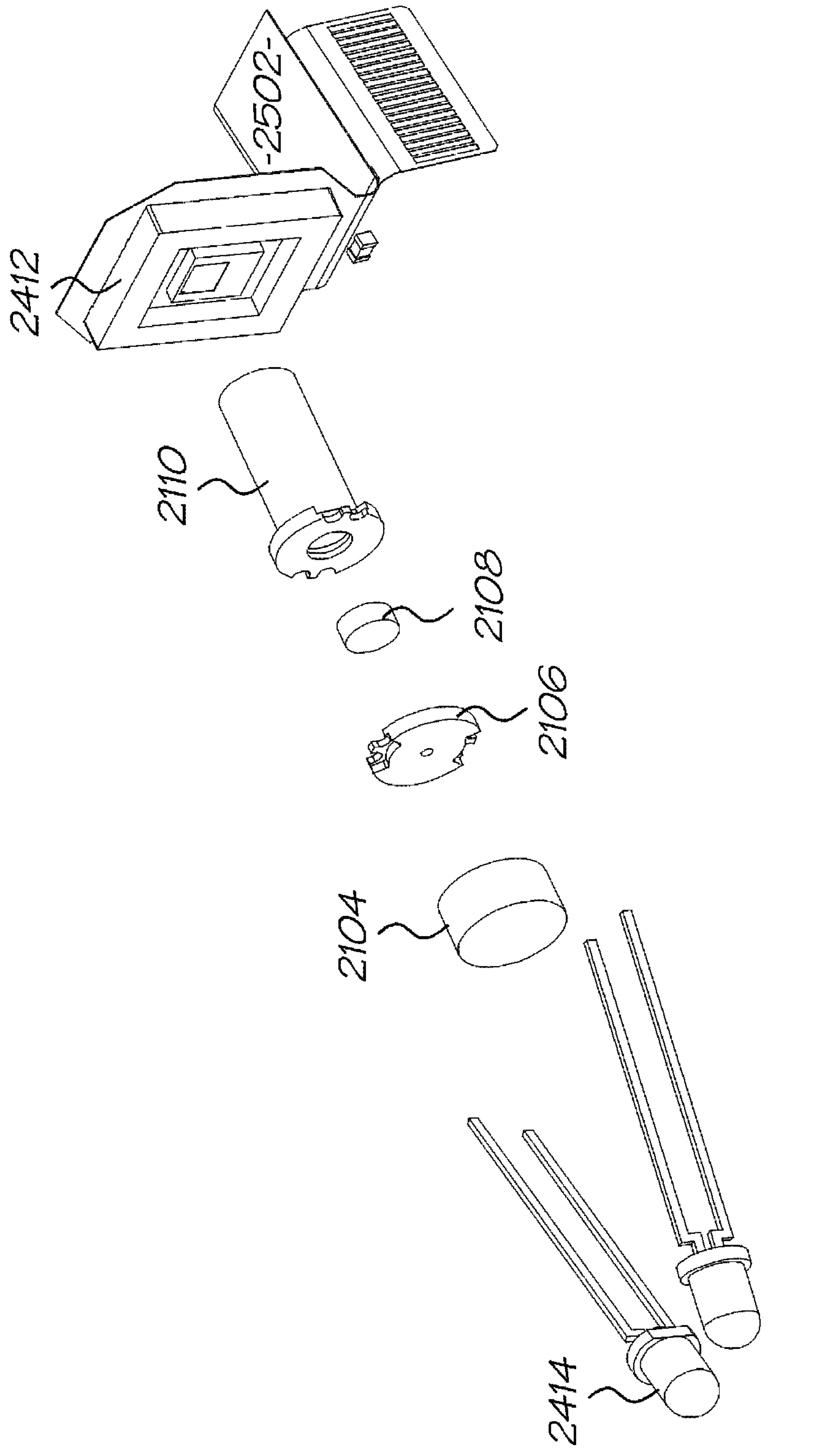
FIG. 64 shows an exploded view of the optical sub-assembly.

FIG. 63 and FIG. 64 show close-up and exploded views of the optics respectively.

The image sensor is usefully of freeze-frame type rather than rolling-shutter type to avoid skew between successive scan lines. A suitable image sensor design is described in the present applicants' co-pending Australian Patent Application entitled "Methods and Systems (NPS041)" (docket number NPS041), filed 17 Feb. 2003. Suitable freeze-frame image sensors are also available commercially from Micron, Texas Instruments and National Semiconductor.

FIG. 62 shows the image sensor 2412 attached via a flexible PCB 2502 to the main PCB 2500. The main PCB as shown holds an image processor 2410, controller 2400 and communications interface 2424. FIG. 12 a corresponding block diagram of the electronics.

The image processor 2410 is closely coupled with the image sensor 2412. A suitable design of the image processor is described the co-pending application (NPS041) identified above. As described in the co-pending application, the image sensor and image processor are designed to implemented together in the same chip, to minimise requirements for high-speed external interfacing. The image processor supports rapid readout of images from the image sensor into the image processor's internal memory, followed by relatively slower readout from the image processor's internal memory to the external controller. The image processor also provides low-level image processing functions to assist the controller with image processing and further reduce the data rate to the controller. The image processor also controls the timing of the image sensor and the synchronisation of image acquisition with the strobing of the illumination LEDs 2414.

In a typical configuration, image acquisition occurs at a rate of between 50 and 150 frames per second. The exposure time of the image sensor may be as low as 200 microseconds to allow accurate scanning even during significant relative motion between the scanner and the tagged surface.

The image readout time of the image sensor is typically a couple of milliseconds, which is only a fifth of the frame period at 100 frames per second. Thus the controller has ample time to process the acquired image in the image processor's internal memory. The image processor's memory may be double-buffered to allow the controller to utilise the full frame period for image processing.

Figure 69:
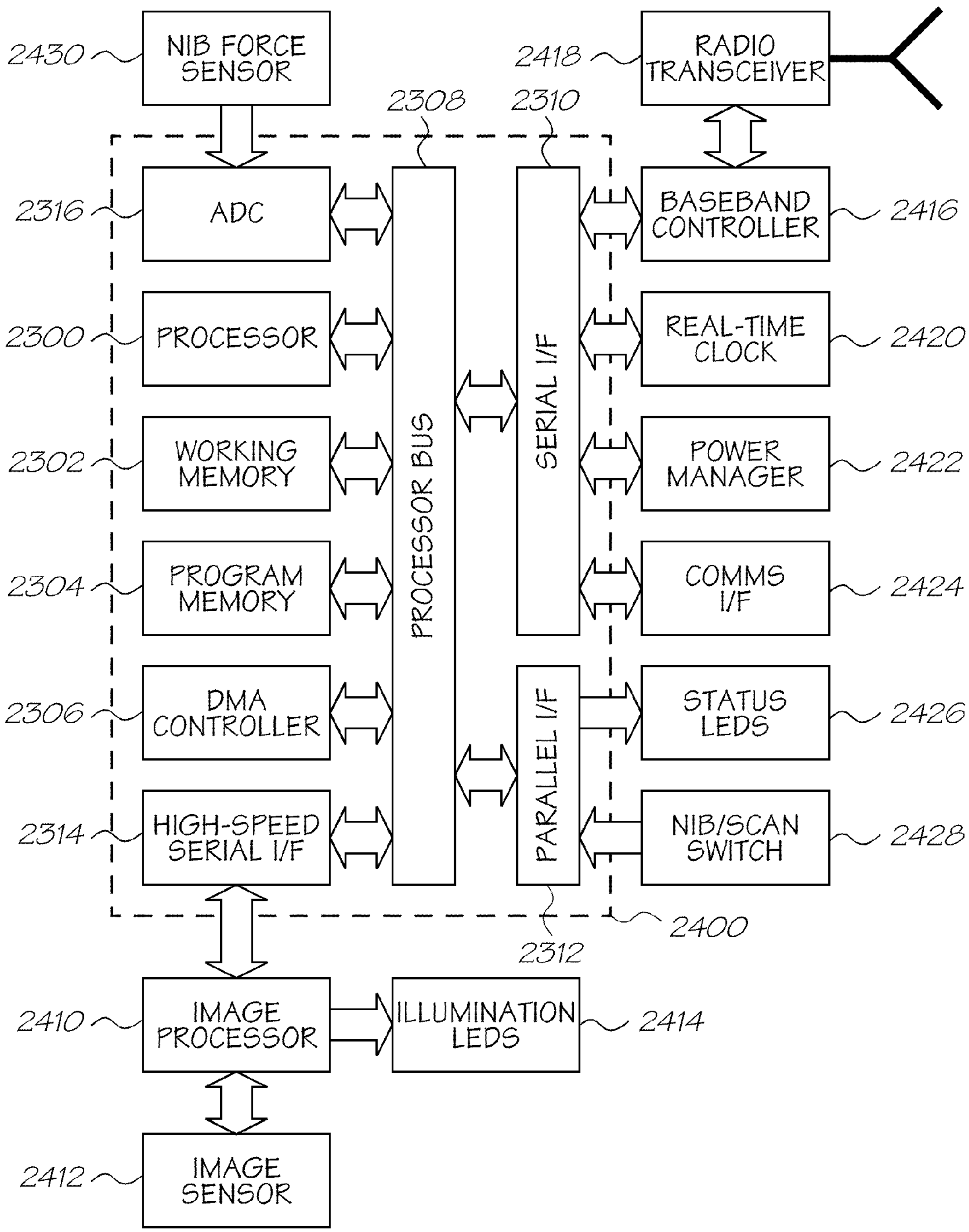
FIG. 69 shows a block diagram of salient aspects of the electronics of the scanner and pen.

As shown in FIG. 69, the image processor is designed to interface with the controller via a high-speed serial interface 2312. One example of such an interface is the high-speed synchronous serial interface provided on Atmel controllers.

The controller 2400 includes a processor 2300 which runs software to perform a number of tasks. These tasks include overall control of the scanner; real-time decoding of images of Hyperlabel tags acquired and pre-processed by the image sensor 2412 and image processor 2410; and encoding and transmission of scan data to the external control unit via the communications interface 2424 (or alternatively via the baseband controller 2416 and radio transceiver 2418). Image processing and decoding are described in detail in the co-pending application (NPS041) identified above, as well as in the main body of this specification.

The controller incorporates a high-speed working memory 2302 (such as a static RAM) for program data and for program code which is executing. It also incorporates a non-volatile program memory 2304 which stores the program code, and which may be used to persistently (and hence securely) store scan data awaiting transmission. The controller may incorporate a DMA controller 2306 for optimising the transfer of data between working memory and the high-speed serial interface. The controller's components are interconnected via a shared control, address and data bus 2308.

The processor senses depression of the scan switch 2428 via a general-purpose parallel input on the parallel interface 2312. It controls the status LED(s) 2426 via outputs on the same parallel interface. The controller 2400 may optionally include a programmable pulse width modulator (PWM) for driving the status LEDs.

When configured for wireless operation, the real-time clock 2420 provides the basis for timestamping scan data when operating off-line. The power manager 2422 manages power utilisation and controls battery charging. Both are controlled via the serial interface 2310.

The Hyperlabel scanner can be further augmented with a monochrome or color display to allow the operator to obtain product information based on scan data. This may include product-specific information such as descriptive information, and item-specific information such as manufacturing and use-by dates.

When the user of the scanner is a customer operating in self-checkout mode, the display can assist the customer in adding items to and removing items from their shopping cart. This may work in conjunction with a mode switch incorporated in the scanner which allows the customer to switch the scanner between the "add" mode and the "remove" mode prior to scanning an individual item. The mode can also be signalled more economically via one or more mode-indicating LEDs.

When operating in self-checkout mode, the customer may provide an identity token, such as a magnetic stripe or smart-card-based payment card or RFID token, which allows the customer to be associated with the scanner for the duration of the shopping excursion. The reader for the identity token may usefully be incorporated in the scanner. If the identity token is a payment card, then payment can also be completed through the scanner.

8.4.1.2 Handheld Hyperlabel Laser Scanner

Figure 72:
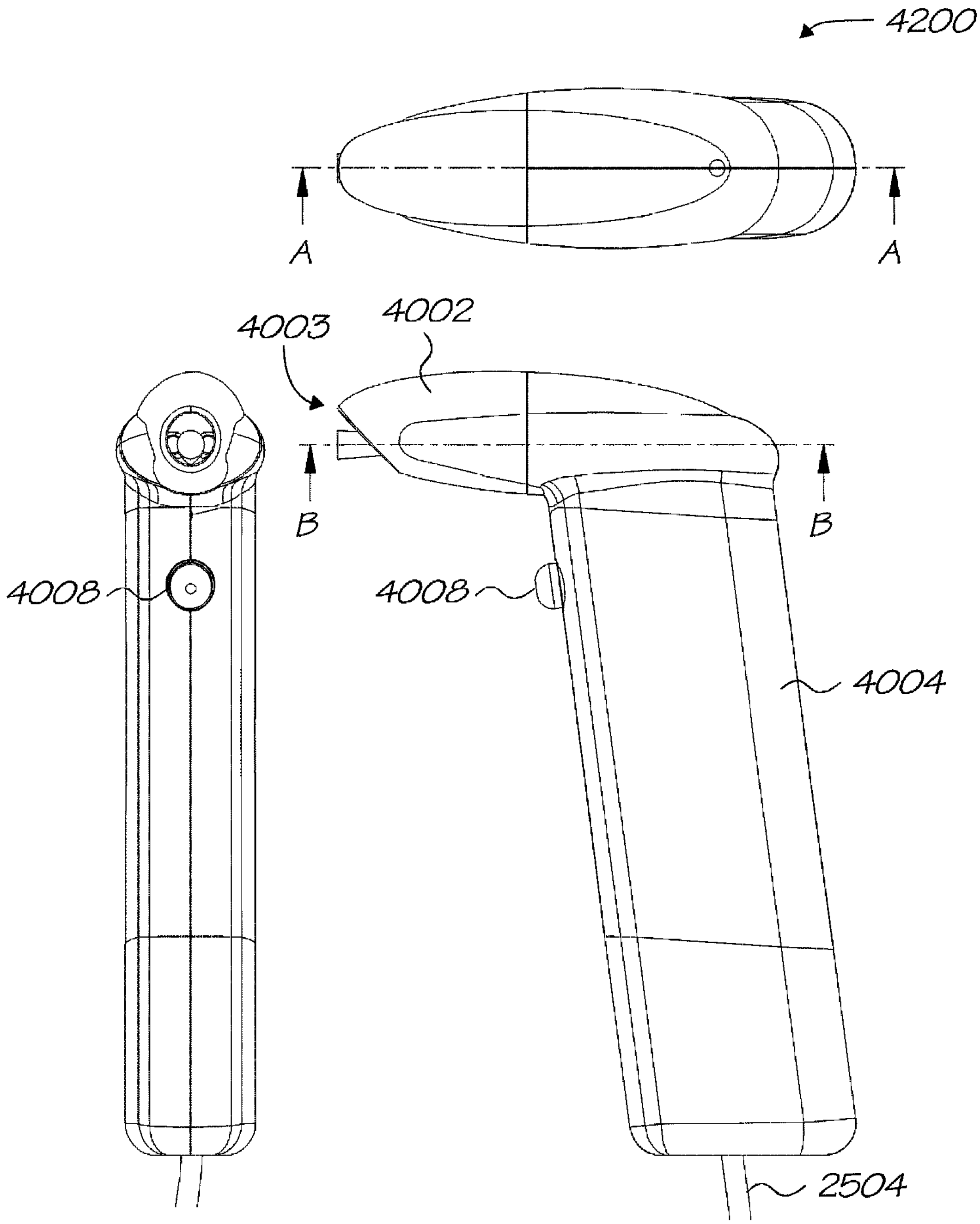
FIG. 72 shows a plan and elevation view of a hand-held Hyperlabel scanner 4200 according to a preferred embodiment of the present invention.
Figure 73:
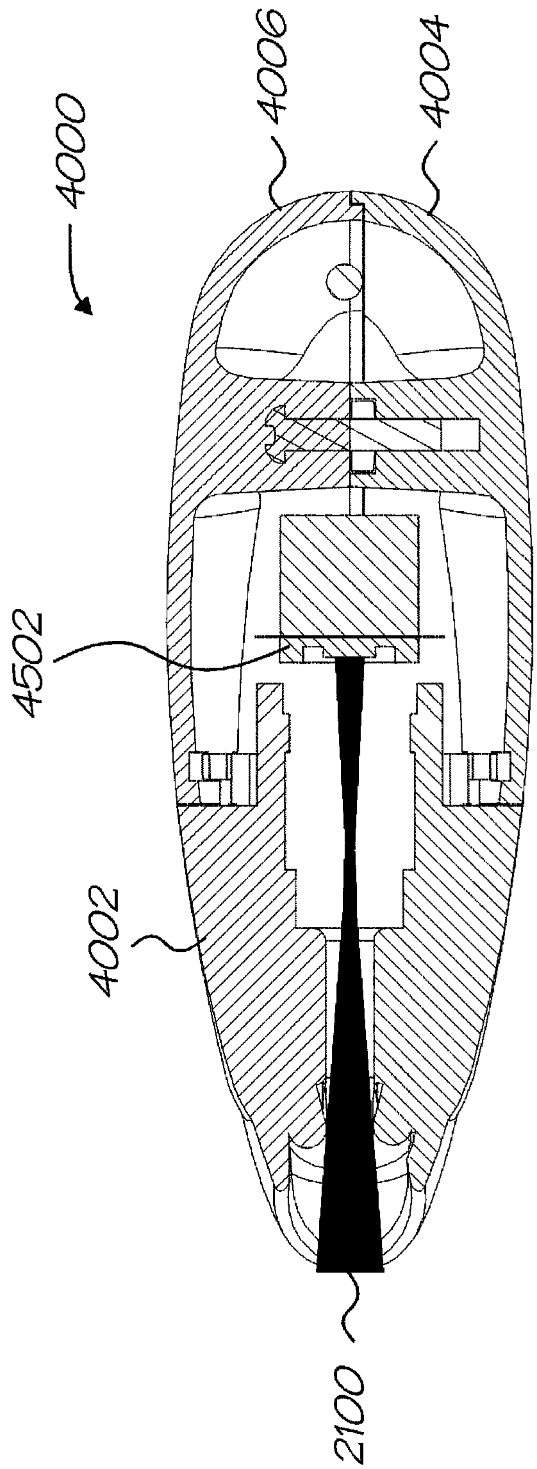
FIG. 73 shows a cross-sectional view A of the scanner of FIG. 72.
Figure 74:
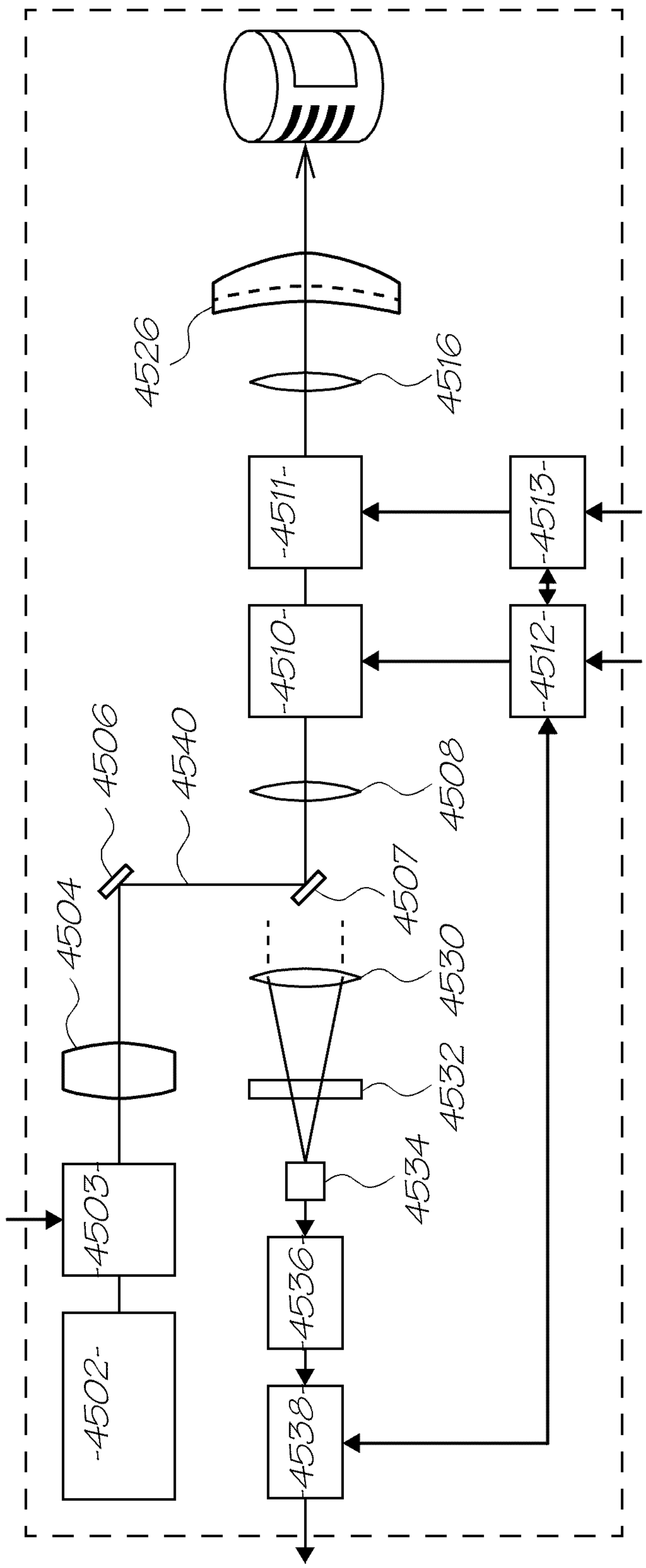
FIG. 74 shows a schematic of the scanning optics and electronics of the hand-held Hyperlabel scanner of FIG. 72.

FIGS. 72, 73 and 74 show a second embodiment of a Hyperlabel scanner 4000. FIGS. 72 and 73 use similar reference numerals to FIGS. 58 and 59 to denote similar elements. In this example, the optical assembly shown in FIG. 59 is replaced with a laser based scanning system, an example of which is shown in FIG. 74.

As shown in FIG. 74, a scan beam 4540 is produced by a laser 4502. The laser produces a narrowband near-infrared beam matched to the peak wavelength of the near-infrared ink used to print the Hyperlabel tags. An optional amplitude modulator 4503 allows the amplitude of the beam to be modulated, e.g. for ambient light suppression or ranging purposes as discussed below. An optional beam expander 4504 allows the beam to be reduced to produce the desired spot size. The laser is typically a solid-state laser.

A pair of mirrors 4506 and 4507 injects the scan beam into line with the retroreflective collection system, as described further below.

An optional focussing lens 4508 focusses the beam prior to steering. A first deflector 4510 provides horizontal deflection of the beam within a scan line of the patch. A second deflector 4511 provides vertical deflection of the beam between scan lines of the patch.

The maximum pixel sampling rate of the patch is usefully derived from the maximum operating frequency of commercially-available horizontal deflectors. There are a number of available alternatives, including acousto-optic deflectors and resonant scanners. A practical upper limit on the operating frequency of these devices is about 500 KHz, and this is taken as the scan line rate for the purposes of the following description.

Given a patch width of 150 pixels, the pixel rate of the scanner is therefore 75 MHz and the pixel time is 13 nanoseconds. The scan line time is 2 microseconds, but to achieve line separation the actual scan line rate is 250 KHz rather than 500 KHz. The minimum patch time is therefore 600 microseconds and the maximum patch rate is 1.6 KHz.

The vertical deflector 4511 is only required to operate at the maximum patch rate of 1.6 KHz. Again there are a number of available alternatives, including acousto-optic deflectors, resonant scanners, rotating polygon mirrors, galvanometers and piezoelectrically-actuated platforms.

The two deflectors 4510 and 4511 are driven by synchronised drivers 4512 and 4513 respectively, each incorporating scan generation, amplification etc.

The angle of the output beam of the horizontal and vertical deflectors 4510 and 4511 is transformed into a spatial offset within the patch by an angle-to-displacement transform lens 4516. This has the benefit that the bundle of (time-displaced) scan beams which make up the patch beam is collimated, thus the sampling frequency of the patch is unaffected by distance to the tagged surface.

The patch beam is focussed and its focal plane is flattened by a focussing and field-flattening lens 4526.

During the "exposure" time of a single pixel the scan beam spot effectively rests at a single point on the product item 201.

Figure 75:
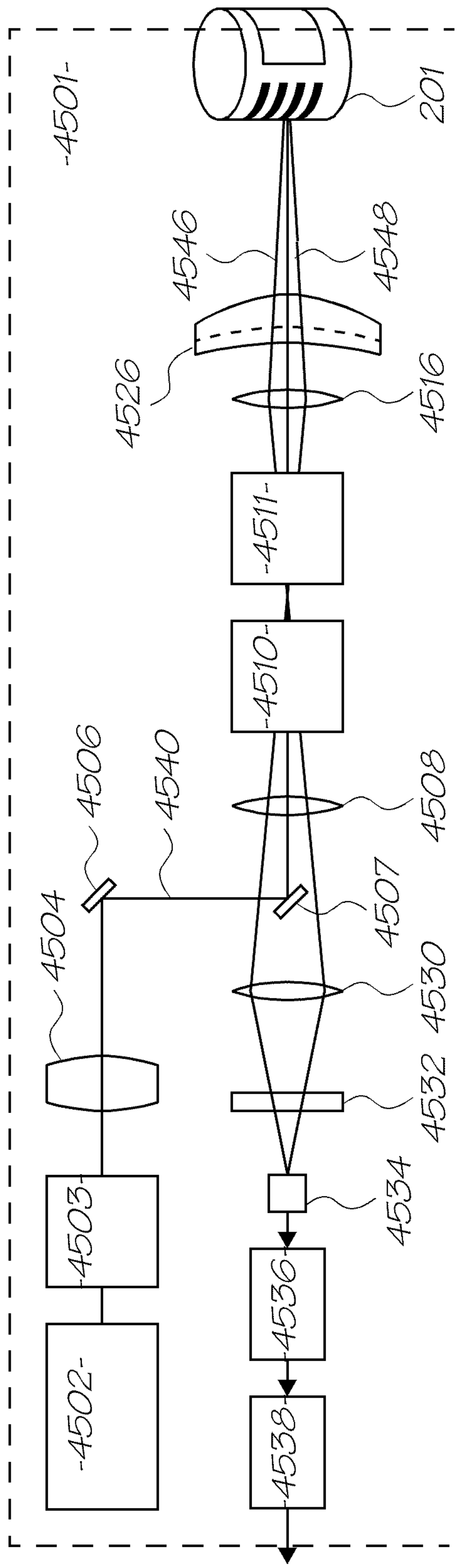
FIG. 75 shows the return light detection path of the scanner of FIG. 72.

As shown in FIG. 75, the scanner's light collection system is retroreflective, significantly increasing the scanner's signal-to-noise ratio. As shown in the figure, divergent rays 4546 and 4548, diffusely reflected where the scan beam strikes the surface of the tagged product item, converge through the transform lens 4516, follow the reverse path of the scan beam through the deflectors 4511 and 4510 to emerge centered on the scan beam, are largely unaffected by the focussing lens 4508, largely bypass the mirror 4507, and are finally focussed by a collecting lens 4530 onto a photodetector 4536. An optional near-infrared filter 4532 further helps reject of ambient light. The photodetector is of any suitable type, such as a solid-state photodiode or a photomultiplier tube.

The signal from the photodetector 4536 is amplified by amplifier 4536 and is converted to a digital value by analog-to-digital converter (ADC) 4538. The ADC operates at the scanner's pixel rate, i.e. 100 MHz. The ADC is synchronised with the horizontal deflector driver 4512.

In use, the photodetector circuit can be modulated in accordance with the modulation of the laser, as achieved by the amplitude modulator 4503, to thereby assist with the suppression of ambient light.

In particular, during an integration (or "exposure") period, the photodetector 4536 produces a photocurrent which is proportional to the intensity of light incident upon the photodetector. When the controlled light source, in this case, the scanning beam 4540 is off, the light incident upon the photodetector will primarily be ambient light. When the scanning beam is on, the light incident upon the photodetector 4536 will be formed from light reflected from the product item, and the ambient light.

Accordingly, the photodetector system can be adapted to operate in two phases in accordance with the modulation of the scanning beam 4540. During a first phase, when the scanning beam 4540 is off, the photodetector circuit is adapted to detect the incident light and from this determine and effectively memorise the ambient light level.

In the second phase when the scanning beam is activated, the photocurrent in the photodetector 4536 increases in proportion to the light incident thereon, based on the reflected radiation and the ambient light. This "total light signal" is corrected by effectively subtracting the memorised ambient light level signal, to generate a "difference signal", which is indicative of the reflected scanning beam only. This allows the effects of ambient light to be reduced.

This process and a photodetector circuit suitable for performing such operation are described in the co-pending PCT Publication No. WO 03/044814 entitled "Active Pixel Sensor" filed 22 Nov. 2002, the contents of which are incorporated herein by cross-reference.

The electronics of the scanner will be similar to those of FIG. 69.

8.4.1.3 Hyperlabel Pen

Figure 65:
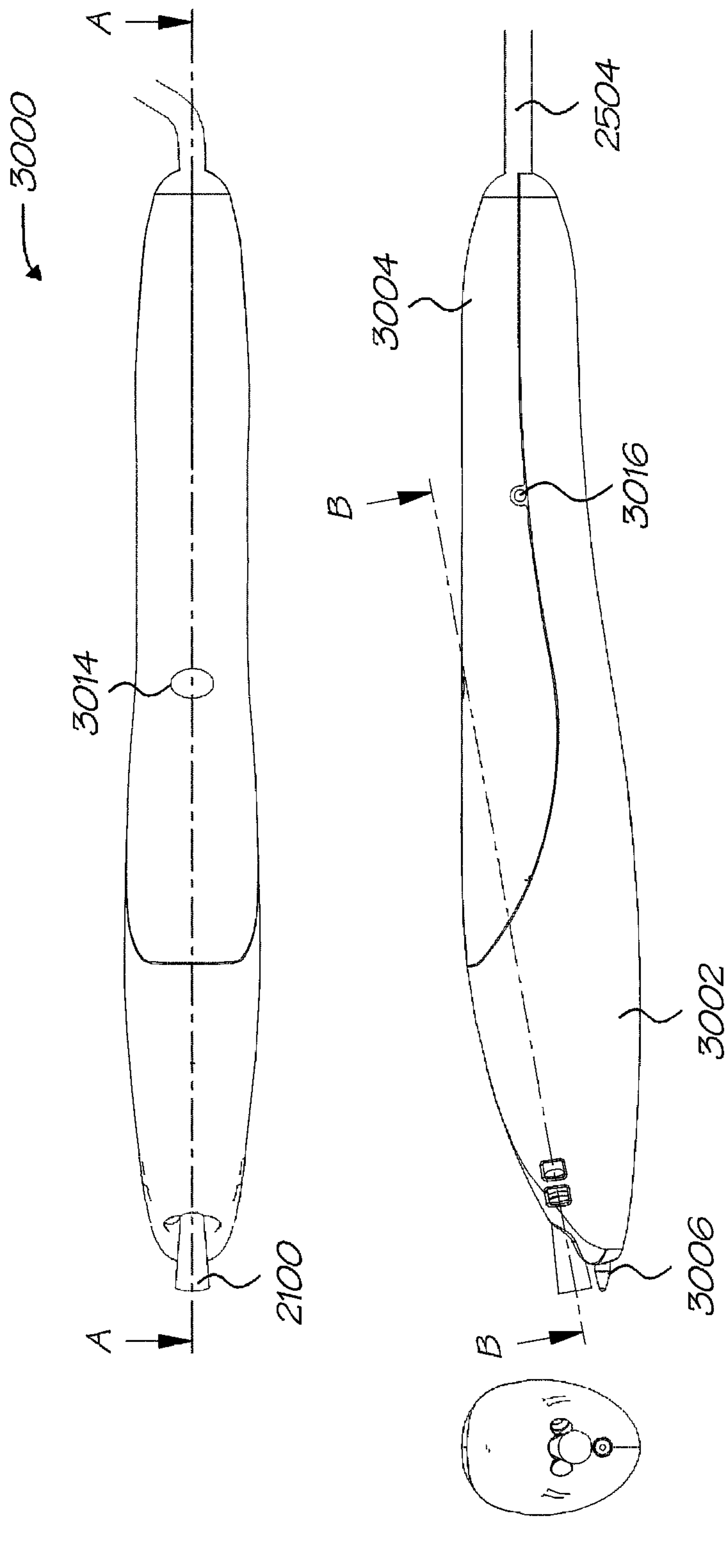
FIG. 65 shows a plan and elevation view of a netpage pen 3000 according to a preferred embodiment of the present invention.
Figure 66:
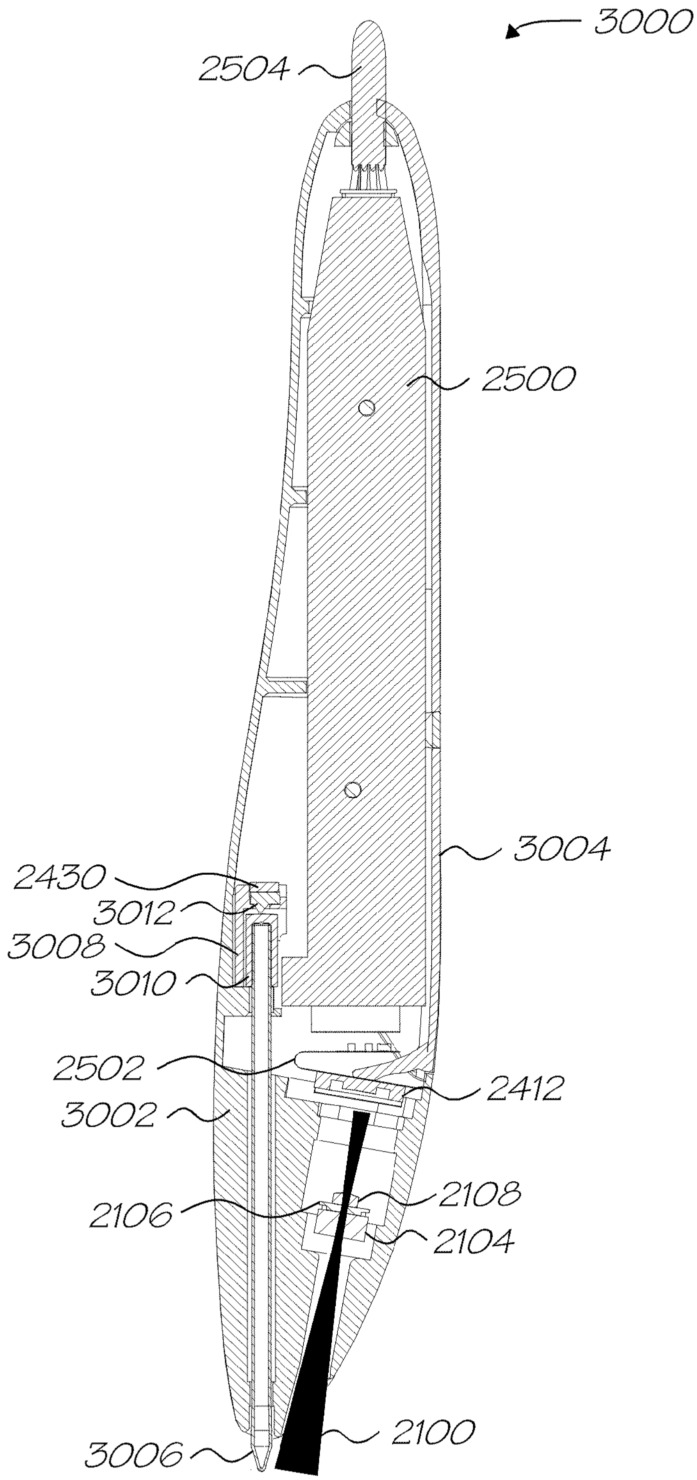
FIG. 66 shows a cross-sectional view A of the pen of FIG. 65.

FIG. 65, FIG. 66 and FIG. 69 show a preferred embodiment of a Hyperlabel pen 3000. The pen is designed to image and decode Hyperlabel tags when its nib 3006 is brought into close proximity or contact with a Hyperlabel tagged surface. The pen can be operated in "hover" mode, in which it continuously and automatically scans tags within its field of view; or in contact mode, in which it only scans tags after a "pen down" event, i.e. when its nib switch 2428 is engaged and/or its nib force sensor 2430 registers a threshold force. Hover mode is useful when the pen is used to drive a cursor on a display screen. It is less useful when interaction is exclusively paper-based.

During normal operation the pen decodes a succession of tag positions 86, refines these positions according to the position and orientation of each tag within the field of view, and thereby generates a succession of nib positions representative of the pen's motion with respect to the tagged surface. As shown in FIG. 33 the pen thus generates a succession of strokes referred to collectively as digital ink, each stroke delimited by a pen down and a pen up event. Each stroke identifies the IDs of the one or more pages or regions within which the stroke was captured.

The pen incorporates a marking nib and ink cartridge 3006, allowing the user to write on a tagged page while simultaneously generating digital ink. The cartridge is replaceable, and a non-marking "stylus" cartridge may be substituted for non-marking operation.

The pen as shown is designed for tethered operation, wherein it obtains DC power from an external supply via a cable 2504, and transmits digital ink to an external processor via the same cable 2504. The pen may be connected to a relay device 44 which simply relays the digital ink to a remote processing system (e.g. page server) via wired or wireless communications, or the pen may be directly connected to the processing system.

Alternative versions of the pen incorporate a replaceable or rechargeable battery to allow untethered operation; a wireless communication capability such as IrDA, Bluetooth, IEEE 802.15 (e.g. ZigBee) or IEEE 802.11 to allow untethered data transmission; and/or external contacts designed to mate with a tethered pod to allow in-pod battery charging and/or data transmission.

Figure 67:
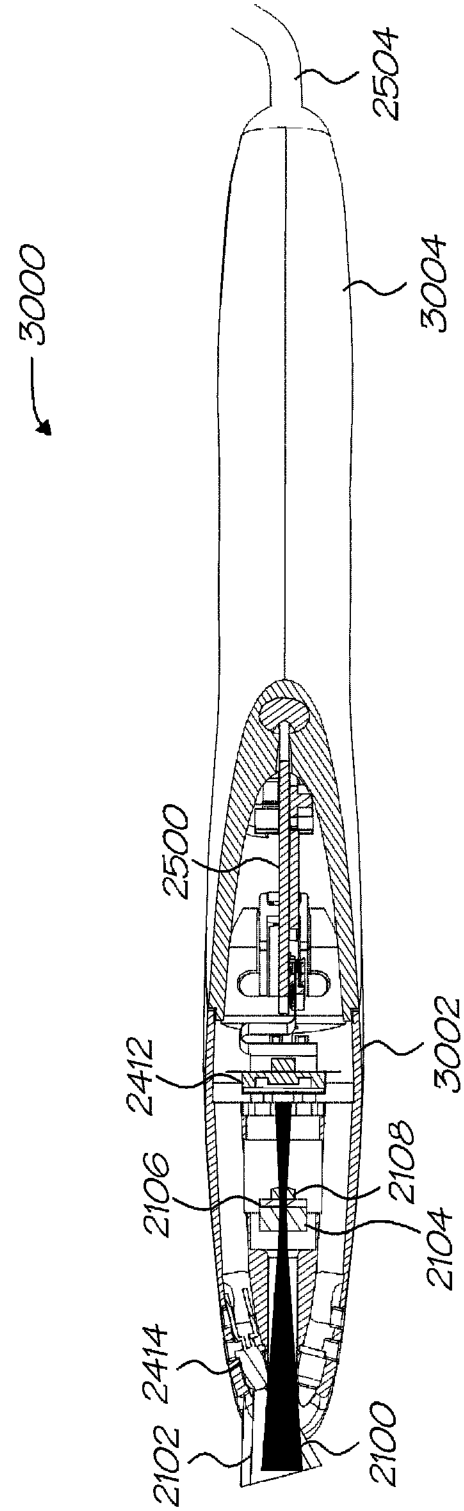
FIG. 67 shows a cross-sectional view B of the pen of FIG. 65.

As shown in FIG. 65 through FIG. 67, the pen consists of a base molding 3002 and a cover molding 3004. The moldings mate together to form the pen body. Although shown with screw fasteners, the moldings may alternatively incorporate snap fasteners. The base molding incorporates an aperture, directly above the nib 3006, to accommodate the imaging field-of-view cone 2100 and illumination field cones 2102. Further apertures in the body accommodate the status LED window 3014, reset switch 3016, and the cable 2504.

The Hyperlabel pen 3000 and the hand-held Hyperlabel scanner 4000 are designed to share the same optics and electronics. The following description therefore focusses on those areas where the pen differs from the scanner.

As shown in FIG. 66, the pen incorporates a force sensor 2430 coupled to the ink cartridge 3006. A housing 3008 contains a pliable sleeve 3010 designed to grip the removable cartridge 3006 and push against an element 3012 which couples it with the force sensor 2430. The force sensor may usefully be of resistive, piezo-resistive, or piezo-capacitive type.

Figure 5B:
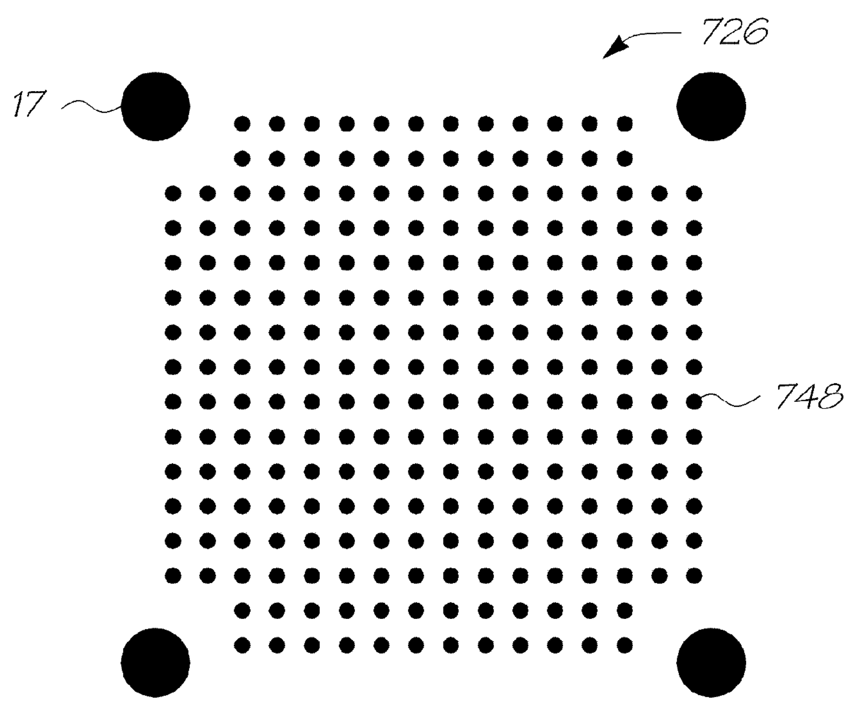
FIG. 5B is a plan view showing a macrodot layout for the tag shown in FIG. 5A.
Figure 68:
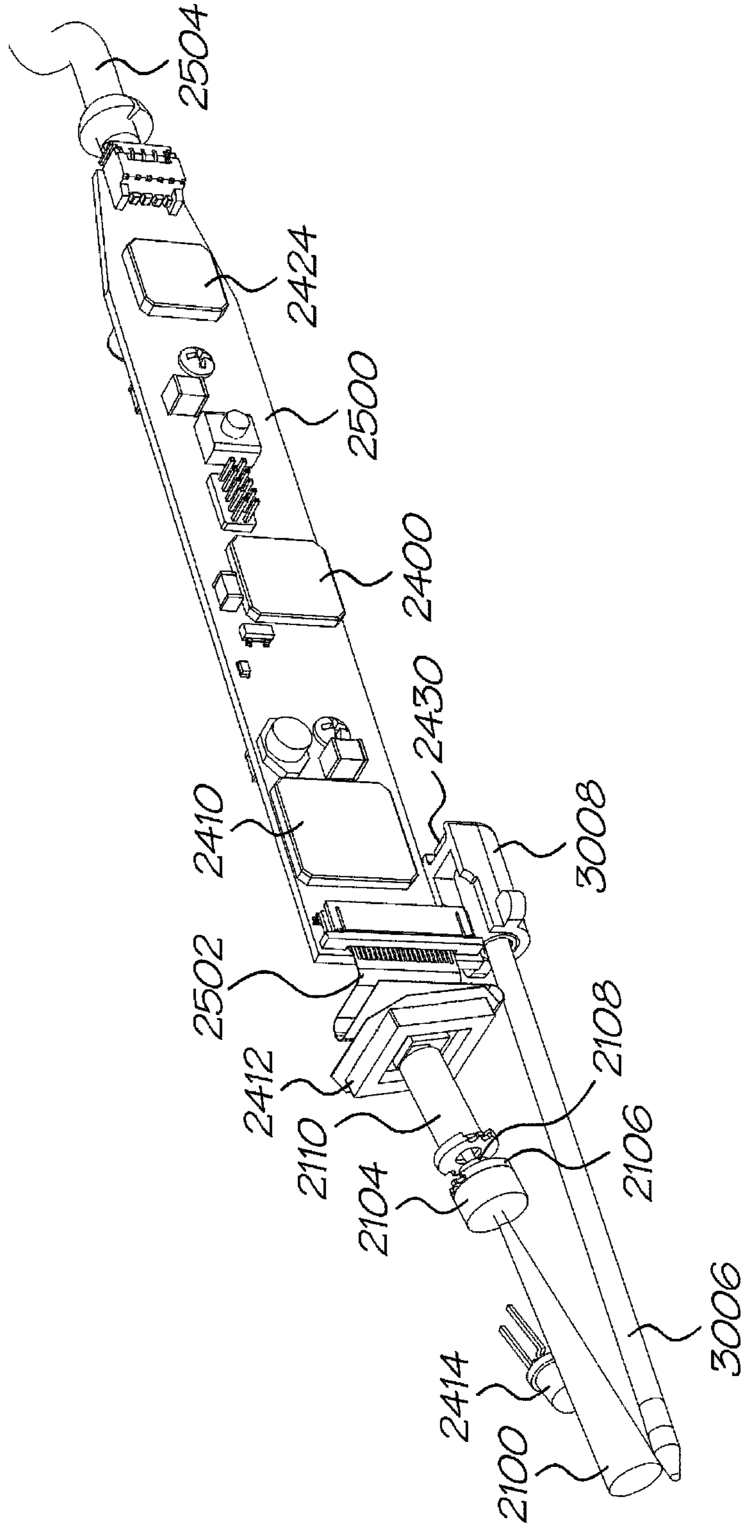
FIG. 68 shows a view of the optical and electronic sub-assemblies of the pen.

FIG. 68 shows the optics and PCB in a linear arrangement suited to the pen, in contrast with the folded arrangement suited to the scanner, as shown in FIG. 5.

As shown in the block diagram of the electronics illustrated in FIG. 12, the controller's ADC 2314 converts the analog signal from the pen's nib-coupled force sensor 2430. The pen optionally incorporates a nib switch 2428, placed in line with the force sensor 2430 to provide a power-efficient and reliable pen-down signal, as well as a basis for force sensor offset calibration. The force signal is included in the digital ink generated by the pen. It may be used in various application-specific ways, including to modulate the thickness of strokes rendered to match the physical strokes produced by the marking nib.

8.4.1.4 Glove Scanner

Figure 70:
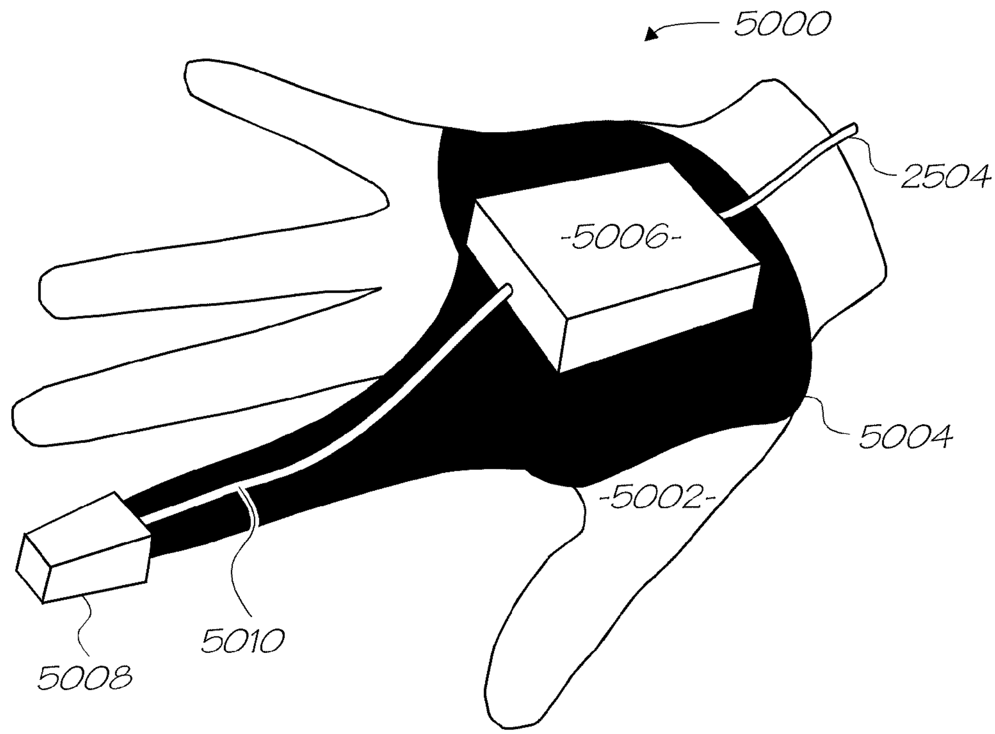
FIG. 70 shows a view of a glove Hyperlabel scanner 5000 according to a preferred embodiment of the present invention.
Figure 71:
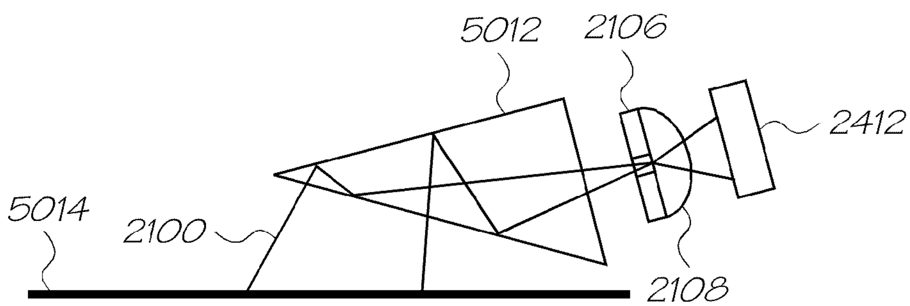
FIG. 71 is a schematic diagram of the optics of the glove scanner of FIG. 70.

FIG. 70 shows a preferred embodiment of a "glove" Hyperlabel scanner 5000. The glove scanner is designed to image and decode Hyperlabel tags when its "thimble" imaging unit 5008 is brought into close proximity or contact with a Hyperlabel tagged surface. The scanner can be operated in free mode, in which it continuously and automatically scans tags within its field of view; or in triggered mode, in which it only scans tags when its trigger is held depressed. Although the scanner is designed with a very limited depth of field, thus reducing the likelihood of unintentional scans in free mode, triggered mode can be used to avoid unintentional scans. Because an individual product item is tagged with a unique item ID, there is no possibility of duplicate scans.

The glove scanner is a general-purpose Hyperlabel scanner particularly suited to automatic scanning of stock during handling, such as during shelf replenishment. Unlike other glove-mounted bar code scanners which image in a direction parallel to the outstretched finger, the Hyperlabel glove scanner images in a direction normal to the underside of the grasping finger. This mode of operation is made possible by the smallness of the field of view required to acquire a Hyperlabel tag, i.e. of the order of 5 mm.

In the glove scanner 5000, the viewing distance is shortened relative to the viewing distance in the hand-held scanner 4000 and netpage pen 3000. This allows the imaging unit 5008 to be compact, but reduces the depth of field. This is not a problem, however, since the imaging unit is designed to be used when close to and parallel to a tagged surface.

The imaging unit 5008 contains the same optical components as the hand-held scanner, including the near-infrared illumination LEDs 2414. In addition, it incorporates a 30-60-90 prism 5012 which folds the imaging cone (to line it up with the image sensor mounted almost normally to the surface 5014) and increases the viewing distance. Since the thimble is less susceptible to ambient light than the hand-held scanner, the near-infrared filter 2104 is optional.

The imaging unit also incorporates the trigger switch (not shown) which registers contact with a tagged surface. Alternatively or additionally, the trigger switch may be placed between thumb and forefinger for manual activation.

The imaging unit incorporates both the image sensor 2412 and the image processor 2410, which are usefully combined into a single compact chip as described in the co-pending U.S. application U.S. Ser. No. 10/778,058 entitled "Image Sensor with Low-Pass Filter", U.S. Ser. No. 10/778,060 entitled "Image Sensor with Range Expender", U.S. Ser. No. 10/778,059 entitled "Pixel Sensor", U.S. Ser. No. 10/778,063 entitled "Image Sensor Timing Circuit", U.S. Ser. No. 10/778,062 entitled "Image Processor with Low Power Mode", U.S. Ser. No. 10/778,061 entitled "Image Processor", and U.S. Ser. No. 10/778,057 entitled "Synchronization Protocol" filed 17 Feb. 2004

The imaging unit 5008 is connected to the processing unit 5006 via a power and high-speed data cable 5010. The remainder of the scanner electronics are incorporated in the processing unit, including the processor 2400 and communications interface 2424. The processing unit is connected to an external control unit via a power and data cable 2504 in the usual way.

Both the imaging unit 5008 and the processing unit 5006 are attached to a harness 5004, constructed from elastic material, which is worn like a glove.

8.4.2.1 Fixed Hyperlabel Laser Scanner

A first example of a design of a fixed Hyperlabel laser scanner 254 will now be described.

Figure 76:
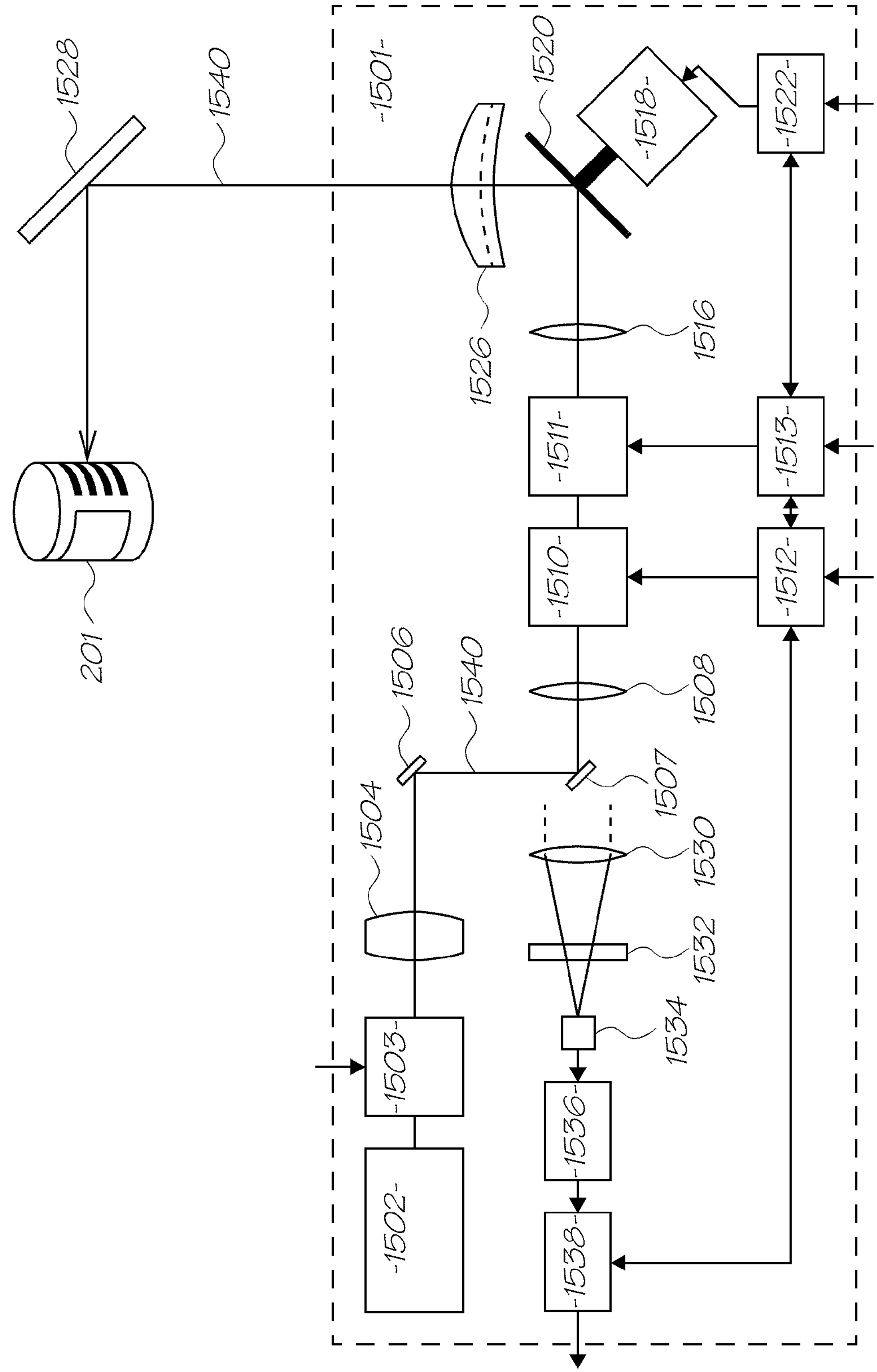
FIG. 76 shows a schematic of the scanning optics and electronics of a first example of a fixed Hyperlabel laser scanner 1500 according to a preferred embodiment of the present invention.

FIG. 76 shows the central unit 1501 of a preferred embodiment of a fixed Hyperlabel laser scanner 1500 suitable for incorporation in a retail checkout 1000.

To accommodate as large a proportion as possible of the full range of product items which may need to be scanned, the Hyperlabel scanner 1500 is designed to accurately scan any item which fits on the 500 mm wide conveyor 1014 of the checkout 1000. It is configured to automatically scan a single item at a time as it passes by on the conveyor at a speed of up to 500 mm/s. It may scan three sides and the tops of items from both sides of the conveyor, up to an item height of 500 mm, thus providing a five-sided scanning function.

The scanner is typically able to scan product items ranging across the full size range, e.g. ranging from packets of corn flakes to packets of chewing gum, as well as partially labelled items such as glass bottles, jars and shrink-wrapped produce.

If the scanner acquires two different item IDs simultaneously then it flags an error to the operator and stops the conveyor, thereby preventing accidental or deliberate (and therefore fraudulent) occlusion of an item by other items. The operator must then move the offending items to the input side of the conveyor and restart the conveyor.

The uniqueness of the item ID prevents any item from being recorded as a sale more than once.

The scanner detects the transit of an object on the conveyor. If it detects the transit of an object which fails to scan, then it flags an error and stops the conveyor. The operator may then move the offending item to the input side of the conveyor and restart the conveyor, or scan the item manually, e.g. using the hand-held Hyperlabel scanner 4000.

Hyperlabel tagging covers a large proportion of the surface of a product item. The basic Hyperlabel scanning strategy therefore consists of sparsely sampling the scan volume. This basic strategy may then be refined to improve scan accuracy and/or scan efficiency.

The acquisition of a two-dimensional Hyperlabel tag requires the scanning of a spatially coherent two-dimensional "patch" large enough to be guaranteed to contain at least one entire tag. This contrasts with the acquisition of a one-dimensional bar code, which only requires the scanning of a spatially coherent line. There is therefore a fundamental requirement to provide two levels of beam steering, where the first level provides the two-dimensional scan of the beam within a patch, and the second level provides the two- or three-dimensional scan of the patch within the scan volume. For the purposes of the following discussion the second level of beam steering is taken to apply to a "patch beam".

As described earlier in this specification, a Hyperlabel tag has a maximum feature period of about 150 microns. Assuming a sampling rate of two and a minimum inclination between a tagged surface and the scan beam of 45 degrees, a sampling spot period of 50 microns and a sampling spot size of between 50 and 100 microns is required, depending on beam cross-section. At a sampling rate of two, the required circular field of view has an image-space diameter of about 150 pixels. This in turn determines the dimensions of the patch, i.e. 150 by 150 pixels.

As shown in FIG. 76, a scan beam 1540 is produced by a laser 1502. The laser produces a narrowband near-infrared beam matched to the peak wavelength of the near-infrared ink used to print the Hyperlabel tags. An optional amplitude modulator 1503 allows the amplitude of the beam to be modulated, e.g. for ranging purposes as discussed below. An optional beam expander 1504 allows the beam to be reduced to produce the desired spot size. The laser may be a solid-state or gas laser such as HeNe laser.

A pair of mirrors 1506 and 1507 injects the scan beam into line with the retroreflective collection system, as described further below.

An optional focussing lens 1508 focusses the beam prior to steering. A first deflector provides horizontal deflection of the beam within a scan line of the patch. A second deflector 1511 provides vertical deflection of the beam between scan lines of the patch.

The maximum pixel sampling rate of the patch is usefully derived from the maximum operating frequency of commercially-available horizontal deflectors. There are a number of available alternatives, including acousto-optic deflectors, resonant scanners and rotating polygon mirrors. A practical upper limit on the operating frequency of these devices is about 500 KHz, and this is taken as the scan line rate for the purposes of the following description.

Given a patch width of 150 pixels, the pixel rate of the scanner is therefore 75 MHz and the pixel time is 13 nanoseconds. The scan line time is 2 microseconds, but to achieve line separation the actual scan line rate is 250 KHz rather than 500 KHz. The minimum patch time is therefore 600 microseconds and the maximum patch rate is 1.6 KHz.

The vertical deflector 1511 is only required to operate at the maximum patch rate of 1.6 KHz. Again there are a number of available alternatives, including acousto-optic deflectors, resonant scanners, rotating polygon mirrors, galvanometers and piezoelectrically-actuated platforms.

The two deflectors 1510 and 1511 are driven by synchronised drivers 1512 and 1513 respectively, each incorporating scan generation, amplification etc.

The angle of the output beam of the horizontal and vertical deflectors 1510 and 1511 is transformed into a spatial offset within the patch by an angle-to-displacement transform lens 1516. This has the benefit that the bundle of (time-displaced) scan beams which make up the patch beam is collimated, thus the sampling frequency of the patch is unaffected by distance to the tagged surface.

Figure 77:
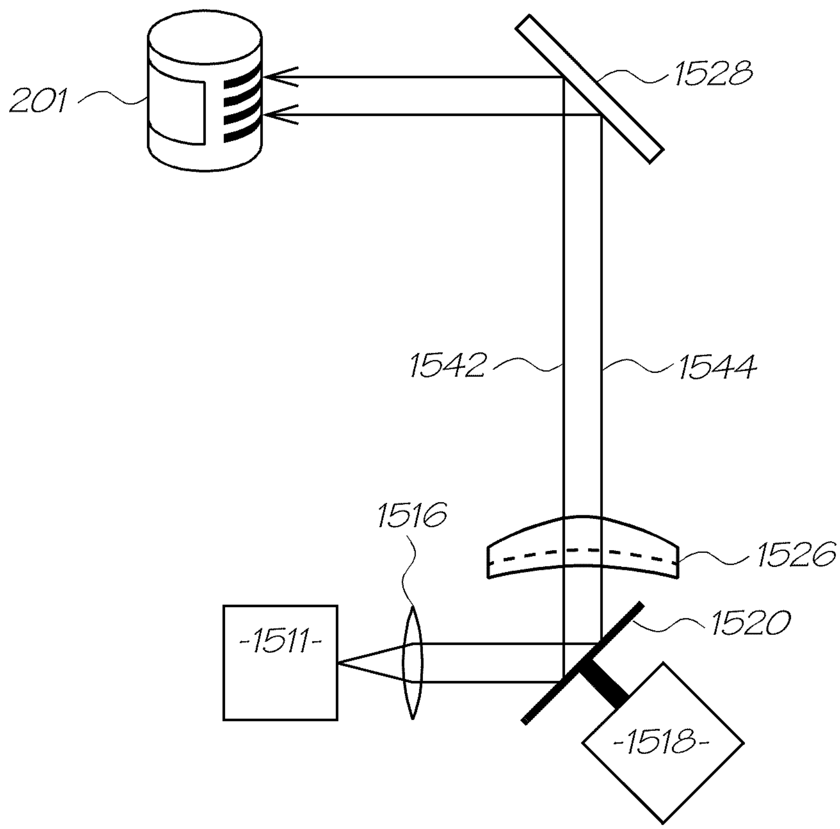
FIG. 77 shows the beam steering mirror of the scanner in a nominal position.
Figure 78:
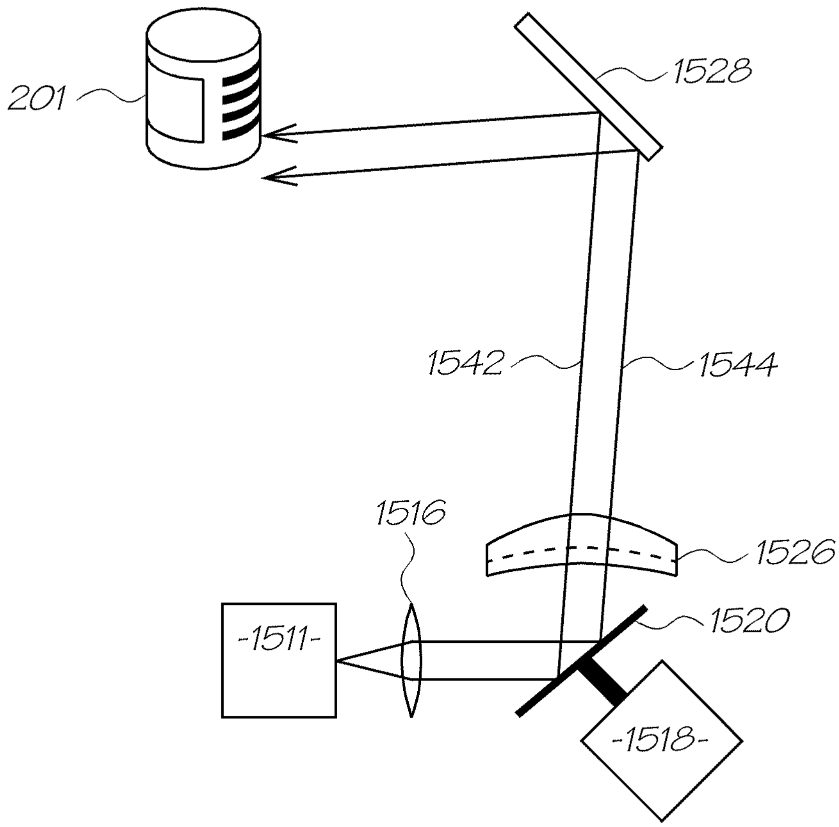
FIG. 78 shows the beam steering mirror of the scanner in a “low” position.
Figure 79:
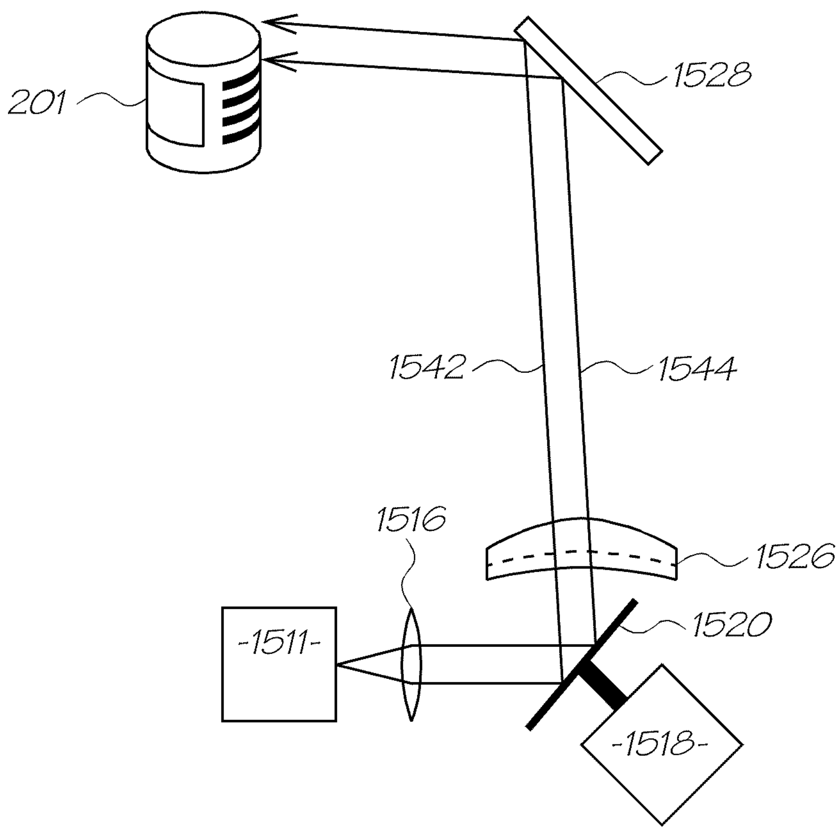
FIG. 79 shows the beam steering mirror of the scanner in a “high” position.
Figure 80:
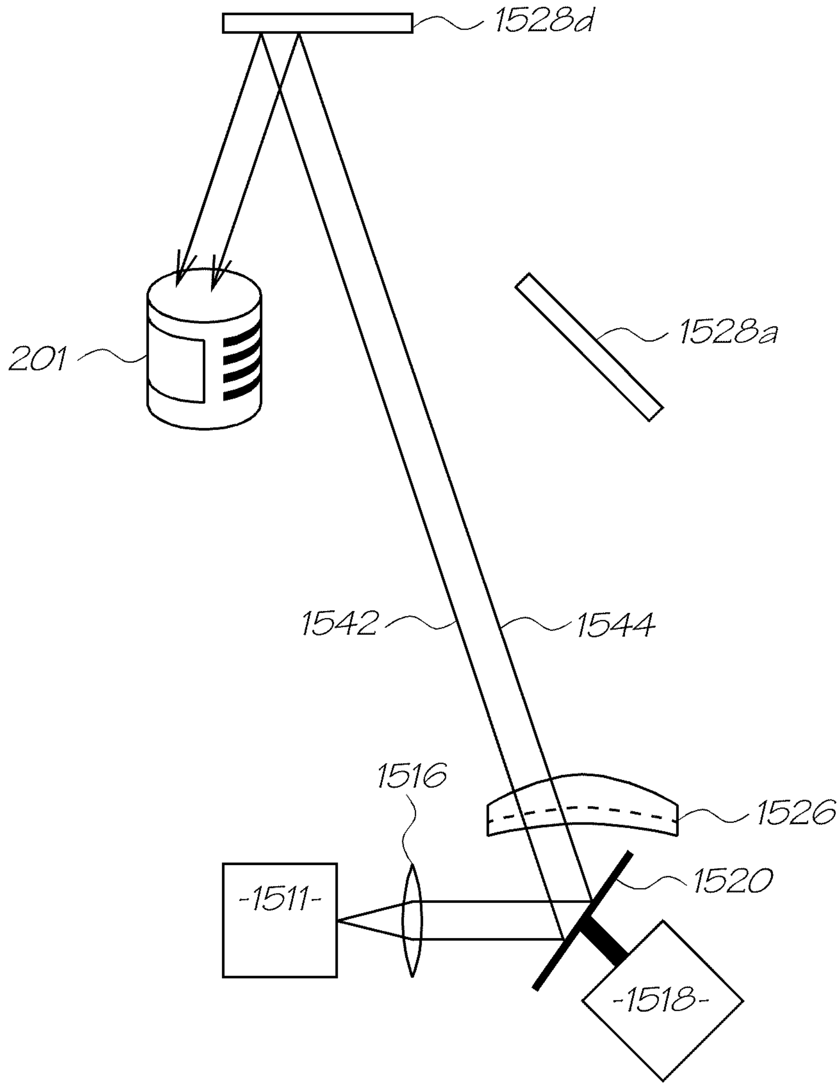
FIG. 80 shows the beam steering mirror of the scanner selecting an alternative deflection mirror.
Figure 82:
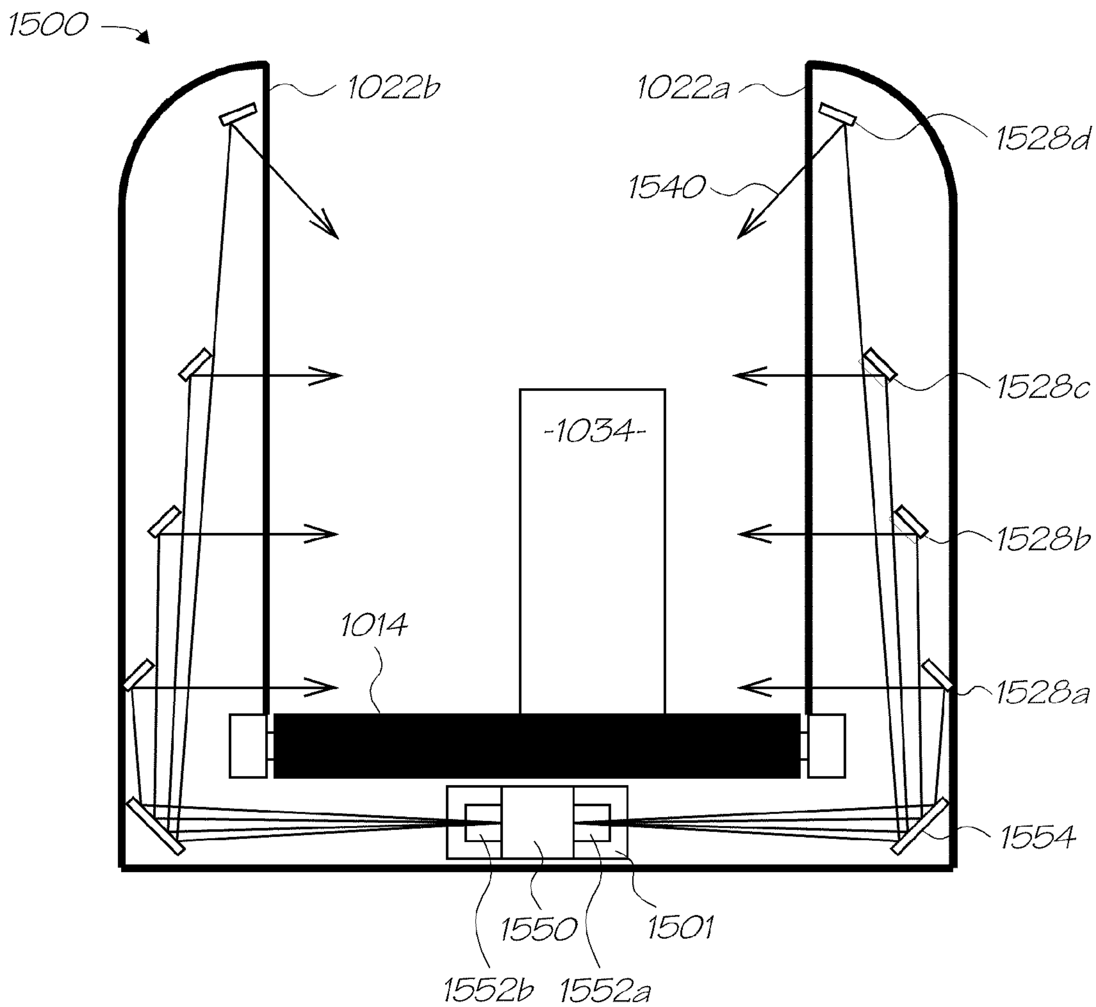
FIG. 82 shows an elevation view of the scanner incorporated in the checkout.
Figure 84:
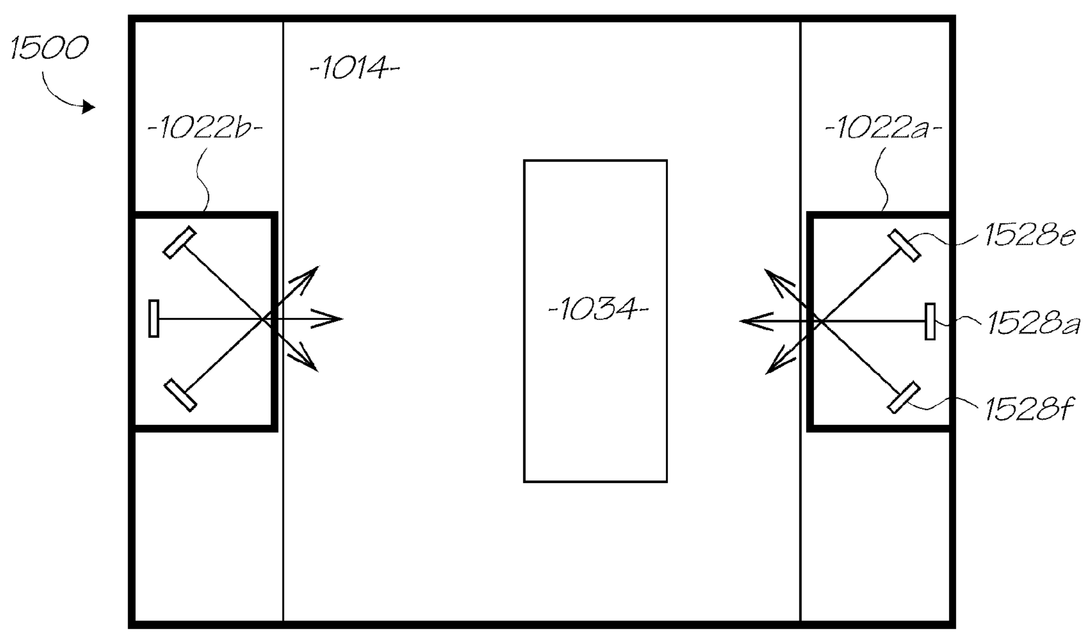
FIG. 84 shows a plan view of the scanner incorporated in the checkout, showing beam paths above the conveyor.

The patch beam is steered by a mirror 1520 attached to a piezoelectric tip-tilt platform 1518. Fine steering control within the scan volume is achieved by steering the patch beam within the confines of a scan mirror 1528, as illustrated in FIG. 77, FIG. 78 and FIG. 79. Gross steering control within the scan volume is achieved by steering the patch beam between different scan mirrors **1528*a*, 1528*b* etc., as illustrated in FIG. 80, FIG. 82 and FIG. 84. Although FIG. 82 shows four scan mirrors 1528*a*, 1528*b* etc. arranged vertically, and FIG. 84 shows three scan mirrors 1528*a*, 1528*e* and 1528*f*** arranged horizontally, there are in practice any number of scan mirrors distributed both vertically and horizontally within the scan posts to effect omnidirectional scanning.

A typical tip-tilt platform has a resonant frequency of about 1 KHz, i.e. an access time of about 1 millisecond. This results in an effective patch rate of about 600 Hz. Faster beam-steering solutions, such as acousto-optic deflectors, may be used to achieve patch beam steering at the maximum patch rate.

As shown in FIG. 84, scan mirrors **1528*e* and 1528*f*, located at the sides of the scan posts 1022** and facing diagonally across the scan volume between the scan posts, provide support for scanning the leading and trailing side of a product item, i.e. just after the item enters the scan volume and just before the item leaves the scan volume respectively.

The focus of the beam can be dynamically adjusted for the path length associated with the selected scan mirror. The focus of the beam can be altered by translating a lens element, e.g. within the beam expander 1504, using a precision piezoelectric translation stage.

Depending on the characteristics of the beam produced by the laser 1502, and on the required spot size, the depth of field of the scan beam can be increased by dividing the scan volume into two or more depth zones and individually scanning patches in all zones with zone-specific beam focus.

The deflector drivers 1512 and 1513 may modulate the pixel and line scan rate to accommodate patch distortion caused by the state of the tip-tilt platform 1518.

The patch beam is focussed and its focal plane is flattened by a focussing and field-flattening lens 1526.

During the "exposure" time of a single pixel the scan beam spot effectively rests at a single point on the product item 201. The speed of the conveyor induces a negligible skew. Even during the 300-microsecond scan time of the entire patch, the object moves only about 150 microns, i.e. about 3% of the patch size.

Although conveyor motion with respect to patch size is nominally minimal, the motion may be irregular due to the imprecise nature of the coupling between the motor and the conveyor. The scanner may therefore include a motion sensor 1556 which senses the actual motion of the conveyor, and may use the resultant known motion of the conveyor to correct any motion-induced distortions in the sampled patch, such as inter-line skew.

Figure 81:
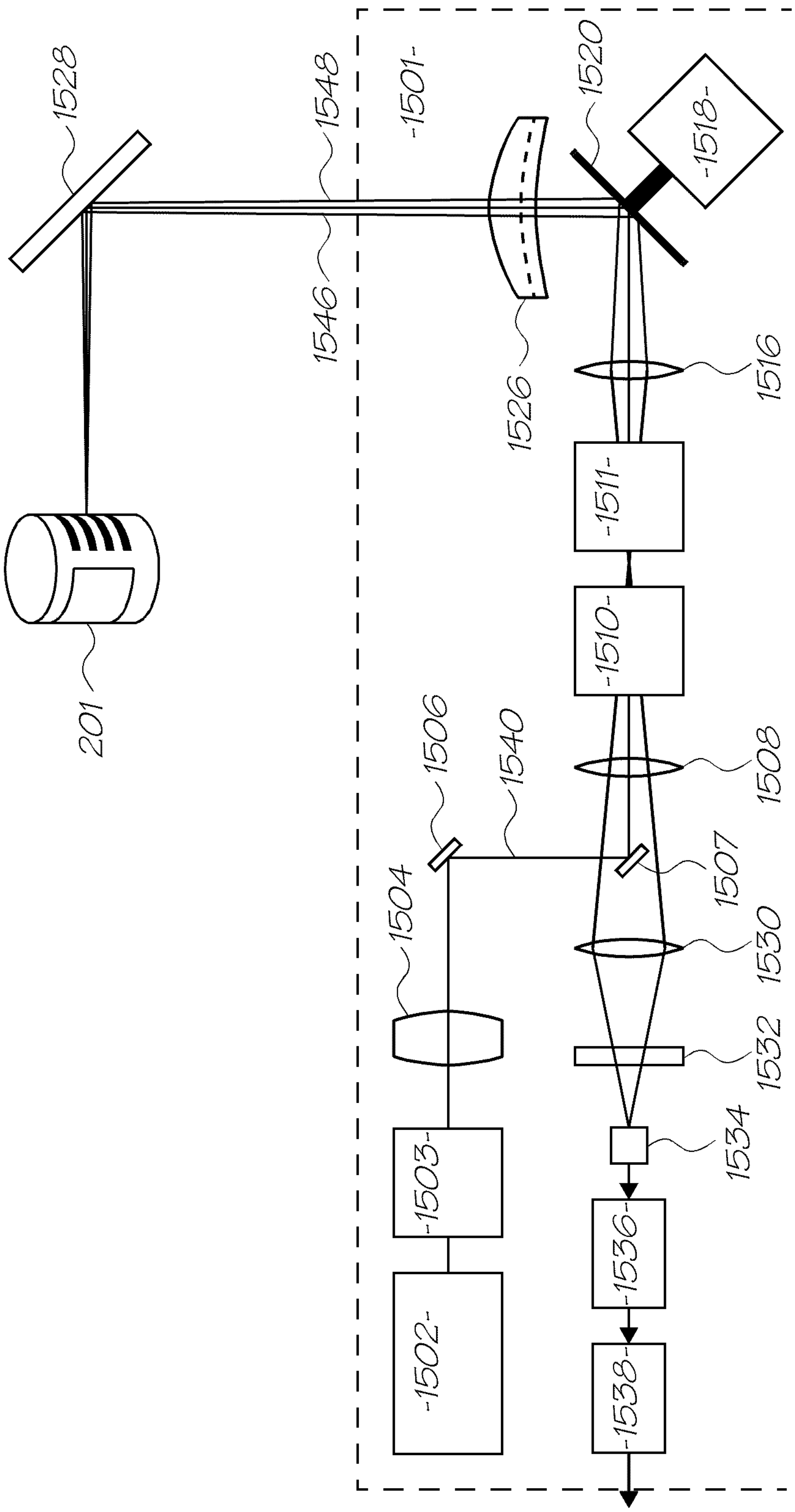
FIG. 81 shows the return light detection path of the scanner.

As shown in FIG. 81, the scanner's light collection system is retroreflective, significantly increasing the scanner's signal-to-noise ratio. As shown in the figure, divergent rays 1546 and 1548, diffusely reflected where the scan beam strikes the surface of the tagged product item, converge through the transform lens 1516, follow the reverse path of the scan beam through the deflectors 1511 and 1510 to emerge centered on the scan beam, are largely unaffected by the focussing lens 1508, largely bypass the mirror 1507, and are finally focussed by a collecting lens 1530 onto a photodetector 1536. An optional near-infrared filter 1532 further helps reject of ambient light. The photodetector is of any suitable type, such as a solid-state photodiode or a photomultiplier tube.

The signal from the photodetector is amplified by amplifier 1536 and is converted to a digital value by analog-to-digital converter (ADC) 1538. The ADC operates at the scanner's pixel rate, i.e. 100 MHz. The ADC is synchronised with the horizontal deflector driver 1512.

Figure 85:
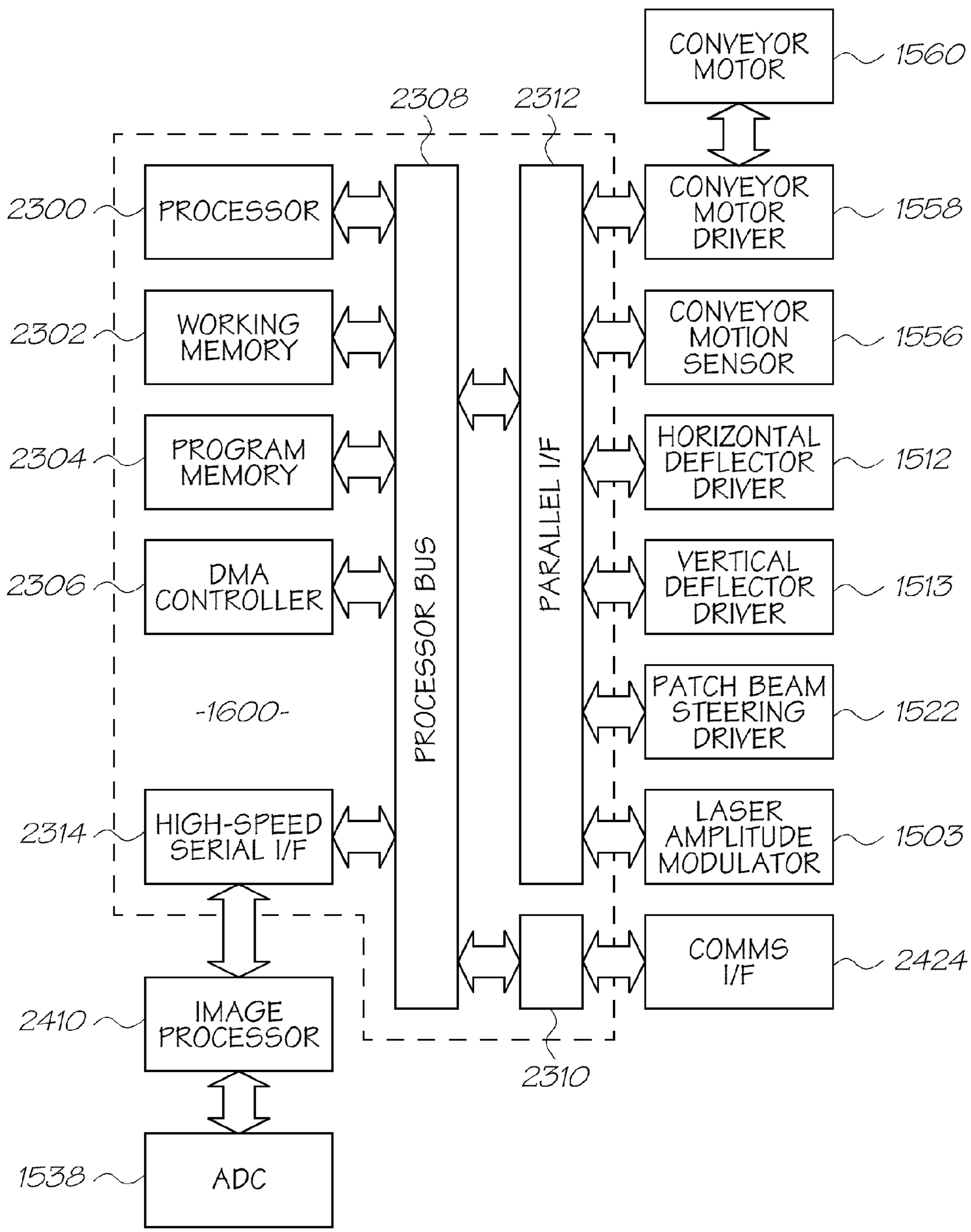
FIG. 85 shows a block diagram of salient aspects of the electronics of the scanner FIG. 76; and, FIG. 86 shows a schematic of a second example of a fixed Hyperlabel laser scanner 1500 according to a preferred embodiment of the present invention.

FIG. 85 shows a block diagram of the electronics of the scanner, including an integrated scanner controller 1600. Where reference numbers in FIG. 85 match those described in FIG. 69, they refer to the same or similar components and functions.

The fixed Hyperlabel scanner 1500 utilises the same image processor 2410 as the hand-held Hyperlabel scanner, and netpage pens described in FIGS. 8, 9, 65 and 58, here configured to directly capture the digital output of the ADC 1538. The controller 1600 is a higher-performance but otherwise similar controller to the controller described in FIG. 69. It decodes Hyperlabel tags in real time and communicates the resultant scan data over the communications interface 2424 to the control unit or retail processing system to which the scanner is attached. It controls the conveyor motor 1560 via the conveyor motor driver 1558. It controls the scanning operation via the horizontal and vertical deflector drivers 1512 and 1513, and the tip-tilt patch beam steering driver 1522. During range finding it controls the amplitude of the laser beam via the amplitude modulator 1503.

As an alternative to the retroreflective collection system, or in addition to it, one or more photodetectors with collection lenses and near-infrared filters may be placed closer to the scan volume, i.e. within the scan posts 1022.

Figure 83:
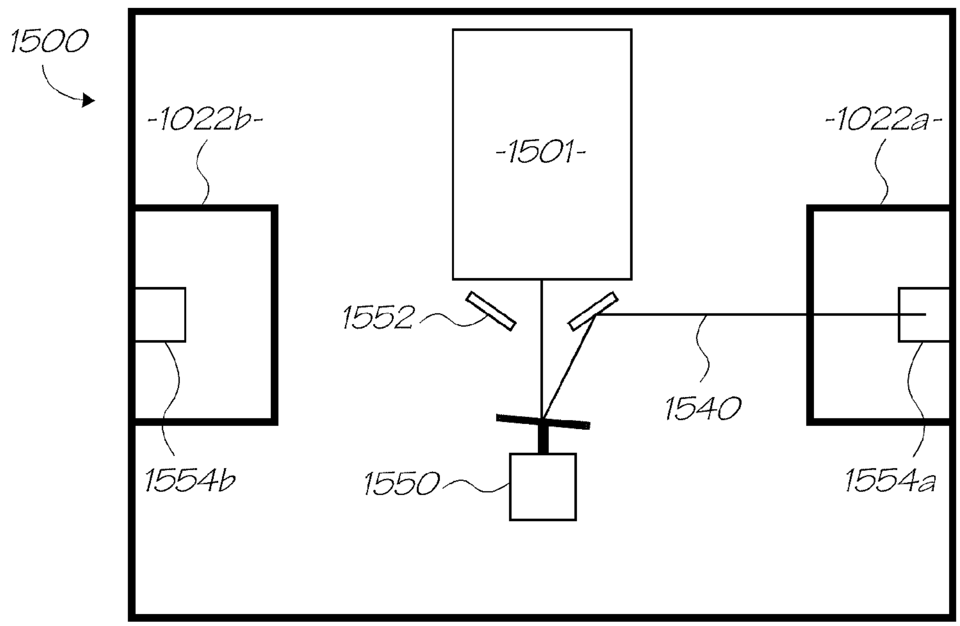
FIG. 83 shows a plan view of the scanner incorporated in the checkout, showing beam paths below the conveyor.

As shown in FIG. 82 and FIG. 83, the scanner's central unit 1501 is designed to be housed below the conveyor 1014, and to be time-multiplexed between the two scan posts 1022. An additional tip-tilt mirror 1550 is used to direct the scan beam to mirror 1552 associated with one or other scan post, and thence to mirror 1554 which directs the beam up the corresponding scan post 1022 to mirrors **1528*a*** etc. to effect the omnidirectional scan.

Rather than time-multiplexing a single scanner unit 1501, it is also possible to use two separate scanner units.

The scanner can be operated as a range finder by modulating a pulse onto the scan beam 1540, using the amplitude modulator 1503, and precisely measuring the nanosecond-scale time-of-flight of the pulse to the photodetector 1534.

Range finding can be used for two distinct purposes. It can be used to detect the presence or absence of an object in the scan volume, and it can be used to determine the distance to the object surface, i.e. the depth of the object surface with respect to the scanner. The known depth of object surface being scanned can be used on a per-patch basis to optimise the focus of the beam and hence the scan spot size.

The scanner may also employ adaptive focus. If it succeeds in acquiring tag targets within a particular patch, but fails to successfully acquire and decode the tag data, then it may rescan the patch with a different beam focus.

The scanner may usefully operate in three modes. In the first "detection" mode the scan volume is nominally empty and the scanner is attempting to detect an object on the input edge of the scan volume, either using range finding or using a separate object detector based on one or more light sources and photodetectors.

In the second "profiling" mode the scan volume contains a detected object and the scanner is determining the two- or three-dimensional profile of the object from the point of view of the scanner, using rapid range finding throughout the scan volume.

In the third "scanning" mode the scan volume contains a profiled object and the scanner is actively scanning the object as described previously. Given a known object profile the scanner can optimise the patch distribution to evenly cover the object and maximise the chances of tag acquisition.

It is also possible to operate the scanner with a fixed patch scan pattern rather than a scan pattern adapted to the profile of the object. In this case the tip-tilt steering mirror 1520 may be replaced by a rotating holographic disc, each of whose segments encodes a different beam direction (and possibly beam focus). In this way the beam can be steered at in an arbitrary pre-determined pattern at the maximum patch rate. A scanner which utilises a holographic disc is described in Dickson, L. D. and G. T. Sincerbox, "Optics and holography in the IBM supermarket scanner", in *Selected Papers on Laser Scanning and Recording*, SPIE Volume 378, referenced below.

The maximum patch rate of the scanner means that it can densely scan the 500 mm height and 500 mm depth of the scan volume at about 8 Hz (or at half this rate if time-multiplexed between the two sides of the conveyor). At a conveyor speed of 500 mm/s, the scanner is able to perform 5 such scans during 300 mm of product item movement. This provides coverage of the three sides and top of the product item required to be scanned by the scanner from one side of the conveyor.

If a fixed scan pattern is used then the scanner has no profiling mode.

Although this description has assumed a pixel rate of 100 MHz, the scanner can be configured to operate at a lower rate. In this case the patch size is widened to accommodate increased skew induced by conveyor motion. Alternatively, the maximum speed of the conveyor may be reduced.

A number of components, systems and techniques related to the present invention are described in Beiser, L. and B. J. Thompson (eds.), *Selected Papers on Laser Scanning and Recording*, SPIE Volume 378 (SPIE 1985), and in Smith, W. J., *Modern Optical Engineering,* 3rd edition (McGraw-Hill 2000), the contents of both of which are herein incorporated by cross-reference.

8.4.2.2 Fixed Hologram Controlled Hyperlabel Laser Scanner

Figure 86:
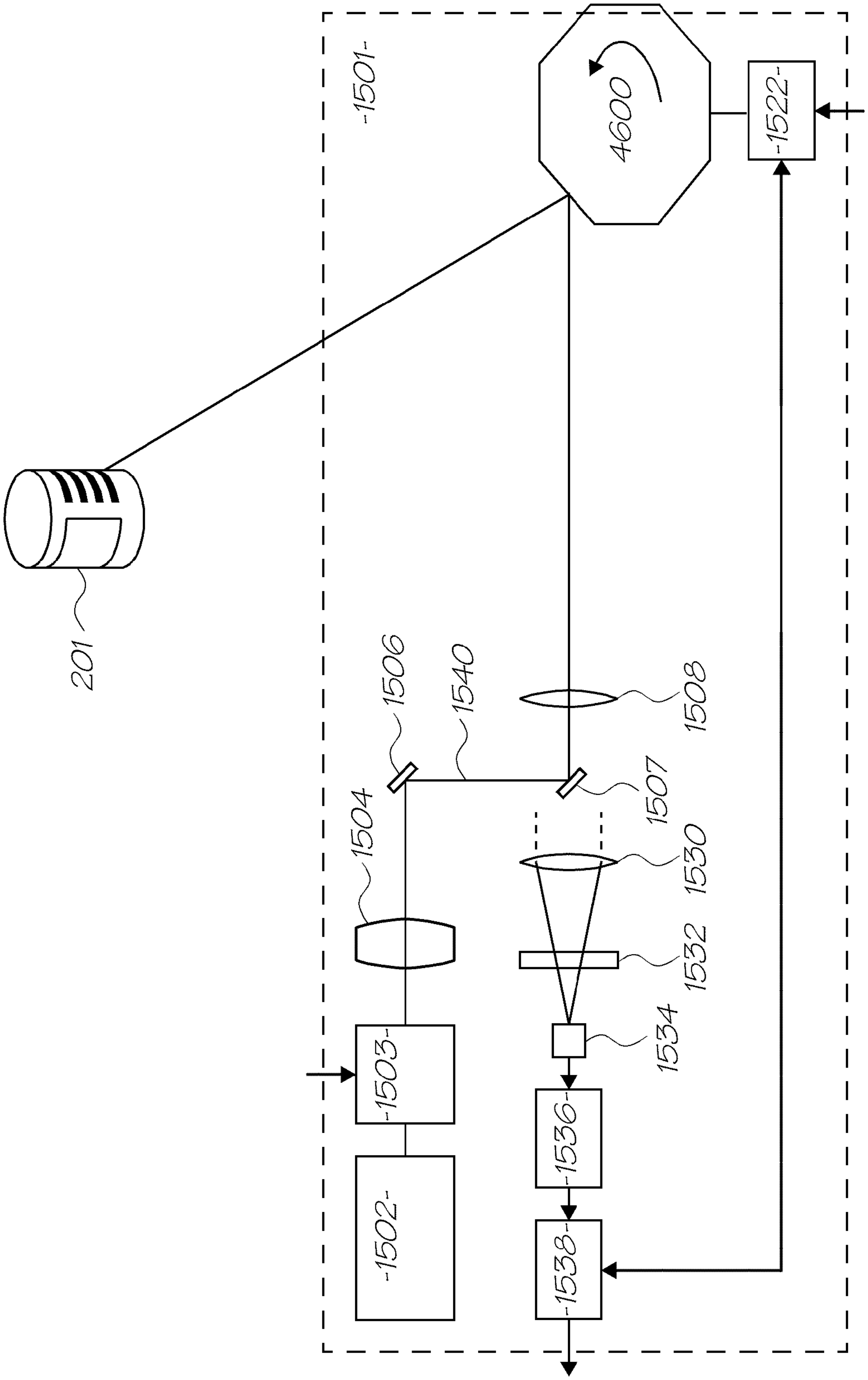

As an alternative to using the mirror based system to control the scanning beam, a holographic optical element may instead be used. An example of this will now be described with reference to FIG. 86.

In this example, a rotating holographic optical element 4600 is designed to both generate a scanning beam which moves over a patch, and to position the patch on the product item 201. This therefore removes the requirement for both the horizontal and vertical deflectors 1510 and 1511, and the mirror based control system 1518, 1528, as shown.

Figure 87:
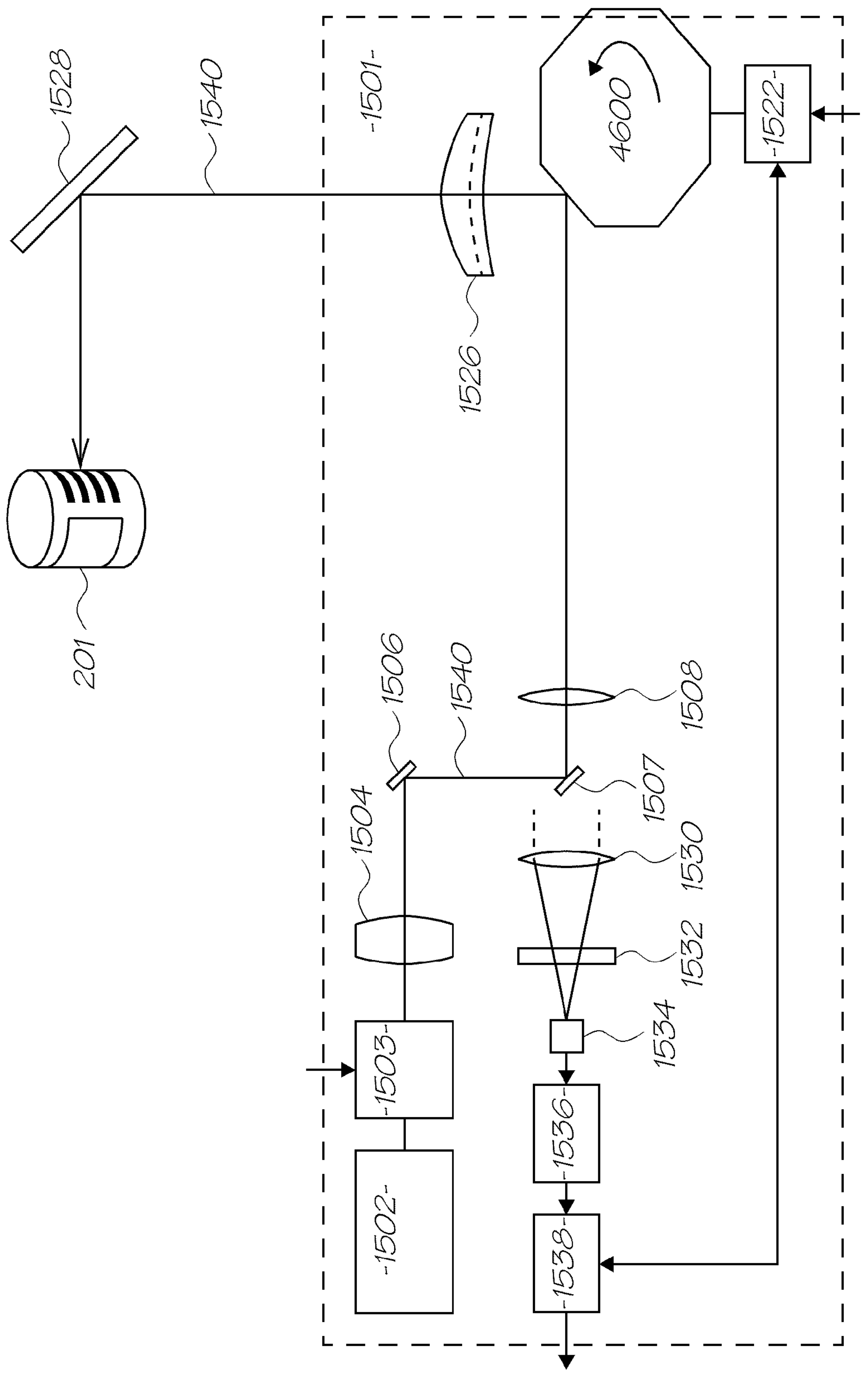
FIG. 87 shows a schematic of a third example of a fixed Hyperlabel laser scanner 1500 according to a preferred embodiment of the present invention.
Figure 88:
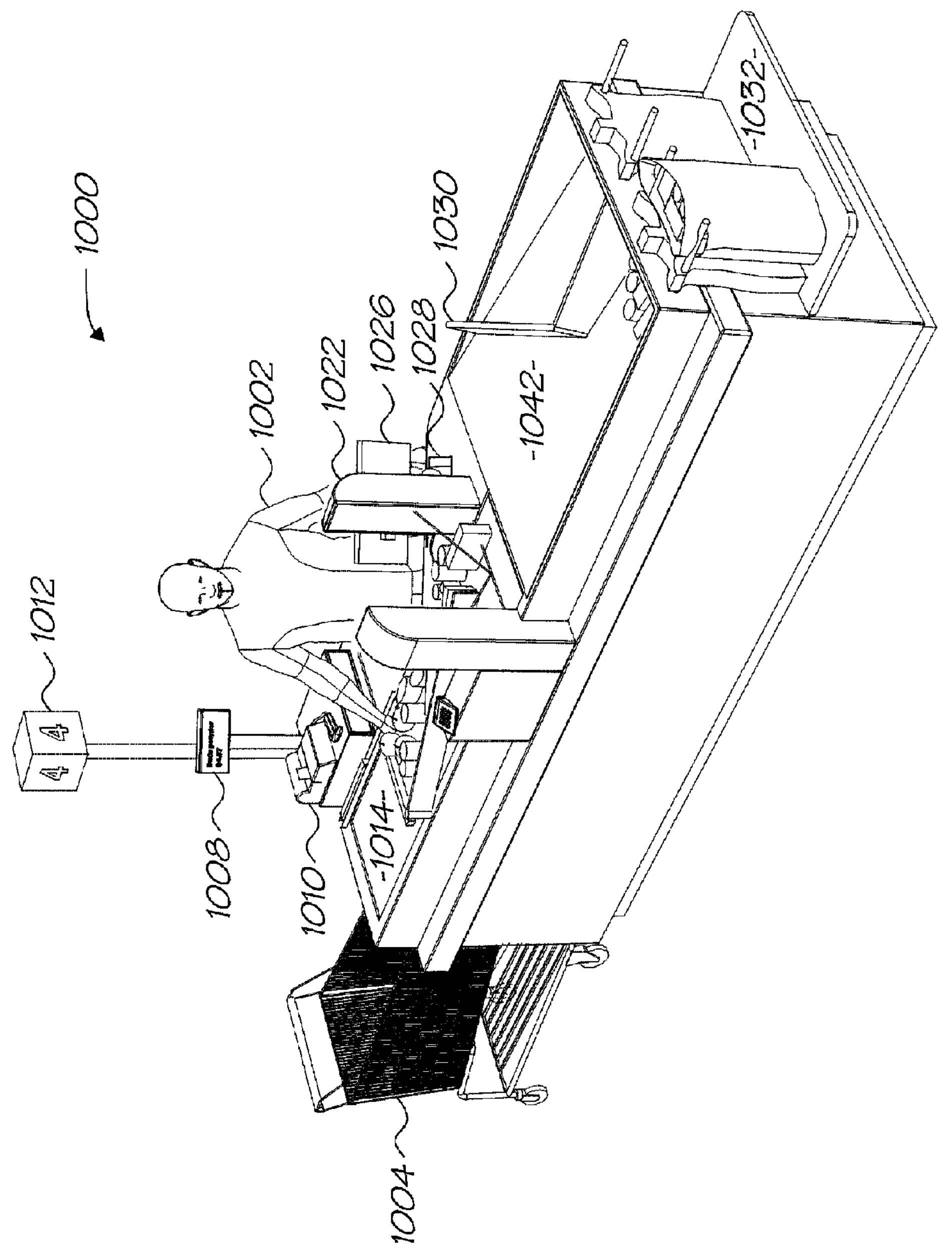
FIG. 88 shows a view of a first example of a checkout 1000 incorporating a fixed Hyperlabel laser scanner 1500, both according to preferred embodiments of the present invention.
Figure 89:
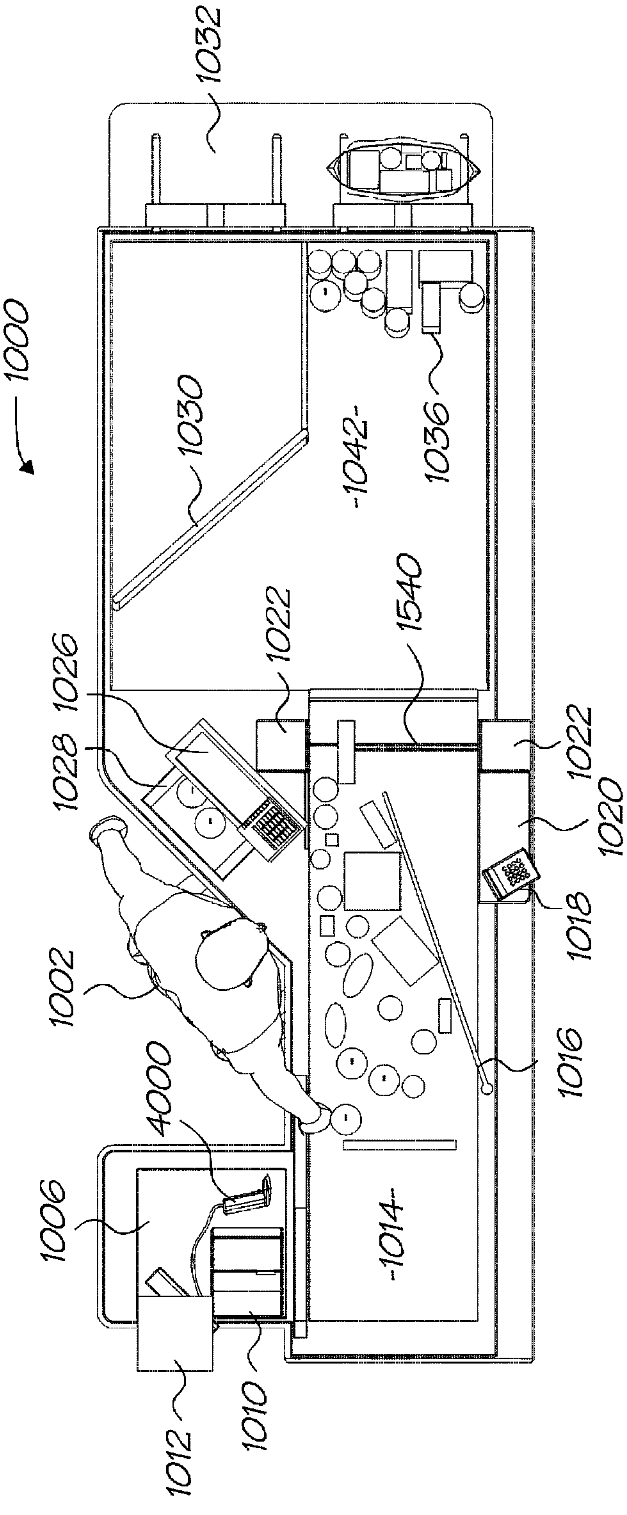
FIG. 89 shows a plan view of the checkout of FIG. 88.
Figure 90:
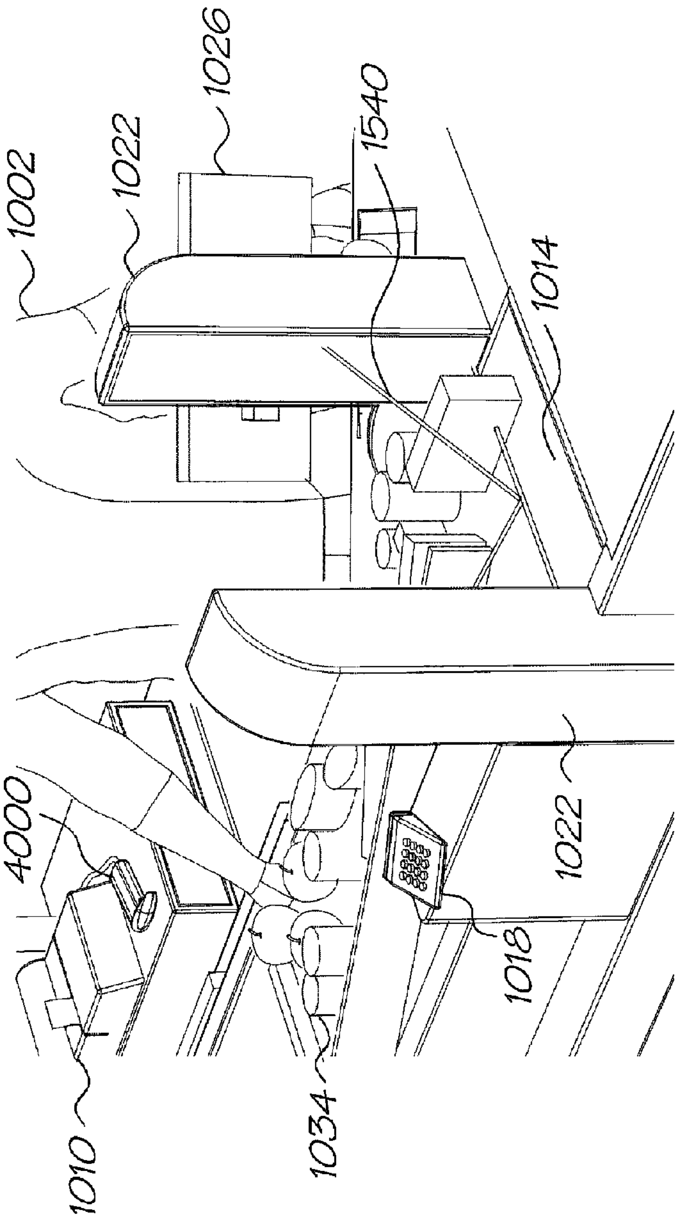
FIG. 90 shows a close-up view of the checkout of FIG. 88.
Figure 91:
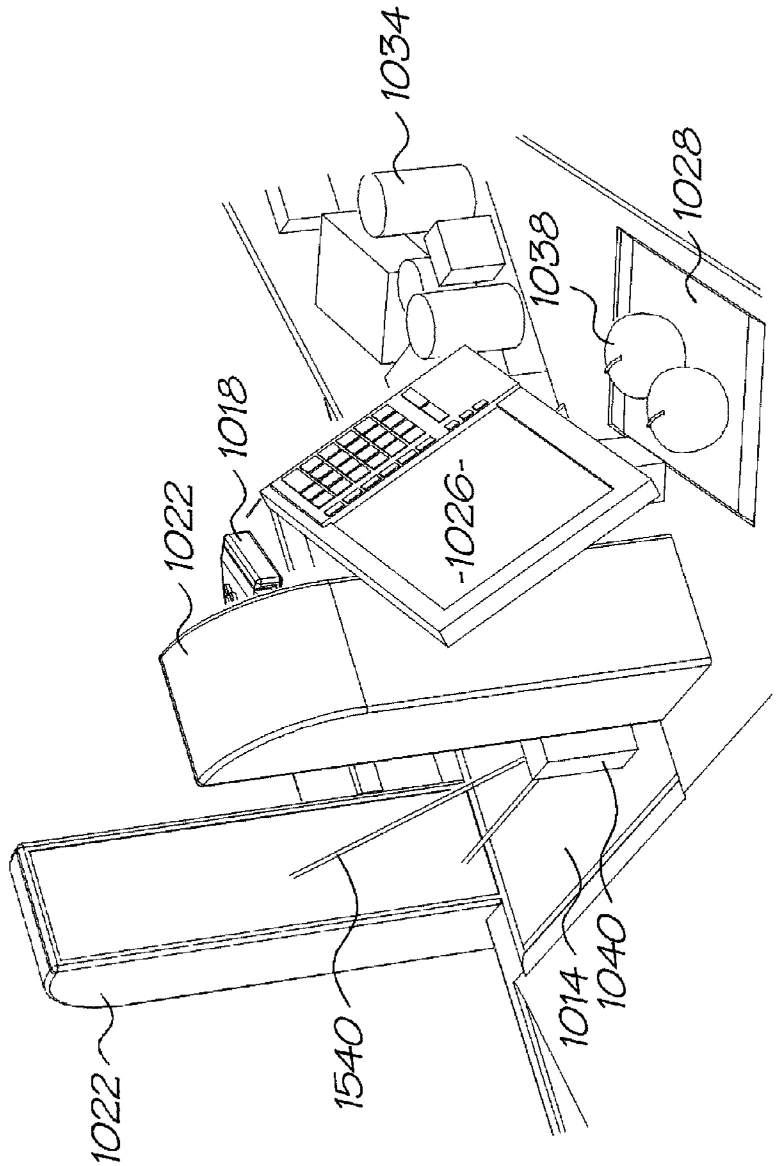
FIG. 91 shows close-up view of the checkout of FIG. 88 from the operator’s point of view.

The functioning of the device otherwise is substantially as described above with respect to the mirror based control system and will not therefore be described in any further detail. However, it will be appreciated by persons skilled in the art that the holographic element may direct the patch beam onto a number of mirrors equivalent to the mirrors 1528, to allow for appropriate directing of the scanning beam onto the product item 201, as shown in FIG. 87.

Alternatively, the beam may be aimed directly into the sensing region. In this latter case, it will be appreciate that the patch beam will enter the sensing region from substantially one direction. However, this still allows retail checkouts to be achieved as will be described in more detail below.

8.4.3.1 Column Array Based Retail Checkout

FIG. 88, FIG. 89, FIG. 90 and FIG. 91 show a first example of a retail checkout 1000 which incorporates and is adapted to exploit the fixed Hyperlabel laser scanner 1500. This may be either the mirror based or hologram based laser scanner systems, as will be appreciated by persons skilled in the art.

The checkout is designed to semi-automatically scan grocery and other items conveyed past the Hyperlabel scan posts 1022. The customer transfers items from a shopping cart 1004 to the conveyor 1014. The checkout operator 1002 ensures that tagged product items 1034 proceed through the scanner singly, but otherwise allows scanning to proceed automatically. Unique item IDs make semi-automatic scanning possible, and semi-automatic scanning of unique IDs result in more accurate scanning and prevents fraudulent collusion between the operator and the customer.

The operator diverts untagged items such as fruit and vegetables to a set of scales 1028 for manual entry via the register touchscreen 1026.

Tagged items slide off the conveyor into an output holding area 1042 after being scanned. Manually-processed untagged items are pushed by the operator into the holding area. The holding area includes a moveable boom 1030 which allows the holding area to simultaneously receive items for one customer while holding items for the previous customer. This allows the previous customer to continue bagging items in the bagging area 1036 while the next customer is being serviced, thus optimising checkout throughput.

The checkout includes a register display 1008 visible to the customer. This displays the description and price of the most recently scanned or manually entered item, as well as the running total. An indicator post 1012 incorporated in the checkout advertises the checkout's number, availability and other status information.

A hand-held Hyperlabel scanner 4000 allows the operator to manually scan bulky items or items which otherwise fail to scan automatically.

The checkout also includes a cash drawer 1006, EFTPOS terminal 1018, transaction counter 1020, and receipt printer 1010. The receipt printer may be a netpage printer, as described in the main part of this specification, thus providing the customer with the downstream benefits of netpage interactivity, such as the ability to record receipted items in a personal inventory, update a transaction history, and obtain product-level and item-level information about receipted items.

The receipt may also be printed on the reverse side with netpage-interactive advertising, special offers, and redeemable coupons.

To support interoperability with bar coded as well as RFID tagged items, the checkout may incorporate a traditional bar code reading capability as well as an RFID tag reading ability.

Both the fixed Hyperlabel laser scanner 1500 and the hand-held Hyperlabel scanner 4000 can provide scan data in a standard format and according to standard interfaces and protocols, and can thus be essentially plug-compatible with other item ID (e.g. EPC) scanners such as RFID readers.

8.4.3.2 Transparent Conveyor Based Retail Checkout

In an alternative configuration, the laser based scanning system is provided within the checkout to direct the scanning beam into the sensing region through the conveyor.

Figure 92:
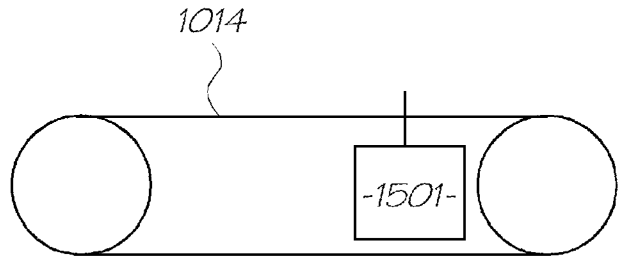
FIG. 92 shows a side view of the conveyor of a second example of the checkout of FIG. 88.

In this example, shown in FIG. 92, the central unit 1501 of the scanning device is positioned below the conveyor to allow the scanning beam to pass through the conveyor into the sensing region. Similar reference numerals to FIGS. 88 and 89 denote similar elements, and will not therefore be described in detail.

In this example, the conveyor belt 1014 is made at least partially invisible to infrared radiation. This is preferably achieved by providing holes in the conveyor belt which are of a sufficient area to allow the scanning beam to illuminate the product item and for the reflected radiation to pass back through the hole and be detected by the central unit 1501, as shown in FIG. 92.

This may be achieved by having the entire conveyor belt, or a portion 1014*a* thereof constructed from a mesh which has sufficient apertures for the laser scanning beam to pass therethrough.

Alternatively, this may be achieved by utilising an infrared-transparent conveyor belt which is infrared-transparent almost over the entire surface or at least a portion thereof. For example, a infrared-transparent strip 1014*a* could be provided along the centre of the conveyor belt as shown.

Operation is then substantially as described above.

It will be appreciated that this could be utilised in addition to the column based checkout system described above to thereby further enhance the chance of product items scanning correctly regardless of their orientation on the conveyor belt.

8.4.4 Other Scanner Configurations

The Hyperlabel laser scanner 1500 may usefully be incorporated in other checkout devices.

A variant of the Hyperlabel laser scanner may be incorporated in a self-checkout where the customer is responsible for scanning items. Even if the customer is still required to manually present items to the scanner, the unique item ID ensures that duplicate scans do not occur, and Hyperlabel tagging ensures that the customer is more easily able to scan items without having to be concerned with correctly presenting a bar code.

A variant of the Hyperlabel scanner may also be incorporated in a shopping cart in such a way that items added to the cart are automatically scanned and added to a record of the cart's content, and items removed from the cart are automatically scanned and removed from the record of the cart's content. In the shopping cart the scanner is configured to densely scan two scan volumes, each of which covers the entire opening into the cart. One scan volume lies above the other, and the scanner is configured to distinguish an item addition from an item removal based on the order in which the item's ID is scanned in the two scan volumes. Beam coverage of the scan volumes is assisted by mirrors mounted around the opening into the cart.

8.5 Hyperlabel-Based Netpage Interactions

A product item whose labelling, packaging or actual surface has been Hyperlabel tagged provides the same level of interactivity as any other netpage.

There is a strong case to be made for netpage-compatible product tagging. Netpage turns any printed surface into a finely differentiated graphical user interface akin to a Web page, and there are many applications which map nicely onto the surface of a product. These applications include obtaining product information of various kinds (nutritional information; cooking instructions; recipes; related products; use-by dates; servicing instructions; recall notices); playing games; entering competitions; managing ownership (registration; query, such as in the case of stolen goods; transfer); providing product feedback; messaging; and indirect device control. If, on the other hand, the product tagging is undifferentiated, such as in the case of an undifferentiated 2D barcode or RFID-carried item ID, then the burden of information navigation is transferred to the information delivery device, which may significantly increase the complexity of the user experience or the required sophistication of the delivery device user interface.

8.5.1 Product Registration

A Hyperlabel tagged product can contain a <register> button which, when activated with a netpage pen, registers the netpage user as the owner of the product. The user's contact information, which is already recorded on the netpage system, can be automatically transmitted to the product manufacturer who can record it in their customer database. The registration process can automatically add the manufacturer to the user's e-mail contact list, thus allowing the manufacturer to send the user e-mail relevant to the product, such as related special offers, recall notices, etc. If the manufacturer abuses their e-mail privileges, the user can bar them in the usual way.

8.5.2 Product Information via Product ID

Some of the benefits of Hyperlabel tagging products can be gained by enhancing the netpage pen to decode UPC bar codes. Alternatively a UPC bar code scanner can netpage-enabled. When the netpage system receives a scanned UPC, it forwards a request to a default or favorite application for that product type (as described earlier), and this in turn elicits product information from the application, such as in the form of a printed netpage. The product page can also include the facility to enter the serial number of the product item and register the user's ownership of it via a <register> button. Product manufacturers can thus gain the benefits of netpage linking for their entire installed base of products without making alterations to the products themselves.

8.5.3 Context-Specific Product Help

If the entire surface of a product is Hyperlabel tagged, then pressing on any part of the surface with a netpage pen can then elicit product-specific help. The help is either specific to the area pressed, or relates to the product as a whole. Thus the user of the product has instant access to helpful information about specific features of a product as well as the product as a whole. Each feature-specific help page can be linked to the entire product manual.

8.5.4 Product Ownership Tracking

If the entire surface of a product is Hyperlabel tagged, then pressing on any part of the surface with a netpage pen can elicit a description of the product and its current ownership. After the product is purchased, pressing on any part of the surface can automatically register the product in the name of the owner of the netpage pen. Anyone can determine the ownership of a product offered for sale simply by pressing on any part of its surface with a Netpage Pen. Ownership may only be registered by a new owner if the current owner has relinquished ownership by signing the "sell" portion of the product's status page. This places the product in an "unowned" state.

Product information and ownership is maintained either by the product manufacturer, as a service to its customers, or by a profit-oriented third party.

The shipping computer system of a product manufacturer can automatically transfer ownership of products from the manufacturer to the distributor or retailer, and so on down through the supply chain. The retail computer system of the retailer can automatically mark each sold item as free, or transfer ownership directly to the holder of the payment card used to pay for the product. The customer can also use a netpage pen at the point of sale to register immediate ownership of the product.

Traditional clearing-houses for stolen goods, such as pawn shops, can be required by law to check the ownership of all products presented to them. Since a Hyperlabel tagged product has an invisible encoding on most or all of its surface, it is difficult for a thief to remove it or even tell if it has been successfully removed. Conversely, it is incumbent on a potential buyer of a product to ensure that a clean reading can be obtained from its surface so that its ownership can be indisputably established.

Where a product is leased or otherwise subject to complex or multiple ownership, the product registration database can reflect this and thus alert a potential buyer.

8.5.5 Light Weight Web Interface

As described earlier, Hyperlabel tagged products can be used to request linked Web pages for printing or display on a Web terminal, e.g. a screen-based Web browser running on a personal computer (PC), mobile telephone or personal digital assistant (PDA).

In the absence of infrastructure support for product interface descriptions, a single page ID can be used per page, or an individual link ID can be used for each embedded hyperlink, i.e. the position 86 usually encoded in a netpage tag (or Hyperlabel tag) can be replaced by a link number, either selectively or over the entire page.

If the page ID is structured (e.g. if it includes an item ID 215), then part of the page ID (e.g. the product ID 214) can be used to identify a Web page directly, i.e. via some rule for encoding the ID as an Uniform Resource Identifier (URI), and the remaining part (e.g. the serial number 213) can be appended to the URI as a unique session ID (transaction ID). The presence of the session ID can allow the corresponding Web server to enforce per-item behavior, such as ensuring that a competition is only entered once. If link numbers are used, then they also form part of the URI.

8.5.6 Local Computer Application Interface

The user interface to a GUI-based computer application running on a multi-tasking computer can be printed as a netpage on a user interface or command "card". The printed user interface can include a "digitizer pad" area for moving the GUI pointer relative to the application. Invoking any function of the application's user interface or moving the GUI pointer, automatically makes the application current—i.e. if the application is running in a windowed GUI system then its window is brought to the front and made current. If the application is not currently running, then it is automatically launched.

The printed user interface for a text-oriented application can contain a printed keyboard, a general-purpose handwriting input text field, or both.

A personal computer system or workstation can thus potentially consist of a screen for displaying GUI output, a number of application-specific printed user interfaces, a sensing device (typically a stylus) for sensing user operations relative to the printed user interfaces, and a computer which receives wired or wireless transmissions from the sensing device, runs applications, and interprets sensed inputs relative to each application.

Each printed user interface "card" can be encoded with a unique page ID specific to the application, and tagged with an attribute which instructs the personal computer or workstation to interpret operations on the page relative to a local instance of the application, even in a global networked netpage environment.

If the computer is a network terminal connected to a LAN, an intranet, or the Internet, any interaction with the printed user interface can launch or interact with a networked instance of the application.

8.5.7 Sensing Device Context

The same netpage may elicit different behavior depending on the type, identity and/or context of the netpage sensing device used to interact with it. For example, a netpage pen or stylus connected to a PC or Web terminal without a netpage printer (or prior to full netpage system deployment) may elicit displayed Web pages or even local application behavior, as described above. In the presence of a netpage printer the same sensing device may elicit printed netpages, possibly with a different format and behavior to the corresponding on-screen versions.

8.6 Near-Infrared Dyes

Near-infrared dyes suitable for Hyperlabel tagging (and netpage tagging in general) exhibit relatively strong absorption in the near infrared part of the spectrum while exhibiting relatively minimal absorption in the visible part of the spectrum. This facilitates tag acquisition under matched illumination and filtering, while minimising any impact on visible graphics and text.

Figure 93:
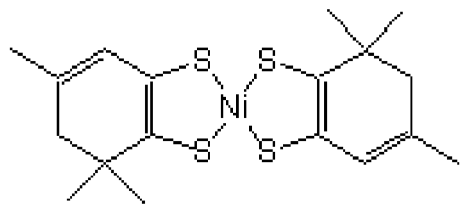
FIG. 93 shows the molecular structure of isophorone nickel dithiolate.
Figure 94:
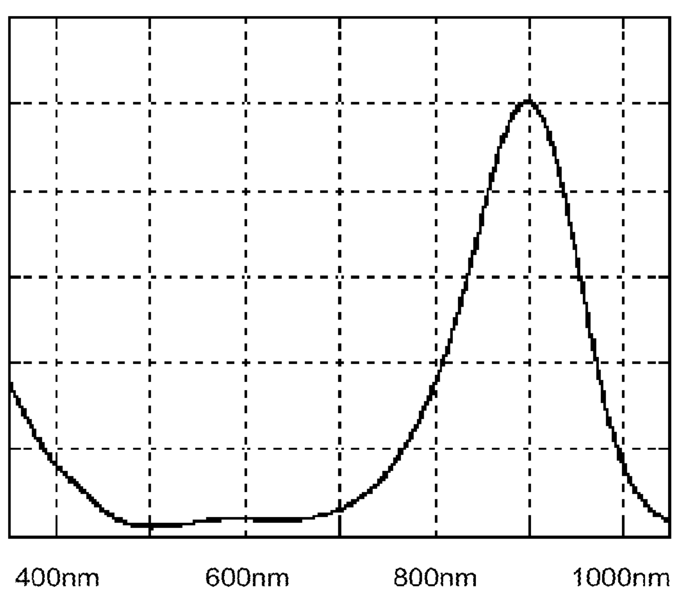
FIG. 94 shows the absorption spectrum of the dye of FIG. 93.
Figure 95:
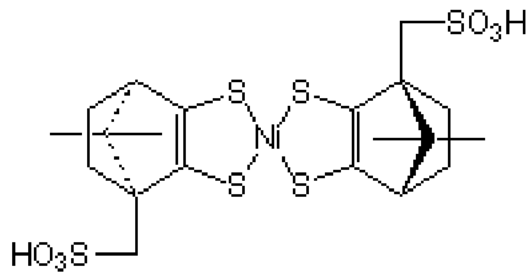
FIG. 95 shows the molecular structure camphor sulfonic nickel dithiolate.
Figure 96:
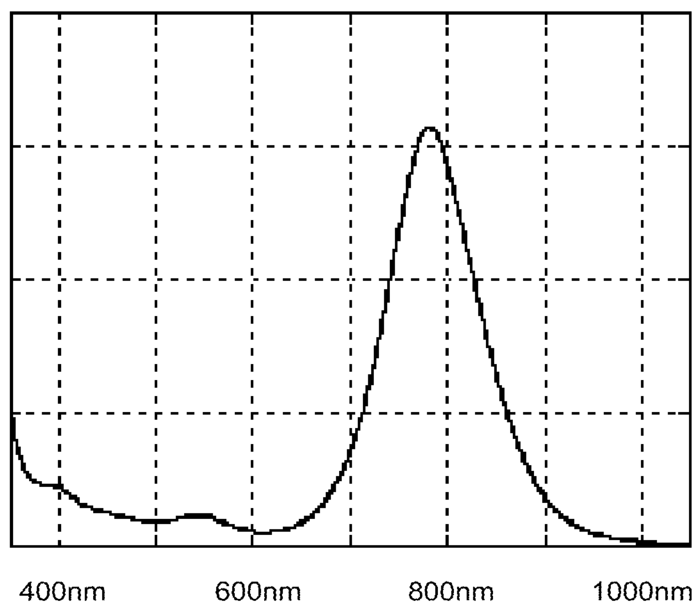
FIG. 96 shows the absorption spectrum of the dye of FIG. 95.

FIG. 93 and FIG. 95 show the molecular structures of a pair of suitable near-infrared dyes. FIG. 93 shows the structure of isophorone nickel dithiolate. As shown in FIG. 94, it exhibits a strong absorption peak around 900 nm in the near infrared, while exhibiting relatively minimal absorption in the visible spectrum. FIG. 95 shows the structure of camphor sulfonic nickel dithiolate. As shown in FIG. 96, it exhibits a strong absorption peak just below 800 nm in the near infrared, while exhibiting relatively minimal absorption in the visible spectrum.

8.6 Hyperlabel Tagging Benefits

Some of the benefits of Hyperlabel tagging will now be discussed. This will focus on the costs and benefits of item-level tagging using Hyperlabel tag-carried EPCs in grocery. Note, however, that Hyperlabel tags are also applicable to higher-valued items, and items which are tagged with RFIDs may usefully be Hyperlabel tagged as well to allow scanning without RFID infrastructure or after RFID erasure.

Assuming case-level RFID tagging and item-level Hyperlabel tagging, an item is accurately recorded into retail store inventory when its corresponding case is received and scanned. Ignoring stocktake-related scanning for the moment, the item is next scanned at the checkout, at which time it is recorded as sold and removed from on-hand store inventory.

A grocery checkout system based on optical reading of Hyperlabel tags, such as the system described above can provide equivalent capabilities. Grocery item labels and packaging are particularly well-suited to Hyperlabel tagging, where much or all of the visible surface of a product item can be tagged. A Hyperlabel reader can reliably scan a Hyperlabel tagged product item presented in its field of view, irrespective of the item's orientation. If an item instead carried only a single visible bar code (whether UPC or unique), then reliable scanning would only be achieved by presenting the item's bar code directly to the reader, as occurs at checkouts at present. This would in turn preclude automatic scanning.

In practice a Hyperlabel reader is designed to scan the scanning field from at least two substantially orthogonal directions. This helps the reader scan items which are only partially Hyperlabel tagged, such as tins which may have untagged tops and bottoms, and can also help the reader avoid occlusions which may occur in manual presentation scenarios, i.e. due to the hand presenting the item to the reader.

Since partial and incremental item-level RFID tagging of higher-value grocery items is likely, in practice a checkout may incorporate both RFID and Hyperlabel readers. Since Hyperlabel tagging may itself be introduced incrementally, a checkout may incorporate RFID, Hyperlabel and bar code reading ability.

Automatic checkouts bring a number of benefits. They reduce staff costs by reducing reliance on trained checkout operators, both by reducing required skill levels at manned checkout stations, and by facilitating simplified self-checkout by customers, thus increasing its acceptance. In addition, automatic checkouts minimise the possibility of collusion between the operator and the customer, i.e. where the operator deliberately omits scanning selected items, thus resulting in reduced shrinkage.

Self-checkout has the intrinsic benefit that a single operator can oversee multiple self-checkout stations. Since scan errors are more likely during self-checkout than during manned checkout, self-checkout stations incorporate scales which allow an item's weight to be cross-checked against the item's scanned class. This also helps to prevent substitution-based cheating by the customer. Item-level tagging makes scanning more accurate, and makes substitution more difficult, since the substituted item must be an unsold item in the store's inventory, and can only be used once.

Once an item is in the customer's hands, the item's EPC can serve as a link to useful item-related online information. This is discussed in detail later in a companion paper.

When an item is shoplifted or otherwise stolen from a store, it remains recorded as part of the store's on-hand inventory. In the case of item-level RFID tagging, theft can arguably be detected by RFID readers strategically positioned at store exits. However, a shoplifter or thief can exploit RFID readers' problems with radiopacity by shielding the stolen item's RFID tag from exit readers. Once at large, however, the stolen item's EPC acts as a persistent link to information which indicates that the item has not been legitimately obtained. This auditability of any item serves as a powerful deterrent to shoplifting and theft, including the acquisition of goods whose providence is suspect. Note that this applies equally to items shoplifted via an auto-checkout.

If and when the customer decides to return a legitimately-purchased item to a retail store because the item is unwanted, unsuitable or defective, the EPC serves as a link to information which confirms that the item has been legitimately obtained from the same store or the same retail chain. This prevents fraudulent returns, such as the attempted "return" of stolen goods, and ensures that any credit associated with a legitimate return matches not the current price but the original purchase price, which may be substantially different. The EPC also allows the return to be accurately recorded, so that the returned item itself is less likely to be subject to internal loss or theft.

With item-level tagging, inventory records intrinsically become more accurate, with the consequence that automatic reordering and replenishment becomes more reliable and hence relied-upon. This in turn improves stock availability while simultaneously reducing reliance on safety stock. Demand-driven efficiencies then flow back up the supply chain.

Case-level RFID tracking in the backroom, coolroom and freezer, either during case movement or in situ, allows accurate backroom stock monitoring. Case-level RFID tracking onto the sales floor allows accurate recording of shelf-stock additions, and item-level tracking at the checkout allows accurate recording of shelf-stock removals.

Imminent out-of-stock conditions on the sales floor are rapidly detected from on-shelf stock levels, and replacement stock availability in the backroom is rapidly determined from backroom stock levels, as well as the approximate or exact location of the replacement stock in the backroom.

Unlike with UPCs, poor shelf stock rotation is easily detected via item-level tracking at the checkout. If newer stock of a product is inadvertently sold in preference to older stock, then a stock rotation alert can be raised for the product in question. Shop staff can interrogate the shelf stock in question using hand-held scanners to obtain date codes, or can read date codes directly off the stock. Poor stock rotation is thereby addressed before the stock in question becomes unsaleable, leading to a general reduction in the unsaleable rate.

Relatedly, Hyperlabel tagging makes it possible to construct smart dispensers for high-value and high-turnover items which incorporate Hyperlabel readers and monitor all dispensing and replenishment operations to allow imminent out-of-stocks to be signalled and sweeps to be detected.

Hyperlabel tagging, in contrast to RFID tagging, is likely cost significantly less than one cent once established, and to become negligible in the longer term, particularly once digital printing of product labels and packaging becomes established. It is therefore likely that item-level Hyperlabel tagging in the grocery sector is justified.

Figure 97:
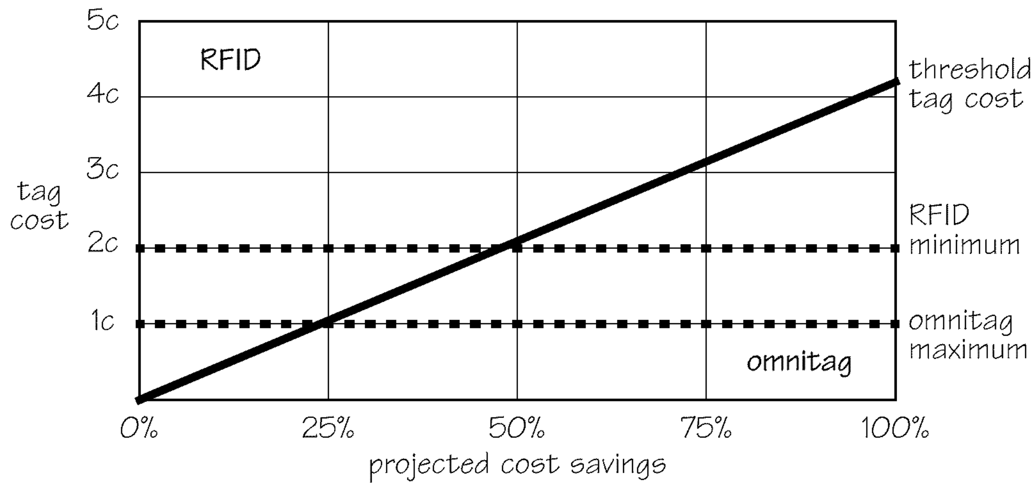
FIG. 97 is a graph of threshold tag cost as a function of projected cost savings.
Figure 98:
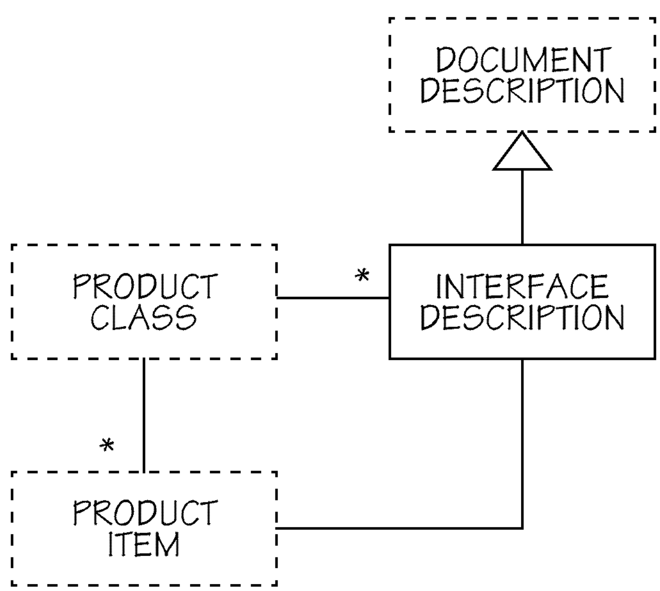
FIG. 98 is a schematic diagram of an interface description class used for recording relationships between ranges of item IDs and particular interface descriptions.
Figure 99:
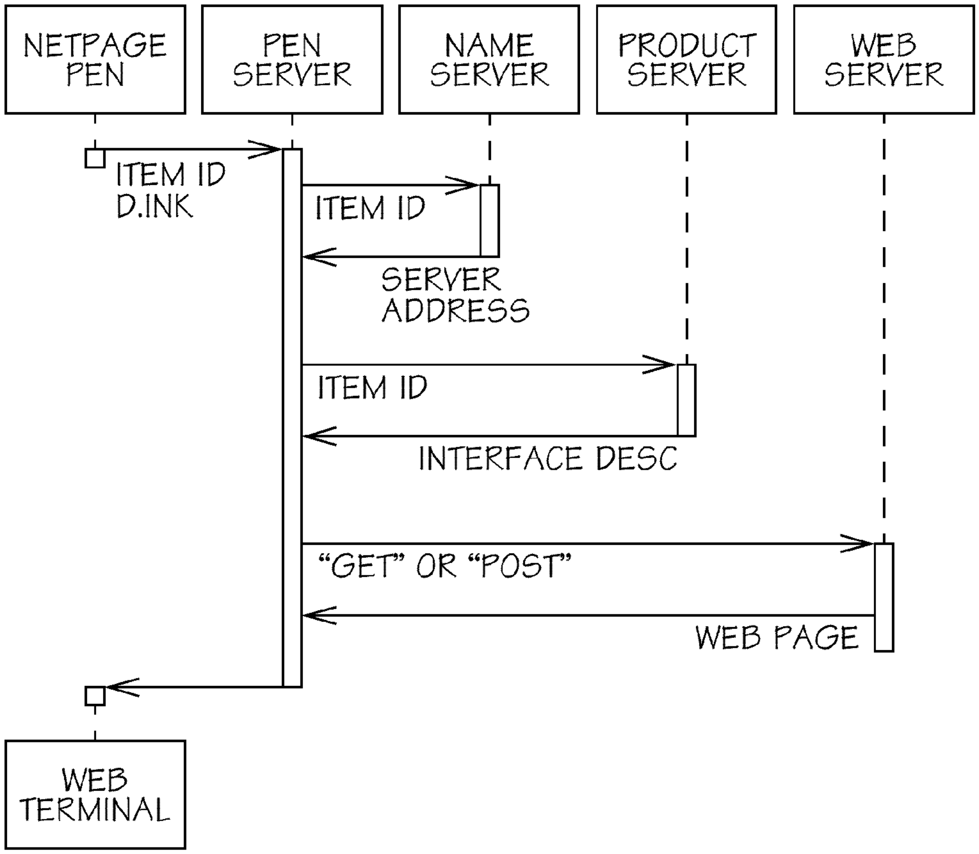
FIG. 99 is a schematic diagram of an example of interaction between a Netpage pen and a Web server; and, FIG. 100 is a block diagram of tagging levels in the supply chain; supply chain stages and tagging level.

FIG. 97 shows the threshold cost of a tag as a function of cost savings projected as accruing from item-level tagging. Assuming wildly optimistic cost savings of 50% accruing from item-level tagging, the threshold cost of a tag is just over two cents. Assuming more realistic but still quite optimistic cost savings of 25%, the threshold cost of a tag is just over one cent.

Whilst the read-only nature of most optical tags has been cited as a disadvantage, since status changes cannot be written to a tag as an item progresses through the supply chain. However, this disadvantage is mitigated by the fact that a read-only tag can refer to information maintained dynamically on a network.

As noted earlier, if incremental tagging of higher-priced grocery items takes place, then the average price of remaining grocery items is reduced, and the threshold cost of a tag is further reduced as well. This makes universal item-level RFID tagging even less likely, and makes a case for the use of Hyperlabel tagging as a lower-cost adjunct to RFID tagging.

8.6.1 Shrinkage

The cost of shrinkage in the grocery sector was 1.42% of net sales in 2001-2002, equating to about $7 billion. The cost of shrinkage therefore exceeded net profit. Table 5 summarises sources of shrinkage in the grocery sector.

TABLE 5

| Sources of shrinkage in the grocery sector | | |
|---|---|---|
| source of shrinkage | contribution | approximate cost ($ millions) |
| internal theft | 62.0% | 4,340 |
| external theft | 23.0% | 1,610 |
| supplier fraud | 7.6% | 530 |
| paper shrinkage | 7.4% | 520 |
| total | 100% | 7,000 |

The largest source of shrinkage in the grocery sector, at 62% or around $4.3 billion, is internal theft, consisting mainly of product theft by employees. This is followed, at 23% or around $1.6 billion, by external theft, consisting mainly of shoplifting. Supplier fraud and paper shrinkage together account for the final 15% or $1 billion.

Table 4 summarises the ways in which item-level RFID tagging can be used to address the various sources of shrinkage, as described in Alexander, K. et al., *Applying Auto-ID to Reduce Losses Associated with Shrink*, MIT Auto-ID Center, November 2002, http://www.autoidcenter.org/research/IBM-AUTOID-BC-003.pdf. The table also shows how item-level Hyperlabel tagging can in many cases effectively address the same issues.

As shown in the table, item-level RFID addresses employee theft and shoplifting predominantly via exit-door RFID readers which detect attempts to remove unsold goods, while Hyperlabel tagging acts a deterrent to theft since item-level tagging supports downstream auditing of suspected stolen goods.

As described earlier, item-level scanning at point-of-sale improves accuracy and enables automatic scanning, while item-level recording of sales prevents attempted fraudulent returns, both largely independently of tagging method. Automatic checkout scanning in turn reduces collusion between checkout operators and customers.

TABLE 6

| Sources of shrinkage, RFID solutions and Hyperlabel solutions | | | |
|---|---|---|---|
| source of shrinkage | pain point | RFID solution | Hyperlabel solution |
| internal theft | product theft | exit door scan N/A | audit deterrent; N/A[c] |
| | collusion with customers | automatic checkout | automatic checkout[d] |
| | collusion with vendors | N/A[c] | N/A[c] |
| external theft | shoplifting | exit door scan[b] | audit deterrent |
| | fraudulent returns | item status check | item status check |
| | burglary | audit deterrent; N/A[c] | audit deterrent; N/A[c] |
| supplier fraud | phantom delivery | N/A[c] | N/A[c] |
| | invoice errors | N/A[c] | N/A[c] |
| | returns | item status update | item status update |
| | over/under delivery | N/A[c] | N/A[c] |
| paper shrinkage | pricing errors | N/A | N/A[e] |
| | scanning errors | automatic checkout[d] | automatic checkout[d] |
| | unrecorded returns | item status update | item status update |
| | incorrect store physical inventory | automatic stocktake[b]; automatic checkout[d] | automatic checkout[d] |

8.6.2 Unsaleables

The cost of unsaleables in the grocery sector was 0.95% of net sales in 2001-2002 Lightburn, A., 2002 *Unsaleables Benchmark Report*, Joint Industry Unsaleables Steering Committee 2002, equating to about $5 billion. The cost of unsaleables was therefore almost comparable to net profit. Table 7 summarises sources of unsaleables in the grocery sector.

TABLE 7

| Sources of unsaleables in the grocery sector | | |
|---|---|---|
| source of unsaleable | contribution | approximate cost ($millions) |
| damaged | 63% | 3,150 |
| out-of-code | 16% | 800 |
| discontinued | 12% | 600 |
| seasonal | 6% | 300 |
| other | 4% | 200 |
| total | 101% | 5,050 |

The largest cause of unsaleables in grocery, at 63% or over $3 billion, is damaged product. This includes product which is unlabelled, improperly sealed, over- or under-weight, only partially filled, crushed, dented or collapsed, swollen or rusted (cans), moldy, leaking, soiled, stained or sticky.

Much of this damage is due to poor transport and handling, and item-level tagging helps by allowing the supply-chain history of a damaged item to be queried. Over time this can pinpoint a particular problem area, such as a specific distribution center where staff training is inadequate, or a specific forklift operator who needs to take more care. Furthermore, item-level tagging makes it feasible to feed remedial information back to the appropriate point in the supply chain, including as far back as the original manufacturer or one of its suppliers.

The second-largest cause of unsaleables in grocery, at 16% or around $800 million, is out-of-code (i.e. expired) product. Item-level tagging supports better stock rotation, for example via checkout-driven alerts.

Discontinued and seasonal product is more of a problem in retail sectors such as consumer electronics and apparel Alexander, K. et al., *Applying Auto-ID to Reduce Losses Associated with Product Obsolescence*, MIT Auto-ID Center, November 2002, http://www.autoidcenter.org/research/IBM-AUTOID-BC-004.pdf, but still account, at 12% and 6% respectively (or around $600 million and $300 respectively), for a non-trivial proportion of grocery unsaleables. Discontinued product includes product withdrawn by manufacturers, and product made unsaleable by labeling and SKU changes due to mergers and acquisitions.

Item-level tagging helps reduce safety stock and so reduces exposure to discontinued and seasonal product. By improving stock visibility, it makes offloading of soon-to-discontinued or seasonal product more efficient, i.e. without requiring excessive markdowns or manufacturer returns. Finally, by improving auditability, it allows better accounting of discontinued and seasonal stock back to the original manufacturer, rather than forcing reliance on inefficient swell allowances Reilly, D., "Retail returns—a necessary problem, a financial opportunity", Parcel Shipping & Distribution.

8.6.3 Out-of-Stocks

Out-of-stocks were estimated to result in a 3% loss in net sales in 2001-2002 [25], which translates into a $200 million reduction in net profit, or about 0.04% of net sales. Although out-of-stocks have a much smaller effect on the bottom line than shrinkage and unsaleables, they are felt particularly acutely because they demonstrably undermine customer loyalty to brand, store and chain, and are considered eminently correctable.

Table 6 summarises the ways in which case-level and item-level RFID tagging can be used to address the various causes of out-of-stocks, as described in Alexander, K. et al., *Focus on Retail: Applying Auto-ID to Improve Product Availability at the Retail Shelf*, MIT Auto-ID Center, June 2002. The table also shows how item-level Hyperlabel tagging, in conjunction with case-level RFID tagging, can in many cases effectively address the same issues.

TABLE 8

Sources of out-of-stocks, RFID solutions and Hyperlabel solutions

| pain point | RFID solution | Hyperlabel solution |
|---|---|---|
| receiving accuracy | case-level tracking and some item-level tracking | case-level tracking[b] |
| on-hand stock visibility | case-level tracking[b] and item-level tracking using smart shelves and at the checkout | case-level tracking[b] and item-level tracking at the checkout |
| replenishment from the backroom | case-level tracking[b] and item-level tracking | case-level tracking[b] |
| plan-o-gram compliance/ product lifecycle management | manual and smart shelves[c] | manual |
| cycle counting/manual ordering errors | manual and smart shelves[c] | manual |
| physical inventory counts (preparation and execution) | manual and smart shelves[c] | manual |
| point-of-sale scan accuracy | automatic checkout | automatic checkout[d] |
| inaccurate replenishment algorithms | automatic checkout | automatic checkout[d] |

8.6.4 Privacy Implications of Item-Level Tagging

An RFID tag is promiscuous in that it responds with its ID to a query from an RFID reader without verifying the reader's right to ask. When a uniquely tagged item is travelling through the supply chain and benefits from being tracked, this promiscuity is useful, but once the item is purchased by a customer and no longer needs to be tracked, it can become a problem. The owner of the item may have no idea that the item's RFID tag is being queried surreptitiously, since the reader doesn't require line-of-sight to the tag. Even low-cost passive tags intended for high-volume tagging of product items can be read from a distance of at least a meter, and in many cases much further. If the RFID tag contains a unique item ID, then for tracking purposes the item ID becomes a pointer to the person, particularly if the RFID is embedded in clothing, shoes, a wristwatch or jewellery. RFIDs typically support a partial or complete self-erasure command, and it is proposed that RFIDs should be at least partially erased at point-of-sale to remove an item's serial number (but not necessarily its product number). It is also proposed, in an "RFID Bill of Rights", that such erasure should be the prerogative of the customer. It is still unclear whether retailers will erase tags by default or even give customers a choice.

Even if serial numbers are erased at point-of-sale, the "constellation" of product codes readable from the various RFID tags carried by a particular person may still constitute a sufficiently unique signature for tracking purposes.

Hyperlabel tags are less promiscuous than RFIDs since they require line-of-sight for reading. Unlike RFID tags which are likely to be physically embedded in product during manufacture, Hyperlabel tags are likely to only appear on labels and packaging, which in the case of higher-priced items such as clothing and shoes is typically removed from the product prior to use. Where Hyperlabel tags persist on higher-priced product items, they typically do so in discreet locations such as on labels sewn into the seams of clothing. For lower-priced items such as grocery, the persistence of item-level tagging is not a threat to privacy.

If privacy advocates succeed in forcing RFIDs to be erased at point-of-sale by default, then dual RFID tagging and Hyperlabel tagging provides a way of providing consumers with the downstream benefits of item-level tagging without the privacy concerns of RFID, including online access to item-specific product information, as well as validated returns, warranties and servicing.

Sensing Device

The design of the various components and operational blocks of the preferred embodiment of the sensing device will now be described in more detail. For convenience, this portion of the specification is split into the following sections:

Section A describes a preferred embodiment of the present invention in the form of the Jupiter image sensor chip with on-board image processing.

Section B describes the functions of the Ganymede image sensor component of Jupiter.

Section C describes the design of the Ganymede image sensor.

Section D describes the design of an 8-bit analog-to-digital converter (ADC) used by Ganymede.

Section E describes the functions and design of the Callisto image processor component of Jupiter.

Section F describes alternative filtering and subsampling circuits which may be utilised by Callisto.

Section G describes netpage tag sensing algorithms adapted to utilise the Callisto image processor for tag image processing and tag decoding in the context of the netpage networked computer system outlined in the cross-referenced patent applications listed above.

In a preferred embodiment of the invention, the Jupiter image sensor is designed to be embedded in a netpage sensing device such as a netpage pen (as described in co-pending PCT application WO 00/72230 entitled "Sensing Device, filed 24 May 2000; and co-pending U.S. application U.S. Ser. No. 09/721,893 entitled "Sensing Device", filed 25 Nov. 2000), or a Netpage viewer (as described in co-pending PCT application WO 01/41046 entitled "Viewer with Code Sensor", filed 27 Nov. 2000).

In a preferred embodiment of the invention, the Jupiter image sensor is also designed to be used in conjunction with surfaces tagged with identity-coding and/or position-coding patterns (such as described in co-pending PCT application WO 00/72249 entitled "Identity-Coded Surface with Reference Points", filed 24 May 2000; co-pending PCT application WO 02/84473 entitled "Cyclic Position Codes", filed 11 Oct. 2001; co-pending U.S. application U.S. Ser. No. 10/309,358 entitled "Rotationally Symmetric Tags", filed 4 Dec. 2002; and Australian Provisional Application 2002952259 entitled "Methods and Apparatus (NPT019)", filed 25 Oct. 2002).

Various alternative pixel designs suitable for incorporation in the Jupiter image sensor are described in co-pending PCT application PCT/AU/02/01573 entitled "Active Pixel Sensor", filed 22 Nov. 2002; and co-pending PCT application PCT/AU02/01572 entitled "Sensing Device with Ambient Light Minimisation", filed 22 Nov. 2002.

One embodiment of the invention incorporates a monolithic image sensor, analog to digital converter (ADC), image processor and interface, which are configured to operate within a system including a host processor. The applicants have codenamed the monolithic integrated circuit "Jupiter". The image sensor and ADC are codenamed "Ganymede" and the image processor and interface are codenamed "Callisto".

In an alternative embodiment, various Jupiter components form part of a scanning device such as any of those described above.

It should appreciated that the aggregation of particular components into functional or codenamed blocks is not necessarily an indication that such physical or even logical aggregation in hardware is necessary for the functioning of the present invention. Rather, the grouping of particular units into functional blocks is a matter of design convenience in the particular preferred embodiment that is described. The intended scope of the present invention embodied in the detailed description should be read as broadly as a reasonable interpretation of the appended claims allows.

Jupiter

Function and Environment

The Jupiter image sensor has been designed for high-speed low-cost machine vision applications, such as code sensing in devices such as the Netpage pen and Netpage viewer. Jupiter comprises an image sensor array, ADC function, timing and control logic, digital interface to an external microcontroller, and implementation of some of the computational steps of machine vision algorithms.

FIG. 101 shows a system-level diagram of the Jupiter monolithic integrated circuit 15001 and its relationship with a host processor 15002. Jupiter 15001 has two main functional blocks: Ganymede 15004 and Callisto 15006 blocks. Ganymede comprises the sensor array, ADC, timing and control logic, clock multiplier PLL, and bias. Callisto comprises the image processing, image buffer memory, and serial interface to a host processor. A parallel interface 15008 links Ganymede 15004 with Callisto 15006, and a serial interface 15010 links Callisto 15006 with the host processor 15002

Interfaces

Jupiter has several internal and external interfaces. External interface include the host processor interface and a flash (exposure) and capture interface. Both of these interfaces belong to Callisto and are described in more detail in the Callisto section below.

The internal interfaces in Jupiter are used for communication among the different internal modules. The internal interfaces in Jupiter are described in more detail below.

Power Modes

Each module in Jupiter has two power modes: SLEEP and ON. In the SLEEP mode, the modules are shut down, and in the ON mode the modules are activated for normal operation. The power is controlled via an internal 8-bit register. Each bit of this register is used to control one separate module. A bit value of 0 means that the associated module is turned off while a bit value of 1 means that the associated module is turned on.

Mechanical Characteristics

The packaging of Jupiter is performed using a wafer-level packaging technique to reduce the overall manufacturing cost. The physical placement of the pads and their dimensions, and the wafer-level die specifications, accommodate the wafer-level packaging process.

Ganymede Image Sensor

Ganymede features:

- sensor array
- 8-bit digitisation of the sensor array output
- digital image output to Callisto.
- a clock multiplying PLL.

Ganymede Functional Characteristics

Figure 104:
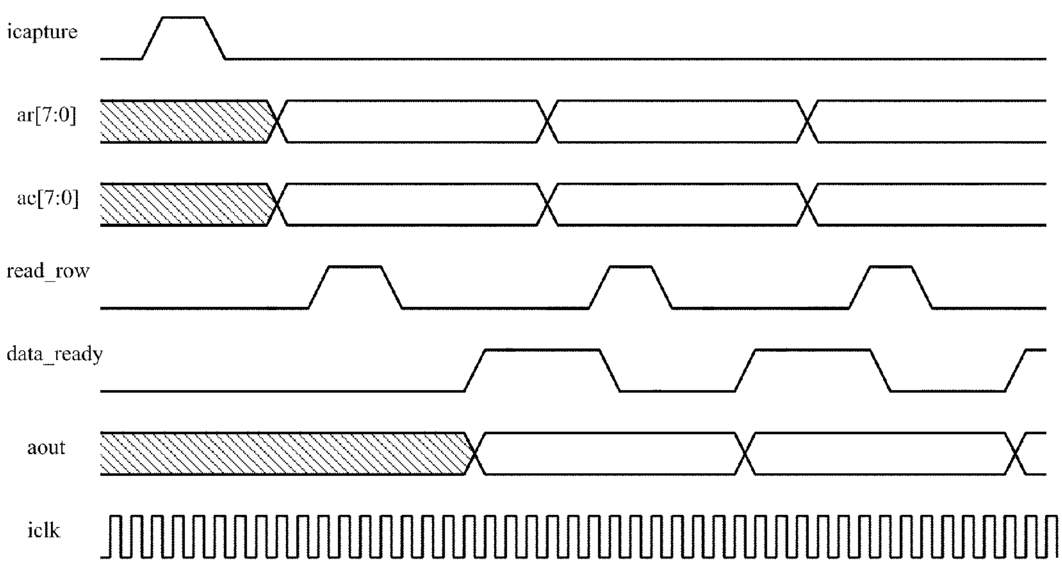

As best shown in FIG. 104, Ganymede 15004 comprises a sensor array 15012, an ADC block 15014, a control and timing block 15016 and a phase lock loop (PLL) 15018 for providing an internal clock signal. The sensor array comprises pixels 15020, a row decoder 15022, a column decoder and MUX 15024. The ADC block 15014 includes an ADC 15026 and a programmable gain amplifier (PGA) 15028. The control and timing block 15016 controls the sensor array 15012, the ADC 15026, and the PLL 15018, and provides an interface to Callisto 15006.

The following table shows characteristics of the sensor array 15012:

| Parameter | Characteristic | Comment |
|---|---|---|
| Resolution | 8 bits | |
| Sampling frequency | — | For an N × N sensor array the sampling frequency is greater than 0.002/(N × N) Hz. |
| Integral non-linearity (INL) | <1 bit | |
| Differential non-linearity (DNL) | <0.5 bit | |
| Input voltage range | +/−1.0 | Differential input |
| Gain | 1 to 16 | The gain of the ADC is linearly set by a 4-bit register. |
| Offset | <0.5 bit | A calibration mechanism is implemented to reduce the offset. |
| Missing codes | NONE | |

ADC

The ADC block is used to digitise the analog output of the sensor array. The following table shows characteristics of the ADC:

| Parameter | Characteristic | Comment |
|---|---|---|
| Resolution | 8 bits | |
| Sampling frequency | — | For an N × N sensor array the sampling frequency is greater than 0.002/(N × N) Hz. |
| Integral non-linearity (INL) | <1 bit | |
| Differential non-linearity (DNL) | <0.5 bit | |
| Input voltage range | +/−1.0 | Differential input |
| Gain | 1 to 16 | The gain of the ADC is linearly set by a 4-bit register. |
| Offset | <0.5 bit | A calibration mechanism is implemented to reduce the offset. |
| Missing codes | NONE | |

Clock Multiplying PLL

A clock multiplier within the PLL 15018 provides a lock_detect output which indicates the PLL's lock status. The following table shows characteristics of the PLL:

| Parameter | Characteristic |
|---|---|
| Input clock frequency | 1 MHz < fin < 40 MHz |
| Output clock frequency | 10 MHz < fout < 200 MHz |
| Clock jitter | <200 ps |
| Lock time | <1 ms |

Image Sensor Interface

The image sensor interface is used internally in Ganymede to read the image sensor data. The interface between Ganymede and Callisto (represented by signals iclk, isync, ivalid, idata) is described below in more detail.

The following table shows the image sensor interface pins:

| Name | Function | Type |
|---|---|---|
| icapture | This signal triggers a frame capture sequence. | Digital input |
| sleep | This signal puts the image sensor to sleep. | Digital input |
| frame_reset | This signal resets the pixel voltage in FF mode. | Digital input |
| frame_capture | This signal captures the pixel voltage in FF mode. | Digital input |
| read_row | This signal triggers the download of a row of data and subsequently a series of ADC conversions for the data of that row. | Digital input |
| ar[7:0] | This is the row address bus. | 8-bit digital input |
| ac[7:0] | This is the column address bus. | 8-bit digital input |
| data_ready | This signal indicates that the analog output is ready. (This signal may be used to start a conversion in the ADC). | Digital output |
| aout | This is the analog output data from the sensor which is input to the ADC. | analog outputs |
| iclk | This is the clock signal. | digital input |

Figure 103:
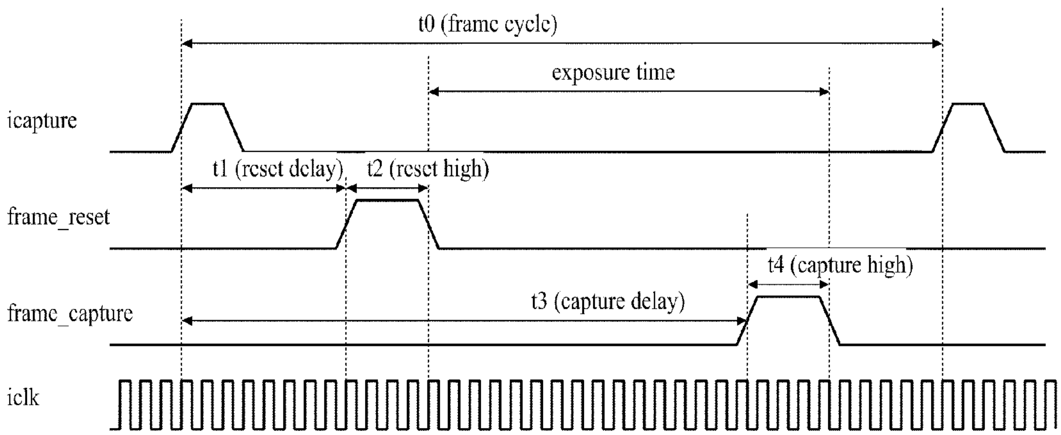
FIG. 103. Timing diagram of the image sensor event signals in Freeze-Frame mode FIG. 104. Timing diagram of image sensor data interface FIG. 105. Timing diagram of the ADC during a conversion cycle FIG. 106. Timing diagram of the ADC during a calibration cycle FIG. 107. Timing diagram of the clock multiplier FIG. 108A. First embodiment of a shuttered pixel circuits FIG. 108B. Second embodiment of a shuttered pixel circuits FIG. 109. Typical timing diagram of a shuttered pixel during the integration cycle FIG. 110. The new pixel design to compensate for reset voltage drop FIG. 111. Schematic diagram of the column circuit FIG. 112. Timing diagram during integration cycle FIG. 113. The timing diagram of the read-out cycle FIG. 114. Schematic diagram of the row decoder circuit FIG. 115. Schematic diagram of level shifter FIG. 116. Bias generator circuit FIG. 117. Layout of the 10 um pixel using a photodiode and the capacitor FIG. 118. Layout of the 10 um pixel using a photodiode and without the capacitor FIG. 119. Layout of the 10 um pixel using a BJT FIG. 120. Block diagram of the sensor FIG. 121. The structure of a pipelined ADC FIG. 122. A bit-slice of the switched capacitor based ADC FIG. 123. The structure of three bit slices of the ADC in one phase of the clock FIG. 124. The structure of the differential folded cascode circuit used in the ADC FIG. 125. The bias generator circuit for the PGA and ADC FIG. 126. The common mode feedback circuit FIG. 127. The gain booting amplifiers FIG. 128. The clock generator FIG. 129. The reference current generator FIG. 130. Resistive ladder used in the bias current generator FIG. 131. The schematic diagram of the comparator FIG. 132. Common mode and reference voltage generator FIG. 133. The wide-range OTA used in the reference voltage generators FIG. 134. The structure of the bandgap generator FIG. 135. The multistage opamp used in the bandgap generator FIG. 136. The structure of the PGA FIG. 137. The selectable capacitor structure used in the PGA FIG. 138. The compensation structure used in the PGA opamp FIG. 139. The floorplan of the ADC FIG. 140. The block diagram of the ADC FIG. 141. Timing diagram of the ADC in the normal mode FIG. 142. Callisto system diagram FIG. 143. Coordinate system FIG. 144. Sub-sampling FIG. 145. Sub-sampling pixel replication FIG. 146. Dynamic range expansion window FIG. 147. Incomplete dynamic range expansion window FIG. 148. Sub-pixel value FIG. 149. General Callisto message format FIG. 150. Register access message format FIG. 151. Callisto command message format FIG. 152. Register data message format FIG. 153. Command data message format FIG. 154. Command data format for processed image read command FIG. 155. Frame sync message format FIG. 156. Frame store write message format FIG. 157. Frame store write message format FIG. 158. Unprocessed image read command message FIG. 159A. Processed image read command with arguments FIG. 159B. Processed image read command without arguments FIG. 160A. Sub-sampled image read command with arguments FIG. 160B. Sub-sampled image read command without arguments FIG. 161. Sub-pixel read command message FIG. 162. Command execution and frame store write states FIG. 163. Frame store buffer locking FIG. 164. Error recovery cycle FIG. 165. Reset timing FIG. 166. Image sensor data interface timing FIG. 167. Image sensor timing signals FIG. 168. Image sensor timing—external capture FIG. 169. Serial interface synchronous timing: 2 bytes back-to-back from Callisto to microprocessor FIG. 170. Serial interface synchronous timing single bite transfer from microprocessor to Callisto FIG. 171. Error recovery timing using break FIG. 172. External register interface read timing FIG. 173. External register interface write timing FIG. 174. Callisto top-level partitioning FIG. 175. clk_driver logic FIG. 176. register_read State Machine FIG. 176A. Four-byte Register Read Access FIG. 177. serialif structure FIG. 178. ser2par State Machine FIG. 179. msg_sync State Machine FIG. 180. msg_hand State Machine FIG. 181. Register Write and Read Accesses FIG. 182. Unprocessed-Processed-Subsampled Image Read Sequence FIG. 183. Subpixel Read Command FIG. 184. Direct Frame Store Write Sequence FIG. 185. frame_handshaking State Machine FIG. 186. header_generation State Machine FIG. 187. sif_par2ser functional timing FIG. 188. par2ser State Machine FIG. 189. error_handler State Machine FIG. 190. imgproc structure FIG. 191. imgproc_fs State Machine FIG. 192. Sub-functions of the Processed Image Read Function FIG. 193. "Column Min-max" Generation FIG. 194. "Column Min-Max" Pipeline and Range-Expand and Threshold FIG. 195. Serial Output during Processed Image Region Read FIG. 196. imgproc_sertim state machine FIG. 197. imgsensif structure FIG. 198. sens_ctrl state machine (fsm—double buffered)

FIG. 103 shows a timing diagram of image sensor event signals in a "Freeze-Frame" mode of the sensor array 15012, whilst FIG. 104 shows a typical timing diagram of the image sensor interface during a read cycle. It should be noted that the number of clock pulses between events in all timing diagrams is for the purposes of illustration only. The actual number of clock cycles will vary depending upon the specific implementation.

ADC Interface

The control and timing block 15016 provides timing and control signals to the ADC 15026. The following table shows the ADC 15026 pins.

| Signal | Function | Type |
|---|---|---|
| sleep | This puts the ADC to sleep | Digital input |
| iclk | The clock | Digital input |
| start_conv | A transition from low to high on this signal starts the conversion process. | Digital input |
| end_conv | A transition from low to high indicates that the conversion has ended. | Digital output |
| start_calibrate | A transition from low to high on this signal starts the calibration process in the next clock cycle. | Digital input |
| end_calibrate | A transition from low to high indicates that the calibration process has ended. | Digital output |
| pga_gain | The gain of the PGA amplifiers used at the input of the ADC. | 3-bit digital input |
| ain | The analog input to the ADC. | Analog input |
| dout[7:0] | The digital output of the ADC. | 8-bit digital output. |

Figure 105:
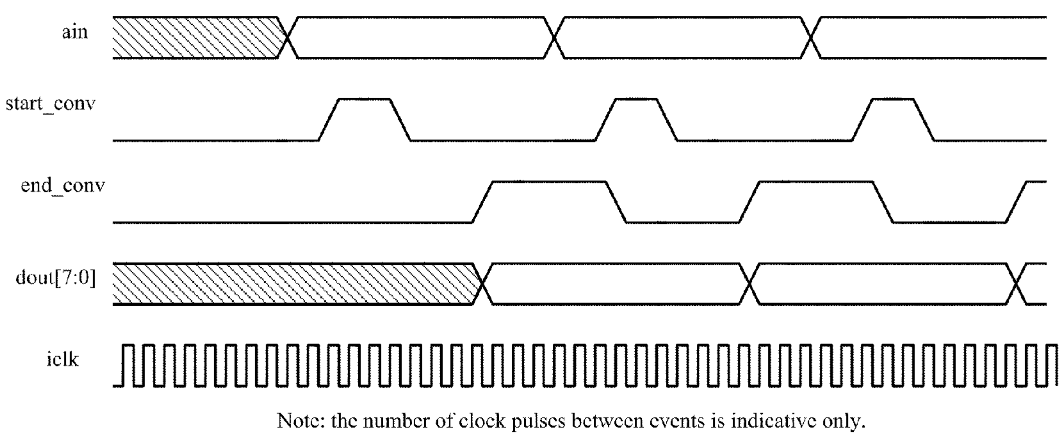

A typical timing diagram of the ADC interface during a conversion cycle is shown in FIG. 105. The conversion is triggered by the start_conv signal. During this period the analog inputs are also valid. The end_conv signal indicates the end of conversion, and the output digital data dout is then valid. The end_conv signal is set to low when the start_conv goes from low to high.

Figure 106:
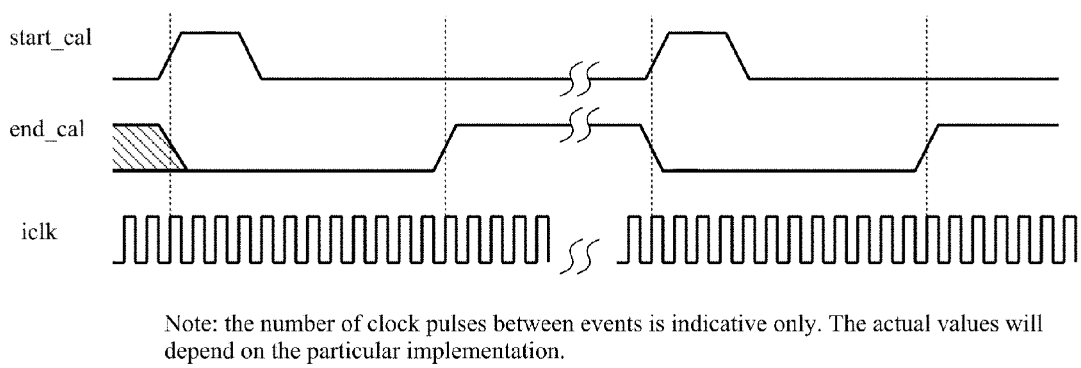

A typical timing diagram of the ADC interface during a calibration cycle is shown in FIG. 106. The start_cal signal triggers the calibration cycle. The period that it takes for the calibration to take place will depend on the particular architecture.

Clock Multiplying PLL Interface

The clock multiplier provides multiplication factors of the form M/N, where M and N are positive integer values. The following table shows the pins of the clock multiplier.

| Signal | Function | Type |
|---|---|---|
| sleep | This puts the ADC to sleep | Digital input |
| iclk | The clock | Digital input |
| start_conv | A transition from low to high on this signal starts the conversion process. | Digital input |
| end_conv | A transition from low to high indicates that the conversion has ended. | Digital output |
| start_calibrate | A transition from low to high on this signal starts the calibration process in the next clock cycle. | Digital input |
| end_calibrate | A transition from low to high indicates that the calibration process has ended. | Digital output |
| pga_gain | The gain of the PGA amplifiers used at the input of the ADC. | 3-bit digital input |
| ain | The analog input to the ADC. | Analog input |
| dout[7:0] | The digital output of the ADC. | 8-bit digital output. |

Figure 107:
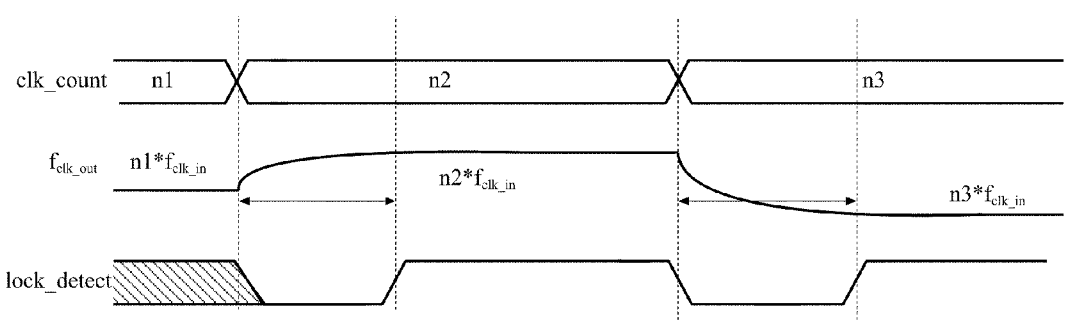

The timing of the clock multiplier is shown in FIG. 107. The time that it takes for the output clock frequency to settle is determined by the settling/lock characteristics of the clock multiplier as specified above.

Power/Sleep Interface

This interface controls the power state of the modules in Ganymede. Each module in Ganymede has a digital input pin, which turns the module on or off.

Operation

Registers

This section describes the registers that are used in Ganymede. Note that Callisto's registers are described in Appendix E.

The address gaps between registers is intentional, to allow possible expansion during the design process, and also to facilitate the classification of registers and their functions.

Image Sensor Frame_Reset Timing Register

The reset value for the frame_reset_high corresponds to 1.6 us using a 20 MHz clock.

TABLE 7

| Frame_reset timing register 32-bit | | | | |
|---|---|---|---|---|
| Field | Width | Bits | Reset value | Description |
| frame_reset_delay | 16 | 15:0 | 0x0000 | This is the delay, in number of clock pulses, between the rising edge of the frame_reset and the capture signals. (t1 in FIG. 103) |
| frame_reset_high | 16 | 31:16 | 0x0020 | This is the period, in number of clock pulses, when frame_reset is high. (t2 in FIG. 103) |

Image Sensor Frame_Capture Timing Register

The reset values correspond to 140 us and 1.6 us, respectively, using a 20 MHz clock.

TABLE 8

| frame_capture timing register 32-bit | | | | |
|---|---|---|---|---|
| Field | Width | Bits | Reset value | Description |
| frame_capture_delay | 16 | 15:0 | 0x0B00 | This is the delay, in number of clock pulses, between the rising edge of the frame_capture and the capture signals. (t3 in FIG. 103) |
| frame_capture_high | 16 | 31:16 | 0x0020 | This is the period, in number of clock pulses, when frame_capture is high. (t4 in FIG. 103) |

ADC Calibration Output Register

This register contains the offset error value obtained after a calibration cycle.

TABLE 9

| ADC offset register 8-bit | | | | |
|---|---|---|---|---|
| Field | Width | Bits | Reset value | Description |
| ADC_offset | 8 | 7:0 | 0x00 | The offset of the ADC |

Clock Multiplier Counter Register

TABLE 10

| Clock multiplier counter register 8-bit | | | | |
|---|---|---|---|---|
| Field | Width | Bits | Reset value | Description |
| PLL_count_M | 4 | 3:0 | 0x0 | The feedback divider ratio for the clock multiplier. |
| PLL_count_N | 4 | 7:4 | 0x0 | The forward divider ratio value for the clock multiplier. |

Configuration Register

TABLE 11

| Configuration register 8-bit | | | | |
|---|---|---|---|---|
| Field | Width | Bits | Reset value | Description |
| ADC PGA gain | 4 | 3:0 | 0x0 | The gain of the PGA used in the ADC. |
| Calibrate | 1 | 4 | 0x0 | 0 to 1 = Perform internal calibration. |
| TBD | 3 | 7:5 | 0x0 | TBD |

Status Register

This is a read-write register.

TABLE 12

| Status register 8-bit | | | | |
|---|---|---|---|---|
| Field | Width | Bits | Reset value | Description |
| Calibration Status | 1 | 0 | b'0 | Flags the completion of the internal calibration |
| Capture overflow | 1 | 1 | b'0 | Indicates that a new capture signal has arrived before the previous capture cycle has ended. Upon read, this register is reset to 0. |
| PLL Lock status | 1 | 2 | b'0 | 0 = Not in lock<br>1 = In lock |
| TBD | 6 | 7:2 | 0x00 | TBD |

4.1.7 Sleep Control Register

This register contains the sleep status for the associated modules/circuits. A value of 1 means that the circuit is off (in sleep mode), and a value of 0 means that the circuit is on (active mode).

TABLE 13

| Sleep control register 8-bit | | | | |
|---|---|---|---|---|
| Field | Width | Bits | Reset value | Description |
| Sensor | 1 | 0 | 0 | Image sensor sleep signal |
| ADC | 1 | 1 | 0 | ADC sleep signal |
| AUTO | 1 | 2 | 0 | Automatically turn-off relevant image sensor circuits during the non-capture mode. |
| TBD | 5 | 7:3 | 0 | TBD |

Test Control Register

This register controls which signal is being connected to the PROBE pad, and also controls the test mode of Callisto. Notice that the PROBE pad is a direct analog pad which only has the protection circuits.

Each signal may be appropriately buffered before being connected to the PROBE pad.

At any given time only one bit of this register shall be high.

TABLE 14

| Test control register 16-bit | | | | |
|---|---|---|---|---|
| Field | Width | Bits | Reset value | Description |
| Column circuit output/ADC input | 1 | 0 | b'0 | Connect the column circuit output and ADC input to PROBE |

TABLE 14-continued

| Test control register 16-bit | | | | |
|---|---|---|---|---|
| Field | Width | Bits | Reset value | Description |
| VBG | 1 | 1 | b'0 | Connect the bandgap generator output to PROBE |
| PLL input | 1 | 2 | b'0 | Connect the input clock to the PLL to PROBE |
| PLL feedback | 1 | 3 | b'0 | Connect the feedback clock (after the divider) to PROBE |
| PLL charge pump | 1 | 4 | b'0 | Connect the charge pump output to PROBE |
| PLL output | 1 | 5 | b'0 | Connect the PLL output clock to PROBE |
| PLL lock detect | 1 | 6 | b'0 | Connect the PLL lock detect output to PROBE |
| Bias 1 | 1 | 7 | b'0 | Connect the bias1 signal to PROBE |
| Bias 2 | 1 | 8 | b'0 | Connect the bias2 signal to PROBE |
| TBD | 6 | 14:9 | 0x00 | TBD |
| Callisto Test enable (ten) | 1 | 15 | 0x0 | Control the test mode of Callisto. |

Operation Modes

Normal Operation

In this mode the start of the capture cycle is determined by the icapture signal.

The period of a capture cycle is determined by the period of the icapture signal. However, if a new capture signal arrives before the previous capture cycle has ended, the capture signal is ignored and the "Capture overflow" status flag is set high and remains high until it is explicitly cleared. The normal operation, however, resumes if a new capture signal arrives after the current capture cycle.

Reset Mode

When RESETB is set low, and iclk is toggling, Ganymede and all its components are reset, and all registers are reset to predefined values. The reset cycle takes only one clock cycle of iclk. The reset cycle is repeated as long as the RESETB pin is low.

Section C—Ganymede Design

A CMOS process offers several different photodetector structures, almost all present as parasitic devices. The main devices are photogate, vertical and lateral bipolar structures, and vertical and lateral diodes.

The preferred structure was chosen mainly on the estimated sensitivity of that structure in the 800-850 nm range. Sensitivity is a function of several parameters:

- Quantum efficiency (dependent on junction profile)
- Effective detector area (the effective area can be improved by using microlenses)
- Pixel capacitance (which depends on the structure as well as the pixel circuits)

Among these, quantum efficiency plays a more important role in the selection of the structure, as the other two parameters are less dependent on the junction profile.

Pixel Circuits

Figure 108A:
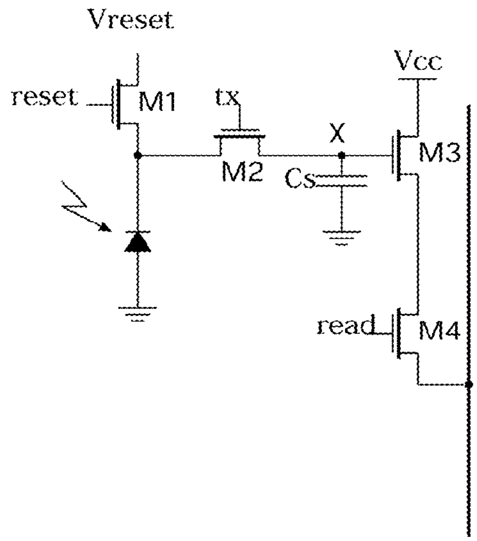
Figure 108B:
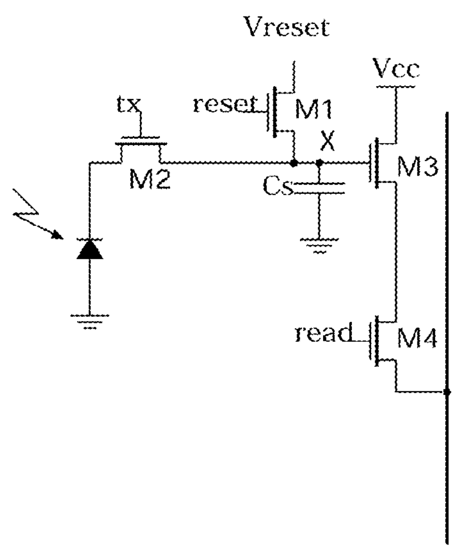
Figure 109:
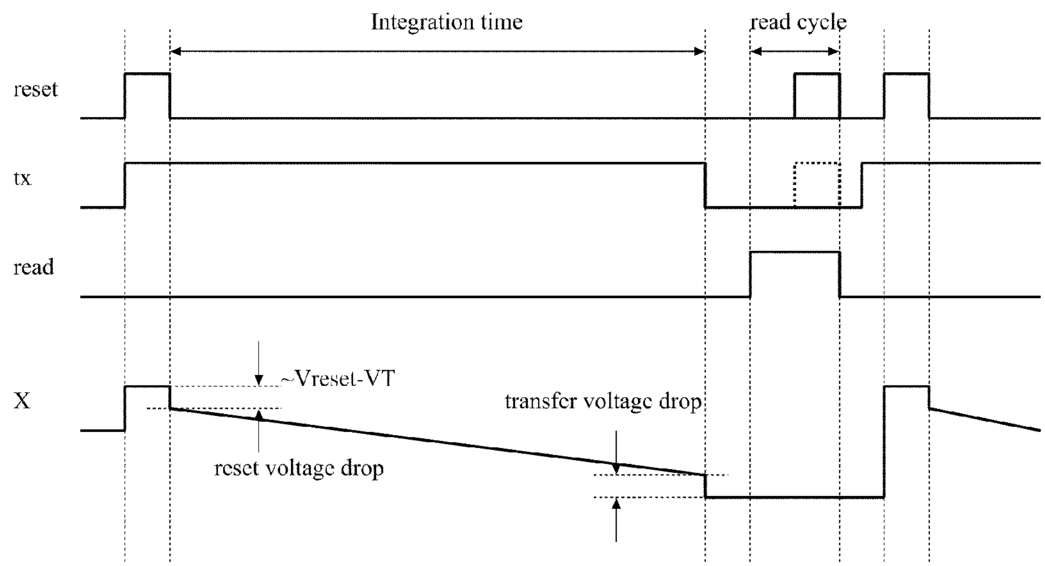
Figure 109A:
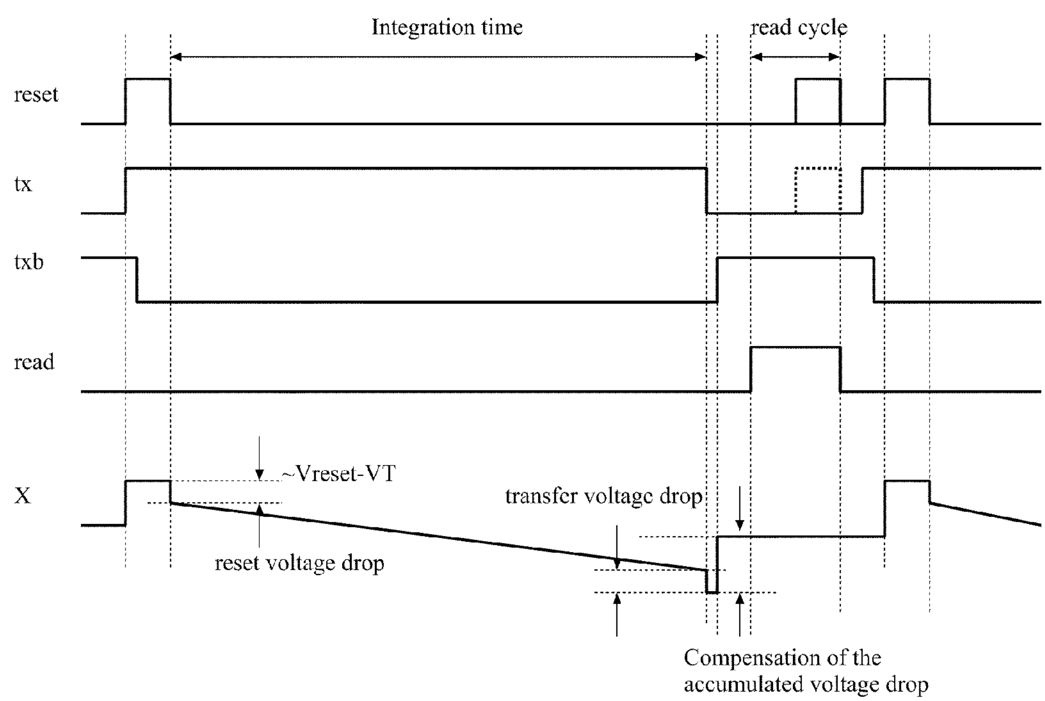

This section describes the circuits used at each pixel. Here we only discuss the shuttered (or freeze-frame) pixel circuits, although unshuttered pixels can also be used Two circuits commonly used for a shutter pixel are shown in FIGS. 108*a* and 108*b*. The difference between the two circuits is the location of the reset transistor M1 with respect to the storage node X. In both circuits M1 is the reset transistor, M2 is the transfer transistor, M3 is the output transistor, and M4 is the row-select transistor. The capacitor Cs is the storage capacitance, which may implicitly exist as parasitic capacitances at the storage node X. Alternatively, additional capacitance can be added to improve the charge retention capability of the pixel. FIG. 109 shows a typical timing of the signals and voltages.

Notwithstanding their differences, the circuits of FIGS. 108*a* and 108*b* are almost identical with respect to sensitivity and dark current. This is because during the active period of the pixel (integration time) shown in FIG. 109, when M2 is on, the storage node X sees the same amount of capacitance and junction diodes. The main difference between operation of the two circuits is during the reset period of the read cycle. For the circuit of FIG. 108*a*, the tx signal should also be on to allow the storage node to be reset, while the circuit of FIG. 108*b* does not require this. Also in the circuit of FIG. 108*a*, the photodetector current will lower the reset voltage at node X, and will induce an image dependent reset noise. However, during the reset period of the circuit of FIG. 108*b*, M2 can be turned off.

Reset Voltage Drop

A major problem faced by all active pixel circuits is the voltage drop when the reset voltage is lowered. In shuttered pixels there is also the voltage drop induced by the transfer transistor. It should be noticed that this voltage drop reduces the dynamic range of the pixel, and therefore is an undesirable effect. The voltage drop is caused because of capacitive coupling between the gate of these transistors are the storage node.

Many alternatives have been suggested to remedy this problem, including increasing the reset voltage Vreset to account for the voltage drop, or using more complex read-out circuits. All of these alternatives bring their own set of undesirable side-effects.

Figure 110:
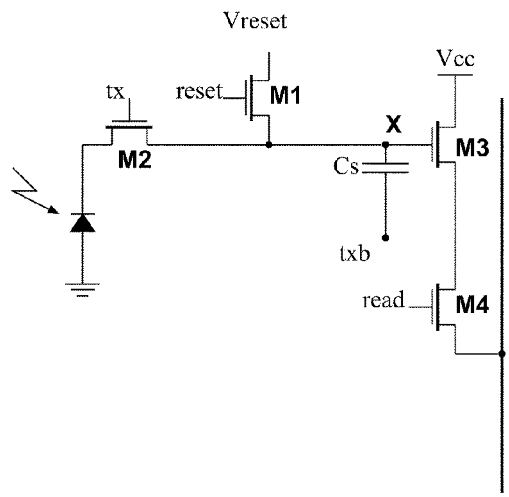

FIG. 110 shows a preferred embodiment of a pixel design which reduces this problem. As shown, the storage node includes a capacitor, the other side of which is connected to txb, the logically negated version of tx. It will be appreciated that txb is a particularly convenient signal, in terms of timing and voltage, to use. However, any other suitable signal can be used to partially or wholly compensate for the voltage drop.

The value of the capacitor is determined such that it compensates for the substantially all of the voltage drop effects. Physically the capacitor can be implemented such that it covers the active circuits, such that it does not affect the fill factor of the pixel. For a typical 10 um×10 um pixel, the amount of capacitance needed to compensate for the voltage drop is about 0.2 fF. Compared to the total capacitance of 30-40 fF, this is negligible, and therefore it does not affect the sensitivity of the pixel.

Sensitivity

Before starting any discussions we define the "sensitivity" to avoid confusion with other implied meanings of this term. The term "sensitivity" used here is the conversion factor from input light power in Watts to output pixel voltage in Volts.

The main parameters determining sensitivity are the QE, pixel area, and effective pixel capacitance. In order to simulate the sensitivity we use the circuit shown in Figure. The input current sources are ratioed to reflect their respective QE at a wavelength of 850 nm. For a 1 Watt/m^2 input light at 850 nm the photon flux per unit area is:

$$N=\frac{\lambda}{hc}=\frac{850\times10^{-9}}{6.63\times10^{-34}\times3\times10^{8}}=4.27\times10^{18}\frac{1}{s\cdot m^{2}}$$

Using the simulated QE numbers for the Nwell-Psub and Pdiff-Nwell-Psub structures, we can conclude that for a 10 u pixel, with approximately 80% fill factor, the photocurrent for a 1-Watt/m^2 input light will be $$\begin{aligned}I_{NWell\text{-}Psub}&=\frac{QE\times A\times FF\times A\times q}{t}\\&=0.123\times4.27\times10^{18}\times0.8\times10^{-10}\times1.6\times10^{-19}\\&=0.672\times10^{-11}\end{aligned}$$

$$\begin{aligned}I_{Pdiff\text{-}NWell\text{-}Psub}&=\frac{QE\times A\times FF\times A\times q}{t}\\&=2.28\times4.27\times10^{18}\times0.8\times10^{-10}\times1.6\times10^{-19}\\&=13.5\times10^{-11}\end{aligned}$$

In order to estimate the sensitivity we can use these values in a transient simulation. However, as most spice simulators are not tailored for low current simulations to give accurate "current" outputs, and the available simulators could not converge, we will use a different method to estimate the effective capacitance at the storage node, and then deduce the sensitivity. We use AC simulations. By applying an AC voltage at the storage node, and then measuring the drawn current, we can find an estimate for the total capacitance.

From the simulations the total capacitance at the storage node is 31 fF and 40 fF for the Nwell-Psub, and Pdiff-Nwell-Psub structures, respectively. The sensitivity of the devices can be calculated to be 21.6 and 337.5 V·s/W for the respective structures.

Area Dependence

We have found that sensitivity improves only as a function of fill factor, and is relatively constant for pixel dimensions larger than 10 um.

Column Circuit

Figure 111:
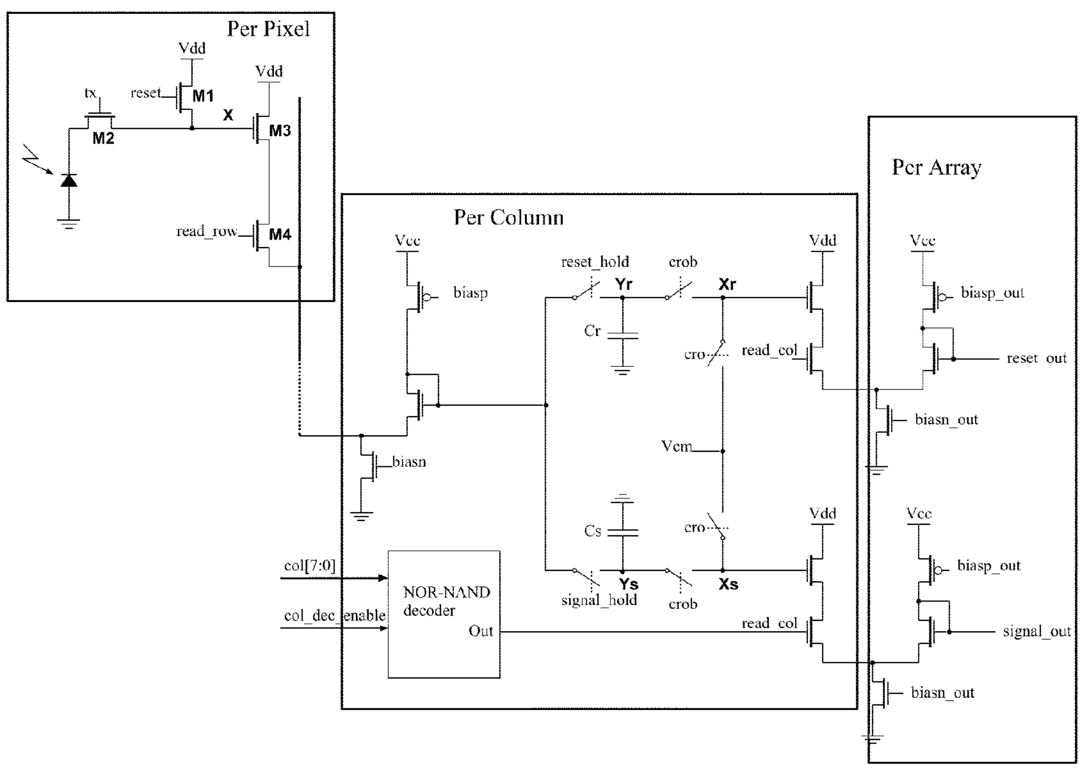
Figure 111A:
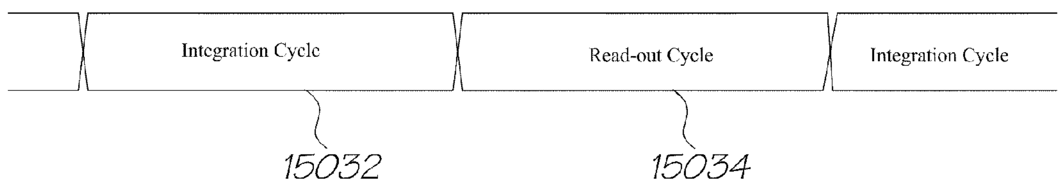

A column circuit 15030, as shown in FIG. 111, is present at each column of the sensor array 15012. At the end of an integration cycle, the column circuit 15030 is activated. The rows are sequentially multiplexed to the input of this circuit. The illustrated circuit performs buffering in addition to pixel level and column level correlated double sampling (CDS).

In the column circuit 15030, the source-follower transistor and the read_row transistor are connected to three other transistors in such a way to form a basic unity-gain buffer. This circuit is advantageous over the traditional source-follower structure, as it provides a gain closer to one, and therefore reduces the dynamic range loss from the pixel. The output of the first buffer is sampled twice, using two identical sample-and-hold structures. The sampling is first done by activating the signal_hold, and storing the value on Cr. Then all pixels in the row are reset, and the reset value is sampled, this time onto the Cs capacitor. This operation performs the pixel level CDS.

During the period when the sampling is performed, the cro signal is set high, and in effect resets the output buffer circuits following the nodes Xr and Xs. Once sampling has finished, the cro signal is set low and the sampled signals are transferred to Xr and Xs, and buffered to the outputs. This operation performs column level CDS.

It should be mentioned that the circuit following the sensor (either a PGA or ADC), should be designed such that it can benefit from the column level CDS mechanism, i.e. it can process the outputs from the two different phases of cro.

Column Decoder

The column decoder is part of the column circuit 15030. It implements a N−2 N decoder, and as such it can be used in a random access mode.

Timing

The timing of the signals controlling the pixel and column circuits can be separated into alternating integration and read-out cycles.

During each integration cycle 15032, the entire sensor array 15012 is first reset and then the electronic shutter is left open to integrate the photocurrent. At the end of this cycle the shutter is closed and the integrated charge is stored in the pixel. In the read-out cycle 15024 the stored charge is read out row by row and the pixel-level and column-level CDS is performed, and the output is read out pixel by pixel.

Figure 112:
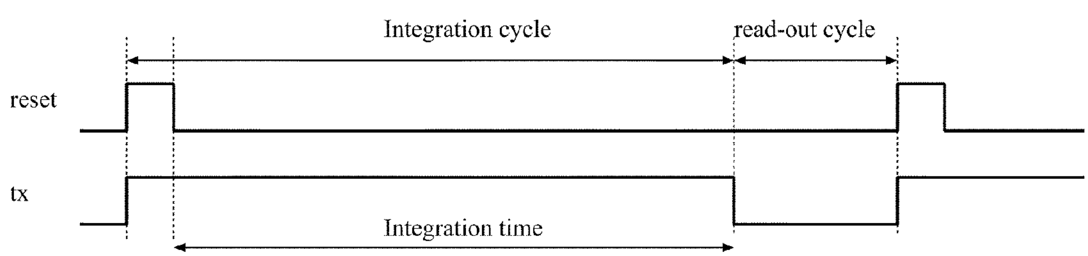

The timing diagram for the integration cycle 15032 is shown in more detail in FIG. 112. The main signals during this cycle are the reset and tx signals. These signals act on all pixels in the sensor array.

Figure 113:
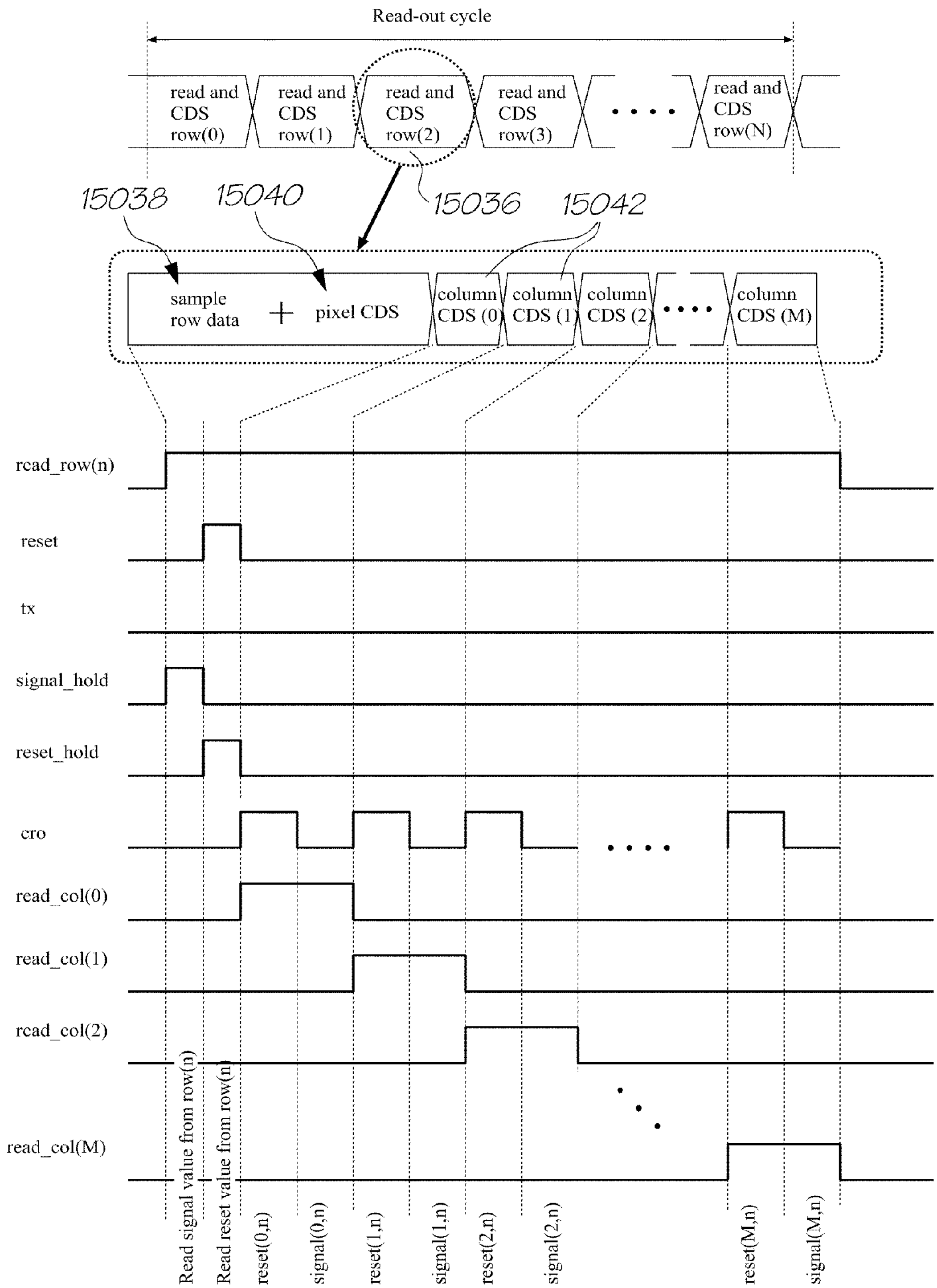

The read-out cycle is more complex as it involves several different operations. FIG. 113 shows the sequence of events and the timing diagram during the read-out cycle. The read-out cycle essentially consists of a series of "read and CDS row(n)" cycles 15036, for all rows of the sensor array 15012. Each "read and CDS row(n)" cycle 15036 in turn consists of a "sample row data" 15038, a "pixel CDS" 15040, and a series of "column CDS" cycles 15042. During the "sample row data" period 15038, first signal_hold is set high, and the data is sampled and held by its corresponding capacitor. In the next phase, the entire row of pixels is reset and the reset value is sampled and held by its associated capacitor. The row decoder circuit is designed such that it supports the resetting of only one row of pixels during the read-out cycle, while it globally resets the pixel array during the integration cycle. The pixel CDS 15040 is inherently done during this same cycle.

During each of the "column CDS" cycles 15042, first the signal cro is set high to provide the off-set component of the column circuits, and then cro is set low to transfer the sampled signal and reset values to the output. This operation is repeated for all the columns in the sensor array 15012.

Row Decoder

Figure 114:
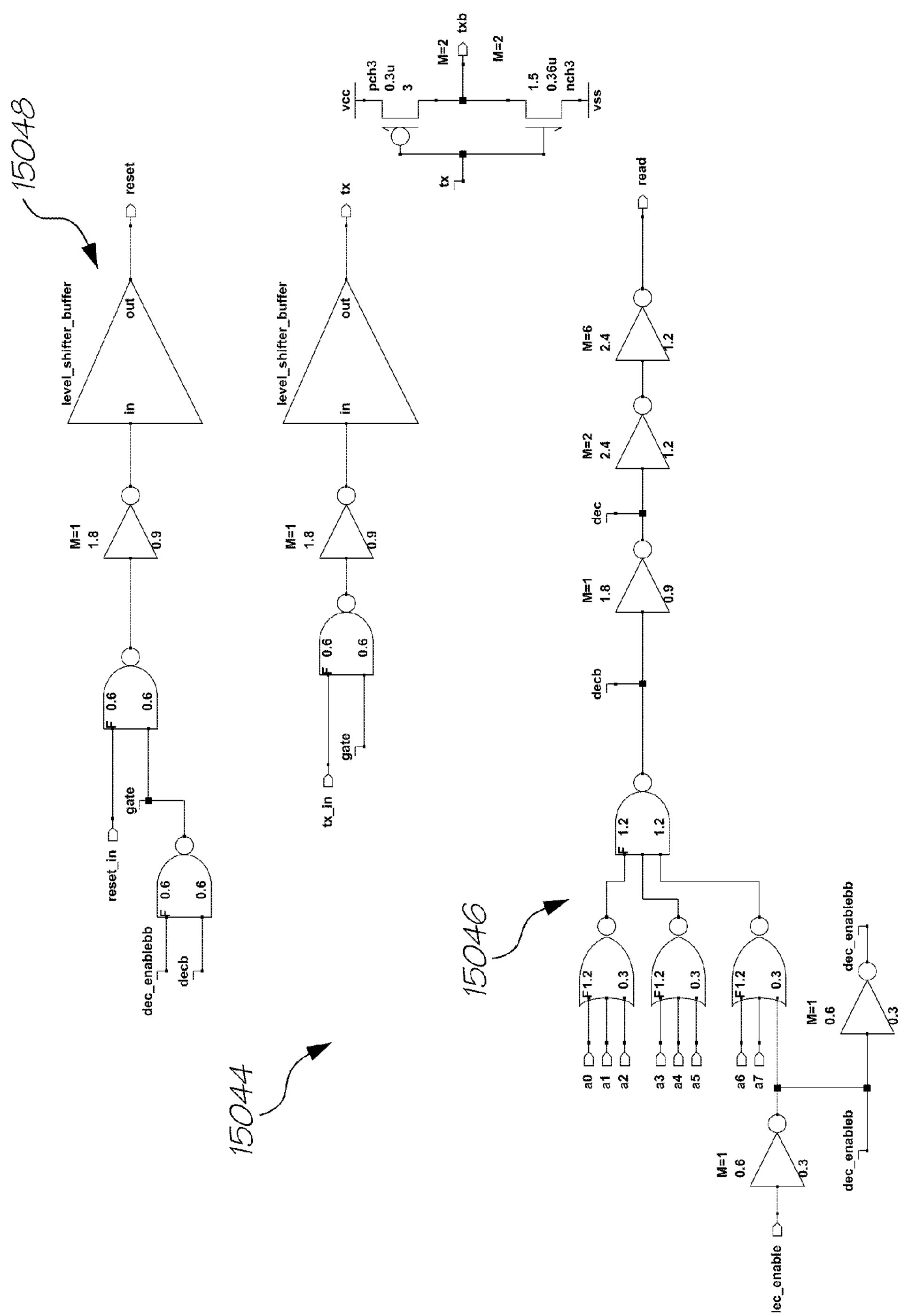

Turning to FIG. 114, a row decoder 15044 is responsible for providing multiplexing signals for the rows, and also controlling the behavior of the reset and tx signals. The decoding is performed by a NOR-NAND structure 15046.

The dec_enable signal controls the behavior of the reset and tx signals. When dec_enable is low, the entire row decoder is disabled and none of the rows are activated. At the same time, the reset and tx signals will take a global role and can be active on all rows.

Figure 115:
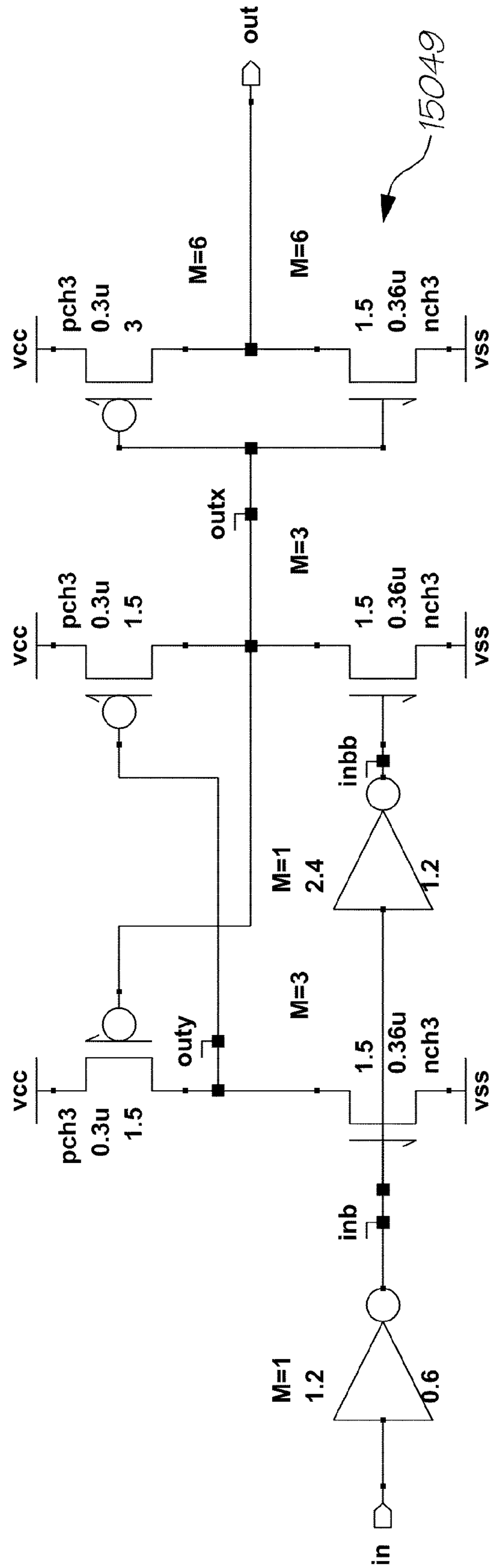

As the row decoder 15044 implements a N−2N decoder, it can be used in a random access mode. Level shifter buffers 15048 are used to translate the logic levels from VDD to VCC (in this design from 1.8 V to 3.0V). FIG. 115 shows one of the level shift buffers 15048. The level shift buffer uses a basic feedback level shifter, which is properly ratioed to avoid any potential latch-up during fast transitions. In this circuit except for the two inverters, all other transistors are designed with the high voltage option. Notice that output PMOS transistor 15050 has been intentionally made weaker than NMOS 15052, to remove any possible overlap between the outputs from two consecutive rows when switching from one row to the next.

Biasing

The only circuits that require biasing are the column circuits 15030. There are four biasing voltages that need to be generated: two for the input buffer (biasn and biasp), and two for the output buffer (biasn_out and biasp_out) (see FIG. 111).

Figure 116:
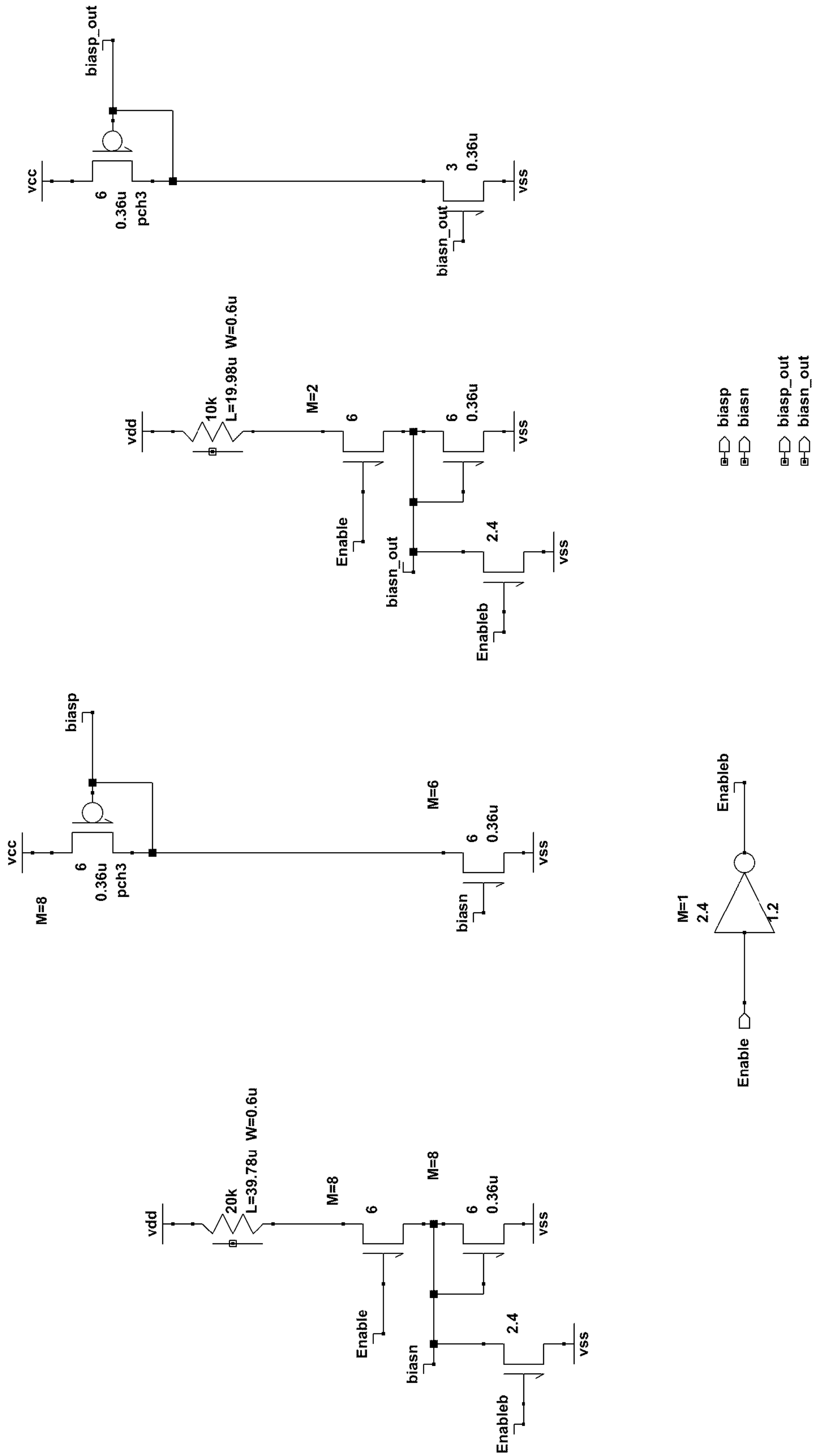

FIG. 116 shows the generator circuitry, comprising basic resistor-based bias generators.

Layout Design

The layout design of the sensor is described in this section. The most important part of the layout design is the pixel design, and the interacting layouts surrounding the pixel array.

A VSS ring, which also has the Psubstrate tap, surrounds the pixel array. This is to ensure that the NMOS transistors within the pixel array receive the best possible substrate biasing, as there is no Psubstrate tap inside the pixels to conserve area.

Pixel Layout

The layout of the pixel should be such that the effective photodetector area is maximised. In the following section we present the layout design of the four different pixel structures that have been selected as alternative candidates for use in the Jupiter design.

Photodiode with Capacitor

Figure 117:
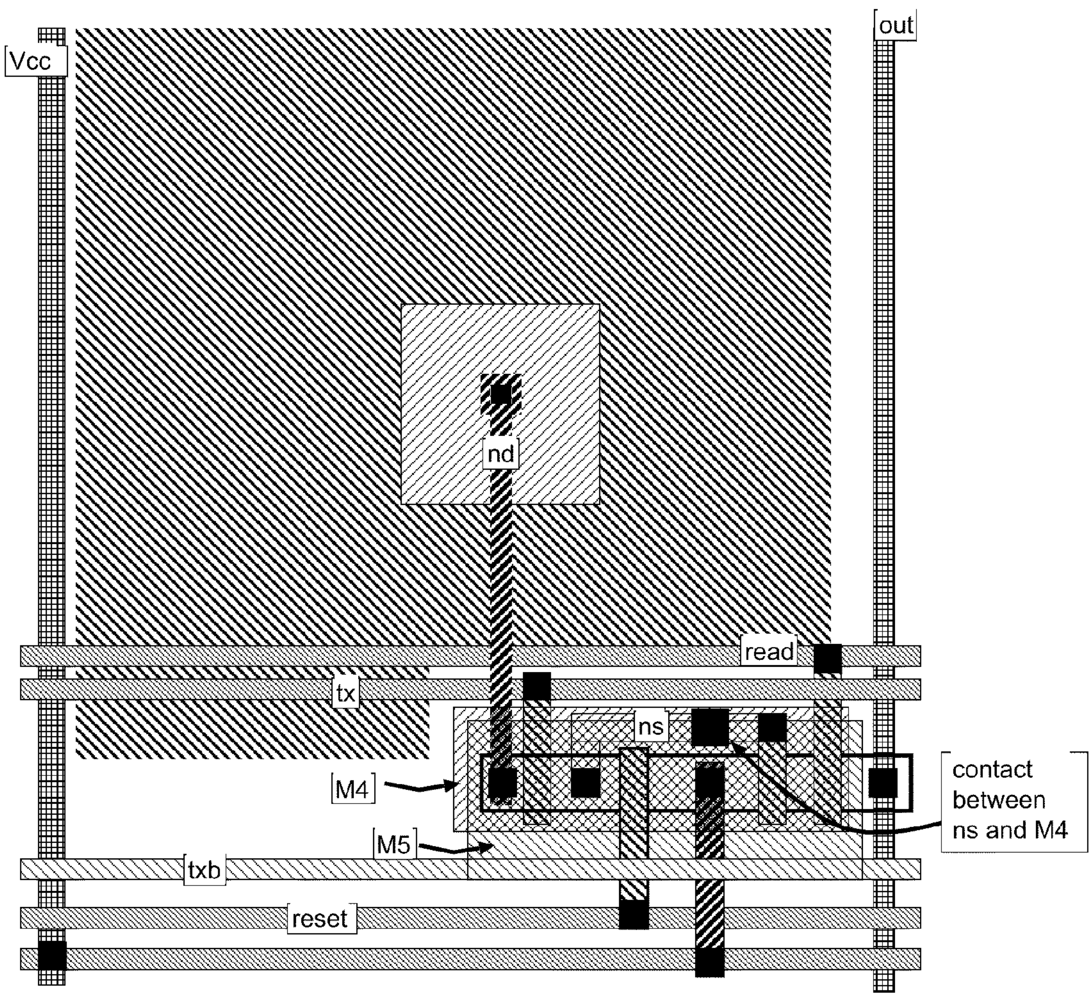

FIG. 117 shows a layout of a 10 um pixel using a photodiode and also having the capacitor for compensating the reset voltage drop as described above.

The photodiode is an NWell-Psub structure, including a central NWell connection, from which the silicide layer is removed (except where the contact to M1 is formed). The VCC supply voltage runs both horizontally and vertically to produce a mesh power structure, which reduces the impedance of the supply planes significantly.

The read, reset, tx and txb signals run horizontally. The out signal runs vertically. The capacitor has been highlighted in the figure. It is formed by the parasitic capacitance between M4 and M5. "txb" runs on M5, and has been widened where the capacitor is formed. The bottom plate which is on M4 is connected to the storage node through a set of stacked vias. For the specific value required for the capacitor, it turns out that the implemented capacitor covers all the active area of the transistors, and therefore it also provides a natural shield for these circuits.

For the illustrated 10 um pixel, the fill factor is approximately 87%.

Photodiode without Capacitor

Figure 118:
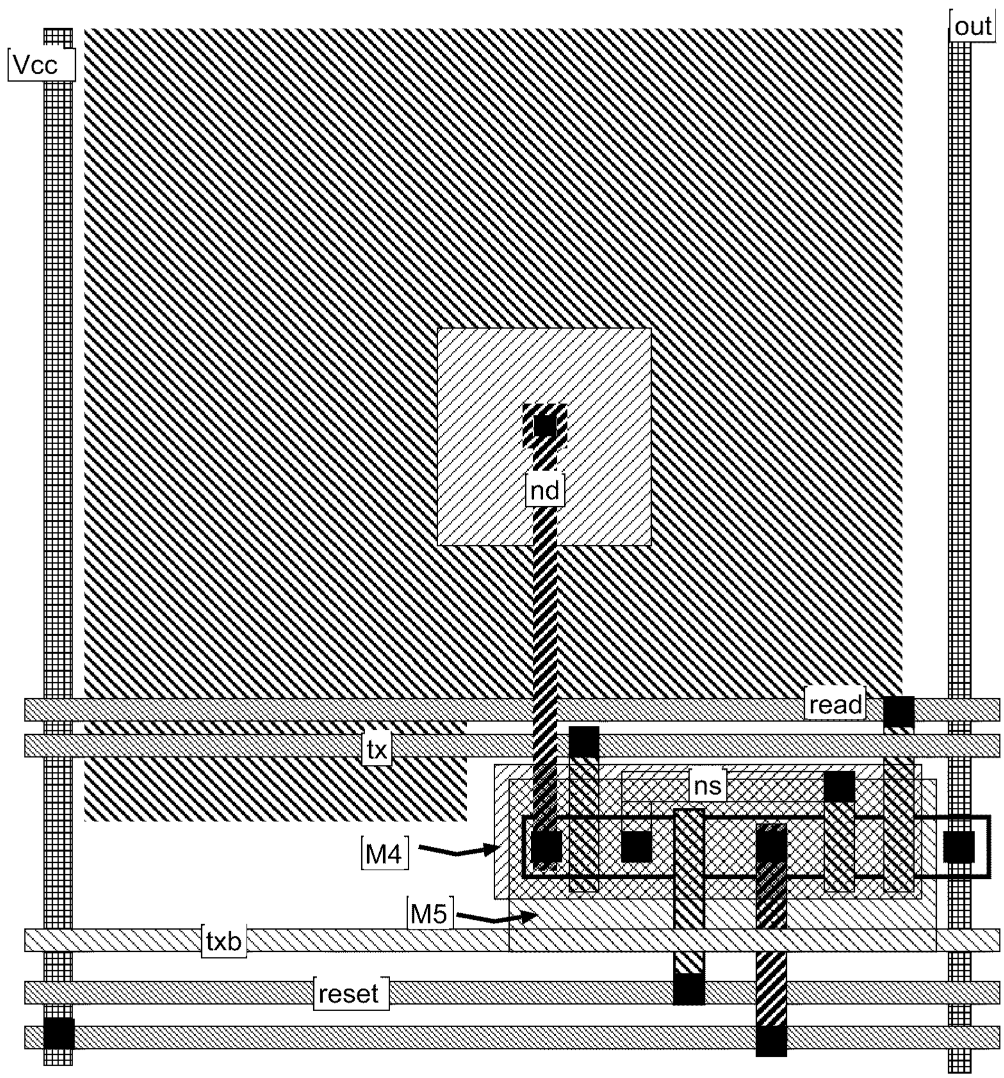

FIG. 118 shows a layout of a 10 um pixel using a photodiode. The pixel is almost identical to that shown in FIG. 117, without the capacitor. There is no M4 below the area where txb has been widened, and therefore no capacitance is formed.

Photo-BJT with/without Capacitor

Figure 119:
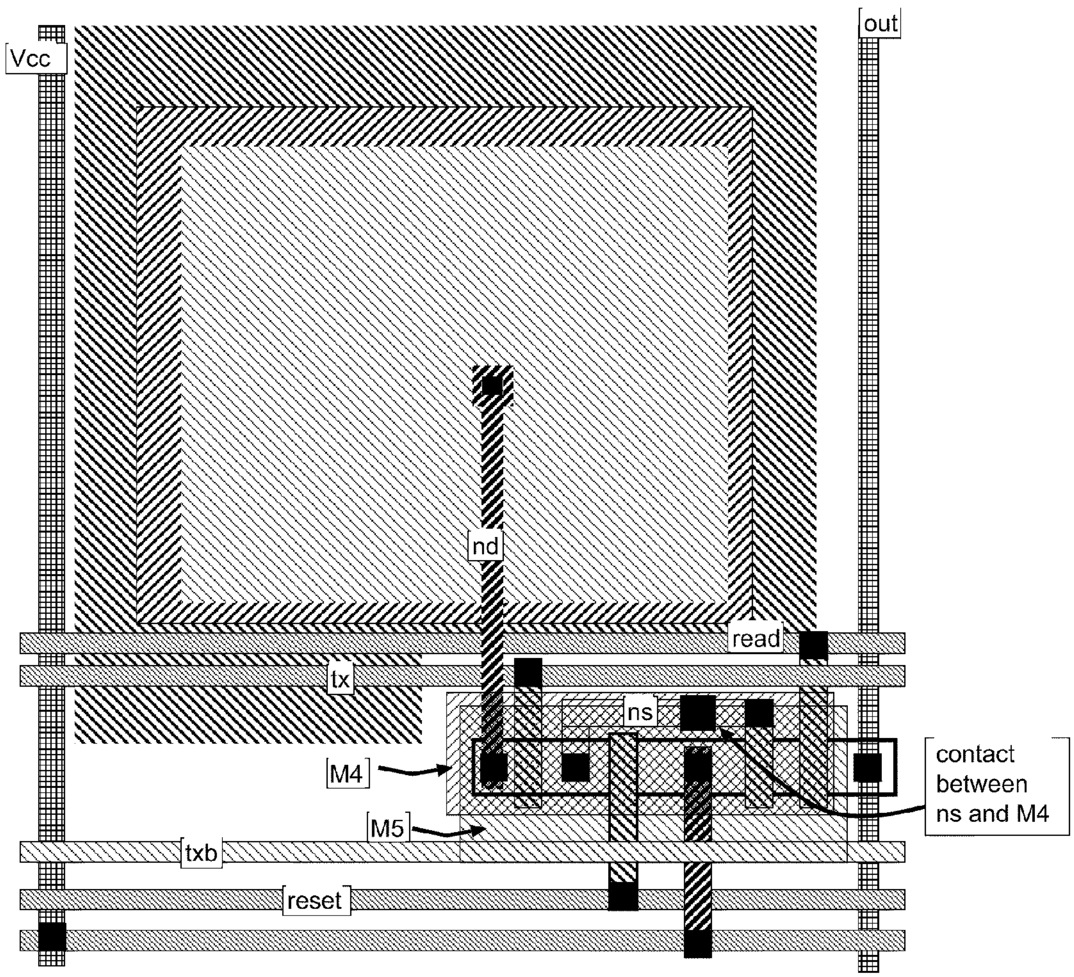

FIG. 119 shows a layout of a 10 um pixel using a Pdiff-NWell-Psub BJT as the photodetector. The layout is very similar to those using a photodiode. The pixel circuit is identical to that used in the photodiode based pixels, and therefore it will not be described here again.

The Pdiff area in this case has been maximized to increase the emitter area. The silicide has been removed from the Pdiff area, except where the emitter contact is made.

Power Routing

A VSS ring which also has the Psubstrate taps surrounds the pixel array. This is to ensure that the NMOS transistors within the pixel array receive the best possible substrate biasing, as there is no Psubstrate tap inside the pixels. A VCC ring also surrounds the array, mainly to ensure that VCC is supplied from all sides of the array to the pixels.

The VCC supply in the pixels runs both horizon-tally and vertically, to produce a low impedance supply mesh. The power routing to the row and column decoders are provided using the top metal layers from M3 to M6.

Light Shielding

The most critical circuits in any image sensor that may be affected by the incoming light are the row and column driving circuits, simply because they are physically close to the pixel array and therefore will be exposed to light. In order to avoid any potential problems, all the circuits in the current design are covered by metal layers. Notice that the design rules do not allow the use of a single continuous layer of metal, and therefore multiple overlapping metal layers have been used to cover the circuits in the preferred embodiment.

It is also worth mentioning that in the 800 nm+ range of input wavelength, only NMOS transistors can potentially be affected by the light, as the PMOS transistors are inside an NWell and have an intrinsic barrier for the photo-generated carriers, which are generated deep in the silicon bulk. Nevertheless, all circuits have been shielded in the preferred embodiment.

Interface

Figure 120:
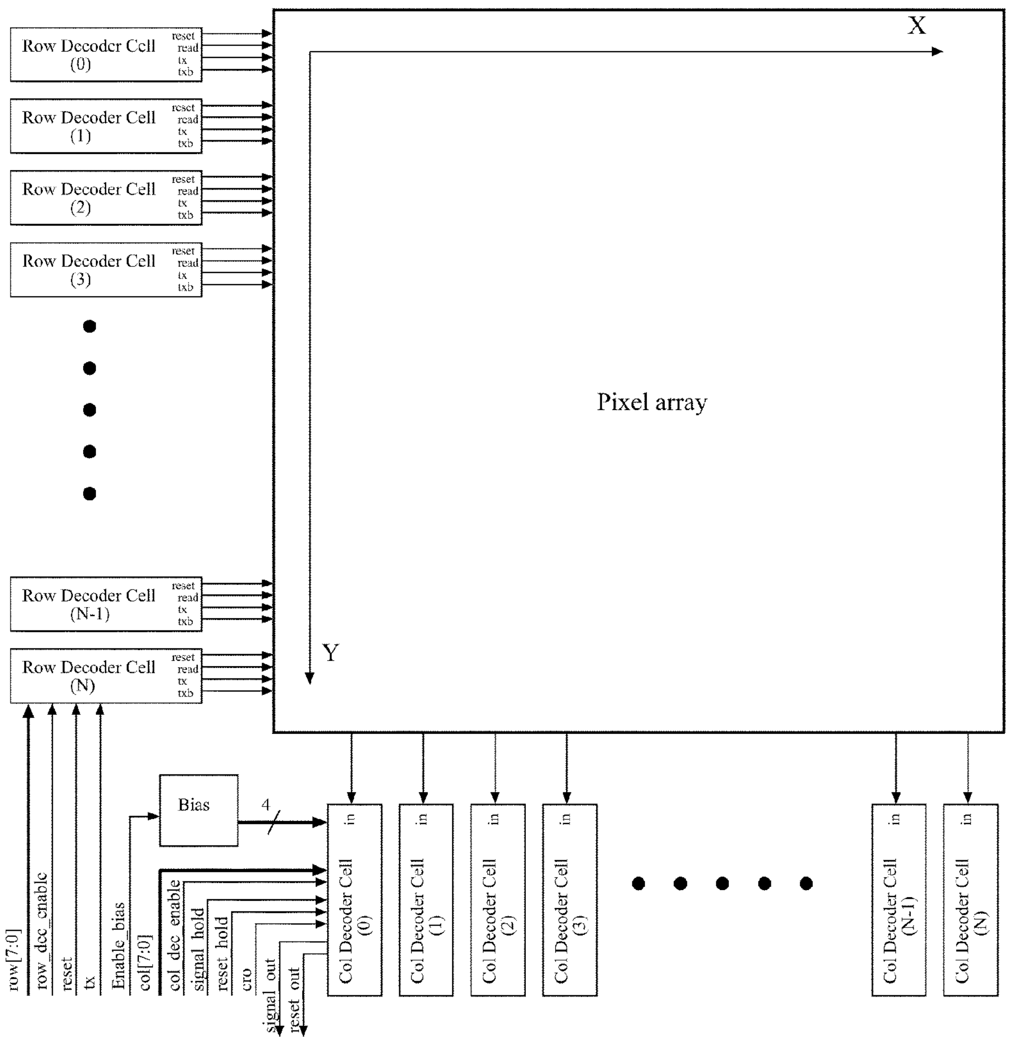

FIG. 120 shows the block diagram of the image sensor. The sensor consists of an M×N pixel array 15054, an array of N row decoder circuits 15056, an array of M column decoder circuits 15058, and a bias circuit 15060.

The size and the number of pixels can be designed according to the required specification.

1.6.2 Operation

This section describes basic steps to operate the sensor. The image sensor only supports one operation mode, which is the normal mode.

In order to operate the sensor in the normal mode the following steps are be followed:

1. Set all the digital input signals to low.
2. Apply the appropriate VDD, VCC, and VSS supply voltages
3. Set the Enable_bias input to high, and wait for at least 1 us. This step may be bypassed if the Enable_bias has already been set high.
4. Set the tx input to high.
5. Set the reset input to high. This will reset all pixels in the array.
6. Wait for the desired integration time.
7. Set the tx input to low. This will close the shutter and store the image at the storage node.
8. Set the "row" address bus to the desired starting address.
9. Set the "col" input address bus to the desired starting address.
10. Set the row_dec_enable and col_dec_enable both to high.
11. Set the signal_hold to high.
12. Set the signal_hold to low.
13. Set reset to high.
14. Set reset_hold to high.
15. Set reset_hold to low.
16. Set the cro to high. At this time the two output signals, signal_out and reset_out, will have the column offset value.

17. Set cro to low. At this time the two output signals will have the pixel signal and reset values.
18. Change the "col" address bus to the next desired value, and repeat the steps from Step 16 to Step 18, up to the last desired column address.
19. Change the "row" address bus to the next desired value, and repeat the steps from Step 11 to Step 19, up to the last desired column address.
20. If the sensor is to be disabled, set all the digital inputs to low. However, if the sensor is to remain enabled, set all digital inputs except Enable_bias to low.

Disabling the Sensor

In order to disable the sensor at any time, the Enable_bias, col_dec_enable, and row_dec_enable signals are set to low. The reset and tx signals should also be set to low, otherwise, the sensor may dissipate power.

8-Bit ADC Design

ADC Architecture

The selection of appropriate architecture for the ADC is a critical step in achieving reliable design, and silicon performance. A fully differential pipelined ADC design is used in the preferred embodiment. A redundant signed digit (RSD) structure is used because it presents an inherent self-correcting function due to the redundant nature of the operation, and because it is relatively tolerant to offset error in comparators, which is the major source of error in other ADC structures.

Figure 121:
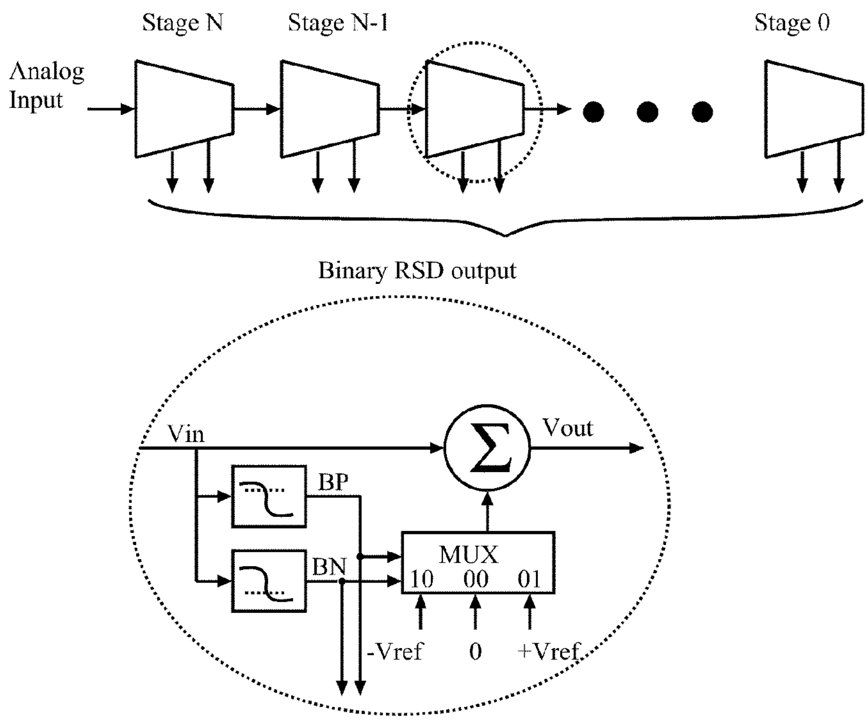

FIG. 121 shows the structure of a pipelined RSD ADC 15062. It consists of identical stages, each of which has an analog input, an analog residue output and two digital outputs.

In an RSD based pipeline ADC, in the first step the input is compared against two levels. These two levels are often chosen at +Vref/4 and −Vref/4. If the input is above both levels the input is reduced by Vref/2 and then amplified by a factor of 2. If the input is between the two levels, the input is directly amplified. And finally, if the input is below both levels, the input is increased by Vref/2 and then amplified by a factor of 2. The input-output equations for one stage of the pipeline are $$\text{if}\left(Vin > \frac{Vref}{4}\right) \quad BP = 1,\ BN = 0 \quad Vout = 2\left(Vin - \frac{Vref}{2}\right)$$

$$\text{if}\left(-\frac{Vref}{4} < Vin < \frac{Vref}{4}\right) \quad BP = 0,\ BN = 0 \quad Vout = 2\left(Vin - \frac{Vref}{2}\right)$$

$$\text{if}\left(Vin < -\frac{Vref}{4}\right) \quad BP = 0,\ BN = 1 \quad Vout = 2\left(Vin - \frac{Vref}{2}\right)$$

Vin is the analog input, BP and BN are the digital outputs, and Vout is the analog residue output.

In order to convert the digital outputs of each stage we should remember that an output of BP=1, BN=0 means that this digit has a value of +1, BP=0, BN=0 has a value of 0, and BP=0, BN=1 has a value of −1. For example the four-bit RSD number (+1)(−1)(0)(−1) is equal to $$(1\times8)+(-1\times4)+(0\times2)+(-1\times1)=3$$

Notice that we can represent 3 as (0)(0)(1)(1), hence we have a redundant representation.

The RSD digital outputs from all stages are then converted to a two's complement number system.

Implementation

The ADC bit-slice can be implemented using switched capacitor circuits. In this approach the input to each stage is first sampled on two capacitors Cs (sampling capacitor) and Cf (feedback capacitor). At the same time the input is compared against two levels and the digital bits are extracted. In the second phase, the capacitors are connected to an opamp to form an amplifier with a gain of 2.

For higher resolution ADCs (more than 8 bits) or for mixed signal designs, a differential approach is used, to reduce the effects of charge injection and substrate coupling.

Figure 122:
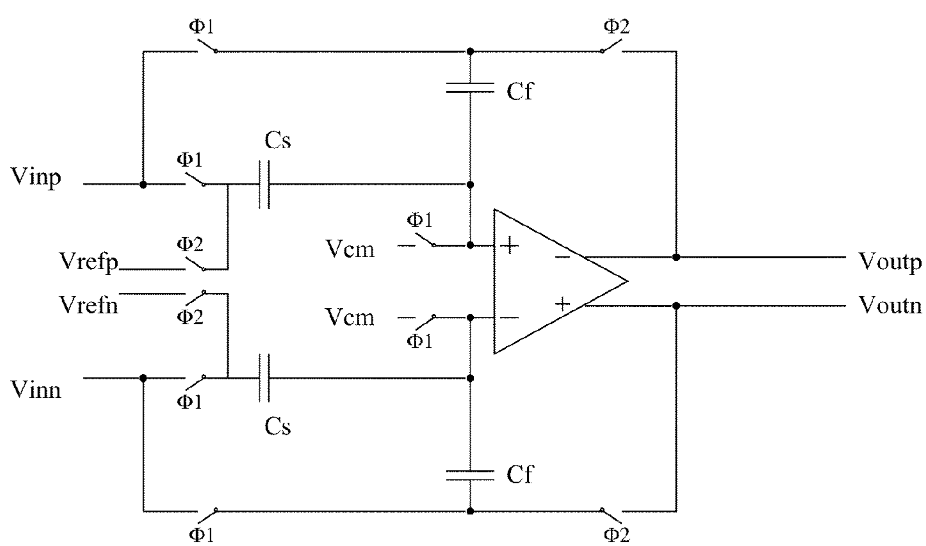
Figure 123:
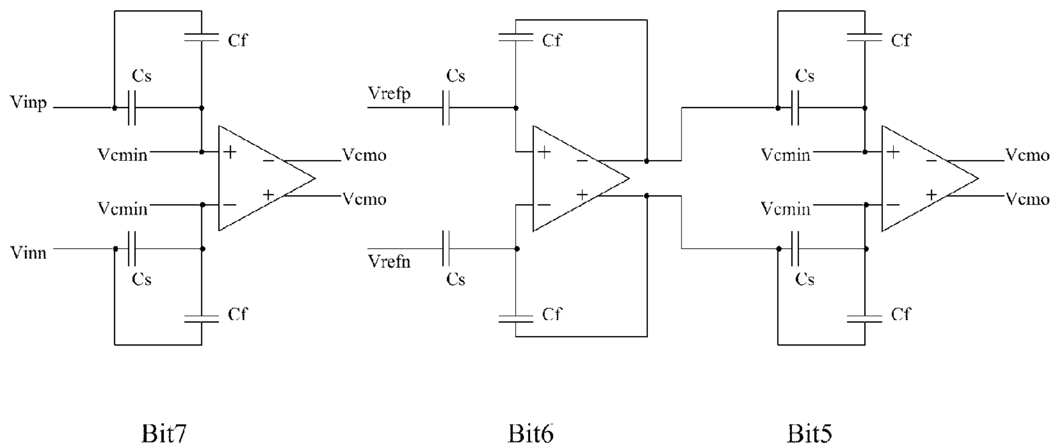

FIG. 122 shows the structure of one bit slice, and FIG. 123 shows the capacitor connections in three bit slices of the ADC in one cycle.

A critical component of the bit-slice is the operational amplifier 15064. The gain, speed, and power dissipation of the opamp determines the overall performance of the ADC. A fully-differential folded-cascode structure was chosen for this design for the following reasons.

- Folded-cascode often does not require compensation.
- The gain of a folded-cascode opamp can be improved using gain-boosting techniques.
- The optimization of the opamp is simpler due to the smaller number of transistors in the circuit.
- The biasing of the opamp can be varied without affecting the stability. Therefore, if a lower speed ADC is required the bias current can simply be reduced to lower the power dissipation.

Figure 124:
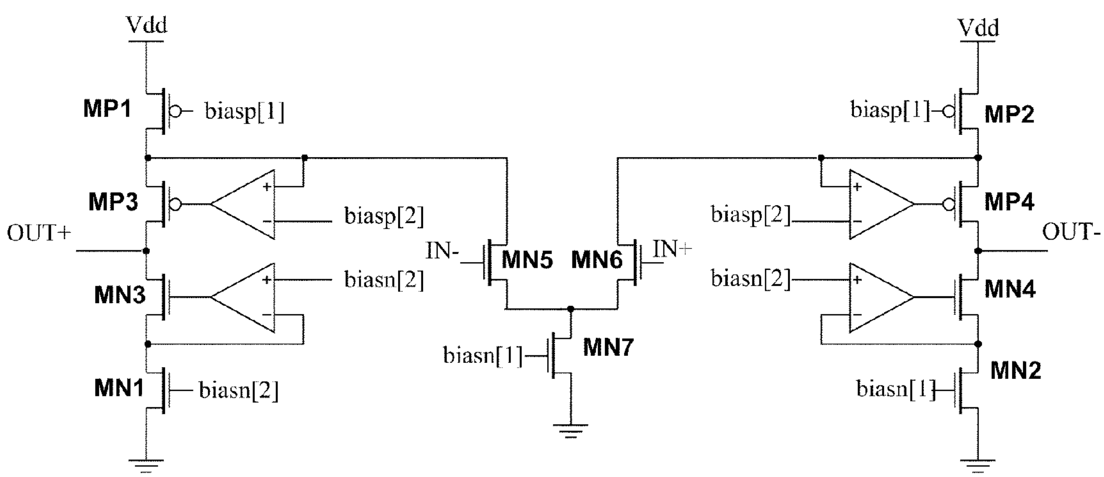

FIG. 124 shows a simplified circuit diagram of the folded cascode opamp 15064. Not shown in this Figure is the common-mode feedback circuit, which forces the common-mode voltage at the output nodes to a predefined value.

This circuit is simplified for illustrative purposes and does not represent the overall complexity involved in the design. In the following sections the design of each major component is described and the justifications for using a particular circuit are explained.

Biasing

Figure 125:
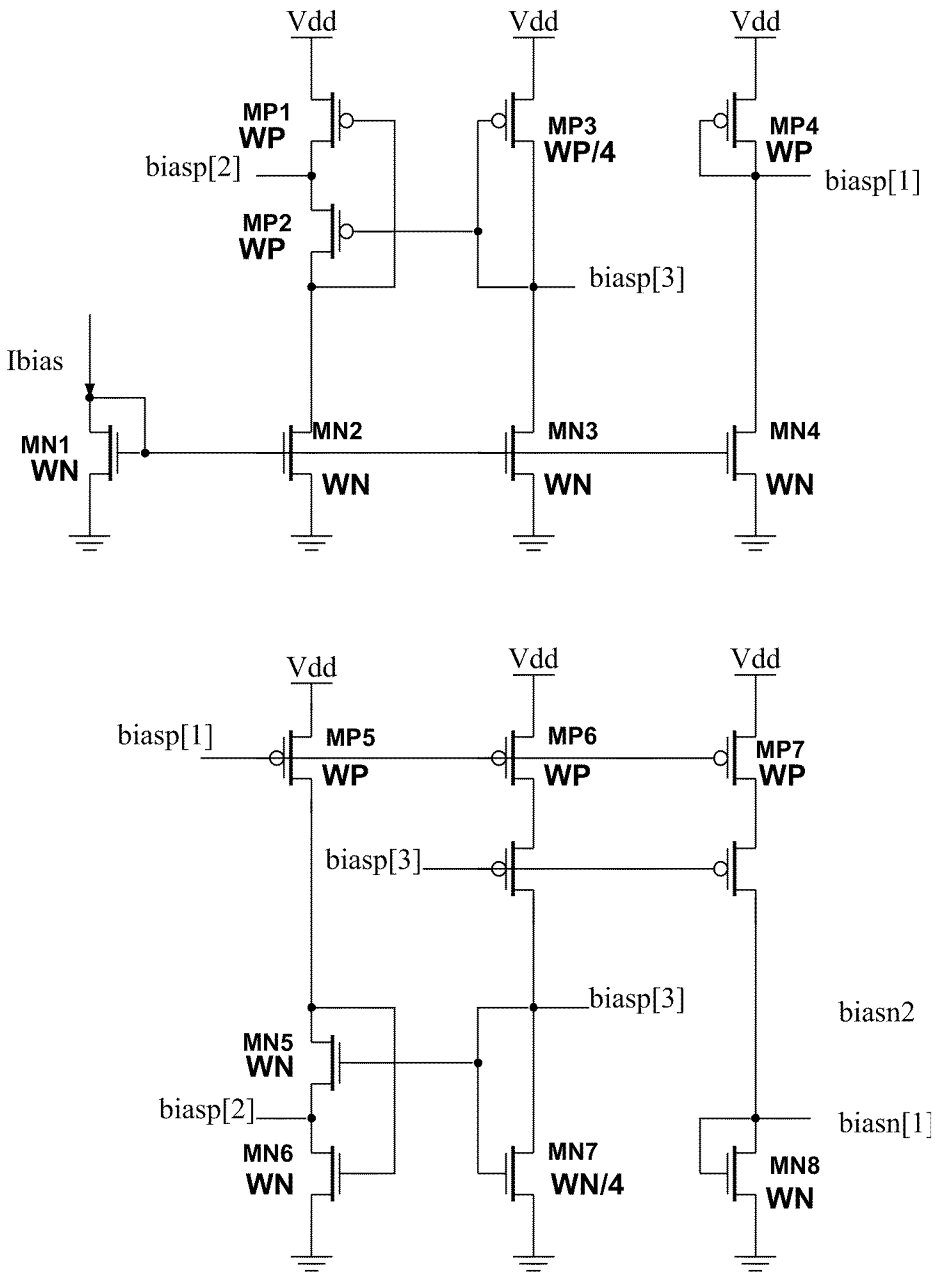

The biasing circuit provides biasing voltages that are used throughout the ADC bit-slices, and also in the PGA. The choice of the biasing voltages is very crucial. In general a trade-off between area (size of bias transistors), and the power dissipation (the bias currents) should be made. FIG. 125 shows the biasing circuit. The role of the bias voltages in the opamp are as follows:

- biasn[1] This voltage is used to determine the bias current in the input branch and the NMOS transistors, MN1 and MN2.
- biasn[2] This voltage is used for the folded cascode opamp, and determines the effective DC bias voltage across MN1 and MN2.
- biasp[1] This voltage is used to determine the bias current in PMOS transistors MP1 and MP2.
- biasp[2] This voltage is used for the folded cascode opamp, and determines the effective DC bias voltage across the PMOS transistors MP1 and MP2

In the actual implementation the sizes of the transistors have been optimized such that the VDS voltages are always at least 0.1 volts above the VDS,sat of the bias transistors in the folded structure. This is to ensure that these transistors are always in the saturation region.

The input current to the bias generator is provided by the reference current generator described below.

Common Mode Circuit

Figure 126:
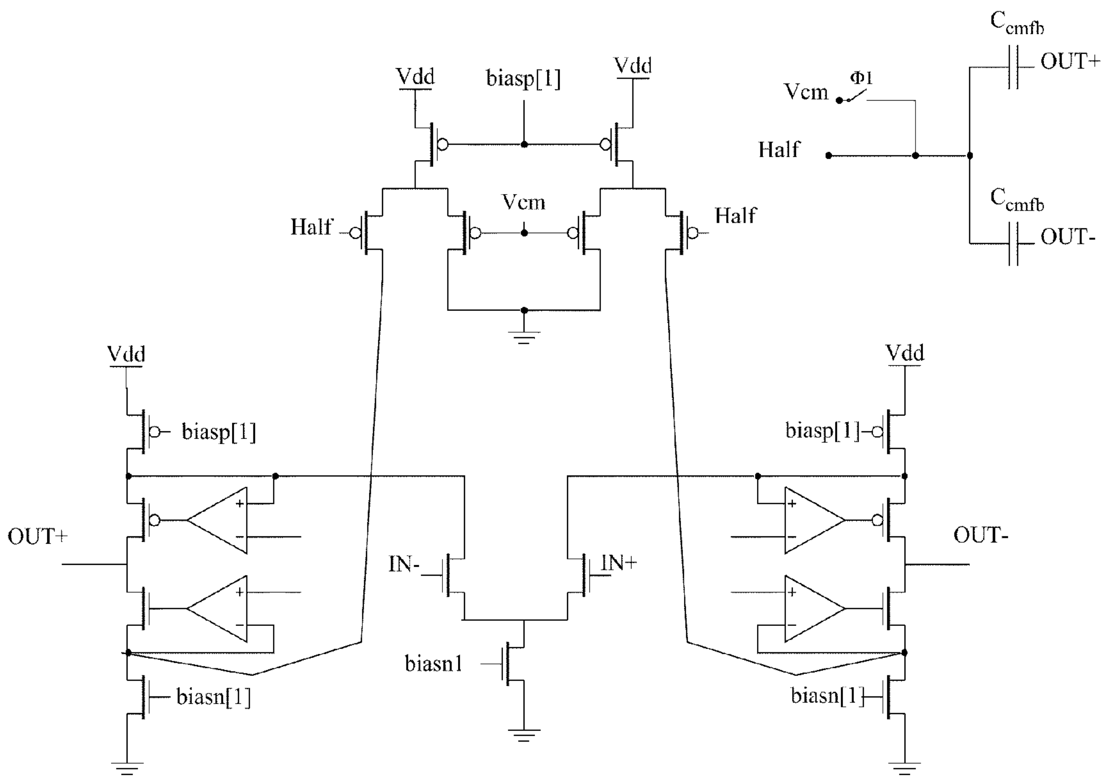

The common mode feedback circuit (CMFB) forces the outputs of the folded opamp to have a predefined common-mode voltage. This circuit effectively tries to change the biasing conditions through a feedback loop. FIG. 126 shows the implemented CMFB circuit.

The differential output of the opamp is used in a capacitive divider to find the common mode voltage of the output. This voltage is then fed back into two differential pairs, which control a current that is injected into the NMOS branch. The other input of the differential pairs is connected to the common mode voltage VCM. This feedback mechanism effectively sets the common mode voltage at the output to VCM. The size of the capacitors Ccmfb in this circuit is only about 50 fF.

The dynamics of the CMFB directly affects the dynamics of the opamp, and therefore during circuit optimization special attention should be paid to the CMFB circuit. Also notice that the CMFB circuit has a different feedback loop, and therefore its dynamics are almost isolated from the dynamics of the opamp.

Gain Boosting Amplifiers

Figure 127:
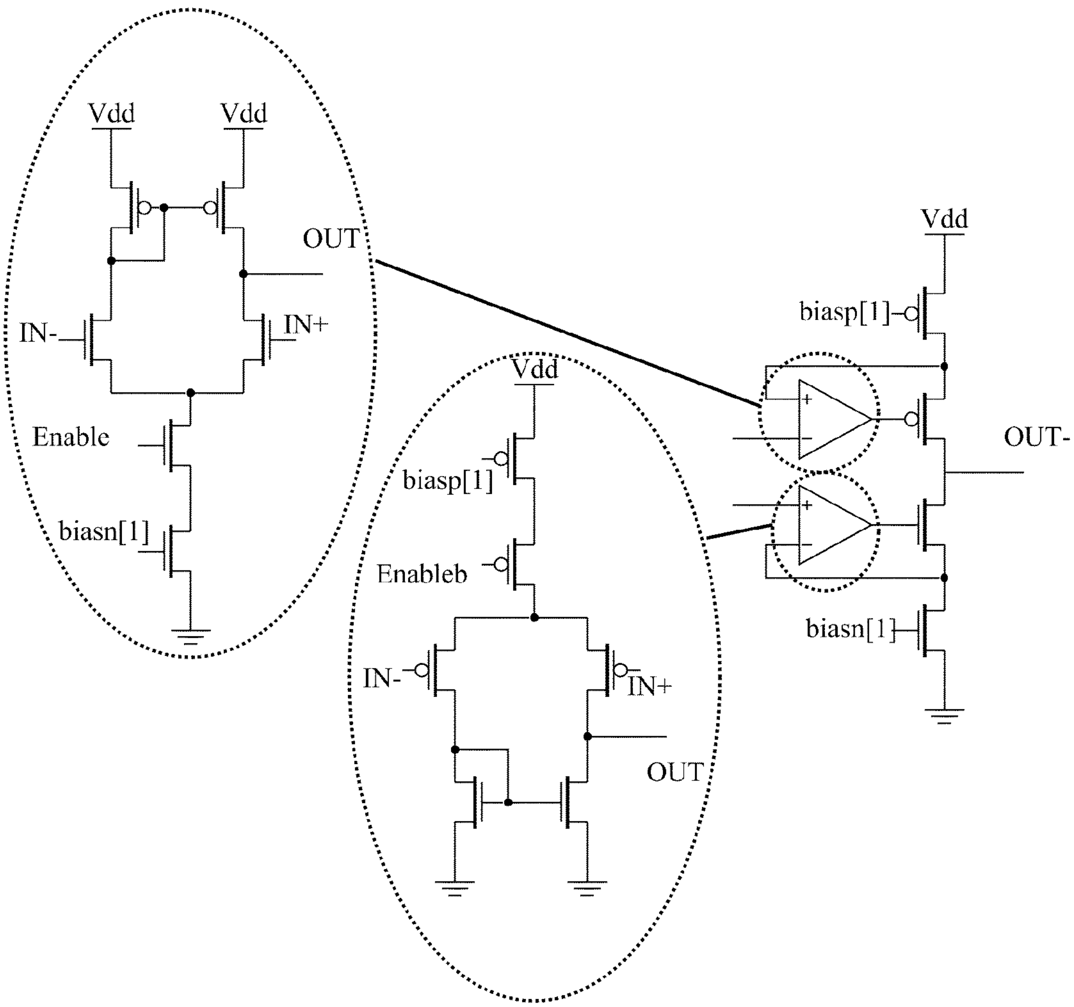

In order to increase the gain of the folded cascode opamp, gain boosting stages are required. The overall gain of the folded cascode stage without gain boosting is less than 100. This is because the cascode transistors have minimum length (0.18 um) to achieve a high bandwidth for the opamp. To increase the gain of the opamp beyond the minimum requirement (which is at least $2^N=2^8=256$) the gain boosting stages should have a gain of at least 10. This amount of gain can easily be obtained from basic OTAs, as shown in FIG. 127.

These amplifiers have been implemented such that they can be turned off. In addition to the power savings achieved by doing this, the output voltage when the circuit is disabled will be set to a value that turns off the transistor that it is connected to. For example, during the off period the output of the top opamp in the figure will be pulled high to Vdd, and therefore the PMOS transistor driven by the output will be turned off.

This turning off mechanism reduces the pressure on the voltage source used to set the common mode voltage at the output of the opamp. In fact when the gain boosting amplifiers are turned off, the output of the opamp will be floating, and the output can be set to any desired value.

An important point in the design of these stages is that their bandwidth should be much more than the overall bandwidth of the main opamp, as otherwise they will form additional poles in the circuit and reduce the phase margin. The bandwidth of the opamp has been designed to exceed 300 MHz. For an N-bit pipeline ADC the required bandwidth is approximately Therefore, a bandwidth of about 1 GHz is required for these amplifiers. This in turn translated into a large biasing current. A relatively large proportion of the power in the ADC is consumed by these amplifiers.

Clock Generator

The clock generator 15066 produces all the clock phases necessary for the operation of the ADC 15026. The circuit is essentially a two-phase clock generator, and extra clock phases are also generated.

Figure 128:
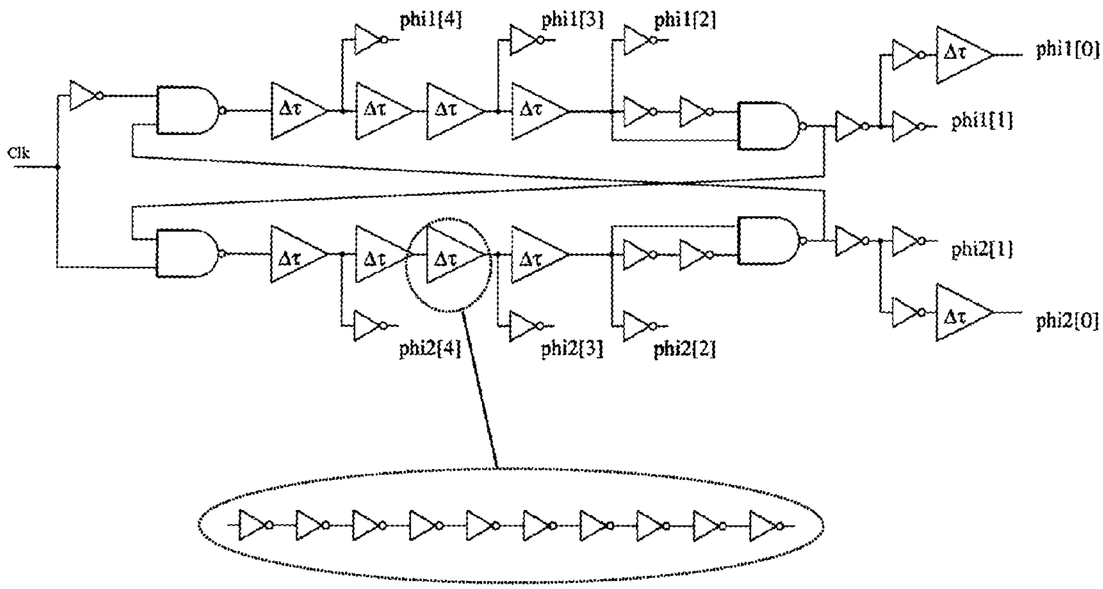

FIG. 128 shows the clock generator 15066, each branch of which generates a series of delayed clock phases. Each of these clock phases is used to control the sequence of events in the pipelined ADC. Notice that the clock phases alternate between the stages of the ADC.

Reference Current Generator

Figure 129:
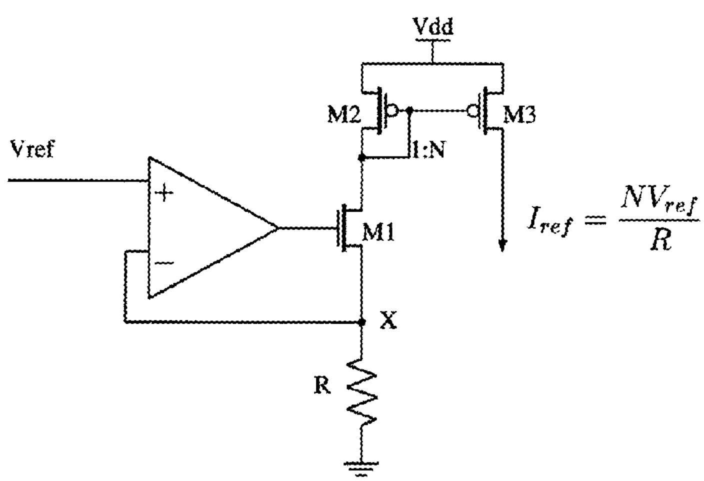
Figure 130:
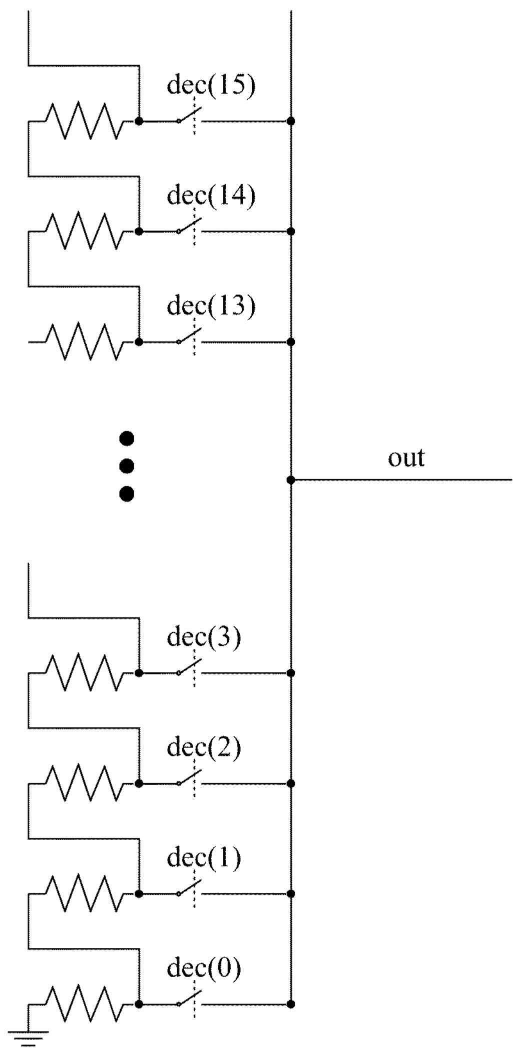

As shown in FIG. 129, the reference current generator 15068 uses a resistor R with a known value, and a reference voltage. This circuit requires a well controlled resistor. In order to maintain good control over the bias current against resistor tolerance the resistor in the preferred embodiment has been implemented as a digitally switched resistor ladder, as shown in FIG. 130. Each ladder consists of 16 equal resistors. The value of these resistors is chosen such that the total resistance in the middle of the ladder is equal to the required resistance.

Differential Comparators

Figure 131:
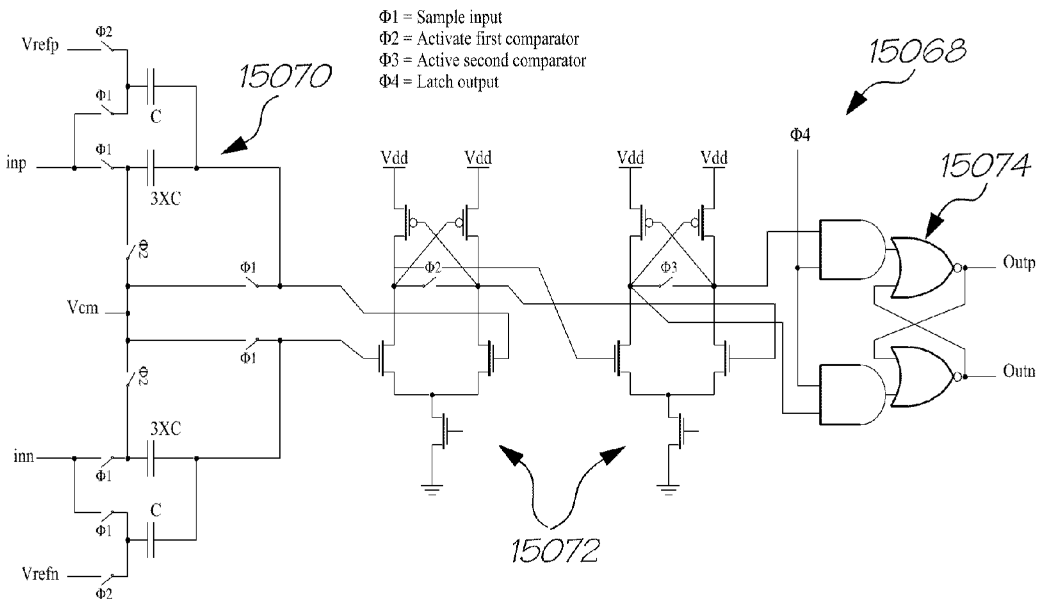

For each stage of the ADC two comparators are required. FIG. 131 shows one of these differential comparators 15068. Each comparator 15068 compares the differential input against a differential reference voltage (Vrefp/4 and Vrefn/4). A switched capacitor structure 15070 has been used in this design, which removes the need for generating the Vrefp/4 and Vrefn/4 signals. The switched capacitor structure 15070 is followed by two cross coupled differential pairs 15072, which act as the main comparator stages.

The reason for using two stages is that the input capacitors are relatively small to reduce the loading on the opamps in the bit slice. This in turn dictates the use of smaller input transistors for the first stage, and therefore, the available gain from only one stage would be low. The second stage ensures that the overall gain is high enough to avoid meta-stable states.

The output of output from differential pairs is passed to a latched RS flip-flop 15074, which ensures that the output does not change before and after the decision has been made, and also to make sure that the two outputs are always inverted, which may not be the case if a meta-stable state occurs.

Common Mode Generator

In order to generate the common mode and reference voltages necessary for the operation of the ADC a common-mode generator is designed.

The common mode voltage is derived from an inverter with self feedback. The advantages of this circuit are its simplicity, and automatic tracking of the supply voltage and process corners. The switch is used to cut off the feedback during the sleep mode, to avoid power dissipation (see FIG. 132).

Reference Voltage Generator

Figure 132:
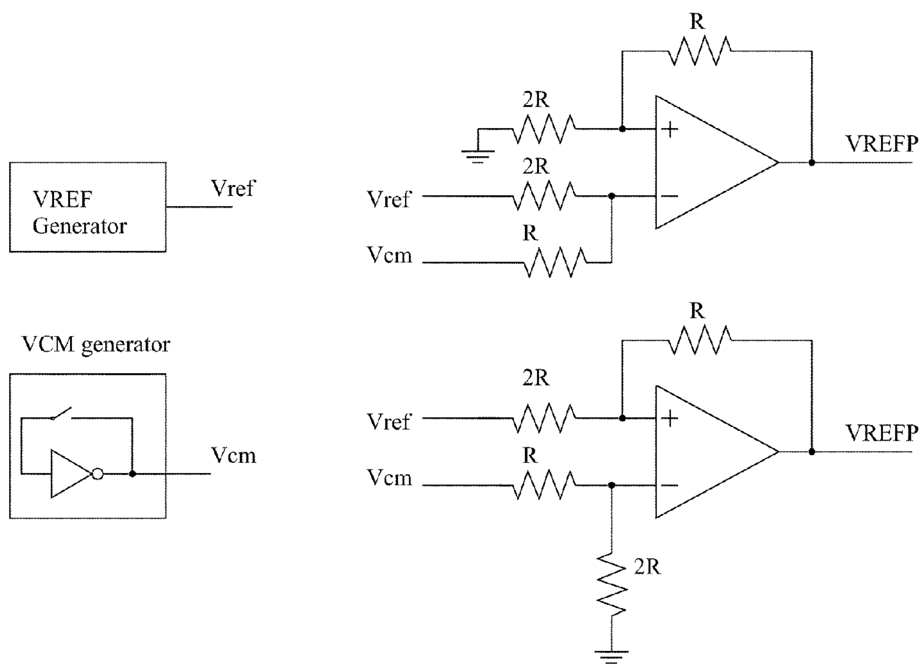

An opamp-based circuit using resistors in the feedback loop is used to derive the Vrefp and Vrefn, as shown in FIG. 132. The reference voltages Vrefp and Vrefn can be obtained as:

$$Vrefp = Vcm + \frac{Vref}{2}$$

$$Vrefn = Vcm - \frac{Vref}{2}$$

For a reference voltage of 1.0 volt, we will have Vrefp=Vcm+0.50, and Vrefn=Vcm−0.50. The Vref reference voltage is generated by a bandgap generator set to output 1.0 volt (see below for more detail).

Figure 133:
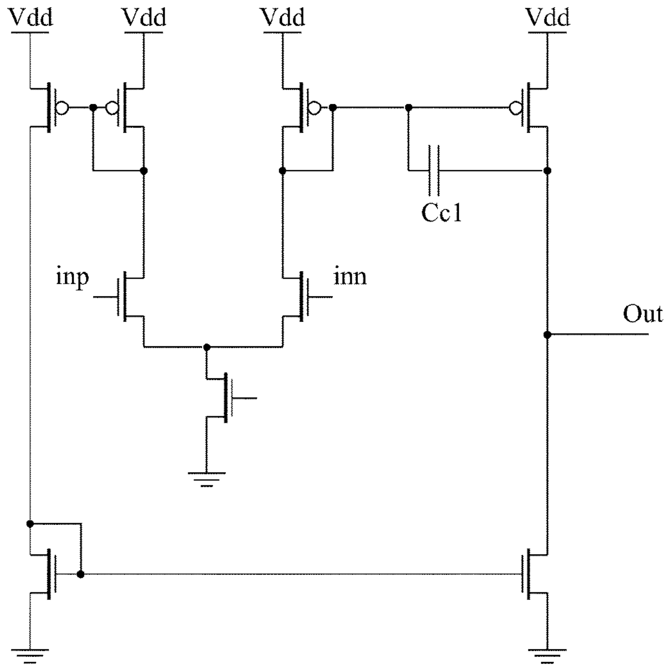

The opamps used in this circuit are based on a wide-range OTA design, to achieve medium gain and high stability in the presence of large capacitive loading. Note that the Vrefp and Vrefn are used to as input to the opamp in the second phase of conversion. They are also heavily decoupled using large MOS capacitors to reduce the bouncing on these voltages. The circuit is shown in FIG. 133. Miller compensation has been used to ensure stability. The current design is stable with capacitive loads of more than 30 pF.

Bandgap Voltage Generator

The bandgap generator produces the main reference voltage from which the Vrefp and Vrefn voltages are derived. It is also used for generating the reference current used in the bias circuit.

Figure 134:
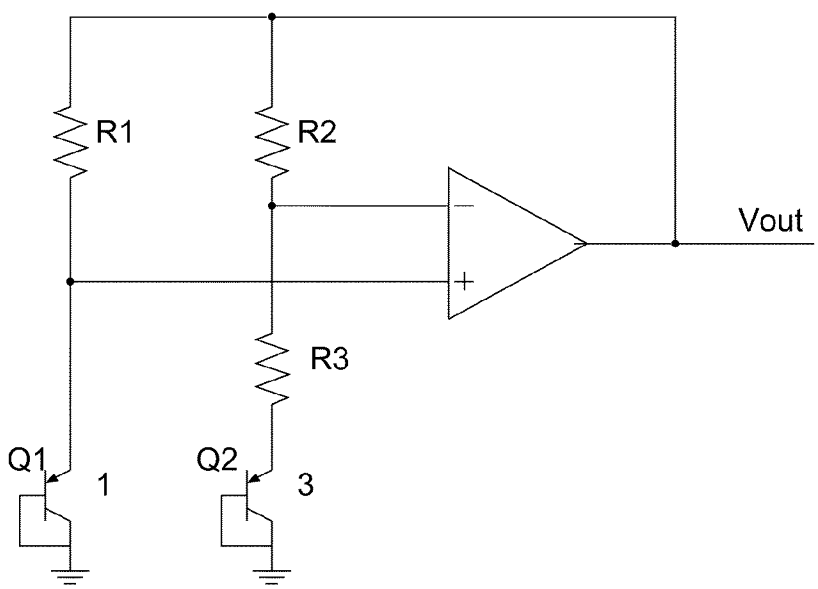
Figure 135:
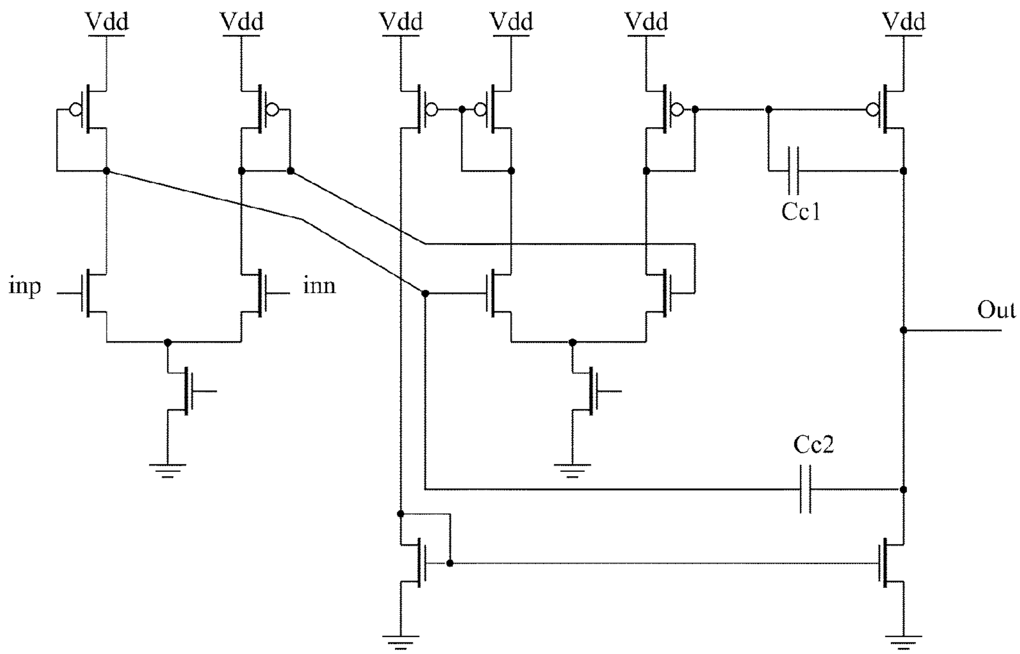
Figure 136:
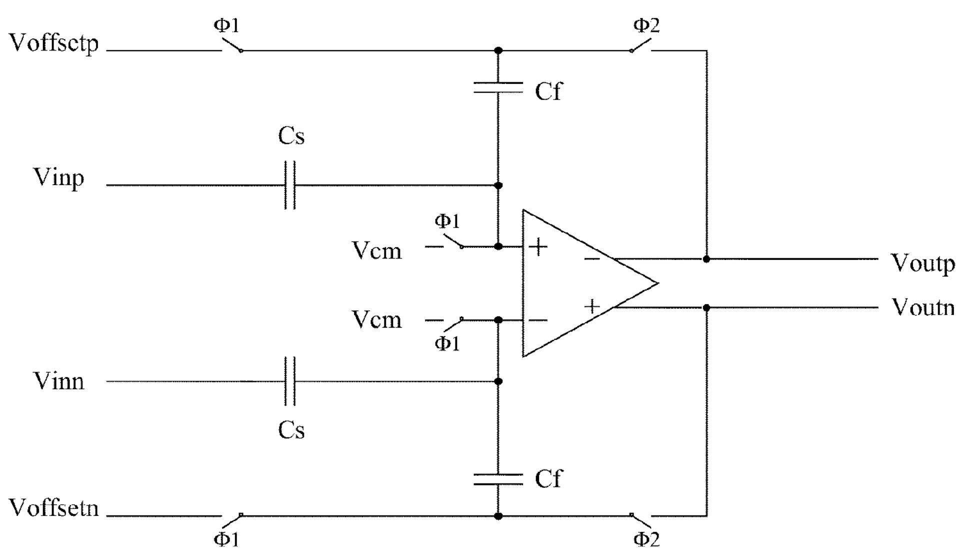

FIG. 134 shows the structure of the bandgap generator. The resistor values have been chosen to produce an output voltage of approximately 1.0 volt. This means that the bandgap generator is in fact out of balance and the output voltage will be temperature dependent. This is in fact a desirable feature for this design. At higher temperatures the dynamic range (or voltage swing) of all circuits in the chip will reduce.

Therefore, if the reference voltage is constant, the required dynamic range of circuits will be higher than what they can achieve. For example, the dynamic range at the output of the image sensor will be lowered at higher temperatures. With a constant reference voltage, the reference levels for the ADC will be constant, and therefore, the ADC will be forced to provide more dynamic range than required.

However, if the reference voltage has a negative temperature coefficient, then the biased circuits will be automatically adjusted to lower biasing currents and voltages, and the amount of dynamic range discrepancy will be reduced.

The opamp used in the bandgap generator is a three stage wide-range OTA, as shown in FIG. 134. This choice is to increase the gain of the opamp and increase the supply rejection. Compensation is necessary in this opamp. A nested miller compensation has been used, to reduce the size of the compensation capacitors.

Programmable Gain Amplifier

At the input of the ADC a digitally programmable amplifier has been implemented. This PGA can have gain values from 0.5 to 8 in steps of 0.5. The structure uses a switched capacitor design. The simplified schematic diagram is shown in FIG. 36. In the first phase the input is sampled onto capacitors Cs. Also other capacitors are precharged to known values. In the second phase the capacitors are connected to the opamp and form an amplifying stage. In the first phase of the clock the switches connected to Φ1 are closed, and in the second phase those connected to Φ2. Using charge conservation equations we can find $$Voutp - Voutn = (Voffsetp - Voffsetn) + \frac{Cs}{Cf}(Vinp(1) - Vinn(1)) - \frac{Cs}{Cf}(Vinp(2) - Vinn(2))$$

where Vinp(1) and Vinn(1) are the input values during Φ1, and Vinp(2) and Vinn(2) are the input values during Φ2.

This particular structure has been chosen to facilitate correlated double sampling (CDS) in the image sensor. During CDS, in the first phase of the clock the signal value is present, and in the second phase the reset value. The values are subsequently subtracted.

Figure 137:
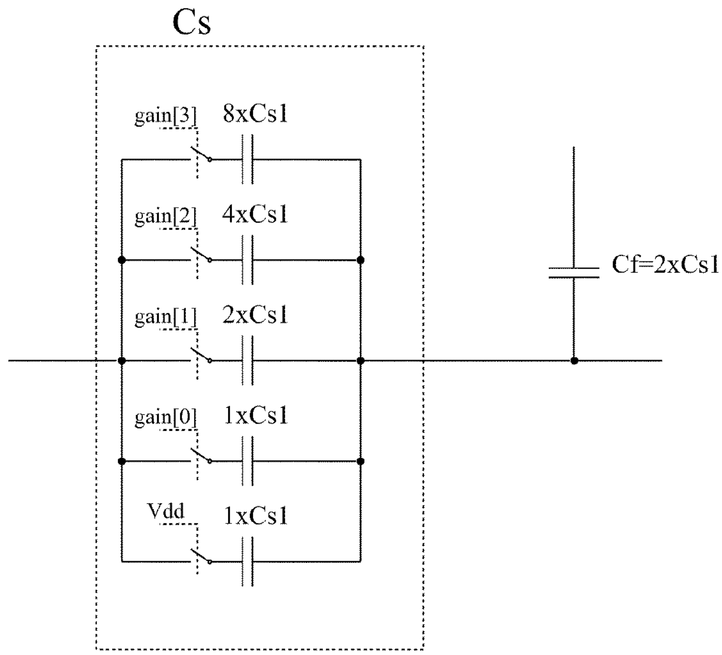

The capacitor Cf in this design is 100 fF. Capacitor Cs is a linearly selectable capacitor as shown in FIG. 137. In this figure Cs1 represents a unit capacitance of 50 fF.

PGA Opamp

Figure 138:
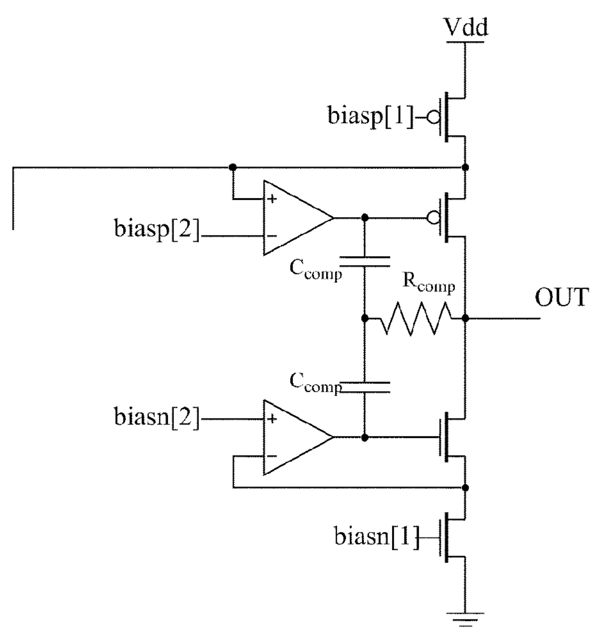
Figure 139:
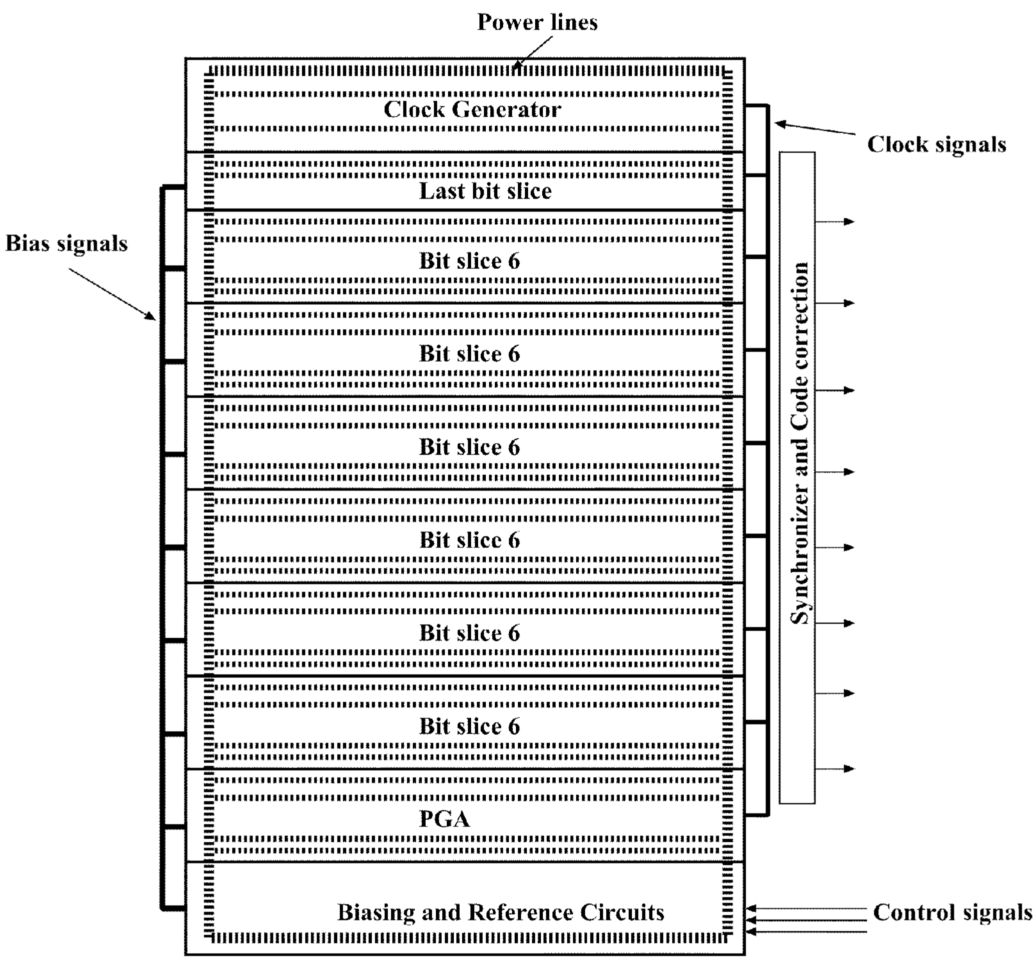

The opamp used in the PGA is very similar to that used in ADC bit slices. There are however, two main changes in this opamp. One is the use of larger transistors, mainly to increase the bandwidth of the opamp, and the other is the use of a basic miller compensation structure at the output branch, as shown in FIG. 138. The source of instability in the PGA is from several factors. The first is the larger gain-bandwidth product required in the opamp. This brings the poles at the output branch close to other poles in the circuit, such as those at the output of the gain boosting OTAs. Also the size of the feedback capacitors is relatively small, to limit the total input capacitance when the gain is to its maximum. The compensation structure tries to bring the poles at the output of the gain boosting OTAs down, and also adds a zero (by adding the series Rcomp resistor), to cancel one of the poles.

Synchronizer

The outputs from the bit slices are generated in a pipeline. During each phase of the clock one bit slice generates an output. In order to synchronize the outputs, synchronizing latches are used. These latches are in fact half of a D-flip flop, and are driven by Phi1[0] and Phi2[0] clock phases (see FIG. 138). The final latches are clocked by Phi2[0]. This means that the output will be valid after the negative edge of Phi2[0], and it can be sampled safely on the negative edge of the input clock.

Before the last latch there is a code correction logic, which is described in the next section.

Output Code Correction

The RSD output of the pipeline ADC is often needed to be converted to more conventional binary representations, such as two's complement or signed representations.

As RSD is a redundant representation, and in a pipeline ADC different representations of the same value may occur because of errors in the comparator, the process of converting the RSD to a binary number is referred to as code correction.

The RSD to binary conversion is relatively simple. If we represent a 7-digit RSD number as $C_6C_5C_4C_3C_2C_1C_0=(B_{p6}B_{n6})(B_{p5}B_{n5})(B_{p4}B_{n4})(B_{p3}B_{n3})(B_{p2}B_{n2})(B_{p1}B_{n1})(B_{p0}B_{n0})$ where each digit is represented by two binary values $(B_p,B_n)$, in which −1=(01), 0=(00), and +1=(10). Then a two's complement number can be obtained by subtracting a binary number formed by $B_n$, from $B_p$ $N_{p6}N_{p5}N_{p4}N_{p3}N_{p2}N_{p1}N_{p0}=B_{p6}B_{p5}B_{p4}B_{p3}B_{p2}B_{p1}B_{p0}-B_{n6}B_{n5}B_{n4}B_{n3}B_{n2}B_{n1}B_{n0}$ The resulting number will range from −127 (10000001) to +127 (01111111).

Therefore, the RSD to binary conversion requires only a subtractor. This subtractor has been implemented as part of the synchronizer, and is inserted before the last latch in the synchronizer.

Calibration

The calibration of the ADC can be performed using different algorithms. The preferred design has support for either a digital offset calibration, an analog offset calibration, or a multi-stage digital gain and offset calibration.

Before describing the different calibration methods, we should mention that for an 8-bit ADC the gain errors, which mainly result from the capacitors, can be less than 1/256. This can be achieved by using a basic common centroid structure for the capacitors. Therefore, gain error will not be a contributing factor in the overall ADC errors.

Also if an application requires only one ADC and an offset of 1% can be tolerated, then offset calibration will not be necessary.

Digital Offset Calibration

This algorithm simply measures the offset of the whole ADC. This is done by shorting the differential inputs of the ADC together and measuring the digital value. In order to reduce the quantization effects the measurement is done on multiple samples (for example, 128 samples). The offset value is then digitally subtracted from the output of the ADC during normal conversion cycles.

Notice that this method of calibration is sufficient for an 8-bit ADC; as mentioned before the gain error can be controlled well below the required 1/256.

Analog Offset Calibration

This algorithm relies on using a calibration DAC. This time the PGA is also involved in the calibration process (this is a feature of the current design), and therefore this algorithm will present a better solution, specially if the PGA is set to high gain values.

In this algorithm, the differential inputs of the PGA are shorted together and the output of the ADC is recorded. A DAC is connected to the offset bias inputs of the PGA. The value of the DAC is changed in a feedback loop such that the output of the ADC becomes zero.

The input applied to the DAC is then recorded as the offset correction value.

Multistage Digital Gain and Offset Calibration

This more elaborate algorithm will remove the gain and offset errors from all stages, through a successive algorithm. This algorithm is often suitable for ADC resolutions of more than 8 and less than 12 bits.

The Algorithm Works as Follows:

1. The input to the last stage (LSB) of the ADC is set to zero, and the digital values are measured. This is repeated for several cycles (typically 128). The measured value represents the offset for this stage.
2. The input to the last stage is set to the mid reference range ((Vrefp-Vrefn)/2). The output is then measured for several cycles. The offset measurement values from Step 1 are included during this phase. The gain error can be found from the measurements.
3. Step 1 and Step 2 are recursively repeated for the next bit slices until the MSB. The offset and gain errors from the previous LSB bit-slices will be used in the calculation of offset and gain errors of each stage.

During a normal operation, the gain and offset values obtained during the calibration process will be used to correct the digital outputs of the ADC.

Layout Design

The layout design of the ADC will directly affect the performance of the ADC. Considering the ADC is a mixed-signal design by nature, it is important to take into account the interaction between the digital and analog circuits and try to minimize any possible crosstalk affecting the analog circuits. While during the circuit design we addressed this issue by using a fully differential architecture, here we describe techniques used to complement the circuit design.

Floorplan

The placement of the blocks in the ADC is such that the most critical circuits, which are the PGA and the first stage(s) of the ADC are further away from the main source of digital noise, i.e. the clock generator. The last stages of the ADC are least sensitive to digital noise. The biasing and reference generator are the farthest block to the clock generator. In fact most of the short range substrate coupling noise will be absorbed by the ADC stages before reaching the biasing circuits.

Signal Routing

The signal routing is also designed to minimize the interaction between the bias and clock signals. The bias signals are routed on one side of the ADC blocks, and the clock signals on the other. Also inside each block the bias and clock signals run through separate channels, further minimizing the interaction between signals.

In areas where the bias and clock signals cross over each other, appropriate shielding has been used to remove any potential crosstalk.

Power Routing

The VDD and VSS supply voltages surround the ADC. They run on two separate metal layers, which form a parallel plate capacitor to enhance supply decoupling. Inside each bitslice the power lines from the two sides are joined together to form a mesh. In most blocks there are MOS capacitors used to locally decouple the supply voltage.

Bandgap Generator

The compensation capacitor of the bandgap generator is formed using MiM structure. The resistors are formed using poly without silicide. The input of the opamp has a common centroid structure to reduce mismatch, although mismatch is not a critical parameter for this bandgap generator.

Biasing and Reference Circuits

This layout is located at the bottom end of the ADC floorplan, and as such it contains the two wide metal lines for the supply voltages. The width of these lines is 18 um.

ADC Bit Slice

The main capacitors in each bitslice of the ADC are formed in a common centroid. All bias and reference voltages are decoupled using large MOS capacitors. Supply decoupling capacitors are also used close to the logic circuits.

PGA

The gain setting capacitors of the PGA are formed in a semi-centroid structure to improve matching. Bias lines, including Vrefp and Vrefn are decoupled using large MOS transistors.

Section D—ADC Design

Interface

Figure 140:
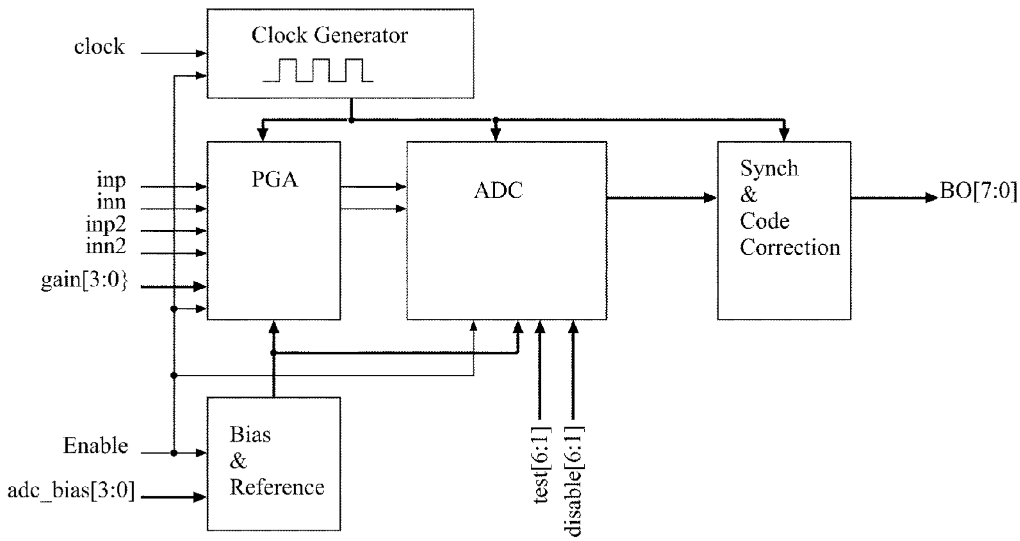

The block diagram of the ADC 15014 is shown in FIG. 140. The ADC 15014 consists of a PGA 15028, seven stages of pipeline RSD ADC 15070, a clock generator 15072, a bias generator 15074 and a synchronization and code correction block 15076.

The following table sets out the function of the pins of the ADC 15014.

| Name | Type | Function |
|---|---|---|
| Enable | Digital Input | Active-high enable input. When this input is high, all blocks will be enabled. When this input is low all blocks will go into the sleep mode. The clock input is also gated to avoid any power dissipation. |
| clock | Digital Input | The input clock. |
| inp | Analog input | The positive input to the PGA. |
| inn | Analog input | The negative input to the PGA. |
| inp2 | Analog input | The positive offset input to the PGA. |
| inn2 | Analog input | The negative offset input to the PGA. |
| gain[3:0] | Digital Input | Four bits controlling the gain of the PGA, from 0.5 to 8, in steps of 0.5. A value of "0000" sets the gain to 0.5, and a value of "1111" sets the gain to 8. |
| adc_bias[3:0] | Digital Input | Four bits setting the bias resistor for the ADC. A value of "0000" sets the bias resistor to 876 Ohm, and a value of "1111" sets the bias resistor to 14 KOhm. The default value should be "1000". |

-continued

| Name | Type | Function |
|---|---|---|
| disable[6:1] | Digital Input | These signals disconnect one bit slice of the ADC from the previous stage and prepare it for digital calibration. The LSB bit slice does not have such a feature. |
| test[6:1] | Digital Input | Set the value used during calibration for a bit slice which has been disconnected from previous stage. |
| bo[7:0] | Digital Output | 8-bit ADC output. |
| VDD | Supply | VDD voltage nominally set at 1.8 V |
| VSS | Ground | Ground voltage set at 0 V. |

Normal Operation

In normal operation the following conditions should be met:

Enable input should be set high.

"test" and "disable" signals should be all set to low

"gain" is set to the desired value

Clock is running up to a maximum frequency of 20 MHz.

Timing in Normal Operation

Figure 141:
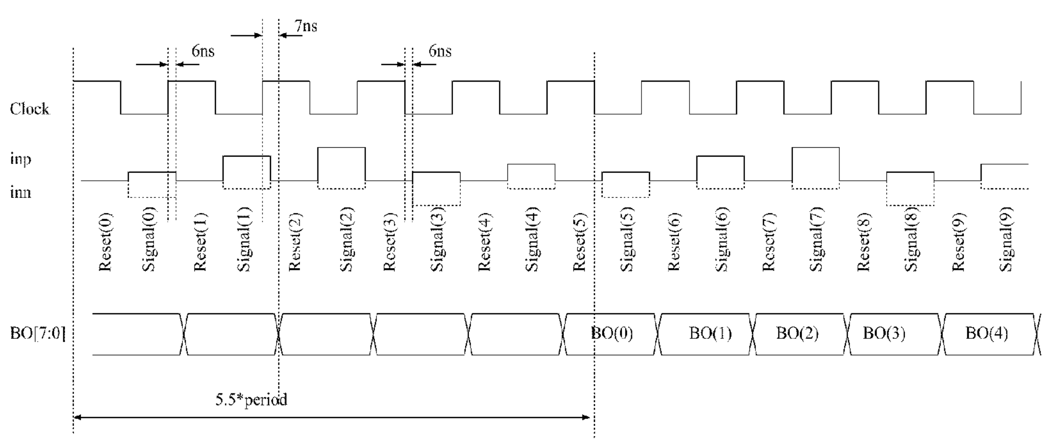
Figure 142:
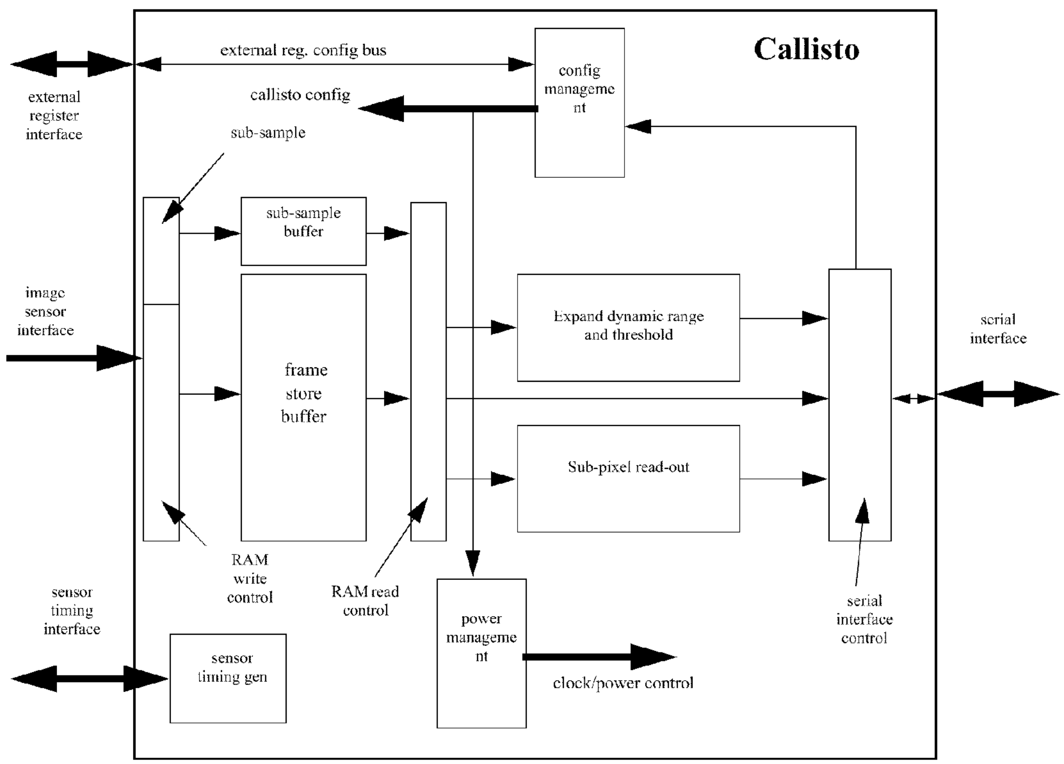

The timing diagram of the signals during the normal operation is shown in FIG. 141. The input will be presented in two phases of the clock. In the first phase, when clock is high, the input is sampled. Typically during this phase the inputs carry the offsets from the previous circuit, and therefore they are almost the same. In the second phase of the operation, when clock is low, the input is sampled again. This time the inputs carry the actual signal values. Notice that the inputs do not necessarily need to be differential.

The output will be generated four clock cycles later. The latency between the time that Reset(x) has been introduced to the time that the output can be safely read is five and a half clock cycles. Notice that as this ADC is pipelined, it does not have any end-of-conversion indicator.

Sleep Mode

In sleep mode, the enable input is set to low. In this mode all blocks will be disabled.

Calibration Modes

Notice that the calibration modes are not controlled by the ADC, and as such any design that uses this ADC shall implement the relevant control logic to perform any of the desired calibration techniques.

Digital Offset Calibration

In order to perform digital offset calibration the following steps should be taken 1. Enable input is set to high
2. test[6:1] is set to "000000"
3. disable[6:1] is set to "100000"
4. Clock is running up to a maximum frequency of 20 MHz
5. The inp and inn inputs of the PGA should be constant
6. During the first 8 clock cycles no operation is performed
7. For the next 64 clock cycles the digital outputs are added together
8. The final output is then averaged, by a right shift operation by 6 bits.
9. The resulting value can be stored and subtracted from subsequent ADC output during normal operation.

Analog Offset Calibration

In order to perform analog offset calibration the following steps should be taken:

1. Enable input is set to high
2. test[6:1] is set to "000000"
3. disable[6:1] is set to "000000"
4. Clock is running up to a maximum frequency of 20 MHz
5. The inp and inn inputs of the PGA should be constant.
6. During the first 8 clock cycles no operation is performed
7. For the next 64 clock cycles the digital outputs are added together
8. If the result is not zero then the an appropriate input is applied to the "inp2" and "inn2" offset inputs of the PGA. For this purpose a DAC is required, which should be provided by the calibration control mechanism.
9. The steps are repeated until the digital output is zero.
10. The resulting value can be stored and applied to the "inp2" and "inn2" input of the PGA during the normal operation.

Digital Multistage Gain and Offset Calibration

In order to perform digital offset calibration the following steps should be taken:

1. Enable input is set to high
2. The PGA gain is set to "0000", and the differential inputs to the PGA shall remain constant during the calibration process.
3. Clock is running up to a maximum frequency of 20 MHz
4. test[6:1] is set to "000000"
5. disable[6:1] is set to "111111"
6. During the first 8 clock cycles no operation is performed
7. For the next 64 clock cycles the digital outputs are accumulated and stored. This value represents the offset value.
8. test[6:1] is set to "000001".
9. During the first 8 clock cycles no operation is performed.
10. For the next 64 clock cycles the digital outputs are accumulated and stored. Subsequently the offset value measured in Step 7 is subtracted from this. The gain error is then calculated from the resulting value.
11. Step 4 to Step 10 are repeated for the next bit slices, while the values of test and disable are shifted by one bit.

The gain and offset values will be used during the normal operation to digitally correct the output code from the ADC.

Section E—Callisto Image Processor

Callisto is an image processor designed to interface directly to a monochrome image sensor via a parallel data interface, optionally perform some image processing and pass captured images to an external device via a serial data interface.

Features

Parallel interface to image sensor;

Frame store buffer to decouple parallel image sensor interface and external serial interface;

Double buffering of frame store data to eliminate buffer loading overhead;

Low pass filtering and sub-sampling of captured image;

Local dynamic range expansion of sub-sampled image;

Thresholding of the sub-sampled, range-expanded image;

Read-out of pixels within a defined region of the captured image, for both processed and unprocessed images;

Calculation of sub-pixel values;

- Configurable image sensor timing interface;
- Configurable image sensor size;
- Configurable image sensor window;
- Power management: auto sleep and wakeup modes;
- External serial interface for image output and device management;
- External register interface for register management on external devices.

Environment

Callisto interfaces to both an image sensor, via a parallel interface, and to an external device, such as a microprocessor, via a serial data interface. Captured image data is passed to Callisto across the parallel data interface from the image sensor. Processed image data is passed to the external device via the serial interface. Callisto's registers are also set via the external serial interface.

Function

Black-Box Description

The Callisto image processing core accepts image data from an image sensor and passes that data, either processed or unprocessed, to an external device using a serial data interface. The rate at which data is passed to that external device is decoupled from whatever data read-out rates are imposed by the image sensor.

The image sensor data rate and the image data rate over the serial interface are decoupled by using an internal RAM-based frame store. Image data from the sensor is written into the frame store at a rate to satisfy image sensor read-out requirements. Once in the frame store, data can be read out and transmitted over the serial interface at whatever rate is required by the device at the other end of that interface.

Callisto can optionally perform some image processing on the image stored in its frame store, as dictated by user configuration. The user may choose to bypass image processing and obtain access to the unprocessed image. Sub-sampled images are stored in a buffer but fully processed images are not persistently stored in Callisto; fully processed images are immediately transmitted across the serial interface. Callisto provides several image process related functions:

- Sub-sampling;
- Local dynamic range expansion;
- Thresholding;
- Calculation of sub-pixel values;
- Read-out of a defined rectangle from the processed and unprocessed image.

Sub-sampling, local dynamic range expansion and thresholding are typically used in conjunction, with dynamic range expansion performed on sub-sampled images, and thresholding performed on sub-sampled, range-expanded images. Dynamic range expansion and thresholding are performed together, as a single operation, and can only be performed on sub-sampled images. Sub-sampling, however, may be performed without dynamic range expansion and thresholding. Retrieval of sub-pixel values and image region read-out are standalone functions.

The details of these functions are provided below.

Functions

Image Coordinate System

Figure 143:
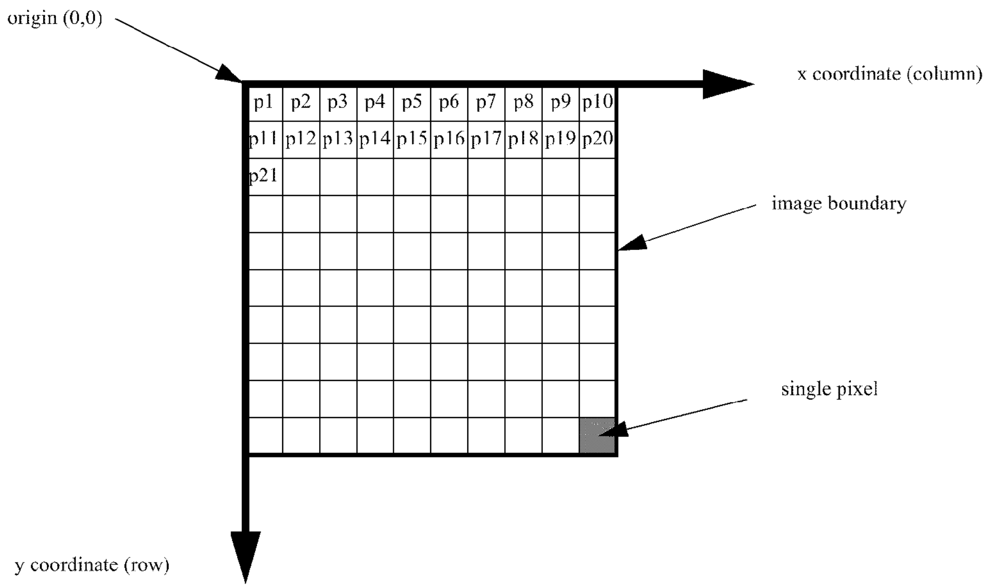

This document refers to pixel locations within an image using an x-y coordinate system where the x coordinate increases from left to right across the image, and the y coordinate increases down the image from top to bottom. It is also common to refer to pixel locations using row and column numbers. Using the x-y coordinate system used in this document, a pixel's row location refers to its y coordinate, and a pixel's column location refers to its x coordinate. The origin (0,0) of the x-y coordinate system used is located at the top left corner of the image. See FIG. 143. Pixel coordinates define the centre of a pixel.

The term "raster order" is also used in this document and refers to an ordering of pixels beginning at the top left corner of the image, moving left to right, and top to bottom. Callisto assumes that pixels from the image sensor are received in this order: pixel at location (0,0) is received first, then the next pixel to the right, continuing across the line. All lines are processed in this order from top to bottom. This assumption means that there is no coordinate translation between input and output. According to the example shown in FIG. 143, raster order would be p1, p2, p3, p4, p5, p6, p7, p8, p9, p10, p11, p12, p13, p14, p15, p16, p17, p18, p19, p20, p21, etc . . . .

All image coordinates are relative to the image sensor window and not the image sensor itself.

Image Sub-Sampling

The captured image is sub-sampled by passing a 3×3 window over the entire image. The "motion" of the window over the image is simply left-to-right, top-to-bottom.

Figure 144:
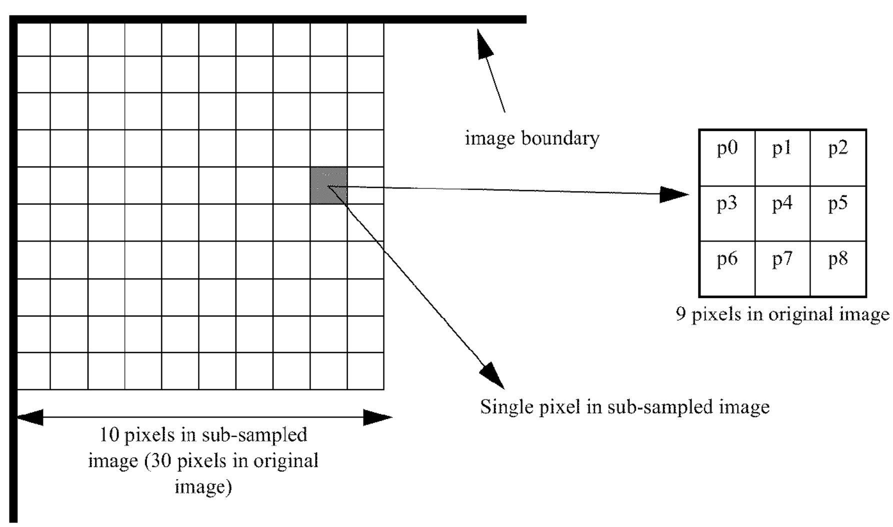

Each 3×3 window produces a single pixel in the output image, thus producing an image that has nine times fewer pixels than the original image (see FIG. 144). The nine pixels in the window are averaged to obtain the output pixel:

$$outputPixel=\frac{1}{9}*(p0+p1+p2+p3+p4+p5+p6+p7+p8);$$

The algorithm for producing the sub-sampled image is:

```
foreach 3x3 window loop
  outputPixel = 0;
  foreach pixel in the window loop
    outputPixel += pixel;
  end loop;
  write (1/9) * outputPixel;
end loop;
```

In the case where there is insufficient pixel data to form a complete 3×3 window, along the right and bottom edges of the original image if its width and height are not multiples of 3, then pixels along the edges of the image will be replicated to fill the 3×3 window.

Figure 145:
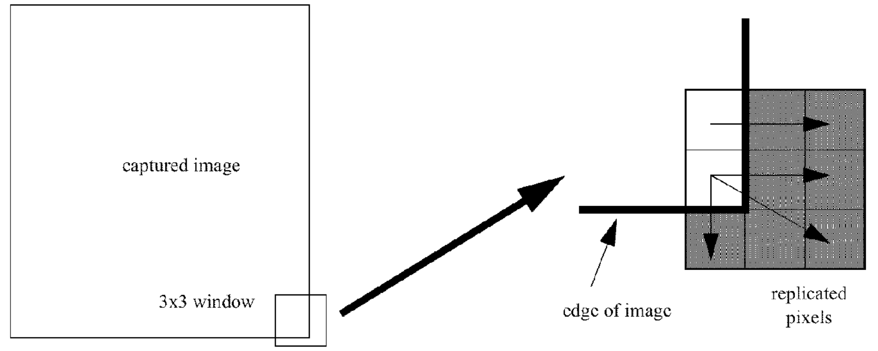

FIG. 145 shows how pixels are replicated during sub-sampling when the sub-sampling window goes beyond the edges of the image.

Local Dynamic Range Expansion

The local dynamic range expansion function is intended to be used to remove the effects of variation in illumination. In particular, it allows thresholding to be performed using a fixed threshold.

The general algorithm for dynamic range expansion is: for each pixel, a histogram of the pixels in a window of specified radius about the current pixel is constructed. Then the value which a specified fraction of the pixels in the window are less than is determined. This becomes the black level. The value which a specified fraction of the pixels are greater than is also determined, and this becomes the white level. Finally, the current pixel is mapped to a new value as follows: if its original value is less than the black level it is mapped to 0. If its value is greater than the white level it is mapped to 255. Values between black and white a mapped linearly into the range 0-255.

Figure 146:
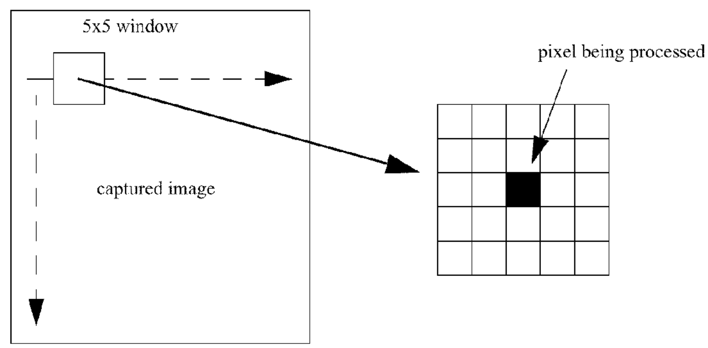
Figure 147:
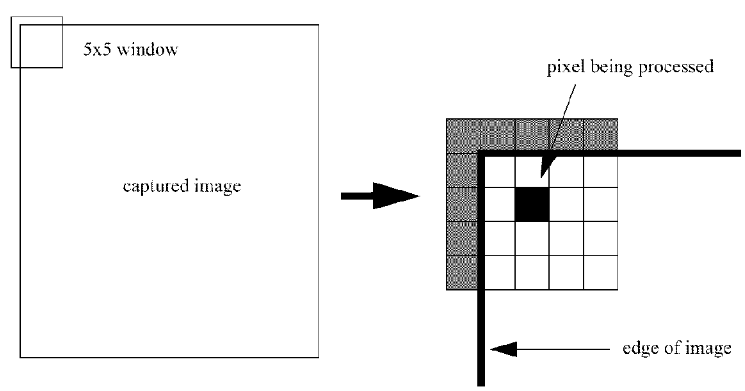

In Callisto, the radius of the window is fixed at 2, which approximates to a 5×5 rectangle. The fractions used are 2% for both the black and white levels. Since 2% of 25 (5*5 pixels) is 0.5, it suffices to determine the minimum and maximum pixel values in a window when determining black and white levels. Callisto's algorithm works by passing a 5×5 window over the image, with the pixel being processed situated in the centre of the image (see FIG. 146). When the pixel being processed is no closer that 2 pixels from the top or bottom, and 2 pixels from the left or right of the image, there are sufficient neighbouring pixels to construct a full 5×5 window. When this condition does not hold there are not enough pixels to construct a 5×5 window, and in this case dynamic range expansion is performed on the available pixels; in FIG. 147 there are only 16 of 25 pixels available in the window for the pixel being processed, so only these 16 are considered in calculating the dynamic-range-expanded value for the pixel being considered. For each pixel being processed, a window around that pixel is constructed as described above. For all the pixels in that window, including the pixel being processed, both the minimum and maximum pixel values are recorded. The new pixel value is calculated by mapping linearly into the range 0 to 255 according to the max and min values in the current window. That is:

$$newPixelValue=255*(pixelValue-min)/(max-min)$$

Unless the max and min values are the same, in which case the new pixel value is set to 255. The algorithm described in pseudo code:

```
foreach pixel in image loop
  construct 5×5 window;
  min = 255;
  max = 0;
  foreach pixel in 5×5 window loop
    if pixel > max then
      max = pixel;
    end if;
    if pixel < min then
      min = pixel;
    end if;
  end loop;
  if max = min then
    pixel = 255;
  else
    pixel = 255*(pixel−min)/(max−min);
  end if;
end loop;
```

Thresholding

Thresholding is a simple function that converts an 8-bit pixel value into a 1-bit pixel value based on the comparison of the 8-bit pixel value with a pre-defined threshold value, stored in a Callisto register. This is the pseudo-code that describes the algorithm:

```
foreach pixel in image loop
  if pixel >= threshold then
    pixel = 1;
  else
    pixel = 0;
  end if;
end loop;
```

Combining Thresholding and Dynamic Range Expansion

Let's assume that t is the threshold value, and that v is the pixel value being dynamic-range-expanded, and that a is the dynamic-range-expanded pixel value. Thresholding requires the following comparison:

$$a>=t$$

Substituting the dynamic range expansion equation yields:

$$255*(v-min)/(max-min)>=t$$

And by re-arranging:

$$255*(v-min)>=t*(max-min)$$

$$v-min>=(t/255)*(max-min)$$

$$v>=((t/255)*(max-min))+min$$

By combining dynamic range expansion and thresholding a complicated divide (a divide by max-min) is replaced with a simple constant divide. The divide may be eliminated altogether by requiring the user to specify t/255 rather than just t. This equation holds true when min=max.

Sub-Pixel Read

Sub-pixel read allows the user to ascertain the grey level value at an arbitrary location which lies between pixels in the captured image, i.e sub-pixels.

Figure 148:
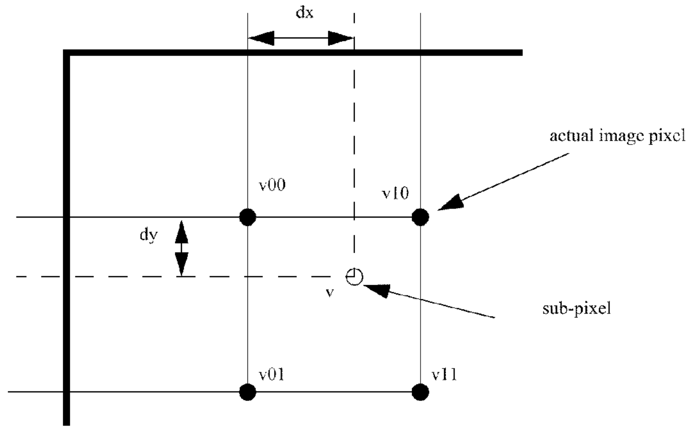

FIG. 148 shows the location of the desired sub-pixel with respect to actual image pixels. Sub-pixel coordinates are expressed as 8.4 fixed point values. The values dx and dy in FIG. 148 simply refer to the fractional portion of the sub-pixel coordinates. The grey scale value v for the pixel shown, which lies between pixels v00, v10, v01, v11 is calculated as follows:

$$v0=v00+dx*(v10-v00);$$

$$v1=v01+dx*(v11-v01);$$

$$v=v0+dy*(v1-v0);$$

To reduce the interrupt processing overhead on the processor, Callisto supports calculating many sub-pixel values in a single command. When Callisto begins a sub-pixel read operation it is told how many sub-pixel values to calculate, placing all the interpolated pixel values into a single message on the serial interface back to the processor.

Unprocessed Image Region Read Function

The image region read function of Callisto allows the user to read all the pixel values out of a defined rectangular region of the unprocessed image in a single operation. The region size and location may be arbitrarily set. Image data is returned in raster order.

The unprocessed image read function operates on the data in the image frame store, i.e the unprocessed image. Because the image region to be read may be at an arbitrary location, and of arbitrary size, it is possible to define a region that exactly fits the image. That is, using this function it is possible to read back the entire image in the frame store, unprocessed, thus providing a bypass path of the image processing functions. It would also be possible to read the entire image in various ways using this function:

A set of tiles;

A set of bands;

Line by line;

etc.

Processed Image Region Read Functions

Like the unprocessed image read, the processed image, or a part of it, may be read by the user. Image data is returned in raster order.

The user may specify what part of the processed image they want to read by defining a rectangular region. The coordinates used to specify this region lie in the processed image so that the region defined is aligned to a 3×3 boundary in the unprocessed image.

The user has two choices as to the type of image processing to be performed. Either:

Sub-sample only; or

Sub-sample+expand dynamic range+threshold.

Out of Image Bounds

For image region read functions Callisto allows the user to arbitrarily specify the position and size of the region independently of the size of the image. This creates the possibility that the some or all of the specified region may lie outside of the image. Callisto does not perform any bounds checking in this regard. If the user does specify a region where all or parts of it lie outside the region, pixel values returned for those parts of the regions outside the image will have undefined values.

There are no side effects or consequences of specifying regions that are not wholly within an image other than that the pixel values returned cannot be predicted.

Direct Writing to Frame Store Buffer

Callisto writes valid pixel data on the image sensor interface to the frame store buffer; this data normally comes from an image sensor. Callisto provides a mode of operation which allows the user to directly write pixel data into the frame store buffer by sending Callisto a "write to frame store" message. By putting Callisto into the appropriate mode—setting the FrameWrite bit in the configuration register—the user is able to write data, four pixels at a time, directly into the frame store buffer by sending Callisto a FrameStoreWrite message. For the first write of a frame the user must set the S bit in the message to '1'. Once a message is sent the user must wait for a FrameStoreWriteAcknowledge message before sending the next FrameStoreWrite message. Callisto uses the ImageSensorWindow setting to determine when a complete frame has been written into the frame store buffer.

Serial Interface

The serial interface to Callisto is used for several purposes:

Processor issuing Callisto commands.

Processor issuing register access commands (read and write).

Callisto returning register data as a result of a register read command.

Callisto returning image data.

Error signalling and recovery.

High level image sensor frame synchronisation.

Frame store write.

Message Types and Formats

There are six Callisto message types, as set out in the following table:

| Message Type | Message Type Code | Message Source | Comment |
|---|---|---|---|
| Register access | b'000 | Processor | Used to access Callisto's registers. Can either specify a read or a write. |
| Callisto command | b'001 | Processor | Used to tell Callisto to perform an image processing function. Can be either:<br>Unprocessed image region read<br>Processed image region read<br>Sub-sampled image region read<br>Sub-pixel read |
| Register data | b'010 | Callisto | Message containing the data requested by a register read request from the Processor. |
| Command data | b'011 | Callisto | Message containing data produced as a result of executing a command. |
| Frame synchronisation | b'100 | Processor & Callisto | Messages used for high level software frame processing synchronisation. |
| Frame store write | b'101 | Processor | Allows the user to write data directly into the frame store buffer via the serial interface. |
| Frame store write acknowledge | b'110 | Callisto | Acknowledges the frame store write message indicating to the user that another frame store write message may be issued. |

All messages consist of a constant message marker byte, common to all messages (used for message synchronisation), followed by a control byte, specific to each message type, followed by a varying number of data byes depending on the message type. The message marker byte is set at 0x7E.

Note that all unused bits in the control byte should always be set to '0'.

Figure 149:
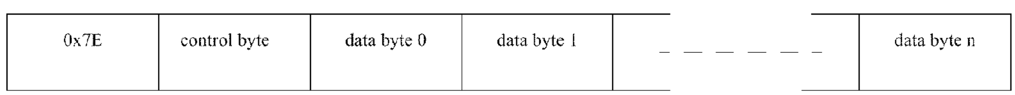

FIG. 149 shows the general format for Callisto messages.

The following table shows a summary of the control byte arrangements for each of the message type:

| | Control Byte | | | | | | | |
|---|---|---|---|---|---|---|---|---|
| Message Type | Bit 7 | Bit 6 | Bit 5 | Bit 4 | Bit 3 | Bit 2 | Bit 1 | Bit 0 |
| Register access | b'0 | E | W | N1 | N0 | T2 | T1 | T0 |
| Callisto command | b'0 | b'0 | P | C1 | C0 | T2 | T1 | T0 |
| Register data | b'0 | E | I | N1 | N0 | T2 | T1 | T0 |
| Command data | b'0 | b'0 | I | C1 | C0 | T2 | T1 | T0 |
| Frame synchronisation | b'0 | b'0 | b'0 | S1 | S0 | T2 | T1 | T0 |
| Frame store write | b'0 | b'0 | b'0 | b'0 | S | T2 | T1 | T0 |
| Frame store write acknowledge | b'0 | b'0 | I | b'0 | ER | T2 | T1 | T0 |

The following table shows control byte field descriptions:

| Field | Description |
|---|---|
| T[2:0] | Message Type<br>b'000 - Register Access<br>b'001 - Callisto Command<br>b'010 - Register Data<br>b'011 - Command Data<br>b'100 - Frame Synchronisation<br>b'101 - Frame Store Write<br>b'110 - Frame Store Write Acknowledge |

-continued

| Field | Description |
|---|---|
| C[1:0] | Command Type<br>b'00 - Unprocessed Image Read<br>b'01 - Sub-pixel Read<br>b'10 - Sub-sampled Image Read<br>b'11 - Processed Image Read |
| N[1:0] | Number of Bytes<br>Defines the number of data bytes (minus one) contained in the message:<br>b'00 - 1byte<br>b'01 - 2 bytes<br>b'10 - 3 bytes<br>b'11 - 4 bytes<br>b'00 - For a register read |
| E | External<br>Used to indicate that a register access command is for an external device connected to Callisto's external register bus. |
| W | Write<br>When set to '1' in a register access message, indicates a register write. |
| P | Parameters<br>When set to '1' indicates that a Callisto Command message contains command parameters also. |
| I | Interrupt<br>When set to '1' in a message from Callisto, indicates that the state of one of the COR bits in the status register has changed. |
| S[1:0] | Synchronisation Message Type<br>b'00 - Ready For New Frame (from processor)<br>b'01 - Finished Frame Processing (from processor)<br>b'10 - Received New Frame (from Callisto) |
| S | Start Of Frame<br>In a Frame Store Write message indicates first write of a frame. |
| ER | Frame Store Write Error<br>In a Frame Store Write Acknowledge message indicates that the previous Frame Store Write could not be performed because the Frame Write bit in the configuration register was not set. |

Callisto Interrupts

All messages from Callisto contain an interrupt (I) bit in the control byte to indicate that the state of one of the COR (clear on read) bits in the status register has been set and that the user should examine the status register. Once this condition has occurred and Callisto has set an I bit in a message, it will continue to set the I bit in subsequent messages until the status register has been read.

Register Access Message Type

Figure 150:
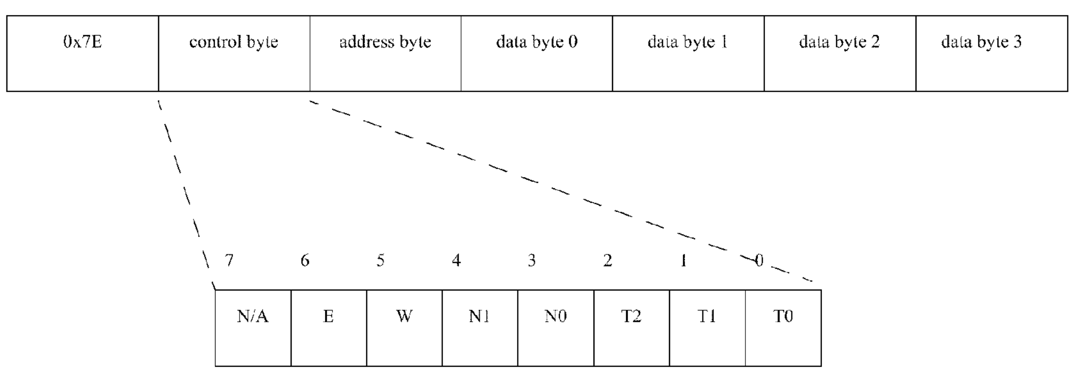

Callisto's registers are accessed by messages sent to it on its serial interface. The message consists of a control byte, an address byte and 0 to 4 data bytes. FIG. 150 shows the format of register access messages. For registers whose width is greater than a single byte, least significant bytes will appear in the message first. Using the example message in FIG. 150 as an example of writing to a 32 bit register, data byte 0 would be written to bits 7:0 of the register, data byte 1 to bits 15:8, data byte 2 to bits 23:16 and data byte 3 to bits 31:24.

The following table shows the control byte format for register access messages:

| Field | Bits | Width | Description |
|---|---|---|---|
| T[2:0] | 2:0 | 3 | Type. Type of message. Set to "000" for register access. |
| N[1:0] | 4:3 | 2 | Number Write Bytes. Indicates the number of bytes of data to be written during a register write, less one, where "00" indicates 1 byte and "11" indicates 4 bytes. Set to "00" for read. |
| W | 5 | 1 | Write. If this bit is set to '1' indicates a register write. Setting to '0' indicates a read. |
| E | 6 | 1 | External. If set to '1' indicates the register operation is for an external device, otherwise a Callisto register access. |
| N/A | 7 | 1 | Not Used. Should be set to '0'. |

Callisto Command Message Type

Figure 151:
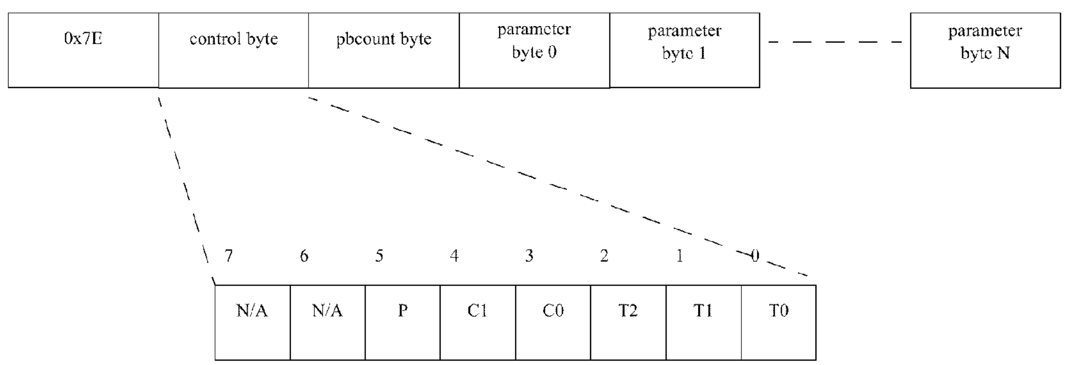

The user asks Callisto to perform its tasks by sending it messages which specify which operation to perform. These command messages consist of a control byte, followed by zero or one parameter byte-count bytes (pbcount), followed by a number of parameter bytes as specified by pbcount, or as implied by the command type. FIG. 151 shows the format for the command message. pbcount is set to the number of parameter bytes less one, so a value of zero signifies that there will be one parameter byte.

The following table shows the control byte format for Callisto command messages:

| Field | Bits | Width | Description |
|---|---|---|---|
| T[2:0] | 2:0 | 3 | Type. Type of message. Set to "001" for Callisto command. |
| C[1:0] | 4:3 | 2 | Command Type. Specifies the type command:<br>"00" Unprocessed image read<br>"01" Sub-pixel read<br>"10" Sub-sampled image read<br>"11" Processed image read |
| P | 5 | 1 | Parameter. When set to '1' indicates that this command has its parameters included in the message. Otherwise use parameters defined by Callisto register settings. |
| N/A | 7:6 | 2 | Not Used. Should be set to "00". |

Number of pbcount bytes per command:

| Command Type | Number of pbcount bytes |
|---|---|
| Unprocessed image read | 0 |
| Processed image read | 0 |
| Sub-sampled image read | 0 |
| Sub-pixel read | 1 |

Register Data Message Type

Figure 152:
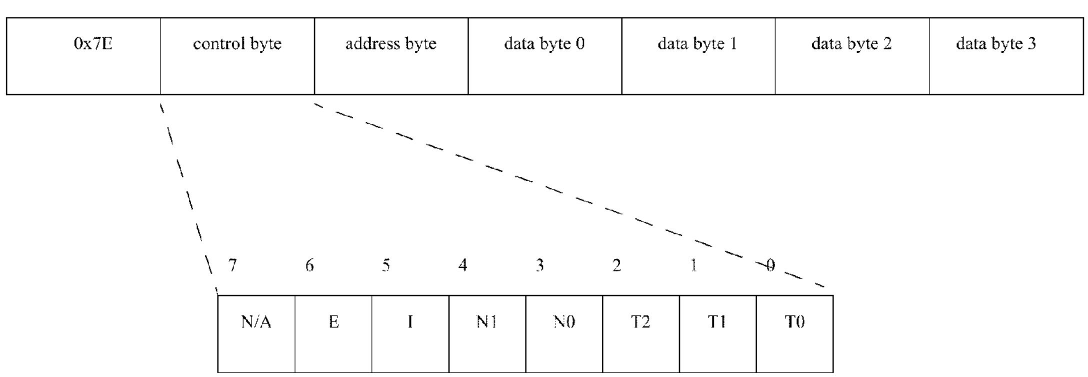

These messages are sent from Callisto back to the processor, as a result of a register read message being received by Callisto. The message consists of a control byte, a register address byte and up to four bytes of data. See FIG. 152. Using the example message in FIG. 152 as an example of reading from a 32 bit register, data byte 0 would be taken from bits 7:0 of the register, data byte 1 from bits 15:8, data byte 2 from bits 23:16 and data byte 3 from bits 31:24. The following table shows the control byte format for register data messages:

| Field | Bits | Width | Description |
|---|---|---|---|
| T[2:0] | 2:0 | 3 | Type. Type of message. Set to "010" for register data. |
| N[1:0] | 4:3 | 2 | Number Data Bytes. Indicates the number of bytes of data, less one, where "00" means 1 byte and "11" means 4 bytes. |
| I | 5 | 1 | Interrupt. Indicates that some event has occurred which has changed the status register. An indicator that software should examine the status register contents. |
| E | 6 | 1 | External. If set to '1' indicates the original register read for an external device, otherwise a Callisto register access and set to '0'. |
| N/A | 7 | 1 | Not Used. Should be set to '0'. |

Command Data Message Type

I. These messages return data back to the processor as a result of processing a command.

Figure 153:
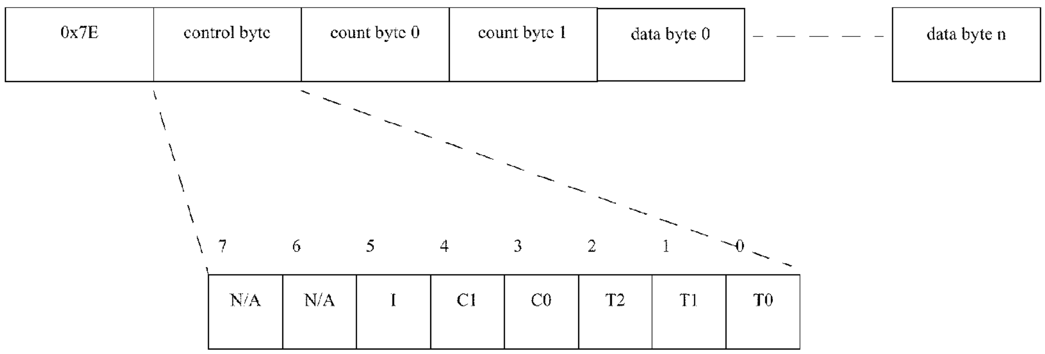

The message comprises a control byte, two data count bytes, followed by a number of data bytes as specified by the data count bytes. See FIG. 153. The data count bytes specify how many bytes of data are in the message, less one, so that a value of 0x0000 means that the message contains a single byte of data. Count byte 0 is the least significant byte of the two bytes.

II.

III. The following table shows the control byte format for command data messages:

| Field | Bits | Width | Description |
|---|---|---|---|
| T[2:0] | 2:0 | 3 | Type. Type of message. Set to "011" for image data message. |
| C[1:0] | 4:3 | 2 | Command Type. Specifies the type command for which this is the data being returned:<br>"00" Unprocessed image read<br>"01" Sub-pixel read<br>"10" Sub-sampled image read<br>"11" Processed Image Read |
| I | 5 | 1 | Interrupt. Indicates that some event has occurred which has changed the status register. An indicator that software should examine the status register contents. |
| N/A | 7:6 | 2 | Not used. Should be set to "00". |

The command type field C indicates the type of command that was executed to produce the result data in the image data message. The interrupt I field indicates that some event has occurred during processing and that the contents of the status register should be examined.

Format of Command Data

Data returned in command data messages is always pixel data, i.e. pixel values. In the case of image region read commands, that pixel data is returned in raster order. In the case of the sub-pixel read command the pixels are returned in the order in which their corresponding coordinates were supplied. Except for the processed image region read command, all pixel data is 8 bit. In the case of the processed image region read command the pixel data returned is 1 bit and padded so that start of lines occur on byte boundaries.

Figure 154:
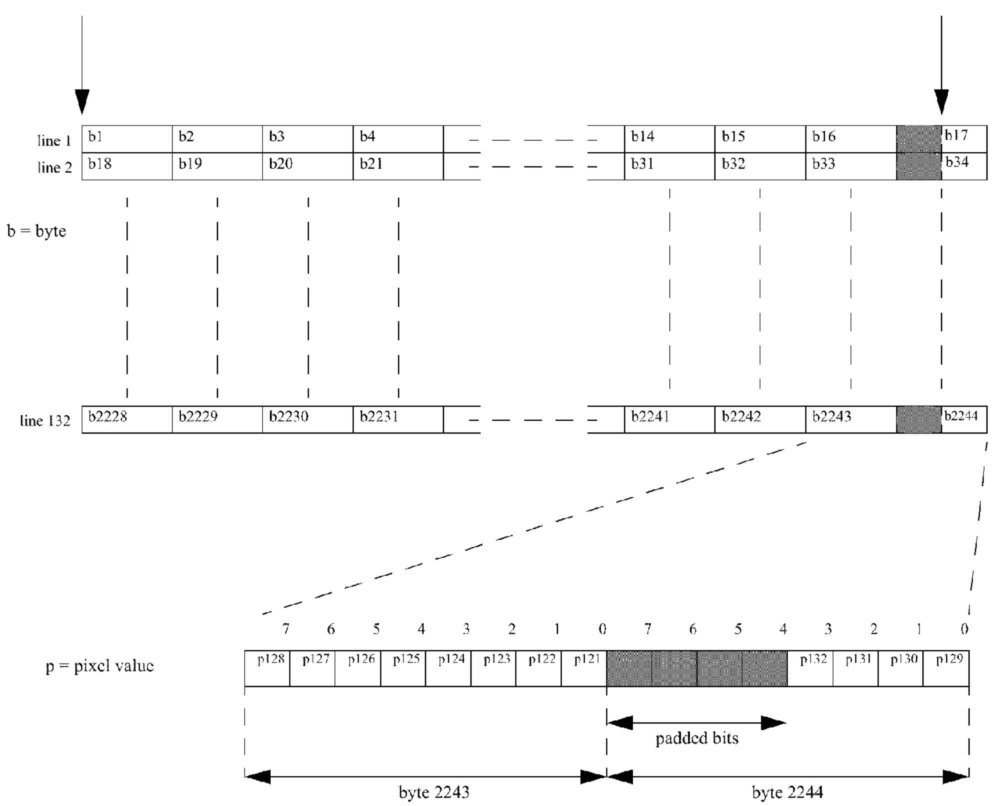
Figure 155:
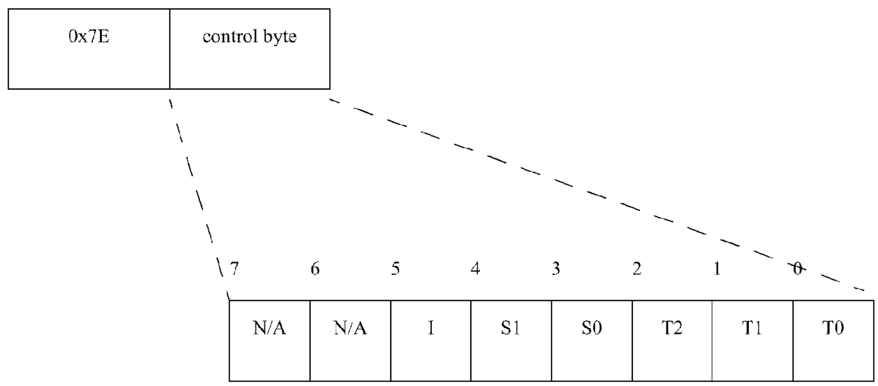
Figure 156:
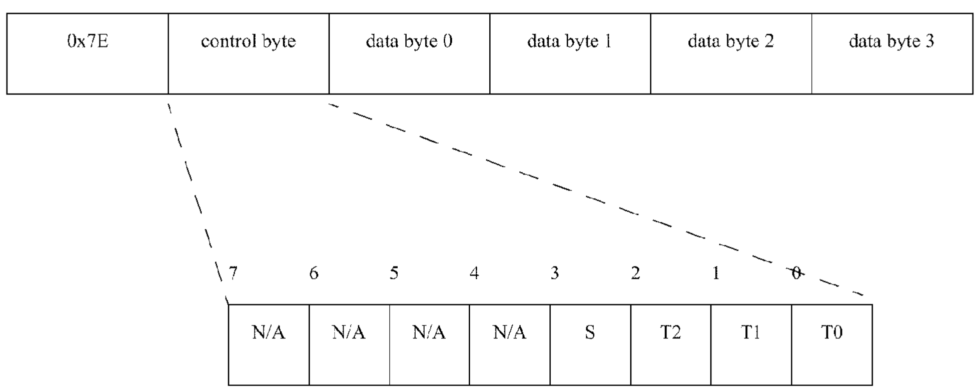
Figure 157:
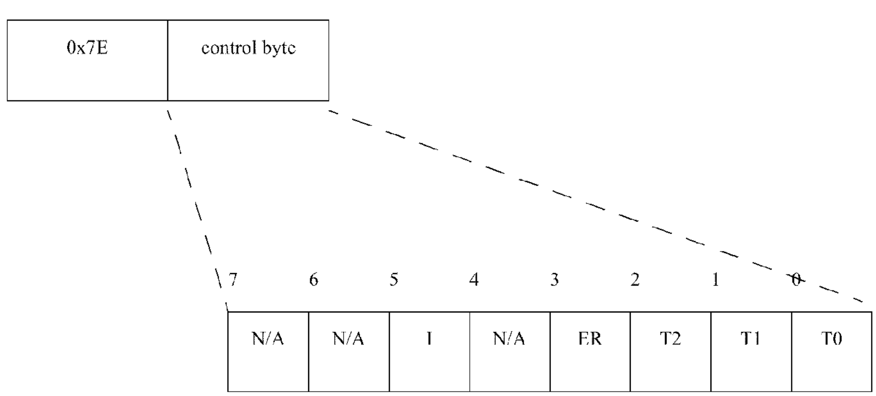

The pixel values returned as a result of executing a processed image read command are single bit values. These values are packed into bytes so that each byte contains 8 pixel values. Image line boundaries always correspond to byte boundaries, and in the case where the image width is not a multiple of 8, the last byte of a line will be padded with a defined bit value so that the next line begins on a byte boundary. The value of the padding bit is defined in the Callisto configuration register. FIG. 154 shows how single bit pixel values are packed for an image that is 132×132 pixels wide. 132 bits requires 16 full bytes, and 4 bits of a 17th byte. The diagram shows that the full image requires 2244 bytes and that each of the 132 lines consists of 17 bytes. Pixels are packed in raster order using the least significant bit first.

Frame Synchronisation Message Type

These messages are intended to be used for software frame processing synchronisation. There are three different forms of this message, as shown in the following table:

| Frame Sync Message Type | Frame Sync Type Code | Message Source | Comment |
|---|---|---|---|
| Ready for new frame | b'00 | Processor | Indicates to Callisto that the processor is ready to process a new frame. Callisto will send a "received new frame" message in response. |
| Finished frame processing | b'01 | Processor | Indicates to Callisto that the processor has finished processing the current frame when the current command has finished execution. This unlocks the frame buffer and allows new image sensor frames to be written. |
| Received new frame | b'10 | Callisto | This is the response to the "ready for new frame" message and indicates that Callisto has a new frame ready for processing. |

Frame Sync Message—Control Byte Format

| Field | Bits | Width | Description |
|---|---|---|---|
| T[2:0] | 2:0 | 3 | Type. Type of message. Set to "100" for frame sync message. |
| S[1:0] | 4:3 | 2 | Frame Sync Type. Indicates the type of frame sync message:<br>"00" - Ready for new frame<br>"01" - Finished frame processing<br>"10" - Received new frame |
| I | 5 | 1 | Interrupt. Indicates that some event has occurred which has changed the status register. An indicator that software should examine the status register contents. This bit only appears in messages from Callisto. i.e. when Frame Sync Type is "10". |
| N/A | 7:6 | 2 | Not used. Should be set to "00". |

Frame Store Write Message Type

This message type enables the user to write pixel data directly into the frame store buffer. To be able to perform this function the 'WriteFrame' bit in the configuration register must be set first. This message consists of the 0x7E byte, a control byte and four bytes of pixel data, supplied in raster order.

Frame Store Write Message—Control Byte Format

| Field | Bits | Width | Description |
|---|---|---|---|
| T[2:0] | 2:0 | 3 | Type. Type of message. Set to "101" for frame store writes. |
| S | 3 | 1 | Start of Frame. Setting this bit indicates that the message contains the first byte of a new frame. |
| N/A | 7:4 | 4 | Not Used. Set to b'000. |

Frame Store Write Acknowledge Message Type

This message acknowledges a frame store write message, notifying the user that another frame store write message may be issued. The message consists of a 0x7E byte and a control byte.

Frame Store Write Message—Control Byte Format

| Field | Bits | Width | Description |
|---|---|---|---|
| T[2:0] | 2:0 | 3 | Type. Type of message. Set to "110" for frame store writes. |
| ER | 3 | 1 | Error. This bit is set by Callisto when a FrameStoreWrite message was received but the configuration register bit WriteFrame was not set. |
| N/A | 4 | 1 | Not Used. Set to b'0. |
| I | 5 | 1 | Interrupt. indicates that some event has occurred which has changed the status register. An indicator that software should examine the status register contents. |
| N/A | 7:6 | 2 | Not Used. Set to b'00. |

13. Callisto Commands

Callisto is able to perform four operations: unprocessed image read, processed image read, sub-sampled image read and sub-pixel read.

Commands are issued to Callisto by sending it command messages. Arguments or parameters for commands may be specified in one of two ways. The first is to set command-specific settings in the appropriate register, as defined in the "Operation" chapter. The second method is to supply the parameters with the command itself. In this case a slightly different form of the command is used to indicate to Callisto that it should use parameters supplied with the command and not from a register setting.

Telling Callisto to use arguments supplied with the command rather than those specified in its registers is done by setting the P bit in the command message control byte to '1'.

Overlapping command execution with command transmission is not supported; while Callisto is busy executing a command it cannot receive any new commands. The user should be careful not to issue a new command until the previous command has finished execution, indicated by the processor receiving the corresponding command data message. If commands are received while Callisto is busy executing a command it will enter an error state and indicate this to the processor via the serial interface. See Section for details.

The following sections describe the individual commands and how to construct the command message to perform them.

Unprocessed Image Read

This command tells Callisto to return all of the pixel data within a defined region of the unprocessed image. This command doesn't require any parameter count bytes following the control byte as it has a fixed number of arguments. This command expects two arguments (expressed as two bytes): TopLeftX, TopLeftY. An example message for this command is shown in FIG. 158.

The actual execution of this command relies on an additional two parameters: SizeX and SizeY. These two parameters must be specified in the appropriate register. Note that this command always expects two arguments, and it is illegal not to have the P bit set.

Different Forms of Unprocessed Image Read Command:

| Has Parameters | Control Byte Value | Comments |
|---|---|---|
| No | b'00000001 | Illegal form of this command. P bit must always be set and arguments supplied. |
| Yes | b'00100001 | Valid form of this command. |

Processed Image Read

This command tells Callisto to return all the pixel values in the defined region of the processed image. This command requires four arguments (expressed in four bytes) if supplied: TopLeftX, TopLeftY, SizeX and SizeY. The size parameters are in processed image units, and TopLeftX and TopLeftY are expressed in processed image coordinates. This command returns pixel values from the processed image after sub-sampling, dynamic range expansion and thresholding, so all pixels are single bit values. FIGS. 159*a* and 159*b* show two example formats of this command.

Different Forms of Processed Image Read Command

| Has Parameters | Control Byte Value | Comments |
|---|---|---|
| No | b'00011001 | Size and TopLeft arguments taken from Callisto register. |
| Yes | b'00111001 | Size and TopLeft arguments supplied with command. |

Sub-Sampled Image Read

Figure 160A:
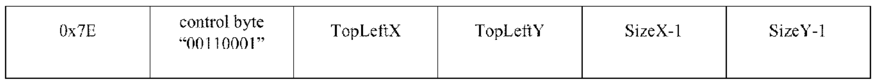
Figure 160B:
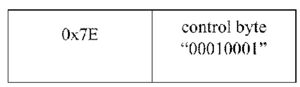

This command is identical to the processed image read command except that the processed image in this case has not had dynamic range expansion and thresholding performed. This means that the pixels returned are 8 bit values. Everything else about this command is the same. FIGS. 160*a* and 160*b* show two example formats for this command.

Different Forms of Sub-Sampled Image Read Command

| Has Parameters | Control Byte Value | Comments |
|---|---|---|
| No | b'00010001 | Size and TopLeft arguments taken from Callisto register. |
| Yes | b'00110001 | Size and TopLeft arguments supplied with command. |

Sub-Pixel Read

Figure 161:
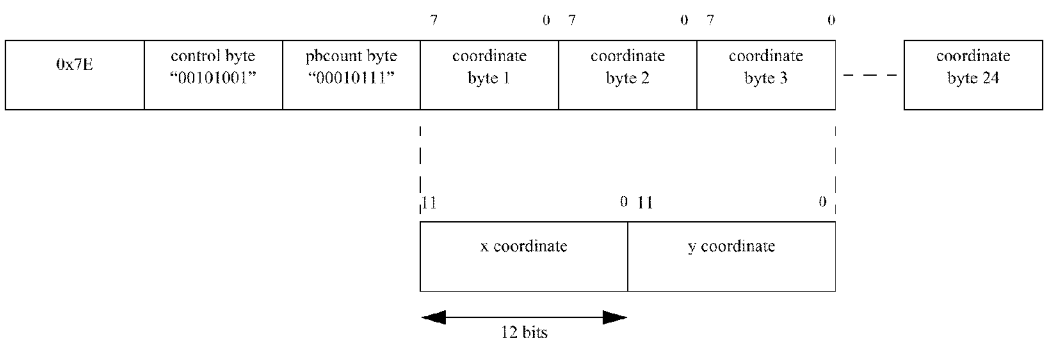

This command tells Callisto to calculate the sub-pixel values at the specified sub-pixel coordinates. This command has only one form and its arguments must always be supplied in the command message. This command has one pbcount byte following the control byte which indicates how many coordinate bytes are contained in the message. pbcount defines the number of coordinate bytes less one—i.e two (b'00000010) means 3 bytes—and must represent a number of bytes that is divisible by 3. FIG. 161 shows the format for a sub-pixel read command with 8 sub-pixel coordinates.

Different Forms of Sub-Pixel Read Command

| Has Parameters | Control Byte Value | Comments |
|---|---|---|
| No | b'00001001 | Illegal form of command. Must have arguments supplied. |
| Yes | b'00101001 | Valid form of command. |

Callisto Command Processing

The commands processed by Callisto are embedded in messages input using the serial interface. In normal circumstances Callisto processes commands immediately upon receipt using whatever image data is in its frame store buffer at the time. There are however some boundary conditions that cause Callisto to not follow this "normal" behavior. These conditions occur at frame boundaries.

Figure 162:
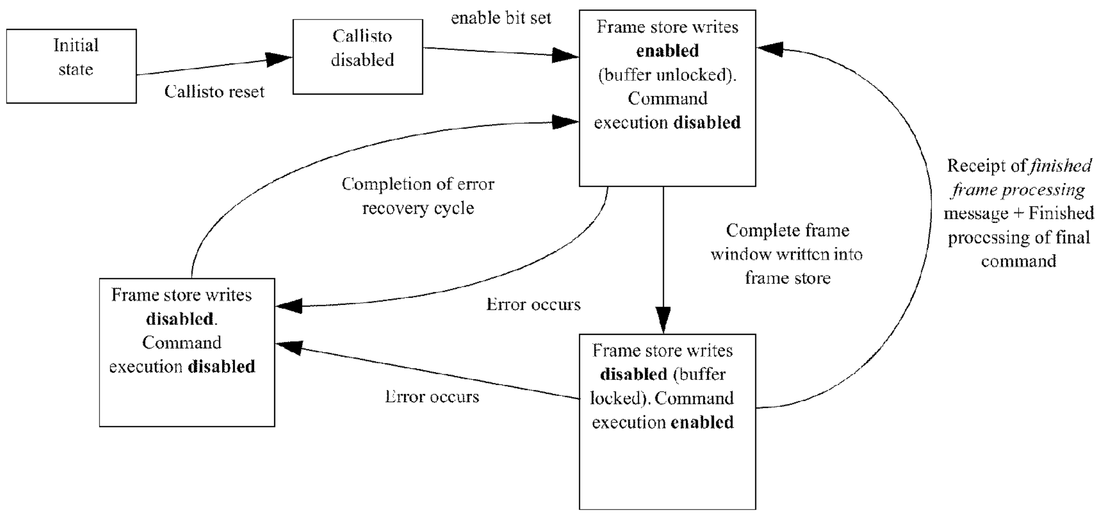

Initially, after reset, the frame store buffer will be empty, and Callisto will be disabled and will not process received commands. Once Callisto is enabled, and when the frame store buffer contains a complete frame, command execution begins and further writing to the frame store buffer is disabled. This condition continues until Callisto receives a finished frame processing message. This indicates that processing of the current frame has finished. At this point the frame store buffer is unlocked, and command execution locked until the next frame window is written into the buffer. FIG. 162 shows the state transitions and states for command execution and frame store writing.

Frame Store Buffer

Figure 163:
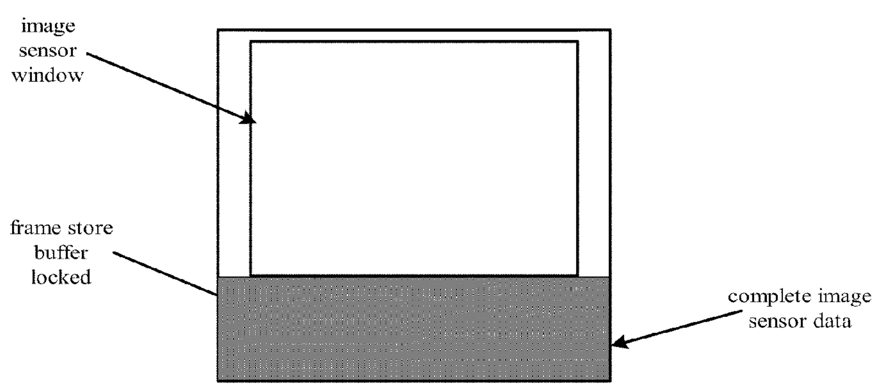

The frame store buffer is where image data from the sensor is stored while Callisto is performing image processing operations on that data. The frame store buffer is considered to be either "locked" or "unlocked". In its unlocked state, the frame store buffer is able to accept image data from the image sensor, while in its locked state it is not (see FIG. 162 above). The frame store buffer becomes locked when the currently defined sensor window is completely written into the buffer, and not when all the data from the image sensor has been received. FIG. 163 shows when the buffer is locked.

Issuing Callisto Requests

For requests that return data, i.e. Callisto commands, register reads and ready to receive a new frame, the processor may only have a single request outstanding at any one time; the processor must wait until it has received the data output of the current request before issuing a new request. For requests that do not return any data, e.g. register writes, the processor does not have to wait and may issue these requests at whatever rate it wishes.

Callisto is unable to honour a command request if its frame store buffer is not full, as this will result in an image data underflow error. Callisto can process register access requests and frame synchronisation requests when the buffer is not full.

Command Execution Performance

Output Data Rates

For all commands except sub-pixel read, the output data as a result of executing a command is produced without interruption at the full serial interface rate. In the case of the sub-pixel read command, the sub-pixel values returned as a result of command execution is produced without interruption at one third the full serial interface rate. The reason for this is that the calculation of each sub-pixel byte value requires a three-byte coordinate value; Callisto must wait for the full coordinate to be received before it can calculate the single-byte result.

The exception to the above is the case of a processed image and sub-sampled image read commands when the regions used are small. In this case the output data rate falls below 100% of the full serial interface data rate. Table shows the output data rate for region widths less than 10 pixels, and heights less than 8 pixels. expressed as a percentage of the full serial data rate.

Data Output Rates for Small Region Sizes

| Region Width | Region Height | Output Data Rate |
|---|---|---|
| 0-9 | 8+ | 50%-60% |
| 10+ | 0-7 | 45%-50% |
| 0-9 | 0-7 | 20% |

Latency

The table below shows execution latencies for each command expressed in number of serial clock cycles. Latency times are measured from the receipt of the start bit for the first byte of the message that contains the command, to the transmission of the start bit for the first byte of the message that contains the command response.

Command Latencies

| Command | Execution Latency |
|---|---|
| Image read (without parameters) | 30-40 clocks |
| Image read (with parameters) | 50-70 clocks |
| Register read | 30-40 clocks |
| Receive new frame | 25-30 clocks |

Error Detection and Recovery

Figure 164:
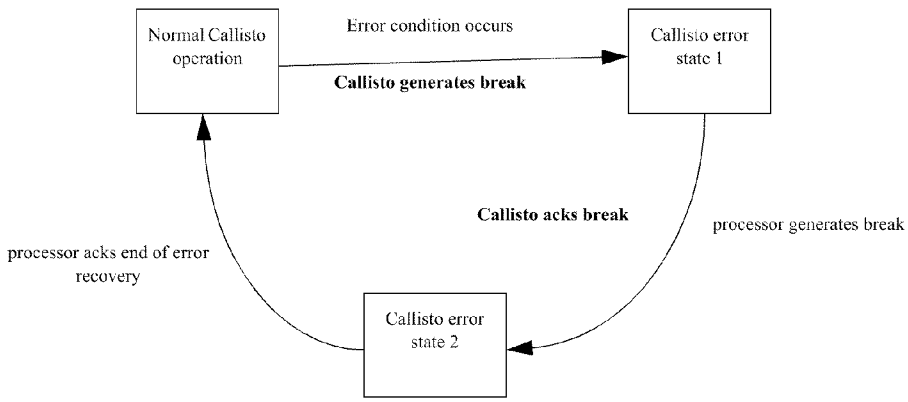

When Callisto is active, and executing commands, there are several events that it will consider to be errors. If any of these events occur, Callisto ceases command execution, initiate a break condition on the serial interface to indicate to the processor that an error has occurred, and will not be able to resume normal operation until the error recovery cycle is complete. FIG. 164 shows the error recovery cycle. The events that put Callisto into an error state are shown in the following table:

Callisto Error Conditions

| Error Condition | Comments |
|---|---|
| Message out of sync | This condition occurs when Callisto is no longer able to determine where messages begin and end. |
| Malformed message | When a Callisto command is malformed. An example of this may be when Callisto is expecting command arguments and none were supplied. |

-continued

| Error Condition | Comments |
|---|---|
| | Definition of malformed messages: |
| | 1. All messages: |
| | (a) illegal message type. |
| | 2. Register Access Messages: |
| | (a) a read access and num_write_bytes /= "00". |
| | (b) not_used field /= '0'. |
| | (c) illegal internal register address value. |
| | (d) illegal external register address value. |
| | (d) internal access, num_write_bytes inconsistent with address |
| | 3. Image Command Messages: |
| | (a) not_used field /= "00". |
| | (b) unprocessed read with P /= '1'. |
| | (c) subpixel read with P /= '1'. |
| | (d) subpixel read where (pbcount + 1) not divisible by 3. |
| | 4. Frame Sync Messages: |
| | (a) illegal control byte type. |
| | (b) interrupt bit /= '0'. |
| | (c) not_used field /= "00". |
| | 5. Frame Store Write Messages: |
| | (a) not_used field /= "000" |
| Malformed byte | Occurs when a stop bit is not found in the correct position. |
| Command overflow | This condition occurs when Callisto is busy processing a message which produces a response and receives a new message requiring a response. |
| Image data underflow | Callisto receives a command but the frame store buffer doesn't contain a complete frame, i.e. isn't locked. |

Image Sensor Interface

Data Interface

The interface to the image sensor relies on external control of image sensor timing, i.e. Callisto does not control the image sensor timing or sequencing. Callisto relies on the image sensor interface telling it when there is a new frame to be read from the sensor, and then relies on the interface telling it when there is valid pixel data. See the "Interfaces" chapter for timing details. Two parameters affect how the image sensor interface behaves: the Image Sensor Window setting, and the Image Sensor Size setting. Both these parameters are located in Callisto registers. The Image Sensor Window setting controls which part of the total image data Callisto is to write to its frame store buffer. Data outside this window is ignored by Callisto, i.e. not written to the frame store buffer.

The Image Sensor Size setting tells Callisto the size of the image sensor array, and so how much data to expect in a frame. This parameter is needed in conjunction with the window setting in order to work out what data to save and which data to ignore.

Timing Interface

Callisto provides two signals, and possibly a third to control the image sensor to which it is connected and an external flash. The two output signals are expose and flash. A third signal, capture, can either be generated by Callisto and used internally or provided as an input. The timings of expose and flash are defined relative to capture and are defined by the delay from the rising edge of capture as well as how long each signal is asserted. The timings of these two signals may be defined independently of each other.

All of Callisto's image sensor timing signals are inactive whenever Callisto is inactive, i.e. when the Enable bit is the configuration register is set to '0'.

When Callisto is configured to generate the timing for the capture signal internally, the user defines the period of the capture signal, defining the length of time between pulses. The first capture pulse is generated immediately after the enable bit is set in the configuration register.

External Register Interface

Callisto may be used to control the reading from, and writing to registers in other devices. To this end Callisto provides a generic register read/write bus that allows it to gain access to registers in other devices. Register access commands used on Callisto's serial interface allow the user to specify whether a register operation is "internal" or "external." Internal register accesses are used to access Callisto registers, and external accesses are used to gain access to registers in the external device, and initiate transactions on the external register interface.

This interface is asynchronous and expects the external device to observe a handshaking protocol.

Power Management

Callisto has a low power mode where the serial interface and external image sensor timing signals remain active. In this mode the user is able to access Callisto registers.

This low power mode can be entered in one of two ways. The first is to set the LowPower bit in the configuration register. When this occurs Callisto will remain in low power mode until the LowPower bit is cleared.

The second way Callisto enters its low power mode occurs when the AutoSleep bit in the configuration register is set. In this case low power mode will be entered when Callisto becomes inactive, and will leave this state when there is some activity for it to perform.

The "inactive" state is entered when Callisto has finished processing the current frame, which corresponds to having received the "finished frame processing" message.

The "active" state is entered when Callisto has received indication, from the image sensor, that a new frame is available. This occurs when the isync signal is asserted.

Callisto Interfaces

Pinout

The following table shows all input and output signals on Callisto.

General Control Interface Signals:

| Signal name | Width | Description | Direction |
|---|---|---|---|
| resetb | 1 | Asynchronous system reset. | input |
| ten | 1 | Test enable. | input |
| tmode | 1 | Test mode | input |
| sen | 1 | Scan enable. | input |
| sclk | 1 | Serial clock. | input |
| txd/sout | 1 | Serial output data or scan output data. | output |
| rxd/sin | 1 | Serial inout data or scan input data. | input |
| iclk | 1 | Image sensor clock. | input |
| isync | 1 | Image sensor frame synch. | input |
| ivalid | 1 | Image sensor pixel valid. | input |
| idata | 8 | Image sensor pixel data. | input |
| capture | 1 | Input version of image sensor capture/flash timing refernce signal. This signal may also be (optionally) internally generated. | input |
| flash | 1 | External flash control signal | output |
| expose | 1 | Image sensor exposure control signal | output |
| rvalid | 1 | Register interface valid. | output |
| rwr | 1 | Register interface write. | output |
| raddr | 8 | Register interface address. | output |
| rdatai | 32 | Register interface input data. | input |

-continued

| Signal name | Width | Description | Direction |
|---|---|---|---|
| rdatao | 32 | Register interface output data. | output |
| rack | 1 | Register interface acknowledgment | input |
| rnak | 1 | Register interface negative acknowledgment | input |
| TOTAL | 96 | | |

General Control and Test Interface
General Control and Test Interface Signals

| Signal name | Description | Direction |
|---|---|---|
| resetb | System reset. Active when driven low. Asynchronous to main system clock sclk. | input |
| ten | Test enable. When driven high enables image data to serial data testing. | input |
| tmode | Test mode. When driven high puts Callisto into test mode, specifically for scan testing and BIST. | input |
| sen | Scan enable. When driven high scan testing is enabled. In this mode the serial interface data signals txd and rxd become scan data signals. In this mode sclk is used as the scan clock. | input |
| sin | Scan input data. Multiplexed with the serial data input signal rxd when sen = '1'. | input |
| sout | Scan output data. Multiplexed with the serial data output signal txd when sen = '1'. | output |

Figure 165:
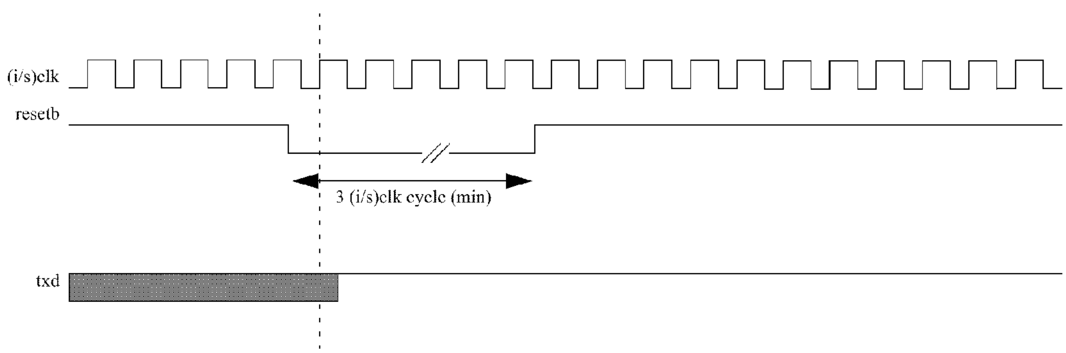

FIG. 165 shows Callisto's reset timing. resetb must be held low for at least 3 cycles of the slowest of the two clocks, sclk and iclk.

Test Mode Definitions ten—Test Enable. When Asserted:

Forces idata to be serialized and output from txd (see section 3.4).

Ignore all commands/accesses except for register writes.

sen—Scan Enable. When Asserted:

Forces every flip-flop in the design into one large shift register tmode—Test Mode. When Asserted:

Forces all derived clocks to be sourced from sclk.

Forces an xor-based bypass of RAM I/O. Outputs of RAMs are wired to the RAM inputs through an xor structure so that RAM outputs can be controlled during scan.

Forces async reset trees to be controlled via reset pin (i.e. bypassing synchronization). Reset is synchronised to target clock domain during normal operation, but this must be disabled during scan as these reset sync flip-flops are also in the scan chain. If this bypassing didn't occur the global synchronised reset signals may accidentally be triggered during scan.

Test Pin Settings

| Device Mode | sen | tmode | ten |
|---|---|---|---|
| Functional | 0 | 0 | 0 |
| Image data to serial | 0 | 0 | 1 |
| Scan testing | 0/1 | 1 | 0 |
| BIST testing | 0 | 1 | 0 |

Image Sensor Data Interface
Image Sensor Interface Signals

| Signal name | Description | Direction |
|---|---|---|
| iclk | Image sensor interface clock. Maximum frequency is 50 MHz. Note: iclk must always be running, | input |
| isync | Image sensor sync. Indicates the image sensor has captured a new frame. | input |
| ivalid | Image sensor data valid. When high, indicates valid data in idata bus. Goes high after isync is asserted. | input |
| idata[7:0] | Image sensor data. Byte-wise data from image sensor. Valid when ivalid is asserted. | input |

Figure 166:
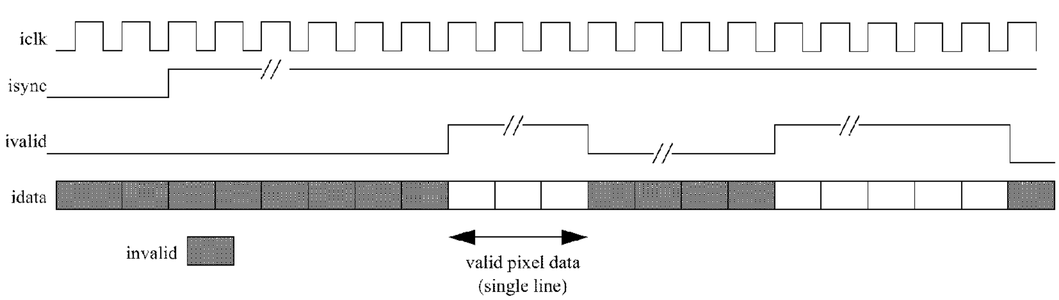

FIG. 166 shows the timing for the image sensor interface. isync is asserted to indicate that the image sensor has captured a new frame. ivalid is asserted to indicate that valid pixel data is now available on idata. ivalid is asserted for each iclk cycle during which there is valid pixel data on idata. isync must be high for at least one clock cycle and may stay high for the entire frame transfer.

Image Sensor Timing Interface
Image Sensor Interface Signals

| Signal name | Description | Direction |
|---|---|---|
| capture | Image sensor capture and flash timing reference signal. | input |
| flash | Control the flash. | output |
| expose | Controls frame capture for the image sensor. | output |

Figure 167:
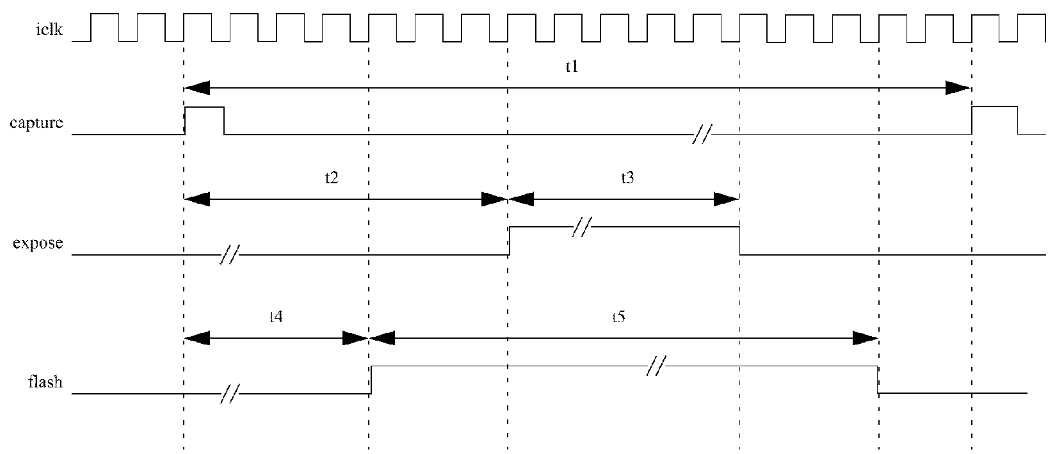

FIG. 167 shows the timings for image sensor control signals. All of the time parameters are in units of iclk clock cycles, and are defined by setting their values in the appropriate Callisto register. The parameter t1 is only definable when capture is an internal signal. The capture signal is synchronous to iclk and has a pulse width of 1 iclk period.

Figure 168:
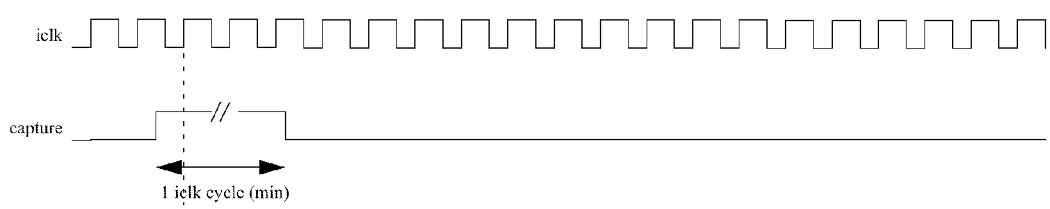

FIG. 168 shows the timing for the external capture signal, which must be asserted for at least 1 iclk cycle when active.

Serial Interface
Serial Interface Signals

| Signal name | Description | Direction |
|---|---|---|
| sclk | Serial clock. Maximum frequency is 40 MHz. | input |
| txd | Transmit data | output |
| rxd | Receive data | input |

Figure 169:
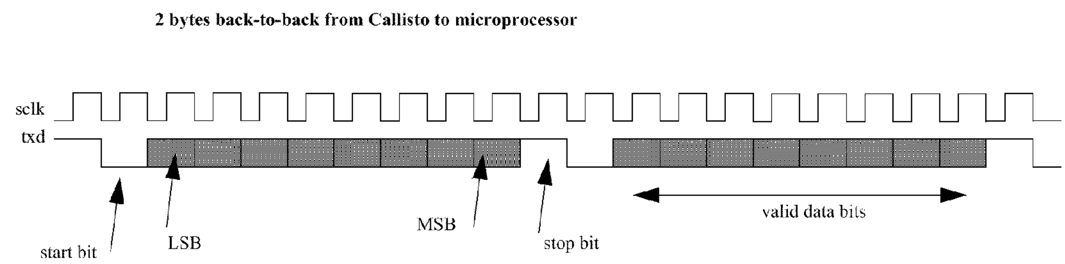
Figure 170:
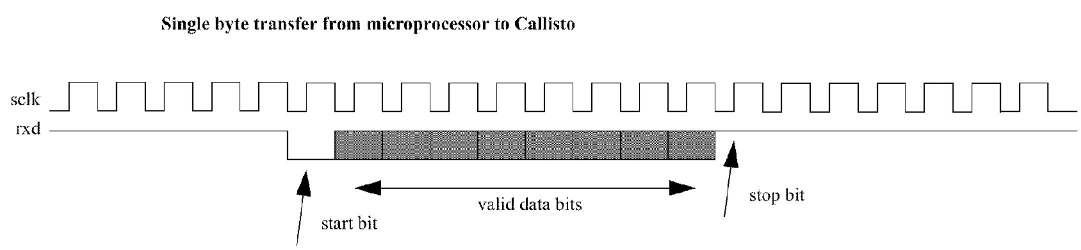

FIGS. 169 and 170 show the operation of the serial interface in synchronous mode. Shown here is a back-to-back transfer of 2 bytes from Callisto to the microprocessor on txd using a single stop bit. Also shown is the transfer of a byte from the microprocessor to Callisto on rxd, also using a single stop bit.

Error Recovery Timing Using Break

Figure 171:
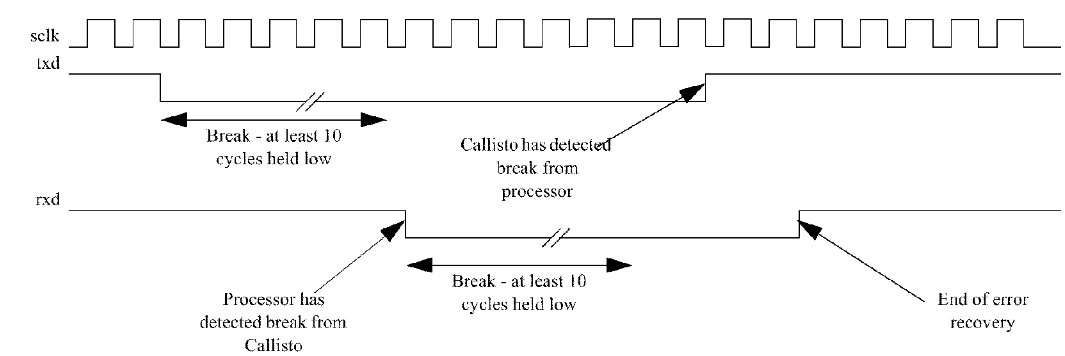

FIG. 171 shows the timing for error recovery. When Callisto encounters an error, it signals this condition by holding the txd signal low (for at least 10 sclk cycles). This will violate the '0' start bit, '1' stop bit requirement and will raise a microprocessor interrupt. This is the break condition. Once the microprocessor detects the break it will then also generate a break condition on rxd. Callisto acknowledges this by driving txd high, and the process is completed by the microprocessor driving rxd high.

External Register Interface

External Register Interface Signals

| Signal name | Description | Direction |
|---|---|---|
| rvalid | Register bus valid. High whenever a read or write operation is occurring. Validates raddr and rdatao. | output |
| rwr | Register bus write. When high indicates the current operation is a register write. | output |
| rack | Register bus ack. Signals to Callisto end of register access cycle. | input |
| rnak | Register bus negative ack. Has same behavior as rack in that it is a handshaking signal to end a transaction. It is asserted instead of rack to indicate that an error has occurred during the transaction, and that it could not be carried out, | input |
| raddr[7:0] | Register bus address. Indicates the address of the register being accessed. | output |
| rdatai[31:0] | Register bus data in. Data bus driven by slave device. Used for register reads. | input |
| rdatao[31:0] | Register bus data out. Data to be written to a register during a write, when rwr is high. | output |

Figure 172:
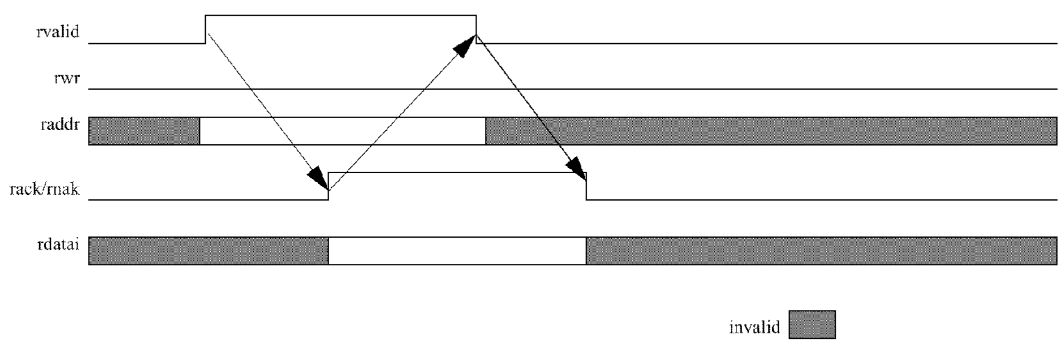

FIG. 172 shows the timing for a read cycle on the external register interface. The read cycle begins by validating the address (raddr) by driving rvalid high, together with driving rwr low. The target device acknowledges that is has put the addressed data onto rdatai by driving rack high. rack then remains high until Callisto drives rvalid low again. This signals the end of the transaction.

Figure 173:
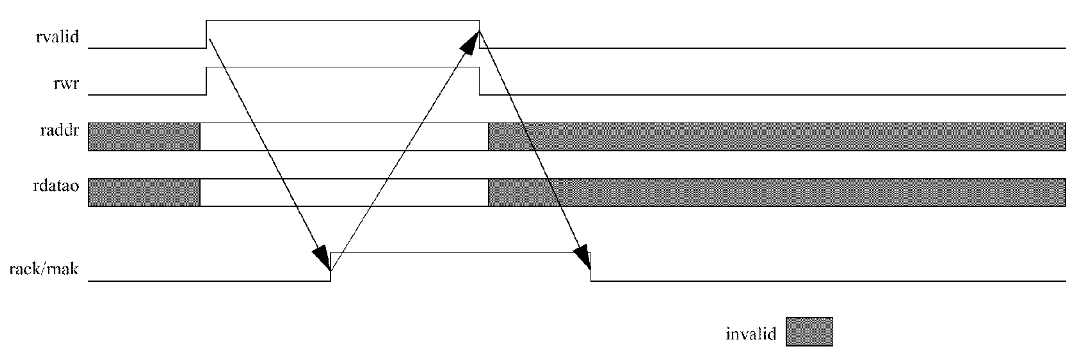

FIG. 173 shows the timing for an external register write. Callisto signals the start of the cycle by validating the address and data to be written (raddr and rdatao) by driving rvalid high, together with driving rwr high. The target device acknowledges the write by driving rack high. rack then remains high until Callisto drives rvalid low again. This signals the end of the transaction. If the rnak signal is asserted to complete a transaction that means there was an error in the external device and the transaction could not be completed successfully.

Note that either rack or rnak should be asserted, and not both simultaneously.

Operation

Registers

This section describes Callisto's registers.

Configuration Register

This is a general Callisto configuration register.

Configuration Register—8 Bit

| Field | Width | Bits | Reset Value | Description |
|---|---|---|---|---|
| Enable | 1 | 0 | b'0 | Enable. Setting this bit to '1' enables Callisto operation. Callisto will perform no command processing or frame store writing while this bit is set to '0', but will still respond to register accesses. |
| ComExRst | 1 | 1 | b'0 | Command Execution Restart. When set to '1' causes Callisto to immediately stop command processing and return to its inital processing state. This bit is self clearing. |
| PadBit | 1 | 2 | b'0 | Padding Bit. Value to use when padding bytes as a result of reading a full processed image. The padding is used to align the start of image lines with byte boundaries. |
| BistStart | 1 | 3 | b'0 | BIST Start. Instructs Callisto to perform BIST testing of its RAMs. This bit is self clearing. |
| CaptureIn | 1 | 4 | b'0 | Capture Input. When set to '1' the capture signal is supplied externally, otherwise it is internally generated. |
| LowPower | 1 | 5 | b'0 | Low Power Mode. When this bit is set to '1' Callisto enters its low power state. |
| AutoSleep | 1 | 6 | b'0 | Auto Sleep and Wakeup. When this bit is set to '1' Callisto will automatically enter its low power state when inactive, and return to its normal state when active again. |
| WriteFrame | 1 | 7 | b'0 | Write Frame. Setting this bit to '1' enables direct writing to the frame store buffer. |

Status Register

Callisto status register. This register is clear on read (COR).

Status Register—16 Bit

| Field | Type | Width | Bits | Reset Value | Description |
|---|---|---|---|---|---|
| ErrCond | COR | 3 | 2:0 | b'000 | Last Error Condition. Indicates the error that occurred that put Callisto into an error state.<br>"000" - No error<br>"001" - Message out of sync<br>"010" - Malformed message<br>"011" - Malformed byte<br>"100" - Command overflow<br>"101" - Image data underflow |

-continued

| Field | Type | Width | Bits | Reset Value | Description |
|---|---|---|---|---|---|
| FrameMiss | COR | 2 | 4:3 | b'00 | Missed Frames. Indicates that new frames were available to be written into the frame store buffer but Callisto was unable to do so because was in the command execution state. "00" - No frames missed "01" - One frame missed "10" - Two frames missed "11" - Three or more frames missed. |
| BistFail | COR | 6 | 10:5 | 0x0 | BIST Failure. Result of running built in self test on 4 internal RAMs. '0' - BIST passed '1' - BIST failed Bit allocation: 0 - Frame Store Buffer 1 1 - Frame Store Buffer 2 2 - Sub-sample Buffer 1, RAM 1 3 - Sub-sample Buffer 1, RAM2 4 - Sub-sample Buffer 2, RAM 1 5 - Sub-sample Buffer 2, RAM 2 |
| BistComplete | COR | 1 | 11 | b'0 | Bist Complete. When '1' indicates that BIST has completed. |
| AutoSleep-Stat | | 1 | 12 | b'0 | Auto Sleep Status. When '1' indicates that Callisto is in its low power state. |
| N/A | | 3 | 15:13 | | Not Used. |

Threshold Register—8 Bit

| Field | Width | Bits | Reset Value | Description |
|---|---|---|---|---|
| Threshold | 8 | 7:0 | 0x00 | Threshold value used in dynamic range expansion and thresholding process. Expressed as t/255 where t is the desired threshold level. Represented as a 0.8 fixed-point value. |

Unprocessed Image Size Register

This register is used to define the size of the region used in the unprocessed image read command.

Unprocessed Image Region Register—16 Bit

| Field | Width | Bits | Reset Value | Description |
|---|---|---|---|---|
| SizeX | 8 | 7:0 | 0x00 | Size - 1 of region in X direction. |
| SizeY | 8 | 15:8 | 0x00 | Size - 1 of region in Y direction. |

Processed Image Region Register

Defines the rectangular region to be used in the full processed image read command, and the sub-sampled image read command.

Image Region Size Register—32 Bit

| Field | Width | Bits | Reset Value | Description |
|---|---|---|---|---|
| TopLeftX | 8 | 7:0 | 0x00 | X coordinate of top left hand corner of region. |
| TopLeftY | 8 | 15:8 | 0x00 | Y coordinate of top left hand corner of region. |
| SizeX | 8 | 23:16 | 0x00 | Size - 1 of region in X direction. |
| SizeY | 8 | 31:24 | 0x00 | Size - 1 of region in Y direction. |

Image Sensor Window Register

This register defines the window used across the image sensor interface. Data outside of the defined window is "dropped," and not written into the frame store buffer.

Image Sensor Window Register—32 Bit

| Field | Width | Bits | Reset Value | Description |
|---|---|---|---|---|
| TopLeftX | 8 | 7:0 | 0x00 | X coordinate of top left hand corner of window. |
| TopLeftY | 8 | 15:8 | 0x00 | Y coordinate of top left hand corner of window. |
| SizeX | 8 | 23:16 | 0x00 | Size - 1 of window in X direction. |
| SizeY | 8 | 31:24 | 0x00 | Size - 1 of window in Y direction. |

Image Sensor Size Register—16 Bit

| Field | Width | Bits | Reset Value | Description |
|---|---|---|---|---|
| SizeX | 8 | 7:0 | 0x00 | Size - 1 of image sensor in X direction. |
| SizeY | 8 | 15:8 | 0x00 | Size - 1 of image sensor in Y direction. |

Capture Period Register—24 Bit

| Field | Width | Bits | Reset Value | Description |
|---|---|---|---|---|
| CapturePeriod | 24 | 23:0 | 0x00 | Defines the period of the capture signal in number of iclk cycles (t1). If set to zero then capture cycle is disabled. |

Expose Timing Register—32 Bit

| Field | Width | Bits | Reset Value | Description |
|---|---|---|---|---|
| Delay | 16 | 15:0 | 0x00 | Defines the delay (minus one) after capture before expose signal is asserted, in number of iclk cycles (t2). |
| HighTime | 16 | 31:16 | 0x00 | Defines how long (minus one) expose is asserted, in iclk cycles (t3). |

Flash Timing Register—32 Bit

| Field | Width | Bits | Reset Value | Description |
|---|---|---|---|---|
| Delay | 16 | 15:0 | 0x00 | Defines the delay (minus one) after capture before flash signal is asserted, in number of iclk cycles (t4). |
| HighTime | 16 | 31:16 | 0x00 | Defines how long (minus one) flash is asserted, in iclk cycles (t5). |

Chip ID Register—8 Bit

| Field | Width | Bits | Reset Value | Description |
|---|---|---|---|---|
| RamWidth | 8 | 7:0 | TBD1 | RAM Width. Identifies the width (minus 1, in bytes) of the frame store buffer. |
| BuffMode | 1 | 8 | TBD2 | Buffering Mode. This bit indicates whether the design uses single or double buffering:<br>0 - Single Buffering<br>1 - Double Buffering |
| Id | 7 | 15:9 | 0x00 | Chip Identifier. Identifies the design. Calliso's value is 0x00. |

1 RamWidth value is defined when the chip is manufactured, as is readable on reset.
2 BuffMode value is defined when the chip is manufactured, as is readable on reset.

Initialisation

After reset, Callisto is in a state where all of its configuration registers contain their reset values defined above; Callisto is disabled, making it unable to perform any image processing. It is not until the Enable bit in the configuration register is set to '1' after reset, by a register write, that Callisto begins performing any of its functions.

Before enabling Callisto by setting the Enable bit, any other fixed parameters should be set also. While Callisto is disabled, i.e. Enable is set to '0', Callisto does not process any commands or write image sensor data into its frame store, and only responds to register access messages.

Normal Operation

During normal operation Callisto is notified of new frames captured by the image sensor. These frames are written into Callisto's frame store buffer. The timing and triggering of image capture by the sensor is outside of Callisto's control. It is simply told when new frames are available. Once a captured image has been written to the frame store buffer, the user may ask Callisto to perform commands. This is done by sending Callisto a command message. Parameters for commands may be supplied with the command, in the message, or may be taken from a command-specific register. This second option saves the user having to keep defining parameters when they are issuing multiple commands with the same arguments. When parameters are sent with the command they are not persistently stored, i.e. they do not get written into the command-specific registers. Only an explicit register write can do this.

For commands that have long sequences of parameters, like the sub-pixel read command, the arguments are used as they arrive. Results are generated immediately, meaning that the results of a sub-pixel read command may start appearing on the serial interface before all the parameters (sub-pixel coordinates) have been received.

Frame Processing

The following pseudo code fragment highlights the steps involved in processing each frame. This code would be executed on the processor at the other end of the serial interface.

```
while TRUE loop
  sendMsg(readyForNewFrame);
  waitMsg(receivedNewFrame);
  processImage(frame);
  sendMsg(finishedProcessingFrame);
end loop;
```

Message Abutment

Commands that do not return any data immediately, such as register writes, may be positioned immediately after another command without the need for that command to have finished execution. Any command may be positioned immediately after another command which doesn't return any data. This section contains some pseudo-code segments to demonstrate this. Normally, a command must finish execution before the next command can be sent:

```
sendMsg(unprocessedImageRead);
// must wait for command execution to finish
waitMsg(unprocessedImageReadData);
registerRead.address = 0x01;
sendMsg(registerRead);
```

In this example, the code waits for the response of the unprocessedImageRead command before sending a request to execute a registerRead command.

Register Writes

Register writes take effect immediately after the message is received by Callisto so care must be taken to ensure that the write does not adversely affect any command in progress.

If a register write immediately follows another command there is no need to wait for its response:

```
sendMsg(unprocessedImageRead);
// no need to wait for command execution to finish
registerWrite.address = 0x03;
registerWrite.data = 0xff
registerWrite.length = 1;
sendMsg(registerWrite);
```

Frame Synchronisation

The FinishedFrameProcessing message does not generate a response so can be abutted against another command, typically the final command in processing a frame.

```
subPixelRead.xCoord[0] = 1.5;
subPixelRead.yCoord[0] = 2.75;
subPixelRead.xCoord[1] = 3.75;
subPixelRead.yCoord[1] = 3.5;
subPixelRead.xCoord[2] = 12.25;
subPixelRead.yCoord[2] = 27.75;
subPixelRead.numCoords = 3;
sendMsg(subPixelRead); // last processing command for current frame
// No need to wait
sendMsg(finishedFrameProcessing);
// Now must wait for sub-pixel data before ready for a new frame
waitMsg(subPixelReadData);
// Signal that we are ready to process a new frame
sendMsg(readyForNewFrame);
waitMsg(receivedNewFrame);
// Processing new frame can now begin
.
.
.
```

Writing Directly to Frame Store Buffer

During normal operation, data going into the frame store buffer comes from an image sensor on the image sensor interface. Callisto has a mode which allows the user to write directly to the frame store buffer. The example below shows writing two 10×10 frames into the frame store buffer.

When switching to direct frame store writing mode it is recommended that the following sequence of operations be used:

Reset Callisto;

Set WriteFrame bit in config register;

Set Enable bit in config register;

Begin writing to frame store.

```
configRegister = 0x00;
registerWrite.address = configRegister;
registerWrite.data[8] = 1; // set WriteFrame bit
sendMsg(registerWrite);
frameStoreWriteMsg.first = 1; // This is the first write of a frame
frameStoreWriteMsg.data = data[0];
sendMsg(frameStoreWriteMsg);
// Wait for the response
waitMsg(frameStoreWriteResp);
frameStoreWriteMsg.first = 0; // This is NOT the first write of a frame
frameStoreWriteMsg.data = data[1];
sendMsg(frameStoreWriteMsg);
// Wait for the response
waitMsg(frameStoreWriteResp);
frameStoreWriteMsg.data = data[2];
sendMsg(frameStoreWriteMsg);
// Wait for the response
waitMsg(frameStoreWriteResp);
.
.
.
```

-continued

```
// last word of the frame
frameStoreWriteMsg.data = data[24];
sendMsg(frameStoreWriteMsg);
// Wait for the response
waitMsg(frameStoreWriteResp);
.
.
.
// Write a new frame into frame store buffer
frameStoreWriteMsg.first = 1; // This is the first write of a frame
frameStoreWriteMsg.data = data[0];
sendMsg(frameStoreWriteMsg);
// Wait for the response
waitMsg(frameStoreWriteResp);
frameStoreWriteMsg.first = 0; // This is NOT the first write of a frame
frameStoreWriteMsg.data = data[1];
sendMsg(frameStoreWriteMsg);
// Wait for the response
waitMsg(frameStoreWriteResp);
frameStoreWriteMsg.data = data[2];
sendMsg(frameStoreWriteMsg);
// Wait for the response
waitMsg(frameStoreWriteResp);
.
.
.
// last word of the frame
frameStoreWriteMsg.data = data[24];
sendMsg(frameStoreWriteMsg);
// Wait for the response
waitMsg(frameStoreWriteResp);
```

Callisto Design

Architectural Overview

Figure 174:
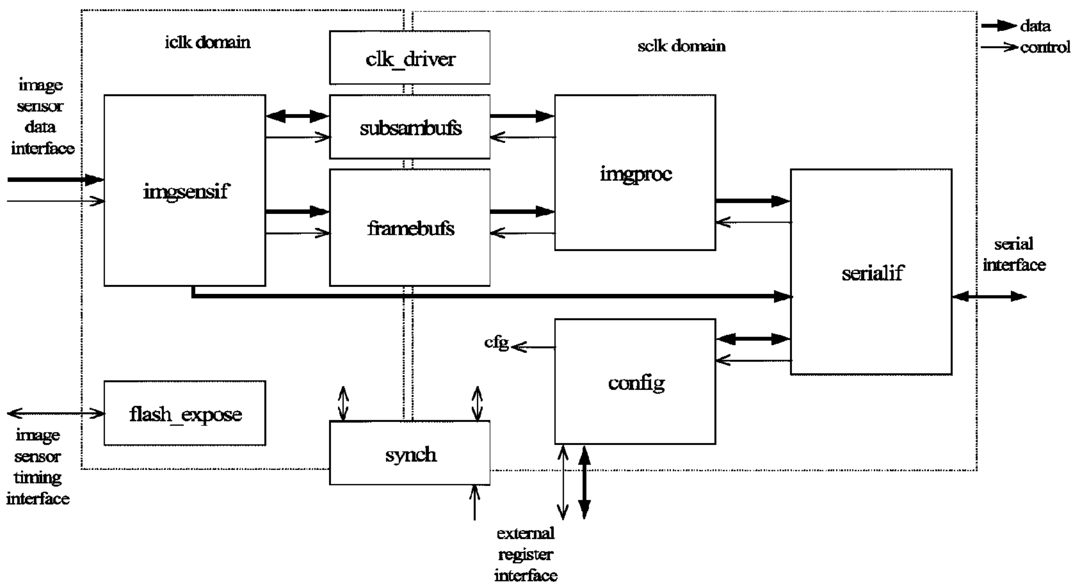

The architectural partitioning of the Callisto design is illustrated in FIG. 174.

Callisto Top-Level Partitioning

The serialif block performs all message reception, interpretation and transmission. Image command and register accesses received from the user are translated into single command instructions which are sent to the improc and config blocks. Subpixel image commands become a series of instructions, one for each coordinate pair. When a message is received that requires a response (image read or register read) the serial interface starts transmitting the message header. The improc and config blocks wait before outputting data to the serial interface to ensure the successful transmission of returning message header.

The config block contains all the configuration registers and the interface to the external registers. Register instructions are received from the serialif block and read data is returned as a rate adapted (at the serial interface bandwidth) byte stream.

The improc block controls the image reading functions. It receives a command instruction from the serialif block and performs SRAM reads from either the subsambufs or framebufs blocks. For subpixel and processed read commands, this data is processed before being passed to the serialif block. For unprocessed and subsampled reads, the raw RAM data is sent to the serialif block. The output data is a rate adapted byte stream.

The framebufs block provides double buffered storage for the raw image data. Bytes are written into the frame store buffer from the imgsensif block, and bytes are read by the imgproc block. The subsambufs block provides double buffered storage for the subsampled image data, which is derived from the incoming image sensor interface. The loading of subsampled data by the imgsensif block involves a read-modify-write operation. This is due not only to the subsambuf word size (70 bits), but also the subsampled value calculation sequence. The wide word size is required to maximize txd utilization during a processed image read. The imgproc block reads from the subsambufs block whilst executing either a subsampled image read or processed image read.

The imgsensif block receives data from the image sensor interface and controls the writing into both the framebufs and subsambufs blocks. It manages the double-buffering swapping mechanism, image windowing and the image data subsampling calculations. Rate adapted image sensor data is passed directly to the serialif during test mode (ten).

The clk_driver block controls the generation of all internal clocks. s_clk and i_clk are the persistent clocks for the serial and image domains respectively. sq_clk and iq_clk are their low-power equivalents and are disabled whenever possible. For the double buffered design, rq_clk[1:0] are the clocks controlling the two swapping SRAM buffers and are also disabled whenever possible. The single buffered design has a single rq_clk[0].

The synch block synchronizes signals crossing the iclk/sclk boundary.

The flash expose block generates the image sensor timing interface signals flash and expose.

cLk_driver

Figure 175:
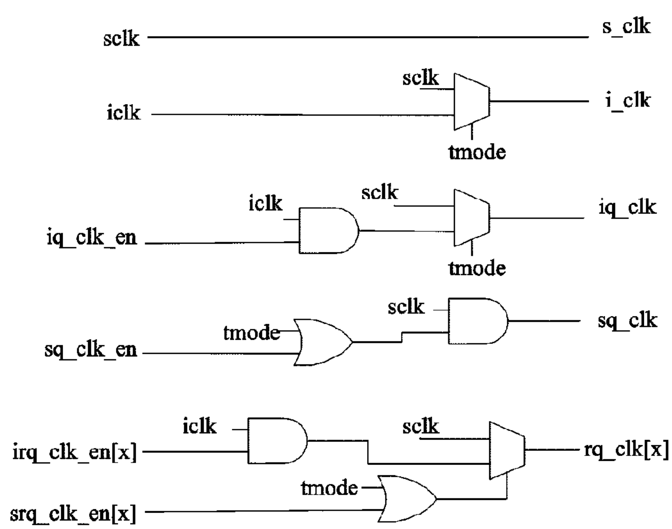

The clk_driver block drives all the internal clocks used in Callisto. Clock muxing and disabling is performed in this block for the iq_clk, sq_clk and rq_clk[1:0] clocks. Clock enable signals (generated in the serial interface and image sensor circuits) are sampled on the negative edge of their driving clock to avoid glitching during disabling/swapover. When the test mode signal (tmode) is asserted all gated clocks are sourced from sclk to enable successful scan and RAM BIST testing. For architectural details regarding clocking strategy see Section. The clock generation logic is illustrated in FIG. 175.

config

The config block contains the configuration registers and drives/receives the signals of the external register interface.

The configuration registers are stored in a single hierarchial type, indexed via the register address. The cfg signal which is output from this block is a flattened type, allowing for easier use. The status register, due to its clear-on-read nature is a special case. At the start of a status register read operation, a snapshot of the register is taken. At the same time the register is cleared and then immediately updated with any events from the current clock cycle. This sequence ensures that no events are missed during the read-clear operation. The snapshot value is then used as the read value.

Figure 176:
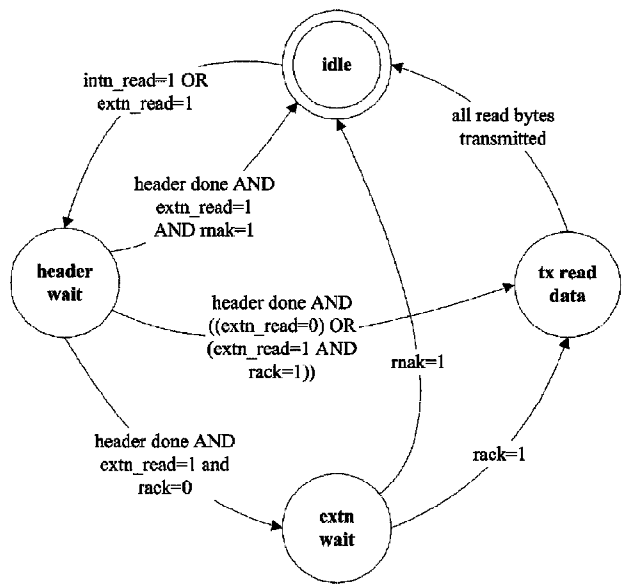

The register_read state machine and associated counter control the read data output. This state machine manages: message header delay; external/internal read delays; variable number of output bytes; the serial interface byte timing; and the reg_read_done output signal. This state machine is illustrated in FIG. 176.

Figure 176A:
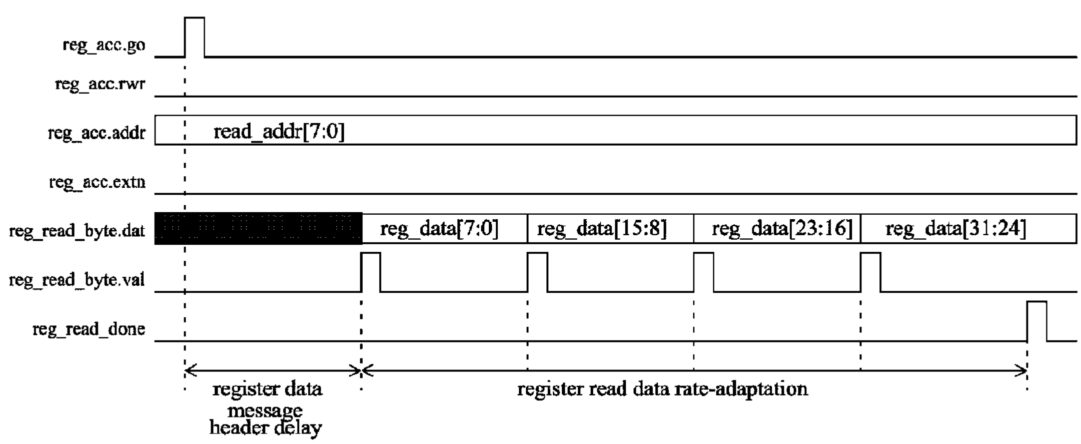

Read data bytes are output from the config block with a fixed cadence of 1 valid byte every ten clocks to match the serial interface data rate. This concept is illustrated with a four byte register read operation in FIG. 176*a*.

All external register interface outputs are registered before being output. The (already synchronized) s_rack and s_rnak signals are used to validate the external register interface inputs. The detection of s_rnak asserted is interpreted as an illegal external address error.

serialif

Figure 177:
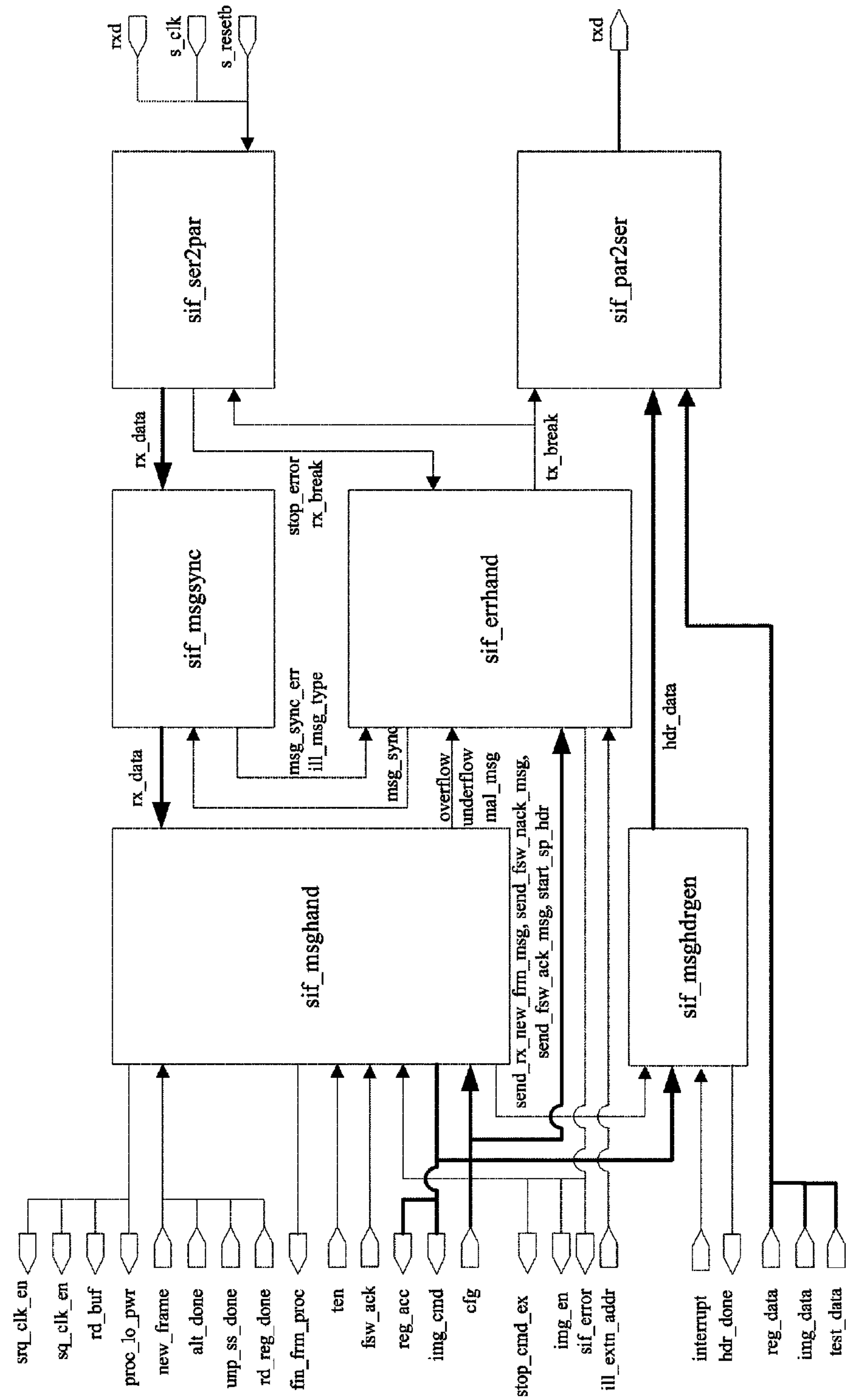

The serialif is a structural block that performs serial interface message reception and transmission. The basic structure of this block is illustrated in FIG. 177.

The serial data received is first converted into bytes by the sif_ser2par block. This byte is then delineated into messages by the sif_msgsync block. The messages are then interpreted by the sif_msghand block. The sif_msghdrgen generates the headers for transmitted frames. The sif_par2ser block converts the byte streams from the sif_msghdrgen, config and imgproc blocks into a serial bit stream. The sif_errhand block collects and collates all the error messages received by the various serial interface blocks, and controls the serial interface error recovery process.

sif_ser2par

Figure 178:
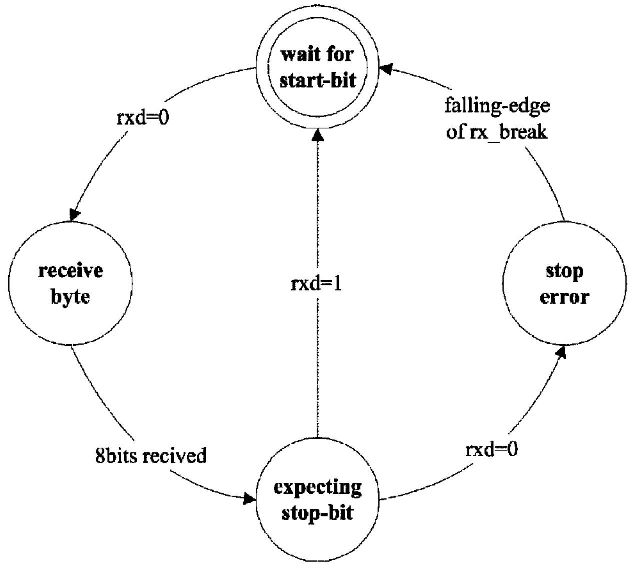

The sif_ser2par block receives the serial bit stream and delineates each byte based on the start and stop bits. On successful delineation the byte is output with an associated valid flag asserted for a single cycle. If rxd is detected to be held low for 10 consecutive cycles (whilst tx_break is asserted) the rx_break_status signal is asserted. This signal is negated when rxd is asserted. If a stop-bit is not found where expected, the start_stop_error signal is asserted. FIG. 178 illustrates the ser2par state machine used to control the serial to parallel conversion.

sif_msgsync

Figure 179:
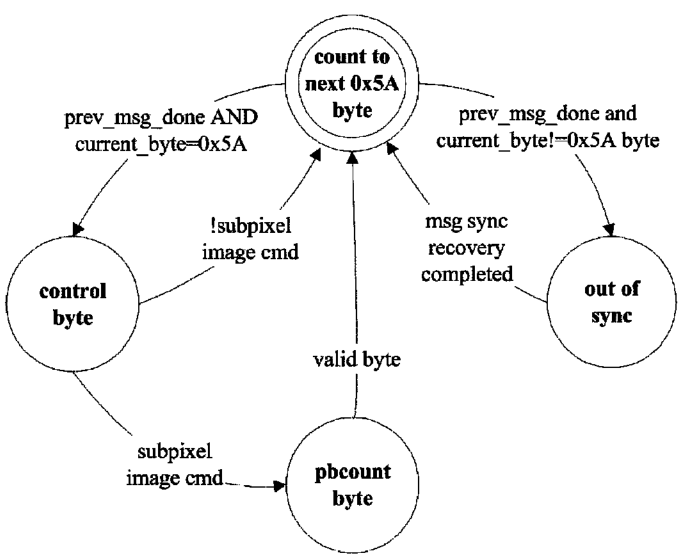

The sif_msgsync block performs message delineation. The message marker byte (0x5A) is used to obtain and check delineation. The message control byte and subsequent argument bytes are used to determine the message length. The msg_sync state machine and associated byte counter is used to control and track the delineation state. This state machine is illustrated in FIG. 179. The output data is simply a registered version of the input data, with the addition of a control byte flag bit. The message_sync_error output signal is a single-cycle pulse that is asserted when delineation is lost.

sif_msghand

Figure 180:
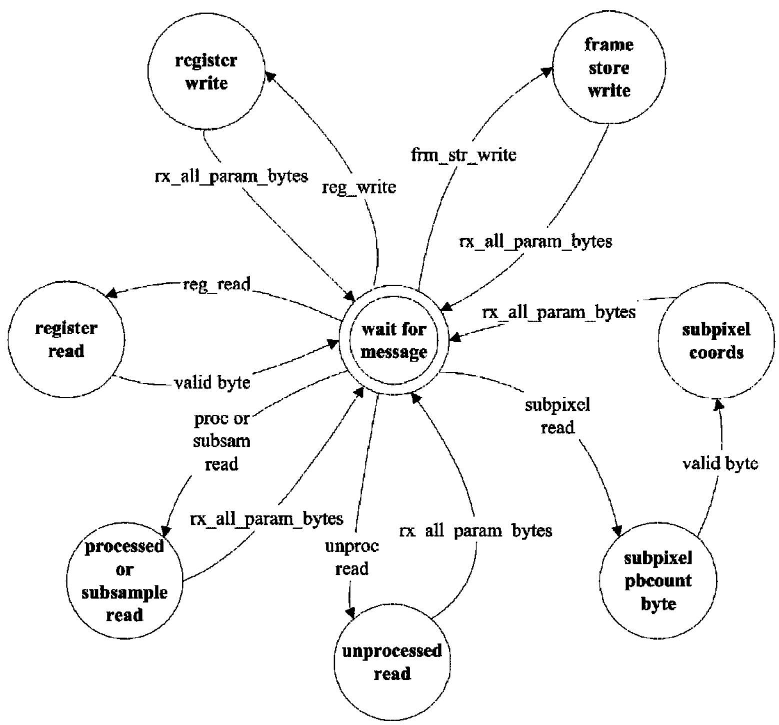

The sif_msghand block performs received message handling. It interprets the message control byte and any subsequent argument bytes. Malformed messages are deleted and an error signal generated (used by the config block). Valid messages are converted into command words. The msg_hand state machine and associated counters control this operation and this state machine is illustrated in FIG. 180.

Figure 181:
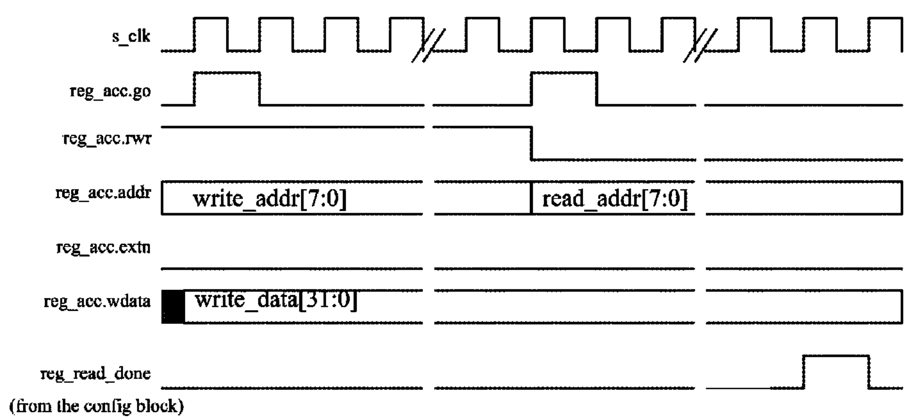

Each register access is translated into a single command word on the reg_acc bus. In addition to the rwr, addr, extn and wdata signals the reg_acc bus has a go signal which indicates the start of a valid access. For register read accesses the reg_read_done signal is returned by the config block indicating that all the read data has been sent to the par2ser block, this enables command overflow error detection. A register write followed by a register read operation is illustrated in FIG. 181.

Figure 182:
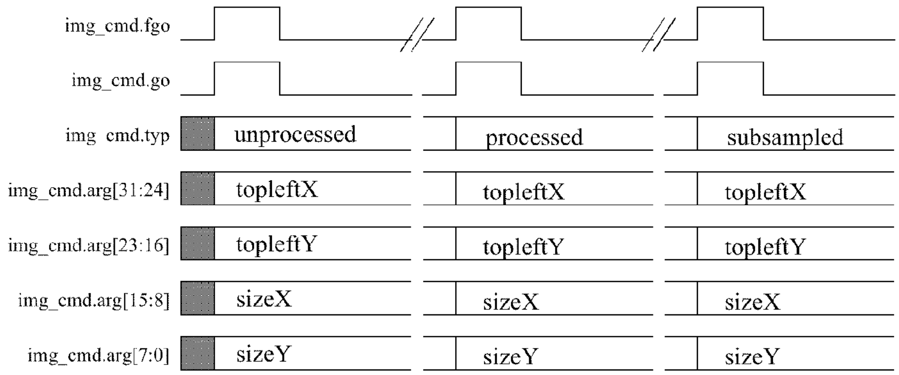
Figure 183:
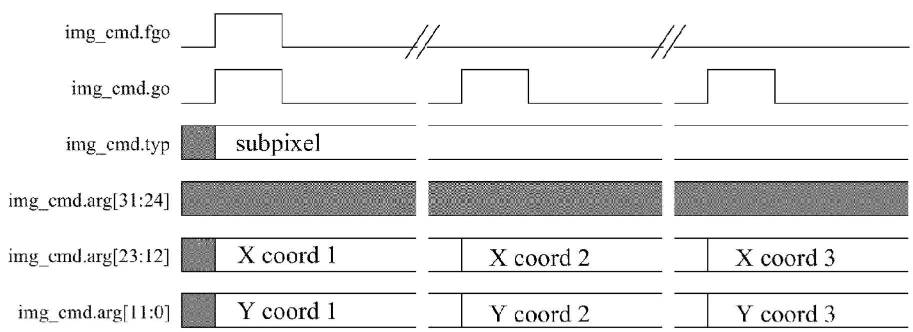
Figure 184:
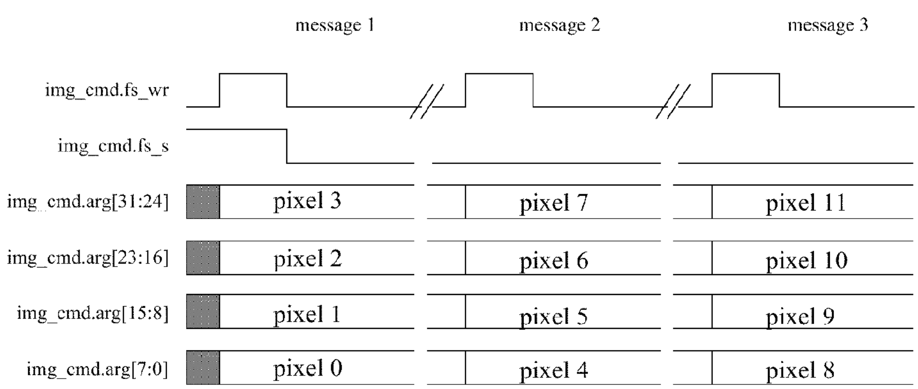

Each image command is translated into a single command word on the img_cmd bus. The subpixel command is the only exception; this command is translated into a series of command words, one for each sub-pixel coordinate (x,y pair). The img_cmd bus consists of six different fields: typ, arg, fgo, go, fs_s and fs_wr. The typ field indicates the image command type. The arg field is a 32-bit bus which carries all the parameter information (topleftX, etc.), this field is loaded with the configuration register values on reception of the message control byte, and then over-written with any message parameters. For non-subpixel image read commands the go and fgo bits are identical and indicate the previously mentioned typ and arg fields of the img_cmd bus are valid and an image read can start. For subpixel image commands the fgo bit flags the first coordinate pair of a command and the go bit indicates the first and subsequent coordinate a pairs for that command. The fs_wr bit (active for a single-cycle) indicates the current data in the arg field part of a direct frame store write. The fs_s bit indicates the start of a frame store write sequence. A sequence of unprocessed, process and subsampled image reads is illustrated in FIG. 182. A subpixel image read command is shown in FIG. 183. FIG. 184 illustrates a direct frame store write sequence.

Figure 185:
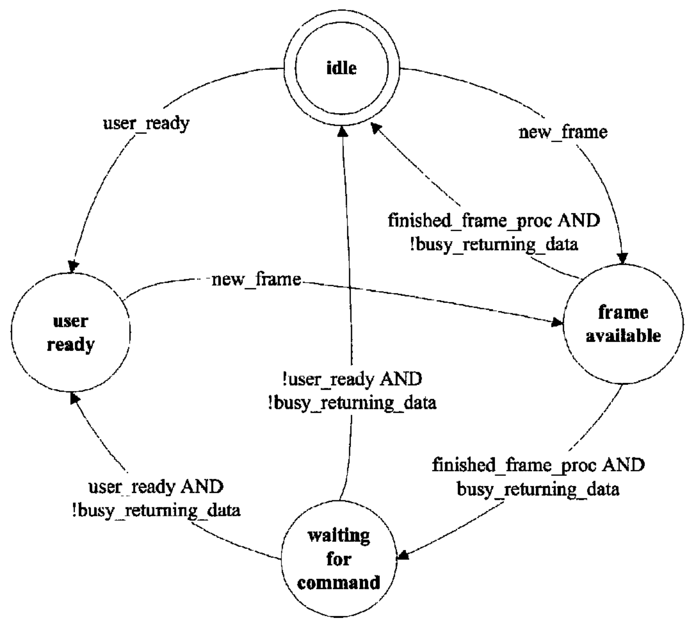

Frame handshaking is also performed by the sif_msghand block. This mechanism controls the generation of the send_rx_new_form_msg signal (used by the sif_msghdrgen block), the fin_form_proc pulse (used by the sens_ctrl block) and the clock enables for sq_clk and rq_clk[1:0]. The frame_handshaking state machine which is illustrated in FIG. 185.

In addition the sif_msghand block also detects and flags the following message related errors: malformed_msg, cmd_overflow, img_dat_underflow, fsw_nack.

sif_msghdrgen

The sif_msghdrgen block generates the transmitted message header bytes for image read commands, register read commands, frame_sync and frame_store_write_ack messages. This is done by monitoring the commands issued by the sif_msghand block and generating the appropriate message header when it detects either an image read or register read.

The sif_msghdrgen block also generates complete framesync and frame-store-write-ack messages based on the send_rx_new_frm_msg, send_fsw_ack_msg and send_fsw_nack_msg signals respectively. The hdr_done signal is generated and used by within the imgproc block to indicate that the message header has been sent and image data is able to be transmitted.

Figure 186:
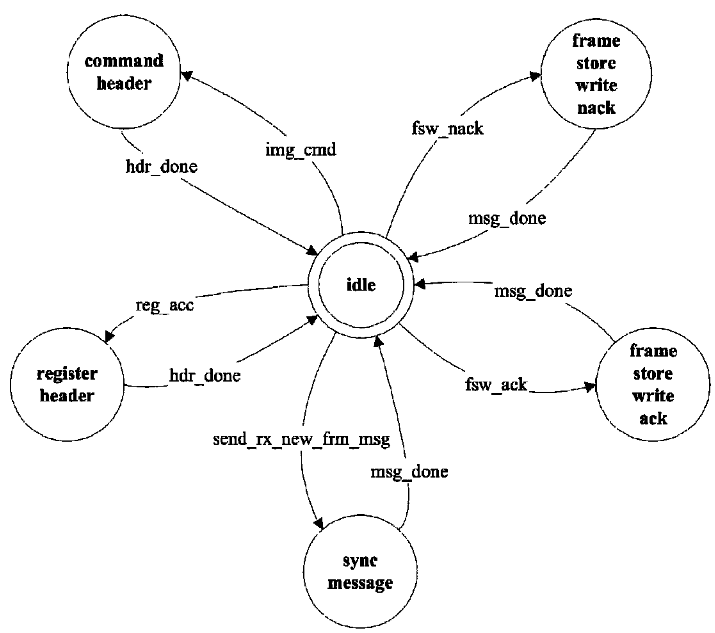

The header_generation state machine and associated counters control the generation of the message headers. This state machine is illustrated in FIG. 186.

For image data messages a two-byte message data byte count field is calculated. For image commands, the number of returned image data bytes is calculated using the command arguments (parameters). This involves a size_x by size_y multiplication for the image pixel read commands, and a division by 3 for the subpixel read command. The number of data bytes returned in a register read message is determined via a lookup based on address and whether the register is internal or external.

Message header bytes are output from this block with a fixed cadence of 1 valid byte every 10 clock periods to match the serial interface data rate.

sif_par2ser

Figure 187:
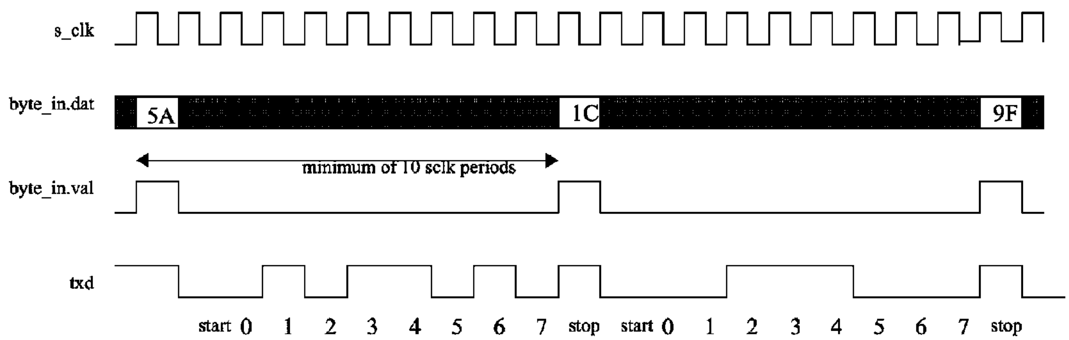

The sif_par2ser block accepts message header, register, stored image and direct image sensor data bytes and converts them to a serial bit stream. When the tx_break input is asserted, normal operation is overridden and the txd output held at logic zero. When tx_break is negated txd is held high until the first valid byte is received, at which point normal operation resumes. It is assumed that only one of the four data sources: message header, register read data, stored image data and direct image sensor data is active at any one time, and that the arriving byte streams are rate-adapted at the serial interface rate of one valid byte every ten sclk periods. This is illustrated in FIG. 187.

Figure 188:
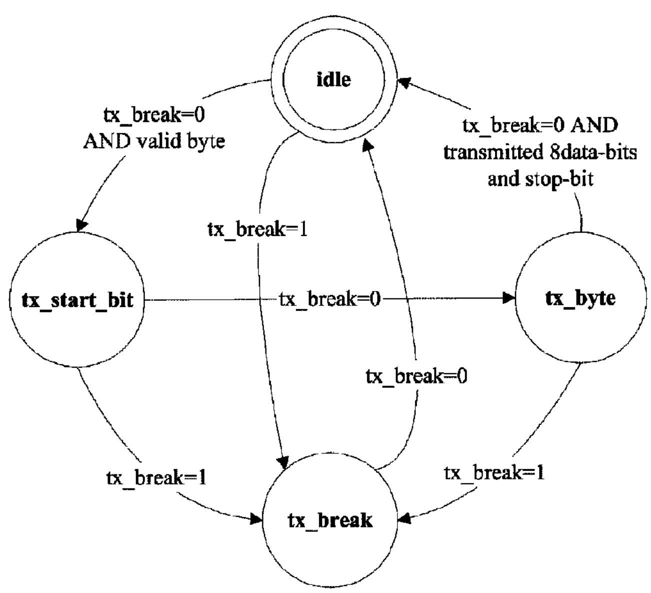

The sif_par2ser samples a valid byte, and the par2ser state_machine and associated counter is used to control generation of the txd sequence: start-bit, serial-bit stream, stop-bit, and any possible tx_break conditions. This state machine is illustrated in FIG. 188.

sif_errhand

Figure 189:
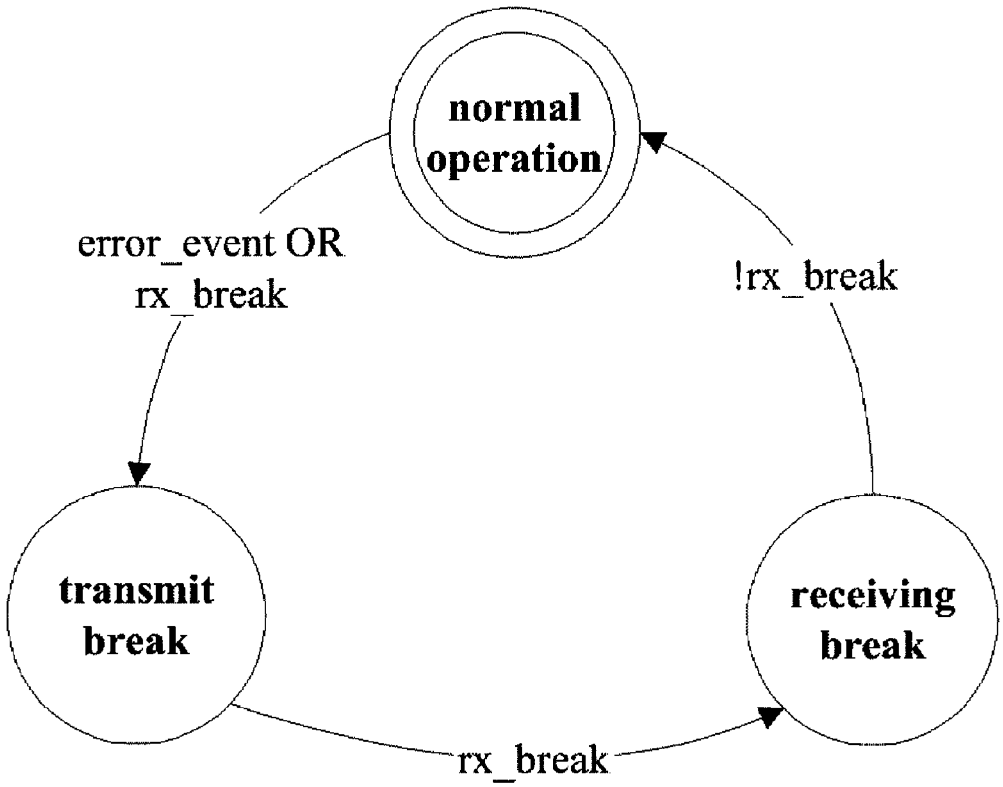

The sif_errhand block performs the error protocol management for the serial interface. The error_handler state machine controls the error recovery process. This state machine is illustrated in FIG. 189.

All serial interface errors are input to the sif_errhand block and collated into the sif_error output signal which is then passed to the config block.

Several error related output signals are generated. The stop_cmd_exec signal is a pulse used by the image processing blocks to abort all command processing. The msg_sync_status signal indicates whether the serial interface is in message synchronization. The tx_break signal indicates that the serial interface should transmit the break sequence.

imgproc

Figure 190:
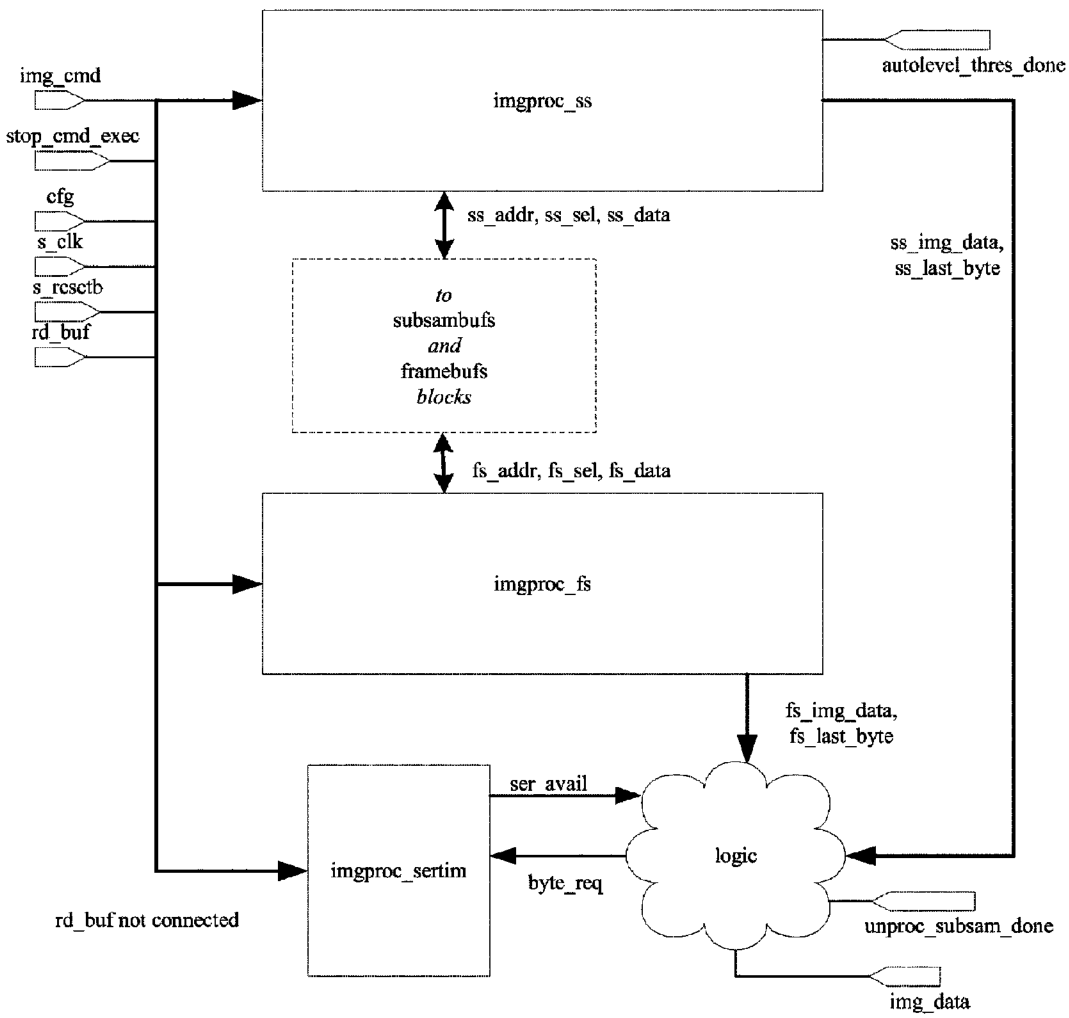

FIG. 190 shows a structural block containing the four image processing functions.

Note that the block 15078 is not internal to the imgproc block: it is shown here only to indicate the connectivity to the subsambufs and framebufs blocks.

imgproc_fs

Provides the 'Unprocessed Image Read' function and the 'Sub-pixel Read' function.

The 'Unprocessed Image Read' function scans the region provided in the img_cmd—returning one byte for each pixel in the region.

Figure 191:
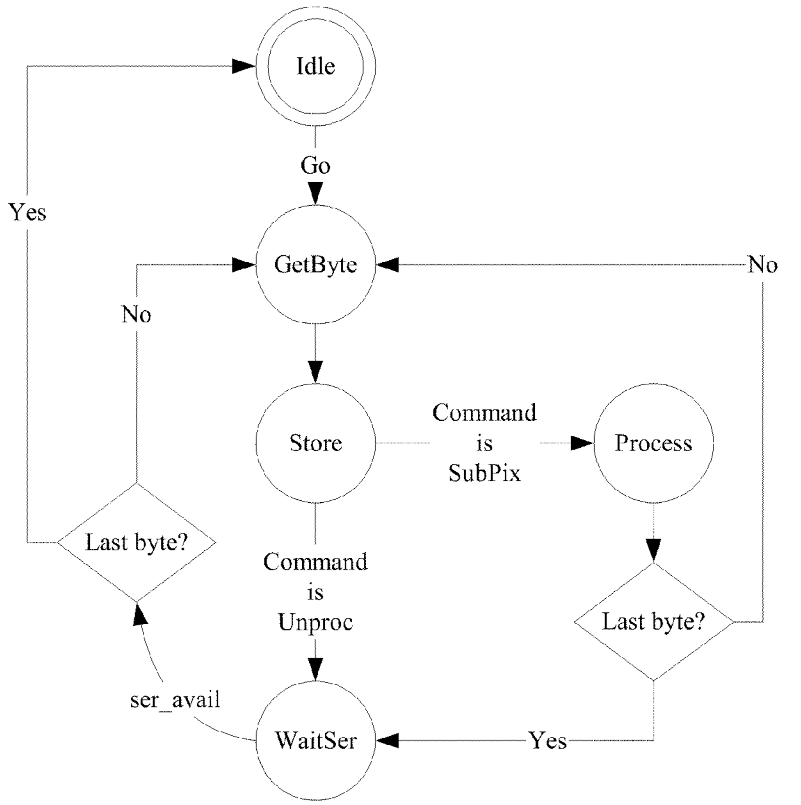

The 'Sub-pixel Read' function re-uses some of the same code—it gets the four pixels required by scanning a 2-by-2 region in the same way as 'unprocessed image read' scans a region, except that it manipulates and accumulates the data on the way and returns only one byte per "region". Its state machine is shown in FIG. 191.

Unprocessed Image Read (Function)

For the Unprocessed Image Read function, the Go indication loads counters to produce (x,y) coordinates for the region. The GetByte state is transient and generates an address to the frame buffer. In the Store state, the resulting pixel is stored and the WaitSer state entered. When ser_avail goes active, a byte request, along with the byte, is immediately output. If we are at the end of the region, we return to the Idle state. Otherwise, we update all the counters, moving to the next row if required, and go back to the GetByte state.

Sub-Pixel Read (Function)

For the Sub-Pixel Read function, the Go indication loads counters to produce (x,y) coordinates for the 2×2 region with the top left of the supplied coordinate.

The GetByte state is transient and generates an address to the frame buffer.

The Store state is also transient—storing the pixel locally for further processing in the Process state, which performs the weighting function on each pixel as it arrives.

After the Process state, if the last pixel has been processed, the resulting sub-pixel value is stored and the WaitSer state entered. When ser_avail goes active, the byte is sent to the serialif block and the Idle state is entered, because we only ever send out one result per region—the Last Byte status is remembered from the Process-to-WaitSer transition.

imgproc_ss

Provides the 'Sub-sampled Image Read' function and the 'Processed Image Read' function.

Sub-Sampled Image Read (Function)

The 'Sub-sampled Image Read' is highly similar to the 'Unprocessed Image Read' function, except some multiplexing is required to get the single byte of data out of the 8-bytes returned from the sub-sample buffer.

Processed Image Read (Function)

The 'Processed Image Read' function is the most complicated of all the functions. The required output is a stream of 1-bit pixel values for a specified region. The pixel order is row-by-row, and left to right within each row, with each row's pixels padded out into an integer number of bytes.

Figure 192:
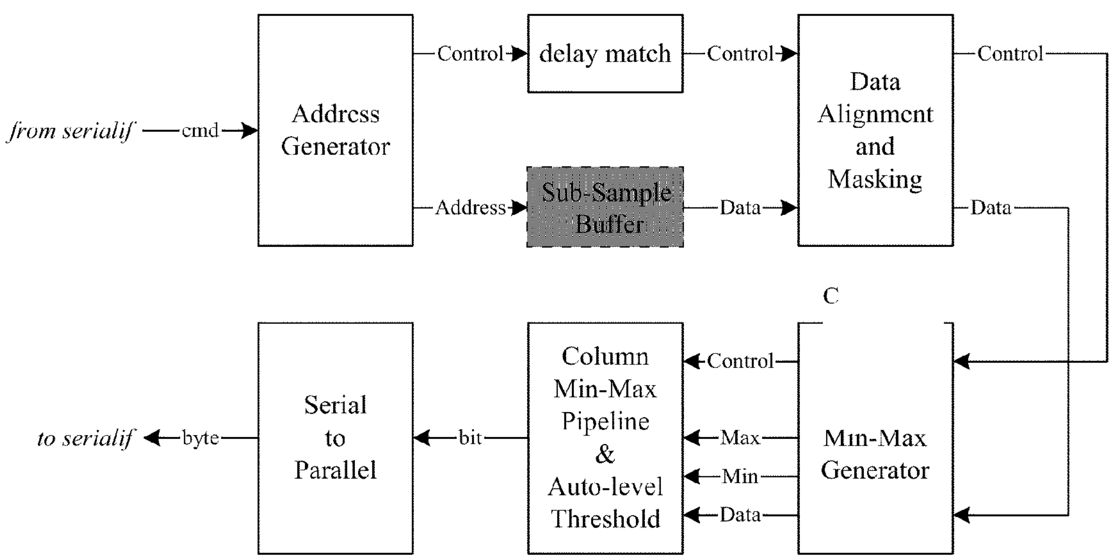

FIG. 192 below shows the sub-functions of the function. Note that the Sub-Sample Buffer is shown here only to show the cadence of the data.

Address Generator sub-function

The algorithm for producing a stream of range-expanded and thresholded pixels in this order involves scanning across each row of the requested region, starting each row from 2 columns before the LHS of the region and ending 2 columns past the RHS of the region. The two rows above and two below are automatically returned for each address generated, so there is no need for these extra rows to be explicitly addressed.

Control info is passed ahead that indicates; which five bytes to use from the eight returned; whether to pad this bit; whether this column is valid; whether or not the first two rows are valid; whether or not to generate a bit for this pixel; and when to send a full byte.

Delay Match sub-function

Since the Sub-Sample Buffer returns data in the next cycle, the control info that matches the data must be delayed by one cycle.

Data Alignment and Masking sub-function

Takes the 8 bytes from the Sub-Sample Buffer and selects the appropriate 5 rows. Also invalidates bytes that are not wanted in the min-max calculation.

Column Min-Max Generator sub-function

Figure 193:
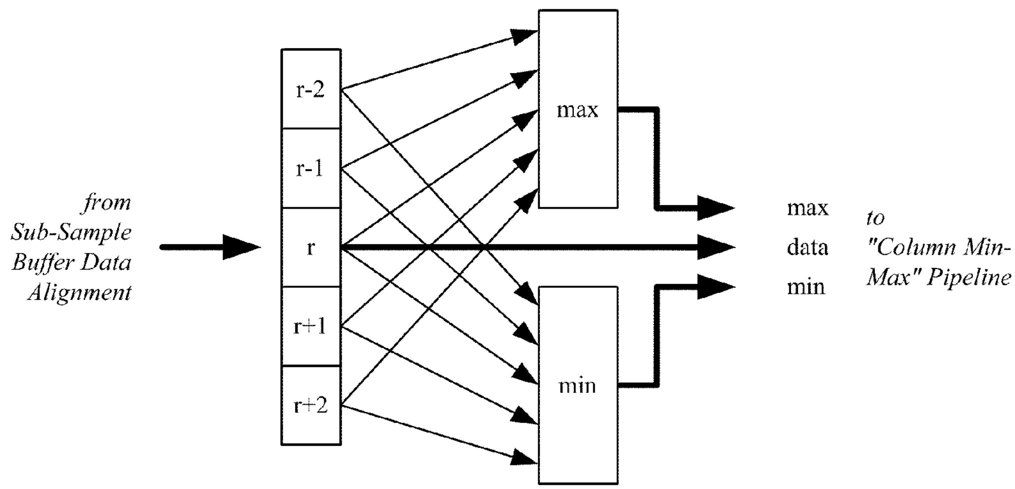

At each column, the pixel data and the two bytes above and below are processed to give the min and max values over that 5-byte column—this is shown in FIG. 193.

Column Min-Max Pipeline and Range-Expand and Threshold sub-function

Figure 194:
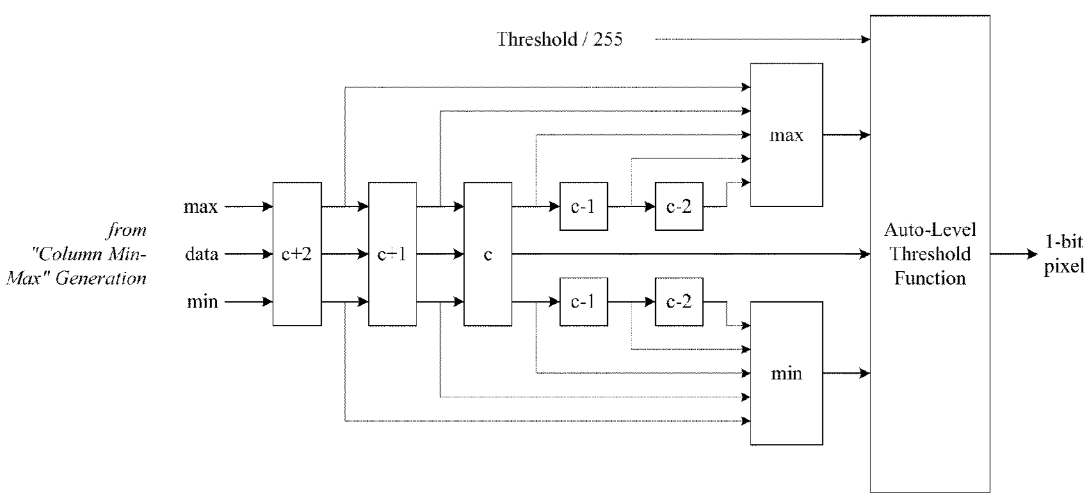

These min, max and pixel values are pushed together into a pipeline with the four previous min-max-pixel values. These five pipelined values are then min-maxed to find the min and max over the 5-by-5 region centred around the pixel in the middle of the pipeline—this is shown in FIG. 194.

Because we can read all five bytes for a column in a single cycle, once the pipeline is full, we can produce one auto-level-threshold pixel value per cycle for every cycle after that.

Serial-to-parallel sub-function

Bits are just shifted into an 8-bit shift register and the resulting byte sent to the serialif when requested by the address generator—remembering that the address generator controls the cadence for the entire block; including the output byte stream to the serialif.

Handing out-of-bounds pixels

When parts of the 5×5 threshold region fall outside the window, these parts need to be excluded from the min-max calculation. This is all controlled at the Address Generator.

a. Top Side

When the row being thresholded is either row 0 or 1, then the two byte rows above the thresholded row in the return value are individually masked as required.

b. Bottom Side

As each row is written from the image sensor side, all the byte lanes lower than the actual one being written are also written with that same value. This means that the last row is duplicated at least two extra times, and these duplicated rows can be used in the min-max calculation without affecting the min-max result.

c. Left Side

The final decision is not made yet—one possibility is to allow negative X values and mask the entire 5-byte result from the min-max calculations if X<0. Another would also allow negative X values, but overwrite the X value in the address calculation to zero if X<0.

d. Right Side

The X coordinate of the current read will be checked against the window width and the resulting 5-bytes masked if it is outside the window.

Padding the output byte

When the width of the region is not divisible by 8, padding bits are added at the end of the byte. The process that sweeps across the row actually acts as if the width was divisible by 8, but supplies an extra bit into the pipeline to tell the final stage of the range-expand and threshold function to use the configured padding bit instead.

Achieving 100% throughput

Due to the requirement to pad the output stream to 8-bits at the end of each row, I will only talk here in terms of possible utilization of the output serial bus, and not the throughput in terms of true, useable data.

The output serial bus will only be less than 100% utilized when the region width is 8 pixels or less.

To achieve 100% throughput across the serial interface, the range-expand and threshold function needs to output (on average) 8 bits every 10 clocks.

During the bulk of long rows, this is not a problem. Once the pipeline has been filled, the range-expand and threshold function can output one bit per cycle. In fact, we have to slow it down to produce only eight bits every ten cycles.

On the other hand, there are two dead cycles at the start of and at the end of each row—so between rows there are four dead cycles.

Figure 195:
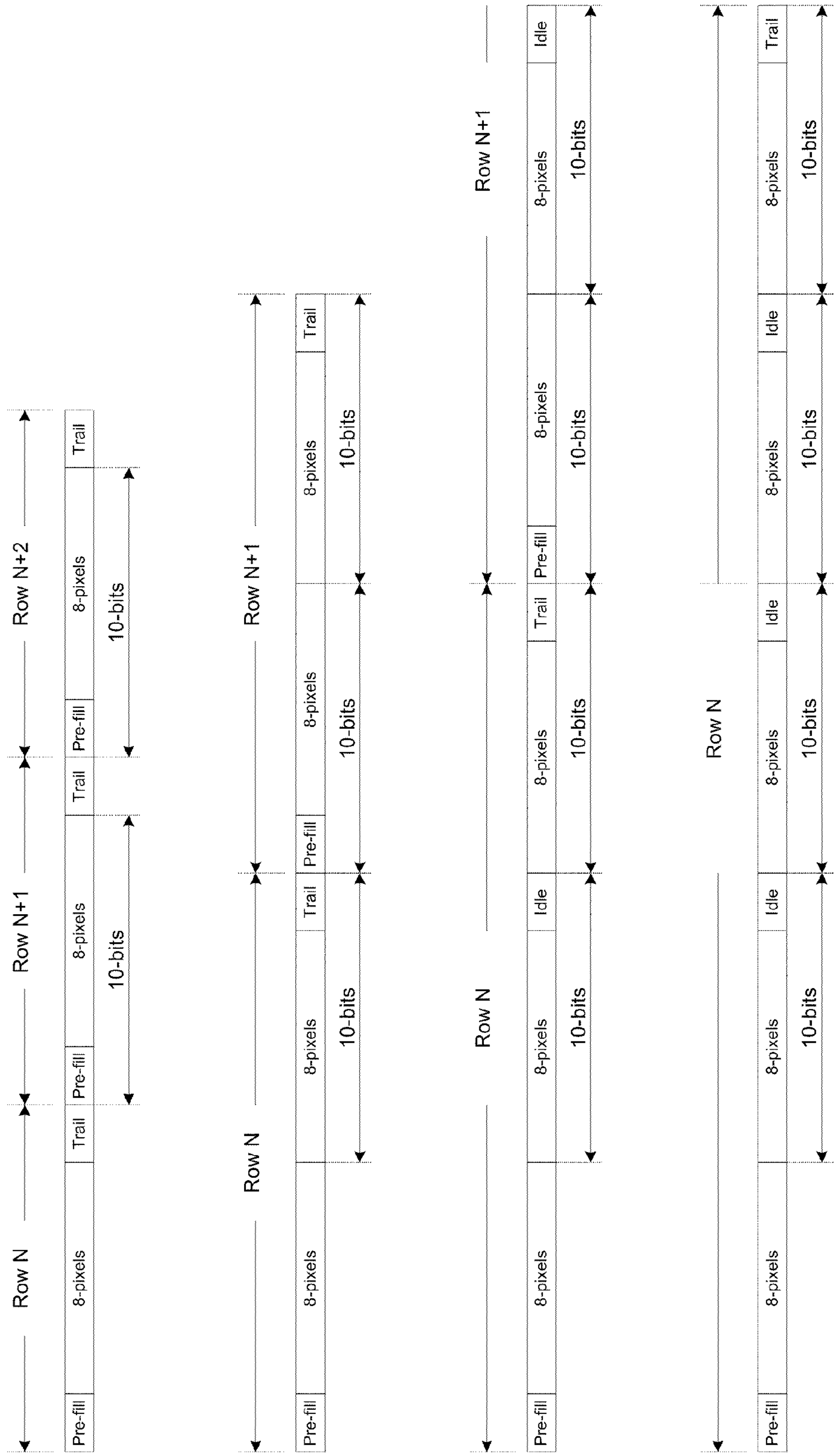

Noting from before that the address generator always produces a row bit-stream that is divisible by 8, we see how the output bitstream progresses for region widths of 8, 16, 24 and 40 pixels. See FIG. 195.

This figure shows the cadence of the bytes arriving at the centre of the pipeline (see FIG. 194), and the 10-bit output cadence each 8-bit block.

The 2-cycle Pre-Fill state indicates the pipeline receiving the max-min values of the two columns to the left of the first pixel in the region. Similarly, the 2-cycle Trail state indicates the two columns to the right of the last pixel in the row passing through the centre point as the pipeline is flushed. Note that the Trail state is followed immediately by a new Pre-fill state: the data for the next row follows right behind the previous row.

The 2-cycle Idle state is used periodically to stop the input data rate exceeding the output rate. The blocks of 10-bits show how the 8-bit data just collected is output to the serial port. Because the serialif block takes data in 8-bit chunks in a single cycle, then serializes it over 10 cycles, there is no need for a FIFO as such, just a shift register. The address generator ensures that the shift register will never overflow.

imgproc_sertim

The imgproc_sertim block provides the serial timing for the output byte stream, independent of the serialif. It is used by the imgproc_fs and imgproc_ss blocks.

This block thus must be 'tuned' to the operating parameters of the serialif block. It basically provides an initial hold-off time at the start of each 'fgo' (first-go) for the serialif to send the response pre-amble, then allows one byte out every 10 cycles.

The imgproc_sertim state machine is shown in FIG. 196. Notes for the state machine are as follows:

1. FirstGo—This is the 'fgo' field of the image command from the serial_if. This basically says: "Wait for the serial_if to end out a command header before you start".
2. When stop_img_cmd='1', this acts as a global reset and overrides other transitions.

3. The ser_avail output is '1' only during the ProcByte state. The ByteRequest may come immediately (in the same cycle), so this state may only last for one cycle.
5. The HdrWait state will last for 30 cycles. The WaitSer state will last for 9 cycles, and when added to the minimum one ProcByte state, we get the required 10 cycles for every byte.

framebufs

Structural block that instantiates either one or two framebuf blocks, depending on the buffering generic passed to it.

It makes sure the correct buffer is accessed by the imgsensif and imgproc blocks.

The two rq_clks are each directed to their respective buffers.

The two blocks (imgsensif and imgproc) accessing the frame buffers each provide two memory enable (sens_me(1:0) and user_me(1:0)) signals, one for each buffer. The framebufs block just directs each enable signal to each individual framebuf block, while all other inputs are simply connected to both blocks. For example, sens_me(1) is connected to the sens_me port of framebuf_1.

This block also multiplexes the two sens_dout output buses from each buffer onto the higher level sens_dout. It does likewise for user_dout.

Each block ensures that only one of its' enable signals is set at a time, and the higher layer protocol ensures that the two blocks don't clash with each other.

At this point the fs_width generic is used to calculate the size of each framestore buffer RAM (in bytes). This value is passed down as a new generic mem_size.

framebuf

Structural block that instantiates the RAM required for a single frame buffer. Provides write only access for the imgsensif block and read only access to the imgproc block.

fs_ram_bist

This block provides an fs_ram and a BIST block to test it.

RAM bypass is also provided here—the din, addr, en and we signals are concatenated, zero extended to the next 8 bit boundary, chopped into 8 bit chunks and XORed to provide a final 8-bit value. This value is muxed onto the dout port when tmode is active.

Note that two are required per subsambuf block, to provide 70-bit wide access.

fs_ram

This block provides a wrapper around the fs_asic_ram.

It is assumed that the fs_asic_ram is 32 bits wide, with 4 individually writable byte lanes. This block converts to the 8-bit accesses of the main design to 32-bit RAM accesses, and back again. It also converts the VHDL unsigned types of the main design with the std_logic_vector types of the fs_asic_ram.

This block may need to be recoded depending on the final RAM implementation.

fs_asic_ram

This is the component that must be replaced with the actual silicon RAM.

It is assumed to be single-port, synchronous and 32-bits wide with four independently writeable byte lanes. It's size (in bytes) should be at least fs_width**2, where fs_width is the Callisto top level generic.

subsambufs

Structural block that instantiates either one or two subsambuf blocks, depending on the buffering generic passed to it.

The two rq_clks are each directed to their respective buffers.

The two blocks (imgsensif and imgproc) accessing the subsample buffers each provide two memory enable (sens_me(1:0) and user_me(1:0)) signals, one for each buffer. The subsambufs block just directs each enable signal to each individual subsambuf block, while all other inputs are simply connected to both blocks. For example, sens_me(1) is connected to the sens_me port of subsambuf_1.

This block also multiplexes the two sens_dout output buses from each buffer onto the higher level sens_dout. It does likewise for user_dout.

Each block ensures that only one of its' enable signals is set at a time, and the higher layer protocol ensures that the two blocks don't clash with each other.

subsambuf

A structural block that instantiates the RAM required for a single sub-sample buffer. It provides read/write access for the imgsensif block and read only access to the imgproc block.

The address manipulation and data multiplexing is provided at this level.

ss_ram_bist

This block provides an ss_ram and a BIST block to test it.

RAM bypass is also provided here—the din, addr, en and we signals are concatenated, zero extended to the next 35 bit boundary, chopped into 35 bit chunks and XORed to provide a final 35-bit value. This value is muxed onto the dout port when tmode is active Note that two are required per subsambuf block, to provide 70-bit wide access.

ss_ram

This block provides a wrapper around the ss_asic_ram. It provides no other function than to convert the VHDL unsigned types of the main design with the std_logic vector types of the ss_asic_ram.

This block may need to be recoded depending on the final RAM implementation.

ss_asic_ram

This is the component that must be replaced with the actual silicon RAM.

It is single-port, synchronous and 35-bit wide. It's minimum size is determined by the Callisto top level generic fs_width, and is calculated as follows:

$$ss\_width=int((fs\_width-1)/3)+1$$

$$ss\_height=int((ss\_width+4-1)/8)+1$$

$$ss\_mem\_size(min)=ss\_width*ss\_height$$

where int(x) is the integer part of a real number x.

See the ss_mem_size_f( ) function in the imgsensproc VHDL package.

imgsensif

Figure 197:
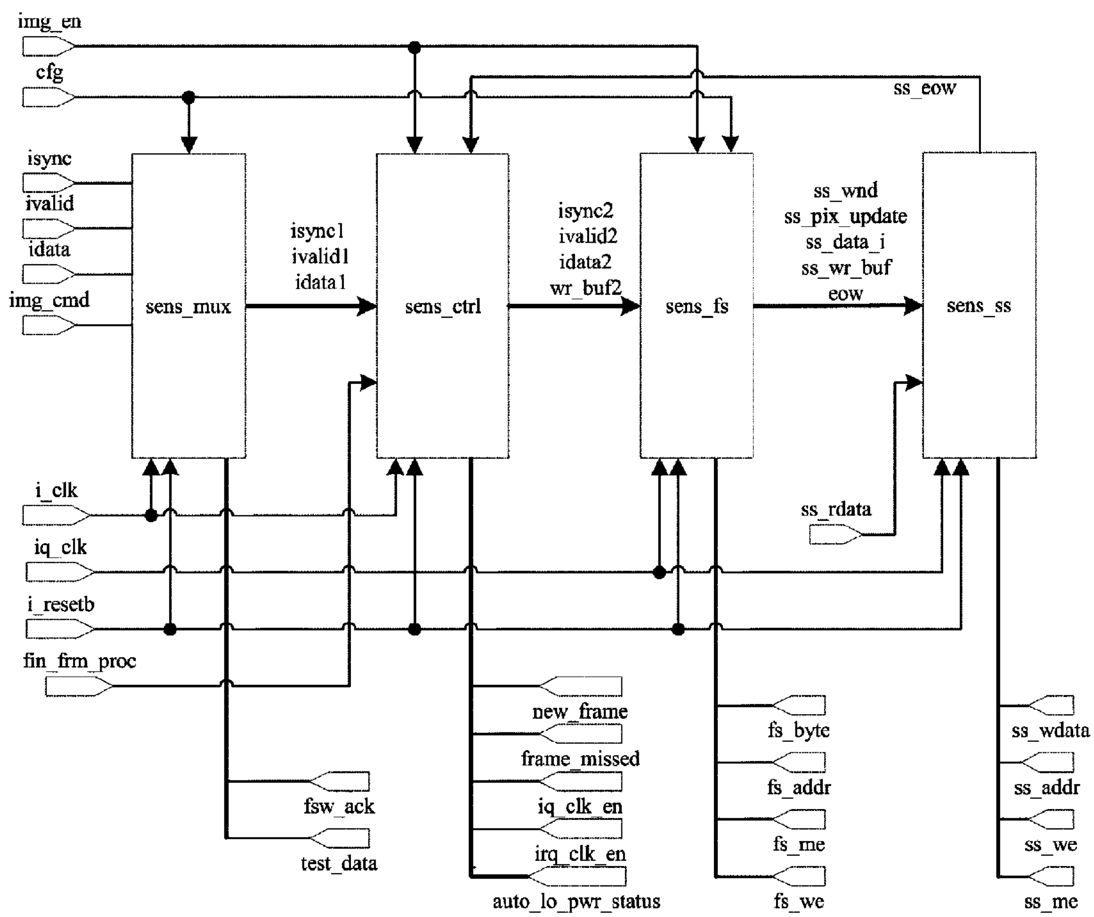

As shown in FIG. 197, imgsensif is a structural block that pushes data from the sensor to the frame and sub-sampled buffers.

sens_mux

Enables either the sensor interface or the serial interface to write frame data. Always clocked—see also section Clocking.

It detects the rising edge of isync and generates a single pulse on the outgoing isync1.

In test mode, this block will also present every tenth value of the sensor interface to the serialif block via the test_data signal.

sens_ctrl

Controls which buffer a frame will go into, and controls the sensor side clocks.

If a buffer is available, sens_ctrl passes data through to the next available buffer and waits for 'EOW' from sens_ss. 'EOW' marks a buffer as full and causes sens_ctrl to generate 'new_frame' to the serialif. 'fin_frm_proc' from the serialif frees the oldest buffer. If no buffer is available at the start of a frame, the frame is dropped and a 'frame_missed' pulse is generated.

Figure 199:
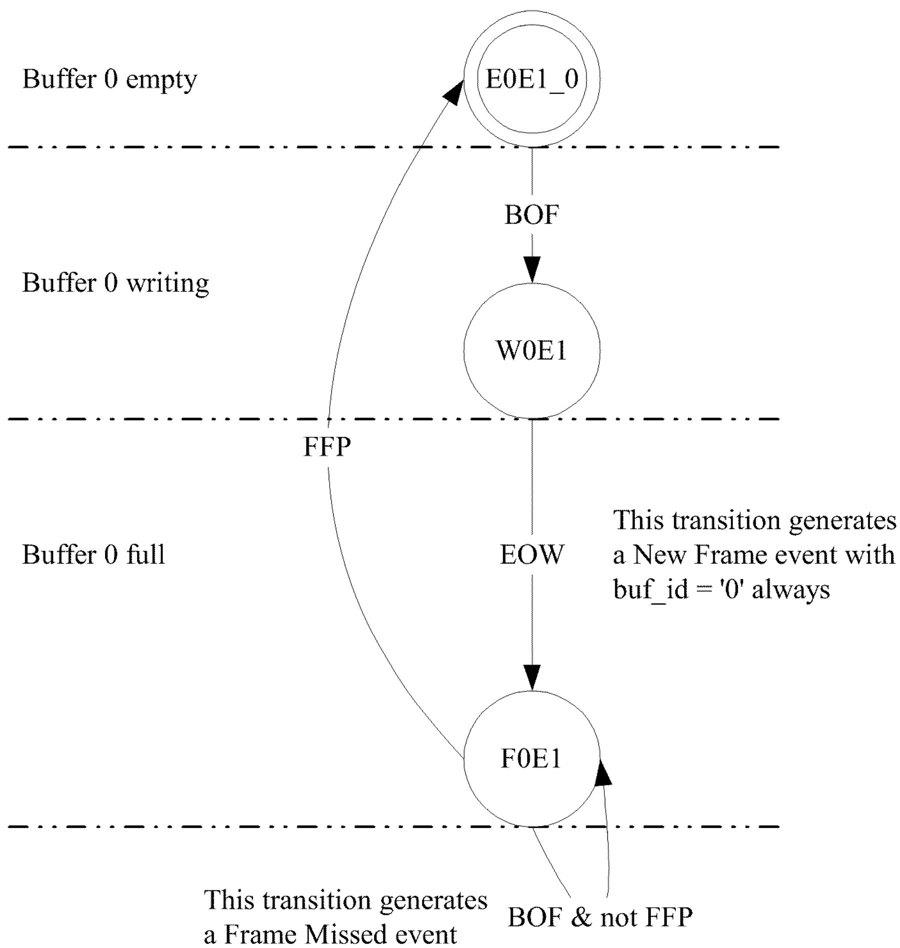
FIG. 199. sens_ctrl state machine (onebuf—single buffered)

Two VHDL architectures are provided in the design—the fsm architecture is a double-buffered version (FIG. 198), while the onebuf architecture is a single buffered version (FIG. 199).

sens_fs sens_fs performs the windowing function and writes all data inside the window into the frame store buffer.

It also calculates sub-sample pixel sub-row values (performing pixel replication where required) and passes theme to the sens_ss block.

These sub-sample pixel sub-row values are the sum of the three pixels in the same row of a sub-sample pixel. Thus, over three rows of frame pixels, three sub-row values are sent for each sub-sample pixel. When pixel replication is performed on the bottom edge, fewer than three sub-row values are sent.

Sub-sample pixel replication is performed at the right and lower edges of the window. First, the end frame pixel is replicated to the right if required—producing an intermediate sum with any unreplicated pixels in the same row. Then, only during the last row of the window, this intermediate sum is also multiplied by 1 plus the number of rows that need to be filled—either 1 or 2. This is the final sub-row value that is passed to the sens_ss block.

sens_ss sens_ss takes the sub-sample row value and updates the sub-sample buffer.

The subsample buffer is capable of accumulating 11-bits per pixel for an entire row of subsample pixels at a time.

When the first sub-row value for a sub-sample pixel arrives, it overwrites the value in the subsample buffer. When the second or third sub-row value arrives, it is added to the value in the sub-sample buffer. When the last sub-row value arrives (and this may also be the first, second or third sub-row value depending on bottom edge pixel replication) the result is divided by 9 before being written to the sub-sample buffer.

flash_expose

The flash_expose block generates the flash and expose image sensor timing output signals. The timing of these signals is based on either the internally or externally generated capture timing signal, and the flash and expose delay and high-time configuration values. A 24-bit counter is used to either generate or track the capture signal depending on the state of the CaptureIn configuration bit. Two 16-bit counters are used to generate the flash and expose signals. These counters (one for flash, one for expose) are loaded with the delay value when the capture signal is pulsed. They count-down and are subsequently loaded with the high-time value when the count is zero, at which point the timing signal (flash or expose) is asserted. When the high-time count reaches zero, the timing signal is negated and the counter remains inactive until the capture pulse is detected.

The flash_expose block accepts the variant generic which disables the generation of the fval signal, which is used only on the Europa design.

synch

A structural block containing synchronizers for data transfers between the sclk and iclk domains. Three types of signal synchronization are used: level, reset and pulse.

synchronizer

Figure 200:
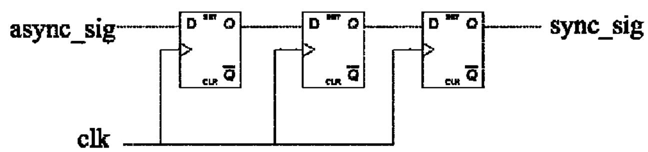
FIG. 200. synchronizer design

Synchronizes a signal using a standard n-stage synchronizer with the number of stages defined by the num_sync_stages_nc constant (3). The synchronizer design is illustrated in FIG. 200.

reset_sync

Figure 201:
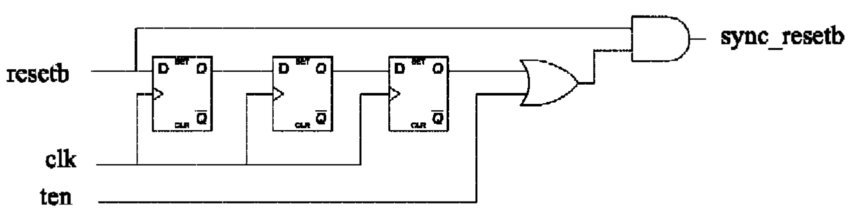
FIG. 201. reset_sync design

The reset_sync block synchronizes an active-low reset signal and produces an asynchronous assert (falling edge) and synchronous negate (rising edge). The number of synchronizer stages is defined by the num_sync_stages_nc constant (3). This synchronizer uses flipflops that are not reset. The test mode input (tmode) enables the output reset signal to be fully controllable during scan testing. The reset_sync design is illustrated in FIG. 201.

sig_pulse_sync

Figure 202:
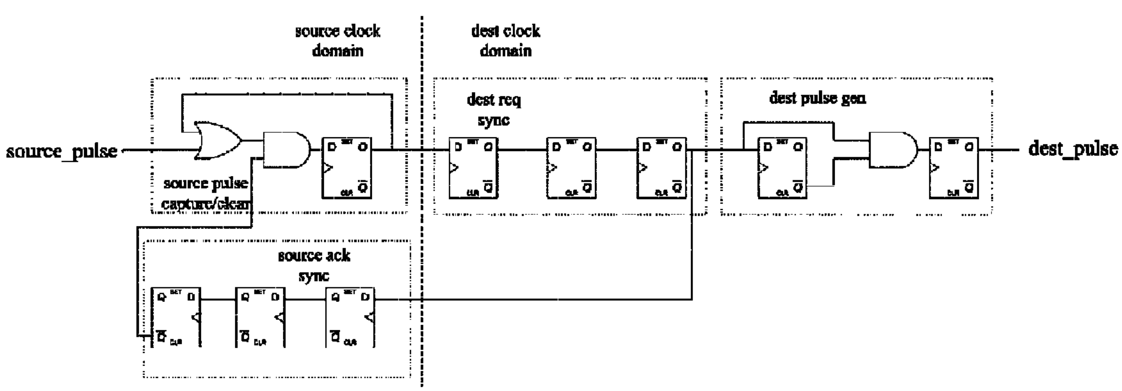
FIG. 202. sig_pulse sync design

The sig_pulse_sync block synchronizes a pulse from one timing domain to another. Due to scan-test restrictions, this is implemented using flipflops (instead of latches). The operation is as follows: the rising edge of the source pulse asserts the req signal. This req signal is then synchronized by the destination clock and the rising edge of the synchronized req signal used to generate a pulse in the destination clock domain. Meanwhile, the synchronized req signal is fed back to the source domain, where is it acts as an acknowledge. It is synchronized and used to reset the original req flipflop. The sig_pulse_sync design is illustrated in FIG. 202.

VHDL Generics

There are three independent generics used in the design.

The variant generic takes on the values v_europa or v_callisto. This is set on the instantiation of the core block, and is spread throughout the design where required. It is used mostly to optimise the subsample buffer address equation, but also in the sif_msghand block.

The buffering generic takes on the values b_single or b_double. It is also set on the instantiation of the core and spread where needed. It is used to conditionally instantiate the second of the double buffers. It is picked up by the config block to be reflected in the BufferingMode field of the Chip ID register.

The fs_width generic is set on the callisto entity at the very top of the design. It defines the width and height of the framestore buffer—each framestore buffer must hold at least fs_width*fs_width bytes—and it can take on values 1 to 256. This value is used to calculate the framestore buffer RAM address from the (x,y) coordinates and the subsample buffer RAM address as described above under the Architectural Overview.

The framebufs and subsambufs blocks use the fs_width generic to calculate the ss_asic_ram and fs_asic_ram memory sizes, which are passed down as the mem_size generic. This mem_size generic is used by the BIST circuitry to calculate the number of RAM addresses to test, and by the ss_asic_ram and fs_asic_ram behavioural models—which assume that the final Callisto implementation actually uses the minimum required memory sizes for a given fs_width. If more memory is actually used than is defined by fs_width, it will be used, but will not be tested by BIST.

The three generics always appear on component entities with default values of v_europa, b_double and 128 respectively. These defaults are purposely set to the values required to synthesize Europa.

Buffering

The design of the entire core is such that single and double buffering can be handled with relative ease.

The double-buffering scheme is fundamentally controlled inside the sens_ctrl block. It controls its own writes to the buffers, and when a new buffer is received, the new_frame event it sends to the serialif contains the number of the buffer that was written. It is this value that the serialif subsequently includes with all its image commands to the imgproc block, and uses to enable the sclk onto the appropriate rq_clk.

Figure 203:
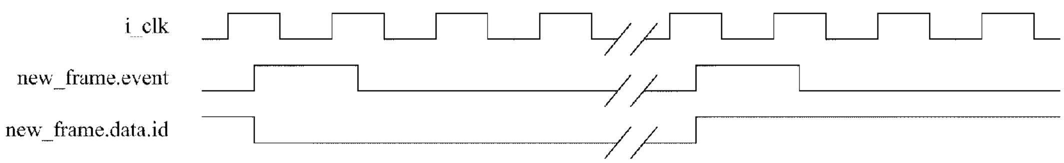
FIG. 203. New Fram events—Double buffering

The single buffered architecture (onebuf) of the sens_ctrl block will only allow one buffer, and will only ever set new_frame.data.id to '0'. FIG. 203 shows new frame events in a double buffering environment.

Single Buffering

Figure 204:
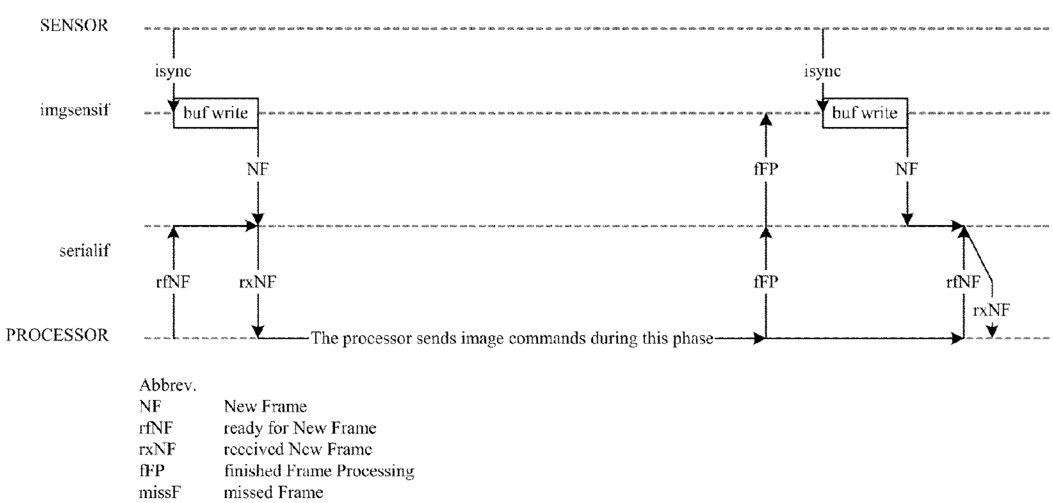
FIG. 204. Single Buffer—Basic cadence

The basic cycle under normal operation, i.e. no missed frames, is shown in FIG. 204.

Figure 205:
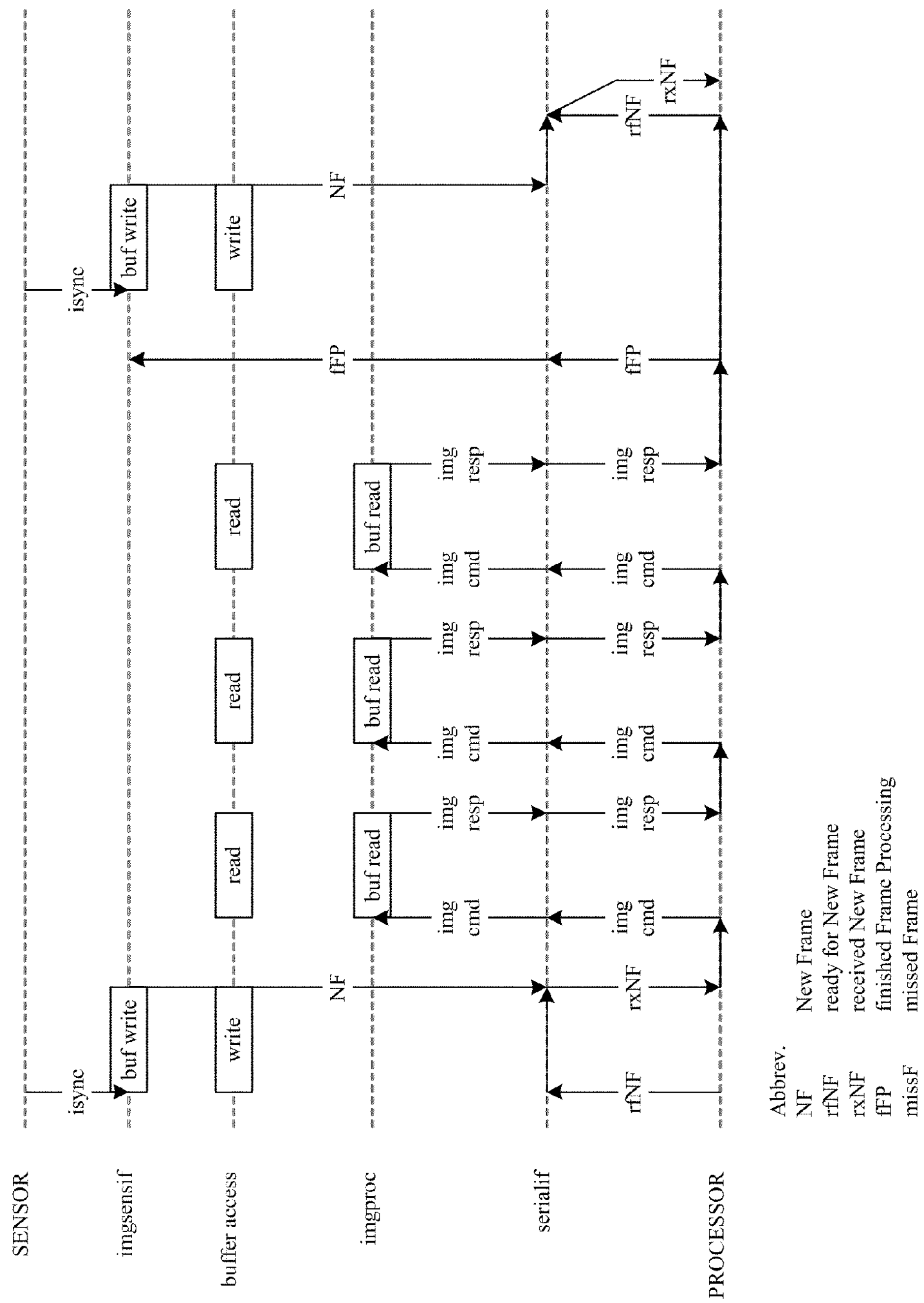
FIG. 205. Single Buffer—Normal operation

FIG. 205 shows normal operation, including all commands.

Single Buffer—Normal Operation

Figure 206:
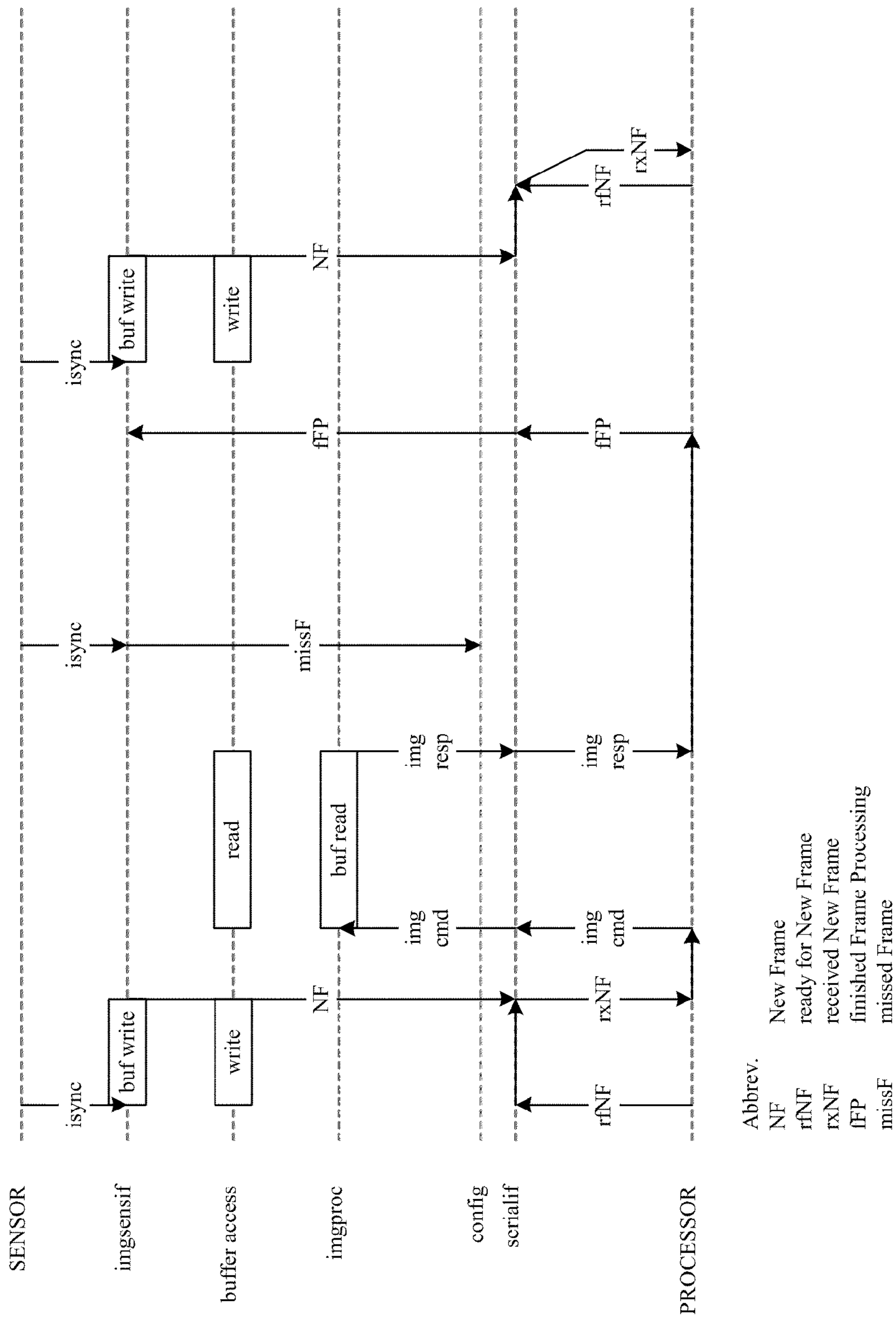
FIG. 206. Single Buffer—One missed frame

FIG. 206 shows a frame arriving at the imgsensif before the "Finished Frame Processing" event arrives from the processor. We see that the "New Frame" only comes in response to isync after "Finished Frame Processing".

Double Buffering

Figure 207:
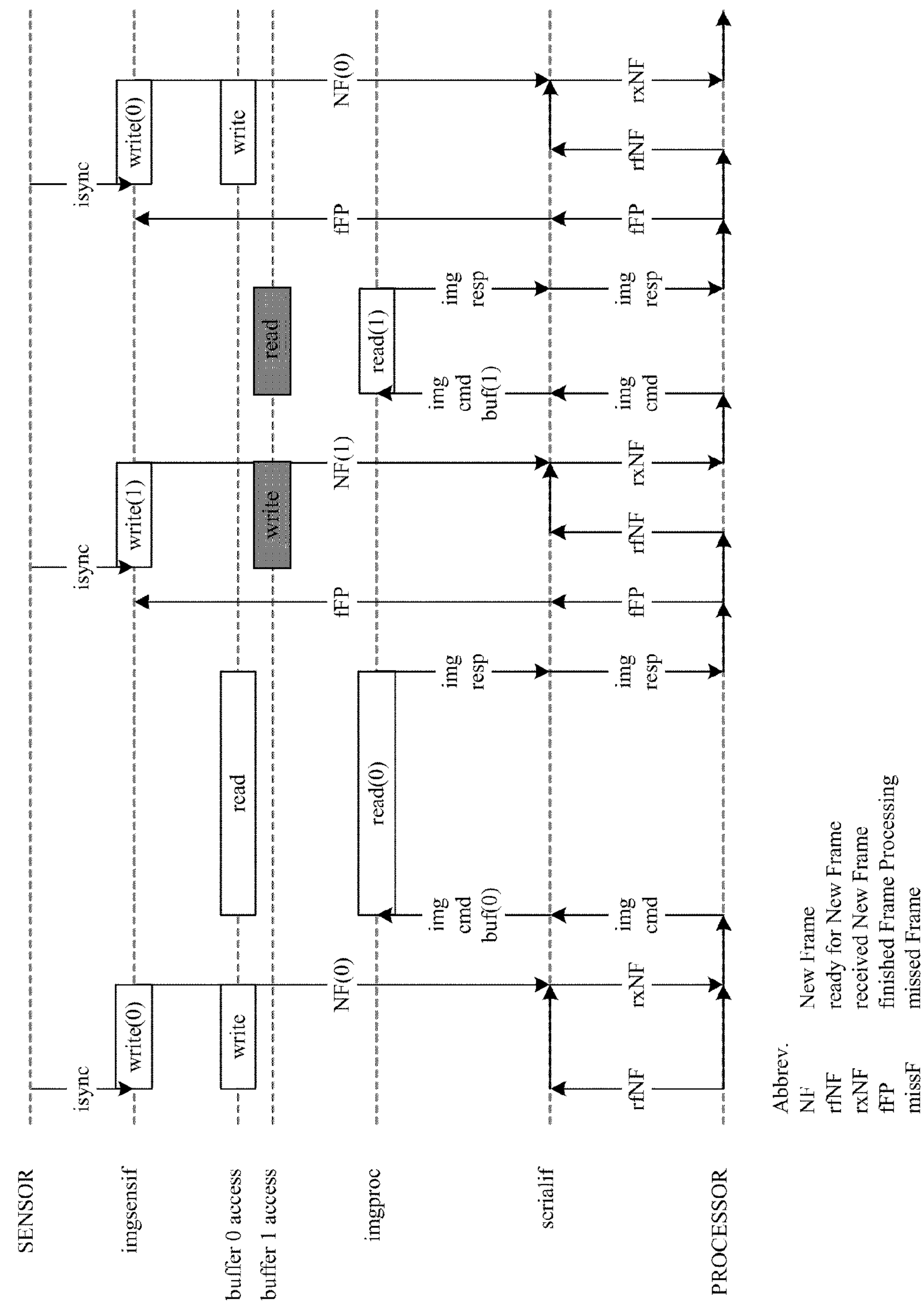
FIG. 207. Double Buffering—Same cadence as normal operation for single buffer
Figure 208:
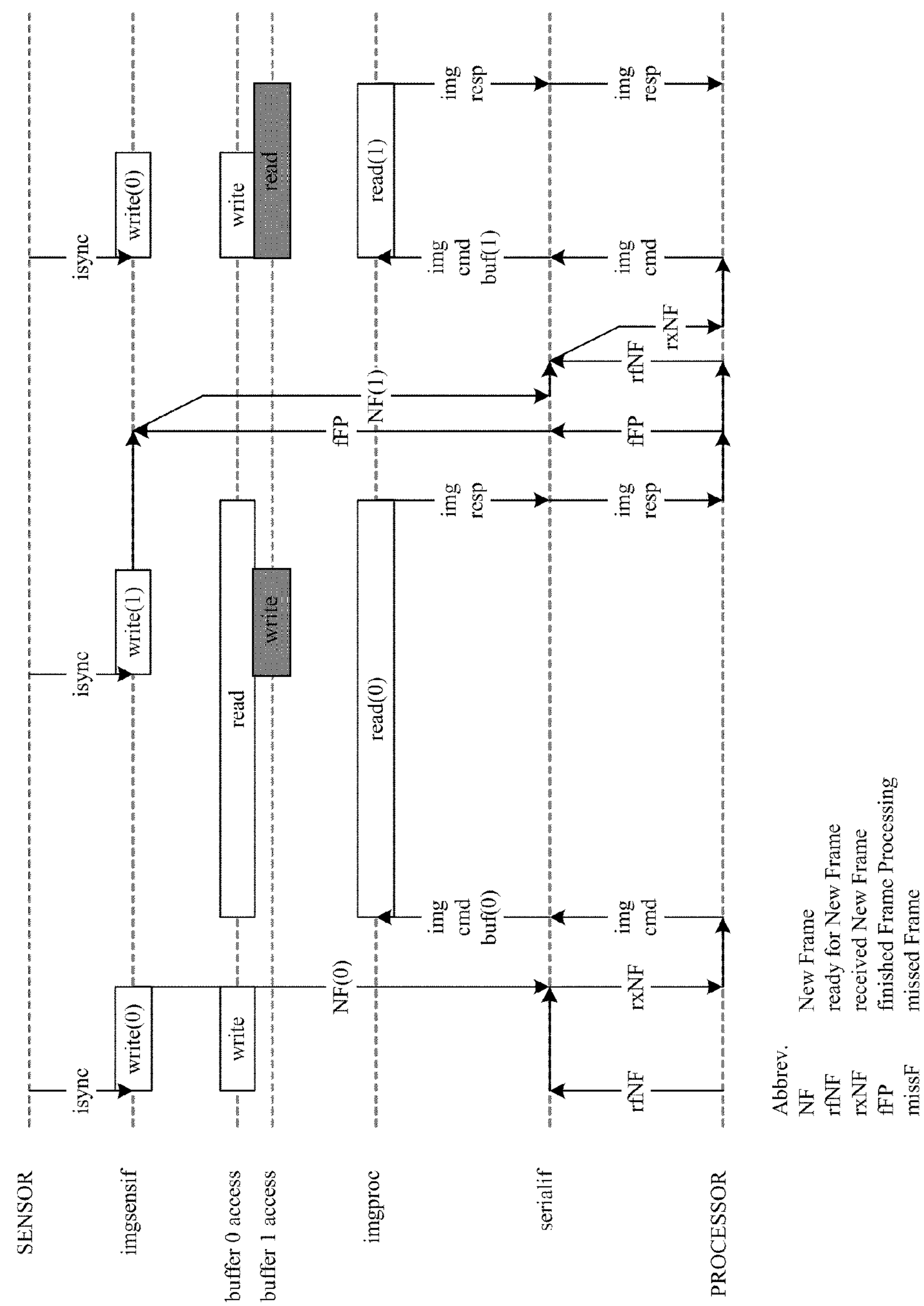
FIG. 208. Double Buffering—No missed frames, simultaneous read and write
Figure 209:
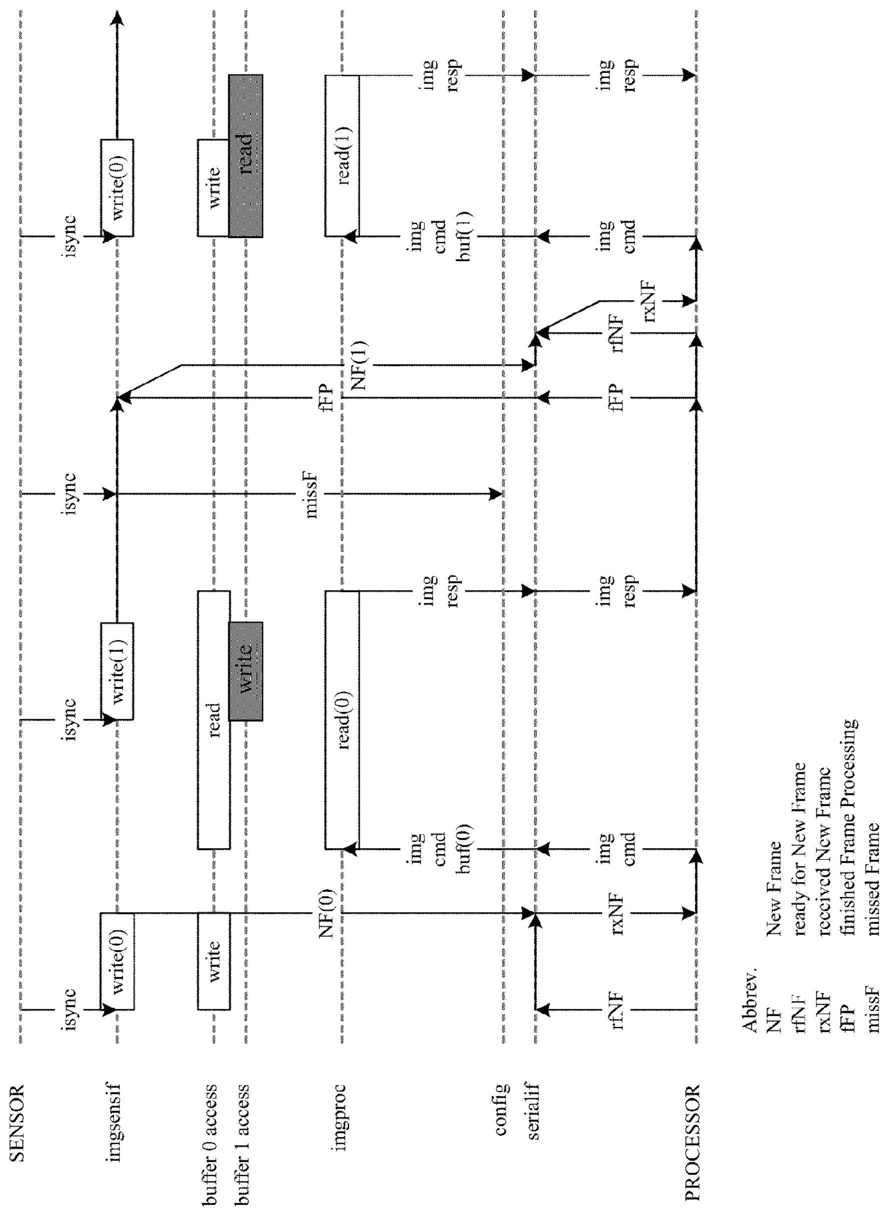
FIG. 209. Double Buffering—One missed frame

FIGS. 207, 208 and 209 respectively show double buffering with:

Same cadence as normal operation for single buffer

No missed frames, simultaneous read and write

One missed frame

Clock Circuits

There are three main aspects to the clocking of registers;

Separate input clocks for serial and sensor timing

Buffer access by circuits in these two clock domains

Low power operation

The following clocks are derived from the two input clocks:

s_clk: always active—straight from sclk i_clk: always active—straight from iclk sq_clk: sourced from sclk. Active from when a frame becomes available and disabled in low power mode iq_clk: sourced from iclk. Active only when the sensor is writing to the buffers and disabled when in low power mode rq_clk(0): active when buffer 0 is being accessed rq_clk(1): active when buffer 1 is being accessed (double buffered incarnation only)

Fundamental to the clocking strategy is the assumption that interaction between clocks within the two clocking families ('i' and 's') does not require any special circuitry. Synthesis using appropriately defined inter-clockskew, followed by corresponding clocktree skew balancing during layout, allows this to be realised.

Each of the two rq_clks drives one of the two buffers in the double buffering scheme. Each rq_clk can be sourced from either s_clk or i_clk (or neither), depending on what function is accessing the buffer—the internal protocol ensures only one side will access a buffer at any one time.

Each of the sclk and iclk domains controls its own drive to the rq_clks. The internal protocol for swapping clocks requires each domain to simultaneously turn off its drive to an rq_clk and to send an indication to the other clock domain through a synchronizer. It is the latency provided by the synchronizer that guarantees only one domain will be driving an rq_clk.

Image Processing Arithmetic Precision

There are three places where precision is a factor:

Range-Expansion and Thresholding

Sub-pixel Generation

Image Subsampling

Range-Expansion and Thresholding

Referring to Section 3.3.5, there are no special requirements for maintaining precision in the following equation:

$$v>=((t/255)*(\text{max}-\text{min}))+\text{min}$$

The t/255 value is presented as an 0.8 fixed-point binary number: it is not actually calculated in the device.

At all stages, full precision is maintained by increasing the number of bits where necessary.

Sub-Pixel Generation

All operations are fixed point binary. At all stages, full precision is maintained by increasing the number of bits where necessary.

Rounding is performed by starting with a constant value of b0.1 (binary ½) in the accumulator, and simply truncating at the end.

Image Subsampling

The sub-sampling process basically requires nine 8-bit values to be summed, then divided by 9 and rounded to produce an 8-bit result.

The precision of the design is operationally equivalent to floating point precision—i.e. the result for all possible input values gives a result that is indistinguishable from a floating point processor.

This is achieved in two ways.

The summation process only requires that the number of bits of storage at all stages is sufficient to hold the full range of values that could be possible at that stage. The result of this process is a 12-bit unsigned number, which is adequate to store all numbers from 0 to 255*9.

The 'divide by 9 and round' process is more complex.

We were able to use a Taylor expansion to get the desired result using only a subtractor, two adders and some shifting.

We 'lucked in' here because the binary value of 9 is b1001, which can also be represented as b1000*b1.001. Thus we have:

$$\text{result}=\text{int}(b0.1+acc/(b1000*b1.001))$$

The (acc/b1000) term is trivial—it is just a fixed point shift, which costs nothing in terms of gates.

So we are left with the interesting problem:

$$acc/b1.001$$

The constant b1.001 can be rewritten as (1+x) where x is b0.001

Using the Taylor expansion, we get $$\begin{aligned} acc/(1+x) &= acc*(1-x+x2-x3+\ldots\ ) \\ &= acc*(1-x)*(1+x2+x4\ \ldots\ ) \end{aligned}$$

or more specifically, for x=b0.001, $$acc/(1+b0.001)=acc*(1-b0.001)*(1+b0.000001+b0.000000000001+\ldots)$$

This still involves an infinite series, but the task here is to find out how many of the increasingly smaller terms is required to give the desired accuracy.

The solution was to use a brute force method to check the result of all possible input values (0 to 255*9). The final function used only the (1+x2) terms; however a small constant value was added to the final result to approximate the x4 term over the input range. We did it this way because we had to add a constant b0.1 at the end for rounding anyway—so we just added a slightly bigger constant.

Integrated Memory

All RAMs are synchronous single-port with separate read and write data ports.

Figure 210:
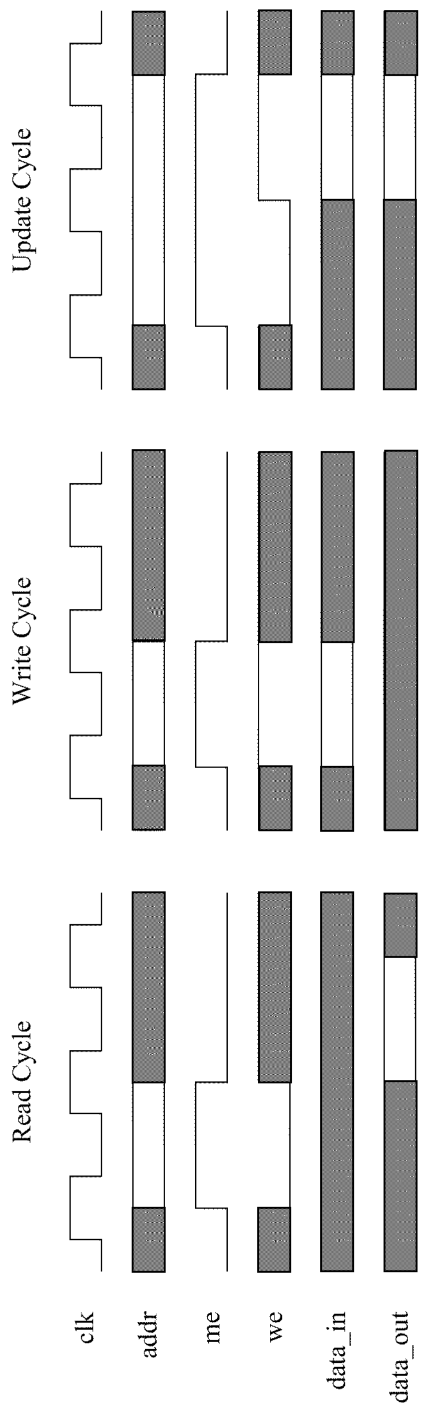
FIG. 210. Generalized RAM Accesses

The general access methods are shown in FIG. 210. The update cycle is just a read followed by write.

Frame Buffers

Each frame buffer is a simple, linearly addressed, byte-wide, single-port synchronous SRAM. By design, only one of the two addressing ports will access the RAM at a time.

A generic, fs_width, defining the maximum row width is used to generate the linear address from the (x,y) coordinates:

Address=$x$+($y$*$fs$_width)

Sub-Sample Buffers

The sub-sample buffers are designed to allow single cycle access to the pixels of 8 contiguous rows from the same column, but with the added feature of addressing on any 4-row boundary. This provides single cycle access to any pixel, and the two pixels above and the two pixels below, for the auto-level-threshold algorithm.

Figure 211:
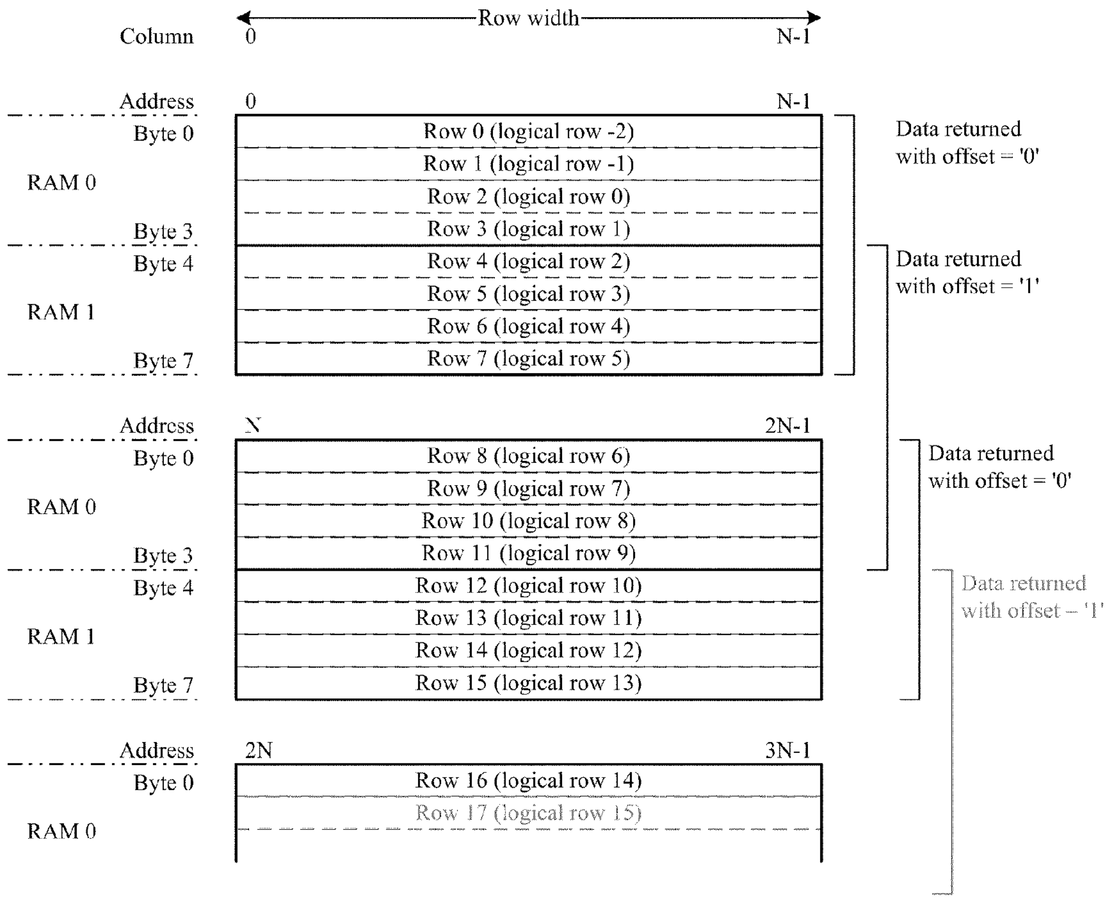
FIG. 211. Sub-sample Buffer RAM architecture

As shown in FIG. 211, each buffer is implemented with two 4-byte wide RAMs, some on-the-fly addressing and some re-ordering of the output data. Each RAM is cut into slices—each slice is the length of the maximum row width, and thus each slice contains four contiguous rows side by side. Slices from each RAM are alternated to provide all the required rows.

The two RAMs (RAM0 and RAM1) are addressed separately. If the address is supplied without an offset, both RAMs are given the same address. The resulting 8-byte data word gets it's four LSBs from RAM0 and it's four MSBs from RAM1. If the address is supplied with an offset, RAM1 gets the address as normal, but the RAM0 address is offset by the maximum row length (N)—thus retrieving data from the same column, but for the four rows below, rather than above. The resulting 8-byte data word is formed with it's four LSBs from RAM1 and it's four MSBs from RAM0 i.e the 4-byte words are swapped inside the result.

The fs_width generic is used to calculate the maximum subsample row width ss_width, which is used to generate the linear sub-sample address from the logical (x,y) subsample array coordinates:

Address=$x$+$ss$_width*($y$/8)

where the division function "/" is the standard VHDL definition of "/".

An extra bit—the offset—is supplied with the address. It indicates whether or not to offset the addressing of RAM0. This is calculated as:

Offset='1' when ($y$ mod 8)>=4

```
Example 1: X = 0, Y = 0 => Address = 0, Offset = 0
RAM0_addr = 0    => data out is Column 0, rows 0 to 3
RAM1_addr = 0    => data out is Column 0, rows 4 to 7
final result is (LSB first) Column 0, rows 0 to 3, Column 0, rows 4 to 7
          = Column 0, rows 0 to 7
Example 2: X = N−1, Y = 4 => Address = N−1, Offset = 1
RAM0_addr = N−1 + N (the extra + N due to Offset == 1)
     = 2N−1    => data out is Column N−1, rows 8 to 11
RAM1_addr = N−1    => data out is Column N−1, rows 4 to 7
final result is (LSB first) Column N−1, rows 4 to 7, Column N−1
rows 8 to 11
          = Column N−1, rows 4 to 11
```

A layer of logical addressing sits over the physical addressing—the logical byte rows, which actually start at −2, are mapped to the physical rows starting at 0. This is done so that the 8-bytes accessed by the physical sub-sample address always contains the 5 bytes required for one column of the auto-levelling window centred around the pixel at the (x,y) coordinate.

This means that the first two byte rows in RAM0 are wasted, but this helps to simplify the design of the auto-level-threshold. The simplification comes from the fact that you can just use the Y coordinate of the row being auto-level-thresholded and you always get the two-rows above and the two-rows below.

The last two byte rows are also effectively wasted. However, they will contain copies of the last row of the window—see Section on page 178.

Each RAM will actually be 35-bits wide rather than 32-bits wide. The extra three bits will be used by the sensor side to provide the required precision for the sub-sample accumulation, and will be ignored otherwise.

The reason for the extra three bits is that the maximum intermediate value that needs to be stored is the sum of two rows of three columns of maximum pixels i.e. 6*255, which requires 11 bits total. These extra three bits will be re-used by each row in the slice of four, since the storage for the extra precision is not required once a sub-sample row is complete, and we only store the final 8-bit value.

System Test Circuits

Direct Frame Store Writing

Direct frame store writing feature is intended to be a system-level testing feature, allowing Callisto to be tested without an image sensor. Frame data is loaded into the frame store by a series of image commands, each containing four pixels worth of data.

The serial interface block sif_msghand interprets frame store write messages and generates command words. When the WriteFrame configuration bit is set the sens_mux block ignores the external image sensor data and drives the internal image data signals with the data received from the serial interface command words.

To allow all possible iclk/sclk frequency relationships a high-level flow control mechanism is used whereby the sens_mux block triggers the transmission of the frame_store_write_ack message when the current command is processed.

Image Sensor Data to Serial Interface

When the test enable input (ten) is asserted Callisto pushes data received on from image sensor data directly out of the serial interface. This operation is intended to assist manufacturing testing of the image sensor on the Jupiter device. Due to the bandwidth mismatch, Callisto samples every tenth byte received from the image sensor, and if this byte is valid it is sent to the serial interface for serialization and transmission on txd.

Device Test Circuits

Scan

Figure 212:
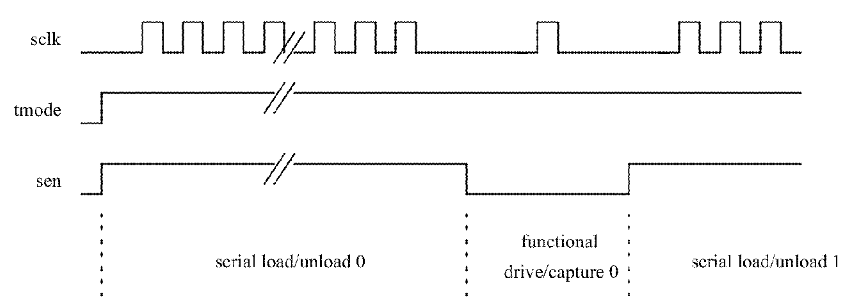
FIG. 212. Scan Test Operation

A single scan chain is to used for Callisto. Scan testing will be performed using sclk only, and will therefore require the tmode input to force mux sclk onto all clock nets. In addition, the assertion of the tmode input will be used to disable any non scan testable logic. The control of the tmode and sen inputs during scan testing is illustrated in FIG. 212. Due to the multiple clock domains and the use of negatively edge-triggered flipflops, careful attention must be paid to the scan chain ordering. Lock-up latches between different clock trees may be necessary. The SRAM cores may be put in a bypass or transparent mode to increase coverage of signals going to and from these cores.

Ram Bist

Each of the four instantiated SRAMs has associated BIST logic. This circuitry is used for ASIC manufacturing test of the RAM cores and runs a 13n MOVI RAM test pattern sequence. The BIST operation is controlled and monitored via the configuration registers. The test enable input signal (tmode) must be asserted during BIST testing to ensure the RAM clocks are driven by sclk.

Section F—Filtering and Subsampling

This section considers hardware implementations of low-pass filtering and subsampling (or decimation).

FIR filters are computationally intensive and in general, for real time video applications, require dedicated hardware which can exploit parallelism to increase throughput. To achieve linear phase, the FIR will have symmetric coefficients and with square pixels can apply the same filtering in X and Y dimensions which simplifies the hardware. When the filter output is to be decimated, further savings can be made as only input samples required to produce an output are taken into account. Usually, the 2D filter can be decomposed into an X filter and Y filter in cascade. For example, a 5 tap symmetric filter has 3 coefficient values so that 2 pre-adds can be used requiring only 3 multiplications per output sample. Since 2 filters in cascade are needed, 6 multiplications per sample are required. The process could be pipelined depending on the acceptable latency so up to 10 ms could be used at the cost of extra memory. At the other extreme, the filter could process directly data from the image array as it is read out or read it from the fieldstore at a lower speed.

Direct 80 and Transpose 82 forms of symmetric FIR filters are shown in FIG. 213. In some implementations, the transpose form 82 may have some advantage over the direct form 80. The combinatorial paths are shorter giving a faster design, but a disadvantage it that the delays no longer form a shift register and cannot be used to store elements of the original input data.

If a low-pass characteristic that is skew-symmetric is used, even coefficients will be zero except for the central one which reduces the computational effort. This implies odd length filters of order (4M+3). Maximally flat filters:—

M=0, coefficients 1 2 1

M=1, coefficients −1 0 9 16 9 0 −1

Coefficients are of the Form:

$$h=n/2^k$$

where n and k are integers which makes exact implementation easy. Only decimation by a factor of 2 is possible in one stage.

The partitioning and addressing of the fieldstore can be arranged such that neighbouring pixels are concurrently available, allowing 2D filtering on the fly without extra memory. This allows the processor to obtain the sub-sampled image pixels and store them for segmentation. A histogram can also be built on the fly.

The example shown in FIG. 215 partitions the memory into 4 blocks, which is particularly simple for addressing (being a power of 2). However, due to symmetry requirements, all coefficients must be equal so only a simple sinc response can be obtained. Furthermore, such a filter has a delay of half a pixel which is difficult to compensate for if the segmented image is used directly to estimate the centres of tag targets.

Decimation by 2 in both X and Y directions is inferred unless a slightly modified addressing scheme is used which allows odd and even samples from adjacent blocks to be read at the same time.

Clearly more coefficients are needed and preferably should be an odd number so that the image is delayed by an integer number of pixels.

As shown in FIG. 216, the number of memory blocks increases as the square of the number of filter taps in X or Y so this approach rapidly becomes impractical. Also, as mentioned above, the decimation factor is tied to the filter order unless a more complex addressing scheme and coefficient switching are used (which prevents constant coefficient multipliers being used).

It is preferable to partition the framestore to provide concurrent line access only and add additional pixel delays to make the X filter. Then, to allow a decimation factor which is not equal to the filter order, a slightly more complex addressing scheme is used and multiplexers added to route the samples to the adders and multipliers allowing the use of fixed coefficients.

In the example shown in FIG. 217, a 5th order FIR filter is assumed. Image lines are written sequentially to 5 memory blocks so that 5 lines may be read concurrently. Since data cannot be shifted from one memory block to another, a virtual shift register is formed with multiplexors. It may be that some paths are not required depending on the filter order and decimation factor N. Some sharing of the adders and multipliers (ROMs) is also possible depending on N.

The cost of adding a few linestores is small compared to the fieldstore. If decimation is required, the X filter benefits from the lower input rate. If separate linestores are used with decimation, the X filter is performed first and decimated, thus reducing the storage and speed requirements of the linestores.

It will be appreciated that multiplier-less filters can be implemented using shift and add functions. Canonical signed digit or other redundant binary arithmetic scheme (−1, 0, 1) can also be used.

Section G—Tag Sensing Algorithms

As described extensively in many of the cross-referenced documents, the preferred Netpage system relies on knowing the identity of the page with which the Netpage pen nib is in contact and the absolute position of the nib on the page. Knowledge of the pen orientation relative to the page is also required. In addition, various regions of the page may be given special properties that need to be known by the pen without referring back to some external server, i.e. they must be determined directly from the page with which it is in contact.

This requirement is achieved by printing tags on the page. The tags encode the data required by the system. These are the page identity, the tag location within the page and the properties of the region of the page containing the tag. The orientation of the pen relative to the page and the position of the pen nib with respect to the tag location can be determined from the location of the tag image in the pen's field of view and from the perspective distortion of the image of the tag. The tags are printed using infrared absorptive ink so that they will be invisible to the naked eye. Two sample tag designs are shown in FIGS. 219 to 222, which are described in detail below. The present description assumes the tag structure of FIGS. 219 and 220, although very little depends on the exact form of the tags. Many aspects of the tag sensing and decoding, especially the determination of the pen orientation and relative position, are described in detail in PCT Application PCT/AU00/00568.

The main focus of this report is on the image processing required to determine the tag location and perspective distortion and to sense the tag data. This task is made challenging by the requirements that the image consist of as few pixels as possible, by the effects of defocus blur and perspective distortion due to pen tilt, by motion blur, by shadows due to ambient illumination and by imperfections due to the printing process and damage to the page. Further, this processing must typically be performed by a battery-powered device at a rate of 100 times per second or more.

The Structure of Netpage Tags

The tags considered in this report consist of two components: targets and macrodots. The tag information is encoded in an array of macrodots. These consist of small solid circles about 130 μm in diameter. The presence of a macrodot indicates a bit value of 1, its absence a value of 0. The data is encoded with a forward error correcting code. The tags described in PCT Application No. PCT/AU00/01111 use a (15,7) Reed-Solomon code in GF(16) (which is described in more detail below). The targets are solid circles just over 300 μm in diameter. The targets delineate the different tags on a page and provide reference points from which the locations of the macrodots, which encode the individual tag data bits, can be found.

The macrodots do not abut one another, thereby avoiding the formation of dark regions that appear similar to the targets and there is a white border around the targets of at least 150 μm. Hence, the targets are always clearly visible. The exact numbers of targets or macrodots are not important to the design of the algorithm, other than that there needs to be at least four targets to allow the determination of the perspective transform. For convenience, we will always assume there are four targets. The dimensions are chosen to ensure the targets are clearly distinguishable.

Tag Sensing and Decoding

The algorithms proceeds through a number of stages to extract the required information from images of the tags. Generally, there are six steps after image acquisition:

1. Create a list of target candidates;
2. Select four candidates as the tag targets;
3. Determine the page-to-sensor transform;
4. Determine the tag bit pattern;
5. Decode the tag region identity and position code and any flags;
6. Determine the location of the pen nib and the pen orientation from the perspective transform and the location of the tag centre.

Steps 1 and 2 can be merged, but it is simpler to keep them distinct. Steps 4 and 5 can be performed concurrently, as the data is often extracted a word at a time. Further there are a number of alternative options for performing each of these steps. Of all these steps it is steps 1 and 2 that present the most challenges, although, in the presence of severe shadowing, step 4 can also be difficult.

The page-to-sensor transform of step 3 is straight-forward. There are well-known procedures for deriving the perspective transform given the mapping of one quadrilateral into another (for example, see Section 3.4.2, pp. 53-56, of Wolberg, G., *Digital Image Warping*, IEEE Computer Society Press, 1990). The algorithm for step 6, determining the pen orientation and displacement, is fully described in PCT Application PCT/AU00/00568. Hence these two steps are not described in this document.

Tag Sensing and Decoding Algorithm

Overview of the Image Processing

FIG. 219 shows the tag image processing chain. The first two steps condition the image for segmentation. The local dynamic range expansion operation 15084 corrects for the effects of varying illumination, in particular when shadows are present. This is followed by thresholding 15086, in preparation for segmentation 15088. Moments-based criteria are then used to extract 15090 a list of candidate targets from the segmented image. These first four steps correspond to step 1 in the preceding paragraphs. Geometric filtering 15092 is used to select a set of targets. This is step 2 described above. The pen-to-sensor transform is determined 15094 using the target locations (step 3) and finally, the macrodots are sampled 15096 to obtain the codewords (step 4).

Tag Image Processing Chain

Finding the Tags

The targets are used to delineate the different tags on a page and provide reference points from which the locations of the macrodots, which encode the individual tag data bits, can be found. Once a suitable set of four targets delineating a single tag have been found, a perspective transform can be used to begin decoding of the tag. The identification of a set of targets proceeds in two stages. First, a collection of target candidates are found, and then four of these are selected to be the final set of targets.

The search for the target candidates is performed directly on the image acquired by the pen and is the most costly and difficult step in terms of computation and algorithm development.

Creating the List of Candidate Targets

The preferred algorithm to create the list of candidate targets consists of a number of steps:

1. Local dynamic range expansion;
2. Thresholding;
3. Segmentation;
4. Target filtering using moments.

Step 1 preprocesses the image for conversion into a binary image (step 2), which is then segmented. The thresholding (step 2) can be carried out as the segmentation (step 3) is performed. It is more efficient, however, to incorporate it into the local dynamic range expansion operation, as will be shown below. The list of image segments is then searched for target-like objects. Since the targets are solid circles, the search is for perspective-distorted solid circles.

From the point of view of computation time and memory requirements, finding the candidate targets is the most expensive portion of the algorithm. This is because in all phases of this process, the algorithm is working on the full set of pixels.

Local Dynamic Range Expansion

The local dynamic range expansion algorithm goes much of the way to removing the effects of shadows and general variations in illumination across the field of view. In particular, it allows thresholding to be performed using a fixed threshold.

For each pixel, a histogram of the pixels in a window of specified radius about the current pixel is constructed. Then the value which a specified fraction of the pixels are less than, is determined. This becomes the black level. Next the value which a specified fraction of the pixels are greater than, is also found. This becomes the white level. Finally the current pixel value is mapped to a new value as follows. If its original value is less than the black level, it is mapped to 0, the minimum pixel value. If its value is greater than the white level, it is mapped to 255, the maximum pixel value. Values between the black and white levels are mapped linearly into the range 0-255.

Since the local dynamic range expansion operation must access all the pixels in a window around each pixel, it is the most expensive step in the processing chain. It is controlled by three parameters: the window radius, the black level percentile and the white level percentile. The values of these parameters used to find the targets in this work are 2, 2% and 2%, respectively. It is also convenient to perform thresholding simultaneously with dynamic range expansion. The threshold value for the range-expanded image is fixed at 128.

The values of the local dynamic range expansion parameters are such as to allow considerable optimisation of the local dynamic range expansion algorithm. In particular, a radius 2 window becomes a rectangular window containing 25 pixels. 2% of 25 is 0.5, hence to determine the black and white levels, it suffices to determine the minimum and maximum pixels in the window. The pixel mapping operation can be eliminated by calculating the local threshold for the unmapped pixel value directly using the equation $$((\text{black level})+(\text{white level}))/2$$

which approximates the exact value given by $$(\text{black level})+[128((\text{white level})-(\text{black level}))]/255$$

Given that the number of pixels in the window is much less than the number of bins in the histogram (there are 256), and that it is sufficient to find only the maximum and minimum pixels in the window, it is more efficient to find these values directly by examining all the pixels in the local window of each pixel. The maxima and minima for the local window are best calculated from the maxima and minima of the columns making up the window. This way, as each pixel on a row is processed, the subresults from the previous pixel can be reused.

With these considerations in mind, the cost per pixel of the local dynamic range expansion operation is shown in the following table. The divide by 2 can be implemented as an arithmetic shift right. The count for the register copies is a worst case count, on average there would be 9 register copies per pixel. All these operations can be performed using 16-bit integers. From the following table, the total operations count per pixel is 65. The only significant memory required is for the thresholded output image. If this is stored as a bit image, the original image size is required for storage, at the expense of extra processing to create the bit image. Otherwise, an amount of memory the same as the original image size is required.

The Local Dynamic Range Expansion Per-Pixel Operations Count

| Operation | Count |
|---|---|
| Fetch | 14 |
| Store | 1 |
| Register copy | 16 |
| Compare | 17 |
| Increment | 15 |
| Add | 1 |
| Divide (by2) | 1 |

Segmentation

The segmentation algorithm takes as its input the binary thresholded image and produces a list of shapes. A shape is represented by a point list, a list of the coordinates of the pixels in the shape. The original binary image is cleared as each pixel is visited.

The segmentation algorithm proceeds by examining each pixel in the field of view. If the value of the pixel is below the threshold or if the pixel has already been assigned to an object, it proceeds to the next pixel. Otherwise, it uses the object seed fill algorithm described in Heckbert, P. S., A Seed Fill Algorithm, Graphics Gems, pp. 275-277 and 721-722, ed. Glassner A. S. (Academic Press, 1990) to determine the extent of the object. This algorithm visits each pixel a little more than twice.

The principle of the seed fill algorithm is as follows. Given a pixel in the image, the seed pixel, it finds all pixels connected to the seed pixel by progressively moving through all connected pixels in the shape. Two pixels are connected if they are horizontally or vertically adjacent. Diagonal adjacency is not considered. A pixel is in a shape if its value is above a nominated threshold. Visited pixels are set to zero so that they will be ignored if encountered again. (Note, this assumes the tag images are inverted, so that they are white on a black background.)

Starting from the seed pixel, or the first pixel it encounters in a row, it scans along the row until it finds the first pixels to either side that are not in the object, placing pixel coordinates in the point list as it proceeds. Then, for each pixel in the row segment, it examines the two vertically connected pixels. If these are in the object and have not already been visited, it first stores information on its current state, the segment details, and repeats this procedure recursively for each of these adjacent pixels.

The nature of this algorithm means it is particularly difficult to estimate its running time and memory requirements. The memory requirements can be limited by applying the target filtering to each shape as it is segmented, thus avoiding the need to store the points list of more than one shape at a time. Also, there is a maximum number of pixels that a valid target can occupy. Once this is reached, there is no need to continue storing points in the point list. Despite this, the fill procedure for each object still uses a stack with 4 bytes per entry, and this can grow to a depth of the order of half the image size, requiring roughly twice the image size in actual memory. In this extreme case, where the shape has a serpentine form occupying the entire image, each pixel is visited close to three times. As a rough estimate, the order of 10-20 operations per pixel are required.

Target Filtering

The target filtering step searches the shape list for shapes of suitable size and shape. A moments-based approach is used. The shape list is first culled of candidates that contain too many or too few pixels. Then the moments of each shape are calculated and if all the moments are within the specified ranges, the shape's position is placed in the candidate list. The positions are determined by calculating the centroid of the binary image of the shape, i.e. only the pixel positions are used. The moments filtering consists of rejecting any shapes whose binary moment do not lie in certain specified ranges. (For a detailed description of moments, see Chapter 8 of Masters, T., Signal and Image Processing with Neural Networks, John Wiley and Sons, 1994) The parameters considered are the aspect ratio, which must lie within a certain range and the (3,0), (0,3) and (1,1) moments, all of which must be less than suitably specified maximum values. For a perfect disc, the aspect ratio is 1 and the moments are all 0, a result of the symmetry of this shape. From symmetry considerations, the minimum aspect ratio should be the reciprocal of the maximum aspect ratio. The perspective transform causes the moments and aspect ratios to vary from the ideal values. The limits on the allowed pen tilt limit these variations and so determine the permitted ranges of these parameters.

The computational cost of this step depends on the number of pixels in each shape and the number of shapes. For each shape it is necessary to first calculate the centroid, as central moments are used throughout. The operation counts for a shape are shown in Table. There are also eight divisions per shape. The results of six of these divisions are only used in comparison tests, and so can be replaced by multiplications of the other side of the comparison. The remaining two of these divisions are required to calculate the centroid. These are divisions by N, the number of points in the shape, which can be replaced by multiplications by 1/N. The restricted range of allowed pixel counts in a shape means that 1/N can be determined from a look-up table. Because we must calculate the central moments, i.e. relative to the centroid which is non-integral, these operations must be performed using fixed point arithmetic. A worst case is when the target candidates cover the entire image, in which case, we can consider the total number of points in all the targets to be a significant fraction of the total number of pixels. However, in the cases where this occurs, it is unlikely that a valid set of targets will be found and so the search would be abandoned anyway.

The Moments-Based Target Filtering Operations Count (N is the Number of Points in the Target Candidate)

| Operation | Count |
|---|---|
| Add | 9/N |
| Multiply | 5/N |

An alternative to using moments is to use caliper measurements (discussed in more detail below). These require much less calculation, but are more sensitive to segmentation noise, as one pixel more or less in an object can have a significant effect. Despite this, using these measurements can produce results of comparable accuracy to those obtained using moments. However, because the target position must be known to sub-pixel accuracy, the target centroid must still be calculated.

Selecting the Targets

Given a list of target candidates, four suitable candidates must be selected as targets. A simple approach is to select the four candidates closest to the centre. Better performance is achieved by enforcing various geometric constraints on the four targets. In principle, any arrangement of four targets is feasible, but the restricted field of view and the allowable tilt range constrains the distances and angles between the targets.

The Procedure Used is to:

1. Find the candidate closest to the centre;
2. Find the candidate closest to a specified distance from the first candidate;
3. Find the candidate closest to a point the specified distance from the first target along a line through the first target and perpendicular to the line between the first two targets;
4. Find the candidate closest to the point completing the parallelogram formed by the first three points.

At each of steps 2 to 4, the distance of the selected target from the previously selected targets must be within certain limits. If this is not the case, then a fallback procedure is used, in which the previously selected candidates are rejected and the next best candidate selected. This continues until an acceptable set of four targets has been found or the list of possible target combinations is exhausted, in which case the tag sensing fails.

The main calculations performed in the above procedure are distance calculations. To deal with the fallback, the distances should be saved as the list of candidate targets is searched. In most cases, no fallback occurs and so the operation count is as shown in the following table. The most expensive operation is the distance calculation, which requires 2 subtractions, 2 multiplications and an addition. It is sufficient to perform the calculation using the target pixel locations, which are integers, rather than the centroid locations, which are reals, and so the calculation can be performed using integer arithmetic.

The Target Selection Operations Count (N is the Number of Target Candidates. It is Assumed No Fallback Occurs)

| Operation | Count |
|---|---|
| Store | 8N |
| Compare | 7N |
| Add | 12N |
| Multiply | 8N |

Sampling the Data Bits

To determine the bit values in the tag image, the intensity value at the predicted position of a macrodot is compared with the values at its four diagonal interstitial points. The central value is ranked against the interstitial values and the corresponding data bit assigned a value of 1 if the rank of the pixel value is large enough. Experiments indicate that a suitable minimum rank is one, i.e. if the macrodot pixel value is greater than any of the interstitial pixel values, the bit is set to one.

The predicted macrodot location is determined using the perspective transform determined from the target positions. This position is specified to sub-pixel accuracy and the corresponding intensity value is determined using bilinear interpolation.

The square tag design described in PCT Patent Application PCT/AU00/01111 and illustrated in FIGS. 220 and 221 has 240 macrodots and 304 interstitial positions. Thus, 544 perspective transforms and bilinear interpolations are required. The following table shows the operation counts for this process. All these operations are fixed point operations. Given the number of intensity values that must be sampled and their compactness in the image domain, it may be worthwhile to transform the image values into the tag coordinate domain using the approaches described in Section 7.6, pp. 240-260, of Wolberg, G., Digital Image Warping, IEEE Computer Society Press, 1990.

The Data Bit Sampling Operations Count (N is the Required Number of Intensity Samples)

| Operation | Count |
|---|---|
| Fetch | 4N |
| Add | 14N |
| Multiply | 11N |
| Reciprocal | N |

Decoding the Tag Data

In the square tag design described in PCT application PCT/AU00/01111 and illustrated in FIGS. 220 and 221, the tag data is encoded using a (15,7) Reed-Solomon code in GF(16). There are four codewords, each containing fifteen 4-bit symbols 92 that are distributed across the tag area. In FIG. 220, one of the four codewords is indicated by bold outlines 94 around each of its symbols. The decoding procedure uses Euclid's algorithm, as described in Section 9.2.3, pp. 224-227, of Wicker, B. W., Error Control Systems for Digital Communication and Storage, Prentice Hall, 1995. This is unlikely to require much in the way of computation or memory to implement. A slightly more efficient algorithm, the Berlekamp-Massey algorithm (Section 9.2.2, pp. 217-224, of Wicker, B. W., ibid), can also be used.

Determining the Pen Position and Orientation

Given the perspective transform, as determined from the target positions in the image, together with the geometry of the pen, one can determine the pen position and orientation using the direct procedure described in PCT Application PCT/AU00/00568, or the iterative least-squares procedure described in US patent application filed 4 Dec. 2002 with U.S. patent application Ser. No. 10/309,358.

Performance and Running Time of the Algorithm

From the point of view of computation and memory, the most expensive processing steps are the local dynamic range expansion preprocessing and the subsequent segmentation, as these two steps are applied to the full-resolution image. The memory requirements for these two steps are roughly three times the size of the image in pixels, assuming that the range-expanded image is thresholded as it is formed, and so requires ⅛ the amount of memory as the input image. If the thresholded image is stored in unpacked form, i.e. one byte per binary pixel, then a total of four times the image size will be required. This factor includes the storage of the original image in memory which must be preserved for the latter macrodot sampling. The local dynamic range expansion step requires of the order 65 operations per pixel.

Considering a circular image field of diameter 128 pixels (corresponding to 12 900 pixels), adequate for decoding the macrodots, acquired at 100 frames per second, and a processor with a clock frequency of 70 MHz such as the ARM7, then there are 55 clock cycles per pixel. This is insufficient for performing the initial dynamic range expansion step, let alone the segmentation. 40 000 bytes of memory are required for the two initial steps, which becomes 52 000 bytes if the thresholded image is stored in unpacked form.

Clearly, the only way the algorithm can be used as described is to use a faster processor or alternatively, to provide hardware support for the local dynamic range expansion step. The expensive local dynamic range expansion step is used to allow some tolerance of shadowing and general variations in illumination within the captured image. Even using local dynamic range expansion, shadows may still be a problem, depending on the relative intensities of controlled light source illumination and uncontrolled ambient illumination. Generally errors occur where a shadow boundary intersects a target.

After local dynamic range expansion, the segmentation operation still remains. This requires from 10-20 operations per pixel. Since a large proportion of the algorithm involves memory access, this translates to 20-40 processor cycles with our example ARM7 processor. In the worst case, the moments calculation requires roughly 13 operations per pixel, requiring 25 processor cycles. Hence, using these rough estimates, these two operations alone consume all of the 55 available processor cycles, leaving nothing for the remaining steps or for other processor tasks.

Summary And Conclusion

In this section the problem of sensing and decoding Netpage tags in the presence of shadowing has been examined. A relatively simple approach to dealing with shadows in the image has been described and analysed. It is clear that the processing resources required for even this simple approach probably require special-purpose hardware support.

If the controlled pen illumination is sufficiently intense compared with uncontrolled ambient illumination, then shadows are less of a problem, and a simple global threshold may be used, remembering that the main purpose of the dynamic range expansion step is to determine a threshold for the subsequent segmentation step. The required global threshold can be determined by constructing a cumulative histogram of the image as described below. Experiments show that in the absence of shadows, such an algorithm gives a tag sensing error rate close to zero. If required, hardware support for this would be relatively simple to provide, involving little more than memory access and incrementing. Even without hardware support, this operation would require only 6 operations per pixel to construct the initial histogram. For the ARM7 this translates to 10 cycles per pixel.

Even with this increased illumination, it is still difficult to perform the required processing in the available time, motivating a modified approach. The problem is that the early processing operations all have a running time of the order of the number of pixels in the image. For the example above, there are 12 900 pixels. The number of pixels required is determined by the need to be able to resolve the macrodots which carry the data. The tag targets are roughly twice the size of the macrodot spacing, and can still be resolved with half the pixel spacing. Hence an image of 3 200 pixels should be adequate for finding the targets. Techniques for finding the targets using low-resolution images are discussed in the following section.

Finding the Targets Using Low-Resolution Images

In this approach, a lower resolution images is used to determine the regions of most interest in an image, which are then examined at higher resolution. While we should be able to find the targets using a half-resolution image, to determine the tag macrodot bit values we need the target positions to sub-pixel accuracy at the full image resolution. As a result, the modified search procedure consists of first finding target candidates using a low-resolution image and then using the full-resolution image to make the final target selection and to determine their positions to the desired precision.

With this in mind, this section describes algorithms for finding the targets using half-resolution and third-resolution images. The process of finding the targets is largely identical to that described above and so we only examine the steps in the algorithm which differ. The main challenge it to determine the target positions accurately from the high-resolution images, using the results of the low-resolution steps, in a manner which does not squander the savings gained from using a low-resolution image in the first place.

Unlike the algorithm described above, the algorithms described here are not designed for images with strong shadows. In practice, this means we are assuming the controlled illumination is sufficient to swamp the ambient illumination, and hence suppress shadows due to ambient illumination.

Down-Sampling

In general, down-sampling involves forming a weighted sum of the high-resolution pixels in some window about the location of the down-sampled pixel, corresponding to low-pass filtering followed by re-sampling. Since the aim of down-sampling is to reduce the computational burden, we should use the simplest scheme possible. This is to down-sample by an integral factor, which only requires averaging the pixels in a square window of a suitable size.

This scheme can easily be implemented in hardware. By suitable organisation of the frame buffer, the low-resolution image can be stored in a virtual frame buffer where the pixel values are accessed as notional memory locations within a few processor clock cycles. The pixel values are calculated as required.

Table shows the operations count for down-sampling as a function of the number of pixels in the full-resolution image and of the down-sampling factor. Assuming an ARM7 processor, this comes out as $5N+5N/k^2$ cycles overall, where N is the number of pixels in the image and k is the down-sampling factor.

The Down Sampling Operations Count Per Down-Sampled Pixel (N is the Number of Pixels in the Full-Resolution Image and k is the Down-Sampling Factor)

| Operation | Count |
|---|---|
| Fetch | N |
| Store | $N/k^2$ |
| Add | $2IN + N/k^2$ |
| Compare | $N/k^2$ |
| Multiply | $N/k^2$ |

Finding the Targets

Introduction

The approach to finding the targets at low-resolution is essentially the same as that used previously with two changes. First global dynamic range expansion is tried, rather than local dynamic range expansion, as we are relying on artificial illumination sufficient to substantially eliminate shadows. Second, caliper measurements are used to filter the targets, rather than the moments-based filtering described above.

Global Dynamic Range Expansion

The global dynamic range expansion process is similar to the local dynamic range expansion process described above. The difference is that a histogram of the entire area of interest is taken and it is from this histogram that the transfer function is determined. This single transfer function is then used for the entire area of interest.

As with local dynamic range expansion, since we are only interested in the thresholded image, we can use the inverse transfer function to determine a threshold level. This single threshold level is then applied to the entire area of interest.

As there are generally far more pixels in the area of interest than in the 5 by 5 window used for local dynamic range expansion as described above, the entire histogram must normally be constructed. The computational cost of global dynamic range expansion is quite low, as each pixel is only visited twice: once to construct the histogram and a second time to apply the threshold. The following table summarises the operations count for global dynamic range expansion.

The Global Dynamic Range Expansion Operations Count. N is the Number of Pixels.

| Operation | Count |
|---|---|
| Fetch | 2N |
| Store | N |
| Increment | 2N |
| Compare | N |
| Add | N |

This adds up to roughly 12 cycles per pixel on the ARM7 processor.

Caliper Based Target Filtering

At the resolutions considered here, i.e. roughly the macrodot spacing, a target is only two to three pixels in diameter, depending on the pen tilt and its position in the field of view. The segmented images of a target can vary by the addition or deletion of a single pixel, and at lower resolutions this can make it difficult to set useful limits for the moments. For example, at these resolutions, a segmented target can consist of three pixels in an L-shaped configuration. To deal with this problem, rather than use moments, we use caliper measurements for the target filtering. Caliper filtering consists of examining the maximum extent of the shape in various directions. The parameters of the shape that are considered are its width, its height and its area, i.e. the number of pixels it contains. The tests are:

1. that the number of pixels in the shape is in a specified range;
2. that the width and height are in a specified range;
3. that the width to the height ratio is within a specified range;
4. that the fill factor is large enough.

As for moments-based filtering, we first test for the number of pixels in the shape.

The tests for the width to height ratios are $$(\text{width}-1) \leqq (\text{maximum aspect ratio}) \times (\text{height}+1)$$

and $$(\text{height}-1) \leqq (\text{maximum aspect ratio}) \times (\text{height}+1)$$

The additions and subtractions of 1 are to compensate for the spurious inclusion or exclusion of pixels into or out of the shape. For the fill factor the test is $$\text{Area} \geqq (\text{minimum fill factor}) \times (\text{width}-1) \times (\text{height}-1)$$

where again, we have subtracted 1 from the width and height to avoid the effects of the spurious inclusion of pixels into the shape.

The following table gives the operation count for finding the height and width of a candidate target.

The Operations Count to Find the Height and Width of a Candidate Target (N is the Number of Points in the Object)

| Operation | Count |
|---|---|
| Fetch | 2N |
| Register | N |
| Copy | |
| Compare | 3N |
| Add | 3N |

For the ARM 7, this works out as 13 cycles per point in the segmented object. There may be up to 15 points per object in a half-resolution image.

The following table shows the operations count for calculation of the calipers features.

The Operations Count to Calculate the Caliper Features

| Operation | Count |
|---|---|
| Compare | 3 |
| Add | 4 |
| Multiply | 4 |

Determining the Target Positions

To determine the precise centre of the targets we calculate the grey-scale centroid in the high resolution image, as opposed to the binary centroid used above. The centroid is calculated in a circular window about the target position determined from the low-resolution image.

The size of the circular window is chosen so as to guarantee including the entire target while excluding any nearby macrodots. This is a minor weakness of this technique. The combination of the low resolution and the noisiness of the low-resolution segmented image means that the target position, as determined from the low-resolution image, can be quite inaccurate. If the window is to be large enough to encompass the entire target, taking into account any inaccuracy in the positioning of its centre, then it will inevitably include some of the surrounding macrodots.

Improved Target Location

A simple approach to improving the estimates of the target locations is to use the same algorithm as used for high-resolution images, except that it is applied only in a small window around the target positions in the full-resolution image. The window positions are determined from the low-resolution images.

The histogram of a small circular region around a candidate target is taken and used to set a threshold, as described above, i.e. we use global dynamic range expansion within the window. An additional form of target filtering is then applied before the segmentation. Remembering that the targets are black, if the intensity of the pixel at the centre of the window is higher than the threshold for the window, the candidate is rejected and segmentation is not performed. Otherwise, the image within the window is segmented.

This segmentation starts at the centre of the window. Unlike the general segmentation applied to the entire image, it is sufficient to extract the single shape at the centre of the window. The position of the target is then given by the binary centroid of the extracted shape.

As pointed out in above, most of the errors of the simple low-resolution algorithm are due to poor location of the targets. However, a significant number of errors is due to target misidentification. To ameliorate this, the segmented high-resolution shape is subjected to further filtering using moments. Only targets that pass the moments criteria are considered for the final target selection process which, as before, is based on geometric constraints.

Performance of the Improved Low-Resolution Algorithm

Similar performance is obtained using third-resolution images with 1/9 the number of pixels. Quarter-resolution images are not so successful, since at this resolution the targets are reduced to single pixels. Improved performance at quarter resolution might be obtained by higher-quality filtering before down-sampling. However, this filtering would have to be performed in hardware for this approach to be practical, as the filter templates are likely to be of the order of 8 by 8 pixels in size. Even taking into account the gains due to down-sampling, this would require excessive processing resources from a general-purpose processor such as the ARM7.

Examining the numbers of candidate targets that pass each of the filtering steps provides some interesting insights. First, at low-resolution, the calipers tests play no part in reducing the number of target candidates. Any reduction in the number of candidates is due to selecting only candidates with suitable sizes. By size, we mean the number of pixels covered by the candidate. By contrast, many target candidates are eliminated because the intensity of their centre pixel in the full-resolution image is too great (remembering that the targets are black).

Applying Local Dynamic Range Expansion to the Low-Resolution Image

The algorithm described so far can be further improved. Pen-controlled illumination is still typically subject to variation within the field of view due to such factors as pen tilt. To overcome the effects of non-uniform illumination, local dynamic range expansion is applied to the low-resolution images rather than the global dynamic range expansion described above. The local dynamic range expansion is exactly as described above. The same parameters are used, noting that the dynamic range expansion radius is in terms of the low-resolution pixels. The cost of local dynamic range expansion is acceptable here because of the greatly reduced number of pixels in the low-resolution image.

Conclusion

Accordingly, Hyperlabel tags provide a useful technique for item-level product tagging. In particular, Hyperlabel tagging is inexpensive, making it economically viable for product items priced below a threshold value of a few dollars, such as the average grocery items, unlike RFID tags. In the grocery sector in particular, this provides many benefits such as reducing shrinkage, unsaleables and out-of-stocks.

In addition to this however, Hyperlabel tags provide consumers with the downstream benefits of item-level tagging such as the provision of additional interactivity, including the ability to define multiple interactive regions on product labels or packaging, which makes the use of Hyperlabel tagging preferable to the use of RFID tags.

It will be appreciated however that in some circumstances Hyperlabel tagging can be used in conjunction with RFID tagging.

Although the invention has been described with reference to a number of specific examples, it will be appreciated by those skilled in the art that the invention can be embodied in many other forms.

The invention claimed is:

1. A sensing device comprising:

an image sensor for capturing images of coded data disposed on a surface when the sensing device is interacted with the surface;

a framestore for storing frames of the captured image as image data;

subsampling means for subsampling the stored image data to generate subsampled image data;

an image processor for processing the subsampled image data to generate processed data based on the coded data sensed during the interaction of the sensing device with the surface; and a second subsampled framestore for storing subsampled image data based on image data from a second framestore, wherein the image processor is integrated on a monolithic integrated circuit, the monolithic integrated circuit including a first subsampled framestore for storing the subsampled image data based on image data from the framestore.

2. A sensing device according to claim 1, wherein the image sensor and framestore are integrated on the monolithic integrated circuit.

3. A sensing device according to claim 1, wherein the first and second framestores and the first and second subsampled framestores are integrated on a monolithic integrated circuit.

* * * * *